APPARATUS IN DATA PROCESSING SYSTEM FOR COORDINATING MEMORY COMMUNICATION AMONG PROCESSORS AND PERIPHERAL DEVICES

Original Filed Feb. 12, 1960

INVENTORS
HENRY L. HEROLD
JOSEPH WEIZENBAUM
BY
ATTORNEY.

United States Patent Office

Re. 27,157
Reissued July 20, 1971

27,157

APPARATUS IN DATA PROCESSING SYSTEM FOR COORDINATING MEMORY COMMUNICATION AMONG PROCESSORS AND PERIPHERAL DEVICES

Henry L. Herold, Los Angeles, Calif., and Joseph Weizenbaum, Concord, Mass., assignors to Honeywell Information Systems Inc.

Original No. 3,354,466, dated Nov. 21, 1967, Ser. No. 8,394, Feb. 12, 1960. Application for reissue Jan. 13, 1969, Ser. No. 801,872

Int. Cl. G06f *3/00*

U.S. Cl. 340—172.5 39 Claims

Matter enclosed in heavy brackets [ ] appears in the original patent but forms no part of this reissue specification; matter printed in italics indicates the additions made by reissue.

*ABSTRACT OF THE DISCLOSURE*

*A data processing system wherein a peripheral unit communicates with a memory store while the central processing unit continues to execute its normal sequence of operations. The central data processing unit responds only to the appropriate signal to provide the necessary data item transfer and to halt the transfer thereof. A buffer register transmits or receives data words to or from the peripheral device in succession. When the buffer register is filled with the information from the peripheral unit or has transferred the information to the peripheral unit, a signal is transmitted to the central data processing unit which provides the communication between the buffer register and the memory store.*

[TOPICS Column

General Description 3
Description of Drawings 5
Data Processing System—General 7
Data Representation 8
Mod-Bits 13
System Circuit Elements 14
Clock Pulse Generator 14
Clock Pulse Driver 16
Flip-Flop 17
AND-Gate 20
OR-Gate 21
Inverter 22
Emitter Follower 22
Register Transfer 23
One-Shot 25
Register 26
Data Processing System—Details 27
Data Processing Operations 29
Glossary and Index of Signals 32
Definitions 60
Component Details and Operations 61
The Logical Schematic Diagram 61
Central Processor 64
Timing Circuit 70
Clock Circuit 72
J-Mod-Generator 73
Arithmetic Unit 74
Control Console 78
Clear Controls 78
Starting Controls 79
Halt Controls 80
Sequential Memory Location Operation Controls 80
Miscellaneous Switches 81
Memory 81
Core Memory 82
Data Storage 83
Core Memory Addressing: Store and Read Out 85

TOPICS—Continued Column

Core Memory Data Read Out 88
M-Register 89
General Operation and Timing 91
Control Circuit 91
P-Buffer 92
Clock Circuit, P-Buffer 95
P-Mod-Generator 95
Control Typewriter 96
Data Input from Control Typewriter 96
Data Output to Control Typewriter 97
Register Type-In 98
Register Type-Out 98
Central Processor Control 99
Photoreader 100
Multiplex Buffer 100
Write Buffer 100
Clock Circuit, Write Buffer 103
Tape Handler 104
Tape Control Unit 107
Read Buffer 111
Clock Circuit, Read Buffer 114
Printer 114
Sorter and Character Reader 114
Sorter Control Unit 118
Clock Circuit, Sorter Control Unit 121
Instructions 121
Initial Routine During Instruction 122
Memory Cycle 122
Details of Initial Routine 122
Modulo-3 Check 123
Instruction 21: Exchange R and M (XRM) 124
Instruction 70: Transfer R to M (TRM) 126
Instruction 75: Transfer M to R (TMR) 126
Instruction 85: Transfer M to FULL (TMF) 127
Instruction 80: Transfer FULL to M (TFM) 128
Instruction 94: Exchange R and B (XRB) 128
Instruction 97: Exchange L and R (XLR) 129
Instruction 90: Shift R Right (N) (SHR) 130
Instruction 91: Ring Shift R (N) (RSR) 130
Instruction 92:
Shift FULL Right (N) (SHF) 131
Analysis of Joint Use of A and W to Control Shift Count 133
Instruction 93: Ring Shift FULL (N) (RSF) 134
Instruction 25: Mod-3 Generation on R (GMR) 134
Instruction 26: Mod-3 Generation on L and R (GMF) 135
Instruction 53: Halt (HLT) 136
Instruction 63: Jump Unconditionally (JUN) 137
Instruction 61: Jump Unconditionally, Transfer N to B (JNB) 137
Instruction 60:
Branch if D1 (BD1) 138
Halt Option 138
Instruction 62: Branch if D2 (BD2) 139
Instruction 64: Branch if D3 (BD3) 139
Instruction 54: Does Condition X Exist? (DSW) 140
Instruction 50: Change State of Sign or Designator of R, or Change Jc (CHR) 141
Instruction 76: Is R Greater Than M? (RGM) 142
Instruction 86: Is $L-R$ Greater Than $M_A$ and $M_A+1$? (FGM) 144
Instruction 71: Is R Unequal to M? (RUM) 145
Instruction 81: Is $L-R$ Unequal to $M_A$ and $M_A+1$? (FUM) 145
Instruction 31:
Find Word in Memory Equal to $L-R$ (FND) 146
Halt Search or Tumble Variation 148
Instruction 36:
Find Word in Memory Equal to or Greater Than FULL (FGR) 149
Halt Search or Tumble Variation 150
Instruction 35:
Tumble (TUM) 150
Halt Search or Tumble Variation 152
Instruction 72:
Add M to R (AMR) 152
Mathematical Analysis of Results of Complementation 154
Modulo-3 Comparison 155
Instruction 73: Subtract M From R (SMR) 156
Instruction 82:
Add M to FULL (AMF) 157
Hash-Add 162
Instruction 83: Subtract M From FULL (SMF) 162
Instruction 87: Add M to R and Carry (ARC) 163
Instruction 88: Subtract M From R and Carry (SRC) 164
Instruction 27: Add M to B (AMB) 164
Instruction 28: Transfer M to B (TMB) 165
Instruction 29: Extract M Into R by L (EXT) 166
Instruction 42:
Multiply M by R (MPY) 167
Tr Subsequence 168

TOPICS—Continued

| | Column |
|---|---|
| Td Subsequence | 168 |
| Miscellaneous Logic Relationships | 169 |
| Tape Interrupt Variation Not Necessary | 170 |
| Mod-Check | 170 |
| Mathematical Analysis of the Subtractive Td Subsequence | 170 |
| Instruction 43: | |
| Divide FULL by M (DIV) | 174 |
| Miscellaneous Logic Relationships | 175 |
| Tape Interrupt Variation Not Necessary | 176 |
| Mod-Check | 176 |
| Instruction 65: | |
| Read Magnetic Tape or Character Reader (RMT) | 180 |
| Magnetic Tape Reading | 180 |
| Character Reading | 183 |
| Instruction 66: | |
| Write Magnetic Tape or Load Printer (WMT) | 183 |
| Magnetic Tape Writing | 183 |
| Printer Writing | 185 |
| Instruction 68: Write Blockettes on Magnetic Tape or Load Printer (WMB) | 185 |
| Instruction 67: Alter Magnetic Tape (AMT) | 186 |
| Instruction 58: Start or Stop Check Feeding (CHF) | 187 |
| Instruction 57: Select Sorter Pocket (N) (POC) | 188 |
| Instruction 24: Transfer P to M (TPM) | 189 |
| Instruction 74: Transfer M to P (TMP) | 190 |
| Instruction 59: Photoreader or Control Typewriter In or Out (PIO) | 191 |
| Instruction 52: Ring Bell or Gong (RNG) | 192 |
| Automatic Subroutines | 192 |
| B-Subroutine | 193 |
| Designator Bit Subroutine | 194 |
| Augmentor Bit Subroutine | 194 |
| Breakpoint Bit Subroutine | 195 |
| Halts | 195 |
| Manual Halt | 195 |
| Selective Halt | 196 |
| Address Halt | 196 |
| Alarm Halt | 196 |
| Alarms | 196 |
| Sub-Alarms | 197 |
| Full Alarms | 197 |
| Operations From Halt Mode | 199 |
| Original Insertion of Instructions and Operands in Memory | 199 |
| Starting System From Halt Mode | 199 |
| Single-Cycle | 200 |
| Zingle-Cycle | 200 |
| Recycle | 202 |
| Manually-Controlled Operations Involving Sequential Memory Locations | 202 |
| Count-Up of Instruction Address Portion | 203 |
| Control Typewriter Load Memory Operation | 204 |
| Photoreader Load Memory Operation | 205 |
| Dump Memory Operation | 206 |
| Count-Up Recycle Operation | 207 |
| P-Buffer Operations | 207 |
| Transfer of P-Register Contents to M-Register | 208 |
| Transfer of M-Register Contents to P-Register | 208 |
| Control Typewriter Input to P-Register: Single Numeric or First Half Double-Precision Word | 209 |
| Modulo-3 Generation for Numeric Inputs to P-Register | 213 |
| Parity Checking | 214 |
| Photoreader Input to P-Register; Single Numeric or First Half Double-Precision Word | 215 |
| Control Typewriter or Photoreader Input to P-Register; Second Half Double-Precision Word | 216 |
| Control Typewriter or Photoreader Input to P-Register: Alphanumeric Word | 217 |
| Three Alphanumeric Characters Entered | 219 |
| Less Than Three Alphanumeric Characters Entered | 220 |
| Control Typewriter Output from P-Register; Single Numeric or First Half Double-Precision Word | 220 |
| Parity Bit Generation | 224 |
| Control Typewriter Output from P-Register Second Half Double-Precision Word | 226 |
| Control Typewriter Output from P-Register Alphanumeric Word | 226 |
| Register Type-Out, Register Type-In; General | 227 |
| Register Type-Out | 227 |
| Register Type-In | 229 |
| Multiplex Buffer Operations | 231 |
| Write Buffer Operations | 232 |
| Write Program-Interrupt Operation | 233 |
| Write Instruction-Parallel Operation | 236 |
| Write Instruction-Interrupt Operation | 237 |
| Blockette Variation of Write Buffer Operations | 238 |
| Write Buffer Data Transfer for Magnetic Tape Writing | 240 |
| Write Buffer Data Transfer for Printer | 243 |
| Read Buffer Operations | 244 |
| Read Program-Interrupt Operation | 245 |
| Read Instruction-Parallel Operation | 246 |
| Read Instruction-Interrupt Operation | 247 |
| Read Buffer Data Transfer for Magnetic Tape Reading | 248 |
| Data Retiming During Magnetic Tape Reading | 253 |
| Read Buffer Data Transfer for Document Reading | 255 |
| Document Reading and Sorting | 258 |
| Document Reading Operation | 259 |

TABLES OF FREQUENT REFERENCE

| Subject | Column |
|---|---|
| Digit Configurations | 9 |
| Data Word Configuration | 9 |
| Instruction Word Configuration | 10 |
| Alphanumeric Word Configuration | 10 |
| Alphanumeric Character Code | 14 |
| Register Flip-Flop Identification | 27 |
| Control Typewriter Two-Digit Character Codes | 97 |
| Sorter Control Unit Digits | 119 |
| Interrogations | 140 |
| P-Buffer Operations | 211 |
| Multiplex Buffer Operations During Instructions | 254 |

GENERAL DESCRIPTION

This invention relates to information processing apparatus and more particularly to apparatus for processing data at high speeds and adapted to communicate with slower operating components.

In the processing of data, various arithmetic and logical operations are performed on data items by a data processing unit, which is adapted to execute a sequence of these operations in a very short period of time. To maintain a rapid rate of execution of these operations, the data processing unit must be able to immediately receive data items when needed and to immediately store data items after processing. Rapid receipt and storage of data items by the data processing units is provided by a high-speed random access memory. The random access memory operates at a rate of speed compatible with that of the data processing unit and rapidly supplies a data item needed by the data processing unit or rapidly stores a data item provided by the data processing unit.

From time to time, the data processing unit will complete the processing of the data items in the memory or will fill the available memory storage space with processed data items, so that means must be provided to supply the memory with new data items for processing or to empty the memory contents into another storage medium. Consequently, additional storage media are provided, such as magnetic tape data storage units. These magnetic tape units communicate with the memory, under control of the data processing unit, to transmit new data items to the memory or to receive processed data items therefrom. However, magnetic tape units transmit and receive data items at a much slower rate than the data processing unit processes data; that is, the time between transmittal or receipt of successive data items by a tape unit is comparable to the time required for the data processing unit to execute several operations. Therefore, it is desirable, in order to maintain a high average data processing speed, that the data processsing unit does not remain idle during a period when the magnetic tape unit is filling or unloading the memory. Instead, it is preferable that the data processing unit continue to execute the aforementioned sequence of operations, pausing only when the magnetic tape unit is ready to receive from or transmit to the memory a complete data item.

Therefore, it is an object of this invention to provide a high-speed data processing system adapted to communicate with slower operating components.

Another object of this invention is to provide a data processing system adapted to operate with minimum time of interruption for communication with slower operating components.

Another object of this invention is to provide a data processing system adapted to communicate with a slower operating component by halting only when a complete data item is ready to be transmitted or received by said component.

The foregoing objects are achieved by providing a data processing system wherein appropriate signals are delivered when a mangetic tape unit is ready to receive from or transmit to the memory a complete data item and wherein the data processing unit of said system continues to execute its normal sequence of operations, responding only to these signals to provide the necessary data item transfer. A first register is adapted to receive new data items from a magnetic tape unit and a second register is adapted to transmit processed data items to another magnetic tape unit. A first signal issues when the first register has a complete data item therein to notify the data processing unit that this data item must be transferred to the memory. A second signal issues when the second register is ready to receive a complete data item to notify the data processing unit that another data item must be transferred from the memory to the second register. In response to either one of these two signals, the data processing unit will effect the required data item transfer between the memory and one of these registers. This transfer will take place during a period wherein no data item is to be transferred between the data processing unit and the memory. The data processing unit is adapted to discontinue executing its sequence of operations in response to either one of these signals in order to provide a period of sufficient duration to effect the required data item transfer.

In a data processing unit of the type described, the random access memory frequently stores a plurality of data items distinguishable from each other by an identifying number. For example, the memory may contain credit and debit items for a plurality of accounts, wherein each credit and debit item in the memory is provided with a corresponding account number. In order to provide expeditious processing of such credit and debit items, it is convenient to store these items in sequential memory locations in accordance with the numerical order of their associated account numbers. In sorting such account numbers into numerical order it is often necessary to determine the proper memory location for insertion of an unsorted number among a sequence of sorted numbers, and then to insert the unsorted number in this memory location among the sorted numbers.

It is, therefore, another object of this invention to provide a novel data processing system for sorting data items.

Another object of this invention is to provide apparatus for the rapid sorting of data items.

Another object of this invention is to provide apparatus for the sorting of data items according to the numerical content thereof.

Another object of this invention is to provide apparatus for sorting by insertion of unsorted data items among a sorted sequence of data items.

The immediately preceding objects are achieved by providing for the insertion of the unsorted data item into its proper sequential memory location among the sorted data items and by shifting the supplanted data item and the data items following in the sorted group to their next successive memory locations to accommodate the new entry. A register is provided for holding the unsorted data item to be inserted in the memory. An addressing means provides a sequence of memory location addresses starting from the memory location wherein the unsorted data item is to be stored. In response to each address of such sequence, the contents of the register and the addressed memory location are exchanged. When a data item having a predetermined configuration in the least significant digit position thereof is transferred to the register, a signal issues. In response to this signal further exchanges are discontinued.

DESCRIPTION OF THE DRAWINGS

The invention will be described with reference to the accompanying drawings, wherein:

[FIGURE 2 is a circuit diagram of a clock pulse generator useful in the system of FIG. 1;

FIGURE 3 is a circuit diagram of a clock pulse driver useful in the system of FIG. 1, and illustrates two symbols employed to represent the clock pulse driver;

FIGURE 4 is a circuit diagram of a flip-flop useful in the system of FIG. 1, and illustrates a symbol employed to represent the flip-flop;

FIGURE 5 is a circuit diagram of an AND-gate useful in the system of FIG. 1, and illustrates a symbol employed to represent the AND-gate;

FIGURE 6 is a circuit diagram of an OR-gate useful in the system of FIG. 1, and illustrates a symbol employed to represent the OR-gate;

FIGURE 7 is a circuit diagram of an inverter useful in the system of FIG. 1, and illustrates a symbol employed to represent the inverter;

FIGURE 8 provides circuit diagrams of two emitter followers useful in the system of FIG. 1, and illustrates the symbol employed to represent an emitter follower;

FIGURE 9 is a circuit diagram of a register transfer circuit useful in the system of FIG. 1, and illustrates a symbol employed to represent the register transfer;

FIGURE 10 is a circuit diagram of a register transfer interconnecting a pair of flip-flops;

FIGURE 11 is a circuit diagram of a one-shot useful in the system of FIG. 1, and illustrates a symbol employed to represent the one-shot;

FIGURE 12 is a block diagram of the data storage elements, the data transfer paths between these elements, and the major control elements of the system of FIG. 1;

FIGURE 13 is a block diagram of the circuits providing the input signals to a flip-flop of the system;

FIGURES 14*a*, 14*b*, and 14*c* provide a block diagram of the Central Processor of the system;

FIGURE 15 is a timing diagram illustrating the timing sequence of the Central Processor;

FIGURE 16 is a block diagram of the circuits providing the input signals to the T-counter of the Central Processor;

FIGURE 17 is a block diagram of the clock circuit of the Central Processor;

FIGURE 18 is a block diagram of the Arithmetic Unit of the Central Processor;

FIGURES 19*a* and 19*b* provide a circuit diagram of the Control Console of the system;

FIGURE 20 is a block diagram of the Memory of the system;

FIGURE 21 illustrates a magnetic core employed in the Memory of FIG. 20;

FIGURE 22 is a graph illustrating the hysteresis loop of the magnetic core of FIG. 22;

FIGURE 23 is a circuit diagram of an inhibit driver useful in the Memory;

FIGURE 24 is a block diagram of a memory addressing circuit useful in the Memory;

FIGURE 24*a* is a circuit diagram of a switch core driver useful in the memory addressing circuit of FIG. 24;

FIGURE 25 is a circuit diagram of a core read amplifier useful in the Memory;

FIGURE 26 is a circuit diagram of a strobe driver useful in the Memory;

FIGURE 27 illustrates waveforms useful in explaining the operation of the Memory;

FIGURE 28 is a block diagram of a memory control circuit useful in the Memory;

FIGURE 29 is a block diagram of the P-Buffer of the system of FIG. 1;

FIGURES 30 and 31 illustrate waveforms useful in explaining the operation of the P-Buffer;

FIGURE 32 is a block diagram of the Write Buffer employed in the Multiplex Buffer of the system of FIG. 1;

FIGURE 33 is a block diagram of the clock circuit of the Multiplex Buffer and Tape Control Unit;

FIGURES 34 and 35 are schematic diagrams illustrating the scheme for writing data on the magnetic tape of the Tape Handlers;

FIGURE 36 is a circuit diagram of a write driver useful in the Tape Control Unit;

FIGURE 37 is a block diagram of the amplifiers employed in reading data from the magnetic tape of the Tape Handlers;

FIGURE 38 is a circuit diagram of a read preamplifier useful in the Tape Handlers;

FIGURE 39 is a circuit diagram of a read amplifier useful in the Tape Control Unit;

FIGURE 40 is a block diagram of the Read Buffer employed in the Multiplex Buffer of the system of FIG. 1;

FIGURE 41 is a block diagram of the circuits providing retiming for the data read from a magnetic tape;

FIGURE 41*a* illustrates waveforms useful in explaining the operation of the data retiming circuits shown in FIG. 41;

FIGURE 42 is a schematic diagram of the Sorter and Character Reader of the system;

FIGURE 43 is a block diagram of the Sorter Control Unit of the system;

FIGURE 44 is a circuit diagram of interconnected amplifiers employed in the Sorter Control Unit and the Sorter;

FIGURE 45 illustrates a document adapted to be read by the Character Reader;

FIGURES 46 and 47 illustrate waveforms useful in explaining the operation of the Sorter and Sorter Control Unit;

FIGURES 48–105 illustrate logical schematic diagrams of the logical circuits providing input signals to the flip-flops of the Central Processor;

FIGURE 106 illustrates logical schematic diagrams of the logical circuits providing input signals to the one-shots of the Central Processor;

FIGURES 107*a*, 107*b*, 107*c* and 107*d* illustrate logical schematic diagrams of the logical circuits providing designated logical combination signals in the Central Processor;

FIGURES 108*a* and 108*b* illustrate logical schematic diagrams of the logical circuits providing clock pulse driver gating signals in the Central Processor;

FIGURES 109*a* and 109*b* illustrate logical schematic diagrams of the logical circuits providing inverter signals in the Central Processor;

FIGURES 110–120 illustrate logical schematic diagrams of the logical circuits providing input signals to the flip-flops of the Memory;

FIGURES 121*a*, 121*b*, 121*c* and 121*d* illustrate logical schematic diagrams of logical circuits in the Memory;

FIGURES 122–135 illustrate logical schematic diagrams of the logical circuits providing input signals to the flip-flops of the P-Buffer;

FIGURES 136 and 137 illustrate logical schematic diagrams of the logical circuits providing input signals to the one-shots of the P-Buffer;

FIGURES 138*a* and 138*b* illustrate logical schematic diagrams of the logical signals providing designated logical combination signals, clock pulse driver gating signals, and inverter signals in the P-Buffer;

FIGURES 139–156 illustrate logical schematic diagrams of the logical circuits providing input signals to the flip-flops of the Write Buffer;

FIGURE 157 illustrates logical schematic diagrams of the logical circuits providing input signals to flip-flops of the Tape Control Unit;

FIGURE 158 illustrates logical schematic diagrams of the logical circuits providing designated logical combination signals and clock pulse driver gating signals in the Write Buffer;

FIGURES 159–177 illustrate logical schematic diagrams of the logical circuits providing input signals to the flip-flops of the Read Buffer;

FIGURES 178–181 illustrate logical schematic diagrams of the logical circuits providing input signals to flip-flops of the Tape Control Unit;

FIGURE 182 illustrates logical schematic diagrams of the logical circuits providing input signals to the one-shots of the Read Buffer;

FIGURE 183 illustrates logical schematic diagrams of the logical circuits providing designated logical combination signals and clock pulse driver gating signals in the Read Buffer;

FIGURES 184 and 185 illustrate logical schematic diagrams of the logical circuits providing input signals to the flip-flops of the Sorter Control Unit;

FIGURE 186 illustrates logical schematic diagrams of the logical circuits providing input signals to the one-shots of the Sorter Control Unit;

FIGURE 187 illustrates logical schematic diagrams of the logical circuits providing designated logical combination signals and inverter signals in the Sorter Control Unit;

FIGURES 188–197, 198*a*, 198*b*, 199*a*, 199*b*, 200–224, 225*a*, 225*b*, 226*a*, 226*b*, 227, 228, 229*a*, 229*b*, 230*a*, 230*b*, and 231–236 are timing diagrams useful in explaining the operation of the system in executing the programmable commands;

FIGURE 237 is a timing diagram useful in explaining the operation of the system in executing the Initial Routine portion of a programmable command;

FIGURE 238 is a timing diagram useful in explaining the operation of the system in executing the B-subroutine;

FIGURES 239–241, 242*a*, 242*b*, 242*c*, and 243–245 are timing diagrams useful in explaining the operation of the system in executing operations employing the Multiplex Buffer.]

DATA PROCESSING SYSTEM—GENERAL

Figure 1:
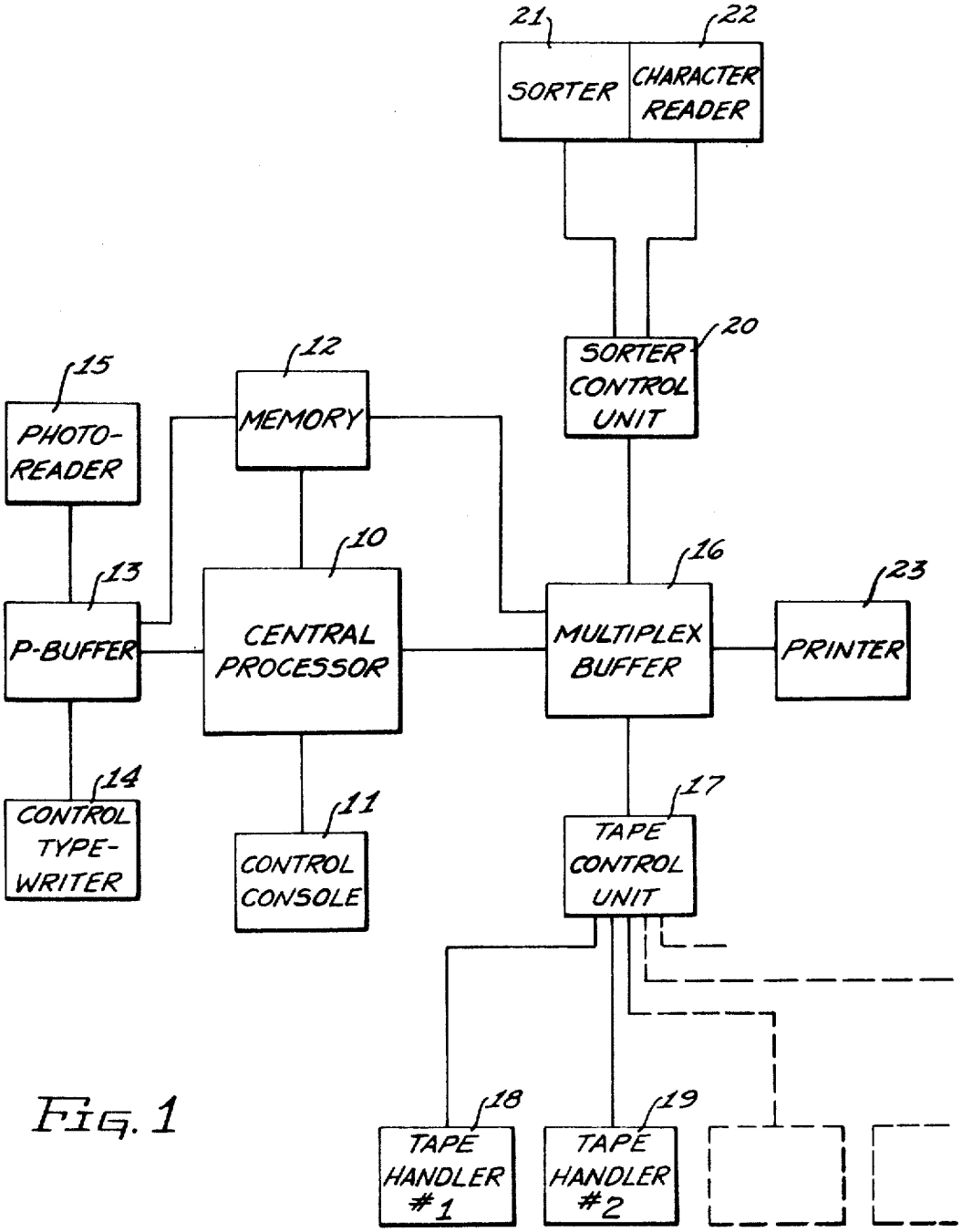
FIGURE 1 is a block diagram of a data processing system to which the instant invention is applicable.

The Data Processing System of FIG. 1 is adapted to process data under operational control of a Central Processor 10. The lines interconnecting the various components illustrated in FIG. 1 represent symbolically paths of data and control communication.

The Central Processor responds to a plurality of distinct instructions which are supplied thereto in the sequential order necessary to perform a particular data processing operation. A Control Console 11 provides an indicating and control station for the operator, whereby he has access to the system for modification of the order of execution of the instructions or for data revision. A Memory 12 stores data words which are to be processed, data words which are the results of processing, and instruction words. The Central Processor communicates with the Memory to receive therefrom data words on which operations are to be performed and instruction words. Following certain data processing operations, the Central Processor transmits the resulting data words to the Memory for storage.

A P-Buffer 13, controlled by the Central Processor, temporarily stores data words being transferred from a Control Typewriter 14 or a Photoreader 15 to Memory and data words being transferred from Memory to the Control Typewriter. The Control Typewriter receives data words from the P-Buffer and types a visible representation of these words or punches on paper tape an encoded representation of these words. The Control Typewriter also transfers data words to the P-Buffer by reading encoded punched paper tape or upon depression of Control Typewriter keys in proper sequence. The Photoreader photoelectrically reads punched encoded paper tapes and transfers the electrical representations of the data thereon to the P-Buffer.

A Multiplex Buffer 16, indirectly controlled by the Central Processor, temporarily stores data being transferred from magnetic tape or from magnetically imprinted documents to Memory and data being transferred from Memory for recording on magnetic tape or for imprinting in visible representation. A Tape Control Unit 17 directs one of a plurality of Tape Handlers 18, 19, etc., to read data from the respective magnetic tape thereof and to deliver this data to the Multiplex Buffer. The Tape Control Unit also directs one of the Tape Handlers to write data provided by the Multiplex Buffer on the respective magnetic tape thereof.

A Sorter Control Unit 20 controls the reading of data borne by documents, such as bank checks, and directs the sorting of these documents into pockets of a Sorter 21. A Character Reader 22 senses magnetically imprinted information on these documents and delivers an encoded representation of this data to the Multiplex Buffer. The Central Processor delivers to the Sorter Control Unit data representing the pockets of Sorter 21 in order that the documents handled thereby may be appropriately sorted in accordance with the information thereon.

A printer 23 receives data words from the Multiplex Buffer and prints a visible representation of these words.

Thus, the system of FIG. 1 processes data received from magnetic tape, documents, the Control Typewriter, or the Photoreader and communicates the results of the data processing by providing a visible record, by permanently storing the results on magnetic tape, by punching paper tape, or by sorting documents.

*For a complete description of the system of FIGURE 1 and of the instant invention which is embodied in such system, reference is made to United States Patent 3,077,984 issued to R. R. Johnson and assigned to the assignee of the present invention. More particularly, attention is directed to FIGURES 2 through 245 of the drawings; column 1, lines 8–73; column 2; column 3, lines 1–27; column 4, lines 55–75; columns 5 and 6; column 7, lines 1–16; column 8, lines 8–75; columns 9–258; and column 259, lines 1–35 of United States Patent 3,077,984, which are incorporated herein by reference and made a part of the instant patent application as if fully set forth herein.*

[*Data Representation*

The Data Processing System of FIG. 1 is adapted to process data represented by the binary code. In the binary code each element of information, termed a "bit," is represented by either a 1 or a 0. In the instant system a 1 is represented by a positive electrical signal and a 0 by a negative electrical signal. The fundamental unit of data for processing and communication is the data word. The data word comprises 28 bits.

The 28 bits of the data word are normally processed as 7 sequential groups of 4 bits. Each group is termed a "digit." The bits of a digit are processed simultaneously. The grouping of the bits permits the system to perform operations in the decimal number system. The 4 bits of a group may be treated as a decimal numeral and such a group is termed a "binary-coded decimal" digit. Each bit of a digit corresponds to a different decimal numeral if the group is employed as a decimal digit representation. In this system, the 5–4–2–1 code is employed. The most significant bit of the digit represents the decimal 5, the next lower order bit represents the decimal 4, the next lower order bit represents the decimal 2 and the least significant bit represents the decimal 1. For example, the decimal 8 is represented by the binary bit group 1011.

Inasmuch as but 10 of the 16 possible configurations of the 4 bits of a group are employed to represent the 10 decimal numerals, 6 configurations of the group are available for other representations. The bit configurations representing the 10 decimal numerals are termed "numeric" digits. Five of the remaining 6 configurations represent respectively the dollar sign ($), the comma (,), the ampersand (&), the period (.), and the asterisk (*). The remaining bit configuration, 1111, is not employed to represent data, but instead is forbidden, and is useful for detecting data processing errors. These 6 configurations representing non-numerals are termed "non-numeric" digits. The 16 configurations of the binary code of a single digit or group and the corresponding symbols which they usually represent are given in the following Table I. In this table, the bits of each group are shown in decreasing order of significance.

TABLE I

| Symbol | Single digit code |
|---|---|
| 0 | 0000 |
| 1 | 0001 |
| 2 | 0010 |
| 3 | 0011 |
| 4 | 0100 |
| 5 | 1000 |
| 6 | 1001 |
| 7 | 1010 |
| 8 | 1011 |
| 9 | 1100 |
| $ | 0101 |
| , | 0110 |
| & | 0111 |
| . | 1101 |
| * | 1110 |
| forbidden | 1111 |

Therefore, all data words, including instruction words, comprise 7 digits, each digit comprising one of the bit configurations of Table I. In arithmetic operations and in many other data processing operations, the 7 digits of a word are processed in sequential order. The digit first processed is termed the least significant digit (LSD) of the word. The digit last processed is termed the most significant digit (MSD) of the word. Each of the 6 least significant digits are interpreted as representing one of the 15 symbols of Table I. The 7th, or MSD, is not usually so interpreted.

This 7th digit of the data word, which is termed the "condition" digit, comprises three independent representations. The most significant bit of the condition digit is termed the "designator" bit and is employed for automatic address modification. The next lower order bit of the condition digit is termed the "sign" bit and is employed to denote the algebraic significance of the 6 least significant digits of the data word. When the sign bit is 1, the data word is considered negative. When the sign bit is 0, the data word is positive. The two least significant bits of the condition digit are termed the "mod-bits." The mod-bits provide a representation of the modulo-3 of the data word and are employed to check the correctness of the data word following a data transfer, or to check the correctness of an arithmetic operation employing the data word. The data word may be represented as follows:

DATA WORD

| Condition digit | 6th digit | 5th digit | 4th digit | 3rd digit | 2nd digit | 1st digit |
|---|---|---|---|---|---|---|
| Designator bit | 5-bit | 5-bit | 5-bit | 5-bit | 5-bit | 5-bit. |
| Sign bit | 4-bit | 4-bit | 4-bit | 4-bit | 4-bit | 4-bit. |
| Mod-bit | 2-bit | 2-bit | 2-bit | 2-bit | 2-bit | 2-bit. |
| Mod-bit | 1-bit | 1-bit | 1-bit | 1-bit | 1-bit | 1-bit. |
| | $x10^5$ | $x10^4$ | $x10^3$ | $x10^2$ | $x10^1$ | $x10^0$. |

The order of the digits in the above representation, starting with the first digit, is the order of sequential processing of the data word. If the word represents a numeric quantity, the increasing order of decimal significance of each digit is indicated in the row following the data word representation.

Five types of data words are employed, and include the instruction word and four types of operand words. The instruction word is employed by the Central Processor to direct a distinct operation of the system. The instruction word is generally employed in two portions to direct an operation. The four least significant digits comprise a Memory address and denote a location in Memory where a data word is to be obtained for processing, or where a processed word is to be stored. The next two digits comprise a command (order) code. The command code is a two decimal digit code which determines the type of operation that the system will execute.

Since the addressable locations in Memory are only 0000–3999, the 4 and 5-bit positions of the 4th digit are not needed for a Memory address. Therefore, in an instruction word, the two most significant bits of the 4th digit are employed for separate functions. The most significant bit of the 4th digit is termed the "augmentor" bit and is employed for automatic modification of the contents of the Memory location addressed. The next lower order bit is termed the "breakpoint" bit and is employed to force the system to halt if a predetermined condition exists in the Control Console. The instruction word may be represented as follows:

INSTRUCTION WORD

| Condition digit | Command portion | | Address portion | | | |
|---|---|---|---|---|---|---|
| | 6th digit | 5th digit | 4th digit | 3rd digit | 2nd digit | 1st digit |
| Designator bit. | 5-bit | 5-bit | Augmentor bit. | 5-bit | 5-bit | 5-bit. |
| Sign bit | 4-bit | 4-bit | Breakpoint bit. | 4-bit | 4-bit | 4-bit. |
| Mod-bit | 2-bit | 2-bit | 2-bit | 2-bit | 2-bit | 2-bit. |
| Mod-bit | 1-bit | 1-bit | 1-bit | 1-bit | 1-bit | 1-bit. |

The four other types of data words are those on which data processing operations are performed. Such words are generally known as "operand" words. The four types of operand words are: (*a*) Single numeric, (*b*) First half double-precision, (*c*) Second half double-precision, and (*d*) Alphanumeric. The single numeric word is the simple data word, described previously, and is processed in conventional manner. Each of the 6 least significant digits of the single numeric word are processed as separate entities and represents one of the 15 symbols of Table I.

A double-precision word comprises two single numeric words which are processed together. In processing the double-precision word, the numeric portions (6 least significant digits) of the two words thereof are processed as a single 12 digit number. The first half double-precision word supplies the 6 most significant digits of the 12 digit number and is termed the "most significant half word (MSH)." The second half double-precision word supplies the 6 least significant digits of the 12 digit number and is termed the "least significant half word (LSH)." Each half word of the double-precision word carries its own mod-bits, but both half words have the same designator and sign bit configurations.

The alphanumeric word is employed to represent alphabetic symbols, numerics, non-numerics, and certain special characters. In the alphanumeric word and the 6 least significant digits are paired to represent three alphanumeric characters. The alphanumeric word may be represented as follows:

ALPHANUMERIC WORD

| Condition digit | 3rd character | | 2nd character | | 1st character | |
|---|---|---|---|---|---|---|
| | 6th digit | 5th digit | 4th digit | 3rd digit | 2nd digit | 1st digit |
| Designator bit | 5-bit | 5-bit | 5-bit | 5-bit | 5-bit | 5-bit. |
| Sign bit | 4-bit | 4-bit | 4-bit | 4-bit | 4-bit | 4-bit. |
| Mod-bit | 2-bit | 2-bit | 2-bit | 2-bit | 2-bit | 2-bit. |
| Mod-bit | 1-bit | 1-bit | 1-bit | 1-bit | 1-bit | 1-bit. |

The two mod-bits of an alphanumeric word are always equal to 1,1 thereby serving to distinguish alphanumeric words from the other four types of data words.

The alphanumeric characters and the single digit code representations of the corresponding digit pairs are given in the following Table II.

TABLE II

| Alphanumeric character | Two-digit code | Alphanumeric character | Two-digit code |
|---|---|---|---|
| 0 | 00 | J | 21 |
| 1 | 01 | K | 22 |
| 2 | 02 | L | 23 |
| 3 | 03 | M | 24 |
| 4 | 04 | N | 25 |
| 5 | 05 | O | 26 |
| 6 | 06 | P | 27 |
| 7 | 07 | Q | 28 |
| 8 | 08 | R | 29 |
| 9 | 09 | | |
| | | (−) | 2* |
| $ | 0$ | (+) | 2, |
| & | 0& | Shift Case | 2. |
| * | 0* | | |
| (,) | 0, | S | 32 |
| (.) | 0. | T | 33 |
| | | U | 34 |
| A | 11 | V | 35 |
| B | 12 | W | 36 |
| C | 13 | X | 37 |
| D | 14 | Y | 38 |
| E | 15 | Z | 39 |
| F | 16 | | |
| G | 17 | Tab | 3$ |
| H | 18 | Stop | 3& |
| I | 19 | Normal Case | 3. |
| Space | 10 | | |
| Carriage Return | 1$ | | |
| Ignore | 1& | | |
| End of Information | 1, | | |

For example, the alphanumeric code for the alphabetic word CAT is 131133. The alphanumeric code for the number 123 is 010203, whereas the numeric portion of a single numeric data word representing the number 123 is 000123.

The special characters listed in Table II are employed to direct operations of the Control Typewriter.

The Memory may contain at any location any one of the five types of data words. However, it is general practice to store the MSH of a double-precision word in an even-numbered Memory location and the LSH of the same double-precision word in the next higher odd-numbered location.

*Mod-Bits*

Although the configurations of the 6 least significant digits and the designator and sign bits of all data words inserted into Memory from magnetic tape, the Control Typewriter, or the Photoreader are discretionary with the operator, the configuration of the mod-bits is mandatory. The mod-bits of all words are representative of the modulo-3 thereof. The modulo-3 of a number is the remainder when that number is divided by 3. Thus, for example, the modulo-3 of 0, 3, 6, and 9, is 0; of 1, 4, and 7 is 1 (−2); and of 2, 5, and 8 is 2 (−1).

The mod-bits are employed in three different forms:

(*a*) The mod-bits of a numeric word in Memory and, consequently, of a word transferred between the components of the system, have the configuration required to make the modulo-3 of the entire 7 digits of the word equal to 1. In determining the modulo-3 of the entire word, the designator and sign bits are assigned their respective positional values of 5 and 4. The most significant mod-bit is assigned the value of 2 and the least significant mod-bit the value of 1. Thus, the three configurations of the mod-bits (most significant bit first) are 0, 0; 0, 1; and 1, 0 to represent the respective numbers 0, 1 and 2. When a data word is transferred into the Central Processor from Memory, its correctness is tested by a "mod-check," wherein the total modulo-3 of all 7 digits is accumulated. If this accumulated total is not 1, an alarm occurs and the Central Processor halts.

The employment of a total modulo-3 of 1 for words transferred from Memory to the Central Processor always permits a positive check on the correctness of the entire word transferred. This positive mod-check is to be contrasted with the false mod-check which would occur if the total word modulo-3 had been set, instead, to 0, and a complete failure of data transfer had occurred, since a word consisting solely of 0's has a total modulo-3 of 0.

(*b*) The mod-bits of an operand employed in an arithmetic operation in the Central Processor have the configuration of the total modulo-3 of the 6 least significant digits (numeric portion) of the word. Thus, in words employed for arithmetic operations with numeric portions having total modulo-3's of 0, 1 or 2, the respective mod-bits are 0, 0; 0, 1; and 1, 0. For example, when two numeric words are added the sum of the modulo-3's thereof must be equal to the modulo-3 of the sum. Therefore, the modulo-3 of the sum is compared with the sum of the modulo-3 of the two words added. If this "mod-comparison" fails, an alarm occurs and the Central Processor halts.

(*c*) An alphanumeric word has no numeric portion and, therefore, no modulo-3. The mod-bits of such a word are set to the 1, 1 configuration and serve to identify the associated data word as an alphanumeric word.

SYSTEM CIRCUIT ELEMENTS

Circuits useful as elements of the system of FIG. 1 will now be described. The system will function with these elements or with other similar elements well-known in the art; therefore, this invention is not to be considered as limited to the employment of the specific circuits shown.

The following circuits find general employment in the system: clock pulse generator, clock pulse driver, flip-flop, AND-gate, OR-gate, inverter, emitter follower, register transfer, and one-shot. Illustrated with the respective drawings of the circuit elements are symbols representative thereof. These symbols will be employed for simplicity in the description of the invention to follow.

In the figures for the circuit elements, specific values of the circuit components are shown. These values are not to be considered as limiting, and the circuit elements will often function satisfactorily with considerable variation from the values provided.

*Clock Pulse Generator*

The clock pulse generator of FIG. 2 provides synchronizing signals for clock pulse drivers located throughout the system. The synchronizing signals are provided at a repetition rate of 250 kc. The clock pulse generator comprises the following four circuits connected in tandem: an oscillator, a feedback amplifier, a regenerative comparator, and an output amplifier.

The oscillator comprises a transistor 31 coupled to a resonant circuit comprising an inductor 32 and a capacitor 33. The approximate frequency of oscillation is determined by the resonant frequency of inductor 32 and capacitor 33. A crystal 34, coupled to the resonant circuit, locks the oscillator at the desired frequency. The sine wave output signal of the oscillator is taken from the emitter electrode 35 of transistor 31.

The output signal of the oscillator is transmitted through a capacitor 36 and a resistor 37 to the base electrode of transistor 38 of the feedback amplifier. The feedback amplifier has substantial voltage gain, whereby the output signal thereof, delivered at collector electrode 39, is a sine wave having an amplitude of approximately 1 volt peak-to-peak.

The output signal of the feedback amplifier is applied directly to the base electrode of transistor 45 of the regenerative comparator. The regenerative comparator is a bistable circuit delivering a substantially square wave in response to the received sine wave, and is provided for obtaining a waveform with a steep wavefront from the input signal. The regenerative comparator operates substantially as follows: Consider the portion of the cycle of operation when the input signal is negative with respect to ground, but is increasing positively. At this time transistor 45 is non-conducting and transistor 46 is conducting. In this stable state, the base electrode of transistor 46 is at 0 volt (v.), or ground.

The collector electrode of transistor 45 is at +8 v., and capacitor 47 is charged to +8 v. The emitters of both of transistors 45 and 46 will be a fraction of a volt negative with respect to ground, since transistor 46 is conducting. As the input voltage applied to the collector electrode of transistor 45 increases positively and reaches 0 v., the emitter-base junction of transistor 45 becomes forward biased and collector current commences to flow therein. A sharp regenerative action thereupon ensues, with transistor 45 turning on sharply and transistor 46 turning off sharply. During this regenerative action, the negative swing at the collector electrode of transistor 45 is coupled through capacitor 47 to the base electrode of transistor 46. As the emitter current of transistor 46 decreases, the emitter voltage thereof becomes more negative, increasing the forward bias of transistor 45 and sustaining the regenerative action. The time constant of capacitor 47, inductor 48 and resistor 49 is adjusted so that the sharp negative pulse at the base electrode of transistor 46 terminates in about 2 microseconds (μsecs.).

So long as the input signal now remains positive, transistor 45 continues to conduct and transistor 46 remains non-conducting. After the input voltage has passed its positive peak value and is decreasing negatively, all switching transients have terminated and the base electrode of transistor 46 is again at 0 v. The emitter electrode of transistor 46 is only a fraction of a volt less than the positive voltage applied to the base electrode of transistor 45 and, therefore, is positive with respect to the base electrode of transistor 46 at this time. When the signal applied to transistor 45 decreases negatively and reaches 0 v., transistor 46 becomes forward biased and commences to conduct. As the emitter current of transistor 46 starts to increase, the increasing voltage drop across resistor 50 decreases the forward bias of transistor 45. As the emitter current of transistor 45 decreases, the collector current thereof decreases, allowing the collector voltage to swing sharply positive. The positive swing at the collector electrode of transistor 45 is coupled by capacitor 47 to the base electrode of transistor 46, causing a sharp regenerative action which cuts off transistor 45 very rapidly and turns on transistor 46 very rapidly. As the input voltage now continues in its negative half cycle, transistor 46 continues conducting and transistor 45 continues non-conducting.

When transistor 46 is conducting the emitter current thereof is relatively constant, so that square waves of current appear at the collector electrode thereof. Because of the regenerative action, the slope of the leading edge of the current waveform will depend but little on the amplitude of the input signal applied to the base electrode of transistor 45, but will depend primarily on the circuit parameters of the regenerative comparator.

The signal available at the collector electrode of transistor 46 is employed as the output signal of the regenerative comparator.

The output signal of the regenerative comparator is coupled to an output amplifier, which functions to isolate the regenerative comparator from the clock pulse generator load, while preserving the steep wavefront of the waveforms generated. A transistor 55 of the output amplifier and its associated circuit is adapted to receive the output signal of the regenerative comparator and to provide amplification thereof. When the collector electrode current of transistor 46 is zero, transistor 55 is maintained cut off by the current passing through resistor 56, silicon diode 57 and resistor 58. At this time the clock pulse generator output signal from terminal 59 is −5 v. When transistor 46 is conducting the potential at the collector electrode thereof is sufficiently negative to provide forward bias for transistor 55, which thereupon conducts. When transistor 55 conducts the potential at output terminal 59 is approximately +5 v. The combination of silicon diode 57 and germanium diode 60 prevents transistor 55 from saturating, thus insuring more rapid cutoff of transistor 55 when transistor 46 is cut off.

An approximate waveshape of the output signal from terminal 59 is illustrated in the waveform immediately below output terminal 59.

*Clock Pulse Driver*

The clock pulse driver of FIG. 3 provides clock pulse signals to drive other clock pulse drivers or for direct application to flip-flops and register transfers to control respectively the entry of data into flip-flops and the transfer of data between flip-flops. The clock pulse driver responds to positive trigger signals supplied by a clock pulse generator to generate corresponding clock pulses. The clock pulse driver may be gated to provide single clock pulses or clock pulses at the 250 kc. rate. When gated on, the clock pulse driver generates a clock pulse for each trigger signal received, but when gated off, no clock pulses are generated.

The clock pulse driver is basically a triggered blocking oscillator with output amplifier. A transistor 65, a transformer 66, a resistor 67, and associated biasing and power supply circuits, shown in FIG. 3, comprise the blocking oscillator portion of the clock pulse driver. A trigger signal supplied by the clock pulse generator is received at input terminal 68 and triggers the blocking oscillator to produce an output clock pulse. The trigger signal is only effective to trigger the blocking oscillator if the oscillator is not gated off by a negative voltage applied to gate terminal 69.

In the quiescent state, the base electrode of transistor 65 is at approximately +6.7 v., and transistor 65 is non-conducting due to the reverse bias applied thereto by the conduction of diode 70. The input trigger signals of the clock pulse generator have a peak-to-peak swing from −5 v. to +5 v., or a total excursion of about +10 v. When the gate input terminal 69 is enabled, a +6 v. signal is applied thereto. At this time the input trigger signal has sufficient amplitude to overcome the reverse bias applied to transistor 65.

The input trigger signal initiates the flow of a small emitter current in transistor 65. This, in turn, causes the flow of a small collector current through the primary winding of transformer 66. This increase in collector current in the primary winding of transformer 66 induces a voltage in the secondary winding thereof in a direction to apply a positive voltage to the emitter electrode of transistor 65. This induced voltage causes the emitter electrode to conduct more heavily. Thus, the circuit is highly regenerative and will quickly drive the transistor into saturation, wherein the impedance of the transistor between electrodes is substantially zero, and the entire applied voltage is developed across the transformer primary winding. The resulting large voltage developed across the secondary winding of transformer 66 saturates transistor 72 of the output amplifier, so that only resistor 67 limits the flow of emitter current in transistor 65. Since the total applied voltage appears across the primary winding of transformer 66, the collector current of transistor 65 rises linearly toward the maximum allowable value of collector current, as determined by the emitter current. The time for this current to rise to the maximum value is determined by the inductance of transformer 66.

When the collector current of transistor 65 reaches its maximum value, the resulting voltage induced in the transformer terminates. Another regenerative action takes place and the transistor cuts off rapidly.

When transistor 65 is conducting, transistor 72 conducts, and the clock pulse driver output signal, at terminal 73, is at approximately +6 v. When transistor 65 is non-conducting, transistor 72 is non-conducting, and the output signal from the clock pulse driver is clamped at −5 v. The clock pulse provided at terminal 73 is illustrated immediately below terminal 73.

When the clock pulse driver is gated off, by application of a —5 v. signal to terminal 69, a voltage drop of approximately 1 volt occurs across diodes 74 and 75. Thus, —4 v. is provided at the corresponding terminal of capacitor 76. The receipt of the input trigger signal, with swing of +10 v., will drive the emitter electrode of transistor 65 to only +6 v. Inasmuch as the base electrode of transistor 65 is at +6.7 v., the transistor will not conduct and a clock pulse will not be delivered. Therefore, only when the clock pulse driver is enabled by the application of an appropriate gating signal thereto, will output clock signals be provided thereby.

If the clock pulse driver is to operate continuously and to provide an output clock pulse at a continuous 250 kc. rate, a +6 v. D.-C. bias is applied to input terminal 77.

Two symbols, shown in FIG. 3, are employed to represent the clock pulse driver. Symbol 80 represents a continuous clock pulse driver. Input trigger signals are received from a clock pulse generator by the input lead on the left-hand side of the block. Output clock pulses are delivered continuously from the output lead on the right-hand side of the block. The symbol 81 represents a gated clock pulse driver. Input trigger signals are received at the left-hand terminal and gated output clock pulses are delivered at the right-hand terminal. The gating signal is applied to the terminal "G" at the bottom of the symbol. The G terminal represents the gate input terminal 69 of the clock pulse driver. So long as the gating signal is at the —5 v. level, no output clock pulses are delivered from the right-hand lead. When the gating signal is increased to +6 v., the clock pulse driver delivers a clock pulse for every input trigger signal received. The gating signal is identified by the "Gate-" prefix. Thus, the gating signal applied to the SA clock pulse driver is identified as the Gate-SA signal.

Generally clock pulse drivers and their respective output signals are identified in accordance with the function they perform. Thus, clock pulse drivers whose designations begin with the letter "C," such as clock pulse driver CDA12, drive flip-flops and other clock pulse drivers. Clock pulse drivers driving register transfers generally have designations beginning with the letters "S" or "X." The letter "S" denotes a clock pulse driver directing a serial shift of data. Thus, the clock pulse driver SA delivers the clock signal SA and provides a serial shift of the contents of the A-register. The letter "X" denotes a clock pulse driver directing a parallel shift, or transfer, of data. Thus, the clock pulse driver XAN provides a parallel transfer of data between the A-register and the N-register.

*Flip-Flop*

The flip-flop of FIG. 4 provides temporary storage of a data word bit or provides temporary storage of a control signal. Generally, when a flip-flop is employed to store a data bit it comprises one of an array of flip-flops denoted as a register. For example, in a register adapted to provide temporary storage for a complete data word, 28 flip-flops are employed, one for each bit of the data word.

The flip-flop is a circuit adapted to operate in either one of two stable states, and to transfer from the state in which it is operating to the other stable state upon application of a trigger signal thereto. In one state of operation the flip-flop represents the binary 1 (1-state) and in the other state the binary 0 (0-state). The flip-flop circuit includes a pair of collector-coupled transistor amplifiers, comprising the respective transistors 101, 102. The coupled transistor amplifier pair is connected to a pair of grounded-emitter transistor output amplifiers, the output signals thereof representing respectively the binary numbers 1 and 0, according to the stable state in which the flip-flop is operating. The two output amplifiers are designated respectively the 1-output amplifier and the 0-output amplifier, and comprise the respective transistors 103 and 104.

The flip-flop is adapted to receive five input signals; as follows:

(*a*) A clock pulse signal, received at input terminals 105 and 105', and supplied by a clock pulse driver, (*b*) An input logic signal for triggering the flip-flop to its 1-state, received at input terminal 106, and usually supplied by a logical gate, (*c*) An input logic signal for triggering the flip-flop to its 0-state, received at input terminal 107, and usually supplied by a logical gate, (*d*) An input signal for triggering the flip-flop to its 1-state, received at input terminal 108, and usually supplied by a register transfer circuit, and (*e*) An input signal for triggering the flip-flop to its 0-state, received at input terminal 109, and usually supplied by a register transfer circuit.

A flip-flop output signal representing the 1-state of the flip-flop is delivered at output terminal 110 and an output signal representing the 0-state of the flip-flop is delivered at output terminal 111.

The operation of the flip-flop will now be described. In both of the stable states of the flip-flop one of transistors 101 and 102 is conducting and the other is non-conducting. Assume that transistor 101 is conducting and transistor 102 is not conducting. When transistor 101 conducts its collector electrode voltage is approximately at +8 v. This voltage, when coupled to the base electrode of transistor 102 causes the potential thereof to be approximately +8.3 v. and maintains transistor 102 in its non-conducting state. The flip-flop will continue in this state until application of a positive voltage greater than +8 v. to the base electrode of transistor 101. Transistor 101 will momentarily cease conducting. When transistor 101 ceases conducting, the collector electrode potential thereof becomes momentarily more negative. This negative change is coupled through capacitor 114 to the base electrode of transistor 102, which will then commence conducting. The collector electrode potential of transistor 102 will begin rising, and this potential rise will be coupled by a capacitor 115 to the base electrode of transistor 101. The positive-going voltage coupled to the base electrode of transistor 101 tends to further decrease its tendency to conduct. This regenerative action continues until transistor 102 is fully conducting and transistor 101 is non-conducting. At this time the flip-flop has transferred from the state in which it was operating to the other stable state.

When transistor 101 is conducting and transistor 102 is non-conducting the flip-flop is in its defined 0-state, and when transistor 102 is conducting and transistor 101 is non-conducting the flip-flop is in its 1-state. Thus, the state of operation of the flip-flop represents a binary digit.

When the flip-flop is in its 0-state, the +8 v. of the collector electrode of transistor 101 is coupled to transistor 103 and maintains transistor 103 in a state of non-conduction. The signal provided at output terminal 110 at this time is at the —5 v. level. Inasmuch as the system logical elements and flip-flops respond to positive signals of approximately +6 v., the —5 v. delivered at output terminal 110 denotes a binary 0. Similarly, when transistor 101 is conducting, a negative voltage is coupled to transistor 104, so that transistor 104 conducts and delivers a +6 v. signal at output terminal 111. The elements of the system are adapted to respond to the +6 v. signal, and it is, therefore, denoted as a binary 1. Therefore, when the flip-flop is in the 0-state, a 0-output signal is provided by the 1-output terminal and a 1-output signal is provided by the 0-output terminal. Thus, system elements adapted to respond to the flip-flop 0-state will be enabled by the +6 v. signal delivered at terminal 111, whereas elements adapted to respond to the flip-flop 1-state will be disabled by the —5 v. signal delivered at terminal 110.

Conversely, when transistor 102 is conducting, so that the flip-flop is in its 1-state, a +6 v. signal, representing a binary 1, is supplied at terminal 110 and a −5 v. signal, representing a binary 0, is supplied at terminal 111. Thus, the designation of output terminal 110 as a 1-output terminal indicates that when the flip-flop is in its 1-state, a binary 1-output signal is provided therefrom. The designation of terminal 111 as a 0-output terminal indicates that when the flip-flop is in its 0-state, a binary 1-output signal is provided therefrom.

Consider now the input signals which will trigger the flip-flop; that is, those signals which will transfer the flip-flop from the state in which it is operating to its other stable state. The signals applied to terminals 106 and 107 result from the logical combination of other data-representing signals. When a logical combination represents a binary 0, the resulting logic signal is approximately −5 v. When a logical combination represents a binary 1, the resulting logic signal is approximately +6 v. Inasmuch as +8 v. is applied to the emitter electrode of the one of the transistors 101 and 102 that is non-conducting, neither a 0-logic signal nor a 1-logic signal is adequate, alone, to trigger the flip-flop when applied to terminal 106 or 107.

The input logic signals applied to terminals 106 and 107 are coupled to the respective capacitors 116 and 117 and charge the corresponding capacitors to the logic voltage level. When a clock pulse is applied to terminals 105 and 105', the terminals will experience a positive voltage swing of approximately +11 v., as described in the previous section on the clock pulse driver. If a 1-logic signal is present at terminal 106 or terminal 107, the clock pulse signal is superposed thereon and momentarily drives the corresponding base electrode of transistors 101 and 102 to +17 v., a voltage sufficient to momentarily cause the transistor to stop conduction, if it is conducting, and, therefore, to change the state of the flip-flop. However, any one of terminals 106 and 107 which is receiving a 0-logic signal when the clock pulse occurs will cause a signal of but +6 v. to be applied to the base electrode of the corresponding flip-flop transistors, a signal insufficient to change the state of the flip-flop. This type of flip-flop triggering is known as clock pulse pedestal triggering and enables the flip-flops of the system to change their state in synchronism with the clock pulses. Between clock pulses, which occur no more frequently than every 4 microseconds, there is adequate time for the logic elements of the system to change their state and for the resulting logical combination signals to stabilize at the logic input terminals 106 and 107 of all flip-flops. Then when clock pulses are applied to any one of the flip-flops, the input logic signal levels will determine whether the flip-flop changes state. Since clock pulses are applied to both sides of the flip-flop simultaneously, only one of the logic inputs to the flip-flop is ordinarily permitted to be in the 1-state at any given time. If both logic inputs are in the 1-state, the clock pulse would attempt to turn off both transistors simultaneously and the flip-flop would not change its state. If both logic inputs are in the 0-state, the flip-flop does not change.

The diodes 119 and 120 isolate the input logic signal source from the flip-flop when the clock pulse occurs. The combination of the silicon and germanium diodes coupled to transistors 101 and 102 prevent saturation and are similar to those described for the clock pulse generator.

In addition to the input logic signal, which when enabled by a clock pulse, will trigger the flip-flop, a register transfer input signal of proper amplitude, applied to terminals 108 or 109 will trigger the flip-flop. The register transfer signal, usually provided by a register transfer circuit, consists of a logic signal with superposed clock pulse. Therefore, if the logic signal represents a binary 1, thereby having a +6 v. amplitude, the register transfer signal will be sufficient to trigger the flip-flop. The superposed logic and clock signal is provided in the register transfer circuit to be described later. Therefore, the signals applied to terminals 108 or 109 are independently triggering, since they are adapted to trigger the flip-flop without requiring the clock pulses applied to terminals 105 and 105'. Register transfer circuits are generally employed to transfer the state of one flip-flop to another flip-flop and are, therefore, employed in transferring data between or within registers.

The register transfer input terminals are also employed for manually setting or resetting the flip-flop. A +12 v. signal is applied to the appropriate register transfer input terminal through a push-button or a switch. The +12 v. is adequate to transfer the flip-flop to the desired state.

Flip-flops are identified in accordance with the function they perform. For example, a typical flip-flop employed for control is identified as the *Cwu* flip-flop. The *Cwu* designation stands for "Count W up," and the *Cwu* flip-flop, when in the 1-state, increases the count of the W-counter by 1. A typical flip-flop employed for temporary storage of data is the A41 flip-flop. When the A41 flip-flop stores a binary 1, a +6 v. output signal is available at the 1-output terminal thereof. The flip-flop of FIG. 4 is identified as the A41 flip-flop, and its input and output terminals are identified with the corresponding input and output signals of the A41 flip-flop.

The symbol 122, shown in FIG. 4, is employed to represent a flip-flop. Symbol 122, in this instance, represents the A41 flip-flop.

The A41 flip-flop is employed to temporarily store the 1-bit of the 4th digit of the contents of the A-register. The five leads entering the left-hand side of the flip-flop symbol represent the five input terminals. The two upper input leads receive the 1-input signals and the two lower leads receive the 0-input signals. The central input lead receives the clock pulse signal.

The symbol indicates that the A41 flip-flop receives the clock signals of the B27 clock pulse driver. The first and fifth input leads to symbol 122 represent the respective register transfer input terminals 108 and 109. The notation #A41 opposite the first input lead, identifies the register transfer signal adapted to trigger the A41 flip-flop to the 1-state. Correspondingly, the notation $\#\overline{A41}$ opposite the fifth lead identifies the register transfer signal adapted to trigger the A41 flip-flop to the 0-state. Similarly, the notations *A41 and $*\overline{A41}$ identify the logic input signals adapted to trigger the A41 flip-flop to the respective 1 and 0-states. However, although the *A41 or the $*\overline{A41}$ signal may represent a binary 1, it will not change the state of the flip-flop until the clock pulse driver B27 supplies a clock pulse. If only register transfer signals are applied to a flip-flop, no clock pulse driver is connected thereto, whereupon the notation "*n-c*" is placed opposite the clock pulse input terminal.

The two leads leaving the right-hand side of symbol 122 represent the two output terminals. The upper output lead delivers the 1-output signal of the flip-flop and the lower output lead delivers the 0-output signal. The notations A41 and $\overline{A41}$ identify the respective 1-output and 0-output signals of the A41 flip-flop. Thus, the notation A41 has the dual function of identifying the A41 flip-flop and of identifying the 1-output signal thereof.

In the ensuing system description, a flip-flop in its 1-state is also said to be in the "set" state or in the "on" state. Conversely, a flip-flop in its 0-state is also said to be in the "reset" state or in the "off" state. When a flip-flop is transferred to its 1-state it will often be said to be "set" or to be turned "on." Conversely, when a flip-flop is transferred to its 0-state it may be said to be "reset" or to be "turned off."

*AND-Gate*

The AND-gate of FIG. 5 provides the logical operation of Conjunction for positive input signals applied thereto. In the system a binary 1 is represented by a signal of approximately +6 v. Therefore, the AND-gate provides an output signal of approximately +6 v., representing a binary 1, only when all of the input signals applied thereto represent binary 1's.

The AND-gate of FIG. 5 is illustrated, by way of example, as having three input terminals 126, 127 and 128, and a single output terminal 129. The AND-gates employed in the system are not limited to three input terminals, but may have from two input terminals to the maximum number necessary for the required Conjunctive operation.

A logic input signal applied to an input terminal of the AND-gate represents either a binary 0 or a binary 1, and is provided as a corresponding signal of −5 v. or +6 v. Current flows from a positive voltage source through resistor 130 and the diodes 131, 132 and 133 to respective terminals 126, 127 and 128. If any one of the input signals is at the −5 v. level, the corresponding diode will conduct and all other diodes of the AND-gate receiving +6 v. input signals will be back-biased and will not conduct. In such instance, the output signal from terminal 129 will be at −5 v. and represent a binary 0. Therefore, only when all input signals are at the +6 v. level will the output signal be at the +6 v. level.

The symbol 135, shown in FIG. 5 is employed to represent the AND-gate. Symbol 135 represents an AND-gate having three input terminals. The three input signals to the particular AND-gate shown are respectively denoted T*p*, T*q* and T*s*. Therefore, the output signal is denoted T*p* T*q* T*s*.

The expression T*p* T*q* T*s* is the logic expression for the Conjunctive, or AND, combination of the individual signals T*p*, T*q* and T*s*. This form of expression is used in logical equations, which are also known as Boolean equations, to be employed hereinafter. The Conjunctive operation on any two signals, such as the T*p* and T*q* signals, is indicated by writing the two signal terms adjacent each other with no operator notation therebetween, or with the operator notation (·) between the two terms; as follows: $Tp \cdot Tq$. This expression is read as "T*p* AND T*q*."

*OR-Gate*

The OR-gate of FIG. 6 provides the logical operation of Inclusive-Or for positive input signals applied thereto. The OR-gate provides an output signal of approximately +6 v., representing a binary 1, when any one or more of the input signals applied thereto represent binary 1's.

The OR-gate of FIG. 6 is illustrated, by way of example, as having three input terminals 140, 141 and 142 and a single output terminal 143. The OR-gates employed in the system are not limited to three input terminals, but may have from two input terminals to the maximum number necessary for the required Inclusive-Or operation.

A logic input signal applied to an input terminal of the OR-gate represents either a binary 0 or a binary 1, and is provided as a corresponding signal of −5 v. or +6 v. Current flows from the input terminals through the diodes 145, 146 and 147, and resistor 148 to a negative voltage source. If any one of the input signals is at the +6 v. level, the corresponding diode will conduct and all other diodes of the OR-gate receiving −5 v. input signals will be back-biased and will not conduct. In such instance, the output signal from terminal 143 will be at +6 v. and will represent a binary 1. Therefore, when any one or more of the input signals are at the +6 v. level the output signal will be at the +6 v. level.

The symbol 149, shown in FIG. 6, is employed to represent the OR-gate. Symbol 149 represents an OR-gate having three input terminals. The three input signals to the particular OR-gate shown are respectively denoted T*p*, T*q* and T*s*. Therefore, the output signal is denoted $Tp+Tq+Ts$.

The expression $Tp+Tq+Ts$ is the logic expression for the Inclusive-Or, or OR, combination of the individual signals T*p*, T*q*, and T*s*. This form of expression is used in the logical equations to be employed hereinafter. The Inclusive-Or operation on any two signals, such as the T*p* and T*q* signals, is indicated by writing the two signal terms adjacent each other with the (+) operator notation therebetween; as follows: $Tp+Tq$. This expression is read as "T*p* OR T*q*."

*Inverter*

The inverter circuit of FIG. 7 provides the logical operation of Inversion, or NOT, for an input signal applied thereto. The inverter is adapted to provide an output signal of approximately +6 v., representing a binary 1, when the input signal received thereby has a −5 v. level, representing a binary 0. Conversely, the inverter provides an output signal representing a binary 0 when the input signal represents a binary 1. The inverter supplies an additional output signal having the same logical significance as the input signal.

The inverter circuit of FIG. 7 comprises an emitter follower driving a grounded-emitter amplifier. The emitter follower portion of the inverter comprises a transistor 155 having its output signal level clamped to have a total excursion between the extremes of −3.5 v. and +3.5 v. The input signal is applied at terminal 156. The output signal of the emitter follower is taken from the emitter electrode of transistor 155. This signal is also available at terminal 157 as a true logical representation of the inverter input signal. The output signal of the emitter follower is coupled to the grounded-emitter amplifier comprising transistor 158.

To analyze the operation of the inverter assume, first, that a binary 0 input signal is applied to input terminal 156. With an input signal of −5 v. level applied to the base electrode of transistor 155, the emitter electrode of transistor 155 operates approximately at the −5 v. level. However, junction point 160 is clamped to a −3.5 v. At this time current flows from the positive potential source through resistor 161, diode 162, and resistor 163 to the −3.5 v. junction point 160. The value of voltage at the base electrode of transistor 158 is below the value of +6 v., so that transistor 158 conducts and supplies a +6 v. output signal at output terminal 165. Thus, the inverter delivers an output signal representing a binary 1 when the input signal thereto represents a binary 0.

Assume, now, that the input signal represents a binary 1. The application of a +6 v. signal to the base electrode of transistor 155 causes transistor 155 to cease conducting and establishes junction point 160 at the +3.5 v. level. The value of voltage at the base electrode of transistor 158 tends to go above +6 v., so that current flows through diode 166 and cuts off transistor 158. At this time the output signal at terminal 165 is at the −5 v. level. Thus, a binary 1 input signal to the inverter provides a binary 0 output signal from terminal 165.

Capacitor 167 functions to speed the response of the inverter when the inverter input signal level changes from −5 v. to +6 v. Capacitor 168 prevents bypassing the diode 162, and thereby prevents saturation of transistor 158.

The symbol 170, shown in FIG. 6, is employed to represent the inverter. By way of example, the input signal to the inverter is denoted as the S*ig* signal. The logically inverted output signal provided at terminal 165 of the inverter is designated as $\overline{\mathrm{IS}ig}$. The output signal provided from terminal 157 is not logically inverted and is represented by the legend IS*ig*. Thus, the "true" output signal of an inverter is usually identified with the letter I affixed to the input signal term. The inverted output signal is similarly written, but is provided with a superscribing bar.

*Emitter Follower*

The emitter follower of FIG. 8 is employed in many parts of the logic networks of the system. The primary function of the emitter follower is to supply the input current requirements of a large chain of logical gates, which a flip-flop would be unable to directly drive. The specific locations of the emitter followers in the system will not be given in the description to follow. However, they may be employed following flip-flop output terminals or at other locations where large current requirements exist.

The emitter follower provides an output signal having the same logical sense as the input signal. That is, the emitter follower delivers a binary 1 output signal when the input signal represents a binary 1, and vice versa. Two types of emitter followers are shown in FIG. 8. The first type, comprising the PNP transistor 175, is identified as a PNP emitter follower. The second type, comprising the NPN transistor 176, is identified as an NPN emitter follower. Generally, the PNP emitter follower drives an AND-gate and the NPN emitter follower drives an OR-gate.

The symbol 178, shown in FIG. 8, is employed to represent the emitter follower. The output signal of the emitter follower bears the same identification as the input signal applied thereto.

*Register Transfer*

The register transfer shown in FIG. 9 provides for the direct transfer of data between a pair of flip-flops, under control of a gated clock pulse driver. Normally, if a first flip-flop (which may be termed a data-receiving flip-flop) is adapted to receive the data bit stored in a second flip-flop (which may be termed a data-transmitting flip-flop), the register transfer input terminals of the first flip-flop are connected through respective register transfers to the corresponding output terminals of the second flip-flop.

The register transfer circuit of FIG. 9 comprises eight register transfers and is adapted to transfer the contents of four data-transmitting flip-flops, storing a full data digit, to four data-receiving flip-flops, also adapted to store a full data digit. A register transfer circuit is connected between the 1-output terminal of each data-transmitting flip-flop and the register transfer 1-input terminal of the corresponding data-receiving flip-flop. A register transfer is also connected between the 0-output terminal of each data-transmitting flip-flop and the register transfer 0-input terminal of the corresponding data-receiving flip-flop. FIGURE 10 illustrates the connection of a register transfer between an output terminal of a data-transmitting flip-flop and the corresponding register transfer input terminal of a data-receiving flip-flop.

The operation of a typical register transfer 201 of FIG. 9 will now be described. Register transfer 201, which is also shown in FIG. 10, is connected between the 1-output terminal of the N21 flip-flop and the register transfer 1-input terminal of the N11 flip-flop. The N21 flip-flop 1-output terminal is connected to input terminal 202 of the register transfer circuit. Terminal 202 is connected to one end of resistors 203 and 204. The other end of resistor 203 is connected to a source of minus voltage. Resistor 203 provides collector resistance for the data-transmitting flip-flop output amplifier. Thus, the potential applied to input terminal 202 will be +6 v., when a binary 1 is applied thereto, and −5 v. when a binary 0 is applied thereto. This input signal is transferred through resistor 204 and a diode 205 to output terminal 208. A capacitor 206 is connected to the junction of resistor 204 and diode 205, and is adapted to be charged to the logic voltage level provided by the corresponding data-transmitting flip-flop. Generally, the output signal of a gated clock pulse driver is connected to input terminal 207. Output terminal 208 is connected to the corresponding register transfer input terminal of the data-receiving flip-flop. A resistor 209 functions to discharge any stray capacitance connected across the output terminal 208, thereby preventing spurious triggering of the data-receiving flip-flop.

As described in the previous section entitled "Flip-Flop," neither a −5 v. signal nor a +6 v. signal applied to the register transfer input terminal is sufficient to trigger the flip-flop. However, when a clock pulse is superposed on a +6 v. signal, the flip-flop can be triggered. Thus, if a clock pulse is delivered by gated clock driver SN when a binary 1-input signal is applied to input terminal 202, the superposed +6 v. and clock pulse delivered at terminal 208 will be adequate to trigger the data-receiving flip-flop.

The eight register transfers of FIG. 9 are adapted to transfer the entire contents of the second digit position of the N-register to the first digit position of the N-register upon receipt of the SN signal provided by the SN clock pulse driver. Inasmuch as a triggering output signal from a register transfer output terminal requires the simultaneous presence of a binary 1 from the corresponding data-transmitting flip-flop output terminal and a clock pulse at terminal 207, the register transfer output signal may be considered as representing a Conjunctive operation on the flip-flop input signal and the clock pulse. Therefore, the output signal delivered at terminal 208, for example, may be represented as:

$$\#N11 = SN\ N21$$

Correspondingly, the output signal delivered at terminal 210 may be represented as:

$$\#\overline{N11} = SN\ \overline{N21}$$

The output terminals of one or more register transfers may be connected to a single register transfer input terminal of a flip-flop. In such instance, the one of the register transfers which has a clock pulse applied thereto will transfer the contents of the corresponding data-transmitting flip-flop to the data-receiving flip-flop. An example of such a circuit is provided by the N11 flip-flop, which is adapted to receive the contents of the N21 flip-flop when the SN clock signal is applied to register transfers connecting the output terminals of the N21 flip-flop to the corresponding register transfer input terminals of the N11 flip-flop, or to receive the contents of the A11 flip-flop when the XAN clock signal is applied to register transfers connecting the output terminals of the A11 flip-flop to the corresponding register transfer input terminals of the N11 flip-flop. This plural input connection to the register transfer 1-input terminal of the N11 flip-flop is illustrated in FIG. 10.

Inasmuch as the plural register transfer connection to a flip-flop provides that an output signal from any one of the connected register transfers will trigger the data-receiving flip-flop, an Inclusive-Or logical operation is thereby provided for the output signals of the plurally-connected register transfers. Thus, the register transfer 1-input signal to the N11 flip-flop may be expressed as:

$$\#N11 = SN\ N21 + XAN\ A11$$

The output signals delivered by certain manually operated push buttons or switches are often directly connected to a flip-flop register input terminal which also has connected thereto one or more register transfers. Actuation of such a button or switch usually provides a +12 v. output signal, which is sufficient to trigger the data-receiving flip-flop. Therefore, this type of connection also provides an Inclusive-Or logical operation for the output signals of the plurally-connected register transfers and the buttons or switches. For example, the register transfer 0-input signal to the N11 flip-flop may be expressed as:

$$\#\overline{N11} = SN\ \overline{N21} + XAN\ \overline{A11} + Kcc$$

where $Kcc$ is a +12 v. signal when certain buttons on the Control Console are depressed.

The symbol 212, shown in FIG. 9, is employed to represent the eight register transfers connecting the four flip-flops N24, N23, N22 and N21 to the corresponding ones of flip-flops N14, N13, N12 and N11. The arrow in symbol 212 denotes that upon receipt of a clock pulse, the entire contents of N2($i$) are transferred to N1($i$). Terminal 207', which is shown connected to symbol 212, illustrates that this data transfer is effected only when a clock pulse SN is received. Symbol 213 represents the four flip-flops, N2(*i*), which are adapted to store the second digit of the contents of the N-register. Symbol 214 represents the four flip-flops, N1(*i*), which are adapted to store the LSD of the N-register.

*One-Shot*

The monostable multivibrator, or one-shot, of FIG. 11 provides an output signal of predetermined duration. The duration of the output signal is usually equal to a non-integral number of clock periods.

The one-shot is a circuit adapted to operate normally in a stable state, but to transfer to an unstable state for a predetermined duration upon application of a trigger signal thereto. In one state of operation the one-shot represents the binary 1 (1-state) and in the other state the binary 0 (0-state). The one-shot circuit includes a pair of coupled transistor amplifiers comprising the respective transistors 220 and 221. The coupled transistor amplifier pair is connected to a grounded-emitter transistor output amplifier, the output signal thereof representing the 0-state of the one-shot. This output amplifier comprises a transistor 222.

The one-shot is adapted to receive two input signals; as follows: (*a*) a clock pulse signal, received at input terminal 223, and supplied by a clock pulse driver, and (*b*) an input logic signal, received at input terminal 224, and usually supplied by a logical gate.

The output signal, representing the 0-state of the one-shot, is delivered at output terminal 225.

The operation of the one-shot will now be described. In the stable state transistor 221 is conducting and transistor 220 is non-conducting. The current flowing through the resistor 228 provides sufficient reverse bias voltage to maintain transistor 220 non-conducting, whereas this bias voltage is divided by resistors 229 and 230 to permit preferential conduction of transistor 221. The base electrode of conducting transistor 221 is approximately at ground, so that the emitter electrodes of transistors 220 and 221 are held negative with respect to ground by only a small voltage. The collector electrode of transistor 221 is also close to 0 v., so that transistor 222 is forward biased and conducts. The conduction of transistor 222 when the one-shot is in the stable state provides an output signal at terminal 225 of +6 v., representing a binary 1.

In the stable state the collector electrode of transistor 220 is approximately at +70 v. Therefore, capacitor 232, which is connected between the collector of transistor 220 and the base of transistor 221, is charged to +70 v.

A transistor 233 serves to isolate transistor 220 from the input terminals of the one-shot. Normally, transistor 233 is non-conducting. The logic input signal applied to terminal 224 is either at the −5 v. level (binary 0) or at the +6 v. level (binary 1). Either level of the logic input signal is insufficient to trigger the one-shot to its unstable state. However, if a clock pulse is applied to terminal 223 when the logic input signal is at its +6 v. level the superposition of the two input signals is sufficient to drive transistor 233 into conduction. This momentary high positive signal, approximately +17 v., is applied to the base electrode of transistor 220, which thereupon commences conduction. When transistor 220 commences to conduct, the collector electrode thereof experiences a sudden potential drop. This potential drop is coupled through capacitor 232 to the base electrode of transistor 221. As the base electrode of transistor 221 swings negatively, the collector current thereof diminishes. The decrease in current flow of transistor 221 reduces the reverse bias applied to transistor 220, which conducts more heavily. Thus, a regenerative action ensues, and transistor 220 is transferred to the conducting state and transistor 221 is rendered non-conducting. Transistor 221 remains cut-off by the high reverse bias applied to its base electrode from capacitor 232.

When transistor 221 is non-conducting, transistor 222 is rendered non-conducting, and the voltage at the output terminal 225 drops to −5 v. Thus, when the one-shot is in its unstable state, its output signal represents a binary 0.

Capacitor 232 now commences to discharge through the path provided. The discharge time of capacitor 232 is determined by the RC-time constant of the circuit loop comprising, basically, capacitor 232, potentiometer 234 and resistor 235. The discharge time is also influenced by the parallel-connected capacitor 236 and any one or more of capacitors 237, 233 and 239, which may be connected to the "capacitor return" terminal 240. The discharge time may also be altered by providing an external capacitor between the "ext time" terminal 241 and terminal 240.

In the unstable state, the emitter electrode of transistor 221 is slightly below ground potential. The base electrode thereof is held below ground in accordance with the voltage across capacitor 232. Therefore, as capacitor 232 discharges, the base electrode of transistor 221 rises toward the potential of the emitter electrode. When the base electrode potential reaches the emitter electrode potential, transistor 221 commences conducting, and the one-shot returns to its stable state, where it remains until it is again triggered.

One-shots are identified in accordance with the function they perform, although all one-shot designations begin with the letter "Y." For example, the Y*b*1 designation refers to a one-shot which controls the time duration of the ringing of a bell. Normally only the 0-output signal is taken from the one-shot. That is, when the one-shot is triggered into its unstable state, the logic signal available at the output terminal of the one-shot represents a binary 0. In its stable state the one-shot output signal represents a binary 1. Thus, in effect, the one-shot output signal turns off when the one-shot is triggered. If desired, another output amplifier may be connected to the collector electrode of transistor 220 to provide an output signal representing the 1-state of the one-shot. Such an amplifier would provide a binary 1 when the one-shot was in its unstable state.

The symbol 244, shown in FIG. 11, is employed to represent the one-shot. Symbol 244, in this instance, represents the Y*b*1 one-shot. The two leads entering the left-hand side of symbol 244 represent the two input terminals. The upper input lead receives the logic input signal. The lower input lead receives the clock pulse signal. The symbol indicates that the Y*b*1 flip-flop receives the clock pulses provided by the CDA12 clock pulse driver. The notation *Y*b*1 opposite the upper input lead identifies the logic input signal. The lead leaving the right-hand side of symbol 244 represents the output terminal. The notation $\overline{Yb1}$ identifies the 0-output signal of the Y*b*1 one-shot. The duration of the unstable state of the flip-flop is also included within the symbol. Thus, the unstable state of the Y*b*1 flip-flop is indicated to be 15 ms.

*Register*

A register is adapted to provide temporary storage of data being processed or data being transferred between system components. The register comprises a plurality of flip-flops, one flip-flop for each bit of the data to be stored therein. Most registers of the system store a full data word and, therefore, comprise 28 flip-flops.

The flip-flops of a register are identified according to the register designation and the numerical significance of the data bits stored therein. Thus, a register flip-flop will be designated as the Q*mn* flip-flop, where Q identifies the register, *m* identifies the digit order of the bit stored, and *n* identifies the decimal significance of the bit stored. For example, the J13 flip-flop stores the 4-bit of the least significant digit of the J-register contents. The 28 flip-flops of the J-register may be represented; as follows:

J-REGISTER

| | | | | | | |
|---|---|---|---|---|---|---|
| *Jd* (J74) | J64 | J54 | J44 | J34 | J24 | J14 |
| *Js* (J73) | J63 | J53 | J43 | J33 | J23 | J13 |
| *Jm*2 (J72) | J62 | J52 | J42 | J32 | J22 | J12 |
| *Jm*1 (J71) | J61 | J51 | J41 | J31 | J21 | J11 |

The most significant, or 7th, digit of the data word is stored in *Jd*, *Js*, *Jm*2 and *Jm*1. This set of flip-flops is also termed J74, J73, J72 and J71.

The data in most of the registers may be serially shifted from higher to lower order digit positions of the register. In such registers, the entire contents of a digit position are transferred by parallel shift to the next lower order digit position. The serial shifting of data in this manner is most often effected by register transfers connected between the flip-flops (see FIGS. 9 and 10 in the section "Register Transfer"). Data which is serially transferred by digits to successively lower order digit positions is said to be "shifted-down." If the flip-flops are interconnected to transfer the data to successively higher order digit positions, they are said to "shift-up" the data.

If the digit in the LSD position is directed to re-enter the register at the MSD position during a shift-down, the data is said to be "ring shifted-down." Conversely, if the MSD position digits enter the LSD position, the data is said to be "ring shifted-up."

Temporary signal storage is provided to permit a register flip-flop to change its state at the same time that its contents are being transmitted to another register flip-flop; i.e., during the serial shift of data in a register. This temporary signal storage is supplied by capacitors in the register transfers and in the flip-flop logic input circuits. These capacitors store the logic signal levels from the output terminals of a data-transmitting flip-flop prior to the occurrence of the clock signal that causes the data-transmitting flip-flop to change its state and the corresponding data-receiving flip-flop to receive the contents of the data-transmitting flip-flop. Thus, the register transfer capacitors 206 temporarily store the logic signal levels provided by the data-transmitting flip-flop. When the clock pulse is applied to the register transfer the contents of the data-transmitting flip-flop are held in capacitors 206 sufficiently long for the data-receiving flip-flop to respond thereto, while the data-transmitting flip-flop may simultaneously have the state thereof changed. Similarly, where the contents of one flip-flop are transmitted to another through logical gates, the flip-flop input capacitors 116 and 117 provide temporary storage for the input logic signal levels.

DATA PROCESSING SYSTEM—DETAILS

The Data Processing System is shown symbolically in FIG. 12 to illustrate the elements therein which store data, the paths of data transfer between these elements, and major control elements of the system.

Instruction words for data processing, and operand words which are to be processed are stored in the 4,000 word Core Memory during data processing operations. Temporary storage of data words is provided in the various registers of the system. Data is most often transferred between registers by means of register transfers, not shown in FIG. 12. Most registers are also adapted to shift the data therein by the employment of register transfers between digit positions, such as shown in FIG. 9.

The instruction word which directs the system operation is stored in the I-register 272. The I-register comprises two registers, a 2-digit C-register and a 4-digit A-register. The I-register stores the 6 least significant digits of an instruction word, these digits including the command portion and the address portion. The command portion is stored in the C-register and the address portion in the A-register. The command portion in the C-register controls the type of operation to be executed by the system. The address portion in the A-register usually indicates the memory location from which the operand word is to be received, or where a data word is to be stored. However, the address portion is also employed as a control function to supplement the command portion in controlling the type of operation to be executed. The memory location of the next instruction to be executed is stored in the 4-digit N-register 274. As execution of an instruction is nearing completion the next-instruction address stored in the N-register is transferred to the A-register, and this address provides the Memory Controls 242 with the information to obtain the next instruction from the Core Memory 243.

All data words received from the Core Memory or entered into the Core Memory must pass through the 7-digit M-register 245. Therefore, when an instruction is to be received from the Core Memory the A-register contents direct the Memory Controls to obtain the instruction from the location then indicated in the A-register. This instruction is first transferred to the M-register and then to the 7-digit J-register 271. From the J-register the 6 least significant digits of the instruction word are transferred to the I-register and the instruction is then executed. Operand words needed by the instruction are obtained from the Core Memory by the same process; that is, by a first transfer to the M-register under control of the address portion of the instruction word in the A-register and then by a transfer to the J-register.

Arithmetic operations, sorting operations, comparison operations, etc., on operand words are performed primarily by employing the Arithmetic Unit 276, the L-register 273, and the R-register 275. The L-register and R-register are both 7-digit registers and each stores a complete data word. The L and R-registers are employed together when data processing is performed on double-precision words, and when so employed are designated as the FULL-register. The R-register is usually employed when processing single data words. The Arithmetic Unit is adapted to perform the operation of addition or subtraction on a pair of words received simultaneously from the J-register and the R-register or on data received simultaneously from the A-register and the B-register 270. When the contents of J and R are received by the Arithmetic Unit the output signals thereof are entered into the R-register, if single numeric words are being processed, and into the FULL-register if double-precision words are being processed.

A data word in the R-register may be transferred to the M-register for storage in the Core Memory at the location designated by the A-register contents.

The 4-digit B-register is employed to modify the address portion of the instruction word in the A-register. This modification is performed by adding the B-register contents to the A-register contents in the Arithmetic Unit, and by entering the output signals of the Arithmetic Unit into the A-register.

The A*r*-register 268 and the A*w*-register 269 store memory addresses during respective Multiplex Buffer read and write operations and are adapted to enter the address into the A-register when the Multiplex Buffer is to transfer a word to the Core Memory or to receive a word therefrom.

The modulo-3 of all words received by the J-register from the Core Memory is compared against the mod-bits of these words by the J-mod-generator 277, which accumulates the modulo-3 of a word as it ring shifts in the J-register. The V-mod-generator of the Arithmetic Unit accumulates the modulo-3 of the Arithmetic Unit output signals in order to apply the appropriate mod-bits to this word.

The A*r*, A*w*, B, J, I, L, N, and R-registers, the Arithmetic Unit, and the J-mod-generator comprise the Central Processor 10 of FIG. 1. The Memory Controls, Core Memory, and M-register comprise the Memory 12 of FIG. 1.

The Central Processor receives data from the Control Typewriter, the Photoreader, the Tape Handlers, and the Character Reader, and transmits data to the Tape Handlers, the Printer, the Control Typewriter, and the Sorter.

The 7-digit P-register 247, which is a part of the P-Buffer, temporarily stores a data word being transferred from the Control Typewriter or from the Photoreader to Memory. The P-register also temporarily stores a data word being transferred from Memory to the Control Typewriter. In so exchanging data with the Memory, the P-Buffer is controlled by the Central Processor and its mode of operation is initiated by the contents of the A-register, which sets the P-Buffer Controls 246. The P-Buffer, when directed by the Control Typewriter, coordinates the typing out of the contents of the B, I, L, N, P, and R-registers by the Control Typewriter. The Control Typewriter and the P-Buffer also cooperate in entering data words directly into the I-register and the R-register.

The R*b*-register 248 and the W*b*-register 250 form a part of the Multiplex Buffer and are controlled by the Multiplex Buffer Controls 249. The 7-digit R*b*-register temporarily stores a data word being transferred from magnetic tape or the Sorter Control Unit to Memory. The 7-digit W*b*-register temporarily stores a data word being transferred from Memory to magnetic tape or to the Printer.

A description of the system operation is provided in a succeeding section entitled "Instructions," and in the sections following thereafter. Details of the system structure and of the components thereof are provided in FIGS. 17, 19, 20, 24, 28, 29, 33, 36, 37, 42, 43 and 48–187.

*Data Processing Operations*

The command portions of the instruction word may have any one of 52 bit configurations, each configuration representing a different one of 52 decimal numbers. Each command portion number directs a fundamentally different data processing operation of the system. The system executes the commands of a succession of instruction words to process data. This succession of instruction words is termed a "program," in any program many, or all, of the 52 fundamental operations are executed one or more times to process the received data.

These fundamental operations which the system will execute, may be grouped by function; as follows:

A. Memory Input-Output Operations

Instruction 75: Transfer M to R (TMR)
A data word in Memory is transferred to the R-register.

Instruction 70: Transfer R to M (TRM)
The data word in the R-register is transferred to Memory.

Instruction 21: Exchange R and M (XMR)
The data word in the R-register is transferred to a specified memory location and the data word in that location is transferred to the R-register.

Instruction 85: Transfer M to FULL (TMF)
A double-precision word in Memory is transferred to the L and R-registers (FULL).

Instruction 80: Transfer FULL to M (TFM)
The double-precision word in FULL is transferred to Memory.

B. Operations Shifting Data within the Central Processor

Instruction 94: Exchange R and B (XRB)
The entire contents of the B-register are exchanged with the four least significant digit position contents of the R-register.

Instruction 97: Exchange L and R (XLR)
The L and R-registers exchange data words.

Instruction 90: Shift R Right (N) (SHR)
The numeric portion of the data word in the R-register is shifted-down through a designated number (N) of digit positions.

Instruction 91: Ring Shift R (N) (RSR)
The numeric portion of the data word in the R-register is ring shifted-down through a designated number (N) of digit positions.

Instruction 92: Shift FULL Right (N) (SHF)
The combined numeric portions of the double-precision data word in FULL is shifted-down through a designated number (N) of digit positions.

Instruction 93: Ring Shift FULL (N) (RSF)
The combined numeric portions of the double-precision data word in FULL is ring shifted-down through a designated number (N) of digit positions.

Instruction 28: Transfer M to B (TMB)
The four least significant digits of a data word in Memory are transferred to the B-register.

C. Program Jump Operations

Instruction 60: Branch if D1 (BD1)
The sequence of instructions being executed will be interrupted by a jump to a designated instruction, if the D1 flip-flop is on.

Instruction 62: Branch if D2 (BD2)
The sequence of instructions being executed will be interrupted by a jump to a designated instruction, if the D2 flip-flop is on.

Instruction 64: Branch if D3 (BD3)
The sequence of instructions being executed will be interrupted by a jump to a designated instruction if the D3 flip-flop is on.

Instruction 63: Jump Unconditionally (JUN)
The sequence of instructions being executed will be interrupted by a jump to a designated instruction.

Instruction 61: Jump Unconditionally, Transfer N to B (JNB)
The sequence of instructions being executed will be interrupted by a jump to a designated instruction, and the contents of the N-register are transferred to the B-register.

D. Comparison Operations

Instruction 76: Is R Greater Than M? (RGM)
The data word in the R-register is compared with a specified data word in Memory, and if the word in the R-register is greater than the word in Memory, the D1 flip-flop is set.

Instruction 86: Is $L—R$ Greater Than $M_A$ and $M_A+1$? (FGM)
The double-precision word in FULL is compared with a specified double-precision word in Memory, and if the word in FULL is greater than the word in Memory, the D1 flip-flop is set.

Instruction 71: Is R Unequal to M? (RUM)
The data word in the R-register is compared with a specified data word in Memory, and if the two words compared are not equal, the D1 flip-flop is set.

Instruction 81: Is $L—R$ Unequal to $M_A$ and $M_A+1$? (FUM)
The double-precision word in FULL is compared with a specified double-precision word in Memory, and if the two words compared are not equal, the D1 flip-flop is set.

Instruction 31: Find Word in Memory Equal to $L-R$ (FND)

The Memory is searched through a series of sequential double-word locations to find a double-precision word that is equal to the double-precision word in FULL.

Instruction 36: Find Word in Memory Equal To or Greater Than FULL (FGR)

The Memory is searched through a series of sequential double-word locations to find a double-precision word that is equal to or greater than the double-precision word in FULL.

E. Sorting Operation

Instruction 35: Tumble (TUM)

The double-precision word in FULL is stored in Memory at a designated double-word location, and the double-precision words in the designated memory location and in following sequential double-word memory locations are each shifted to the next sequential double-word locations.

F. Arithmetic Operations

Instruction 72: Add M to R (AMR)

A word in Memory is added to the word in the R-register, and the sum is placed in the R-register.

Instruction 73: Subtract M from R (SMR)

A word in Memory is subtracted from the word in the R-register, and the difference is placed in the R-register.

Instruction 82: Add M to FULL (AMF)

A double-precision word in Memory is added to the double-precision word in FULL, and the sum is placed in FULL.

Instruction 83: Subtract M from FULL (SMF)

A double-precision word in Memory is subtracted from the double-precision word in FULL, and the difference is placed in FULL.

Instruction 87: Add M to R and Carry (ARC)

A word in Memory is added to the word in the R-register, and the sum is placed in FULL.

Instruction 88: Subtract M from R and Carry (SRC)

A word in Memory is subtracted from the word in the R-register, and the difference is placed in FULL.

Instruction 27: Add M to B (AMB)

The four least significant digits of a data word in Memory are added to the contents of the B-register, and the sum is placed in the B-register.

Instruction 42: Multiply M by R (MPY)

A word in Memory is multiplied by the numeric portion of the word in the R-register, and the product is placed in FULL.

Instruction 43: Divide FULL by M (DIV)

The numeric portion of the double-precision word in FULL is divided by the numeric portion of a single numeric word in Memory, and the quotient is placed in FULL.

G. Miscellaneous Central Processor Operations

Instruction 25: Mod-3 Generation on R (GMR)

Mod-bits are generated for the modulo-3 of the numeric portion of the R-register contents.

Instruction 26: Mod-3 Generation on L and R (GMF)

Mod-bits are generated for the modulo-3 of the numeric portions of both the L and R-registers.

Instruction 54: Does Condition X Exist? (DSW)

One or more of a plurality of interrogations relating to conditions in various parts of the system are made, and if the condition or conditions exist, the D3 flip-flop is turned on.

Instruction 50: Change State of Sign or Designator of R, or Change Jc (CHR)

The state of the Jc, R*d*, and R*s* flip-flops may be altered.

Instruction 29: Extract M into R by L (EXT)

Certain digits of the word in the R-register are replaced with the corresponding digits of a word in Memory, under control of a word in the L-register.

Instruction 53: Halt (HLT)

Data processing halts at the termination of the instruction.

H. System Input-Output Operations

Instruction 24: Transfer P to M (TPM)

The data word in the P-register is transferred to Memory.

Instruction 74: Transfer M to P (TMP)

A data word in Memory is transferred to the P-register.

Instruction 59: Photoreader or Control Typewriter In or Out (PIO)

A data word is transferred into the P-register from either the Photoreader or the Control Typewriter, or the data word in the P-register is transferred to the Control Typewriter.

Instruction 52: Ring Bell or Gong (RNG)

An audible indication is produced.

Instruction 65: Read Magnetic Tape or Character Reader (RMT)

The Multiplex Buffer is directed to start reading one block of data from magnetic tape or to start reading one line of data from a document.

Instruction 66: Write Magnetic Tape or Load Printer (WMT)

The Multiplex Buffer is directed to start writing one block of data onto magnetic tape or to start transmitting one block of data to the Printer.

Instruction 67: Alter Magnetic Tape (AMT)

The magnetic tape of a Tape Handler is caused to reverse, erase, or rewind.

Instruction 68: Write Blockettes on Magnetic Tape or Load Printer (WMB)

The Multiplex Buffer is directed to start writing 5 blockettes of data onto magnetic tape, or to start transmitting 5 blockettes of data to the Printer.

Instruction 58: Start or Stop Check Feeding (CHF)

The Sorter is directed to start or stop transferring documents to the Character Reader.

Instruction 57: Select Sorter Pocket (N) (POC)

The Sorter is directed to store the next document in a designated (N) pocket.

In addition to the 49 above-described programmable operations, three different operations are directed by the corresponding command portion numbers 51, 55, and 56. These three numbers are automatically inserted into the C-register when data is being transferred into or out of the Multiplex Buffer. One of these operations is employed each time the program or an instruction is interrupted in order to transfer data between the Memory and the Multiplex Buffer.

Under certain circumstances an Instruction 25 or 26 is entered automatically to provide the correct mod-bits after an instruction has altered the modulo-3 of a word.

GLOSSARY AND INDEX OF SIGNALS

The signals provided by the system circuit elements are tabulated below. The portion of the description which illustrates or describes the respective source circuit element for each of these signals is also identified.

For example, the notation:

*Anpd*: FF, Cent Proc; FIG. 105 indicates that the *Anpd* signal is provided by the *Anpd* flip-flop of the Central Processor, and that the source flip-flop and the corresponding logical schematic diagrams for providing input signals thereto are illustrated in FIG. 105. A similar notation is employed for one-shot and inverter output signals.

The notation:

*Cad*: Log, Cent Proc; FIG. 107 indicates that the *Cad* signal is a designated logical combination signal of the Central Processor, and that its source logical schematic diagram is illustrated in FIG. 107.

The notation:

B27: CP, Cent Proc; FIG. 17 indicates that the B27 signal is provided by the B27 clock pulse driver of the Central Processor. Since the B27 clock pulse driver operates continuously, "FIG. 17" refers to the actual illustration of the B27 clock pulse driver. However, if a clock pulse driver is gated, the noted figure refers to the illustration showing the logical schematic diagram for providing the gating signal for the clock pulse driver which supplies the tabulated signal. Thus, the B28 gated clock pulse driver output signal is tabulated as B28: CP, Cent Proc; FIG. 108 wherein FIG. 108 illustrates the logical schematic diagram that provides the Gate-B28 signal for the B28 clock pulse driver.

The notation:

*Kccc*: Sw, Con Cons; FIG. 19 indicates that the *Kccc* signal is provided by closing a switch or button on the Control Console.

The notation:

*Ka*: Key, Con Typ; "Control Typewriter" section indicates that the *Ka* signal is provided by depressing a key on the Control Typewriter. The source circuit element for the *Ka* signal is not illustrated in the drawings, but is described in the "Control Typewriter" section.

The notation (*ij*) following the identification of a flip-flop indicates, generally, all flip-flops of a given register which bear a numerical suffix. For example, A(*ij*) refers to the signals delivered by all flip-flops of the A-register.

The table to follow employs the abbreviations:

CP—Clock pulse driver
FF—Flip-flop
Inv—Inverter
Key—Key
Log—Designated logical combination signal
OS—One-shot
Sw—Switch or button
Cent Proc—Central Processor
Char Rdr—Character Reader
Con Cons—Control Console
Con Typ—Control Typewriter
Mem—Memory
Mult-Buf—Multiplex Buffer
P-Buf—P-Buffer
Photo—Photoreader
Prtr—Printer
Read-Buf—Read Buffer
Sort—Sorter
Sort Con—Sorter Control Unit
Tape Con—Tape Control Unit
Tape Han—Tape Handler
Write-Buf—Write Buffer A(*ij*): FF, Cent Proc; FIGS. 48–51
The 1-output signals of the 16 flip-flops of the A-register, which stores the address portion of the instruction word.

*Aac*: FF, Cent Proc; FIG. 98
The 1-output signal of an alarm flip-flop which is set to the 1-state if a malfunction occurs in the Arithmetic Unit.

*Ah*: Sw, Con Cons; FIG. 19
A signal which issues upon depression of the ADDRESS HALT button and causes the system to halt when a designated address is in the A-register.

*Ai*: FF, Cent Proc; FIG. 105
The 1-output signal of an alarm flip-flop which is set to the 1-state if an improper instruction word enters the Central Processor.

AM(*ij*): FF, Mem; FIGS. 110–113
The 1-output signals of the 14 flip-flops of the AM-register, which stores the address of the memory location addressed during each memory cycle.

*Amm*: FF, Cent Proc; FIG. 105
The 1-output signal of an alarm flip-flop which is set to the 1-state if an improper data word is transferred to the Central Processor from Memory.

*Anpd*: FF, Cent Proc; FIG. 105
The 1-output signal of a sub-alarm flip-flop which is set to the 1-state if the Central Processor fails to select a Sorter pocket after a document is read by the Character Reader.

*Ar*(*ij*): FF, Cent Proc; FIGS. 52–55
The 1-output signals of the 14 flip-flops of the *Ar*-register, which stores the memory location wherein the next word to be read from magnetic tape or the Character Reader is to be stored.

*Atd*: FF, Tape Con; "Alarms" section
The 1-output signal of an alarm flip-flop which is set to the 1-state if the addressed Tape Handler is disabled.

*Ate*: FF, Cent Proc; FIG. 105
The 1-output signal of an alarm flip-flop which is set to the 1-state if a malfunction occurs when a Tape Handler or the Character Reader is reading or when a Tape Handler or the Printer is writing.

*Atm*: FF, Cent Proc; FIG. 104
The 1-output signal of a control flip-flop which, when set to the 1-state, causes the word in the M-register of the Memory to be incremented by 2 as it is restored to its Core Memory location.

*Aw*(*ij*): FF, Cent Proc; FIGS. 56–59
The 1-output signals of the 14 flip-flops of the *Aw*-register, which stores the memory location wherein the next word to be written by a Tape Handler or the Printer is stored.

B17: CP, Cent Proc; FIG. 17
The clock pulses which are delivered by a continuous clock pulse driver and which are applied to clock pulse input terminals of Central Processor flip-flops.

B27: CP, Cent Proc; FIG. 17
The clock pulses which are delivered by a continuous clock pulse driver and which are applied to clock pulse input terminals of Central Processor flip-flops.

B28: CP, Cent Proc; FIG. 108
The clock pulses which are delivered by a gated clock pulse driver and which are applied to clock pulse input terminals of Central Processor flip-flops.

B(*ij*): FF, Cent Proc; FIGS. 60–63
The 1-output signals of the 16 flip-flops of the B-register, which stores a number for modifying the address in the A-register.

*Bb*: FF, Cent Proc; FIG. 95
The 1-output signal of a control flip-flop which, when set to the 1-state, causes modification of the address in the A-register effecting the addition thereto of the contents of the B-register.

*Bbf*: FF, Write-Buf; FIG. 154
The 1-output signal of a control flip-flop, which when set to the 1-state, signals that the first word of a block of data words has been transferred to the Write Buffer or aids in terminating the transfer of a block of data words to the Printer.

*Bbs*: Log, Write-Buf; FIG. 158
A signal which notifies the Printer that the first word of a block of data words is ready to be transferred thereto.

*Bkt*: Log, Cent Proc; FIG. 107
A signal which directs a Tape Handler to back one data block.

*Blk*: FF, Cent Proc; FIG. 104
The 1-output signal of a control flip-flop which, when set to the 1-state, directs the writing on magnetic tape or by the Printer of 100 data words comprising five blockettes of 20 words, wherein the five blockettes are taken from five respective groups of memory locations disposed at random in Memory, each group comprising 20 consecutive memory locations.

*Bls*: Log, Cent Proc; FIG. 107
A signal which counts the *Wbk*-counter up by 1 whenever the write-memory address in the A-register is a multiple of 20.

*Brt*: FF, P-Buf; FIG. 135
The 1-output signal of a control flip-flop which, when set to the 1-state, directs the type-out of the contents of a designated register by the Control Typewriter when the Central Processor is halted.

*C(ij)*: FF, Cent Proc; FIGS. 64, 65
The 1-output signals of the 8 flip-flops of the C-register, which stores the command portion of the instruction word.

*Cad*: Log, Cent Proc; FIG. 107
A signal which effects the decrease by 1 of the number represented by the contents of the A21 and the A1 flip-flops of the A-register.

*Can*: Log, P-Buf; FIG. 138
A signal which directs the transfer of the contents of the P7 flip-flops to the *Cs* flip-flops of the P-Buffer when data is being transferred from the P-Buffer to the Control Typewriter.

*Cap*: CP, P-Buf; FIG. 138
The clock pulses which are delivered by a gated clock pulse driver and which are applied to clock pulse input terminals of P-Buffer flip-flops.

*Cau*: Log, Cent Proc; FIG. 107
A signal which effects the increase by 1 of the numerical portion of the contents of the A-register.

*Cd0–Cd9*: Char Rdr; FIG. 42
Signals delivered by the Character Reader which represent the reading and recognition of the respective numerals 0–9 on a document.

CD1, CD2: CP, Mult-Buf; FIG. 33
The clock pulses which are delivered by a pair of continuous clock pulse drivers and which are applied to clock pulse input terminals of Multiplex Buffer flip-flops and one-shots.

CD3: CP, Tape Con; FIG. 33
The clock pulses which are delivered by a continuous clock pulse driver and which are applied to clock pulse input terminals of Tape Control Unit flip-flops.

CD4: CP, P-Buf; FIG. 29
The clock pulses which are delivered by a continuous clock pulse driver and which are applied to clock pulse input terminals of P-Buffer flip-flops and one-shots.

CDA, CDB, CDC: CP, Cent Proc; FIG. 17
The clock pulses which are delivered by three continuous clock pulse drivers and which are applied to drive other clock pulse drivers of the Central Processor.

CDA11, CDA13, CDA14: CP, Cent Proc; FIG. 17
The clock pulses which are delivered by three gated clock pulse drivers and which are applied to clock pulse input terminals of Central Processor flip-flops.

CDA12: CP, Cent Proc; FIG. 17
The clock pulses which are delivered by a continuous clock pulse driver and which are applied to clock pulse input terminals of Central Processor flip-flops and one-shots.

*Cer*: Char Rdr; FIG. 42
A signal which is delivered by the Character Reader to denote that the Character Reader has been unable to read or to recognize a particular character on a document.

*Cfd*: FF, Cent Proc; FIG. 104
The 1-output signal of a control flip-flop which, when set to the 1-state, causes the Sorter Control Unit to direct the Sorter to continuously feed documents.

*Cfs*: FF, Read-Buf; FIG. 177
The 1-output signal of a control flip-flop which, when set to the 1-state, controls the Read Buffer so that a line of data is read from but one document.

*Cfsd*: Log, Cent Proc; FIG. 107
A signal which effects the resetting of the *Reb* flip-flop after a character reading command has been given, but during the duration of which no document has been detected, by causing the setting of the *Cfs* flip-flop.

*Cha*: FF, Read-Buf; FIG. 175
The 1-output signal of a control flip-flop which, when set to the 1-state, controls the Read Buffer when data is being transferred thereto from the Character Reader.

*Chad*: Log, Cent Proc; FIG. 107
A signal which prepares the Read Buffer and Character Reader for a character reading operation by causing the setting of the *Cha* flip-flop in the Read Buffer.

*Cinf*: Log, P-Buf; FIG. 138
A signal which directs the transfer of the character transmitted by the Control Typewriter to the *Cs* flip-flops of the P-Buffer.

*Cinp*: Log, P-Buf; FIG. 138
A signal which directs the transfer of the character transmitted by the Photoreader to the *Cs* flip-flops of the P-Buffer.

*Cinr*: Log, P-Buf; FIG. 138
A signal which directs the transfer of the contents of the P7 flip-flops, or of the P7 and P1 flip-flops, to the *Cs* flip-flops of the P-Buffer, when data is being transferred from the P-Buffer to the Control Typewriter.

*Ckp*: FF, Sort Con; FIG. 185
The 1-output signal of a control flip-flop which, when set to the 1-state, signals that the field of a document is passing the transducer of the Character Reader.

*Cld*: Log, Cent Proc; FIG. 107
A signal which effects the decrease by 1 of the contents of the L1 flip-flops of the L-register.

*Clu*: Log, Cent Proc; FIG. 107
A signal which effects the increase by 1 of the contents of the L1 flip-flops of the L-register.

*Cod4–Cod1*: Log, Sort Con; FIG. 187
The signals delivered by the digit encoder 850 of the Sorter Control Unit, which represent in four bit complementary code the numeral read and recognized by the Character Reader.

*Cof*: FF, Sort Con; FIG. 185
The 1-output signal of a control flip-flop which, when set to the 1-state, directs the Sorter to continuously feed documents.

*Cpg*: Log, Cent Proc; FIG. 107
A signal which issues during a "greater than" comparison instruction to enable various logic inputs to D1, in order that D1 may reflect the result of a "greater than" comparison.

*Crd4–Crd1*: Log, Sort Con; FIG. 187
The signals transmitted from the Sorter Control Unit to the Read Buffer, which represent in four bit complementary code the character read and recognized by the Character Reader.

*Cs1–Cs6, Csp*: FF, P-Buf; FIGS. 130, 131
The 1-output signals of the 7 flip-flops of the *Cs*-register, which stores the six data bits and the parity bit of characters being transferred into the P-Buffer from the Control Typewriter and the Photoreader or being transferred out of the P-Buffer to the Control Typewriter.

*Csc1, Csc2*: CP, Sort Con; FIG. 43
The clock pulses which are delivered by a pair of continuous clock pulse drivers and which are applied to clock pulse input terminals of Sorter Control Unit flip-flops and one-shots.

*Csu*: FF, Read-Buf; FIG. 177
The 1-output signal of a control flip-flop, which controls the bursts of the *Tr*-counter when data is being read by the Character Reader and transferred to the Read Buffer, and also signals the failure of a Tape Handler to transfer any data to the Read Buffer during the reading of a block of data from magnetic tape.

*Csy1, Csy2, Csy3*: OS, Sort; FIG. 42
The output pulses of three cascaded Sorter one-shots which operate to synchronize the reading of a line of data from a document and the subsequent insertion of the document in a Sorter pocket when a pocket decision is received by the Sorter.

*Cu4–Cu1*: Char Rdr; FIG. 42
Signals delivered by the Character Reader which represent the reading and recognition of the respective cue characters on a document.

*Cwu*: Log, Cent Proc; FIG. 107
A signal which effects the increase by 1 of the contents of the W-counter.

*Cytc*: CP, P-Buf; FIG. 138
The clock pulses which are delivered by a gated clock pulse driver and which are applied to clock pulse input terminals of P-Buffer flip-flops.

D1: FF, Cent Proc; FIG. 100
The 1-output signal of a control flip-flop which, when set to the 1-state, indicates the results of the execution of certain comparison instructions.

D2: FF, Cent Proc; FIG. 100
The 1-output signal of a control flip-flop which, when set to the 1-state, indicates that the two least significant digits of the contents of a memory address have been incremented by 2, and also indicates that an overflow has occurred when the four least significant digits of a word in Memory are added to the contents of B, during execution of an Instruction 27.

D3: FF, Cent Proc; FIG. 100
The 1-output signal of a control flip-flop which, when set to the 1-state, indicates that a particular situation exists during execution of an interrogation by an Instruction 54.

D3*g*: Log, Cent Proc; FIG. 107
A signal which issues when a particular situation exists during interrogation by an Instruction 54.

*Dcc*: FF, Sort Con; FIG. 185
The 1-output signals of a control flip-flop which, when set to the 1-state, indicates that a character has been read from a document and recognized by the Character Reader.

*Dec0–Dec9, Dec–ss*: Log, Sort Con; FIG. 187
The signals delivered by the Sorter Control Unit to the Sorter, which represent respectively the Sorter pocket into which a document is to be inserted.

*Dor*: Log, Sort Con; FIG. 187
A signal which issues when a numeral on a document has been read and recognized by the Character Reader.

DRC0–DRC19: Mem; FIG. 121
The respective output signals of the 20 address drivers of the Memory.

*Dsy1, Dsy2*: FF, Read-Buf; FIG. 176
The 1-output signals of two control flip-flops which aid in retiming the data bits received by the Read Buffer from magnetic tape.

*Dt*: FF, Cent Proc; FIG. 100
The 1-output signal of a control flip-flop which, when set to the 1-state, indicates that a programmed instruction has not been executed because a system component was busy or was not prepared.

*Efp*: FF, P-Buf; FIG. 132
The 1-output signal of a full alarm flip-flop which is set to the 1-state if a parity error has been detected in data in the P-Buffer.

*Em24*: Log, Cent Proc; FIG. 107
A signal which issues during execution of an Instruction 24 to reset the *Mc3* flip-flop for indicating that the P-register is empty following the execution of the instruction.

*Em59*: Log, Cent Proc; FIG. 107
A signal which issues during execution of an Instruction 59 for setting the P-Buffer mode control flip-flops to direct the execution of the selected operation.

*Em74*: Log, Cent Proc; FIG. 107
A signal which issues during execution of an Instruction 74 to initiate transfer of a word from Memory to the P-Buffer.

*End*: Log, Cent Proc; FIG. 107
A signal which issues during the last clock period in the execution of an instruction.

*Eoc*: FF, Read-Buf; FIG. 107
The 1-output signal of a control flip-flop which, when set to the 1-state, signals that the end of the line of data has been read by the Character Reader.

*Eod*: FF, P-Buf; FIG. 133
The 1-output signal of a control flip-flop which, when set to the 1-state, indicates the conclusion of a P-Buffer operation, in order to provide proper delay for the Control Typewriter mechanism to return to its idle state.

*Eos*: Log, P-Buf; FIG. 138
A signal which issues to indicate that a P-Buffer operation has been completed.

*Err*: Log, Sort Con; FIG. 187
A signal which issues when the waveshape obtained from an improper character has been transmitted to the Character Reader, or when the Character Reader cannot recognize the waveshape received thereby.

*Ers*: FF, Read-Buf; FIG. 174
The 1-output signal of a sub-alarm flip-flop which is set to the 1-state: if a row or column parity error is detected in a data word received by the Read Buffer from magnetic tape; if the Read Buffer has not been unloaded when the next word is received from magnetic tape or from the Character Reader; or if no data is transmitted into the Read Buffer from a tape block.

*Ersd*: Log, Cent Proc; FIG. 107
A signal which effects the resetting of the *Ers* flip-flop when the state thereof is interrogated by execution of an Instruction 54.

*Ert*: Log, Cent Proc; FIG. 107
A signal which issues during execution of an Instruction 67 to initiate the erasing of block markers and the backing of an identified magnetic tape.

*Ews*: FF, Write-Buf; FIG. 151
The 1-output signal of a sub-alarm flip-flop which is set to the 1-state: if the Write Buffer has not been loaded before another word must be transmitted to the Tape Handler; or if the Write Buffer has not been unloaded when the Central Processor is ready to enter another word therein.

*Ewsd*: Log, Cent Proc; FIG. 107
A signal which effects the resetting of the *Ews* flip-flop when the state thereof is interrogated by execution of an Instruction 54.

*Ftr*1–*Ftr*10: Tape Con; FIGS. 37 and 39
The 1-output signals of the 10 read amplifiers of the Tape Control Unit. These amplifiers amplify and temporarily store the data read from the corresponding magnetic tape tracks of the Tape Handler currently reading data.

*Gm*2, *Gm*1: FF, P-Buf; FIG. 134
The 1-output signals of the two flip-flops of the P-Mod-generator, which are primarily employed to accumulate the modulo-3 of a data word in the P-Buffer. The *Gm*1 flip-flop is also employed to suppress the type-out of the most significant 0's in the P-register. The *Gm*2 flip-flop is also employed during the type-out of a second half double-precision word from the P-Buffer to provide for the Car Ret putaway character.

*Gm*3: Log, P-Buf; FIG. 138
A signal which effects the increase by 1 of the number represented by the *Gm*2, 1 flip-flops, in response to a digit having a modulo-3 of +1.

*Gm*4: Log, P-Buf; FIG. 138
A signal which effects the decrease by 1 of the number represented by the *Gm*2, 1 flip-flops, in response to a digit having a modulo-3 of −1.

*Gmt*: Log, P-Buf; FIG. 138
A signal which enables the *Gm*2, 1 flip-flops to accumulate the modulo-3 of a word in the P-register in accordance with the state of the *Gm*3 and *Gm*4 signals.

*Haf*: FF, Read-Buf; FIG. 174
The 1-output signal of a control flip-flop which aids in retiming the tape digits received by the Read Buffer. The *Haf* flip-flop, when in the 1-state, denotes that one digit from a magnetic tape transverse recording position has been transmitted to the Read Buffer digit input registers.

HD*d*, HD*s*, HD*m*2, HD*m*1, H*d*(*ij*): Mem; FIG. 121
The input signals to the logic input terminals of the respective inhibit drivers of the Memory.

*Hst*: FF, Cent Proc; FIG. 101
The 1-output signal of a control flip-flop which, when set to the 1-state, is employed to "remember" that an instruction-interrupt operation is being performed by the Multiplex Buffer, during execution of an Instruction 31, 35 or 36.

*Ht*1, *Ht*2: FF, Cent Proc; FIG. 102
The 1-output signals of a pair of control flip-flops which function to halt the operation of the Data Processing System.

*Icb*: Inv, P-Buf; FIG. 138
The true output signal of an inverter which indicates that the Photoreader is ready and that a Photoreader input command has been given to the P-Buffer.

*Icom*: Inv, Cent Proc; FIG. 109
The true output signal of an inverter which issues to reset the *Ht*1 and *Ht*2 flip-flops and thereby to place the system in the normal data processing mode.

*Icsp*, *Ics*6–*Ics*1: Inv, P-Buf; FIG. 138
The true output signals of seven inverters which provide 1- and 0-logic input signals to the corresponding flip-flops of the *Cs* character register of the P-Buffer.

I*End*: Inv, Cent Proc; FIG. 109
The true output signal of an inverter which provides an inverted logic signal for the *End* logical combination signal.

I*Err*: Inv, Sort Con; FIG. 187
The true output signal of an inverter which provides an inverted logic signal for the *Cer* signal.

I*fc*: Inv, P-Buf; FIG. 138
The true output signal of an inverter which controls the transfer of each character from Control Typewriter to P-Buffer, or from P-Buffer to Control Typewriter.

IM14–IM11: Inv, Cent Proc; FIG. 109
The true output signals of four inverters which provide inverted logic signals for the 1-output signals of the corresponding M-register flip-flops M14–M11.

IM*j*4, IM*j*1: Inv, Cent Proc; FIG. 109
The true output signals of four inverters which provide inverted logic signals for the corresponding M*j*4–M*j*1 logical combination signals. These signals are employed during accumulation of the modulo-3 of the contents of the J-register or the L-register by the J-Mod-generator.

IM*of*: Inv, Mem; FIG. 121
The true output signal of an Inverter which provides an inverted logic signal for the M*of* signal.

IM*s*: Inv, Cent Proc; FIG. 109
The true output signal of an inverter which provides an inverted logic signal for the 1-output signal of the M*s* flip-flop of the M-register. The IM*s* signal is employed to determine whether an additive or subtractive function should be executed during an arithmetic operation.

IN*pd*: Inv, Cent Proc; FIG. 109
The true output signal of an inverter which provides an inverted logic signal for the N*pd* logical combination signal of the Sorter Control Unit.

I*pc*: Inv, P-Buf; FIG. 138
The true output signal of an inverter which controls the transfer of each character from Photoreader to P-Buffer.

I*pd*, I*ps*, I*pm*2, I*pm*1: Inv, P-Buf; FIG. 138
The true output signals of four inverters which provide 1- and 0-logic input signals to the corresponding P*d*, P*s*, P*m*2 and P*m*1 flip-flops of the P-register.

IQ*d*, IQ*s*, IQ*m*2, IQ*m*1, IQ(*ij*): Inv, Mem; FIG. 121
The true output signals of 28 inverters which provide a portion of the 1- and 0-logic input signals to the corresponding M-register flip-flops. These signals are employed when new data is to be inserted into the addressed Memory location.

IR*em*: Inv, Cent Proc; FIG. 109
The true output signal of an inverter which represents a binary 1 if the contents of the LSD positions of the J-register and the R-register are the same, if either of these two digit positions contains an asterisk (*), or if both the designator bits and the sign bits of the J- and R-registers are alike.

IR*gm*: Inv, Cent Proc; FIG. 109
The true output signal of an inverter which provides an inverted logic signal for the R*gm* logical combination signal.

IR*sr*: Inv, Cent Proc; FIG. 109
The true output signal of an inverter which provides an inverted logic signal for the R*sr* signal of the Sorter.

I*rt*: Inv, P-Buf; FIG. 138
The true output signal of an inverter which provides an inverted logic signal for the K*tc* signal of the Control Typewriter. The I*rt* signal is employed when the Control Typewriter directs a type-out of the contents of certain registers.

*Isin*: Inv, Cent Proc; FIG. 109
The true output signal of an inverter which issues to reset the *Ht*2 flip-flop and thereby to cause the system to execute a Single-Cycle or Zingle-Cycle.

*Itv*: Inv, Cent Proc; FIG. 109
The true output signal of an inverter which enables the 1-logic input signal of the *Tv* flip-flop.

IV4–IV1: Inv, Cent Proc; FIG. 109
The true output signals of four inverters which provide inverted logic signals for the corresponding V4–V1 logical combination signals.

IV*a*4–IV*a*1: Inv, Cent Proc; FIG. 109
The true output signals of four inverters which provide inverted logic signals for the corresponding V*a*4–V*a*1 logical combination signals.

IV*b*4–IV*b*1: Inv, Cent Proc; FIG. 109
The true output signals of four inverters which provide inverted logic signals for the corresponding V*b*4–V*b*1 logical combination signals.

IV*c*: Inv, Cent Proc; FIG. 109
The true output signal of an inverter which provides the 1- and 0-logic input signals for the V*c* flip-flop.

IV*s*3: Inv, Cent Proc; FIG. 109
The true output signal of an inverter which provides the 1- and 0-logic input signals to the V*s*3 flip-flop.

IV*sa*: Inv, Cent Proc; FIG. 109
The true output signal of an inverter which provides the 1- and 0-logic input signals to the V*sa* flip-flop.

IXMJ: Inv, Cent Proc; FIG. 109
The true output signal of an inverter which provides an inverted logic signal for the Gate-XMJ clock pulse driver gating signal.

IXZJ: Inv, Cent Proc; FIG. 109
The true output signal of an inverter which provides an inverted logic signal for the Gate-XZJ clock pulse driver gating signal.

IY*b*1, IY*b*2: Inv, Cent Proc; FIG. 109
The true output signals of a pair of inverters which provide inverted logic signals for the 0-output signals of the corresponding Y*b*1 and Y*b*2 one-shots.

IY*ck*: Inv, Sort Con; FIG. 187
The true output signal of an inverter which provides an inverted logic signal for the 0-output signal of the Y*ck* one-shot.

IY*cp*: Inv, Sort Con; FIG. 187
The true output signal of an inverter which provides an inverted logic signal for the 0-output signal of the Y*cp* one-shot.

I*ycrt*: Inv, P-Buf; FIG. 138
The true output signal of an inverter which provides an inverted logic signal for the 0-output signal of the Y*crt* one-shot.

I*yrd*: Inv, P-Buf; FIG. 138
The true output signal of an inverter which aids in controlling the transfer of each character from the Control Typewriter or the Photoreader to the P-Buffer. This signal provides an inverted logic signal for the 0-output signals of either the Y*fr* one-shot or the Y*pr* one-shot.

I*ytc*: Inv, P-Buf; FIG. 138
The true output signal of an inverter which provides an inverted logic signal for the 0-output signal of the Y*tc* one-shot.

IZ*c*: Inv, Cent Proc; FIG. 109
The true output signal of an inverter which directs execution of instructions in proper sequence during a Zingle-Cycle operation.

IZ*m*: Inv, Cent Proc; FIG. 109
The true output signal of an inverter which provides an inverted logic signal for the Z*m* logical combination signal.

J*d*, J*s*, J*m*2, J*m*1, J(*ij*): FF, Cent Proc; FIGS. 66–72
The 1-output signals of the 28 flip-flops of the J-register, which receives instruction words and operands for the Central Processor from the Memory.

J*a*1, J*a*2: Log, Cent Proc; FIG. 107
A pair of signals which supply the modulo-3 of the word in the J-register to the respective mod-adder flip-flops M*a*1 and M*a*2.

J*c*: FF, Cent Proc; FIG. 103
The 1-output signal of a control flip-flop which, when set to the 1-state, directs the Central Processor to perform an absolute, 7-digit, comparison on two data words, rather than an algebraic 6-digit comparison.

J*m*20: FF, Cent Proc; FIG. 101
The 1-output signal of the control flip-flop which, when set to the 1-state, directs that the Write Buffer operation then being executed be modified to the blockette variation thereof. This variation is employed to obtain the starting write-memory location address for the succeeding blockette to be transferred to the Write Buffer.

J*mg*2, J*mg*1: FF, Cent Proc; FIG. 99
The 1-output signals of the two flip-flops of the J-Mod-generator, which are primarily employed to accumulate the modulo-3 of the contents of the J-register or the L-register.

J*mgd*: Log, Cent Proc; FIG. 107
A signal which effects the decrease by 1 of the number represented by the J*mg*2, 1 flip-flops, in response to a digit having a modulo-3 of −1.

J*mgu*: Log, Cent Proc; FIG. 107
A signal which effects the increase by 1 of the number represented by the J*mg*2, 1 flip-flops, in response to a digit having a modulo-3 of +1.

J*na*: FF, Cent Proc; FIG. 104
The 1-output signal of a control flip-flop which, when set to the 1-state, prevents the transfer of the next-instruction address to the A-register, thereby permitting the execution of a branch or jump operation.

J*r*: FF, Cent Proc; FIG. 101
The 1-output signal of a control flip-flop which, when set to the 1-state, controls a Read Buffer operation.

J*w*: FF, Cent Proc; FIG. 101
The 1-output signal of a control flip-flop which, when set to the 1-state, controls a Write Buffer operation.

K*a*: Key, Con Typ; "Control Typewriter" section
A Control Typewriter special signal which changes state when the A key is depressed, after the Enable key has been depressed. This signal transfers the system to the normal data processing mode from the halt mode. The K*a* signal is normally in the 1-state, but is transferred to the 0-state when the A key is depressed.

K*ab*: Log, Write Buf; FIG. 158
A signal which issues to reset the E*rs* and E*ws* sub-alarm flip-flops.

K*acr*: Con Typ; "Control Typewriter" section
A signal provided when a carriage return is to be executed by the Control Typewriter, following receipt of a character from the P-Buffer, to isolate the Control Typewriter for a predetermined time in order to allow the carriage return operation to be completed.

K*ah*: Con Cons; FIG. 19
A signal which issues when an instruction word in the A-register bears the address to which the ADDRESS HALT SELECTOR switches of the Control Console have been set. The K*ah* signal initiates a halt sequence if the ADDRESS HALT switch is on.

*Kam*: Sw, Con Cons; FIG. 19
A logic level signal which issues when the ALPHANUMERIC STORE switch is closed, and which causes additional characters to function as put-away signals when alphanumeric data is transferred from the Control Typewriter or the Photoreader to the P-Buffer.

*Kb*: Key, Con Typ; "Control Typewriter" section
A Control Typewriter special signal which issues when the D key is depressed, after the Enable key has been depressed. This signal causes the B-register contents to be typed out.

*Kbc*: Sw, Con Cons; FIG. 19
A logic level signal which issues when either the COMPUTE button or the SINGLE-CYCLE button on the Control Console is depressed, and which is effective to insure that only one cycle of the specified operation takes place.

*Kbh*: Sw, Con Cons; FIG. 19
A logic level signal which issues when the BRANCH HALT switch is closed, and which initiates a halt sequence if an Instruction 60 is executed.

*Kcb*: Sw, Con Cons; FIG. 19
A logic level signal which changes state when the COMPUTE button is depressed, and which causes the system to start normal data processing. The *Kcb* signal is normally in the 1-state, but is transferred to the 0-state when the COMPUTE button is depressed.

*Kcc*: Log, Cent Proc; FIG. 107
A signal which issues when either the TOTAL CLEAR or the COMPUTER CLEAR button on the Control Console is depressed, and which clears the Central Processor.

*Kccc*: Sw, Con Cons; FIG. 19
A preemptive signal which issues when the COMPUTER CLEAR button is depressed, and which clears the Central Processor.

*Kcf*: Con Typ; "Control Typewriter" section
A signal which issues whenever any one of the *Ka*, *Ks*, *Kz* signals goes to 0, and which insures that only one compute, single-cycle or zingle-cycle operation takes place for each depression of the corresponding A, S or Z key.

*Kds*1–*Kds*6: Sw, Con Cons; FIG. 19
Logic level signals which issue when the corresponding ones of six DECISION switches on the Control Console are closed. The presence of any one of these signals enables the program to branch in a predetermined direction by interrogation with a corresponding Instruction 54.

*Kec*: Sw, Con Cons; FIG. 19
A preemptive signal which issues when the EXTERNAL CLEAR button on the Control Console is depressed, and which clears the Multiplex Buffer and Tape Control Unit.

*Ken*1, *Ken*2: Key, Con Typ; "Control Typewriter" section
A pair of signals which change state when the Enable key on the Control Typewriter is depressed. Depression of the Enable key enables several Control Typewriter keys to issue special signals. The *Ken*1 signal is normally in the 0-state and the *Ken*2 signal is normally in the 1-state. When the Enable key is depressed, the *Ken*1 signal is transferred to the 1-state and the *Ken*2 signal is transferred to the 0-state.

*Kew*: Key, Con Typ; "Control Typewriter" section
A Control Typewriter special signal which issues when either the E key or the W key is depressed, after the Enable key has been depressed. If the *Kew* signal occurs due to the E key being depressed. data is first transferred from the Control Typewriter to the P-register and then from the P-register to the I-register. If the *Kew* signal occurs due to the W key being depressed, data is first transferred from the Control Typewriter to the P-register and then to the R-register.

*Key*: Sw, Con Cons; FIG. 19
A logic level signal which issues when the KEY switch on the Control Console is unlocked. Unlocking the KEY switch enables certain controls on the Control Console to become effective.

*Key*2: Sw, Con Cons; FIG. 19
A logic level signal which changes state when the KEY switch on the Control Console is unlocked. The *Key*2 signal is normally in the 1-state, but is transferred to the 0-state when the KEY switch is unlocked.

*Kfc*: Con Typ; "Control Typewriter" section
A timing signal transmitted from the Control Typewriter to the P-Buffer control circuits when the seven bits of a character are fully represented by the signals KF1–6, *p* and is ready for insertion in the P-register. The *Kfc* signal is normally in the 1-state, but is transferred to the 0-state when a character is ready for transmittal.

*Kfi*: Con Typ; "Control Typewriter" section
A signal which issues when the Control Typewriter is ready to transmit or to receive information.

*Kfp*, *Kf*6–*Kf*1: Con Typ; "Control Typewriter" section
Seven signals transmitted from the Control Typewriter to the P-Buffer to represent the six data bits of an encoded character and the corresponding parity bit.

*Kh*: Key, Con Typ; "Control Typewriter" section
A Control Typewriter special signal which issues when the H key is depressed, after the Enable key has been depressed. This signal causes the Central Processor to halt.

*Khb*: Sw, Con Cons; FIG. 19
A logic level signal which issues when the HALT button on the Control Console is closed, and which causes the system to halt.

*Kho*1, *Kho*2: Sw, Con Cons; FIG. 19
A pair of logic level signals which change state when the ALARM HALT OVERRIDE switch on the Control Console is closed. Closure of the ALARM HALT OVERRIDE switch causes the Central Processor to continue its normal instruction sequence without halting, although an alarm flip-flop may set. The *Kho*1 signal, which is normally in the 0-state, is transferred to the 1-state and the *Kho*2 signal, which is normally in the 1-state, is transferred to the 0-state when the ALARM HALT OVERRIDE switch is closed.

*Ki*: Key, Con Typ; "Control Typewriter" section
A Control Typewriter special signal which issues when the I-key is depressed, after the Enable key has been depressed. This signal causes the I-register contents to be typed out.

*Kl*: Key, Con Typ; "Control Typewriter" section
A Control Typewriter special signal which issues when the L-key is depressed, after the Enable key has been depressed. This signal causes the L-register contents to be typed out.

*Klm*1, *Klm*2: Sw, Con Cons; FIG. 19
A pair of logic level signals which change state when the CONTROL TYPEWRITER LOAD switch, the PHOTOREADER LOAD switch, the MEMORY DUMP switch, or the RECYCLE MANUAL switch on the Control Console is closed. For data processing from sequential programmed instructions, the *Klm*2 signal is normally in the 1-state and the *Klm*1 signal is normally in the 0-state. However, when one of these four switches is closed, the *Klm*2 signal is transferred to the 0-state and the *Klm*1 signal is transferred to the 1-state, whereupon the instruction in the I-register is executed repeatedly and the address portion thereof is increased by 1 each time the instruction is executed.

*Klm1g*: Sw, Con Cons; FIG. 19

A logic level signal which issues when the CONTROL TYPEWRITER LOAD switch, the PHOTOREADER LOAD switch, or the MEMORY DUMP switch on the Control Console is closed. The *Klm1g* signal causes the automatic alternating between a P-Buffer operation and execution of an instruction which remains in the instruction register.

*Klmd*: Sw, Con Cons; FIG. 19

A logic level signal which changes state when the MEMORY DUMP switch is closed, and which effects a Dump Memory operation. The *Klmd* signal, which is normally in the 1-state, is transferred to the 0-state when the MEMORY DUMP switch is closed.

*Klmp*: Sw, Con Cons; FIG. 19

A logic level signal which changes state when the PHOTOREADER LOAD switch on the Control Console is closed, and which effects a Photoreader Load Memory operation.

*Kn*: Key, Con Typ; "Control Typewriter" section

A Control Typewriter special signal which issues when the N key is depressed, after the Enable key has been depressed. This signal causes the N-register contents to be typed out.

*Knt1*, *Knt2*: Sw, Con Cons; FIG. 19

A pair of logic level signals which change state when the INHIBIT TYPE-OUT switch on the Control Console is closed. These signals function to prevent the P-register from being emptied by an Instruction 59. The *Knt1* signal, which is normally in the 1-state, is transferred to the 0-state and the *Knt2* signal, which is normally in the 0-state, is transferred to the 1-state, when the INHIBIT TYPE-OUT switch is closed.

*Kpc*: Photo; "Photoreader" section

A timing signal transmitted from the Photoreader to the P-Buffer control circuits when the seven bits of a character are fully represented by the *Kp1–6, p* signals, and is ready for insertion in the P-register.

*Kpcc*: Sw, Con Cons; FIG. 19

A preemptive signal which issues when the CONTROL TYPEWRITER CLEAR button is depressed, and which clears the P-Buffer.

*Kpi*: Photo; "Photoreader" section

A signal which issues when the Photoreader is ready to transmit information.

*Kpp*, *Kp6–Kp1*: Photo; "Photoreader" section

Seven signals transmitted from the Photoreader to the P-Buffer to represent the six data bits of an encoded character and the corresponding parity bit.

*Kqw*: Key, Con Typ; "Control Typewriter" section

A Control Typewriter special signal which issues when either the Q key or the W key is depressed, after the Enable key has been depressed. If the *Kqw* signal occurs due to the Q key being depressed, data is transferred from the Control Typewriter to the P-register, and retained in the P-register. If the *Kqw* signal occurs due to the W key being depressed, data is first transferred from the Control Typewriter to the P-register, and then to the R-register.

*Kr*: Key, Con Typ; "Control Typewriter" section

A Control Typewriter special signal which issues when the P key is depressed, after the Enable key has been depressed. This signal causes the R-register contents to be typed out.

*Kra*: Sw, Con Cons; FIG. 19

A preemptive signal which issues when the ALERT RESET button is depressed, and which clears all alarm and subalarm flip-flops in the system.

*Krac*: Log, Cent Proc; FIG. 107

A signal which issues when the TOTAL CLEAR button, the COMPUTER CLEAR button, or the ALERT RESET button on the Control Console is depressed, and which clears all alarm flip-flops in the Central Processor.

*Kry1*, *Kry2*: Sw, Con Cons; FIG. 19

A pair of logic level signals which change state when the RECYCLE button on the Control Console is depressed. Depression of the RECYCLE button causes the Central Processor to repeatedly execute an instruction in the I-register. The *Kry1* signal, which is normally in the 0-state, is transferred to the 1-state and the *Kry2* signal, which is normally in the 1-state, is transferred to the 0-state when the RECYCLE button is depressed.

*Ks*: Key, Con Typ; "Control Typewriter" section

A Control Typewriter special signal which issues when an S key is depressed, after the Enable key has been depressed. This signal causes the Central Processor to execute a single-cycle operation.

*Ksb*: Sw, Con Cons; FIG. 19

A logic level signal which issues when the SINGLE-CYCLE button on the Control Console is depressed, and which causes the Central Processor to execute a single-cycle operation.

*Ksh*: Sw, Con Cons; FIG. 19

A logic level signal which issues when the SELECTIVE HALT switch on the Control Console is closed, and which causes the Central Processor to halt if an instruction word bearing a breakpoint bit is executed.

*Kt*: Key, Con Typ; "Control Typewriter" section

A Control Typewriter special signal which issues when the T key is depressed, after the Enable key has been depressed. This signal causes the P-register contents to be typed out.

*Ktb*: Log, Write-Buf; FIG. 158

A signal which issues when either the TOTAL CLEAR button or the EXTERNAL CLEAR button on the Control Console is depressed, and which clears the Multiplex Buffer and Tape Control Unit.

*Ktc*: Con Typ; "Control Typewriter" section

A signal which changes state whenever any one of the *Kb*, *Ki*, *Kl*, *Kn*, *Kr*, or *Kt* signals issues, and which initiates a type-out sequence. The *Ktc* signal, which is normally in the 1-state, is transferred to the 0-state, when one of the six above-identified signals issues.

*Ktcc*: Sw, Con Cons; FIG. 19

A preemptive signal which issues when the TOTAL CLEAR button is depressed, and which clears the entire data processing system.

*Ktf*: Con Typ; "Control Typewriter" section

A signal which issues following the receipt of a character by the Control Typewriter, to isolate the Control Typewriter for a predetermined time from receipt of further signals in order to provide for the character received to be typed out or punched out.

*Kz*: Key, Con Typ; "Control Typewriter" section

A Control Typewriter special signal which issues when the Z key is depressed, after the Enable key has been depressed. This signal causes the Central Processor to execute a zingle-cycle operation.

*Ld*, *Ls*, *Lm2*, *Lm1*, *L(ij)*: FF, Cent Proc; FIGS. 73–79

The 1-output signals of the 28 flip-flops of the L-register, which is most often employed for storing the most significant half of a double-precision word.

*Lpr*: Prtr; "Printer" section

A signal delivered by the Printer following receipt thereby of the *Prt* signal, to notify the Write Buffer that the Printer has been turned on and is ready to receive data.

Lw: FF, Write-Buf; FIG. 155

The 1-output signal of a control flip-flop which, when set to the 1-state, orders the Central Processor to perform an operation to transfer a word from Memory to the Write Buffer.

Md, Ms, Mm2, Mm1, M(ij): FF, Mem; FIGS. 114–120

The 1-output signals of the 28 flip-flops of the M-register, which temporarily holds the data word that is to be stored in the Core Memory, or temporarily holds the data word that is read from the Core Memory.

M3g: FF, Cent Proc; FIG. 95

The 1-output signal of a control flip-flop which, when set to the 1-state, directs that an operation be executed to generate mod-bits for a designated data word.

Ma1, Ma2: FF, Cent Proc; FIG. 98

The 1-output signals of a pair of control flip-flops, which provide the sum of the mod-bits of the two numbers added by the Arithmetic Unit. This sum is compared with the contents of the Vmg1 and Vmg2 flip-flops to provide a test of the correctness of the result of an arithmetic operation.

Mc: Log, Cent Proc; FIG. 107

A signal which issues following failure of a comparison between the sum of the mod-bits of the two numbers added by the Arithmetic Unit and the mod-bits of the sum.

Mc1–Mc4: FF, P-Buf; FIG. 129

The 1-output signals of four control flip-flops which determine and direct the particular type of operation being performed by the P-Buffer. The Mc3 flip-flop is also employed to indicate that the P-register contains a data word.

Mca: Log, Cent Proc; FIG. 107

A signal which initiates the first half of the memory cycle, wherein the word in the addressed memory location is transferred to the M-register and the addressed memory location to be cleared.

Mcb: Log, Cent Proc; FIG. 107

A signal which initiates the second half of the memory cycle, wherein the word read out from the Core Memory during the first half of the memory cycle may be restored to the addressed memory location, or a new word from the R, Rb or P-register may be inserted into the addressed memory location.

Mi1, Mi2: FF, P-Buf; FIG. 135

The 1-output signals of a pair of control flip-flops which direct operations wherein data is transferred to the I-register, the P-register, the R-register or to Memory with the Central Processor in the halt mode.

Mj4–Mj1: Log, Cent Proc; FIG. 107

The output signals delivered by the J-Mod-generator input gates, and which represent the digit contents of the J1 flip-flops or the L1 flip-flops, according to the state of the M3g flip-flop.

Mof: Log, Mem; FIG. 121

A signal which issues if an overflow occurs when the two least significant digits of the word in the M-register are incremented by 2 as the word is restored to its Core Memory location.

MPd, MPs, MPm2, MPm1, MP(ij): Mem; "Memory" section

The signals delivered by the read-out windings of the respective 28 memory planes of the Core Memory.

Msc1, Msc2: FF, Cent Proc; FIG. 102

The 1-output signals of a pair of control flip-flops, which are employed, when starting from the halt mode, to insure that only one cycle of the specified operation takes place.

Mwt: Log, Cent Proc; FIG. 107

A signal which gates a new word into the M-register from the R, the Rb or the R-register for storage in the addressed memory location.

N(ij): FF, Cent Proc; FIGS. 80–83

The 1-output signals of the 16 flip-flops of the M-register, which stores the address of the next instruction to be received by the Central Processor from Memory.

Na0–Na9: Log, Tape-Con; FIG. 158

A signal which issues in response to a corresponding address in the Wt-register to connect the 10 write drivers to the write heads of the addressed Tape Handler.

NBtd0–NBtd9: Tape Con; "Tape Control Unit" section

A signal generated by the corresponding Tape Handler and the Tape Control Unit to reset the corresponding S(i) flip-flop when tape of the Tape Handler addressed thereby has been completely rewound.

Npd: Log, Sort Con; FIG. 187

A signal which changes state to set the Anpd sub-alarm flip-flop of the Central Processor, if the Central Processor fails to select a Sorter pocket after a document is read by the Character Reader.

Nr0–Nr9: Log, Tape Con; FIG. 183

A signal, which issues in response to a corresponding address in the Rt-register, and which enables the read preamplifiers connected to the read heads of the addressed Tape Handler.

Nrb: Log, Tape Con; "Tape Control Unit" section

A signal which issues during execution of an Instruction 65 to direct the transfer of the designated Tape Handler address from the LSD position of the A-register to the Rt-register of the Tape Control Unit.

Nwb: Log, Tape Con; "Tape Control Unit" Section

A signal which issues during execution of an Instruction 66, 67, or 68 to direct the transfer of the designated Tape Handler address from the LSD position of the A-register to the Wt-register of the Tape Control Unit.

Ov: FF, Cent Proc; FIG. 98

The 1-output signal of a control flip-flop which, when set to the 1-state, indicates that the sum or the difference of the two numbers applied to the Arithmetic Unit is too great to be placed in the allotted number of register digit positions. The Ov flip-flop also sets during Instruction 43 if the quotient will be too large for the allotted register space.

Pd, Ps, Pm2, Pm1, P(ij): FF, P-Buf; FIGS. 122–128

The 1-output signals of the 28 flip-flops of the P-register, which temporarily stores the data being transferred through the P-Buffer.

Pbn: Log, P-Buf; FIG. 138

A signal which gates the SB and SBB clock drivers to ring shift the contents of the B-register and which gates the SN clock driver to ring shift the contents of the N-register during a register type-out operation.

Pbz: Log, P-Buf; FIG. 138

A signal which issues if the P-register is receiving data from the Control Typewriter or the Photoreader, or is transmitting data to the Control Typewriter, thereby indicating that the P-register is busy.

Pcd: Log, Read-Buf; FIG. 183

A signal which issues, while checking column parity of the tape digit in the Rin1–5 flip-flops, if the two bits in Rin4, 5 are different.

Pce: Log, Read-Buf; FIG. 183

A signal which issues, while checking column parity of the tape digit in the Rin1–5 flip-flops, if an even number of 0's is present in Rin1–3.

Pco: Log, Read-Buf; FIG. 183
A signal which issues, while checking column parity of the tape digit in the Rin1–5 flip-flops, if an odd number of 0's is present in Rin1–3.

Pcs: Log, Read-Buf; FIG. 183
A signal which issues, while checking column parity of the tape digit in the Rin1–5 flip-flops, if the two bits in Rin4, 5 are the same.

Pi: Log, P-Buf; FIG. 138
A signal which gates the SC, SA, and SAC clock drivers to ring shift the contents of the I-register during a register type-out operation of the P-Buffer.

Pig1: Log, P-Buf; FIG. 138
A signal which issues to gate Ignore characters into the P-register during alphanumeric input operations of the P-Buffer.

Pig2: Log, P-Buf; FIG. 138
A signal which issues, in the absence of the Pig1 signal, to enable the normal serial shifting of the contents of the P-register.

Pmr: Log, P-Buf; FIG. 138
A signal which gates the mod-bits in the P-Mod-generator to the R-register during a register type-in operation of the P-Buffer.

Pnbz: Log, P-Buf; FIG. 138
A signal which issues if the P-register is neither receiving data from the Control Typewriter or the Photoreader nor transmitting data to the Control Typewriter, thereby indicating that the P-register is not busy.

Ppi: Log, P-Buf; FIG. 138
A signal, which issues during a register type-in operation of the P-Buffer, and which gates the contents of the P-register to the I-register, while simultaneously causing the contents of the I-register to shift-down.

Ppr: Log, P-Buf; FIG. 138
A signal which issues during a register type-in operation of the P-Buffer, and which gates the contents of the P-register to the R-register, while simultaneously causing the contents of the R-register to shift-down.

Prl: Log, P-Buf; FIG. 138
A signal which gates the SR76, SR, and SRRm clock drivers to ring shift the contents of the R-register and which gates the SL, SL76, and SLL7 clock drivers to ring shift the contents of the L-register during a register type-out operation of the P-Buffer.

Prt: FF, Write-Buf; FIG. 155
The 1-output signal of a control flip-flop which, when set to the 1-state, aids in controlling the Write Buffer when data is being transferred to the Printer.

Prtd: Log, Cent Proc; FIG. 107
A signal which prepares the Write Buffer and Printer for a write operation by causing the setting of the Prt flip-flop in the Write Buffer.

Ps4–Ps1: Log, Cent Proc; FIG. 107
The signals delivered by the Central Processor which represent in four bit complementary code a digit identifying the Sorter pocket selected by the Central Processor.

Pss: Log, P-Buf; FIG. 138
A signal which issues during a Control Typewriter Load Memory operation, a Photoreader Load Memory operation, or a Dump Memory operation, to cause an automatic single execution of the instruction in the I-register in order to effect automatic alternating between a P-Buffer operation and execution of the instruction in the I-register.

Pwc1, Pwc2: Log, Write-Buf; FIG. 158
A pair of signals employed to generate the column parity bit for a digit to be written on magnetic tape. One of these two signals issues if there is an even number of 0's in the digit in the Pwr flip-flops and thereby writes a 0 for the corresponding column parity bit.

Pwc3, Pwc4: Log, Write-Buf; FIG. 158
A pair of signals employed to generate the column parity bit for a digit to be written on magnetic tape. One of these two signals issues if there is an even number of 0's in the digit in the Wa3 flip-flops and thereby writes a 0 for the corresponding column parity bit.

Pwr4–Pwr1: FF, Write-Buf; FIG. 156
The 1-output signals of four flip-flops, which comprise a single digit register for providing temporary storage for certain digits to be transferred to magnetic tape or to the Printer, and for accumulating the row parity bits of the word stored in the Write-Buffer.

Qor: Log, Sort Con; FIG. 187
A signal which issues when a cue character on a document has been read and recognized by the Character Reader.

Rd, Rs, Rm2, Rm1, R(ij): FF, Cent Proc; FIGS. 84–90
The 1-output signals of the 28 flip-flops of the R-register, which is the primary register employed for storing operands and the results of various operations performed by the Central Processor on single numeric and alphanumeric words.

Ra1, Ra2: Log, Cent Proc; FIG. 107
A pair of signals which supply the modulo-3 of the number in the R-register to the respective mod-adder flip-flops Ma1 and Ma2.

Ra(ij): FF, Read-Buf; FIGS. 159–162
The 1-output signals of the 16 flip-flops of the Ra-register, which temporarily stores the data being transferred through the Read Buffer. The Ra-register receives input data transmitted to the Read Buffer and delivers this data to the Rb-register.

Rbd, Rbs, Rbm2, Rbm1, Rb(ij): FF, Read Buf; FIGS. 163–169
The 1-output signals of the 28 flip-flops of the Rb-register, which temporarily stores data being transferred through the Read Buffer. The Rb-register receives data delivered by the Ra-register and transmits full data words to the M-register.

Rb: FF, Tape Con; FIG. 175
The 1-output signal of a control flip-flop which, when set to the 1-state, indicates that one of the Tape Handlers is presently engaged in transmitting a block of data to Memory through the Read Buffer, and also controls the gating of the selected Tape Handler read preamplifier output signals to the Ftr(i) read amplifiers.

Rd1, Rd2: FF, P-Buf; FIG. 134
The 1-output signals of two control flip-flops, which synchronize the speed of operation of the Control Typewriter and Photoreader with that of the P-Buffer and Central Processor.

Rds1, Rds2: FF, Read-Buf; FIG. 176
The 1-output signals of two control flip-flops, which aid in retiming the data bits received by the Read Buffer from magnetic tape.

Rdy: Log, P-Buf; FIG. 138
A signal which issues to indicate that the P-register may receive a character from the Cs-register during a P-Buffer input operation, or that the P-register may transmit a character to the Cs-register during a P-Buffer output operation.

*Reb*: FF, Read-Buf; FIG. 175
The 1-output signal of a control flip-flop which, when set to the 1-state, indicates that the Read Buffer is busy receiving data from a Tape Handler or from a Character Reader.

*Rebd*: Log, Cent Proc; FIG. 107
A signal which prepares the Read Buffer and Tape Control Unit for a reading operation by causing the setting of the *Reb* flip-flop in the Read Buffer.

*Red*: Tape Han; FIG. 35 and "Tape Handler" section
A signal delivered by the block marker analyzer of a Tape Handler, when the $\gamma$-block marker is sensed as data is being read from magnetic tape, to denote the end of a block of data.

*Rgm*: Log, Cent Proc; FIG. 107
A signal which represents a binary 1 if the digit in the LSD position of the R-register is greater than the digit in the LSD position of the J-register.

*Rin*1–*Rin*5: FF, Read-Buf; FIGS. 170, 172
The 1-output signals of the five flip-flops of a tape digit input register in the Read Buffer, which receives the tape digits read from one-half of a magnetic tape.

*Rin*6–*Rin*10: FF, Read-Buf; FIGS. 171, 172
The 1-output signals of the five flip-flops of a tape digit input register in the Read Buffer, which receives the tape digits read from one-half of a magnetic tape.

*Rip*: Log, P-Buf; FIG. 138
A signal which issues to gate numeric input data to the P-register.

*Ripa*: Log, P-Buf; FIG. 138
A signal which issues to gate alphanumeric characters to the P-register.

*Rmt*: Log, Cent Proc; FIG. 107
A signal which issues during execution of an Instruction 67 to initiate the rewinding of an identified magnetic tape.

*Rpl*: Log, Read-Buf; FIG. 183
A signal which gates the digits of a data word received from magnetic tape to the R*b*7 flip-flops of the R*b*-register to accumulate therein the row parity of the data word.

*Rsr*: Sw, Sort; FIG. 42
A logic level signal which issues when the START SORTER switch on the Sorter is depressed, thereby indicating that the Sorter is running and ready to start document feeding.

*Rsy*: Tape Han; FIG. 35 and "Tape Handler" section
A signal delivered by the block marker analyzer of a Tape Handler, when the $\beta$-block marker is sensed as data is being read from magnetic tape, to denote the beginning of a block of data.

*Rt*4–*Rt*1: FF, Tape Con; FIG. 178
The 1-output signals of the four flip-flops of the R*t*-register, which stores the identification of the Tape Handler that is to transfer one block of data from the magnetic tape thereof to the Read Buffer.

*Rtc*: FF, P-Buf; FIG. 135
The 1-output signal of a control flip-flop which, when set to the 1-state, controls the type-out of the contents of a designated register by the Control Typewriter.

*Rwd*: Tape Con; "Tape Control Unit" section
A signal which issues when a magnetic tape is rewinding. This signal may be interrogated by an Instruction 54.

S0–S9: FF, Tape Con; FIGS. 179–181
The 1-output signals of the 10 flip-flops of the S-register, which stores an identification of a Tape Handler that is rewinding the magnetic tape thereof.

S9R7: Log, Cent Proc; FIG. 107
A signal which gates 9's into the R7 digit position of the R-register.

SA: CP, Cent Proc; FIG. 108
The clock pulses which are delivered by a gated clock pulse driver and which are applied to register transfers to shift-down the contents of the A-register.

SAC: CP, Cent Proc; FIG. 108
The clock pulses which are delivered by a gated clock driver and which are applied to register transfers to shift the contents of the A1 flip-flops to the C6 flip-flops.

SB: CP, Cent Proc; FIG. 108
The clock pulses which are delivered by a gated clock pulse driver and which are applied to register transfers to shift-down the contents of the B-register.

SBB: CP, Cent Proc; FIG. 108
The clock pulses which are delivered by a gated clock pulse driver and which are applied to register transfers to shift the contents of the B1 flip-flops to the B4 flip-flops.

SC: CP, Cent Proc; FIG. 108
The clock pulses which are delivered by a gated clock pulse driver and which are applied to register transfers to shift-down the contents of the C-register. The SC clock pulses are also applied to register transfers to shift the contents of the C5 flip-flops to the A4 flip-flops.

SCD0–SCD12: Mem; FIG. 121
The respective output signals of the 13 switch core drivers of the Memory.

*Sin*1: CP, Read-Buf; FIG. 183
The clock pulses which are delivered by a gated clock pulse driver and which are applied to clock pulse input terminals of the R*in*1–R*in*4 Read Buffer flip-flops to gate data thereto from the corresponding F*tr*1–F*tr*4 read amplifiers.

*Sin*2: CP, Read-Buf; FIG. 183
The clock pulses which are delivered by a gated clock pulse driver and which are applied to clock pulse input terminals of the R*in*7–R*in*10 Read Buffer flip-flops to gate thereto from the corresponding F*tr*7–F*tr*10 read amplifiers.

SJ: CP, Cent Proc; FIG. 108
The clock pulses which are delivered by a gated clock pulse driver and which are applied to register transfers to ring shift-down the contents of the J-register.

SJL*m*: Log, Cent Proc; FIG. 107
A signal which gates the contents of the J12 and J11 flip-flops to the respective L72 and L71 flip-flops.

SJL*s*: Log, Cent Proc; FIG. 107
A signal which gates the contents of the J14 and J13 flip-flops to the respective L74 and L73 flip-flops.

SJ*mg*L: Log, Cent Proc; FIG. 107
A signal which gates the contents of the J*mg*2 and J*mg*1 flip-flops of the J-Mod-generator to the respective L72 and L71 flip-flops.

SJ*mg*R: Log, Cent Proc; FIG. 107
A signal which gates the contents of the J14 and J13 flip-flops to the respective R74 and R73 flip-flops and the contents of the J*mg*2 and J*mg*1 flip-flops of the J-Mod-generator to the respective R72 and R71 flip-flops.

S*jp*: Log, P-Buf; FIG. 138
A signal which gates the contents of the J1 flip-flops to the corresponding P7 flip-flops.

SJR*m*: Log, Cent Proc; FIG. 107
A signal which gates the contents of the J1 flip-flops to the corresponding R7 flip-flops.

SL: CP, Cent Proc; FIG. 108
The clock pulses which are delivered by a gated clock pulse driver and which are applied to register transfers to shift-down the contents of the L6–L1 digit positions of the L-register.

SL76: CP, Cent Proc; FIG. 108
The clock pulses which are delivered by a gated clock pulse driver and which are applied to register transfers to shift the contents of the L7 flip-flops to the L6 flip-flops.

SLL7: CP, Cent Proc; FIG. 108
The clock pulses which are delivered by a gated clock pulse driver and which are applied to register transfers to shift the contents of the L1 flip-flops to the L7 flip-flops.

SLL*s*: Log, Cent Proc; FIG. 107
A signal which gates the contents of the L14 and L13 flip-flops to the respective L74 and L73 flip-flops.

SLR6: CP, Cent Proc; FIG. 108
The clock pulses which are delivered by a gated clock pulse driver and which are applied to register transfers to shift the contents of the L1 flip-flops to the R6 flip-flops.

SLR7: CP, Cent Proc; FIG. 108
The clock pulses which are delivered by a gated clock pulse driver and which are applied to register transfers to shift the contents of the L1 flip-flops to the R7 flip-flops.

SN: CP, Cent Proc; FIG. 108
The clock pulses which are delivered by a gated clock pulse driver and which are applied to register transfers to ring shift-down the contents of the N-register.

SNB: CP, Cent Proc; FIG. 108
The clock pulses which are delivered by a gated clock pulse driver and which are applied to register transfers to shift the contents of the N1 flip-flops to the B4 flip-flops.

*Sou*4–*Sou*1: FF, Sort Con; FIG. 184
The 1-output signals of the four flip-flops of the *Sou*-register, which stores the Sorter pocket decision transmitted by the Central Processor.

S*p*: CP, P-Buf; FIG. 138
The clock pulses which are delivered by a gated clock pulse driver and which are applied to register transfers to shift-down the contents of the P5–P1 digit positions of the P-register. The S*p* clock pulses are also applied to register transfers to shift the contents of the P7 flip-flops to the P6 flip-flops.

SPC: CP, Cent Proc; FIG. 108
The clock pulses which are delivered by a gated clock pulse driver and which are applied to register transfers to shift the contents of the P1 flip-flops to the C6 flip-flops.

S*pp*: Log, P-Buf; FIG. 138
A signal which gates the contents of the P1 flip-flops to the corresponding P7 flip-flops.

SPR7: CP, Cent Proc; FIG. 108
The clock pulses which are delivered by a gated clock pulse driver and which are applied to register transfers to shift the contents of the P1 flip-flops to the R7 flip-flops.

SP*wr*: CP, Write-Buf; FIG. 158
The clock pulses which are delivered by a gated clock pulse driver and which are applied to register transfers to shift the signals provided by the row parity generator of the Write Buffer to the corresponding flip-flops of the P*wr*-register.

SR: CP, Cent Proc; FIG. 108
The clock pulses which are delivered by a gated clock pulse driver and which are applied to register transfers to shift-down the contents of the R6–R1 digit positions of the R-register.

SR16: CP, Cent Proc; FIG. 108
The clock pulses which are delivered by a gated clock pulse driver and which are applied to register transfers to shift the contents of the R1 flip-flops to the R6 flip-flops.

SR76: CP, Cent Proc; FIG. 108
The clock pulses which are delivered by a gated clock pulse driver and which are applied to register transfers to shift the contents of the R7 flip-flops to the R6 flip-flops.

SR*a*: CP, Read-Buf; FIG. 183
The clock pulses which are delivered by a gated clock pulse driver and which are applied to register transfers to shift-up the contents of the R*a*-register.

SR*b*: CP, Read-Buf; FIG. 183
The clock pulses which are delivered by a gated clock pulse driver and which are applied to register transfers to shift-up the contents of the R*b*6–R*b*1 digit positions of the R*b*-register. The SR*b* clock pulses are also applied to register transfers to shift the contents of the R*a*4 flip-flops to the R*b*1 flip-flops.

SR*in*: CP, Read-Buf; FIG. 183
The clock pulses which are delivered by a gated clock pulse driver and which are applied to register transfers to shift the contents of the R*in*6–R*in*10 flip-flops to the corresponding R*in*1–R*in*5 flip-flops.

SRL6: CP, Cent Proc; FIG. 108
The clock pulses which are delivered by a gated clock pulse driver and which are applied to register transfers to shift the contents of the R1 flip-flops to the L6 flip-flops.

SRL7: CP, Cent Proc; FIG. 108
The clock pulses which are delivered by a gated clock pulse driver and which are applied to register transfers to shift the contents of the R1 flips-flops to the L7 flip-flops.

SRR*m*: Log, Cent Proc; FIG. 107
A signal which gates the contents of the R1 flip-flops to the corresponding R7 flip-flops.

SRXB: CP, Cent Proc; FIG. 108
The clock pulses which are delivered by a gated clock pulse driver and which are applied to register transfers to shift the contents of the R1 flip-flops to the B4 flip-flops. The SRXB clock pulses are also applied to register transfers to shift the contents of the B1 flip-flops to the R7 flip-flops.

S*t*: Mem; FIGS. 26 and 28
A signal which is delivered by the strobe driver of the Memory and which is applied to the 28 core read amplifiers thereof to enable the core read amplifiers to transmit the output signals delivered by the corresponding 28 read out windings of the Core Memory.

SVA: Log, Cent Proc; FIG. 107
A signal which gates the V4–V1 output signals of the Arithmetic Unit to the corresponding A4 flip-flops.

SVB: Log, Cent Proc; FIG. 107
A signal which gates the V4–V1 output signals of the Arithmetic Unit to the corresponding B4 flip-flops.

SVL7: Log, Cent Proc; FIG. 107
A signal which gates the V4–V1 output signals of the Arithmetic Unit to the corresponding L7 flip-flops.

SV*mg*L: Log, Cent Proc; FIG. 107
A signal which gates the contents of the V*mg*2 and V*mg*1 flip-flops of the Arithmetic Unit V-Mod-generator to the respective L72 and L71 flip-flops.

SV*mg*R: Log, Cent Proc; FIG. 107
A signal which gates the contents of the V*mg*2 and V*mg*1 flip-flops of the Arithmetic Unit V-Mod-generator to the respective R72 and R71 flip-flops.

SVR7: Log, Cent Proc; FIG. 107
A signal which gates the V4–V1 output signals of the Arithmetic Unit to the corresponding R7 flip-flops.

SWa1: CP, Write-Buf; FIG. 158
The clock pulses which are delivered by a gated clock pulse driver and which are applied to register transfers to shift-up the contents of the Wa-register. The SWa1 clock pulses are also applied to register transfers to shift the contents of the Wb7 flip-flops to the Wa1 flip-flops.

SWa2: CP, Write-Buf; FIG. 158
The clock pulses which are delivered by a gated clock pulse driver and which are applied to register transfers to shift the contents of the Wa3 flip-flops to the corresponding Pwr flip-flops of the Pwr-register.

SWb1/4: CP, Write-Buf; FIG. 158
The clock pulses which are delivered by a gated clock pulse driver and which are applied to register transfers to shift-up the contents of the Wb3–Wb1 digit positions of the Wb-register. The SWb1/4 clock pulses are also applied to register transfers to shift the contents of the Wb3 flip-flops to the Wb4 flip-flops.

SWb5/7: CP, Write-Buf; FIG. 158
The clock pulses which are delivered by a gated clock pulse driver and which are applied to register transfers to shift-up the contents of the Wb4–Wb7 digit positions of the Wb-register.

SWb7–4: CP, Write-Buf; FIG. 158
The clock pulses which are delivered by a gated clock pulse driver and which are applied to register transfers to shift the contents of the Wb7 flip-flops to the Wb4 flip-flops.

SWop: CP, Write-Buf; FIG. 158
The clock pulses which are delivered by a gated clock pulse driver during transfer of data from the Write Buffer to the Printer and which are applied to the register transfers to shift the contents of the Pwr flip-flops to the corresponding Wo1–Wo4 flip-flops and the contents of the Wa3 flip-flops to the corresponding Wo6–9 flip-flops.

SWot: CP, Write-Buf; FIG. 158
The clock pulses which are delivered by a gated clock pulse driver and which are applied to the clock pulse input terminals of the Wo1–Wo10 flip-flops to gate thereto the two tape digits to be transferred from Read Buffer to magnetic tape.

SZL6: Log, Cent Proc; FIG. 107
A signal which gates 0's into the L6 digit position of the L-register.

SZR6: Log, Cent Proc; FIG. 107
A signal which gates 0's into the R6 digit position of the R-register.

SZR7: Log, Cent Proc; FIG. 107
A signal which gates 0's into the R7 digit position of the R-register.

T1, Ta3, Ta8, Tb1, Tb7, Tb8, Ti, Tv: FF, Cent Proc; FIGS. 92–95
The 1-output signals of eight control flip-flops, which are employed in the timing circuit of the Central Processor to identify various ones of the 48 states of the timing circuit.

Ta, Tb, Td, Ty, Tzv: FF, Cent Proc; FIGS. 92–94
The 1-output signals of five control flip-flops, which are employed in the timing circuit of the Central Processor to define the 48 different states of the timing circuit. The combined configurations of these five signals identify six different cycles of the T-counter.

Ta2: Log, Cent Proc; FIG. 107
A signal which identifies one of the 48 states of the timing circuit.

Tca, Tcb, Tcc: FF, P-Buf; FIG. 133
The 1-output signals of the three flip-flops of the Tc-counter, which directs the sequence of the steps of the P-Buffer in executing an operation.

Tp, Tq, Ts: FF, Cent Proc; FIG. 91
The 1-output signals of the three flip-flops of the T-counter, which is the fundamental unit of the timing circuit of the Central Processor.

Tr1–Tr5: FF, Read-Buf; FIGS. 173, 174
The 1-output signals of the five flip-flops of the Tr-counter, which is the source for fine timing and control of the shifting operations executed by the Read Buffer.

Tsa, Tsb, Tsc: FF, P-Buf; FIG. 132
The output signals of the three flip-flops of the Ts-counter, which is the source for fine timing and control of the shifting operations executed by the P-Buffer.

Tsp: Log, P-Buf; FIG. 138
A signal which controls the duration in which the Cap and Sp clock pulses issue and thereby determines the number of digit positions through which the P-register contents are shifted.

Tw1–Tw6: FF, Write-Buf; FIGS. 152, 153
The 1-output signals of the six flip-flops of the Tw-counter, which is the source for fine timing and control of the shifting operations executed by the Write Buffer.

Ur: FF, Read-Buf; FIG. 175
The 1-output signal of a control flip-flop which, when set to the 1-state, orders the Central Processor to perform an operation to transfer the word in the Rb-register to Memory.

Us: FF, Cent Proc; FIG. 97
The 1-output signal of a control flip-flop which, when set to the 1-state, directs that the magnitude of the numeric portion of one of the numbers applied to the Arithmetic Unit be subtracted from the magnitude of the numeric portion of the other number applied thereto.

V4–V1: Log, Cent Proc; FIG. 107
The four output signals of the Arithmetic Unit which represent the result of the arithmetic operation performed thereby.

Va4–Va1: Log, Cent Proc; FIG. 107
Four signals which represent one of the input numbers on which the Arithmetic Unit is to perform an operation.

Vb4–Vb1: Log, Cent Proc; FIG. 107
Four input signals which represent one of the input numbers on which the Arithmetic Unit is to perform an operation.

Vc: FF, Cent Proc; FIG. 97
The 1-output signal of a flip-flop, which generates the carry bit of the two digits being added by the Arithmetic Unit.

Vct: Log, Cent Proc; FIG. 107
A signal generated during those instructions wherein an arithmetic operation is being performed by the Arithmetic Unit to gate input signals to the Vc flip-flop.

Vmg2, Vmg1: FF, Cent Proc; FIG. 99
The 1-output signals of the two flip-flops of the V-Mod-generator, which are primarily employed to accumulate the modulo-3 of the six-digit output word delivered by the Arithmetic Unit.

Vmgd: Log, Cent Proc; FIG. 107
The signal which effects the decrease by 1 of the number represented by the Vmgd2, 1 flip-flops in response to a digit having a modulo-3 of —1.

Vmgu: Log, Cent Proc; FIG. 107
A signal which effects the increase by 1 of the number represented by the Vmgd2, 1 flip-flops in response to a digit having a modulo-3 of +1.

Vs1–Vs4, Vsa: FF, Cent Proc; FIGS. 96, 97
The 1-output signals of five flip-flops of the Arithmetic Unit, which generate the sum digit of the two digits being added by the Arithmetic Unit.

W1–W3: FF, Cent Proc; FIG. 103

The 1-output signals of the three flip-flops of the W-counter, which is employed primarily for counting the number of register digit positions through which data is shifted in certain operations. These three flip-flops also have independent control functions. The W1 flip-flop indicates that two digits compared during a comparison-type of instruction are not equal. The W2 flip-flop indicates the presence of an asterisk digit in either word compared during a comparison instruction. The W3 flip-flop indicates the presence of a period digit in the least significant digit of a double-precision word obtained from Memory, during execution of an Instruction 35.

*Wa(ij)*: FF, Write-Buf; FIGS. 139–141

The 1-output signals of the 12 flip-flops of the *Wa*-register, which temporarily stores the data being transferred through the Write Buffer. The *Wa*-register receives data from the *Wb*-register and transmits this data to a Tape Handler for storage on magnetic tape, or to the Printer.

*Wbd*, *Wbs*, *Wbm2*, *Wbm1*, *Wb(ij)*: FF, Write-Buf; FIGS. 142–148

The 1-output signals of the 28 flip-flops of the *Wb*-register, which temporarily stores the data being transferred through the Write Buffer. The *Wb*-register receives complete data words from the M-register and delivers these words to the *Wa*-register.

*Wb*: FF, Tape Con; FIG. 155

The 1-output signal of a control flip-flop which, when set to the 1-state, indicates that one of the Tape Handlers is presently engaged in receiving a block of data from the Memory through the Write Buffer, and also controls the application of the write driver output signals to the write heads of the selected Tape Handler.

*Wbf*: FF, Write-Buf; FIG. 151

The 1-output signal of a control flip-flop which, when set to the 1-state, indicates that the Write Buffer is loaded and that the contents thereof are ready to be transferred to magnetic tape or to the Printer.

*Wbk1*–*Wbk3*: FF, Write-Buf; FIG. 154

The 1-output signals of the three flip-flops of the *Wbk*-counter, which directs the number of data words transferred during a Write Buffer operation.

*Web*: FF, Write-Buf; FIG. 155

The 1-output signal of a control flip-flop which, when set to the 1-state, indicates that the Write Buffer is busy transferring data from Memory to magnetic tape or to the Printer.

*Webd*: Log, Cent Proc; FIG. 107

A signal which prepares the Write Buffer and Tape Control Unit for a writing operation by causing the setting of the *Web* flip-flop in the Write Buffer.

*Wed*: Tape Han; FIG. 35 and "Tape Handler" section

A signal delivered by the block marker analyzer of a Tape Handler, when the $\gamma$-block marker is sensed as data is being written on magnetic tape, to denote the end of the block space.

*Wo1*–*Wo5*: FF, Write-Buf; FIGS. 149, 151

The 1-output signals of five flip-flops which hold a digit and its corresponding column parity bit for transfer to magnetic tape or to the Printer.

*Wo6*–*Wo10*: FF, Write-Buf; FIGS. 150, 151

The 1-output signals of five flip-flops which hold a digit and its corresponding parity bit for transfer to magnetic tape or to the Printer.

*Wos*: Log, Write-Buf; FIG. 158

A signal which notifies the Printer that two digits are in the *Wo* flip-flops of the Write Buffer and are available for receipt by the Printer.

*Wsy*: Tape Han; FIG. 35 and "Tape Handler" section

A signal delivered by the block marker analyzer of the Tape Handler, when the $\alpha$-block marker is sensed as data is being written on tape, to denote the beginning of a block space.

*Wt4*–*Wt1*: FF, Tape Con; FIG. 157

The 1-output signals of the four flip-flops of the *Wt*-register, which stores the identification of the Tape Handler that is to receive and record on the magnetic tape thereof one block of data from the Write Buffer. The *Wt*-register also stores the identification of the Tape Handler which is to have the magnetic tape thereof backed one block, or backed one block and the corresponding block markers erased.

XAA*w*: CP, Cent Proc; FIG. 108

The clock pulses which are delivered by a gated clock pulse driver and which are applied to register transfers to provide a parallel shift of the contents of the A-register to the A*w*-register.

XAN: CP, Cent Proc; FIG. 108

The clock pulses which are delivered by a gated clock pulse driver and which are applied to register transfers to provide a parallel shift of the contents of the A-register to the N-register.

XA*r*A: CP, Cent Proc; FIG. 108

The clock pulses which are delivered by a gated clock pulse driver and which are applied to register transfers to provide a parallel shift of the contents of the A*r*-register to the A-register.

XA*t*A: CP, Cent Proc; FIG. 108

The clock pulses which are delivered by a gated clock pulse driver and which are applied to register transfers to shift the contents of the *Wbk*-counter flip-flops to the corresponding A11, A12, and A13 flip-flops. The XA*t*A clock pulses are also applied to a register transfer to shift a 0-bit to the A14 flip-flop.

XA*w*A: CP, Cent Proc; FIG. 108

The clock pulses which are delivered by a gated clock pulse driver and which are applied to register transfers to provide a parallel shift of the contents of the A*w*-register to the A-register.

XJI: CP, Cent Proc; FIG. 108

The clock pulses which are delivered by a gated clock pulse driver and which are applied to register transfers to provide a parallel shift of the contents of the six least significant digit positions of the J-register to the I-register.

XMA: CP, Cent Proc; FIG. 108

The clock pulses which are delivered by a gated clock pulse driver and which are applied to register transfers to provide a parallel shift of the contents of the M4–M1 digit positions of the M-register to the A-register. Only the 1-output signals of the M4, M3, and M2 flip-flops are applied to the corresponding A-register flip-flops; however, both the 1-output signals of the M1 flip-flops and corresponding inverted signals are applied to the A1 flip-flops.

XMJ: CP, Cent Proc; FIG. 108

The clock pulses which are delivered by a gated clock pulse driver and which are applied to register transfers to provide a parallel shift of the contents of the M-register to the J-register. Only the 1-output signals of the M7–M2 flip-flops are applied to the corresponding J-register flip-flops; however, both the 1-output signals of the M1 flip-flops and corresponding inverted signals are applied to the J1 flip-flops.

XMW*b*: CP, Write-Buf; FIG. 158
The clock pulses which are delivered by a gated clock pulse driver and which are applied to register transfers to provide a parallel shift of the contents of the M-register to the W*b*-register. Only the 1-output signals of the M-register flip-flops are applied to the corresponding W*b*-register flip-flops.

XNA: CP, Cent Proc; FIG. 108
The clock pulses which are delivered by a gated clock pulse driver and which are applied to register transfers to provide a parallel shift of the contents of the N-register to the A-register.

X*r*1, X*r*2: CP, Tape Con; FIG. 183
The clock pulses which are delivered by a pair of gated clock pulse drivers and which are applied to the clock pulse input terminals of the respective groups of F*tr*1–F*tr*5 and F*tr*6–F*tr*10 read amplifiers to preset the read amplifiers of the corresponding group to the 1-state.

XZJ: CP, Cent Proc; FIG. 108
The clock pulses which are delivered by a gated clock pulse driver and which are applied to register transfers to clear the J7–J2 flip-flops of the J-register and to shift the contents of the J2 flip-flops to the J1 flip-flops.

$\overline{Yb1}$, $\overline{Yb2}$: OS, Cent Proc; FIG. 106
The 0-output signals of a pair of one-shots, which control certain audible indications that are demanded by the Central Processor.

$\overline{Yck}$: OS, Sort Con; FIG. 186
The 0-output signal of a one-shot, which is employed to indicate the detection of the reference edge of a document by the automatic reading apparatus of the Sorter. This one-shot remains in its unstable state for a duration sufficient to enable the triggering of the C*kp* flip-flop and the Y*or* one-shot.

$\overline{Ycp}$: OS, Sort Con; FIG. 186
The 0-output signal of a one-shot, which remains in its unstable state during the period when each character is being read from a document.

$\overline{Ycrt}$: OS, P-Buf; FIG. 137
The 0-output signal of a one-shot, which provides a suspense period in the P-Buffer whenever an automatic carriage return is executed by the Control Typewriter, or when a Tab or Car Ret character is transmitted to the Control Typewriter.

$\overline{Yco}$: OS, P-Buf; FIG. 136
The 0-output signal of a one-shot, which provides delay at the end of an operation to allow the Control Typewriter to return to its quiescent state.

$\overline{Yfr}$: OS, P-Buf; FIG. 136
The 0-output signal of a one-shot, which indicates that character signals are ready to be supplied by the Control Typewriter.

$\overline{Yor}$: OS, Sort Con; FIG. 186
The 0-output signal of a one-shot, which controls the period when the S*ou*-register may receive a new pocket decision.

$\overline{Ypr}$: OS, P-Buf; FIG. 136
The 0-output signal of a one-shot, which indicates that character signals are ready to be supplied by the Photoreader.

$\overline{Yro}$: OS, Sort Con; FIG. 186
The 0-output signal of a one-shot, which gates the contents of the S*ou*-register to the Sorter.

$\overline{Ytc}$: OS, P-Buf; FIG. 136
The 0-output signal of a one-shot, which gates the character in the C*s* flip-flops of the P-Buffer to the Control Typewriter.

$\overline{Ytd1}$, $\overline{Ytd2}$: OS, Read-Buf; FIG. 182
The 0-output signals of a pair of one-shots, which control the amount of magnetic tape skew that is tolerated by the data retiming circuit.

Z*a*1, Z*a*2, Z*a*3: Log, Cent Proc; FIG. 107
Signals which issue to propagate carrys from the respective 1st, 2nd, and 3rd digit positions in the A-register as the contents thereof are counted up. The Z*a*1 signal issues when the A1 flip-flops contain a 9, the Z*a*2 signal issues when the A2, 1 flip-flops contain a 99, and the Z*a*3 signal issues when the A3, 2, 1 flip-flops contain a 999.

Z*m*: Log, Cent Proc; FIG. 107
A signal which issues during a multiplication operation when the multiplicand is to be multiplied by a 0 digit of the multiplier, or when the multiplier digit which is currently multiplying the multiplicand is about to become a 0. This signal causes a shift-down through one digit position of the accumulated product in the FULL register.

Z*va*: FF, Cent Proc; FIG. 97
The 1-output signal of a control flip-flop which when set to the 1-state, normally directs that 0's be supplied by the V*a* input gates of the Arithmetic Unit. However, when the U*s* flip-flop is also set, the Z*va* signal directs that 9's be supplied by the V*a* input gates.

DEFINITIONS

The definition or explanation of certain terms employed in this description follow:

Block—The unit and region of data storage on magnetic tape. A data block comprises 100 data words.

Blockette—A group of 20 data words, which are stored in sequential memory locations, and which are transferred to magnetic tape.

Block Marker—Information provided in an auxiliary magnetic tape track for notifying control circuits of the region on the magnetic tape wherein a block of data is to be written or of the region on magnetic tape wherein a data block has been stored.

Control Function—That part of the address portion of an instruction word that is utilized to control a function of the system, instead of denoting a location in Memory.

FULL—The combination of the L-register and the R-register for storing and processing double-precision words.

Logic Level Signal—A signal which is provided by closing a switch or button and which has the same logical effect as the 0- or 1-output signals of a flip-flop.

LSD—The least significant digit of a data word. This digit is the one first processed when the seven digits of a word are processed in sequential order. If the word represents a numerical quantity, the LSD is the digit of least numerical significance.

LSH—The least significant half word of a double-precision word.

Mod—A reference to a modulo-3 relationship. The modulo-3 of a number is the remainder when that number is divided by 3. The mod-bits of a data word are two bits which indicate the modulo-3 of the data word.

MSD—The most significant digit of a data word. This digit is the one last processed when the seven digits of a data word are processed in sequential order.

MSH—The most significant half word of a double-precision word.

Operator—A notation expressing the logical relationship between a pair of signals. For example, the plus sign in the logical relationship $Tp+Tq$ indicates that the logical operation of Inclusive-Or is performed on the T*p* and T*q* signals.

Parallel Shift—The substantially simultaneous transfer of a plurality of data bits from one location to another. This expression is most often employed when the complete contents of a register are transferred to another register during a single clock period.

Preemptive Signal—A signal which is provided by the closing of a switch or button and which directly and immediately sets or resets a flip-flop.

Q*mn*—A notation identifying the flip-flop which stores the $n$th order bit in the $m$ digit order of the Q-register. For example, the J13 flip-flop stores the 3rd order bit of the least significant digit of the J-register contents. This notation also identifies the output signal of the corresponding flip-flop.

The notation Q$i$ identifies all the flip-flops in the $i$th digit order of a register. For example, the J2 flip-flops comprise the J24, J23, J22, and J21 flip-flops.

The notation Q($ij$) identifies all flip-flops of the Q-register.

Ring Shift-down—A function performed if the digit in the LSD position of a register reenters in the MSD position when the register contents are shifted-down.

Ring Shift-up—A function performed if the digit in the MSD position of a register reenters in the LSD position when the register contents are shifted-up.

Serial Shift—An expression most often employed when all the data in a register, or portion thereof, is shifted through one digit position during a single clock period.

Shift-down—A function performed when the contents of a register are serially shifted to successively lower order digit positions.

Shift-up—A function performed when the contents of a register are serially shifted to successively higher order digit positions.

Term—The element of a logical expression or logical schematic diagram that is related to the other elements of the logical expression or logical schematic diagram by the Inclusive-Or operator.

COMPONENT DETAILS AND OPERATION

The internal circuit structures of the components of the system, the circuit configurations interconnecting the components, and a description of the operation of the system follow hereinafter. The details of the circuit structure of the components and of the circuit configurations interconnecting the components are provided in FIGS. 17, 19, 20, 24, 28, 29, 33, 36, 37, 42, 43, and 48–187. These component structures and interconnecting configurations comprise novel assemblages of the previously described clock pulse drivers, flip-flops, AND-gates, OR-gates, inverters, emitter followers, register transfers, and one-shots to perform the functions of the Data Processing System. The connective relationship between these circuit elements can usually be described by logic expressions of the type illustrated in the foregoing sections "AND-gate," "OR-gate," and "Register Transfer."

*The Logical Schematic Diagram*

Generally, two or more output signals from flip-flops, one-shots, inverters, and clock pulse drivers and the signals provided by certain switches and push buttons are combined logically by AND-gates, OR-gates, and register transfer circuits to provide input signals to other flip-flops, one-shots, and inverters and to provide gating signals for clock pulse drivers. Thus, the two logic input signals to a flip-flop (FIG. 4) are usually the output signals of respective logical chains of AND-gates and OR-gates, which receive output signals provided by other flip-flops, and by one-shots, inverters, and certain switches and push buttons. These logical chains may be described and illustrated by logical expressions, which are actually logical schematic diagrams representing the logical and structural interconnection of the chain providing these two input signals to the flip-flop; i.e., see FIG. 48. Similarly the two register transfer input signals to a flip-flop are usually the signals provided by a tree of interconnected register transfers and switches or push buttons, wherein the register transfers receive output signals provided by other flip-flops and by clock pulse drivers. Thus, the four circuits providing the logic and register transfer input signals to a flip-flop may be illustrated by four logical schematic diagrams for each flip-flop, as shown in FIG. 48. The remaining input signal, which is received directly from a clock pulse driver, is also represented in FIG. 48. (If no logic input signals are provided at the flip-flop input terminals, no clock pulse driver is necessary.) The flip-flop representations of FIG. 48 and the associated logical schematic diagrams to the left of each flip-flop symbol are termed "flip-flop input" diagrams.

The one-shot receives an input logic signal from a logical chain of AND-gates and OR-gates, which receive output signals provided by other one-shots, and by flip-flops, inverters, and certain switches and push buttons. Therefore, the logical chain delivering the logical input signal to a one-shot may also be illustrated by a logical schematic diagram; i.e., see FIG. 106. The one-shot representations of FIG. 106 and the associated logical schematic diagrams to the left of each one-shot symbol are termed "one-shot input" diagrams.

In a similar manner the logical circuits providing input signals to inverters and gating signals to clock pulse drivers may be illustrated by logical schematic diagrams. The logical schematic diagrams of the logical circuits providing input signals to inverters are illustrated in the drawings under the headings "Inverter Signals"; i.e., see FIG. 109. The logical schematic diagrams of the logical circuits providing gating signals to clock pulse drivers are illustrated in the drawings under the headings "Clock Pulse Driver Gating Signals"; i.e., see FIG. 108.

The four types of logical schematic diagrams; namely, "flip-flop input" diagrams, "one-shot input" diagrams, "inverter signal" diagrams, and "clock pulse driver gating signal" diagrams, are employed in FIGS. 48–187 to illustrate the internal circuit structure of the components and the interconnecting circuit configurations between the components.

In addition to the four types of logical schematic diagrams described above, a fifth type of logical schematic diagram termed the "designated logical combination signal" diagram is employed in FIGS. 107, 121, 138, 158, 183, and 187. Designated logical combination signals are generated within logical chains. Such signals are, therefore, the output signals of a first logical chain and are employed as input signals to one or more additional logical chains. These signals are not usually employed directly as input signals to flip-flops, one-shots, inverters, or clock pulse drivers. For example, the C*lu* signal (FIG. 107) is employed to increase the numeric value of the L-register contents. The C*lu* signal is the output signal of a logical chain, which receives input signals from the C63, C51, T*b*8, Tz, U*s*, T*b*7, and T*d* flip-flops. The C*lu* signal is applied as an input signal to a plurality of logical chains whose output signals are applied to logic input terminals of L-register flip-flops.

In the logical circuits illustrated by the following types of logical schematic diagrams, the logical functions of Conjunction are implemented by AND-gates and the logical functions of Inclusive-Or are implemented by OR-gates:

*a.* One-shot input diagrams
*b.* Inverter signal diagrams
*c.* Clock pulse driver gating signal diagrams
*d.* Designated logical combination signal diagrams
*e.* Flip-flop input diagrams for logical circuits applying signals to input logic terminals of flip-flops.

In the logical circuits illustrated by flip-flop input diagrams for logical circuits applying signals to register transfer input terminals of flip-flops, the logical functions of Conjunction are implemented by register transfers and the logical functions of Inclusive-Or are implemented by plural input connections, as described in the preceding "Register Transfer" section.

The following example demonstrates the significance of the logical schematic diagram and its employment to illustrate the interconnection of flip-flops, one-shots, inverters, clock pulse drivers, switches and push buttons by AND-gates, OR-gates, and register transfers. It particularly illustrates that this notation, couched in terms of signal designations in associative and combinatorial arrangements, completely defines the block and schematic circuit element arrangements, once these basic building blocks have been determined, as has been done in FIGS. 3–11.

FIGURE 13 is a block diagram of the circuits providing the five input signals of the L11 flip-flop. This figure is the block diagram equivalent of the logical schematic diagrams which provide the L11 input signals of FIG. 79 and the *Cld* and *Clu* signals of FIG. 107.

The *Cld* signal is the output signal of AND-gate 251 (FIG. 13). AND-gate 251 receives the T*d* output signal of the T*d* flip-flop, the T*b*7 output signal of the T*b*7 flip-flop, and the $\overline{Us}$ output signal of the U*s* flip-flop. The output signal of AND-gate 251 is represented by:

$$Cld = Tb7\ Td\ \overline{Us}$$

where T*b*7 T*d* $\overline{Us}$ represents the logical operation of Conjunction on the three input signals applied to AND-gate 251, and is also a direct representation of the circuit generating *Cld*. Therefore, the logical schematic diagram T*b*7 T*d* $\overline{Us}$ may also be employed to illustrate the logical circuit which generates the *Cld* signal.

The *Clu* signal is generated by the logical circuit comprising AND-gates 252 and 253 and OR-gate 254. AND-gate 252 receives the U*s* output signal of the U*s* flip-flop, the T*b*7 output signal of the T*b*7 flip-flop and the T*d* output signal of the T*d* flip-flop. The output signal of AND-gate 252 is represented by $$Tb7\ Td\ Us$$

AND-gate 253 receives the C63 output signal of the C63 flip-flop, the $\overline{C51}$ signal of the C51 flip-flop, the T*b*8 signal of the T*b*8 flip-flop, the T*z* signal of the T*z* flip-flop, and the U*s* signal of the U*s* flip-flop. The output signal of AND-gate 253 is represented by $$C63\ \overline{C51}\ Tb8\ Tz\ Us$$

The output signals of AND-gates 252 and 253 are applied to OR-gate 254. The output signal of OR-gate 254 is represented by $$Clu = Tb7\ Td\ Us + C63\ \overline{C51}\ Tb8\ Tz\ Us$$

Therefore, the above logical schematic diagram also illustrates the logical circuit which generates the *Clu* signal.

The clock pulse signal received by the L11 flip-flop is provided by the continuously operating clock pulse driver B17. Clock pulse driver B17 receives input trigger signals synchronized by the master clock pulse driver illustrated in FIG. 17.

The logic input signal *L11 is generated by the logical circuit comprising OR-gate 257, AND-gate 258, AND-gate 259, and OR-gate 260. OR-gate 257 receives the L12 output signal of the L12 flip-flop and the L13 output signal of the L13 flip-flop. The output signal of OR-gate 257 is represented by $$L13 + L12$$

AND-gate 258 receives the $\overline{L11}$ output signal of the L11 flip-flop, the output signal of OR-gate 257, and the *Cld* output signal of AND-gate 251. The output signal of AND-gate 258 is represented by $$Cld\ \overline{L11}\ (L13 + L12)$$

AND-gate 259 receives the $\overline{L13}$ output signal of the L13 flip-flop, the *Clu* output signal of OR-gate 254, and the $\overline{L11}$ output signal of the L11 flip-flop. The output signal of AND-gate 259 is represented by $$Clu\ \overline{L13}\ \overline{L11}$$

OR-gate 260 receives the output signals of AND-gate 258 and AND-gate 259. The output signal of OR-gate 260, which is the *L11 input signal to the L11 flip-flop, is represented by $$*L11 = Clu\ \overline{L13}\ \overline{L11} + Cld\ \overline{L11}\ (L13 + L12)$$

Therefore, the above logical schematic diagram also illustrates the logical circuit which generates tne *L11 signal.

In a similar manner the logical schematic diagram $$*\overline{L11} = (Clu + Cld) L11$$

illustrates the logical circuit which generates the $*\overline{L11}$ signal.

The register transfer input signals #L11 and $\#\overline{L11}$ are received by the L11 flip-flop from two of the eight register transfers of register transfer circuit 265. Input signals to the register transfer circuit 265 are provided by the eight output signals of the L24, L23, L22, and L21 flip-flops. The SL clock pulse driver, when gated on, supplies clock pulses to register transfer circuit 265. The SL clock pulse driver is gated on by the signal Gate-SL, which is a signal generated by the logic circuit illustrated in the corresponding logical schematic diagram of FIG. 108. The signals #L11 and $\#\overline{L11}$ are represented respectively by:

$$\#L11 = SL\ L21$$
$$\#\overline{L11} = \overline{SL}\ \overline{L21}$$

Therefore, the above two logical schematic diagrams also illustrate the register transfer logical circuits which generate the #L11 and $\#\overline{L11}$ signals.

The preceding example demonstrates how the logical schematic diagrams of FIGS. 48–187 provide simple, compact, and readily analyzed and related illustrations of the circuit structures of the components and of the circuit interconnection configurations between components. This has been done by using signal designations in associations and combinations serving not only to identify the signal relationships, but also to define the circuit elements and their circuit relationships.

*Central Processor*

The Central Processor exercises operational control over the Data Processing System. The Central Processor responds to a plurality of distinct instructions, which are supplied thereto in the sequential order necessary to perform a particular data processing function. The data which is processed in the Central Processor is primarily supplied thereto from the Memory. This data is usually transferred into and out of the Memory under control of the Central Processor.

The Central Processor comprises registers for temporarily storing data, register transfer and logic circuits for transferring data through and between registers, clock pulse drivers for controlling the timing of the Central Processor, counters, an Arithmetic Unit, and flip-flops and one-shots employed as control signal sources. FIGURE 14 illustrates symbolically the elements of the Central Processor which store data, the paths of data transfer between these elements, and certain control elements. The Central Processor comprises the following registers: the A*r*-register 268, the A*w*-register 269, the B-register 270, the J-register 271, the I-register 272, the L-register 273, the N-register 274, and the R-register 275. The Arithmetic Unit 276 is adapted to perform the operation of addition or subtraction on a pair of words received thereby.

The details of the circuit structure of the Central Processor are provided in FIG. 17, which illustrates the clock circuit, FIGS. 48–105, which are the flip-flop input logical schematic diagrams of Central Processor flip-flops employed in registers, in counters, as control signal sources, and in the Arithmetic Unit; FIG. 106, which is a one-shot input logical schematic diagram; FIG. 107, which is a designated logical combination signal diagram; FIG. 108, which is a clock pulse driver gating signal diagram; and FIG. 109, which is an inverter signal diagram.

As described in the preceding section "Data Processing System—Details," the instruction word which directs the system operation is stored in the 6-digit I-register, which comprises the 2-digit C-register for storing the command portion of the instruction word and the 4-digit A-register for storing the address portion of the instruction word. The preceding section "Data Processing Operations" described the command portion of the instruction word as having any one of 52 bit configurations, each configuration directing a fundamentally different data processing operation of the system. These operations were described generally in this preceding section, but are also described in detail in a following section "Instructions." In the "Instructions" section, and in the sections immediately following thereafter, there is provided a detailed description of the operation of the Central Processor in performing each of its possible functions.

The logical schematic diagrams of the I-register are given by FIGS. 48–51, 64, and 65. The contents of the C-register may be shifted-down upon application of the SC clock signal to register transfers connecting the digit positions of the C-register. The SC signal also gates the contents of the C5 flip-flops to the A4 flip-flops. The contents of the A-register are shifted-down upon application of the SA clock signal to register transfers connecting the digit positions of the A-register. The contents of the A1 flip-flops are transferred to the C6 flip-flops upon application of the SAC clock signal to the register transfers which connect the output terminals of the A1 flip-flops to corresponding input terminals of the C6 flip-flops. Therefore, the entire contents of the I-register are ring shifted-down by the simultaneous issuance of the clock signals SAC, SC, and SA.

The I-register is adapted to receive, by parallel shift, the contents of the corresponding 6 least significant digit positions of the J-register upon application of the XJI clock signal to the register transfers which connect the output terminals of the J6–J1 flip-flops to corresponding input terminals of the I-register flip-flops.

The A-register flip-flops are adapted to receive, by parallel shift, the contents of the corresponding flip-flops of the A*r*-register upon application of the XA*r*A clock signal to register transfers which connect the output terminals of the A*r* flip-flops to corresponding input terminals of the A flip-flops. The A-register flip-flops are adapted to receive, by parallel shift, the contents of the corresponding flip-flops of the A*w*-register upon application of the XA*w*A clock signal to register transfers which connect the output terminals of the A*w* flip-flops to corresponding input terminals of the A flip-flops. The A-register flip-flops are adapted to receive, by parallel shift, the contents of the corresponding M-register flip-flops of the Memory upon application of the XMA clock signal to register transfers which connect the output terminals of the M flip-flops to corresponding input terminals of the A flip-flops. In this instance only the 1-output signals of the M4, M3, and M2 flip-flops are applied to the corresponding A-register flip-flops; however, both the 1 and 0-output signals of the M1 flip-flops are applied to the corresponding A1 flip-flops.

The A11, A12, and A13 flip-flops are adapted to receive the contents of the corresponding Write Buffer W*bk*1, W*bk*2, and W*bk*3 flip-flops upon application of the XA*t*A clock signal to register transfers which connect the output terminals of the W*bk* flip-flops to corresponding input terminals of the A11, A12, and A13 flip-flops. When the XA*t*A signal transfers the W*bk*-counter contents to the A11, A12, and A13 flip-flops, a binary 0 is transferred to A14. The A4 flip-flops are adapted to receive the output signals delivered by the corresponding Arithmetic Unit V output AND-gates and their respective inverters upon application of the SVA logical combination signal to logical gates which connect the Arithmetic Unit to the A-register.

The contents of the A-register may be transmitted to the Memory Controls 242 (FIG. 12) to indicate the memory location of the data word to be received from or stored in the Core Memory. The contents of the A-register may also be transmitted to the N, A*r*, and A*w*-registers. The 0-output signals of the A1 flip-flops may be transmitted to the Sorter Control Unit (FIG. 43) to store in the S*ou* flip-flops thereof the Sorter pocket code necessary to direct the storage of a document in a designated pocket. The contents of the A1 flip-flops are also adapted to be transmitted to the V*a* input AND-gates of the Arithmetic Unit.

The C6 flip-flops are adapted to receive the contents of the corresponding P1 flip-flops of the P-register (FIGS. 12 and 14) upon application of the SPC clock signal to register transfers which connect the output terminals of the P1 flip-flops to corresponding input terminals of the C6 flip-flops.

The N-register is a 4-digit register adapted to store a memory address, which is usually the address of the next instruction to be received from Memory by the Central Processor. The logical schematic diagrams of the N-register are given by FIGS. 80–83. The N-register contents are ring shifted-down upon application of the SN clock signal to register transfers which connect the digit positions of the N-register. The N-register flip-flops are adapted to receive, by parallel shift, the contents of the corresponding A-register flip-flops upon application of the XAN clock signal to register transfers which connect the output terminals of the A flip-flops to corresponding input terminals of the N flip-flops. The contents of the N-register may be transmitted to the A-register. The contents of the N1 flip-flops may be transmitted to the B4 flip-flops of the B-register.

The B-register is adapted to store 4 digits which represent a memory address, and is primarily employed to modify the address stored in the A-register. The logical schematic diagrams of the B-register are given by FIGS. 60–63. The B-register contents are shifted-down upon application of the SB clock signal to register transfers which connect the digit positions of the B-register. In addition, the contents of the B1 flip-flops are transferred to the corresponding B4 flip-flops upon application of the SBB clock signal to register transfers which connect the output terminals of the B1 flip-flops to corresponding input terminals of the B4 flip-flops. Therefore, the entire contents of the B-register are ring shifted-down by the simultaneous issuance of the clock signals SBB and SB.

The B4 flip-flops are adapted to receive the contents of the corresponding N1 flip-flops of the N-register upon application of the SNB clock signal to register transfers which connect the output terminals of the N1 flip-flops to corresponding input terminals of the B4 flip-flops. The B4 flip-flops are adapted to receive the contents of the corresponding R1 flip-flops of the R-register upon application of the SRXB clock signal to register transfers which connect the output terminals of the R1 flip-flops to corresponding input terminals of the B4 flip-flops. The B4 flip-flops are also adapted to receive the output signals delivered by the corresponding Arithmetic Unit V output AND-gates and their respective inverters upon application of the SVB logical combination signal to logical gates which connect the Arithmetic Unit to the B-register.

The contents of the B1 flip-flops may be transmitted to the R7 flip-flops of the R-register and to the V*b* input AND-gates of the Arithmetic Unit.

The 7-digit J-register is the primary input register for the Central Processor. The logical schematic diagrams of the J-register are given by FIGS. 66–72. The contents of the J-register are ring shifted-down upon application of the SJ clock signal to register transfers which connect the digit positions of the J-register. The J-register flip-flops are adapted to receive, by parallel shift, the contents of the corresponding Memory M-register flip-flops upon application of the XMJ clock signal to register transfers which connect the output terminals of the M flip-flops to corresponding input terminals of the J flip-flops. The J7–J2 flip-flops, however, receive only the 1-output signals of the corresponding M-register flip-flops. The J1 flip-flops, however, receive both of the 1-output signals and the 0-output signals of the corresponding M1 flip-flops.

The XZJ clock signal clears the J7–J2 flip-flops of the J-register and transfers the contents of the J2 flip-flops to the corresponding J1 flip-flops through register transfers which connect the output terminals of the J2 flip-flops to corresponding input terminals of the J1 flip-flops. The contents of the J6–J1 flip-flops may be transferred by parallel shift to the corresponding flip-flops of the I-register. The contents of the J1 flip-flops may be transferred to the L7 flip-flops of the L-register, to the R7 flip-flops of the R-register, and to the V*a* input AND-gates of the Arithmetic Unit. The contents of the J1 flip-flops may also be transmitted to the J-Mod-generator 277.

The J-Mod-generator 277 comprises the J*mg*2 and J*mg*1 flip-flops (FIG. 99) and their corresponding input logical circuits. The J-Mod-generator is adapted to accumulate the modulo-3 of the words applied thereto, and its operation is described, for example, in the sections "Initial Routine During Instruction," "Instruction 21," and "Instruction 26."

The 14-bit A*r*-register is adapted to store a memory address, and is primarily employed during Read Buffer operations wherein data is transferred from magnetic tape or Character Reader to Memory. The logical schematic diagrams of the A*r*-register are given by FIGS. 52–55. The A*r*-register flip-flops are adapted to receive, by parallel shift, the contents of the corresponding A-register flip-flops upon application of the XA*r*A clock signal to register transfers which connect the output terminals of the A flip-flops to corresponding input terminals of the A*r* flip-flops. The contents of the A*r*-register may be transmitted to the A-register.

The 14-bit A*w*-register is adapted to store a memory address, and is primarily employed during Write Buffer operations wherein data is transferred from Memory to magnetic tape or the Printer. The logical schematic diagrams of the A*w*-register are given by FIGS. 56–59. The A*w*-register flip-flops are adapted to receive, by parallel shift, the contents of the corresponding A-register flip-flops upon application of the XAA*w* clock signal to register transfers which connect the output terminals of the A flip-flops to corresponding input terminals of the A*w* flip-flops. The contents of the A*w*-register may be transmitted to the A-register.

The 7-digit R-register is the primary register employed for storing the operands and the results of various operations performed by the Central Processor on single numeric and alphanumeric words. The logical schematic diagrams of the R-register are given by FIGS. 84–90. The contents of the R6–R1 flip-flops of the R-register are shifted-down upon application of the SR clock signal to register transfers which connect the R6–R1 digit positions of the R-register. The contents of the R1 flip-flops are transferred to the corresponding R7 flip-flops upon application of the SRR*m* logical combination signal to logical gates which connect the output terminals of the R1 flip-flops to corresponding input terminals of the R7 flip-flops. The contents of the R7 flip-flops are transferred to the corresponding R6 flip-flops upon application of the SR76 clock signal to register transfers which connect the output terminals of the R7 flip-flops to corresponding input terminals of the R6 flip-flops. Therefore, the entire contents of the R-register are ring shifted-down by the simultaneous issuance of the SRR*m*, SR76, and SR signals. The contents of the R1 flip-flops are also adapted to be transferred to the corresponding R6 flip-flops upon application of the SR16 clock signal to register transfers which connect the output terminals of the R1 flip-flops to corresponding input terminals of the R6 flip-flops. Therefore, the numeric contents of the R-register are ring shifted-down by the simultaneous issuance of the SR16 and SR clock signals.

The R7 flip-flops are adapted to receive the contents of the corresponding J1 flip-flops of the J-register upon application of the SJR*m* logical combination signal to logical gates which connect the output terminals of the J1 flip-flops to corresponding input terminals of the R7 flip-flops. The R72 and R71 flip-flops are adapted to receive the contents of the corresponding J*mg*2 and J*mg*1 flip-flops of the J-Mod-generator upon application of the SJ*mg*R logical combination signal to logical gates which connect the output terminals of the J-Mod-generator flip-flops to corresponding input terminals of the R7 flip-flops. The R74 and R73 flip-flops are adapted to receive the contents of the corresponding J14 and J13 flip-flops upon application of the SJ*mg*R logical combination signal to logical gates which connect the output terminals of the J14 and J13 flip-flops to corresponding input terminals of the R74 and R73 flip-flops. The R7 flip-flops are adapted to receive the contents of the corresponding B1 flip-flops of the B-register upon application of the SRXB clock signal to register transfers which connect the output terminals of the B1 flip-flops to corresponding input terminals of the R7 flip-flops. The R7 flip-flops are also adapted to receive the contents of the corresponding L1 flip-flops of the L-register upon application of the SLR7 clock signal to register transfers which connect the output terminals of the L1 flip-flops to corresponding input terminals of the R7 flip-flops. The R7 flip-flops are adapted to receive the contents of the corresponding P1 flip-flops of the P-register upon application of the SPR7 clock signal to register transfers which connect the output terminals of the P1 flip-flops to corresponding input terminals of the R7 flip-flops. The R7 flip-flops are adapted to receive the output signals delivered by the corresponding Arithmetic Unit V output AND-gates and their respective inverters upon application of the SVR7 logical combination signal to logical gates which connect the Arithmetic Unit to the R-register. The R72 and R71 flip-flops are adapted to receive the contents of the corresponding V*mg*2 and V*mg*1 flip-flops of the Arithmetic Unit V-Mod-generator upon application of the SV*mg*R logical combination signal to logical gates which connect the output terminals of the V-Mod-generator flip-flops to corresponding input terminals of the R7 flip-flops. Additionally, the R6 flip-flops are adapted to receive the contents of the corresponding L1 flip-flops of the L-register upon application of the SLR6 clock signal to register transfers which connect the output terminals of the L1 flip-flops to corresponding input terminals of the R6 flip-flops.

The contents of the R-register may be transmitted by parallel shift to the M-register. In this parallel shift only the 1-output signals of the R flip-flops are applied to the corresponding M flip-flops. The contents of the R1 flip-flops may be transmitted to the L7 or L6 flip-flops of the L-register, to the V*b* input AND-gates of the Arithmetic Unit, and to the B4 flip-flops of the B-register.

The 7-digit L-register is most often employed for storing the most significant half of a double-precision word. When the MSH of a double-precision word is stored in the L-register, the MSH of the word is stored in the R-register. The combination of the L and R-registers for storing and processing double-precision words is identified as the FULL-register. The logical schematic diagrams of the L-register are given by FIGS. 73–79. The contents of the L6–L1 flip-flops are shifted-down upon application of the SL clock signal to register transfers which connect the L6–L1 digit positions of the L-register. The contents of the L1 flip-flops are transferred to the corresponding L7 flip-flops upon application of the SLL7 clock signal to register transfers which connect the output terminals of the L1 flip-flops to corresponding input terminals of the L7 flip-flops. The contents of the L7 flip-flops are transferred to the corresponding L6 flip-flops upon application of the SL76 clock signal to register transfers which connect the output terminals of the L7 flip-flops to corresponding input terminals of the L6 flip-flops. Therefore, the entire contents of the L-register are ring shifted-down by the simultaneous issuance of the SLL7, SL76, and SL clock signals. The contents of the L14 and L13 flip-flops are transferred to the corresponding L74 and L73 flip-flops upon application of the SLL*s* logical combination signal to logical gates which connect the output terminals of the L14 and L13 flip-flops to corresponding input terminals of the L74 and L73 flip-flops.

The L74 and L73 flip-flops are adapted to receive the contents of the corresponding J14 and J13 flip-flops upon application of the SJL*s* logical combination signal to logical gates which connect the output terminals of the J14 and J13 flip-flops to corresponding input terminals of the L74 and L73 flip-flops. The L72 and L71 flip-flops are adapted to receive the contents of the corresponding J12 and J11 flip-flops upon application of the SJL*m* logical combination signal to logical gates which connect the output terminals of the J12 and J11 flip-flops to corresponding input terminals of the L72 and L71 flip-flops. The L72 and L71 flip-flops are also adapted to receive the contents of the corresponding J*mg*2 and J*mg*1 flip-flops of the J-Mod-generator upon application of the SJ*mg*L logical combination signal to logical gates which connect the output terminals of the J*mg*2 and J*mg*1 flip-flops to corresponding input terminals of the L72 and L71 flip-flops.

The L7 flip-flops are adapted to receive the contents of the corresponding R1 flip-flops upon application of the SRL7 clock signal to register transfers which connect the output terminals of the R1 flip-flops to corresponding input terminals of the L7 flip-flops. Therefore, the entire contents of FULL are ring shifted-down by the simultaneous issuance of the SL76, SL, SLR7, SR76, SR, and SRL7 clock signals. The L6 flip-flops are adapted to receive the contents of the corresponding R1 flip-flops upon application of the SRL6 clock signal to register transfers which connect the output terminals of the R1 flip-flops to corresponding input terminals of the L6 flip-flops.

The L7 flip-flops are also adapted to receive the output signals delivered by the corresponding Arithmetic Unit V output AND-gates and their respective inverters upon application of the SVL7 logical combination signal to logical gates which connect the Arithmetic Unit to the L-register. The L72 and L71 flip-flops are adapted to receive the contents of the corresponding V*mg*2 and V*mg*1 flip-flops of the Arithmetic Unit V-Mod-generator upon application of the SV*mg*L logical combination signal to logical gates which connect output terminals of the V-Mod-generator flip-flops to corresponding input terminals of the L7 flip-flops.

The contents of the L1 flip-flops may be transmitted to the R7 or R6 flip-flops of the R-register.

A T-counter 278, which comprises the T*p*, T*q*, and T*s* flip-flops (FIG. 91), and which repetitively counts through 8 discrete states, is the basic source for timing and control of the operations executed by the Central Processor. A W-counter 279, which comprises the W3, W2, and W1 flip-flops (FIG. 103), is employed primarily for counting the number of register digit positions through which data is shifted in certain operations, but has additional control functions which are described in the various instructions wherein the W-counter is employed.

Other Central Processor flip-flops are employed primarily to perform control functions. The A*i*, A*mm*, A*npd*, and A*te* flip-flops (FIG. 105) function as alarms to notify the Central Processor when a particular malfunction or other unusual incident has occurred. The A*tm* flip-flop (FIG. 104) is set when the contents of the Memory M-register must be increased by 2. The B*b* flip-flop (FIG. 95) is set to direct a B-Subroutine, wherein the contents of the B-register are added to the address in the A-register. The B*lk* flip-flop (FIG. 104) controls the transfer of blockettes of data from Memory to the Multiplex Buffer following execution of an Instruction 68. The C*fd* flip-flop (FIG. 104) controls the feeding of documents by the Sorter. The D1, D2, and D3 flip-flops (FIG. 100) are decision flip-flops, each adapted to set when a respective event occurs. The D*t* flip-flop (FIG. 100) is set when a programmed instruction is not executed because a necessary system component is busy or is not prepared. The H*st* flip-flop (FIG. 101) functions during an instruction-interrupt operation of the Multiplex Buffer. The H*t*1 and H*t*2 flip-flops (FIG. 102) function to halt the operation of the Data Processing System. The J*c* flip-flop (FIG. 103) controls the type of data comparison executed during comparison operations. The J*m*20 flip-flop (FIG. 101), when on, directs a blockette variation of the Write Buffer operation then being executed.

The J*mg*1 and J*mg*2 flip-flops (FIG. 99) accumulate the modulo-3 of a data word applied to the J-Mod-generator. The J*na* flip-flop (FIG. 104) is employed during branch and jump instructions to prevent the transfer of the next-instruction address to the A-register. The J*r* and J*w* flip-flops (FIG. 101) direct respective Multiplex Buffer read and write operations. The M3*g* flip-flop (FIG. 95), when set, directs that an operation be executed to generate mod-bits for a designated data word. The M*sc*1 and M*sc*2 flip-flops (FIG. 102) are employed when starting from the halt mode to insure that only a single cycle of the specified operation takes place. The T1, T*a*, T*a*3, T*a*8, T*b*, T*b*1, T*b*7, T*b*8, T*d*, T*i*, T*v*, T*y*, and T*z* flip-flops (FIGS. 92–95) are part of the timing circuit of the Central Processor and aid in controlling the sequence of execution of operations.

In addition to the control flip-flops above-described, the Y*b*1 and Y*b*2 one-shots control the duration of certain audible indications that are demanded by the Central Processor.

TIMING CIRCUIT

The timing circuit of the Central Processor controls the sequential execution of the steps in the operations performed by the system. Forty-eight different clock periods (FIG. 15) are defined by the timing circuit. Each clock period exists for approximately 4 μsec. and is terminated by a clock pulse. Although the execution of each instruction commences at *t*1 of the timing sequence, all of the clock periods do not occur for most of the instructions. Furthermore, the clock periods do not always occur in sequence. For example, during some instructions, certain groups of clock periods of the timing sequence are executed repetitively until a designated event occurs. Generally, when the signal E*nd* issues, the timing sequence returns to *t*1 and a new instruction commences.

The timing circuit comprises the T*p*, T*q*, T*s*, T1, T*a*, T*a*3, T*a*8, T*b*, T*b*1, T*b*7, T*b*8, T*d*, T*i*, T*v*, T*y*, and T*z* flip-flops and their associated logical circuits. In addition, the timing circuit comprises the logical circuit which generates the T*a*2 designated logical combination signal. The logical schematic diagrams of the timing circuit flip-flops are shown in FIGS. 91–95, and the logical schematic diagram of the circuit for generating T*a*2 is shown in FIG. 107.

The 48 clock periods of the timing sequence are defined by the 48 different states of the combination comprising the T*p*, T*q*, T*s*, T*a*, T*b*, T*d*, T*y*, and T*z* flip-flops. The T1, T*a*3, T*a*8, T*b*1, T*b*7, T*b*8, T*i*, and T*v* flip-flops and the T*a*2 signal are on during certain of the 48 states. For example, the T1 flip-flop is on during the first clock period of each instruction, whereas the T*b*1 flip-flop is in the 1-state whenever the logical combination $\overline{Tp}\ \overline{Tq}$ $Ts\ \overline{Ta}\ Tb$ exists. The $Ta2$ signal issues whenever $\overline{Tp}\ Tq\ \overline{Ts}\ Ta$ exists.

The fundamental unit of the timing circuit is the T-counter. The T-counter is a three stage binary counter which, in effect, counts the 250 kc. clock signals delivered by the gated clock pulse driver, CDA13. The T-counter, which repetitively counts through 8 discrete states, comprises the $Tp$, $Tq$, and $Ts$ flip-flops, and their associated logical circuits. The logical schematic diagrams of the T-counter are shown in FIG. 91. The block diagram of FIG. 16 is another representation of the circuit illustrated by the logical schematic diagrams of FIG. 91. The AND-gates and OR-gates of the logical schematic diagrams of FIG. 91 are shown as blocks in FIG. 16. For example, the 1-logic input signal to the $Tp$ flip-flop $$*Tp=\overline{Tp}\ Tq\ Ts+Zm$$

is provided by the logic chain comprising the AND-gate 297 and the OR-gate 298. The method of employing the emitter followers of FIG. 8 is illustrated in FIG. 16 (i.e., emitter followers 299 and 300).

The $Ts$ flip-flop represents the lowest order bit of the T-counter and changes its state for every clock pulse received thereby. The $Tq$ flip-flop represents the 2-bit order of the counter. The $Tp$ flip-flop is the highest order flip-flop of the T-counter. The T-counter normally counts from 001 ($\overline{Tp}\ \overline{Tq}\ Ts$), as shown in FIG. 15, to 111, returns to the 000 state and continues to count repetitively through its eight clock periods. The eight clock periods of the T-counter from the 001 state to the 000 state are termed a "T-cycle" and are 32 μsec. in duration.

In addition to receiving the CDA13 clock signals, the T-counter receives the $\overline{Bb}$ signal, the $Zm$ signal, and the $Kcc$ signal. The T-counter may be halted, and the Central Processor assumes the halt mode. When halted, the T-counter ceases counting with the $Tp$, $Tq$, $Ts$ flip-flops in the 011 state (see Instruction 53). This halting of the T-counter is accomplished by gating off the CDA13 clock signals when both of the halt flip-flops $Ht1$ and $Ht2$ are in the 1-state. The $\overline{Bb}$ signal represents a binary 0 during a B-Subroutine and alters the normal sequence of the T-counter (see the succeeding section "B-Subroutine") by forcing the T-counter to the 3-state from the 7-state. The $Zm$ signal, when in the 1-state, also affects the sequence of the T-counter during an Instruction 42 (see the section "Instruction 42") by forcing the T-counter to return to the 7-state from the 0-state. The $Kcc$ signal provides initial conditions throughout the Central Processor and sets the T-counter to the 011-state. The $Kcc$ signal issues upon depression of certain buttons on the Control Console.

Six different T-cycles of the T-counter are defined to provide the 48 different clock periods of the timing sequence. The six different T-cycles are distinguished by the state of the combination comprising the $Ta$, $Tb$, $Td$, $Ty$, and $Tz$ flip-flops, as shown in FIG. 15. Thus, the eight clock periods designated $t1$–$t8$ occur during the T-cycle when $Ta=1$. The $t9$–$t16$ clock periods occur during the T-cycle when $Tb\ \overline{Td}\ \overline{Ty}\ \overline{Tz}$. The $t17$–$t24$ clock periods occur during the T-cycle when $Tb\ \overline{Td}\ Ty\ \overline{Tz}$. The $t25$–$t32$ clock periods occur during the T-cycle when $Tb\ \overline{Td}\ \overline{Ty}\ Tz$. The $t33$–$t40$ clock periods occur during the T-cycle when $Tb\ \overline{Td}\ Ty\ Tz$. The $t41$–$t48$ clock periods occur during the T-cycle when $Tb\ Td\ Ty\ \overline{Tz}$.

The $Tv$ flip-flop (FIG. 94) is set only during instructions in the 90 group. In these instructions the contents of a register are shifted therein through a predetermined number of digit positions. The $Tv$ flip-flop enables the necessary shift signals to issue for a predetermined duration during these instructions.

The $Ti$ flip-flop (FIG. 95) is in the 1-state during the fourth clock period of certain T-cycles, and thereby notifies the system that the Memory will not be needed either (*a*) during the remaining clock periods of the particular instruction or operation being executed, or (*b*) during the next eight clock periods of the instruction or operation. This notification by $Ti$ permits the Memory to transfer the next-instruction word to the M-register, or to transmit a word to or to receive a word from the Multiplex Buffer. The issuance of the $Ti$ signal is not illustrated in FIG. 15, since the clock period when $Ti$ issues depends upon the particular instruction being executed.

The states that the timing circuit occupies during the execution of each instruction are shown in the timing diagram accompanying the description of the instruction. The shortest instructions are executed during the clock periods $t1$–$t8$. Many instructions, however, continue beyond $t8$ and comprise various combinations of the five remaining T-cycles or portions of these T-cycles.

CLOCK CIRCUIT

The clock circuit of the Central Processor, shown in FIG. 17, provides clock pulse signals for application to flip-flops and register transfers to control respectively the entry of data into flip-flops and the transfer of data between flip-flops. The clock pulse drivers of the Central Processor clock circuit may be gated to provide single clock pulses or clock pulses at the 250 kc. rate, or may be operated continuously. A detailed description of the clock pulse driver is given in a preceding section entitled "Clock Pulse Driver." When gated on, the clock pulse driver generates a clock pulse for each trigger signal received, but when gated off, no clock pulses are generated. The logical schematic diagrams of the logical circuits providing gating signals for the clock pulse drivers of FIG. 17 are illustrated in FIG. 108. This clock circuit also provides clock pulses to control the triggering of one-shots.

The Central Processor clock circuit comprises a clock pulse generator 301, which has been previously described and is shown in FIG. 2. The clock pulse generator supplies trigger signals at a 250 kc. repetition rate for the clock pulse drivers. Continuous clock pulse driver 302 responds to the output signals of clock pulse generator 301 to provide continuous clock pulses at the 250 kc. rate. The output signals of clock pulse driver 302 are applied as trigger signals to the CDA clock pulse driver 303, the CDB clock pulse driver 304, and the CDC clock pulse driver 305. The CDA, CDB, and CDC clock pulse drivers operate continuously and deliver clock pulses at the 250 kc. rate. Additionally, clock pulse driver 302 delivers clock pulses on a lead 306 for driving the clock pulse drivers of the Multiplex Buffer, the Tape Control Unit, and the P-Buffer.

The clock pulses delivered by the CDA clock pulse driver are applied to the input terminals of the CDA11, CDA12, CDA13, CDA14, SAC, SC, SPC, and XJI clock pulse drivers. All clock pulse drivers driven by the CDA clock pulse driver are gated clock pulse drivers, with the exception of the continuous clock pulse driver CDA12. The output clock pulses of the CDA11, CDA12, CDA13, and CDA14 clock pulse drivers are applied to the clock pulse input terminals of Central Processor flip-flops. For example, the output clock pulses of the CDA11 clock pulse driver are applied to the clock pulse input terminals of the D1, D2, and D3 flip-flops. Since the logical schematic diagram illustrating the circuit for gating the CDA11 clock pulse driver is (FIG. 108)

$$\text{Gate-}CDA11=\overline{Ht1}+\overline{Ht2}$$

the CDA11 clock pulse driver supplies clock pulses continuously at the 250 kc. rate, except when the Central Processor is in the halt mode; i.e., when both the $Ht1$ and $Ht2$ flip-flops are set.

The SAC, SC, SPC, and XJI clock pulse drivers supply clock pulses to the clock pulse input terminals of register transfers. For example, the SC clock pulse driver supplies clock pulses to the register transfers which connect the output terminals of the C6 flip-flops to the corresponding register transfer input terminals of the C5 flip-flops. When the SC clock pulse driver is gated on, in accordance with the corresponding logical schematic diagram of FIG. 108; i.e., $$\text{Gate-}SC=Pi+Ppi$$

the contents of the C6 flip-flops are transmitted to the corresponding C5 flip-flops. The related register transfer circuits are illustrated by the logical schematic diagrams for the C51 flip-flops (FIG. 65); as follows:

$$\#C5(i)=SC\,C6(i)$$

$$\#\overline{C5(i)}=SC\,\overline{C6(i)}$$

The clock pulses delivered by the CDB clock pulse driver are applied to the input terminals of the B17, B27, B28, SA, SL, SL76, SLL7, SN, SRL6, SRL7, XAA*w*, XAN, XA*r*A, XA*w*A, and XNA clock pulse drivers. All clock pulse drivers driven by the CDB clock pulse driver are gated clock pulse drivers, with the exception of the continuous clock pulse drivers B17 and B27. The output clock pulses of the B17, B27, and B28 clock pulse drivers are applied to the clock pulse input terminals of Central Processor flip-flops. The output clock pulses of the SA, SL, SL76, SLL7, SN, SRL6, SRL7, XAA*w*, XAN, XA*r*A, XA*w*A, and XNA clock pulse drivers are applied to the clock pulse input terminals of Central Processor register transfers.

The clock pulses delivered by the CDC clock pulse driver are applied to the input terminals of the SB, SBB, SJ, SPR7, SNB, SR, SR16, SR76, SLR6, SLR7, SRXB, XA*t*A, XMA, XMJ, and XZJ clock pulse drivers. All clock pulse drivers driven by the CDC clock pulse driver are gated clock pulse drivers, and supply clock pulses for Central Processor register transfers.

J-MOD-GENERATOR

The J-Mod-generator 277 (FIG. 14) comprises the J*mg*2 and J*mg*1 flip-flops (FIG. 99) and their corresponding input logic circuits. The primary function of the J-Mod-generator is to accumulate the modulo-3 of a data word, as the digits of the word are sampled in serial order, LSD first. The accumulated modulo-3 is then employed to generate the mod-bits for the sampled data word, or to check the total modulo-3 of the sampled word.

In accumulating the modulo-3 of a word, the J*mg*2 and J*mg*1 flip-flops respond to their present contents and to the J*mgd* and J*mgu* logical combination signals (FIG. 107). The J*mgd* signal represents a binary 1 whenever the digit sampled by the J-Mod-generator has a modulo-3 of 2 (−1). Thus, the digits 2, 5, and 8 cause issuance of the J*mgd* signal. Additionally, the numerical significance of the ($) and (*) digits cause issuance of the J*mgd* signal. The J*mgu* signal represents a binary 1 whenever the digit sampled by the J-Mod-generator has a modulo-3 of 1 (−2). Thus, the numeric digits 1, 4, and 7, and the non-numeric digits (&) and (.) cause issuance of the J*mgu* signal.

Therefore, whenever the J*mgd* signal issues to indicate the sampling by the J-Mod-generator of a digit having a modulo-3 of −1, the number stored in J*mg*2, 1 is decreased by 1. Similarly, when the J*mgu* signal issues to indicate the sampling of a digit having a modulo-3 of 1, the contents of J*mg*2, 1 is increased by 1. If neither J*mgd* nor J*mgu* issues, the digit sampled has a modulo-3 of 0, and the contents of J*mg*1 and J*mg*2 remain unchanged.

The J*mgd* and J*mgu* signals issue in response to the M*j*1, M*j*2, M*j*3, and M*j*4 logical combination signals and their corresponding inverter signals $\overline{\text{IM}j1}$, $\overline{\text{IM}j2}$, $\overline{\text{IM}j3}$, and $\overline{\text{IM}j4}$. The M*j*(*i*) and $\overline{\text{IM}j(i)}$ signals represent the digit sampled by the J-Mod-generator. The logical schematic diagrams of the circuits generating the M*j*(*i*) signals are illustrated by FIG. 107; as follows:

$$Mj(i)=J1(i)\ \overline{M3g}+L1(i)\ M3g$$

The corresponding inverter signals are generated in circuits illustrated by the logical schematic diagrams of FIG. 109; for example, $$IMj(i)=Mj(i)$$

If the M3*g* flip-flop is off, the J*mg*2, 1 flip-flops accumulate the modulo-3 of the contents of the J-register. This occurs when a mod-check of the instruction or operand is made as it enters the Central Processor from Memory. If the M3*g* flip-flop is on, the J*mg*2, 1 flip-flops accumulate the modulo-3 of the contents of the L-register. This occurs during execution of an Instruction 26, wherein new mod-bits are generated for the contents of FULL.

The operation of the J-Mod-generator in accumulating the modulo-3 of an instruction word, an operand, or a data word in the L-register, is described in the respective sections "Initial Routine during Instruction," "Instruction 21," and "Instruction 26." In certain operations the J-Mod-generator is preset to prevent its triggering the A*mm* alarm flip-flop as, for example, when an alphanumeric operand enters the J-register. The functioning of the J-Mod-generator in these operations is set forth in the sections describing these operations.

ARITHMETIC UNIT

The Arithmetic Unit is adapted to perform the operation of addition or subtraction on a pair of data words received simultaneously from the J-register and the R-register or on data received simultaneously from the A-register and the B-register. FIGURE 18 illustrates symbolically the elements of the Arithmetic Unit which store data, the paths of data transfer into and out of these elements, and certain control elements. The Arithmetic Unit comprises the V*a* input gates 309; the V*b* input gates 310; the inverters 312, 313, etc.; the sum and carry bit generation logic circuit 315; the V*c*, V*s*1, V*s*2, V*s*3, V*sa*, and V*s*4 flip-flops; the sum digit encoding logic circuit 317; the V-mod-bit accumulation logic circuit 318; the V*mg*2 and V*mg*1 flip-flops; and the control signal sources, including the A*ac*, M*a*1, M*a*2, O*v*, U*s*, and Z*va* flip-flops. The details of the circuit structure of the Arithmetic Unit are provided in FIGS. 96–99, which are the flip-flop logical schematic diagrams of Arithmetic Unit flip-flops; FIG. 107, which is a designated logical combination signal diagram; and FIG. 109, which is an inverter signal diagram.

The details of the operation of the Arithmetic Unit are provided in the descriptions of the various arithmetic instructions which employ the Arithmetic Unit, such as in the sections entitled "Instruction 72," "Instruction 73," "Instruction 82," "Instruction 83," "Instruction 87," "Instruction 88," "Instruction 27," "Instruction 28," and "B-Subroutine."

When the V*a* input gates sample the contents of the J1 flip-flops and the V*b* input gates sample the contents of the R1 flip-flops, the Arithmetic Unit adds to or subtracts from the contents of the R-register, the contents of the J-register, digit-by-digit. The state of the U*s* flip-flop determines the type of operation to be performed by the Arithmetic Unit. If $Us=0$, an additive operation is performed and the data word applied to the V*a* input gates is added to the word transmitted to the V*b* input gates. On the other hand, if $Us=1$, a subtractive operation is performed, and the magnitude of the numeric portion of the word applied to the V*a* input gates (i.e., |J|) is subtracted from the magnitude of the numeric portion of the word transmitted to the V*b* input gates (i.e., |R|). The subtractive operation is executed by causing the V*a* input gates to deliver the complement of the word applied thereto.

Five classes of output signals are supplied by the V*a* input gates, these output signals being represented by the logical combination signals Va4, Va3, Va2, and Va1. Most often, the Va1–4 signals represent the digit in J1. If $Us=1$ the Va4–1 signals represent the 9's complement of the digit in J1. If $Us=1$ and $Zva=1$, the Va4–1 signals represent the digit 9. If $Us=0$ and $Zva=1$, the Va4–1 signals represent the digit 0. If the Bb flip-flop is set, the Va4–1 signals represent the digit in the A1 flip-flops of the A-register. The Zva flip-flop, when on, normally directs that 0's be supplied by the Va input gates. However, when the Us flip-flop is also on, the complement of these 0's; i.e., 9's, are supplied by the Va input gates.

Three classes of output signals are supplied by the Vb input gates, these output signals being represented by logical combination signals Vb4, 3, 2, and 1. Most often, the Vb4–1 signals represent the digit in R1. However during a B-subroutine and during execution of Instruction 27, the Vb4–1 signals represent the digit in B1. If $Tz=1$, the Vb4–1 signals represent the 9's complement of the digit in R1. This latter class of output signal is necessary following an arithmetic operation wherein a number has been subtracted from a smaller number, so that the result in R must be complemented; i.e., see the description of Instruction 72.

The Va4, Va3, Va2, and Va1 signals are applied to the respective IVa4, IVa3, IVa2, and IVa1 inverters 312, 313, etc. The Vb4, Vb3, Vb2, and Vb1 signals are applied to the respective IVb4, IVb3, IVb2, and IVb1 inverters. The output signals of the IVa4–IVa1 and IVb4–IVb1 inverters are applied to the sum and carry bit generation logic circuit 315. Logic circuit 315 adds the two digits represented respectively by the output signals of the IVa4–IVa1 and IVb4–IVb1 inverters and the carry bit stored in Vc and provides the output signals *Vs1, *$\overline{Vs1}$, *Vs2, *$\overline{Vs2}$, *Vs3, *$\overline{Vs3}$, *Vsa, *$\overline{Vsa}$, *Vs4, and *$\overline{Vs4}$, which represent the sum digit, and the signals *Vc and *$\overline{Vc}$, which represent the next carry bit. The output signals of logic circuit 315 set or reset the corresponding flip-flops Vs1, Vs2, Vs3, Vsa, Vs4 and Vc each clock period in accordance with the sum digits and carry bits produced by logic circuit 315.

The following table "Input Signal Combinations Which Set Vs(i) Flip-flops" illustrates how circuit 315 combines the Va4–1, Vb4–1, and Vc signals to set the Vs flip-flops to their respective 1-states.

INPUT SIGNAL COMBINATIONS WHICH SET Vs(i) FLIP-FLOPS

| Vs(i) | (Value) | Va4 | Vb4 | Va3 | Vb3 | Va2 | Vb2 | Va1 | Vb1 | Vc |
|---|---|---|---|---|---|---|---|---|---|---|
| Vs1 | 1 | | | | | | | 0 | 1 | 0 |
| | | | | | | | | 1 | 0 | 0 |
| | | | | | | | | 1 | 1 | 1 |
| | | | | | | | | 0 | 0 | 1 |
| Vs2 | 2 | | | | | 1 | 0 | | | |
| | | | | | | 0 | 1 | | | |
| | | | | 1 | 1 | | | | | |
| Vsa | 2 | | | | | | | 1 | 1 | |
| | | | | | | | | 1 | | 1 |
| | | | | | | | | | 1 | 1 |
| | | | | 1 | 1 | | | | | |
| Vs3 | 4 | | | | | 1 | 1 | | | |
| | | | | 1 | | | | | | |
| | | | | | 1 | | | | | |
| Vs4 | 5 | 1 | 0 | | | | | | | |
| | | 0 | 1 | | | | | | | |

The total of the values represented by the five Vs flip-flops is the sum digit resulting from addition of the three digits represented by the Va, Vb, and Vc signals. If at least one of the combinations illustrated in the table for a given Vs flip-flop does not appear in any clock period, the corresponding Vs flip-flop is set to its 0-state. The Vs4 flip-flop, which represents the quantity 5, is dependent on only the 5-bits of the two input digits, and is set to its 1-state if any one, but not both, of the 5-bit positions of Va4–1 and Vb4–1 is 1. Thus, the Vs4 flip-flop is not set to the 1-state even though combinations of the Va3–1, Vb3–1, and Vc signals provide a sum between the values of 5 and 9. The Vs1 flip-flop, which represents the value 1, is dependent only on the 1-bits of the two input digits, and on the state of the carry flip-flop, Vc. Thus, Vs1 is set to the 1-state if any one or all three of the Va1, Vb1, and Vc signals represent 1. Vs1 is unaffected by any of the higher order signals Va4, Vb4, Va3, Vb3, Va2, and Vb2. Thus, the signal combination illustrated by the above table provides for a simplified logical structure wherein each Vs flip-flop must respond to but simple logical combinations of only a few of the input signals to logic circuit 315.

At the same time that the Vs flip-flops are set or reset in accordance with the sum of each pair of received digits, the Vc flip-flop is set or reset in accordance with whether a carry should be held over for the next succeeding digit pair.

In providing the sum digit in the Vs flip-flops and the carry bit, the non-numeric digits are weighted according to their respective bit values. For example, the dollar sign ($) adds as a 5, the comma (,) adds as a 6, the ampersand (&) adds as a 7, the period (.) adds as a 0, and the (*) adds as a 1.

The total value represented by the five bits stored in the Vs flip-flops is encoded into the four bit 5, 4, 2, 1 digit code of the Central Processor by the sum digit encoding logic circuit 317. Logic circuit 317 comprises the circuits for generating the V4, V3, V2, and V1 signals and is illustrated by the logical schematic diagrams for the V4–V1 signals of FIG. 107. The V4, V3, V2, and V1 signals represent respectively the values 5, 4, 2, and 1. The following table "V Output Signals of Arithmetic Unit" illustrates the various configurations which the V4–V1 signals take in response to the possible combinations of the Vs flip-flops.

V OUTPUT SIGNALS OF ARITHMETIC UNIT

| | Vs4 | Vs3 | Vsa | Vs2 | Vs1 |
|---|---|---|---|---|---|
| V4 | 1 | 0 | | 0 | |
| | 1 | 0 | | | 0 |
| | 1 | 0 | 0 | | |
| | 1 | | 0 | 0 | 0 |
| | 0 | 1 | | 1 | |
| | 0 | 1 | | | 1 |
| | 0 | 1 | 1 | | |
| | 0 | | 1 | 1 | 1 |
| V3 | | 0 | 1 | 1 | 0 |
| | | 1 | 0 | 0 | 0 |
| | | 1 | 1 | 1 | 1 |
| V2 | | 0 | 0 | 1 | |
| | | | 1 | 0 | 1 |
| | | 0 | 1 | 0 | |
| | | 1 | 1 | 1 | 0 |
| | | | 0 | 1 | 1 |
| V1 | | 0 | | 0 | 1 |
| | | 0 | 0 | | 1 |
| | | 1 | | 1 | 0 |
| | | 1 | 1 | | 0 |

Consider the following example: the signals Va4–Va1 represent the digit 9 and the signals Vb4–Vb1 represent the digit 8. The carry flip-flop is in its 0-state. Under these circumstances the Vs flip-flops will be set to the $\overline{Vs4}$ Vs3 $\overline{Vsa}$ Vs2 Vs1 configuration. For this combination the V4 and V2 signals issue to represent the digit 7. The carry flip-flop Vc will be set to the 1-state.

The Vc flip-flop generates the carry bit of the two digits being added by logic circuit 315, providing also for the previous state of the Vc flip-flop, when enabled by the Vct signal. The Vct signal is generated during those instructions where an arithmetic operation is to be performed.

The alarm flip-flop, Aac, is set to the 1-state if:

(a) The Arithmetic Unit output digits (from V-output gates) are non-numeric, except if $M3g=1$, during which time mod-bits are generated for the R contents and the Arithmetic Unit output digits are not employed;

(*b*) Any input digit to the Arithmetic Unit is non-numeric during execution of an operation when the Arithmetic Unit is actually performing an arithmetic operation, and its output signals are being used, except that non-numerics to the V*a* input gates do not set the A*ac* flip-flop during the "Hash-Add" variation of Instruction 82;

(*c*) There is a non-numeric input digit to the V*a* input gates during execution of Instruction 28, wherein the contents of the designated memory location are transmitted through the Arithmetic Unit to the B-register; and (*d*) The mod-comparator signal M*c* issues during an arithmetic operation to indicate that the mod-comparison has failed (see description of Instruction 72).

When the A*ac* flip-flop sets, it causes the Central Processor to halt following completion of the current instruction.

Logic circuit 315 is also adapted to add together two non-numeric digits or to add a numeric and a non-numeric digit, in accordance with the numerical equivalent of the non-numeric digits. However, the resulting sum digit stored in the V*s* flip-flops always represents a quantity from 0–9. Therefore, only numeric digits are supplied by the V4–V1 output signals of the Arithmetic Unit during an arithmetic operation. Consequently, when the A*ac* flip-flop is prevented from setting during the Hash-Add variation of Instruction 82, non-numeric double-precision words from Memory may be added to numeric double-precision words in FULL and numeric words are delivered by the Arithmetic Unit.

The overflow flip-flop, O*v*, is employed primarily in arithmetic operations and indicates that the sum or difference of the two numbers applied to the Arithmetic Unit is too great to be placed in the prescribed number of digit positions. The O*v* flip-flop also sets during Instruction 43 if the quotient will be too large for the allotted storage space.

The V*mg*2 and V*mg*1 flip-flops (FIG. 99) and their corresponding input logic circuits, as represented by logic circuit 318 of FIG. 18, comprises the V-Mod-generator shown in FIG. 14. The primary function of the V-Mod-generator is to accumulate the modulo-3 of the six-digit output number delivered by the Arithmetic Unit. The accumulated modulo-3 is then employed to generate the mod-bits for this output word and to check the correctness of the operation performed by the Arithmetic Unit.

In accumulating the modulo-3 of the output digits of the Arithmetic Unit, the V*mg*2 and V*mg*1 flip-flops respond to their present contents and to the V*mgd* and V*mgu* logical combination signals (FIG. 107). The V*mgd* and V*mgu* signals issue in response to the V4, V3, V2, and V1 signals and their corresponding inverter signals $\overline{IV1}$, $\overline{IV2}$, $\overline{IV3}$, and $\overline{IV4}$ (FIG. 109). The V*mgd* signal represents a binary 1 whenever the digit applied to logic circuit 318 has a modulo-3 of 2 (−1). The V*mgu* signal represents a binary 1 whenever the digit applied to logic circuit 318 has a modulo-3 of 1 (−2). The V-Mod-generator is also adapted to respond to non-numeric digits, inasmuch as the V4–V1 signals represent the contents of R14–R11 during a mod-bit generation operation; i.e., Instruction 25.

Therefore, whenever the V*mgd* signal issues to indicate the application to the V-Mod-generator of a digit having a modulo-3 of −1, the number stored in V*mg*2, 1, is decreased by 1. Similarly, when the V*mgu* signal issues to indicate the receipt of a digit having a modulo-3 of 1, the contents of the V*mg*2, 1 is increased by 1. If neither V*mgd* nor V*mgu* issues, the digit applied to logic circuit 318 has a modulo-3 of 0, and the contents of V*mg*2, 1 remain unchanged.

The operation of the V-Mod-generator in accumulating the modulo-3 of a data word is described in the sections "Instruction 25" and "Instruction 72."

The mod-adder flip-flops M*a*2 and M*a*1 (FIG. 98) provide the sum of the mod-bits of the two words added or subtracted by the Arithmetic Unit, for comparison with the contents of V*mg*2, 1, in order to provide a test of the correctness of the result. The M*a*2, 1 flip-flops respond to the logical combination signals J*a*2, 1, and R*a*2, 1 (FIG. 107), as described in the "Modulo-3 Comparison" subsection of the Instruction 72 description.

*Control Console*

The Control Console provides an indicating and control station for the operator, whereby he has access to the system for modification of the sequence of execution of the instructions or for data revision. FIGURE 19 illustrates those portions of the Control Console which are related to this invention and includes the controls for enabling the operator to modify the sequence of execution of the instructions and the controls for starting or halting data processing in the system. The Control Console primarily directs the Central Processor, which, in turn, enables controlling the remainder of the Data Processing System. Not shown in FIG. 19 are indicators which may be employed to show the states of the various register, alarm, and control flip-flops of the system by indicating with illuminated lamps those of the flip-flops which are in their 1-states. Also not shown in FIG. 19 are a plurality of switches which may be employed to selectively apply voltages directly to the register transfer input terminals of system flip-flops in order to set or reset various flip-flops.

Two types of signals are delivered by the Control Console and may be termed respectively "logic level signals" and "preemptive signals." Logic level signals are intended to have the same effect as the 0 or 1-output signals of a flip-flop and, therefore, are at similar voltage levels. Thus, a logic level signal which represents a binary 1 merely enables a flip-flop, when it is applied to an input logic terminal thereof, and the flip-flop requires the further application of a clock pulse to be set or reset. For example, the output signal, K*bh*, of the BRANCH-HALT switch is coupled through a logical circuit to the 1-input logic terminal of the H*t*1 flip-flop of FIG. 102; as follows:

$$*Ht1=(\overline{C62}\ C61\ \overline{C54}\ Ta3)(\overline{C53}\ \overline{C52}\ \overline{C51})\ Kbh$$

If the BRANCH-HALT switch is in its off position, the K*bh* signal is at the −7.5 v. level, and the above expression for the *H*t*1 signal cannot represent a binary 1 during the course of data processing. However, if the BRANCH-HALT switch is in its on position, the K*bh* signal is at the +6 v. level, and enables the above expression for *H*t*1. When so enabled, the *H*t*1 signal represents a binary 1 at *t*3 of Instruction 60 and the H*t*1 flip-flop sets to the 1-state upon receipt of the next clock pulse from the CDA12 clock pulse driver.

Preemptive signals in their 1-states set or reset flip-flops directly. For example, the CONTROL TYPEWRITER CLEAR switch directs the level of the preemptive K*pcc* signal. When the CONTROL TYPEWRITER CLEAR switch is in its on position, the K*pcc* signal is at the +12 v. level, and resets the M*c*1, M*c*2, and M*c*3 flip-flops (FIG. 129) by its application to the register transfer 0-input terminals thereof.

CLEAR CONTROLS

Selected components of the system, or the entire system, may be cleared by closing the appropriate clear button or clear switch. These buttons are usually closed with the system in the halt mode (see succeeding section "Operations From Halt Mode"). Accidental closure of any one of these buttons while the system is processing data by automatically executing instructions in sequence would cause errors, and would seriously interfere with the data processing operation. Therefore, a protective switch is provided, which must be unlocked, before these clear controls are effective. This protective switch is the KEY switch 325, which is normally locked in its open position when the system is processing data. When it is desired to enable one of the clear buttons, the KEY switch is unlocked. Unlocking KEY switch 325 (FIG. 19) causes actuation of a relay 326. When relay 326 is actuated, arms 327 and 328 thereof contact their upper terminals, causing the *Key* output signal, which in the locked state of the KEY switch represents a —7.5 v. binary 0, to represent a +6 v. binary 1. Simultaneously, the *Key*2 signal, which in the locked state of the KEY switch represents a binary 1, now represents a binary 0. Arm 328, which in the locked state of the KEY switch causes —7.5 v. to be applied to the upper terminals of clear buttons 329, 330, 331, 332, and 333, in the unlocked state of the KEY switch contacts its upper terminal and applies +12 v. to the upper terminals of the clear buttons 329–333. Thus, each of buttons 329–333 is enabled, and when the movable arm thereof contacts the respective upper terminal, the output signal delivered thereby will represent a +12 v. binary 1.

With the KEY switch unlocked the clear buttons are effective; as follows: the TOTAL CLEAR button 329, when in its upper position, causes the *Ktcc* signal to issue, which clears the entire data processing system, including the Central Processor, P-Buffer, Multiplex Buffer, and Tape Control Unit; the COMPUTER CLEAR button 330, when in its upper position, causes the *Kccc* signal to issue which clears the Central Processor; the CONTROL TYPEWRITER CLEAR button 331, when in its upper position, causes the *Kpcc* signal to issue, which clears the P-Buffer; the EXTERNAL CLEAR button, when in its upper position, causes the *Kec* signal to issue, which clears the Multiplex Buffer and Tape Control Unit; and, the ALERT RESET button, when in its upper position, causes the *Kra* signal to issue, which clears all alarm and sub-alarm flip-flops in the system.

STARTING CONTROLS

The COMPUTE button 335, the SINGLE-CYCLE button 336, and the RECYCLE button 337 will each cause the Central Processor to execute one or more instructions, starting from the halt mode.

Closure of the COMPUTE button by moving the arm thereof to contact the lower terminal, causes the *Kcb* signal, which is normally in the 1-state, to enter the 0-state, and causes the *Kbc* signal, which is normally in the 0-state, to enter the 1-state. This change of state of the *Kcb* and *Kbc* signals is effective to reset the halt flip-flops, *Ht*1 and *Ht*2, and to place the system in the normal data processing mode (see section "Starting System From Halt Mode").

Closure of the SINGLE-CYCLE button by moving the arm thereof to contact the lower terminal, causes the *Ksb* signal, which is normally in the 1-state, to enter the 0-state, and causes the *Kbc* signal to enter the 1-state. This change of state of the *Ksb* and *Kbc* signals is effective to cause the Central Processor to execute the instruction then in the I-register, and to halt immediately thereafter with the next sequential instruction in the I-register (see section "Single-Cycle").

Neither the COMPUTE button nor the SINGLE-CYCLE button is effective if the KEY switch is locked, inasmuch as the *Key* signal would be in the 0-state, and would prevent the *Kbc* signal from entering the 1-state.

Closure of the RECYCLE button by moving the arm thereof to contact the upper terminal, causes the *Kry*1 signal, which is normally in the 0-state, to enter the 1-state, and causes the *Kry*2 signal, which is normally in the 1-state, to enter the 0-state. This change of state of the *Kry*1 and *Kry*2 signals is effective to cause the Central Processor to repeatedly execute an instruction in the I-register (see section "Recycle"). The RECYCLE button is ineffective if the KEY switch is locked, inasmuch as the *Key*2 signal is in the 1-state, thereby preventing the *Kry*2 signal from entering the 0-state.

HALT CONTROLS

The HALT button 339, the BRANCH HALT button 340, the SELECTIVE HALT button 341, and the ADDRESS HALT button 342 will each enable the Central Processor to halt. HALT button 339, when closed by moving the arm thereof to contact the lower terminal, causes the *Khb* signal, which is normally in the 0-state, to enter the 1-state. When the *Khb* signal enters its 1-state, it sets the *Ht*1 flip-flop and initiates a halt sequence, as described in a succeeding section "Manual Halt." The halt sequence can only be initiated by the HALT switch if the KEY switch is unlocked, thereupon transferring the *Key* signal to the 1-state. If the KEY switch is not unlocked, the —7.5 v. *Key* signal clamps the *Khb* signal in the 0-state regardless of the condition of the HALT button.

Closure of the BRANCH HALT switch by moving the arm thereof to contact the upper terminal, causes the *Kbh* signal to enter the 1-state. When the *Kbh* signal is in the 1-state the Central Processor will halt if an Instruction 60 is executed (see description of Instruction 60).

Closure of the SELECTIVE HALT switch by moving the arm thereof to contact the upper terminal, causes the *Ksh* signal to enter the 1-state. When the *Ksh* signal is in the 1-state, the Central Processor will halt if an instruction bearing a breakpoint bit is executed (see section "Selective Halt").

Closure of the ADDRESS HALT switch by moving the arm thereof to contact the upper terminal causes the *Ah* signal to enter the 1-state. When the *Ah* signal is in the 1-state the Central Processor will halt if an instruction word bearing the address to which the ADDRESS HALT SELECTOR switches 344 are set enters the A-register (see section "Address Halt").

If the arm of the ALARM HALT OVERRIDE switch 345 is moved to contact the lower terminal, the *Kho*2 signal, which is normally in the 1-state, enters the 0-state, and the *Kho*1 signal enters the 1-state. When the *Kho*2 signal is in the 0-state the Central Processor will continue its normal instruction sequence without halting, although an alarm flip-flop sets (see section "Alarm Halt"). The ALARM HALT OVERRIDE switch is ineffective if the KEY switch is locked, inasmuch as the *Key*2 signal is in the 1-state, thereby preventing the *Kho*2 signal from entering the 0-state.

SEQUENTIAL MEMORY LOCATION OPERATION CONTROLS

With the system in the halt mode four different operations, each involving sequential memory locations, are initiated by closing the respective CONTROL TYPEWRITER LOAD switch 350, the PHOTOREADER LOAD switch 351, the MEMORY DUMP switch 352, and the RECYCLE MANUAL switch 353. Each of these switches is effective only if the KEY switch 325 is unlocked. Details of the operation initiated by each of these four switches is provided in the section "Manually-Controlled Operations Involving Sequential Memory Locations." The CONTROL TYPEWRITER LOAD switch, when closed to its ON position, causes the Memory to receive data words from the Control Typewriter and to place them in sequential memory locations. The PHOTOREADER LOAD switch, when closed to its ON position, causes the Memory to receive data words from the Photoreader and to place them in sequential memory locations. When the MEMORY DUMP switch is in its ON position, the Memory transmits words from sequential memory locations to the Control Typewriter. When the RECYCLE MANUAL switch is in its ON position, the instruction in the I-register is repeatedly executed and the address portion thereof is increased by 1 following each execution.

MISCELLANEOUS SWITCHES

Six DECISION switches 365, 366, 367, 368, 369, and 370 are provided for interrogation by the Central Processor. When a DECISION switch is closed, the corresponding output signal thereof, *Kds(i)*, is in the 1-state. If the closed DECISION switch is then interrogated by an Instruction 54, the D3 flip-flop will set. Thus, the manual closing of a particular DECISION switch enables the program to branch in a predetermined direction.

If the arm of the ALPHANUMERIC STORE switch 371 is moved to contact the upper terminal, the +6 v. *Kam* signal which results causes additional characters to function as putaway signals in the P-Buffer operation described in the section "Control Typewriter or Photoreader Input to P-Register; Alphanumeric Word."

The INHIBIT TYPE-OUT switch 372, when in the ON position, causes the signal *Knt*1 to be in the 0-state and the signal *Knt*2 to be in the 1-state. These two signals then function to prevent the P-register from being emptied by an Instruction 29, as described in the P-Buffer Operation section "Control Typewriter Output From P-Register; Single Numeric or First Half Double-Precision Word."

*Memory*

The Memory stores operand words which are to be processed, data words which have resulted from processing, and instruction words to direct data processing.

The Memory comprises a storage element, a buffer register for transferring words into and out of the storage element of the Memory, appropriate addressing circuits for locating words in the storage element, control circuits, etc. FIGURE 20 illustrates symbolically the elements of the Memory, the paths of data transfer between these elements, and the paths of control signals. The details of the circuit structure of the Memory are provided in FIGS. 23, 24, 25, 26, 28, and 110–121.

The storage element of the Memory of FIG. 20 is the coincident-current magnetic core type, which is well known in the art. The structure and operation of such a memory element is described, for example, in the publication by C. V. L. Smith, "Electronic Digital Computers," chapter 12, McGraw-Hill Book Co., Inc., New York, 1959. Core Memory 401 is the storage element of the Memory of FIG. 20. The Core Memory is adapted to store 4,000 data words of 28 bits each, each bit being stored in a corresponding magnetic core. The Core Memory comprises 28 planes, each plane having 4,000 magnetic cores. Each plane stores the corresponding bit for the 4,000 words. A core plane comprises a matrix of magnetic cores arranged in 50 rows and 80 columns. The location of a magnetic core in a matrix row and column is the address of the core and is identified by a number. Corresponding cores in all 28 planes are identified by the same number and store the 28 bits of a data word. Therefore, Core Memory 401 contains 4,000 addressable locations (0000–3999) for storing 4,000 data words.

One of the 50 X-line switch cores 402 and one of the 80 Y-line switch cores 403 are excited to address the respective row and column in which data is to be stored into or read from the Core Memory. The M-register 404 temporarily stores the data word that is to be stored in the Core Memory, or temporarily stores the data word that is read from the Core Memory. Twenty-eight inhibit drivers 405, directed by the respective contents of the M-register flip-flops, control the storage of the 28 bits of a word in the addressed memory location. Twenty-eight core read amplifiers 406, when enabled by the *St* signal, read out the 28 bits from the addressed memory location and store the data word in the M-register. M-register input gates 407 direct the storage in the M-register of the data word read from the Core Memory or of an input data word from the P-register, the R*b*-register, or the R-register. The contents of the M-register may be transferred to the Central Processor or to the Write Buffer of the Multiplex Buffer.

A 2 adder 408 adds the number 2 to the contents of the two least significant digits of the word in the M-register as it is transferred to the Core Memory, if the signal *Atm* is delivered by the Central Processor. A mod-bit adder 409 corrects the mod-bits of the word transferred from the M-register to the Core Memory when the *Atm* signal is present.

An AM-register 410 stores the address of the Core Memory location wherein data is to be stored or from which data is to be read. The AM-register receives a new address from the AM input gates 411 upon application of the M*ca* signal of the Central Processor to the AM input gates. The contents of the AM-register control one of 5 switch core drivers 412 and one of 10 address drivers 413, which, in turn, excite one of the 50 X-line switch cores 402. The AM-register also controls one of 8 switch core drivers 414 and one of 10 address drivers 415, which, in turn, excite one of the 80 Y-line switch cores 403.

Control circuit 416 directs the timing sequence of the Memory for reading data from the Core Memory to other components and for storing data in the Core Memory from other components.

CORE MEMORY

The Core Memory 401 comprises 112,000 magnetic cores, each adapted to store one bit of information. These magnetic cores, FIG. 21, are characterized by substantially rectangular hysteresis loops, FIG. 22, being composed of materials such as silicon steels and certain ferrites; i.e., see the aforementioned C. V. L. Smith reference, section 4–14. Such magnetic cores are characterized by very low coercive forces and high remanent magnetism.

In the core hysteresis loop of FIG. 22 the abscissae represents current, or magnetizing force, with positive current to the right. The ordinate represents the magnetic field induced in the core. If a magnetizing force provided by a positive current greater than $I_m$ is impressed upon the core, the core will saturate in a direction denoted as positive magnetic saturation. After removal of the saturating current, the core will retain the +B*r* residual magnetic field. A core so magnetized is said to be in the 1-state. After a core is magnetized to saturation in the negative direction by a negative current greater in magnitude than $I_m$, and the magnetizing force is removed, the core will retain a magnetic field of −B*r*, which is designated as the 0-state of magnetism in the core.

Assume, first, that the core is in the 0-state, and that a positive current $I_1$ is applied thereto as a magnetizing force. This current is not sufficient to transfer the magnetic field of the core beyond the negative knee of the hysteresis loop, so that when the current $I_1$ is removed, the magnetic field in the core will remain at the −B*r* value and the core will remain in the 0-state. Assume, now, that a current equal to $2\times I_1$ is applied as a magnetizing force to the core, where $2I_1>I_m$. This constitutes a positive saturating current for the core, and it will saturate in the positive direction, so that when the magnetizing force is removed, the core will remain in the 1-state. Therefore, by simultaneous application of two currents, each equal to $I_1$, and each alone incapable of changing the state of the core, but which together are greater than $I_m$, the core is transferred from the 0-state to the 1-state. Similarly, if the core is in the 1-state, the simultaneous application of two currents, each equal to $-I_1$, will transfer the core to the 0-state.

Four one-turn windings thread each core: the X-line winding 426, the Y-line winding 427, the read out winding 428, and the inhibit winding 429. When energized, the X-line winding and the Y-line winding each carry a current having a magnitude equal to $I_1$. Therefore, if both the X-line winding and the Y-line winding of a given core are energized with currents providing aiding magnetizing forces, the core receives a saturating magnetizing field and will change state if it is not already in the state directed by this field. The read out winding responds to changes in state of the core to detect the bit value that is stored therein. The inhibit winding, when energized, prevents the transfer of the core from one state to another, by providing a magnetizing force opposing that produced by the X and Y-line windings.

Four thousand cores arranged in a 50 x 80 matrix comprise each memory plane. The cores in a memory plane store the corresponding bit of the 4,000 data words stored in the Memory. Each of 50 X-line windings threads serially 80 cores and each of 80 Y-line windings threads serially 50 cores. Therefore, there are 4,000 different combinations comprising one X-line winding and one Y-line winding, each combination constituting an address. The address of the data word to be stored in or to be read from the Memory designates the combination of X and Y-line windings which is to be energized. All 28 bits of the data word have the same address in the 28 corresponding memory planes. Therefore, it is only the 28 cores having the selected combination of X and Y-lines which are adapted to have their states transferred, since only these cores are capable of receiving a magnetizing force of $|2I_1|$. Thus, for a given address, the corresponding X-line windings and the corresponding Y-line windings in all 28 memory planes are energized.

A data word is stored at the designated memory address by transferring all 28 cores at that address to the 1-state except those which are prevented by a current in their inhibit windings. Each of the 28 inhibit windings threads serially all cores of a corresponding memory plane. Each memory plane that is to have a 0-bit stored in the addressed location is provided with an inhibit current that is equal in magnitude, but opposite in polarity, to the current in the selected X-line winding. Therefore, the addressed core in the inhibited plane only receives a magnetizing force corresponding to one winding current; i.e., $I_1$. Thus, when a word is stored in Memory, all addressed cores are transferred to the 1-state except those which are prevented therefrom by currents through the corresponding inhibit windings.

A single read out winding threads serially all the cores of a given memory plane. Each of the 28 read out windings senses the bit stored at the addressed location of the corresponding memory plane. During read out of data from the selected memory address, currents of $-I_1$ are provided in the selected X and Y-line windings and transfer all cores at the selected address, which were in the 1-state, to the 0-state. The resulting changes in magnetic field direction are sensed by the corresponding read out windings. The 1's sensed by the read out windings are amplified by the corresponding core read amplifiers and are transferred to the corresponding flip-flops of the M-register.

Thus, the Core Memory is adapted to store a data word in each of 4,000 addressable word locations. A data word is stored in an addressed word location by transferring the 28 cores at that location to the 1-state, except those cores which are to store 0-bits. A data word is read out of an addressed memory location by transferring those cores at that location to the 0-state, which were not already in the 0-state, and by sensing each core which had its magnetic field so transferred.

DATA STORAGE

The word to be stored in the addressed memory location is held temporarily in the 28 flip-flops of the M-register (FIGS. 114–120). The 1-output terminal of each flip-flop of the M-register is connected either directly, or through a logical circuit, to the logic input terminal 432 of a corresponding inhibit driver (FIG. 23). These connections of the M-register flip-flop output terminals to the corresponding inhibit driver logic input terminals is shown in the logical schematic diagrams of FIG. 121. In FIG. 121, an inhibit driver is represented by the notation HD(*ij*). For example, the diagram

HD62: M62 illustrates the direct connection of the 1-output terminal of the M62 flip-flop to the logic input terminal of the HD62 inhibit driver. The M3, M4, M5, and M6, M*d* and M*s* flip-flops have their 1-output terminals connected directly to the logic input terminals 432 of a corresponding inhibit driver.

The 1-output terminals of the M1 and M2 flip-flops are connected through logic circuits (designated as the 2 adder 408) to the logic input terminals of the corresponding inhibit drivers, because if the A*tm* signal is in its 1-state, the quantity 2 must be added to the two least significant digits of a word transferred from the M-register to the Core Memory. The logical schematic diagrams of FIG. 121 illustrate the logical circuits provided between the M1 and M2 flip-flops and the corresponding inhibit drivers for adding the number 2 to the two least significant digits transferred from the M-register to the inhibit drivers when the signal A*tm* is present. Any overflow occurring when so adding 2 to the two least significant digits of the word transferred to the Core Memory is suppressed. For example, if the three least significant digit positions of the M-register store the number 499, and the signal A*tm* is present when these M-register contents are transferred to the Core Memory, the number stored in the Core Memory in these two digit positions will be 401. A logical combination signal M*of* is generated by the 2 adder when the overflow occurs to notify the Central Processor and to modify the operation of the mod-bit adder 409. The logical schematic diagram for generating the M*of* signal is illustrated in FIG. 121. Thus, the signal M*of* is generated if the digit contents of the M2 and M1 flip-flops are either 99 or 98, and the A*tm* signal is present when the word in the M-register is transferred to the Core Memory. If the A*tm* signal is not present, the contents of the M2 and M1 flip-flops are transferred directly to the corresponding inhibit drivers, and thus to the Core Memory.

The logic circuits (mod-bit adder 409) connecting the 1-output terminals of the M*m*2 and M*m*1 flip-flops to the logic input terminals of the corresponding inhibit drivers HD*m*2 and HD*m*1 alter the mod-bits if the A*tm* signal is present as the word in the M-register is transferred to the Core Memory, and to further alter these mod-bits if the overflow signal occurs. The number in the M-register, which would be transferred to the Core Memory without alteration if the signal A*tm* did not occur, has the mod-bit configuration required to make the modulo-3 of the entire 28 bits of the word equal to +1. If the A*tm* signal occurs, the modulo-3 of the two least significant digits of the word in the M-register is increased by 2, and, therefore, the mod-bits of the word transferred to the Core Memory must be decreased by 2. The alteration of the mod-bits in such a transfer is shown in the table below.

MOD-BIT ALTERATION IF A*tm* SIGNAL PRESENT

| M register word | | | Word to inhibit drivers | | |
|---|---|---|---|---|---|
| M*m*2 | M*m*1 | Modulo-3 of 26 bits | Modulo-3 of 26 bits | HD*m*2 | HD*m*1 |
| 0 | 0 | 1 | 0 | 0 | 1 |
| 0 | 1 | 0 | 2 | 1 | 0 |
| 1 | 0 | 2 | 1 | 0 | 0 |

For example, if the mod-bits of the data word in the M-register are both 0, the modulo-3 thereof is +1. Therefore, when 2 is added to this data word, the modulo-3 of the data word, less the mod-bits, becomes 0, whereupon the new mod-bits must be 0, 1.

If the overflow signal occurs, however, indicating that a value of 100 has been dropped, the modulo-3 of 100 (which is +1) must be deducted from the modulo-3 alteration in the word. Thus, if the signal *Atm* and *Mof* both occur, the modulo-3 of the bits of the word, less the mod-bits, is only increased by 1, and, therefore, the mod-bits must be decreased by 1. This is illustrated in the table following.

MOD-BIT ALTERATION IF *Atm* AND *Mof* BOTH OCCUR

| M-register word | | | Word to inhibit drivers | | |
|---|---|---|---|---|---|
| *Mm*2 | *Mm*1 | Modulo-3 of 26 bits | Modulo-3 of 26 bits | HD*m*2 | HD*m*1 |
| 0 | 0 | 1 | 2 | 1 | 0 |
| 0 | 1 | 0 | 1 | 0 | 0 |
| 1 | 0 | 2 | 0 | 0 | 1 |

If the *Atm* signal does not occur, the contents of the *Mm*2 and *Mm*1 flip-flops are transferred directly to the corresponding inhibit drivers.

A second input terminal 433 of the inhibit drivers is coupled to receive the gate-inhibit signal provided by the control circuit 416. This is a −5 v. signal, representing a binary 0, and is delivered when the word in the M-register is to be transferred to the Core Memory. Only when the gate-inhibit signal and the logic input signal both represent binary 0's, does the inhibit driver provide an output signal. Thus, the inhibit driver functions to inhibit the change of state of the corresponding core if the corresponding bit to be written is a 0. Normally, the input transistor 434 and the output transistor 436 of the inhibit driver of FIG. 23 are biased to be non-conductive. Upon the simultaneous occurrence of a −5 v. logic input signal and a −5 v. gate-inhibit signal, transistor 134 commences conducting and thereby enables the conduction of output transistor 136. Transistor 136, when conducting, provides the inhibit current through the inhibit winding of the corresponding core. If a core is to store a 1, no output current is delivered by its corresponding inhibit driver.

CORE MEMORY ADDRESSING: STORE AND READ OUT

When the data word is stored in the addressed Core Memory location, the addressed core in each of the 28 planes is automatically set to the 1-state, unless the corresponding inhibit driver provides a current through the inhibit winding thereof. When the data word is read out from the addressed Core Memory location, the addressed core in each plane is transferred to the 0-state, if it is not already in that state. The setting to the 1-state of the addressed cores during the store operation and the resetting to the 0-state of the addressed cores during the read out operation is effected by the 50 X-line switch cores 402 and the 80 Y-line switch cores 403. Each X-line switch core is adapted to energize the corresponding X-line winding (FIG. 21) in all 28 memory planes. Correspondingly, each Y-line switch core is adapted to energize the corresponding Y-line winding in all 28 memory planes. Thus, a particular X-line switch core and a Y-line switch core combination identifies 28 magnetic cores, one in each memory plane, through which the corresponding X-line and Y-line windings pass. The 4,000 possible combinations of X-line and Y-line switch core pairs represent the 4,000 addresses at which data words can be stored in the Core Memory.

The 50 X-line switch cores 450, 451, 452, 453, 454, 455, etc. are illustrated in the memory addressing circuit of FIG. 24. The cores of FIG. 24 are arranged in an array of 5 rows and 10 columns. Five switch core drivers 457, 458, 459, 460, and 461 energize respectively the 5 rows of X-line switch cores. These 5 switch core drivers are designated respectively SCD0, SCD1, SCD2, SCD3, and SCD4. Switch core driver SCD0 is shown in detail in FIG. 24*a*. Ten address drivers 464–473 energize respectively the 10 columns of the X-line switch cores. These 10 address drivers are designated respectively as DRC0, DRC1, . . . , DRC9. Address driver DRC0 is shown in detail in FIG. 24.

When a particular switch core is addressed, the address driver and the switch core driver connected thereto are conducting. Thus, the output transistor amplifier 475 of an address driver conducts and delivers current at its output terminal 476 and one of the two output transistors 477 or 478 of a switch core driver conducts and receives current at the corresponding lead 479 or 480. The addressed address driver transmits a pulse of current from its output terminal 476 through one of the windings 482 or 483 of the one of the corresponding five X-line switch cores to which an addressed switch core driver is connected. A switch core functions as a transformer and couples the current pulse in the winding 482 or 483 thereof to an output winding 484 thereof. This output winding is connected directly to the 28 corresponding X-line windings of the Core Memory and delivers the half-current, $I_1$, thereto. Similarly, the output windings of the 80 Y-line switch cores provide the half-current, $I_1$, to the corresponding Y-lines of the Core Memory.

Windings 482 and 483 are wound in opposite directions on switch core 450 and thereby induce output pulses of opposite polarity in output winding 484. The one of transistors 477 or 478, of the triggered switch core driver which conducts determines the one of windings 482 or 483 which conducts to induce a current pulse in output winding 484, and thereby determines whether the corresponding Core Memory cores will be transferred to their 1-state or to their 0-state. If transistor 477 conducts current through winding 482, the corresponding Core Memory cores will be transferred to their 0-state, if they are not already in the 0-state. Therefore, transistor 477 enables the read out of data from the addressed memory location. If transistor 478 conducts current through winding 483, the corresponding Core Memory cores will be transferred to their 1-state, if they are not inhibited by current flowing through the corresponding inhibit winding. Therefore, transistor 478 enables the storing of data in the addressed memory location.

When the address driver (FIG. 24) is not addressed, the input transistor 488 thereof is back-biased and, therefore, non-conducting; transistor 489 is non-conducting; and transistor 490 is conducting. Therefore, output transistor 475 of the address driver is non-conducting when the address driver is not addressed. If all four of the AM-register input signals to the address driver are in the 0-state, the address driver is addressed. At this time the base electrode of transistor 488 drops to the −5 v. level, and transistor 488 commences conducting. The resulting −5 v. output signal from the emitter electrode of transistor 488 is coupled to the base electrodes of transistors 489 and 490, causing transistor 489 to become conductive and transistor 490 to become non-conductive. Current thereupon flows from ground, through transistor 475 and transistor 489 to the −7 v. source. Output terminal 476 is placed approximately at ground potential and transistor 475 is enabled to supply current to the addressed switch core driver. Therefore, the addressed address driver is continuously enabled to supply current at the output terminal thereof.

When the switch core driver (FIG. 24*a*) is not addressed, or does not have a "core reset" or "core set" signal applied thereto, the emitter electrodes of transistors 492 and 493 are at approximately the −5 v. level, thereby maintaining the respective transistors 494 and 495 in the non-conducting state. The switch core driver is addressed if all three input signals from the AM-register are in the 1-state. However, even though the switch core driver is addressed, causing the emitter electrode of transistor 496 to rise to the +5 v. level, transistors 492 and 493 remain non-conducting until the corresponding "core reset" and "core set" signals are transferred to the 1-state; i.e., the +6 v. level. The "core reset" or "core set" signals are delivered by control circuit 416 (FIG. 20) when a data word is to be respectively read from or stored in the Core Memory. Thus, when the +6 v. "core reset" signal is received on lead 497 of the addressed switch core driver, the emitter electrode of transistor 492 rises to approximately +6 v. and transistor 494 commences conducting through the primary winding of transformer 499. A voltage pulse is then coupled to the secondary winding of transformer 499, enabling transistor 477 to receive a pulse of current from output lead 479, thereby enabling the resetting to 1 of the 28 memory cores addressed. Similarly, when the +6 v. "core set" signal is received on lead 498 of the addressed switch core driver, the addressed memory cores in the non-inhibited memory planes are set to the 1-state.

The ten DRC0–DRC9 address drivers 413 are adapted to energize respectively the ten columns of the 50 X-line switch cores. The ten DRC10–DRC19 address drivers 415 are adapted to energize respectively the ten columns of the 80 Y-line switch cores. The DRC0–DRC9 address drivers are addressed by the least significant digit contents of the AM-register. The connections of the least significant digit flip-flops of the AM-register to the input terminals of the address drivers are illustrated in the logical schematic diagrams of FIG. 121. For example, the diagram DRC3: AM14 AM13 $\overline{\text{AM12}}$ $\overline{\text{AM11}}$ illustrates that the 1-output terminals of the AM14 and AM13 flip-flops and the 0-output terminals of the AM12 and AM11 flip-flops are coupled to the four input terminals of the DRC3 address driver. Because of the inverse input logic required to address the address driver, the DRC3 address driver will provide an output signal when the least significant digit in the AM-register is a 3.

Similarly, the second order digit in the AM-register addresses the DRC10–DRC19 address drivers. The connections of the AM2 flip-flops to the input terminals of the DRC10–DRC19 address drivers are also illustrated in FIG. 121.

The five SCD0–SCD4 switch core drivers 412 are adapted to energize respectively the five rows of the 50 X-line switch cores. The eight SCD5–SCD12 switch core drivers are adapted to energize respectively the eight rows of the 80 Y-line switch cores. The SCD0–SCD4 switch core drivers are addressed by the contents of the AM33, AM32, and AM31 flip-flops of the AM-register. The connections of these three flip-flops to the AM-input terminals of the switch core drivers are illustrated in FIG. 121. For example, the diagram SCD2: $\overline{\text{AM33}}$ AM32 $\overline{\text{AM31}}$ illustrates that the 0-output terminals of the AM33 and AM31 flip-flops and the 1-output terminal of the AM32 flip-flop are connected to respective input terminals of the SCD2 switch core driver. When the contents of AM33, AM32, and AM31 are 0, 1, 0, the SCD2 switch core driver is enabled.

Similarly, the contents of the AM42, AM41, and AM34 flip-flops address the SCD5–SCD12 switch core drivers.

The AM-register 410 (FIG. 20) stores a number from 0000–3999 to represent one of the 4,000 addressable memory locations. The logical schematic diagrams for the AM-register flip-flops are illustrated in FIGS. 110–113. The AM-register is adapted to receive the numerical contents of the A-register of the Central Processor upon application of the M*ca* signal to logical gates connecting the output terminals of the A-register flip-flops to corresponding input terminals of the AM-register flip-flops. Thus, the AM-register stores an address until issuance of the M*ca* signal, whereupon the AM-register accepts the current address in the A-register. Inasmuch as the M*ca* signal initiates a complete memory cycle, the AM-register has its contents updated at the start of each memory cycle.

CORE MEMORY DATA READ OUT

As described previously, a single read out winding 428 threads serially all the cores of a memory plane. Each read out winding delivers an output signal whenever a core in its memory plane changes state. Since only the addressed cores will change state, the output signal delivered by the read out winding is representative of the bit stored in the addressed core in the corresponding memory plane.

Each read out winding and the signal delivered thereby is designated in accordance with the numerical order of significance of the bits stored in the corresponding memory plane. Thus, the read out signal from the memory plane which stores the least significant bit of the 3rd digit of a data word is designated as the MP31 signal.

The 28 read out windings are coupled to the respective input terminals of 28 core read amplifiers (FIG. 25). Each core read amplifier is gated so as to provide an output signal only during the portion of the memory cycle when data is to be read out from the addressed memory location. The output signals of the 28 core read amplifiers are transmitted through appropriate logic circuits to the 1 logic input terminals of the corresponding M-register flip-flops.

In the absence of both an input signal from the corresponding read out winding and a read strobe input signal, the core read amplifier delivers an output signal representing a binary 0 on the output lead 505 thereof; i.e., a signal at the −5 v. level. In the absence of both of these input signals, the normal bias level at the base of transistor 506 is +6 v., as established by the voltage divider comprising resistors 507 and 508 and the diode bridge 509. The S*t* read strobe, which is applied to input lead 510, is normally at the +6 v. level and biases transistor 511 into the non-conducting state. Transistor 512 is therefore in the conducting state and its emitter is held at the −5 v. level, providing a binary 0 output signal on lead 505.

The circuit to the left of bridge 509 in FIG. 25 is essentially a balanced amplifier, delivering no voltage differential between leads 513 and 514 in the absence of an input signal to input transformer 515. When transformer 515 receives the MP(*ij*) read out signal, a balanced push-pull input signal is applied to the base electrodes of transistors 516 and 517. The current flowing in transistor 516 then decreases and the current in transistor 517 increases. The change in current flowing through transistors 516 and 517 is coupled to the base electrodes of the respective transistors 518 and 519. The current flowing through transistor 518 then increases and that in transistor 519 correspondingly decreases. These changes in current flow in transistors 518 and 519, in the senses indicated, provide that lead 513, which is coupled to the collector electrode of transistor 518, becomes positive with respect to lead 514, which is coupled to the collector electrode of transistor 519. This voltage differential between leads 513 and 514 is conducted through the diode bridge 509, whereupon the base electrode of transistor 506 becomes more negative. If the strobe signal is at this time transferred to the 0 v. level, the decrease in base electrode voltage of transistor 506 is coupled to the base electrode of transistor 511, which is thereupon rendered conducting. Transistor 511, when conducting, establishes a +5 v. level at the base electrode of transistor 512 thereby causing the output signal on output lead 505 to rise to approximately +5 v., representing a binary 1.

Therefore, the output signal of the core read amplifier represents the logical combination (S*t* MP*ij*), inasmuch as the addressed core in the *ij*th memory plane must have been reset from the 1-state when the S*t* signal was applied to the core read amplifier.

The strobe driver of FIG. 26 supplies a voltage of approximately 0 v. on lead 510 to the core read amplifier when data is to be read from the Core Memory. At other times the signal delivered by the strobe driver is at the +6 v. level. The strobe input signal applied to the strobe driver on lead 523 is normally at the −5 v. level. When data is to be read from the Core Memory by the read amplifiers, this input signal transfers to the +6 v. level. In the quiescent condition, the −5 v. input signal to the strobe driver maintains transistor 524 non-conducting and transistor 525 conducting. The approximately −5 v. signal at the emitter electrode of transistor 525 maintains transistor 526 non-conducting and transistor 527 conducting. With transistor 527 conducting and transistor 526 cut off, the output signal on lead 510 is approximately +6 v. When the strobe input signal on lead 523 rises to the +6 v. level, transistor 525 is cut off and transistor 524 commences conducting. As transistor 524 conducts, transistor 526 commences conducting and transistor 527 cuts off. Transistor 526 couples output lead 510 to approximately ground potential, so that the output signal on lead 510 enables the core read amplifier of FIG. 25.

Capacitors 528 and 529 function to speed the response of the strobe driver and to maintain transistor 527 cut off for the proper duration.

M-REGISTER

The M-register 404 provides temporary storage for the new data words to be stored in the Core Memory, for the data words to be restored in Memory after they have been read therefrom, and for data words which have been read out from the Core Memory and are to be transferred to other components of the system. The M-register flip-flop input diagrams are illustrated in FIGS. 114–120. The M-register flip-flops receive as the logic input signals thereof, the corresponding output signals delivered by the M-register input gates 407 (FIG. 20). The M-register input gates comprise the logical circuits illustrated by the logical schematic diagrams of FIGS. 114–120 and by the logical schematic diagrams of the M-register input inverters IQ(*ij*), of FIG. 121. The M-register input inverters provide input signals to the M-register flip-flops when a new data word is to be stored in the addressed memory location. This new data word is provided by the P-register, the R*b*-register, or the R-register. A typical logical circuit for applying signals to an M-register input inverter is illustrated by:

$$IQ34 = R34\ \overline{C53}\ \overline{Jr} + Rb34\ Jr + P34\ C53\ \overline{Jr}$$

Thus, the contents of the R-register will be gated by the M-register input inverters into the M-register in the presence of the signal combination ($\overline{C53}\ \overline{Jr}$). Such a signal combination occurs, for example, during Instruction 70, when the entire contents (except mod-bits) of the R-register are transferred to Memory. The J*r* signal occurs during a Read Buffer operation and transfers the entire contents of the R*b*-register to Memory. The signal (C53 $\overline{Jr}$) occurs, for example, during Instruction 24 and serves to transfer the entire contents of the P-register to Memory.

As was set forth in the previous section entitled "Mod-bits," the mod-bits of each numeric word in Memory and, consequently, the mod-bits of each word transferred into the M-register must have the configuration required to make the modulo-3 of the entire seven digits of the word equal to +1. Inasmuch as the words stored on magnetic tape have the required mod-bits for storage in Memory and the words read from a document are provided with the proper mod-bits when they are transferred into the R*b*-register, the word transferred from the Read Buffer has the proper mod-bits for insertion into Memory (see succeeding section entitled "Read Buffer Operations"). Similarly, the words received from the Photoreader or the Control Typewriter are provided with the proper mod-bits when they are transferred into the P-register. Therefore, the mod-bits of the words transferred from the P-register or the R*b*-register may be stored without alteration in the Memory. This is illustrated in the logical schematic diagrams for the inverter signals IQ*m*2 and IQ*m*1.

On the other hand, the mod-bits of a word in the R-register have the configuration of the total modulo-3 of the six least significant digits of the word in the R-register. Therefore, these mod-bits must be converted to the proper configuration for insertion in Memory. The logical schematic diagrams for IQ*m*1 and IQ*m*2 illustrate the logical circuits of the M-register input gates 407 for converting the mod-bits of R*m*2 and R*m*1 prior to their insertion in the M-register. The proper mod-bits of the word to be stored in M depends on the mod-bits of the word in R and on the contents of the R*d* and R*s* flip-flops. The following table "Mod-bit Generation: R to M" illustrates the required mod-bits for insertion in the mod-bit positions of the M-register, for the various configurations of the condition digit in the R-register.

MOD-BIT GENERATION: R TO M

| R*m*2 | R*m*1 | R*d* | R*s* | Modulo-3 total (26 bits) | Required | |
|---|---|---|---|---|---|---|
| | | | | | IQ*m*2 | IQ*m*1 |
| 0 | 0 | 0 | 0 | 0 | 0 | 1 |
| 0 | 1 | 0 | 0 | 1 | 0 | 0 |
| 1 | 0 | 0 | 0 | 2 | 1 | 0 |
| 0 | 0 | 0 | 1 | 1 | 0 | 0 |
| 0 | 1 | 0 | 1 | 2 | 1 | 0 |
| 1 | 0 | 0 | 1 | 0 | 0 | 1 |
| 0 | 0 | 1 | 0 | 2 | 1 | 0 |
| 0 | 1 | 1 | 0 | 0 | 0 | 1 |
| 1 | 0 | 1 | 0 | 1 | 0 | 0 |
| 0 | 0 | 1 | 1 | 0 | 0 | 1 |
| 0 | 1 | 1 | 1 | 1 | 0 | 0 |
| 1 | 0 | 1 | 1 | 2 | 1 | 0 |
| 1 | 1 | ----- | ----- | ---------- | 1 | 1 |

For example, if R*m*2, 1 have the configuration 0, 1, the total modulo-3 of the numeric contents of the R-register is +1. If, in addition, *Rd*=0, and *Rs*=1, the modulo-3 of the six numeric digits in R and the R*d* and R*s* contents is 2. Therefore, the mod-bits inserted in the M-register flip-flops M*m*2, 1 must have the configuration 1, 0, in order that the total modulo-3 of the word in the M-register be +1. If the word in R is alphanumeric, the mod-bits inserted in the M-register are automatically 1, 1.

Therefore, each word inserted in the M-register has the proper mod-bits included therein for storage in the Core Memory.

The M-register is cleared by the signal M*ca* at the start of each memory cycle. After clearing, the contents of the addressed memory location are read out and are stored in the M-register; for example:

$$*M61 = St\ MP61$$

This expression represents the output signal delivered by the 28 core read amplifiers. If this word read from the Core Memory is not to be restored therein, a new word is gated into the M-register prior to the writing portion of the memory cycle. This new word is gated into the M-register from the M-register input inverters by the "Memory Write" signal M*wt*, which is delivered by the Central Processor; for example: $*M61 = Mwt\ IQ61$; $*\overline{M61} = Mwt\ \overline{IQ61}$.

Therefore, prior to the portion of the memory cycle during which the contents of the M-register are inserted in the addressed Core Memory location, either the data word which was previously read from this addressed memory location is in the M-register, or a new data word has been inserted in the M-register from the R-register, the R*b*-register, or the P-register.

GENERAL OPERATION AND TIMING

The waveforms of FIG. 27 illustrate the timing sequence of the Memory of FIG. 20. The Memory operates in one of two cycles, illustrated in the lower portion of FIG. 27. During the 8 clock periods of the read cycle, a data word is read out from the addressed Core Memory location, transferred into the M-register, and restored to the same addressed Core Memory location. The restoration of the word read out from the Core Memory is necessary, inasmuch as the read out process is a destructive one, all magnetic cores in the addressed location being returned to the 0-state. The write cycle commences with the read out of the data word from the addressed Core Memory location, an operation which clears the addressed memory location so that a new word can be written therein. The new word to be written in the addressed location is then transferred into the M-register and subsequently stored in the addressed memory location.

A memory cycle is initiated by the issuance of the M*ca* signal from the Central Processor. The M*ca* signal clears the M-register and gates the address in the A-register of the Central Processor into the AM-register of the Memory, thereby designating the Core Memory location which the succeeding memory cycle is to address. FIGURE 27 illustrates a typical timing sequence wherein the signal M*ca* may occur. For example, the signal M*ca* may occur during clock period *t*5 of the Central Processor, following the issuance of the shift signal XNA, which transfers the address of the next-instruction to the A-register. The signal M*ca* initiates the first half of the memory cycle. The first half of the memory cycle is designated "Memory cycle-A." The "core reset" signal issues approximately 2 microseconds, or one-half clock period, after the M*ca* signal enters the Memory, and triggers the addressed X-line switch core driver and the addressed Y-line switch core driver, whereupon all 28 magnetic cores at the addressed memory location, which are not in the 0-state, are restored to their 0-state. During the second clock period of the memory cycle, the read strobe signal, S*t*, issues and enables the 28 core read amplifiers to sense the output signals of the memory planes wherein the cores at the addressed memory location are returned to the 0-state. The output signals of these core read amplifiers which sense a binary 1 thereupon set the corresponding M-register flip-flops to the 1-state, so that at the end of Memory cycle-A (the 4th clock period of the memory cycle) the word in the addressed memory location is in the M-register, and the addressed memory location has been cleared.

The signal M*cb* then issues in the fifth clock period of the memory cycle to initiate Memory cycle-B, the designation for the second half of the memory cycle. During Memory cycle-B the word read out from the Core Memory may be restored to the addressed memory location, or a new word from the R, R*b*, or P-registers may be inserted into the addressed memory location. If a read cycle is occurring, the word read out from the Core Memory remains in the M-register during the last half of the memory cycle. The gate-inhibit signal then issues in the sixth clock period of the memory cycle to apply an inhibiting current to the memory planes in which the bit to be stored is a binary 0. At the same time, the "core set" signal issues and triggers the addressed X-line switch core driver and the addressed Y-line switch core driver, whereupon all non-inhibited cores in the addressed memory location are set to the 1-state. The read cycle is thereupon complete, and the word read out is once again in the addressed memory location. On the other hand, if a write cycle is occurring, the Memory write signal, M*wt*, issues during the 5th clock period of the memory cycle, to transfer the contents of the R, the R*b*, or the P-register to the M-register. The gate-inhibit and core set signals then issue to store the new word in the addressed memory location.

If the quantity 2 is to be added to the two least significant digits of the word in the M-register, the signal A*tm* issues during Memory cycle-B, thereby enabling the 2 adder 408 and the mod-bit adder 409, so that as the word in the M-register is transferred to the Core Memory, the two least significant digits thereof are incremented by 2 and the mod-bits thereof are corrected.

CONTROL CIRCUIT

The timing sequence and control of the Memory is directed by signals generated in the Central Processor and by signals generated in control circuit 416, shown in detail in FIG. 28. The control circuit of FIG. 28 comprises a plurality of interconnected one-shots, which may be of the type previously described, and illustrated in FIG. 11, or may be of any other type well-known in the art; for example, as described in the publication by J. Millman and H. Taub, "Pulse and Digital Circuits," page 600, McGraw-Hill Book Co., Inc., New York, 1956. In the event that the one-shot of FIG. 11 is employed, it may be followed by the inverter of FIG. 7 to achieve the positive signals shown in FIG. 27.

The M*ca* signal triggers a one-shot 536, which remains in its unstable state for approximately 2 microseconds and then returns to its stable state to trigger a one-shot 537. One-shot 537 remains in its unstable state for approximately 2 clock periods to provide the "core reset" signals. The "core reset" signal is applied to the switch core drivers to reset the magnetic cores in the addressed memory location. The M*ca* signal also triggers a one-shot 538, which remains in its unstable state for approximately 4 microseconds and then returns to its stable state to trigger a one-shot 539. One-shot 539 remains in its unstable state for approximately 1 clock period, or 4 microseconds, to trigger the strobe driver 540 (FIG. 26). Strobe driver 540 provides the signal required to enable the core read amplifiers of FIG. 25 during Memory cycle-A.

The M*cb* signal, which follows the M*ca* signal by 4 clock periods, triggers a one-shot 541, which remains in its unstable state for approximately one clock period and then returns to its stable state to trigger a one-shot 542. One-shot 542 remains in its unstable state for approximately 8 microseconds to provide the "core set" signals. The "core set" signal is applied to the switch core drivers to set the non-inhibited Core Memory cores in the addressed memory location. The M*cb* signal also triggers one-shot 543, which remains in its unstable state for one clock period and then returns to its stable state to trigger a one-shot 544. One-shot 544 remains in its unstable state for approximately 10 microseconds to provide the gate-inhibit signal. The gate-inhibit signal enables the inhibit drivers to provide inhibit currents for the magnetic cores in which 0's are to be stored.

There has thus been described a Memory providing random access to 4,000 word locations therein. This Memory is synchronized with the Central Processor, completing a cycle in 8 clock periods. During the memory cycle the word in the memory location addressed by the Central Processor is read out to the M-register, the addressed memory location is cleared, the contents of the M-register may be transferred to the Central Processor or to the Write Buffer, a new word may be inserted in the M-register, and the contents of the M-register are stored in the addressed memory location.

*P-Buffer*

The P-Buffer primarily provides temporary storage for data words being transferred to the Memory from the Control Typewriter or Photoreader and for data words being transferred from the Memory to the Control Typewriter. The P-Buffer temporarily stores data words during these transfers to accommodate the relatively slow rate of the Control Typewriter and Photoreader action to the relatively fast rate of the Central Processor action. The P-Buffer performs these storage functions either under direct control of the Central Processor, as the Central Processor executes an instruction, or independently of the Central Processor after the preparation of the P-Buffer by the Central Processor executing an instruction. However, with the Central Processor in the halt mode the P-Buffer executes certain operations (register type-in and register type-out) under control of the Control Typewriter. The P-Buffer also cooperates in loading or dumping Memory contents in sequential memory locations, under direction of the Control Console, if the Central Processor is in the halt mode. The succeeding sections "P-Buffer Operations" and "Manually-Controlled Operations Involving Sequential Memory Locations" provide details of the operation of the P-Buffer in effecting the above-mentioned operations.

The P-Buffer comprises the P-register for temporarily storing the data being transferred through the P-Buffer, register transfer and logic circuits for transferring data into and through the P-register, clock pulse drivers for controlling the timing of the P-Buffer, counters, and flip-flops and one-shots employed as control signal sources. FIGURE 29 illustrates symbolically the elements of the P-Buffer which store data, the paths of data transfer between these elements, and certain control elements. The details of the circuit structure of the P-Buffer are provided in FIGS. 122–135, which are flip-flop input logical schematic diagrams; FIGS. 136 and 137, which are one-shot input logical schematic diagrams; and FIG. 138, which includes designated logical combination signal diagrams, clock pulse driver gating signal diagrams, and inverter signal diagrams.

The 7-digit P-register 550 temporarily stores the data being transferred through the P-Buffer. The logical schematic diagrams of the P-register are given by FIGS. 122–128. The contents of the P5–P1 flip-flops of the P-register are shifted-down upon application of the *Sp* clock signal to register transfers which connect the P5–P1 digit positions of the P-register. The contents of the P7 flip-flops are transferred to the corresponding P6 flip-flops upon application of the *Sp* clock signal to register transfers which connect the output terminals of the P7 flip-flops to corresponding input terminals of the P6 flip-flops. The contents of the P6 flip-flops are transferred to the corresponding P5 flip-flops upon application of the *Pig2* logical combination signal to logical gates which connect the output terminals of the P6 flip-flops to corresponding input terminals of the P5 flip-flops. The contents of the P1 flip-flops are transferred to the corresponding P7 flip-flops upon application of the *Spp* logical combination signal to logical gates which connect the output terminals of the P1 flip-flops to input terminals of the corresponding P7 input inverters 551. Therefore, the entire contents of the P-register are ring shifted-down by simultaneous issuance of the *Sp*, *Pig2*, and *Spp* signals.

The P7 flip-flops are adapted to receive the contents of the J1, R1, L1, A1, B1, or N1 flip-flops of the Central Processor registers upon application of a corresponding logical combination signal to logical gates which connect the output terminals of these flip-flops of the Central Processor to input terminals of the corresponding P7 input inverters 551. The P7 flip-flops are also adapted to receive the digit contents of the *Cs* flip-flops 552 upon application of logical combination signals to logical gates which connect the output terminals of the *Cs* flip-flops to input terminals of the P7 input inverters 551.

The P1 flip-flops are adapted to receive the most significant digit of an alphanumeric character in the *Cs* flip-flops upon application of the *Ripa* logical combination signal to the alphanumeric input logic circuit 554, which couples the output terminals of the *Cs5* and *Cs6* flip-flops to input terminals of the P11 and P12 flip-flops.

The contents of the P-register may be transmitted by parallel shift to the M-register. The contents of the P1 flip-flops may be transmitted to the C6 flip-flops of the C-register or to the R7 flip-flops of the R-register. The contents of the P1 flip-flops may also be transmitted to the P-Mod-generator 555 and to the alphanumeric output logic circuit 556. The contents of the P7 flip-flops may be transferred to the *Cs* input inverters and logic circuit 557.

The seven *Cs* flip-flops 552 comprise a single character register for providing temporary storage for each character transferred from the Control Typewriter or Photoreader to the P-register or for each character transferred from the P-register to the Control Typewriter. Each character handled by the Control Typewriter or Photoreader comprises six data bits and a parity bit (see the "Control Typewriter" section). *Cs1–Cs6* hold the six data bits of the character being transferred in the common Control Typewriter-Photoreader code. The *Csp* flip-flop holds the parity bit for the data bits in *Cs1–Cs6*. The *Cs* flip-flops are adapted to receive the contents of the P7 flip-flops upon application of the *Cinr* logical combination signal to logical gates which connect the output terminals of the P7 flip-flops to input terminals of the corresponding *Cs* input inverters, when any character is to be transferred from the P-register to the Control Typewriter. The *Cs5* and *Cs6* flip-flops are adapted to receive the contents of the P11 and P12 flip-flops upon application of a corresponding logical combination signal to logical gates 556, which connect the output terminals of the P11 and P12 flip-flops to input terminals of the corresponding *Cs* input inverters when an alphanumeric character is to be transferred from the P-register to the Control Typewriter. The *Cs* flip-flops are adapted to receive the corresponding *Kp1–Kp6*, *Kpp* signals provided by the Photoreader upon application of the *Cinp* logical combination signal to logical gates which apply these Photoreader signals to the *Cs* input inverters. The *Cs* flip-flops are adapted to receive the corresponding *Kf1–6*, *Kfp* signals provided by the Control Typewriter upon application of the *Cinf* logical combination signal to logical gates which apply these Control Typewriter signals to the *Cs* input inverters.

The contents of the *Cs* flip-flops may be transmitted to the P7 flip-flops when a numeric character is in *Cs*. A portion of the contents of the *Cs* flip-flops are transmitted to the P7 flip-flops and the remaining portion to the P1 flip-flops through the logic circuit 554 when an alphanumeric character is in *Cs*. In this latter instance, the least significant digit of the alphanumeric character is transferred to P7 and the most significant digit to P1. The contents of the *Cs* flip-flops may also be transmitted by parallel shift to the Control Typewriter.

A parity generation and check circuit 558 samples the contents of the *Cs* flip-flops to generate a parity bit for the character stored therein, prior to transfer of the character to the Control Typewriter, and to check the contents thereof to determine if an odd number of 0's exist in the 7 bits, when a character is received from the Photoreader or Control Typewriter. In the event that a parity error is detected, the *Efp* flip-flop 559 is set (FIG. 132).

A *Ts*-counter 560, which comprises the *Tsa*, *Tsb*, and *Tsc* flip-flops (FIG. 132) and which operates in eight discrete states, is the source for fine timing and control of the shifting operations executed in the P-Buffer. A *Tc*-counter 561, which comprises the *Tca*, *Tcb*, *Tcc* flip-flops (FIG. 133) and operates in eight discrete states, directs the sequence of the steps which the P-Buffer executes in performing an operation.

Other P-Buffer flip-flops are employed primarily to perform control functions. The *Brt* and *Rtc* flip-flops (FIG. 135) control those operations performed when the Central Processor is in the halt mode, wherein the contents of various Central Processor registers are typed out; i.e., transferred to the Control Typewriter. The *Eod* flip-flop (FIG. 133) is set at the conclusion of a P-Buffer operation to provide proper delay for the Control Typewriter mechanism to return to its idle state. The Mc1, Mc2, Mc3, and Mc4 flip-flops (FIG. 129) determine and direct the particular type of operation being performed by the P-Buffer. The Mi1 and Mi2 flip-flops (FIG. 135) control operations wherein data is transferred to the P-register, the I-register, or to Memory with the Central Processor in the halt mode. The Rd1 and Rd2 flip-flops (FIG. 134) synchronize the speed of operation of the Control Typewriter and Photoreader with that of the P-Buffer and Central Processor. These two flip-flops indicate when a character is to be transferred to the P-Buffer from the Control Typewriter or Photoreader, or when a character is to be transferred to the Control Typewriter from the P-Buffer.

The Ycrt one-shot (FIG. 137) is triggered to provide a suspense period in the P-Buffer whenever an automatic carriage return is executed by the Control Typewriter, or whenever a Tab or Car Ret character is transmitted to the Control Typewriter. The Yco one-shot (FIG. 136) provides delay at the end of an operation to allow the Control Typewriter to return to its quiescent state. The Yfr and Ypr one-shots (FIG. 136) are triggered on receipt of the timing signals from the respective Control Typewriter and Photoreader to indicate that character signals are ready to be supplied therefrom. The Ytc one-shot (FIG. 136) functions to gate the character in the Cs flip-flops into the Control Typewriter.

CLOCK CIRCUIT, P-BUFFER

The clock circuit of the P-Buffer, also shown in FIG. 29, provides clock pulse signals for application to flip-flops and register transfers to control respectively the entry of data into flip-flops and the transfer of data between flip-flops. The clock pulse drivers of the P-Buffer clock circuit may be gated to provide single clock pulses or clock pulses at the 250 kc. rate, or may be operated continuously. The logical schematic diagrams of the logical circuits providing gating signals to the clock pulse drivers of FIG. 29 are illustrated in FIG. 138. This clock circuit also provides clock pulses to control the triggering of one-shots.

The P-Buffer clock circuit comprises a continuous clock pulse driver 365 connected by lead 306 to receive continuous clock pulses at the 250 kc. rate from master clock pulse driver 302 of the Central Processor (FIG. 17). The clock pulses provided by clock pulse driver 365 are applied to continuous clock pulse driver CD4 and to gated clock pulse drivers Sp, Cap, and Cytc.

P-MOD-GENERATOR

The P-Mod-generator 555 (FIG. 29) comprises the Gm2 and Gm1 flip-flops (FIG. 134) and their corresponding logic circuits. The primary function of the P-Mod-generator is to accumulate the modulo-3 of a data word as the digits of the word are sampled thereby in serial order, LSD first. Detailed operation of the P-Mod-generator is described in the following sections "Modulo-3 Generation for Numeric Inputs to P-Register," and "Register Type-In." The modulo-3 accumulated by the P-Mod-generator is employed to generate the mod-bits for the word in the P-register. In accumulating the modulo-3 of a word, the Gm2 and Gm1 flip-flops respond to their present contents and to the Gm3 and Gm4 logical combination signals (FIG. 138). The Gm3 signal represents a binary 1 whenever the digit in P1, which is sampled by the P-Mod-generator, has a modulo-3 of +1. The Gm4 signal represents a binary 1 whenever the digit in P1 has a modulo-3 of −1. Therefore, whenever the Gm3 signal issues, the number stored in Gm2, 1 is increased by 1. Similarly, when the Gm4 signal issues, the contents of Gm2, 1 is decreased by 1. If neither Gm3 nor Gm4 issues, the digit sampled by the P-Mod-generator has a modulo-3 of 0, and the contents of Gm1 and Gm2 remain unchanged. After the P-Mod-generator has sampled the appropriate number of digits in the P-register, the contents of Gm2, 1 are encoded and transferred to the mod-bit flip-flops of the register which at that time contains the word whose modulo-3 was accumulated in Gm2, 1.

Other uses for the Gm2 and Gm1 flip-flops, such as for suppressing the most significant 0's during type-out operations, are described in the "P-Buffer Operations" section.

*Control Typewriter*

The Control Typewriter 14 (FIG. 1) receives data words from the P-Buffer and types a visible representation of these words or punches on paper tape an encoded representation of these words. The Control Typewriter also transfers data words to the P-Buffer by reading encoded punched paper tape or upon depression of Control Typewriter keys in proper sequence. The Control Typewriter is primarily adapted to cooperate with the P-Buffer to transfer words into or receive words from the Memory. However, the Control Typewriter also cooperates with the P-Buffer to transfer data directly into the I-register or the R-register of the Central Processor or to type out the contents of any one of the B, I, L, N, or R registers. Additionally, the Central Processor may be controlled by the Control Typewriter, rather than by the Control Console.

The Control Typewriter, the structure of which is not shown, may be any one of several kinds commonly employed in data processing operations. Generally, the Control Typewriter is an electric typewriter which transmits encoded electrical signals upon the depression of the keys thereof, or types on a printed form in response to encoded signals received thereby. Such an electric typewriter may be also adapted to transmit similarly encoded signals by reading punched paper tape, or to punch paper tape in response to receipt of encoded signals. It is only necessary to an understanding of this invention to describe the signals which are transmitted by the Control Typewriter. Each of these signals is delivered on a separate lead, the signal on each lead representing a binary 0 or a binary 1, in accordance with the system requirements. Thus, if a signal transmitted by the Control Typewriter is to represent a binary 0, it normally will have a −5 v. level, and if it is to represent a binary 1, it normally will have a +6 v. level. Similarly, the Control Typewriter is adapted to receive signals having either the +6 v. or −5 v. level.

The Control Typewriter comprises a plurality of character keys, many of which perform two functions. A character key is provided for each letter of the alphabet, for each of the numerals 0–9, and for each of the non-numeric digits shown in Table I in the section "Data Representation." In its normal function, a character key, when depressed, transmits a corresponding character encoded in a seven bit configuration to the P-Buffer. Additionally, several of the character keys provide special functions. If a key, identified as the "Enable" key is first depressed, and then a character key providing one of the special functions is depressed, a signal is delivered on a corresponding special lead, rather than the seven bit character configuration. The special signals are control signals, which direct operations by the P-Buffer, by the Central Processor, or by both.

DATA INPUT FROM CONTROL TYPEWRITER

When data is transferred from the Control Typewriter to the P-Buffer (for example, after a previous Instruction 59 has been executed by the Central Processor to prepare the P-Buffer), the following signals, which are transmitted by the Control Typewriter to the P-Buffer, are employed.

Kf1–Kf6: These six signals, shown entering the Cs input inverters 557 of FIG. 29, represent the six data bits of the encoded character transmitted by the Control Typewriter when a corresponding character key is depressed. These six signals may represent a single digit, as shown in the aforementioned Table I, or they may represent the two digits of an alphanumeric character, as shown in Table II of the section "Data Representation."

K*fp*: This signal represents the 7th bit transmitted from the Control Typewriter to the C*s* input inverters when a character key is depressed. This signal represents the parity bit for the six data bits represented by the signals K*f*1–6. The value of K*fp* accommodates the requirement for an odd number of 0's in K*f*1–6, *p*.

K*fc*: This sprocket, or timing, signal is transmitted from the Control Typewriter to the P-Buffer Control circuits when the seven bits of a character are fully represented by the signals K*f*1–6, *p* and are ready for insertion in the P-register. The K*fc* signal is normally in the 1-state, but when a character is ready for transmittal, the signal transfers to the 0-state.

The employment of the above signals during operations involving the Control Typewriter and the P-Buffer is described in the Control Typewriter input subsections of the "P-Buffer Operations" section.

The following table illustrates the configurations of the K*f*1–6, *p* signals when the Control Typewriter transmits characters to the P-register. This same code is employed when the P-register transmits data to the Control Typewriter. This code corresponds with the two digit alphanumeric code employed in the system and illustrated in the aforementioned Table II.

CONTROL TYPEWRITER TWO-DIGIT CHARACTER CODES

| Code | 0 | 1 | 2 | 3 | 4 | 5 | 6 | 7 | 8 | 9 | $ | , | & | . | * | A | B | C | D |
|---|---|---|---|---|---|---|---|---|---|---|---|---|---|---|---|---|---|---|---|
| K*f*p | 1 | 0 | 0 | 1 | 0 | 0 | 1 | 1 | 0 | 1 | 1 | 1 | 0 | 0 | 0 | 1 | 1 | 0 | 1 |
| K*f*6 | 1 | 1 | 1 | 1 | 1 | 1 | 1 | 1 | 1 | 1 | 1 | 1 | 1 | 1 | 1 | 1 | 1 | 1 | 1 |
| K*f*5 | 0 | 0 | 0 | 0 | 0 | 0 | 0 | 0 | 0 | 0 | 0 | 0 | 0 | 0 | 0 | 1 | 1 | 1 | 1 |
| K*f*4 | 0 | 0 | 0 | 0 | 0 | 1 | 1 | 1 | 1 | 1 | 0 | 0 | 0 | 1 | 1 | 0 | 0 | 0 | 0 |
| K*f*3 | 0 | 0 | 0 | 0 | 1 | 0 | 0 | 0 | 0 | 1 | 1 | 1 | 1 | 1 | 1 | 0 | 0 | 0 | 1 |
| K*f*2 | 0 | 0 | 1 | 1 | 0 | 0 | 0 | 1 | 1 | 0 | 0 | 1 | 1 | 0 | 1 | 0 | 1 | 1 | 0 |
| K*f*1 | 0 | 1 | 0 | 1 | 0 | 0 | 1 | 0 | 1 | 0 | 1 | 0 | 1 | 1 | 0 | 1 | 0 | 1 | 0 |

| Code | E | F | G | H | I | J | K | L | M | N | O | P | Q | R | S | T | U | V | W |
|---|---|---|---|---|---|---|---|---|---|---|---|---|---|---|---|---|---|---|---|
| K*f*p | 1 | 0 | 0 | 1 | 0 | 1 | 1 | 0 | 1 | 1 | 0 | 0 | 1 | 0 | 0 | 1 | 0 | 0 | 1 |
| K*f*6 | 1 | 1 | 1 | 1 | 1 | 0 | 0 | 0 | 0 | 0 | 0 | 0 | 0 | 0 | 0 | 0 | 0 | 0 | 0 |
| K*f*5 | 1 | 1 | 1 | 1 | 1 | 0 | 0 | 0 | 0 | 0 | 0 | 0 | 0 | 0 | 1 | 1 | 1 | 1 | 1 |
| K*f*4 | 1 | 1 | 1 | 1 | 1 | 0 | 0 | 0 | 0 | 1 | 1 | 1 | 1 | 1 | 0 | 0 | 0 | 1 | 1 |
| K*f*3 | 0 | 0 | 0 | 0 | 1 | 0 | 0 | 0 | 1 | 0 | 0 | 0 | 0 | 1 | 0 | 0 | 1 | 0 | 0 |
| K*f*2 | 0 | 0 | 1 | 1 | 0 | 0 | 1 | 1 | 0 | 0 | 0 | 1 | 1 | 0 | 1 | 1 | 0 | 0 | 0 |
| K*f*1 | 0 | 1 | 0 | 1 | 0 | 1 | 0 | 1 | 0 | 0 | 1 | 0 | 1 | 0 | 0 | 1 | 0 | 0 | 1 |

| Code | X | Y | Z | Space | Shift | Norm | CarRet | Tab | EOI | Stop | + | − | Ignore |
|---|---|---|---|---|---|---|---|---|---|---|---|---|---|
| K*f*p | 1 | 0 | 1 | 0 | 1 | 0 | 0 | 1 | 0 | 0 | 0 | 1 | 1 |
| K*f*6 | 0 | 0 | 0 | 1 | 0 | 0 | 1 | 0 | 1 | 0 | 0 | 0 | 1 |
| K*f*5 | 1 | 1 | 1 | 1 | 0 | 1 | 1 | 1 | 1 | 1 | 0 | 0 | 1 |
| K*f*4 | 1 | 1 | 1 | 0 | 1 | 1 | 0 | 0 | 0 | 0 | 0 | 1 | 0 |
| K*f*3 | 0 | 0 | 1 | 0 | 1 | 1 | 1 | 1 | 1 | 1 | 1 | 1 | 1 |
| K*f*2 | 1 | 1 | 0 | 0 | 0 | 0 | 0 | 0 | 1 | 1 | 1 | 1 | 1 |
| K*f*1 | 0 | 1 | 0 | 0 | 1 | 1 | 1 | 1 | 0 | 1 | 0 | 0 | 1 |

The bits represented by the signals C*s*1, 2, 3, 4, comprise the LSD of the alphanumeric character. The bits represented by the C*s*5 and C*s*6 signals comprise the two least significant bits of the MSD of the alphanumeric character, although the C*s*6 signal provides an inverted bit. Thus, if C*s*6 represents 1, the corresponding MSD bit is a 0, and vice versa. For example, the MSD of the character "J" is the numeric 2. The normal system code for the numeral 2 is 0010. Therefore the control typewriter code for this character is 00, wherein the first 0 is translated to represent a 1.

DATA OUTPUT TO CONTROL TYPEWRITER

When data is received by the Control Typewriter from the P-Buffer (for example, after a previous Instruction 59 has been executed by the Central Processor to prepare the P-Buffer) the following signals, which are transmitted by the Control Typewriter to the P-Buffer, are employed.

K*tf*: This signal follows the receipt of a character by the Control Typewriter to isolate the Control Typewriter for a predetermined time from the receipt of further signals in order to provide for the character received to be typed out or punched out.

K*acr*: This signal is provided when a carriage return is to be executed by the Control Typewriter, following receipt of a character from the P-Buffer, to isolate the Control Typewriter for a predetermined time in order to allow the carriage return operation to be completed.

The employment of the above signals during operations involving the P-Buffer and the Control Typewriter is described in the Control Typewriter output subsections of the "P-Buffer Operations" section.

REGISTER TYPE-IN

With the Central Processor halted, data may be transferred from the Control Typewriter to the P, I, or R-registers. In these operations the following signals, which are transmitted by the Control Typewriter to the P-Buffer, are employed.

K*fi*: This signal denotes that the Control Typewriter is ready to transmit or to receive information.

K*ew*: This is a special signal which issues when either the E key or the W key is depressed, after the Enable key has been depressed. If the signal occurs due to the E key being depressed, data is first transferred to the P-register and then from the P-register to the I-register. If this signal occurs due to the W key being depressed, data is first transferred to the P-register and then to the R-register.

K*qw*: This is a special signal which issues when either the Q key or the W key is depressed, after the Enable key has been depressed. If this signal occurs due to the Q key having been depressed, data is transferred to the P-register and retained therein.

The employment of the above signals during operations involving the Control Typewriter and the P-Buffer is described in the "Register Type-In Subsection of the P-Buffer Operations" section.

REGISTER TYPE-OUT

With the Central Processor halted, the contents of the B, I, L, N, P, or R registers may be transferred to the Control Typewriter for type-out thereby. In these operations the following signals, which are transmitted by the Control Typewriter to the P-Buffer, are employed.

K*tc*: This is a common type-out control signal which initiates the type-out sequence. This signal is normally in its 1-state, but is transferred to the 0-state when one of the special type-out signals K*b*, K*i*, K*l*, K*n*, K*r* or K*t* issues.

K*b*: This special signal issues when the B key is depressed, after the Enable key has been depressed. This signal causes the B-register contents to be typed-out.

K*i*: This special signal issues when the I key is depressed, after the Enable key has been depressed. This signal causes the I-register contents to be typed-out.

K*l*: This special signal issues when the L key is depressed, after the Enable key has been depressed. This signal causes the L-register contents to be typed-out.

K*n*: This special signal issues when the N key is depressed, after the Enable key has been depressed. This signal causes the N-register contents to be typed-out.

K*r*: This special signal issues when the P key is depressed, after the Enable key has been depressed. This signal causes the R-register contents to be typed-out.

K*t*: This special signal issues when the T key is depressed, after the Enable key has been depressed. This signal causes the P-register contents to be typed-out.

K*en*1, 2: The K*en*1 signal is normally in the 0-state and the K*en*2 signal is normally in the 1-state. When the Enable key is depressed the K*en*1 signal is transferred to the 1-state and the K*en*2 signal is transferred to the 0-state.

The employment of the above signals during operations involving the Control Typewriter and the P-Buffer is described in the "Register Type-Out" subsection of the "P-Buffer Operations" section.

CENTRAL PROCESSOR CONTROL

The Central Processor is controlled when certain keys of the Control Typewriter are depressed. The following signals, which are transmitted by the Control Typewriter to the Central Processor, are employed.

K*a*: This special signal issues when the A key is depressed, after the Enable key has been depressed. If the system is in the halt mode, the issuance of this signal will place the system in the normal data processing mode. The function of this signal in causing the Central Processor to initiate the normal processing of data is described in the subsection "Starting System From Halt Mode" of the section "Operations From Halt Mode." This signal is normally in the 1-state, but is transferred to the 0-state when the A key is depressed.

K*h*: This special signal issues when the H key is depressed, after the Enable key has been depressed. When this signal issues the Central Processor will halt. The function of this signal in initiating a system halt operation is described in the subsection "Manual Halt" of the "Halts" section.

K*s*: This special signal issues when the S key is depressed, after the Enable key has been depressed. If the system is in the halt mode, the issuance of this signal causes the Central Processor to execute a single-cycle operation. The function of this signal in initiating a single-cycle operation is described in the "Single-Cycle" subsection of the "Operations From Halt Mode" section. This signal is normally in the 1-state, but is transferred to the 0-state when the S key is depressed.

K*z*: This special signal issues when the Z key is depressed, after the Enable key has been depressed. If the system is in the halt mode, the issuance of this signal causes the Central Processor to execute a zingle-cycle operation. The function of this signal in initiating a zingle-cycle operation is described in the "Zingle-Cycle" subsection of the "Operations From Halt Mode" section. This signal is normally in the 1-state, but is transferred to the 0-state when the Z key is depressed.

K*cf*: This common signal issues whenever any one of the K*a*, K*s*, or K*z* signals goes to 0. This signal insures that only one compute, single-cycle, or zingle-cycle operation takes place for each depression of the corresponding A, S, or Z key. The function of the K*cf* signal is described in the aforementioned "Starting System From Halt Mode" subsection.

*Photoreader*

The Photoreader 15 (FIG. 1) photoelectrically reads punched encoded paper tapes and transfers electrical representations of the data thereon to the P-Buffer. The Photoreader, the structure of which is not shown, may be any one of several kinds commonly employed in data processing operations. Generally, the Photoreader is a device which reads a sequence of characters encoded respectively as a row of holes on punched paper tape and transmits electrical signals representative of the presence or absence of the punched holes. It is only necessary to an understanding of this invention to describe the signals which are transmitted by the Photoreader. Each of these signals is delivered on a separate lead, the signal on each lead representing a binary 0 or a binary 1, in accordance with the system requirements. Thus, if a signal transmitted by the Photoreader is to represent a binary 0 it normally will have a —5 v. level, and if it is to represent a binary 1, it normally will have a +6 v. level.

When data is transferred from the Photoreader to the P-Buffer (for example, after a previous Instruction 59 has been executed by the Central Processor to prepare the P-Buffer), the following signals, which are transmitted by the Photoreader to the P-Buffer, are employed.

K*p*1–K*p*6: These six signals, shown entering the C*s* input inverters 557 of FIG. 29, represent the six data bits of the encoded character transmitted by the Photoreader when a row of punched holes is read from the tape thereof. These six signals may represent a single digit, as shown in the aforementioned Table I, or they may represent the two digits of an alphanumeric character, as shown in the aforementioned Table II.

K*pp*: This signal represents the 7th bit transmitted from the Photoreader to the C*s* input inverters when a row of punched holes is read. This signal represents the parity bit for the six data bits represented by the signals K*p*1–6. The value of K*pp* accommodates the requirement for an odd number of 0's in K*p*1–6, *p*.

K*pc*: This sprocket, or timing, signal is transmitted from the Photoreader to the P-Buffer control circuits when the seven bits of a character are fully represented by the signals K*p*1–6, *p* and are ready for insertion in the P-register.

K*pi*: This signal denotes that the Photoreader is ready to transmit input signals to the P-Buffer.

The employment of the above signals during operations involving the Photoreader and the P-Buffer is described in the Photoreader input subsections of the "P-Buffer Operations" section.

The configurations of the K*p*1–6, *p* signals when the Photoreader transmits characters to the P-register are identical to those employed for transmittal of characters between Control Typewriter and P-Buffer, and are, therefore, illustrated by the preceding table "Control Typewriter Two-Digit Character Codes." In this table, the signals K*p*1–6, *p* may be substituted for the corresponding signals K*f*1–6, *p*.

*Multiplex Buffer*

The Multiplex Buffer provides an intermediate storage function for data words being transferred from Memory to a Tape Handler for storage on magnetic tape or to the Printer, and for data being transferred from a Tape Handler or from the Character Reader to Memory. The Multiplex Buffer temporarily stores data during these transfers to accommodate the relatively slow rate of the Tape Handler, Printer, and Character Reader action to the relatively fast rate of the Memory and its controlling Central Processor.

The Multiplex Buffer comprises a Write Buffer, a Read Buffer, and a clock circuit, each of which will be described separately in succeeding sections.

*Write Buffer*

The Write Buffer temporarily stores data words being transferred from Memory to a Tape Handler for storage on magnetic tape or to the Printer. A succeeding section "Write Buffer Operations" provides details of the operation of the Write Buffer in effecting the following types of data transfer:

(*a*) The writing of one block of 100 data words on magnetic tape from consecutive memory locations;

(*b*) the printing of one block of 100 data words by the Printer from consecutive memory locations;

(*c*) the writing on magnetic tape of one block of 100 data words comprising five blockettes of 20 words, wherein the five blockettes are taken from five respective groups of memory locations, each group comprising 20 consecutive memory locations; and (*d*) the printing by the Printer of one block of 100 data words comprising five blockettes of 20 words, wherein the five blockettes are taken from five respective groups of memory locations, each group comprising 20 consecutive memory locations.

Each of these types of data transfer is initiated by an appropriate programmed instruction (66 or 68) executed in the Central Processor, but continued and carried to completion under control of the Write Buffer.

The Write Buffer comprises a register for temporarily storing the data being transferred through the Write Buffer, register transfer and logic circuits for transferring data into and through the register, clock pulse drivers for controlling the timing of the Write Buffer, counters, and flip-flops employed as control signal sources. FIGURE 32 illustrates symbolically the elements of the Write Buffer which store data, the paths of data transfer between these elements, and certain control elements. The details of the circuit structure of the Write Buffer are provided in FIGS. 139–156, which illustrate flip-flop input logical schematic diagrams, and FIG. 158, which illustrates designated logical combination signal diagrams and clock pulse driver gating signal diagrams.

The 7-digit W*b*-register 601 and the 3-digit W*a*-register 602 temporarily store the data being transferred through the Write Buffer. The logical schematic diagrams of the W*b*-register are illustrated in FIGS. 142–148 and those of the W*a*-register are illustrated in FIGS. 139–141.

The contents of the W*b*3–W*b*1 flip-flops of the W*b*-register are shifted-up upon application of the SW*b*1/4 clock signal to register transfers which connect the W*b*1–W*b*3 digit positions of the W*b*-register. The contents of the W*b*3 flip-flops are transferred to the corresponding W*b*4 flip-flops upon application of the SW*b*1/4 clock signal to register transfers which connect the output terminals of the W*b*3 flip-flops to corresponding input terminals of the W*b*4 flip-flops. The contents of the W*b*7–W*b*4 flip-flops are shifted-up upon application of the SW*b*5/7 clock signal to register transfers which connect the W*b*7–W*b*4 digit positions of the W*b*-register. Therefore, the entire contents of the W*b*-register are shifted-up by the simultaneous issuance of the SW*b*1/4 and SW*b*5/7 signals.

The contents of the W*b*7 flip-flops are transferred to the corresponding W*b*4 flip-flops upon application of the SW*b*7–4 clock signal to register transfers which connect the output terminals of the W*b*7 flip-flops to corresponding input terminals of the W*b*4 flip-flops. Therefore, the contents of the W*b*7–W*b*4 digit positions are ring shifted-up by the simultaneous issuance of the SW*b*5/7 and SW*b*7–4 signals.

The W*b*-register flip-flops are adapted to receive, by parallel shift, the contents of the corresponding Memory M-register flip-flops upon application of the XMW*b* clock signal to register transfers which connect output terminals of the M flip-flops to corresponding input terminals of the W*b* flip-flops. The W*b* flip-flops, however, receive only the 1-output signals of the corresponding M-register flip-flops, since the W*b*-register is cleared before each transfer of a data word thereto from Memory.

The contents of the W*b*7 flip-flops may be transferred to the corresponding W*a*1 flip-flops of the W*a*-register and to the row parity generator circuit 603.

The contents of the W*a*3–W*a*1 flip-flops of the W*a*-register are shifted-up upon application of the SW*a*1 clock signal to register transfers which connect the W*a*3–W*a*1 digit positions of the W*a*-register. The W*a*1 flip-flops are adapted to receive the contents of the corresponding W*b*7 flip-flops upon application of the SW*a*1 clock signal to register transfers which connect the output terminals of the W*b*7 flip-flops to corresponding input terminals of the W*a*1 flip-flops. The contents of the W*a*3 flip-flops may be transferred to the W*o*6–W*o*9 flip-flops, for subsequent transfer to magnetic tape or to the Printer. The contents of the W*a*3 flip-flops may also be transferred to the P*wr* flip-flops for subsequent transfer to magnetic tape or to the Printer.

The W*o*1–W*o*10 flip-flops hold two digits and their corresponding column parity bits for energizing corresponding write drivers for storage of data in a single transverse recording position on magnetic tape. The contents of the W*o*1–W*o*4 flip-flops and the W*o*6–W*o*9 flip-flops may also be transferred to the Printer. The column parity bit for the digit in the W*o*4–W*o*1 flip-flops is stored in the W*o*5 flip-flop. The column parity bit for the digit in the W*o*9–W*o*6 flip-flops is stored in the W*o*10 flip-flop. The logical schematic diagrams for the W*o*1–W*o*10 flip-flops are illustrated in FIGS. 149–151.

Only 0's are written on magnetic tape. A 0 is written whenever the corresponding W*o* flip-flop changes state. Therefore, whenever data is to be transferred from the Write Buffer to magnetic tape, the write zeroes circuits 605 and 606 provide the input signals to the corresponding W*o*1–4 and W*o*6–9 flip-flops. The write zeroes circuit 605 comprises the circuits illustrated by the logical schematic diagrams for the logic input terminals of the W*o*1–4 flip-flops in FIG. 149. Whenever a digit is to be transferred from the P*wr* flip-flops to the corresponding W*o*1–4 flip-flops, for storage on magnetic tape, the write zeroes circuit 605 samples the contents of P*wr* flip-flops and the contents of the corresponding W*o*1–4 flip-flops and changes the state of those W*o*1–4 flip-flops for which the corresponding P*wr* flip-flops store a binary 0. Similarly, when data is to be written on magnetic tape, the write zero circuit 606 changes the state of those W*o*6–9 flip-flops for which the corresponding W*a*3 flip-flops store a 0. The write zeroes circuit 606 comprises the circuits illustrated by the logical schematic diagrams for the logic input terminals of the W*o*6–9 flip-flops of FIG. 150.

Additionally, when data is to be written on magnetic tape, the W*o*5 and W*o*10 flip-flops have their corresponding states changed whenever the column parity bit to be transmitted thereby represents a 0. Column parity generator 607 samples the bits in P*wr* to determine whether the bit to be inserted into W*o*5 should be a 0 and, therefore, that the state of W*o*5 should be changed. If an even number of 0's is stored in P*wr*, column parity generator 607 issues a signal to change the state of the W*o*5 flip-flop. Column parity generator 607 comprises the circuits illustrated by the logical schematic diagrams for generating the P*wc*1 and P*wc*2 signals in FIG. 158 and the circuits illustrated by the logical schematic diagrams for the logic input terminals of the W*o*5 flip-flop of FIG. 151. Similarly, column parity generator 608 samples the contents of the W*a*3 flip-flops to determine whether the W*o*10 flip-flop should have the state thereof changed. Column parity generator 608 comprises the circuits illustrated by the logical schematic diagrams for generating the P*wc*3 and P*wc*4 signals of FIG. 158 and the circuits illustrated by the logical schematic diagrams for the logic input terminals of the W*o*10 flip-flop of FIG. 151.

When data is to be transferred from the Write Buffer to the Printer, the digit contents of the P*wr* flip-flops and the W*a*3 flip-flops are transferred directly to the respective W*o*1–W*o*4 and W*o*6–W*o*9 flip-flops by application of the SW*op* clock signal to register transfers which connect the output terminals of the P*wr* flip-flops to corresponding input terminals of the W*o*4–W*o*1 flip-flops and to register transfers which connect the output terminals of the W*a*3 flip-flops to corresponding input terminals of the W*o*9–W*o*6 flip-flops.

The P*wr* flip-flops 610 (FIG. 156) comprise a single digit register for providing temporary storage of certain digits to be transferred from the W*a*3-register to magnetic tape or to the Printer, and for accumulating the row parity bits of the word stored in the W*b*-register. The P*wr* flip-flops are adapted to receive the contents of the corresponding W*a*3 flip-flops upon application of the SW*a*2 clock signal to register transfers which connect the output terminals of the W*a*3 flip-flops to corresponding input terminals of the P*wr* flip-flops. Row parity generator 603 samples the bits in the W*b*7 flip-flops in order to accumulate row parity for the word in the W*b*-register. Row parity generator 603 comprises those portions of the circuits illustrated by the logical schematic diagrams for the register transfer input terminals of the P*wr* flip-flops of FIG. 156, which are enabled by the SP*wr* clock signal. The function of the P*wr* flip-flops in accumulating the row parity bits is described in detail in a following section "Write Buffer Data Transfer for Magnetic Tape Writing."

A T*w*-counter 611, which comprises the T*w*1–T*w*6 flip-flops (FIGS. 152 and 153) and which operates in 64 discrete states, is the source for fine timing and control of the shifting operations executed in the Write Buffer. The sequence of operations directed by the T*w*-counter is illustrated in the timing diagram of FIG. 242. A W*bk*-counter 612, which comprises the W*bk*1, W*bk*2, and W*bk*3 flip-flops (FIG. 154), and which operates in 8 discrete states, directs the number of data words transferred during a Write Buffer operation.

Other Write Buffer flip-flops are employed primarily to perform control functions. The B*bf* flip-flop (FIG. 154) signals that the first word of a block of data has been transferred to the Write Buffer and that the Write Buffer should commence its sequence of operations to write this first word and the remainder of the block onto magnetic tape or transfer the block to the Printer. The B*bf* flip-flop is also employed for terminating the transfer of a block of data words to the Printer. The E*ws* flip-flop (FIG. 151) functions as an alarm to notify the Central Processor that a particular malfunction in transferring data from Memory to the Write Buffer has taken place. The L*w* flip-flop (FIG. 155), when set, demands that the Central Processor perform an operation to transfer a word from Memory to the Write Buffer. The P*rt* flip-flop (FIG. 155) aids in controlling the Write Buffer when data is being transferred to the Printer. The W*b* flip-flop (FIG. 155), when on, indicates that one of the Tape Handlers is presently engaged in receiving a block of data from Memory through the Write Buffer. (The W*b* flip-flop is actually located in the Tape Control Unit, but is illustrated in FIG. 32 for purposes of clarity of the description, inasmuch as the Tape Control Unit will not be described in detail.) The W*bf* flip-flop (FIG. 151) is turned on when the Write Buffer receives a data word from Memory, to indicate that the Write Buffer is loaded and that the contents thereof are ready to be transferred to magnetic tape or to the Printer. The W*eb* flip-flop (FIG. 155), when on, indicates that the Write Buffer is busy transferring data from Memory to magnetic tape or to the Printer.

CLOCK CIRCUIT, WRITE BUFFER

The clock circuit of the Write Buffer (FIG. 33) provides clock pulse signals for application to flip-flops and register transfers to control respectively the entry of data into flip-flops and the transfer of data between flip-flops. The clock pulse drivers of the Write Buffer clock circuit may be gated to provide single clock pulses or clock pulses at the 250 kc. rate, or may be operated continuously. The logical schematic diagrams of the logical circuits providing gating signals to the Write Buffer clock pulse drivers of FIG. 33 are illustrated in FIG. 158.

The Write Buffer clock circuit comprises a continuous clock pulse driver 625 connected by lead 306 to receive continuous clock pulses at the 250 kc. rate from master clock pulse driver 302 of the Central Processor (FIG. 17). The clock pulses provided by clock pulse driver 625 are applied to continuous clock pulse drivers CD1 and CD2 and to the SP*wr*, SW*a*1, SW*a*2, SW*b*1/4, SW*b*5/7, SW*b*7–4, SW*ot*, SW*op*, and XMW*b* gated clock pulse drivers.

*Tape Handler*

The Tape Handler is adapted to write on magnetic tape the data received from the Write Buffer or to read the data stored on magnetic tape and to deliver this data to the Multiplex Buffer. The Tape Handler is also adapted to erase the data stored on the magnetic tape thereof. The Tape Handler is also adapted to drive the magnetic tape in the forward direction for reading or writing and in the backward direction for rewinding. The Tape Handler will also erase a certain portion of the information stored on the magnetic tape. Tape Handlers are well-known in the art and, therefore, will not be described in detail. Only those Tape Handler elements necessary to explain the operation of this invention will be described.

FIGURES 34 and 35 illustrate the scheme for storing data on magnetic tape and for reading the data therefrom. Data is stored on magnetic tape 640 in groups of data words, which are designated as data blocks 641. Each data block comprises 100 data words wherein each data word comprises eight tape digits. Each tape digit comprises five bits, four bits being the system code for a digit to be processed, as shown in Table I of the "Data Representation" section. The fifth bit of the tape digit is the column parity bit for the tape digit. Seven of the eight tape digits of each tape data word include the seven digits of the data word to be processed in the system and the seven corresponding column parity bits. The eight tape digit contains the five row parity bits for the tape data word.

Data is stored on the magnetic tape in 10 parallel tracks spaced across the tape, and extending parallel to the length of the tape. Ten bits are stored on a line substantially perpendicular to the length of the tape in the 10 tape tracks, which are numbered 1–10. The line on which the ten bits are stored perpendicularly to the length of the tape is termed a transverse recording position. The four data bits of one digit are stored in tracks 1–4 and the corresponding column parity bit in track 5. The four data bits of another digit are stored in tracks 6–9 and the corresponding column parity bit in track 10. Therefore, two tape digits are stored side-by-side in a transverse recording position.

A full tape data word is stored in four adjacent transverse recording positions, so that a data block of 100 words comprises 400 transverse recording positions. As shown in FIG. 35, the row parity digit and the 6th, 4th, and 2nd tape digits of the tape data word are stored in tracks 1–5 and the 7th, 5th, 3rd, and 1st tape digits are stored in tracks 6–10. The spacing between transverse recording positions and the speed of the tape are adjusted so that a transverse recording position is recorded or read approximately once during each 16 clock periods. Therefore, the reading or writing of a complete data word occurs in approximately 64 clock periods.

A plurality of writing heads 642, one opposite each track, are adapted to write data on the magnetic tape in the corresponding track. During the writing process, current is passed continuously through the write head in a direction to magnetize to saturation the corresponding track in a direction parallel to the length of the tape. The direction of this write head current depends on the data to be written. Only 0-bits are stored on magnetic tape. A 0-bit is denoted by a reversal in the direction of saturation in a track. Therefore, whenever a writing head is to write a 0, the current in the winding thereof is reversed. A 1-bit is represented by the absence of any change of magnetic field direction in a transverse recording position.

A plurality of reading heads 643, one opposite each track, are adapted to sense the magnetic field provided by the corresponding track and to deliver an output pulse wherever a 0-bit is sensed. Where a 1-bit is represented, no output signal is delivered by the corresponding read head.

The individual data bits and the representation in which they are stored are illustrated in FIG. 35. The arrows indicate the magnetic saturation of a track in the direction indicated. Thus, at the transverse recording position for the 4th digit, the 1st, 3rd, and 4th tracks have the saturation direction therein reversed, whereas the 2nd, and 5th tracks have the saturation direction unchanged. Consequently, the column parity bit for the 4th digit is a 1 and the four data bits in tracks 4–1 are respectively 0010. The table below illustrates the data word represented in FIG. 35.

DATA DIGITS ON MAGNETIC TAPE (FIG. 35)

| Row parity digit | 7th | 6th | 5th | 4th | 3rd | 2nd | 1st |
|---|---|---|---|---|---|---|---|
| 0 | 1 | 1 | 0 | 1 | 0 | 0 | 1 |
| 1 | 0 | 0 | 0 | 0 | 0 | 0 | 0 |
| 0 | 0 | 1 | 0 | 0 | 0 | 0 | 0 |
| 1 | 1 | 0 | 1 | 1 | 1 | 0 | 0 |
| 0 | 0 | 0 | 1 | 0 | 1 | 0 | 1 |

The bits below the horizontal ruled line and to the right of the vertical ruled line are the data bits. The top row of bits are the column parity bits for the corresponding digits. The bits in the 2nd, 3rd, 4th, and 5th rows of the left-hand column are the row parity bits for the corresponding rows. The bit in the first row of the left-hand column is the column parity bit for that digit. No row parity bit is provided for the first row.

A block marker track provides indicia thereon for notifying the Write Buffer of the area on the magnetic tape wherein a data block is to be written and for notifying the Read Buffer of the location of the data block. Three block markers are employed, designated respectively as the $\alpha$-block marker, $\beta$-block marker, and $\gamma$-block markers. Each different block marker comprises a different number of recorded 0's. A block marker analyzer 644 (FIG. 35) receives the signals provided by the read head 643', which detects the magnetic field of the block marker track. In response to the signals received, the block marker analyzer provides a plurality of output signals identifying the respective block markers. Thus, if data is to be read from tape, the $\beta$-block marker, when sensed, will cause the block marker analyzer to deliver the synchronizing R*sy* signal and the $\gamma$-block marker, when sensed, will cause the block marker analyzer to deliver the R*ed* signal. Similarly, if data is to be written on the tape, when the block marker analyzer senses the $\alpha$-block marker, the W*sy* signal will be delivered and when the analyzer senses the $\gamma$-block marker signal, the W*ed* signal will be delivered. The $\alpha$ and $\beta$ signals are used to denote the beginning of the block for the respective write and read operations. The $\gamma$-block marker is used to denote the end of the block in order to terminate a read or write operation.

Only one Tape Handler may be reading and one Tape Handler writing at any given time, inasmuch as the Read Buffer can only receive data from one Tape Handler and the Write Buffer can only deliver data to one Tape Handler. The address of the Tape Handler which is writing data is stored in the W*t* flip-flops (FIG. 157) of the Tape Control Unit. In response to the Tape Handler address stored in the W*t* flip-flops, the corresponding N*a*(*i*) signal (FIG. 158) issues to actuate one of the relays shown in FIG. 36, to couple the 10 write drivers to the corresponding write heads 642 of the addressed Tape Handler. Thus, if Tape Handler #2 is addressed by the W*t* flip-flops, the signal N*a*2 will issue and couple the 10 write drivers to the 10 write heads 642 of the second Tape Handler.

The address of the Tape Handler which is reading data is stored in the R*t* flip-flops (FIG. 178). In response to the Tape Handler address stored in the R*t* flip-flops, the corresponding N*r*(*i*) signal (FIG. 183) issues to enable the output gates of the read preamplifiers (FIG. 37) of the addressed Tape Handler. Thus, if Tape Handler #4 is addressed by the R*t* flip-flops, the signal N*r*4 will issue and enable the 10 read preamplifiers, corresponding to the 10 data tracks of the fourth Tape Handler.

Each of the 10 write heads 642 of the addressed Tape Handler is coupled to a respective one of 10 write drivers (FIG. 36) through appropriate relays 653, 654, etc. actuated by the corresponding N*a*(*i*) signals. Ten read preamplifiers 660, 661, 662, etc., corresponding to data tracks 1–10, are provided for each Tape Handler and are coupled to the corresponding read heads 643, 643', 643'', etc., thereof (FIG. 37). The read preamplifiers of a particular Tape Handler are enabled by the corresponding N*r*(*i*) signal only when that Tape Handler is addressed. The read preamplifiers of all the Tape Handlers for a given track number are coupled to a common read amplifier 663, by connecting to an input OR-gate of the read amplifier.

A read preamplifier (FIG. 38) is permanently connected to the output winding of each read head in a Tape Handler. Input terminals 665 and 666 are connected directly to the output winding of a read head 643. The signal applied to terminals 665 and 666 is coupled to the respective base electrodes of transistors 667 and 668. Transistors 667 and 668 and their associated circuits comprise a difference amplifier. The output signal of the difference amplifier is taken from the collector electrode 670 of transistor 668. As described previously, only 0's are recorded as magnetic changes in the tape track. Therefore, successive 0's will induce voltages of opposite polarity in the output winding of the corresponding read head. These voltages will appear as pulses of opposite polarity at input terminals 665 and 666 and, consequently, will be amplified and appear as pulses of opposite polarity at collector electrode 670. Thus, the output signal of the difference amplifier delivered at collector electrode 670 will be a series of alternately positive and negative pulses, each pulse occurring when a 0 is read by the corresponding read head.

The output signal of the difference amplifier is coupled through an emitter follower comprising transistor 671 to a variable gain amplifier circuit comprising transistors 672 and 673 and their associated circuits. A potentiometer 674 is provided to adjust the gain of the variable gain amplifier to compensate for variations in read head output levels and for variations in the overall gain of the amplifier chain. The output signal of the variable gain amplifier is taken from the emitter electrode 675 of transistor 673. The alternately positive and negative polarity pulses at emitter electrode 675 each has an amplitude of approximately 1 v.

The output signal of transistor 673 is applied to one input terminal 676 of an AND-gate 677. Normally, AND-gate 677 is disabled by a −5 v. signal applied to its other input terminal 678. However, when a Tape Handler is addressed to read data, the corresponding N*r*(*i*) signal is transferred to its 1-state and enables the corresponding read preamplifier output AND-gate 677. For example, the read preamplifier illustrated in FIG. 38 is in Tape Handler #4, so that when Tape Handler #4 is addressed to read a block of data from its magnetic tape, the signal N*r*4 enters the 1-state, thereby enabling AND-gate 677. With AND-gate 677 enabled, the signal delivered by transistor 673 is coupled to the preamplifier output terminal 679.

The output signal delivered by a read preamplifier is designated as the signal DRO(*i*). For example, the output signal DRO9 of FIG. 38 designates the output signal of a read preamplifier connected to read the data stored in track 9 of a Tape Handler. The output terminals of all read preamplifiers which read data from like-numbered data tracks are connected to the input OR-gate of a single read amplifier (FIG. 37). However, only the read preamplifiers of the addressed Tape Handler will deliver signals to the corresponding read amplifier.

*Tape Control Unit*

The Tape Control Unit 17 (FIG. 1) is adapted to direct one of the Tape Handlers to read data from the magnetic tape thereof and to deliver this data to the Read Buffer; to direct one of the Tape Handlers to write data provided by the Write Buffer on the magnetic tape thereof; and to direct one of the Tape Handlers to back the magnetic tape thereof one block, to back the tape one block and erase one set of block markers, or to rewind the tape completely. Only those elements of the Tape Control Unit necessary to an understanding of this invention are illustrated and described herein. These elements are illustrated in various figures and their operation in cooperation with other components of the system is provided in the instruction descriptions. These elements of the Tape Control Unit are: the R*t*-register; the W*t*-register; the S-register; the R*b* and W*b* flip-flops; the CD3, X*r*1, and X*r*2 clock pulse drivers; logic circuits for generating the N*rb* and N*wb* signals; logic circuits for generating the N*a* and N*r* signals; logic circuits for generating the NB*td*(*i*) signals; the write drivers; and the F*tr* read amplifiers. Additionally, the R*wd* signal issues when a Tape Handler is rewinding the tape thereof. This signal may be interrogated by an Instruction 54.

The four-bit R*t*-register (FIG. 178) stores the identification of the Tape Handler that is to transfer one block of data from the magnetic tape thereof to the Read Buffer. This identification is transferred into the R*t*-register during execution of an Instruction 65.

The four-bit W*t*-register (FIG. 157) stores the identification of the Tape Handler that is to receive and to record on the magnetic tape thereof one block of data from the Write Buffer. This identification is transferred into the W*t*-register during execution of an Instruction 66 or an Instruction 68. The W*t*-register also stores the identification of the Tape Handler which is to have the magnetic tape thereof backed one block, or backed one block and the corresponding block markers erased. This identification is transferred into the W*t*-register during execution of a corresponding Instruction 67.

The S-register (FIGS. 179–181) comprises one flip-flop for each Tape Handler. The S-register, when set, controls the rewinding of the magnetic tape of the corresponding Tape Handler. Thus, the S(*i*) flip-flop, when set, causes the rewinding of the *i*th Tape Handler. An S flip-flop is set during execution of an Instruction 67 that identifies the Tape Handler to be rewound.

The R*b* flip-flop (FIG. 175), when on, indicates that one of the Tape Handlers is presently engaged in transmitting a block of data to Memory through the Read Buffer, and also controls the gating of the selected Tape Handler read preamplifier output signals to the F*tr*(*i*) read amplifiers.

The W*b* flip-flop (FIG. 155), when on, indicates that one of the Tape Handlers is presently engaged in receiving a block of data from the Memory through the Write Buffer, and also controls the application of the write driver output signals to the write heads of the selected Tape Handler.

The Tape Control Unit clock pulse drivers CD3, X*r*1, and X*r*2 provide clock pulse signals for application to flip-flops of the Tape Control Unit to control the entry of data into these flip-flops. The CD3 clock pulse driver operates continuously at the 250 kc. rate. The X*r*1 and X*r*2 clock pulse drivers are gated to provide single clock pulses or clock pulses at the 250 kc. rate. The logical schematic diagrams of the logical circuits providing gating signals to the X*r*1 and X*r*2 clock pulse drivers are illustrated in FIG. 183. These logical schematic diagrams are included with those of the Read Buffer for simplicity. The Tape Control Unit clock circuit, which includes the clock pulse drivers CD3, X*r*1, and X*r*2 is illustrated in FIG. 33. The Tape Control Unit clock circuit comprises a continuous clock pulse driver 629 connected by lead 306 to receive continuous clock pulses at the 250 kc. rate from master clock pulse driver 302 of the Central Processor (FIG. 17). The clock pulses provided by clock pulse driver 629 are applied to the input terminals of the CD3, X*r*1, and X*r*2 clock pulse drivers.

The N*rb* logical combination signal issues during execution of an Instruction 65 to control the transfer of the designated Tape Handler address from the LSD position of the A-register to the R*t*-register in the Tape Control Unit. Although the logical schematic diagram of the circuit for generating the N*rb* signal is not illustrated in the drawings, it may be here illustrated as follows:

$$Nrb = Rebd\ \overline{Rb}$$

The N*wb* logical combination signal issues during execution of an Instruction 66, 67, or 68 to control the transfer of the designated Tape Handler address from the LSD position of the A-register to the W*t*-register in the Tape Control Unit. Although the logical schematic diagram of the circuit for generating the N*wb* signal is not illustrated in the drawings, it may be here illustrated as follows:

$$Nwb = Webd\ \overline{Wb}$$

The N*a*(*i*) logical combination signal issues, in response to the state of the W*t*-register, to energize 10 write head relays (FIG. 36) to connect the 10 write drivers of the Tape Control Unit to the corresponding write heads of the addressed Tape Handler. The logical schematic diagrams for generating the N*a*(*i*) signals are illustrated, for convenience, in FIG. 158.

The N*r*(*i*) logical combination signal issues, in response to the state of the R*t*-register, to enable the read preamplifiers connected to the read heads of the addressed Tape Handler. The logical schematic diagrams for generating the N*r*(*i*) signals are illustrated, for convenience, in FIG. 183.

The NB*td*(*i*) logical combination signal is generated by the *i*th Tape Handler and the Tape Control Unit to reset the corresponding S(*i*) flip-flop when the Tape Handler addressed thereby has been completely rewound.

A write driver (FIG. 36) is provided for each of the W*o* flip-flops of the Write Buffer. The write driver couples the W*o* flip-flops to the corresponding write heads of the Tape Handler that is presently writing data on magnetic tape. The exemplary write driver of FIG. 36 responds to the state of the W*o*3 flip-flop to record corresponding data on track 3 of the magnetic tape of the addressed Tape Handler. The write driver transmits sufficient current through the winding of the corresponding write head to saturate track 3 of the magnetic tape in a direction determined by the W*o*3 flip-flop.

Assume that the W*o*3 flip-flop is in the 1-state. A +6 v. signal is applied to the base electrode of transistor 649 and a −5 v. signal to the base electrode of transistor 650. Transistors 649 and 650 function as emitter followers and therefore provide at the corresponding emitter electrodes thereof the respective +6 v. and −5 v.

signals. Transistors 651 and 652 have the emitter electrodes thereof grounded. Therefore, the +6 v. coupled through a resistor to the base electrode of transistor 651 causes this transistor to be cut off, and the −5 v. coupled through a resistor to the base electrode of transistor 652 causes this transistor to conduct. Therefore, the collector electrode of transistor 651 will be negative with respect to that of transistor 652 and current will flow from junction 657 through the connected write head winding to junction 656.

Conversely, if the W*o*3 flip-flop is in the 0-state, current will flow from junction 656 through the connected write head winding to junction 657.

The Tape Handler address stored in the W*t*-register directs the issuance of the corresponding N*a*(*i*) signal, which actuates the corresponding one of relays 653, 654, etc. When one of relays 653, 654, etc. is actuated, the winding of the corresponding read head 642, 642', etc. receives the current provided by the write driver and magnetizes to saturation the adjacent tape track in a direction controlled by the state of the corresponding W*o* flip-flop.

The F*tr* read amplifier receives the output signals delivered by the enabled read preamplifier connected thereto (FIG. 37) and converts these signals into form suitable for transmission to the R*a*-register of the Read Buffer (FIG. 40).

The read amplifiers are denoted by the inclusive symbols F*tr*1–10, and are adapted to receive the data read from the correspondingly numbered tape tracks of the Tape Handler reading data. A single read amplifier is provided in the Tape Control Unit for like numbered tape tracks of all the Tape Handlers. Thus, as shown in FIG. 37, each read preamplifier coupled to receive the data read from track 9 of the corresponding Tape Handler is connected to the single F*tr*9 read amplifier. However, only the read preamplifier of the Tape Handler then reading data, is enabled by the corresponding N*r*(*i*) logical combination signal, as directed by the R*t*-register.

In the F*tr* read amplifier, shown in detail in FIG. 39, an input OR-gate 701 is connected to receive the output signals of the corresponding read preamplifiers. The output terminals 679 (FIG. 38) of approximately one-half of the corresponding read preamplifiers are connected directly to input terminal 702 and the output terminals of the remaining corresponding read preamplifiers are connected directly to input terminal 703.

The signal received by the read amplifier has pulses, due to binary 0's recorded on tape, which are approximately 1 volt in amplitude and either positive or negative in polarity. It is the function of the read amplifier to convert each of these pulses to the conventional voltage level for data processing. Additionally, the read amplifier will reject spurious and other noise signals received thereby which do not satisfy predetermined criteria of amplitude and duration. The circuits of the read amplifier following OR-gate 701 are adapted to sense the received signal to determine if the signal contains a pulse whose amplitude is greater than a predetermined value and whose length is greater than a predetermined duration. If the received signal satisfies these criteria, the read amplifier will deliver an output signal representing a binary 0. If such a signal is not received, the read amplifier delivers a signal representing a binary 1.

The input signal is first applied to the base electrode of a transistor 705 of a feedback amplifier, designed for stable gain. The feedback amplifier comprises transistors 705 and 706 and their associated circuitry. In the feedback amplifier output signal, taken from the emitter electrode of transistor 706, the pulses representing binary 0's have an amplitude of approximately 7.5 v. This output signal is applied to the base electrode of a transistor 708, which, with transistor 709 and associated circuitry, comprises a threshold detector circuit. This threshold detector provides an output signal only when the input signal applied thereto exceeds a predetermined positive voltage level. Conversely, transistors 710 and 711 and their associated circuitry comprise a threshold detector which provides an output signal only when the signal applied thereto is less than a predetermined negative voltage level.

The output signals of both threshold detectors are applied to the base electrode of transistor 714 of a transistor amplifier. The output signal of transistor 714 is applied to a following amplifier comprising transistor 715. The output signal delivered by transistor 715 is applied to a pulse duration detector circuit, comprising transistor 716. The pulse duration detector provides an output signal only when the signal applied thereto exceeds a predetermined duration. The output signal of the pulse duration detector is applied to the base electrode of a transistor 717 of a flip-flop 718.

Flip-flop 718 comprises the transistors 717 and 719 and associated circuitry. This flip-flop is similar to that described previously and illustrated in FIG. 4. The output signals delivered by flip-flop 718 represent the data read by the corresponding read head. If no 0-bit has been read from tape, the flip-flop 718 delivers a 1-output signal at its output terminal 721. If, however, a 0-bit has been read from tape, flip-flop 718 delivers a 0-output signal at its terminal 722. Transistors 723 and 724 amplify the flip-flop output signals and provide the corresponding output signals of terminals 721 and 722. Whenever all five bits of a complete tape digit have been transferred from five read amplifiers to the Read Buffer, the flip-flops 718 of these five read amplifiers are preset to the 1-state by the clock signal X*r*1 or X*r*2, applied to input terminal 725. The clock signal X*r*1 presets the F*tr*1–F*tr*5 read amplifiers and the clock signal X*r*2 presets the F*tr*6–F*tr*10 read amplifiers. Thus, immediately following receipt of a tape digit by the Read Buffer from a group of five read amplifiers, the flip-flops of these read amplifiers are set to the 1-state, and remain in the 1-state, unless a 0-bit is read from the corresponding tape tracks.

The response of the read amplifier to the signals delivered by transistor 706 will now be described. The circuits will first be analyzed under quiescent conditions; that is, in the absence of any pulses delivered by transistor 706. The base electrode of transistor 708 is at ground potential (0 v.); and transistor 708 is enabled to conduct by current flowing through a resistor 727. Therefore, the emitter electrode of transistor 709, which is connected to the emitter electrode of transistor 708, is approximately at 0 v. The base electrode of transistor 709 is maintained at approximately +1.4 v. by current flow through diodes 728 and 729, so that transistor 709 is held non-conducting. Thus, the output transistor 709 of the positive threshold detector is non-conducting in the quiescent state. Transistor 711 is normally conducting and the base electrode thereof is maintained at the −1.4 v. level by current flow through diodes 730 and 731. Therefore, the emitter electrode of transistor 710, which is connected to the emitter electrode of transistor 711, is held at −1.4 v. Transistor 710 is consequently cut off due to the 0 v. potential applied to the base electrode thereof from the emitter electrode of transistor 708. Thus, the output transistor 710 of the negative threshold detector is non-conducting in the quiescent state.

Transistor 714 is normally cut off and transistor 715 is normally conducting heavily because of the corresponding bias voltages applied thereto. With transistor 715 conducting heavily, the −5 v. signal delivered by the collector electrode thereof is applied to the base electrode of the transistor 716. Since the emitter electrode of transistor 716 is grounded, this transistor is held cut off in the quiescent state. The presetting of flip-flop 718 to the 1-state, renders transistor 717 normally conducting and transistor 719 normally cut off. The level of the emitter electrode of transistor 717 is maintained at +8 v.

Consider now the application of a pulse to the base electrode of transistor 708. If the pulse is positive, the voltage thereof will be coupled through the emitter electrode of transistor 708 to the emitter electrode of transistor 709. Transistor 709 will thereupon commence conducting if this pulse exceeds +1.4 v. When transistor 709 conducts, the emitter electrode thereof is clamped to +1.4 v., so that transistor 708 is forced into non-conduction. If the pulse applied to transistor 708 is negative, the voltage thereof is coupled through the emitter electrode of transistor 708 to the base electrode of transistor 710. Transistor 710 will thereupon commence conducting if this pulse is more negative than —1.4 v., and will, in turn, cut off transistor 711, whose base electrode is maintained at —1.4 v. Therefore, if the input pulse exceeds 1.4 v. in amplitude one of the two threshold detector output transistors 709 or 710 commences conducting.

The conduction of transistors 709 or 710 provides a voltage at the collector electrodes thereof which is sufficiently positive with respect to the —7.5 v. bias on the emitter electrode of transistor 714 to cause transistor 714 to commence conducting. The conduction of transistor 714 causes application of an approximately —7.5 v. signal to the base electrode of transistor 715, which thereupon ceases conduction.

When transistor 715 ceases conduction, the —5 v. output signal thereof is removed from the collector electrode of transistor 716, and capacitor 733 commences charging positively through resistor 734. Capacitor 733 will charge positively from —5 v. until it reaches 0 volt, whereupon transistor 716 commences conducting. The time required for capacitor 733 to charge to 0 volt from its original —5 v. level is approximately 4 μsec. If the amplitude of the input pulse does not exceed 1.4 v. for 4 μsec., or greater, transistor 715 commences conducting once again before the capacitor 733 can charge to the 0 v. level. Conduction of transistor 715 discharges capacitor 733, so that transistor 716 does not become conducting. Therefore, capacitor 733, resistor 734, and transistor 716 constitute a pulse duration detector, providing an output signal only if the input signal applied thereto exceeds 4 μsec. in duration. Therefore, the read amplifier will not respond to extremely short duration pulses even though they be of high level of amplitude, but will respond to pulses provided by a binary 0 on the magnetic tape, since the binary 0 produces a pulse of about 25 μsec. duration.

When transistor 716 conducts, the collector electrode thereof is established at approximately 0 v., and capacitor 735 charges to +6 v. When the read amplifier input pulse decreases and transistor 715 once again commences conducting, transistor 716 cuts off. The collector electrode of transistor 716 thereupon rises to the +8 v. level, causing a signal having a +14 v. level to be coupled to the base electrode of transistor 717. This +14 v. signal cuts off transistor 717, and flip-flop 718 transfers to the 0-state, where it remains until once again preset to the 1-state by the clock signal *Xr*1 or *Xr*2.

Thus, the flip-flop of the *Ftr* read amplifier is preset to the 1-state after each digit has been read from tape and is transferred to the 0-state only if an input pulse of satisfactory amplitude and duration is received by the read amplifier.

*Read Buffer*

The Read Buffer temporarily stores data being transferred from a Tape Handler or the Character Reader to Memory. A succeeding section "Read Buffer Operations" provides details of the operation of the Read Buffer in effecting the following types of data transfer:

(*a*) The storing in consecutive memory locations of one block of 100 data words from magnetic tape, and (*b*) the storing in consecutive memory locations of one line of data read from a document by the Character Reader.

Each of these types of data transfer is initiated by an appropriate programmed instruction (65), executed in the Central Processor, but continued and carried to completion under control of the Read Buffer.

The Read Buffer comprises a register for temporarily storing the data being transferred through the Read Buffer, register transfer and logic circuits for transferring data into and through the register, clock pulse drivers for controlling the timing of the Read Buffer, a counter, and flip-flops employed as control signal sources. FIGURE 40 illustrates symbolically the elements of the Read Buffer which store data, the paths of data transfer between these elements, and certain control elements. The details of the circuit structure of the Read Buffer are provided in FIGS. 159–177, which illustrate flip-flop input logical schematic diagrams; FIG. 182, which illustrates one-shot input logical schematic diagrams; and FIG. 183, which illustrates designated logical combination signal diagrams and clock pulse driver gating signal diagrams.

The 4-digit R*a*-register 740 and the 7-digit R*b*-register 741 temporarily store the data being transferred through the Read Buffer. The logical schematic diagrams of the R*a*-register are illustrated in FIGS. 159–162 and those of the R*b*-register are illustrated in FIGS. 163–169.

The contents of the R*a*4–R*a*1 flip-flops of the R*a*-register are shifted-up upon application of the SR*a* clock signal to register transfers which connect the R*a*1–R*a*4 digit positions of the R*a*-register. The R*a*1 flip-flops are adapted to receive the contents of the corresponding R*in*1–R*in*4 flip-flops upon application of the SR*a* clock signal to register transfers which connect the output terminals of the R*in*1–R*in*4 flip-flops to corresponding input terminals of the R*a*1 flip-flops. The R*a*4 flip-flops are adapted to receive the corresponding C*rd*4–C*rd*1 output signals of the Sorter Control Unit (FIG. 43) upon application of the (T*r*1 $\overline{Tr3}$ C*ha*) signal to logical gates which connect output terminals of the Sorter Control Unit to corresponding input terminals of the R*a*4 flip-flops. The contents of the R*a*4 flip-flops may be transmitted to the R*b*1 or R*b*7 flip-flops of the R*b*-register.

The contents of the R*b*6–R*b*1 flip-flops of the R*b*-register are shifted-up upon application of the SR*b* clock signal to register transfers which connect the R*b*6–R*b*1 digit positions of the R*b*-register. The contents of the R*b*6 flip-flops are transferred to the corresponding R*b*7 flip-flops upon application of the (T*r*2 $\overline{Tr4}$ $\overline{Tr5}$ $\overline{Cha}$) signal to logical gates which connect the output terminals of the R*b*6 flip-flops to corresponding input terminals of the R*b*7 flip-flops. The R*b*1 flip-flops are adapted to receive the contents of the corresponding R*a*4 flip-flops upon application of the SR*b* clock signal to register transfers which connect the output terminals of the R*a*4 flip-flops to corresponding input terminals of the R*b*1 flip-flops. The R*b*7 flip-flops are adapted to receive the contents of the corresponding R*a*4 flip-flops upon application of the R*p*1 logical combination signal to logical gates which connect the output terminals of the R*a*4 flip-flops to corresponding input terminals, of the R*b*7 flip-flops. The contents of the R*b*-register may be transmitted by parallel shift to the M-register. In this parallel shift only the 1-output signals of the R*b* flip-flops are applied to the corresponding M flip-flops. The contents of the R*b*7 flip-flops may be transmitted to the row parity check circuit 743.

The R*in*6–R*in*10 flip-flops comprise one tape digit input register for the Read Buffer and receive the tape digits read from tracks 6–10 of the magnetic tape of the Tape Handler reading data. The R*in*6–R*in*10 flip-flops are adapted to receive the contents of the flip-flops of the corresponding F*tr*6–F*tr*10 read amplifiers upon application of the (R*ds*2 D*sy*2) signal to logical gates which connect the output terminals of the F*tr*6–F*tr*10 amplifiers to corresponding input terminals of the R*in*6–R*in*10 flip-flops. The contents of the R*in*6–10 flip-flops are adapted to be transferred to the corresponding R*in*1–5 flip-flops.

The R*in*1–R*in*5 flip-flops comprise the other tape digit input register for the Read Buffer and are adapted to receive the tape digits read from tracks 1–5 of the magnetic tape of the Tape Handler reading data. The R*in*1–R*in*5 flip-flops are adapted to receive the contents of the flip-flops of the corresponding F*tr*1–F*tr*5 read amplifiers upon application of the (R*ds*1 D*sy*1) signal to logical gates which connect the output terminals of the F*tr*1–F*tr*5 amplifiers to corresponding input terminals of the R*in*1–R*in*5 flip-flops. The R*in*1–R*in*5 flip-flops are also adapted to receive the contents of the corresponding R*in*6–R*in*10 flip-flops upon application of the SR*in* clock signal to register transfers which connect the output terminals of the R*in*6–R*in*10 flip-flops to corresponding input terminals of the R*in*1–R*in*5 flip-flops. The contents of the R*in*1–R*in*4 flip-flops may be transmitted to the R*a*1 flip-flops of the R*a*-register. The contents of the R*in*1–R*in*5 flip-flops may be transferred to the column parity check circuit 744.

The row parity check circuit 743 samples the contents of the R*b*7 flip-flops to determine if each set of eight bits of like bit order in the word received from tape contains an odd number of 0's. The column parity check circuit 744 samples the contents of the R*in*1–R*in*5 flip-flops to determine if the five bits of each tape digit received has an odd number of 0's. If a parity error is detected by the row parity check circuit 743 or the column parity check circuit 744, the E*rs* flip-flop 745 is set (FIG. 174).

A T*r*-counter 746, which comprises the T*r*1–T*r*5 flip-flops (FIGS. 173 and 174) and which operates in 17 discrete states, is the source for fine timing and control of the shifting operations executed in the Read Buffer.

Other Read Buffer flip-flops are employed primarily to perform control functions. The C*fs* flip-flop (FIG. 177) directs the Read Buffer to read a line of data from but one document. The C*ha* flip-flop (FIG. 175) aids in controlling the Read Buffer when data is being transferred thereto from the Character Reader. The C*su* flip-flop (FIG. 177) denotes the failure to read any data from a tape block during a Read Buffer operation, and is employed when the Character Reader is transferring data to the Read Buffer to aid in controlling the T*r*-counter. The D*sy*1, 2, H*af*, and R*ds*1, 2 flip-flops (FIGS. 174 and 176) are employed in the data retiming circuit, illustrated in FIG. 41, to gate the digits received by the read amplifiers from each tape half to the corresponding one of the Read Buffer digit input registers R*in*1–5 and R*in*6–10. (The data retiming circuit is described in the "Read Buffer Operations" section to follow.) The E*oc* flip-flop (FIG. 177) is employed when the Character Reader is supplying data to the Read Buffer to signal that the end of the line of data has been reached by the Character Reader. The R*b* flip-flop (FIG. 175), when on, indicates that one of the Tape Handlers is presently engaged in transferring a block of data to the Memory through the Read Buffer. (The R*b* flip-flop is actually in the Tape Control Unit, but is illustrated in FIG. 40 for purposes of clarity of the description, inasmuch as the Tape Control Unit is not described in detail.) The R*eb* flip-flop (FIG. 175), when on, indicates that the Read Buffer is busy receiving data from a Tape Handler or from the Character Reader. The U*r* flip-flop (FIG. 175), when set, demands that the Central Processor perform an operation to transfer the word in the R*b*-register to Memory.

The Y*td*1 and Y*td*2 one-shots (FIG. 182) function in the data retiming circuit to control the amount of magnetic tape skew which will be tolerated.

CLOCK CIRCUIT, READ BUFFER

The clock circuit of the Read Buffer (FIG. 33) provides clock pulse signals for application to flip-flops and register transfers to control respectively the entry of data into flip-flops and transfer of data between flip-flops. This clock circuit also provides clock pulses to control the triggering of one-shots. The clock pulse drivers of the Read Buffer clock circuit may be gated to provide single clock pulses or clock pulses at the 250 kc. rate, or may be operated continuously. The logical schematic diagrams of the logical circuits providing gating signals to the Read Buffer clock pulse drivers of FIG. 33 are illustrated in FIG. 183.

The Read Buffer clock circuit comprises the continuous clock pulse driver 625, previously described in the "Write Buffer" section. The clock pulses provided by clock pulse driver 625 are applied to continuous clock pulse drivers CD1 and CD2 and to the SR*a*, SR*b*, S*in*1, S*in*2, SR*in* gated clock pulse drivers.

*Printer*

The Printer 23 of FIG. 1 receives data words from the Write Buffer and prints a visible representation of these words. Many types of printers are known in the art and no specific type will be described here. A useful printer for employment with this invention is the printer identified as the "on-the-fly" printer, employing a type wheel which revolves continuously and has accurately timed hammers to strike the paper when the correct type character is opposite the line of type to be printed.

The Printer receives data, one digit at a time, from the Write Buffer and stores this data until a full line is to be printed, at which time the line is reproduced on the paper. The operation of the Printer in cooperation with the Write Buffer is described in a succeeding section "Write Buffer Data Transfer for Printer." Only those signals which are employed in the description of this invention will be described in this section. The Printer receives the following signals from the Write Buffer or Central Processor:

P*rt*: This signal issues during an operation wherein the Printer is to receive a block of 100 data words from the Write Buffer. This operation is initiated by execution of an Instruction 66 or 68.

B*bs*: This signal issues when $Tw=2$ in the first T*w*-cycle of the Write Buffer (FIG. 242) to notify the Printer that the first word is ready to be transferred thereto, W*o*1–4 and W*o*6–9: These signals constitute the two output digits that are simultaneously made available in the output flip-flops of the Write Buffer. These signals are interpreted by the Printer and are employed to set up the line to be printed.

W*os*: This signal issues when $Tw=10$, 26, 42, and 58 to notify the Printer that two digits are available in the W*o* flip-flops. The Printer then accepts these digits, one at a time.

The Printer transmits the signal L*pr* following receipt thereby of the signal P*rt*, to notify the Write Buffer that the Printer has been turned on and is ready to receive data.

*Sorter and Character Reader*

Sorter 21 and Character Reader 22 provide for the automatic reading of data borne by documents, such as bank checks, the delivery of this data to the Sorter Control Unit 20, and the sorting of these documents into Sorter pockets under control of signals received from the Sorter Control Unit. The Sorter stores a stack of documents to be read by the Character Reader and to be subsequently sorted; delivers the documents, one at a time, to apparatus for automatically reading the data thereon, this data being imprinted in magnetic ink; and then sorts these documents into Sorter pockets, as directed by signals received from the Sorter Control Unit. The Character Reader responds to the signals read by the automatic reading apparatus to deliver an encoded representation of the data on the documents to the Sorter Control Unit. A Sorter useful in the embodiment of this invention is described in the copending United States patent application by N. R. Crain et al., filed September 12, 1959, Serial No. 839,836, now Patent No. 3,108,694, for a Sorter Control, which is assigned to the same assignee as the instant invention. A Character Reader and automatic reading apparatus useful in the embodiment of this invention is described in the two copending United States patent applications by P. E. Merritt and C. M. Steele, one filed October 31, 1957, Serial No. 693,773, now Patent No. 2,924,812, for an Automatic Reading System, and the other filed December 29, 1958, Serial No. 783,350, now Patent No. 3,092,809, for Spurious Signal Suppression in Automatic Symbol Reader, both of which are assigned to the same assignee as the instant invention.

The Sorter, which is illustrated schematically in FIG. 42, is driven by a motor 801. Motor 801 is energized upon closure of the START SORTER switch 802 and provides mechanical power by the linkages illustrated schematically for the various belt-driving pulleys, drums, and timer discs of the Sorter. When the START SORTER switch is closed, a relay 803 is energized to deliver a signal representing a binary 1, and denoted as the R*sr* signal, to the Central Processor to indicate that Sorter power is on and that the Sorter is running. Although closure of the START SORTER switch 802 prepares the Sorter to feed documents for automatic reading and sorting, the Sorter must receive an additional signal before the documents are actually processed thereby.

A stack 805 of the documents to be read are held against a base plate 806 by a spring-loaded pressure plate, which is not shown. A continuously rotating cam 807 is provided to feed the bottom document of the stack into the transport mechanism of the Sorter, when this bottom document rests against the cam. However, in the absence of the C*of* signal provided by the Sorter Control Unit, a lever 808 maintains the bottom document of the stack spaced from cam 807. Upon receipt of the C*of* signal from the Sorter Control Unit (see the following description of Instruction 58) solenoids 809 and 809' are energized, thereby causing lever 808 to pivot into a depression provided in cam 807, and allowing the bottom document of the stack to come into contact with cam 807. The C*of* signal also actuates a valve 810, which provides vacuum at orifice 811. Cam 807 forces the bottom document into the region between the oppositely-moving belts 812 and 813. When apertures 814 in belt 812 are opposite orifice 811, the document between belts 812 and 813 is attracted to belt 812 and moves therewith. Belt 813, which moves in a direction opposite the direction of motion of the bottom document, insures that only one document is fed by the document transport mechanism. Therefore, when the C*of* signal is present, the document is moved by belt 812 to the periphery of a drum 816, which, in turn, transports the document to the automatic reading apparatus. The automatic reading apparatus comprises a lamp 817, a photocell 818, a magnet 819, and a transducer 820. Lamp 817 directs a beam of light on photocell 818. Photocell 818 delivers a significant output signal when the reference (leading) edge of a document interrupts the beam of light. Magnet 819 magnetizes the line of information on the document which is to be read, this line of information being imprinted on the document with magnetizable material. Transducer 820 responds to the magnetic field of the magnetized information on the document and delivers corresponding signals to Character Reader 22. The document is then transported to the right in FIG. 42 by the transport mechanism and enters a Sorter pocket in accordance with signals received from the Sorter Control Unit. The signals received from the Sorter Control Unit are delivered thereto by the Central Processor, after the Central Processor has processed the information borne on the document.

The bank check of FIG. 45 exemplifies documents bearing data imprinted in magnetizable material, from which the automatic reading apparatus, FIG. 42, extracts information. The reference edge of the document is that which first interrupts the light beam between lamp 817 and photocell 818. The reference edge of the document of FIG. 45, which is scanned from right to left, is denoted as edge 893. A portion of the check near the lower edge thereof is allotted to the printing of magnetic symbols. This portion is termed the field 890 and comprises a plurality of symbols printed in ink capable of being magnetized. Information which may appear in field 890 includes the amount of the check, represented in FIG. 45 by the eight numerals in the extreme right portion of the field; the transaction code number, represented by the single numeral immediately to the left of the amount; the account number, represented by the five numerals immediately to the left of the transaction code number; and the bank branch number, represented by the three numerals in the extreme left portion of the field.

Information is extracted from the field by first magnetizing the magnetic material thereon and then by scanning the field from the right to the left with transducer 820 of the Sorter, as the document moves to the right across the transducer. In scanning the magnetized symbols, the transducer senses the induced magnetic fields of the symbols, and generates electrical waveshapes characteristic of each different symbol. The Character Reader 22 identifies these characteristic waveshapes and provides output signals indicative of the symbols scanned. Thus, whenever one of the numerals 0–9 is scanned, the corresponding one of output signals C*d*0–C*d*9 is delivered at one of the Character Reader output terminals.

In addition to the numerals bearing the data to be read, cue characters are provided to distinguish the various portions of the document field. Thus, the cue character 891 signals the start of the data borne by the check, and also that the next eight numerals read by the Character Reader represent the amount of the check. The cue character 892 signals that the three digits immediately following constitute the bank branch number. In the documents to be read by the automatic reading apparatus of FIG. 42, four different cue characters are provided. Therefore, the Character Reader identifies the characteristic waveshape obtained by scanning one of the cue characters and delivers a corresponding one of output signals C*u*1–C*u*4.

In addition to providing output signals representing the ten numerals and four cue characters recognizable by the Character Reader, an error signal, C*er*, is provided thereby when the transducer scans an improper character (one that the Character Reader is not designed to recognize), or a character that is so poorly printed that the Character Reader cannot recognize it.

As the automatic reading apparatus scans the document, the C*sy*1, C*sy*2, and C*sy*3 signals are delivered by the Sorter in response to detection of the reference edge 893 of the document by photocell 818. These three signals, which are shown in FIG. 46, are delivered by the tandem-connected one-shots 822, 823, and 824. These one-shots may be of the type described for employment in the Memory, and referred to in the "Control Circuit" subsection of the Memory section. One-shot 822 is triggered into its unstable state by the signal delivered when the light beam from lamp 817 to photocell 818 is interrupted by the reference edge of the document. Thus, the signal delivered to one-shot 822 denotes the arrival of the document at the automatic reading apparatus. One-shot 822 remains in its unstable state for approximately 10 msec. whereupon it returns to its stable state. The 10 msec. pulse delivered by one-shot 822 is differentiated by differentiating circuit 825. The positive-going output pulse from differentiating circuit 125, which is delivered when one-shot 822 returns to its stable state, is transmitted as the C*sy*1 signal to the Sorter Control Unit (FIG. 46) and is also applied to trigger the one-shot 823.

Similarly, one-shot 823 remains in its unstable state for 70 msec., and upon return to its stable state causes issuance of the *Csy2* signal, which triggers one-shot 824. One-shot 824 remains in its unstable state for 62 msec., thereupon returning to its stable state and delivering the *Csy3* signal. Therefore, the signals *Csy1*, *Csy2*, and *Csy3* occur respectively 10 msec., 80 msec., and 142 msec. after the reference edge of the document arrives at photocell 818.

The output signal of photocell 818 is also applied to the Character Reader 22 to allow for activation of the circuits thereof when the document field is opposite transducer 820.

Prior to the arrival of the document at the first Sorter pocket, the Central Processor has determined in which pocket the document is to be entered and transmitted a corresponding signal to the Sorter Control Unit. (Documents are usually sorted in accordance with the numeral in a predetermined position in the field. For example, a group of checks may be sorted according to the least significant digit of the account number.) The Sorter Control Unit, in turn, transmits this pocket identification to the Sorter on one of 11 lines, which carry the corresponding signals *Dec–ss*, and *Dec0–Dec9*. Each of the signals *Dec–ss* and *Dec0–Dec9* is amplified and inverted by a corresponding Sorter amplifier 828, 829, 830, etc. Twelve pockets are provided in the Sorter for accepting the documents. The first pocket, designated as the Special Sort pocket, receives documents which are not to be sorted according to one of the numeric characters thereon. Thus, a check in the stack which did not belong to the bank branch whose checks were then being sorted by account number, may be entered into the Special Sort pocket. The Zero-Nine pockets accept those documents having the corresponding numeral in the field digit position on which the document is being sorted. For example, if the documents are being sorted on the least significant digit of the account number, the check in FIG. 45 will enter the Nine pocket. The last (Reject) pocket is provided to receive those checks for which an error signal is delivered by the Character Reader, or for which no decision is provided by the Central Processor in adequate time to actuate the proper numbered pocket.

The Central Processor provides a pocket decision signal for a document within 62 msec. after the data has been read from the document and transferred to the Central Processor. If the document is to be entered in the Special Sort pocket, the *Dec–ss* signal is delivered to the Sorter, and amplifier 828 directly energizes solenoid 831. When solenoid 831 is energized, deflector 832 lifts and causes the document just read to enter the Special Sort pocket. Inasmuch as the Central Processor provides a pocket decision for all documents before they reach the first deflector; i.e., the Special Sort pocket, means is provided to store this decision until immediately prior to the time when the document arrives at the deflector of the decision pocket. Hence, several documents may be traveling along the transport mechanism between the automatic reading apparatus and the reject pocket. Each document will pass over closed deflectors until it reaches the deflector of the pocket wherein it is to be entered. However, if no pocket is selected for a document, no deflector is lifted, and the document enters the Reject pocket. Thus, if a document is to be sorted into pocket Nine, the corresponding deflector will not be lifted until the document is immediately ahead of the deflector. The storage of pocket decisions, and consequent delay in deflector actuation is provided by a timer 833.

Timer 833 comprises 10 timer discs, 834, each of which corresponds to one of the Zero-Nine pockets. The timer discs are mounted on a common shaft and driven at a speed which provides one complete revolution of the timer disc during the time required for a document to travel the length of the pocket assembly. Each disc is provided with 12 apertures 835 about the periphery thereof, each aperture containing a pin 836 which normally projects outwardly on the right side of the disc, as shown in the drawing. Cooperating with each disc is a corresponding plunger 837, which is driven by a respective solenoid 838. The 10 solenoids 838 are connected to the output terminals of the respective amplifiers 829, 830, etc., which receive the corresponding *Dec0–Dec9* input signals. Upon the occurrence of a signal at the output terminal of any one of amplifiers 829, 830, etc., the corresponding solenoid 838 is energized, thereby driving its plunger 837 to the left, which moves the pin 836 opposite thereto toward the left through its disc support, so that it projects outwardly on the left-hand side of the disc.

As the discs 834 rotate, the pins projecting outwardly on the left-hand side thereof, engage and close corresponding contacts 839. The closure of contacts 839 provides current to energize a corresponding one of solenoids 840, 841, etc., which lifts the deflector for the respective Zero-Nine pockets. For example, energizing solenoid 843 causes the deflector 842 to be lifted at the proper time to admit the check having the numeral 0 in the selected field position into the Zero pocket. Means is provided to reset each pin 836 after it passes the corresponding contacts 839.

If the numeral 9 occurs in the selected field position of one check and the numeral 0 in this field position of the immediately following check, the first check must travel the entire length of the pocket assembly before it is deposited in pocket Nine, whereas the immediately following check must be deposited in the Zero pocket. Thus, this second check must be deposited in its pocket before the first check arrives at deflector 844. Therefore, the contacts 839, adjacent the timer discs which correspond respectively to pockets 0–9, are spaced at progressively greater angles about the periphery of the discs from the corresponding plunger 837. The angular spacing between the plunger 837 and the contacts 839 about the periphery of a disc provides that a pin 836 is moved to the left by the plunger when the pocket decision for a document is generated, and closes the contacts as the document arrives at the corresponding deflector.

The Sorter and Character Reader of FIG. 42, therefore, transport documents individually from a stack, automatically read a line of information thereon, transmit signals providing this information to the Central Processor, receive signals denoting the pockets of the Sorter, and in accordance with these signals enter the documents into corresponding pockets.

*Sorter Control Unit*

The Sorter Control Unit controls the reading of information on documents by the Sorter and Character Reader and transmits this information to the Central Processor. The Central Processor then determines from this information the particular Sorter pockets to which the documents are to be directed and notifies the Sorter Control Unit, which, in turn, directs the transfer of these documents into the corresponding Sorter pockets. The Sorter Control Unit receives the information digit-by-digit as it is read from a document by the Character Reader, encodes the digits of information into Central Processor code, and delivers the digits to the Read Buffer. Subsequently, the Sorter Control Unit receives a digit for each document from the Central Processor, the digit corresponding to the pocket into which the document is to be sorted; decodes this digit; and transmits a signal to actuate the corresponding Sorter pocket in order that the document may be entered therein.

FIGURE 43 illustrates symbolically the elements of the Sorter Control Unit which store data, the elements which encode and decode data, the paths of data transfer between these elements, and certain control elements. The details of the circuit structure of the Sorter Control Unit are provided by FIGS. 184 and 185, which illustrate the flip-flop input logical schematic diagrams; FIG. 186, which illustrates the one-shot input logical schematic diagrams; and FIG. 187, which illustrates designated logical combination signal diagrams and inverter signal diagrams.

As each digit on a document is read by the Character Reader, the Sorter Control Unit receives a corresponding signal on a respective one of 14 lines, these signals being designated *Cd*0–9, if a numeral has been read, and *Cu*1–4, if a cue character has been read. Additionally, the Sorter Control Unit receives the *Cer* signal on a separate line, if an error has been detected by the Character Reader.

Thus, each character read by the Character Reader is designated by only a single signal on a corresponding lead. These single signals, which represent digits or cue characters, must be converted into a four bit code useful by the Central Processor. Therefore, each of the signals *Cd*0–9, *Cu*1–4 and *Cer* is encoded into a four bit digit which comprises a code complementary to that normally employed by the Central Processor. This complementary code is illustrated in the following table "Sorter Control Unit Digits," wherein it may be seen that the four bit Sorter Control Unit complementary code for each character is an inverted binary form from the corresponding digits in Central Processor code.

SORTER CONTROL UNIT DIGITS

| Character | S.C.U. complementary code | Cent. proc. code |
|---|---|---|
| 0 | 1111 | 0000 |
| 1 | 1110 | 0001 |
| 2 | 1101 | 0010 |
| 3 | 1100 | 0011 |
| 4 | 1011 | 0100 |
| 5 | 0111 | 1000 |
| 6 | 0110 | 1001 |
| 7 | 0101 | 1010 |
| 8 | 0100 | 1011 |
| 9 | 0011 | 1100 |
| *Cu*1 | 0010 | 1101 |
| *Cu*2 | 1010 | 0101 |
| *Cu*3 | 0001 | 1110 |
| *Cu*4 | 1001 | 0110 |
| Error | 1000 | 0111 |
| Forbidden | 0000 | 1111 |

The four bits of the complementary code are transmitted from Sorter Control Unit to Central Processor as the respective output signals *Crd*4, *Crd*3, *Crd*2, and *Crd*1. This complementary code enables the ready detection of a reading failure. For example, if no character is read or if a failure occurs in the Character Reader, all lines from Character Reader to the Sorter Control Unit will have no signal thereon. Therefore, all four bits transmitted to the Central Processor will be 0, and this 0000 code will be converted by the Read Buffer to the forbidden 1111 code. Therefore, the Central Processor does not interpret the failure of the Character Reader to provide a character signal to the Sorter Control Unit as a 0 numeral, but, instead, will respond to the forbidden digit combination which is transmitted thereto.

Digit encoder 850 of the Sorter Control Unit provides the logical circuits for receiving any one of the numeral signals *Cd*0–*Cd*9 and for encoding this signal into the corresponding four bit complementary Sorter Control Unit code, in accordance with the preceding table. Digit encoder 850 is illustrated in FIG. 187 by the four logical schematic diagrams which generate the four signals, *Cod*4, *Cod*3, *Cod*2, and *Cod*1. If a numeral has been properly read by the Character Reader, the *Err* error signal (FIG. 187) is absent, and the corresponding signals *Cod*4–*Cod*1 are transmitted directly through OR-gate 851 and AND-gates 852, 853, and 854 as the Sorter Control Unit output signals *Crd*4, *Crd*3, *Crd*2, and *Crd*1. If a cue character is read by the Character Reader, the corresponding signal *Cu*1–*Cu*4 is encoded through OR-gates 851, 855, 856 into the complementary four bit code and delivered as corresponding *Crd*4–1 output signals. If an error is detected by the Character Reader, the *Err* signal causes the transmittal of the binary combination 1000 by the Sorter Control Unit.

The characters in the line of data read from a document are transmitted in the complementary code of the Sorter Control Unit to the Read Buffer, where they are converted to Central Processor code and stored in the Memory. (See the section "Read Buffer Data Transfer for Document Reading.") The Central Processor thereupon analyzes the data provided by the document, in accordance with a prearranged program, and in response to this data provides output signals representing the Sorter pocket into which the document is to be inserted. The four logical combination signals *Ps*(*i*) issue from the Central Processor in response to the bits in the A1 flip-flops of the A-register. The signals *Ps*4–*Ps*1 represent four bits, each being the inverted binary form of the corresponding bit in A1. Therefore, the *Ps*4–*Ps*1 signals represent in the complementary code of the Sorter Control Unit the pocket into which the document is to be sorted. (See the description of Instruction 57.)

The *Ps*4–*Ps*1 signals are applied to the 0-input logic terminals of the respective *Sou*4–*Sou*1 flip-flops of the Sorter Control Unit output register. The *Sou*(*i*) flip-flops are thereby transferred to the same bit configuration as that originally provided by the A1 flip-flops. The *Sou*-register 858 is illustrated in FIG. 184.

Digit decoder 859 responds to the output signals delivered by the *Sou*-register and the *Yro* one-shot, to provide a significant output signal *Dec–ss* and *Dec*0–*Dec*9 on only one of the respective Sorter Control Unit output lines to the Sorter. The signal on each of these output lines represents a binary 1, except on that line which commands a pocket decision. For example, if the *Sou*-register is in the 0001 state, a significant output signal, representing a binary 0, is available on only the *Dec*1 line. If no pocket designation has arrived at the *Sou*-register when the read out signal $\overline{Yro}$ transfers to the 0-state, no pocket decision line is actuated; instead, the *Npd* signal is transmitted to the Central Processor to set the *Anpd* sub-alarm flip-flop. Digit decoder 859 is illustrated in FIG. 187 by the logical schematic diagrams which generate the output signals *Dec–ss*, *Dec*0–*Dec*9, and *Npd*.

The output lines from digit decoder 859 are connected to the input terminals of respective emitter followers 860, 861, 862, etc. The output terminals of these emitter followers are connected to respective amplifiers 828, 829, 830, etc., in the Sorter (FIG. 42).

The significant output signal delivered by digit decoder 859 is a binary 0 on one of the lines therefrom. When this binary 0 issues on a pocket decision line; i.e., the *Dec–ss* and *Dec*0–*Dec*9 lines, it is transmitted through the corresponding emitter follower to a corresponding Sorter amplifier 828, 829, 830, etc. FIGURE 44 illustrates the typical connection of one of the Sorter Control Unit emitter followers 861 to the corresponding Sorter amplifier 829 of the Sorter of FIG. 42. Normally, the input signal to emitter follower 861 represents a binary 1, and the conducting transistor 871 thereof couples the +6 v. input signal to the base electrode of transistor 872 of amplifier 829. Transistor 872 is thereupon back-biased and no collector current is drawn thereby. However, when the *Dec*0 signal issues by transferring to the 0-state, the output voltage delivered by the emitter follower 861 transfers to approximately the 0 v. level and transistor 872 conducts current through the corresponding Sorter solenoid 843. Solenoid 843 thereupon sets the adjacent pin 836 of the respective timer disc, and the corresponding document will enter the Zero pocket when it arrives at deflector 842.

Other Sorter Control Unit flip-flops are employed primarily to perform control functions. The *Ckp* flip-flop (FIG. 185) indicates the presence of the field of a document under the transducer 820 of the Sorter and Character Reader. The *Cof* flip-flop (FIG. 185) directs the feeding of documents by the Sorter. The *Dcc* flip-flop (FIG. 185) indicates the arrival of a character signal from the Character Reader.

The *Yck* one-shot (FIG. 186) is triggered when the *Csy*1 signal arrives from the Sorter Control Unit to indicate the presence of the reference edge of the document. This one-shot remains in its unstable state for a duration sufficient to enable the triggering of the *Ckp* flip-flop and the *Yor* one-shot. The *Ycp* one-shot (FIG. 186) is triggered and remains in its unstable state when a character is being read from the document. The *Yor* one-shot (FIG. 186) controls the period when the *Sou*-register may receive new data. The *Yro* one-shot (FIG. 186) enables the read out of the contents of the *Sou*-register to the Sorter.

CLOCK CIRCUIT, SORTER CONTROL UNIT

The clock circuit of the Sorter Control Unit, also shown in FIG. 43, provides clock pulse signals for application to flip-flops to control the entry of data into the flip-flops. This clock circuit also provides clock pulses to control the triggering of one-shots. The clock pulse drivers of the Sorter Control Unit provide continuous clock pulses at the 250 kc. rate.

The Sorter Control Unit clock circuit comprises a continuous clock pulse generator 866, operating at the 250 kc. rate, and illustrated in FIG. 2. The clock pulses provided by clock pulse generator 866 are applied to continuous clock pulse drivers *Csc*1 and *Csc*2.

INSTRUCTIONS

The Central Processor responds to 52 different commands to execute 52 fundamentally different operations. These operations may be executed solely within the Central Processor, by the Central Processor in cooperation with the Memory, or by the Central Processor in cooperation with one or more of the peripheral equipments. Each operation is initiated by the command number, when it is stored in the C-register, and consists of a sequence of steps controlled and directed by the Clock Circuit and the C-register contents. Each operation is identified by the instruction word for which it is initiated. For example, the operation executed when the contents of the C-register are 27, is identified as "Instruction 27." In addition to the command number, each instruction word contains an address portion, which is either the Memory location of the operand or a control function for complementing the Clock Circuit and the C-register contents in directing execution of this command.

Forty-nine of the commands may be executed as individual instructions in the program. In addition to being programmable, two of these 49 commands (commands 25 and 26) are initiated by the Central Processor to follow certain arithmetic operations for correcting the mod-bits of a word. Commands 51, 55 and 56 are initiated and executed independently by the Central Processor when it performs certain other programmed commands. Commands 51, 55 and 56 cannot be programmed, but are executed during Read-Interrupt or Write-Interrupt operations.

In the description to follow, the sequence of execution of each command is described in detail. The detailed description is accompanied by a timing diagram to aid in visualizing the steps in the operational sequence. The commands 51, 55 and 56 are described in the Multiplex Buffer Operations section. The descriptions of the 52 different commands and the descriptions of the Wired Subroutines comprise a substantially complete functional description of the Central Processor operation and its control of and operation with the Memory and peripheral equipments. The order of presentation of the command descriptions has been chosen to provide an orderly and progressive picture of the Central Processor operation. Certain other operations not executed in the normal course of data processing, such as halts, starts, single-cycles, etc., complete the functional description of the Central Processor.

*Initial Routine During Instruction*

During the first eight clock periods of an instruction (the *Ta*-cycle) certain signals (FIG. 237) normally occur. These normal signals effect the transfer of a new instruction to the I-register, the mod-checking of this instruction, the addition of 1 to the next-instruction address in the A-register, the transfer of this modified address to the N-register, and the transfer of an operand from the memory location designated by the new instruction to the M-register. The sequence of occurrence of the normal signals in this initial routine is given by the timing diagram of FIG. 237.

MEMORY CYCLE

Prior to the occurrence of *t*1 a memory cycle-A has occurred and the new instruction is available in the M-register. Memory cycle-A is initiated by the signal *Mca*, which occurs at *t*5 of every *Ta*-cycle, except for Instructions 90, 94 and 97, and in the fifth clock period of every *Tb*-cycle; except during a B-subroutine. The purpose of the memory cycle-A is to transfer data from Memory to the M-register. The M-register flip-flops are set shortly after, or near the end of the sixth clock period of the T-cycle in which *Mca* occurs; therefore, by the eighth clock period of that T-cycle, the word from Memory is available in the M-register.

Memory cycle-B is initiated by the signal *Mcb*, which occurs at every *t*1. *Mcb* also occurs in the first clock period of every *Tb*-cycle, except for Instructions 90–94 and 97. During memory cycle-B, the word which was transferred from Memory to the M-register during memory cycle-A is restored to Memory, or a new word is stored in Memory. By the fourth clock period of the T-cycle in which *Mcb* occurs, the storing or restoring process is complete.

DETAILS OF INITIAL ROUTINE

At *t*1, three signals occur; namely, *Mcb*, XMJ and *Cau*. XMJ functions to transfer the new instruction from the M-register to the J-register. XMJ always occurs at *t*1, unless $Jr=1$, wherein the Memory is accepting data from the Read Buffer or Character Reader. XMJ is inhibited by *Jr* to prevent the old word in the memory location in which a new data word is to be inserted during a Read-Interrupt operation from giving a faulty modulo check and halting the Central Processor. (See Read-Interrupt Operation.) XMJ effects a parallel shift of data from the M-register to the J-register. At *t*2 the new instruction is in the J-register. *Mcb* occurs unconditionally at *t*1 and initiates the restoration of the new instruction to its original location in Memory. *Cau* causes 1 to be added to the instruction address in the A-register, unless $Ht1=1$, which occurs when the Central Processor is preparing to halt, but is waiting for completion of a Read or Write operation of the type initiated by Instructions 65, 66 or 68. At *t*2 the address present in the A-register has been increased by 1 and will be used to locate the next instruction in Memory.

Three signals occur at *t*2; namely, XJI, XAN and SJ. XJI causes the transfer of the new instruction from the J-register to the I-register by a parallel shift. At *t*3 the new instruction is present in the I-register. XJI always occurs at *t*2 if a Read-Interrupt or Write-Interrupt operation is not occurring (i.e., $\overline{Jr}\ \overline{Jw}\ \overline{Jm20}$), if the "Load Memory" switch on the Control Console is off, and if the Central Processor is not preparing to halt. XAN serves to transfer the address of the instruction, which has been increased by 1, by parallel shift to the N-register. XAN always occurs at $t2$, unless a Re-cycle order is received from the Control Console, unless $\overline{Jr}\ \overline{Jw}\ \overline{Jm20}$ does not exist, or unless the last instruction was improper ($Ai=1$). At $t3$ this next-instruction address has been stored in the N-register. SJ effects a ring shift-down of the J-register contents in order to mod-check the contents thereof, in this instance, to mod-check the new instruction. SJ occurs during the T$a$-cycle, except during the presence of XMJ or XZJ, and if the Central Processor is not preparing to halt (i.e., if $\overline{Ht1}+\overline{Ht2}$). Therefore, SJ is present from $t2$–$t6$, and the first shift of the J-register contents has taken place at $t3$.

At $t5$, M$ca$ occurs. This signal prepares to obtain an operand from the memory location addressed by the new instruction, or prepares to clear the address location for receipt of a new word. M$ca$ occurs at $t5$, except during conditions previously described.

At $t7$, the only signal which occurs is XZJ. This signal transfers 0's by parallel shift to J2–J7 and shifts the contents of J2 to J1. At $t7$, the MSD of the instruction is present in J2, whereupon at $t8$ this digit appears in J1. XZJ always occurs at $t7$ for Instructions 42, 43 and 74. If $\overline{Jr}\ \overline{Bb}$, XZJ occurs for the remaining instructions, except for Instructions 24, 50, 54, 60, 64, 70, 80, 90, 94 and 97. The purpose of XZJ is to clear most of the J-register, since only the 1-output terminals of the M-register flip-flops M2–M7 are coupled to the corresponding J-register flip-flops. However, the 1-output terminals of M1 and their inverted equivalents are coupled to J1, because time is not available to clear J1. It is necessary that the MSD of the new instruction be present in J1 at $t8$ to complete the mod-checking, and, therefore, XZJ effects the transfer of this digit to J1.

The following table illustrates the arrangement of data in the J-register during this Initial Routine. The notation I–$k$ is an instruction digit. The notation O–$k$ is an operand digit.

| | J7 | J6 | J5 | J4 | J3 | J2 | J1 | Shift signals | J$mg$ contents |
|---|---|---|---|---|---|---|---|---|---|
| $t1$ | 0 | 0 | 0 | 0 | 0 | 0 | 0 | XMJ | |
| $t2$ | I-7 | I-6 | I-5 | I-4 | I-3 | I-2 | I-1 | | −1 |
| $t3$ | I-1 | I-7 | I-6 | I-5 | I-4 | I-3 | I-2 | | −1+Mod I-1 |
| $t4$ | I-2 | I-1 | I-7 | I-6 | I-5 | I-4 | I-3 | SJ | −1+Mod 1-1, I-2 |
| $t5$ | I-3 | I-2 | I-1 | I-7 | I-6 | I-5 | I-4 | | −1+Mod I-1, 2, 3 |
| $t6$ | I-4 | I-3 | I-2 | I-1 | I-7 | I-6 | I-5 | | −1+Mod I-1 to 4 |
| $t7$ | I-5 | I-4 | I-3 | I-2 | I-1 | I-7 | I-6 | XZJ | −1+Mod I-1 to 5 |
| XMJ $t8$ | 0 | 0 | 0 | 0 | 0 | 0 | I-7 | XMJ | −1+Mod I-1 to 6 |
| $t9$ | O-7 | O-6 | O-5 | O-4 | O-3 | O-2 | O-1 | | −1+Mod I-1 to 7 |

At $t8$ the signal XMJ occurs. This signal effects the transfer of the operand to the J-register. XMJ occurs at $t8$ under the same conditions that XZJ occurred at $t7$. Therefore, at $t9$, the operand is present in the J-register.

MODULO-3 CHECK

As part of the initial routine, the modulo of the new instruction is checked. Every word stored in Memory has modulo-3 of +1. At $t2$ the J-Mod-generator (J$mg$2, J$mg$1) is set equal to −1. As a result of this initial setting of the J-Mod-generator, its contents should be 0 at the end of the mod-checking interval if the new instruction is correct. The above table illustrates how the contents of the J-Mod-generator are altered by the digits of the new instruction as they are successively shifted into J1, starting at $t3$. At $t3$ the contents of the J-Mod-generator are increased by the modulo-3 of the LSD of the new instruction, the LSD having been stored in J1 at $t2$. Since the MSD of the new instruction enters J1 at $t8$, the J-Mod-generator reflects the modulo-3 of the entire new instruction at $t9$. Therefore, at $t9$ a signal *A$mm$ is generated if the J-Mod-generator contents are not 0. This signal sets the A$mm$ flip-flop at $t10$, an alarm which indicates that the modulo-3 of this new instruction was erroneous.

*Instruction 21: Exchange R and M (XRM)*

This instruction (FIG. 188) effects the exchange of the entire contents (except mod-bits) of the R-register with those of a specified memory location. The address of the operand from Memory is specified in the address portion of the instruction.

The operand address is: 0000–3999 Memory.

The Initial Routine is unaltered.

At $t9$ the operand is in the J-register. At this time the Memory receives two control signals; namely, M$wt$ and M$cb$. M$wt$, "Memory Write," issues unconditionally and gates the entry of new information into the M-register. The command 21 ($\overline{C53}$) directs the parallel shift of the contents of R1–R6, R$s$ and R$d$ to M. During this shift to M, logic circuits generate new mod-bits for the condition digit, so that the sum of all seven digits of the word stored in M has a modulo-3 of +1. M$wt$ controls the generation of a Write pulse in the Memory. The Write pulse, in turn, gates new information into the M-register, whereas $\overline{C53}$ provides this new information from R. M$cb$ then cycles the data in the M-register into the location in Memory designated in the instruction.

Four signals effect the shifting of J into R and commence at $t9$. These signals are SJ, SR, SR76 and SJR$m$.

The signal SJ issues unconditionally from $t9$–$t14$ and is then inhibited by XZJ. SJ ring shifts-down the operand for mod-checking and for transfer to the R-register. Table A illustrates the shifting of data in the J-register during $t9$–$t16$.

TABLE A

| | J7 | J6 | J5 | J4 | J3 | J2 | J1 | J$mg$2, 1(numeric) | J$mg$2,1 (alpha-numeric) |
|---|---|---|---|---|---|---|---|---|---|
| $t9$ | O-7 | O-6 | O-5 | O-4 | O-3 | O-2 | O-1 | 00 | 00 |
| $t10$ | O-1 | O-7 | O-6 | O-5 | O-4 | O-3 | O-2 | Mod O-1 | 11 |
| $t11$ | O-2 | O-1 | O-7 | O-6 | O-5 | O-4 | O-3 | | 11 |
| $t12$ | O-3 | O-2 | O-1 | O-7 | O-6 | O-5 | O-4 | Mod O-1 to 3 | 11 |
| $t13$ | O-4 | O-3 | O-2 | O-1 | O-7 | O-6 | O-5 | | 11 |
| $t14$ | O-5 | O-4 | O-3 | O-2 | O-1 | O-7 | O-6 | Mod O-1 to 5 | 11 |
| $t15$ | O-6 | O-5 | O-4 | O-3 | O-2 | O-1 | O-7 | Mod (numeric part) | 11 |
| $t16$ | 0 | 0 | 0 | 0 | 0 | 0 | O-1 | 0, 1, if correct | 11 |
| $t17$ | 0 | 0 | 0 | 0 | 0 | 0 | 0 | 00 ←Reset→ | 00 |

XZJ which issues at $t15$ clears the entire J-register except for J1. XZJ which issues at $t16$ not only maintains J2–J7 cleared, but shifts a 0 digit from J2 to J1. The J*mg*2, 1 contents are equal to 0, 0 at $t9$, provided the previous instruction gave a correct mod-check. If the operand is not alphanumeric J*mg*2, 1 commences accumulating the modulo-3 of the operand at $t10$. By $t15$, J*mg*2, 1 represents the modulo-3 of the numeric portion of the operand. By $t16$, J*mg*2, 1 should be 0, 1, if the modulo-3 of the operand was correct. If not correct (i. e., if $\overline{Jmg1}$) *A*mm* is generated at $t16$, and at $t17$ A*mm* is set to 1 to indicate an alarm. If the operand is alphanumeric at $t9$, J*mg*2, 1 sense the bits stored in J*m*2, 1 and are set to 1, 1 at $t10$. With the J*mg*2, 1 in the 1, 1 state, they are disabled from responding to the signals provided by J*mgu*, J*mgd* and thus remain at 1, 1 through $t16$. The alarm A*mm* is not set since $Jmg1=1$.

At $t17$ J*mg*2, 1 are reset to 0, 0.

The signals SR and SR76 issue unconditionally during the first T*b*-cycle, if $Tb=1$ (i.e., from $t9$–$t15$). Thus, SR and SR76 are present for seven successive clock periods and allow the R-register to complete seven full shifts. SR shifts-down the data from R6. SR76 shifts the contents of R7 to R6.

SJR*m* issues unconditionally from $t9$–$t14$, being inhibited by T*b*7 and serially shifts the contents of J1 to R7. However, SJR*m* issues at $t15$ only under the conditions indicated below. Thus, from $t10$–$t14$ the operand is transferred from the J-register to the R-register. The original contents of the R-register are destroyed during this shifting process, although they previously have been transferred to Memory by the M*wt* signal. Table B illustrates the shifting of data into the R-register.

TABLE B

| | R7 | R6 | R5 | R4 | R3 | R2 | R1 | |
|---|---|---|---|---|---|---|---|---|
| $t9$ | S-7 | S-6 | S-5 | S-4 | S-3 | S-2 | S-1 | |
| $t10$ | O-1 | S-7 | S-6 | S-5 | S-4 | S-3 | S-2 | |
| $t11$ | O-2 | O-1 | S-7 | S-6 | S-5 | S-4 | S-3 | SR SJR*m* |
| $t12$ | O-3 | O-2 | O-1 | S-7 | S-6 | S-5 | S-4 | SR76 |
| $t13$ | O-4 | O-3 | O-2 | O-1 | S-7 | S-6 | S-5 | |
| $t14$ | O-5 | O-4 | O-3 | O-2 | O-1 | S-7 | S-6 | |
| $t15$ | O-6 | O-5 | O-4 | O-3 | O-2 | O-1 | S-7 | SJR*m* if J11J12 |
| $t16$ | X | O-6 | O-5 | O-4 | O-3 | O-2 | O-1 | SJ*mg*R if $(\overline{J12}+\overline{J11})$ |

NOTE.—$X=O$-$d$, $O$-$s$, mod-bits of numeric portion or 1, 1.

The notation S-*k* is a digit of the original word stored in the R-register.

At $t15$, the contents of J11 and J12 are sampled for a decision. At this time, the condition digit of the operand is in J1. If the operand is alphanumeric, SJR*m* issues during $t15$ and shifts the entire condition digit to R7, but if either J11 or J12 is 0, the operand is not alphanumeric, and the signal SJ*mg*R issues at $t15$. This signal SJ*mg*R shifts the contents of J*mg*2, 1, which at this time represents the modulo-3 of the numeric portion of the operand, to R*m*2, 1. The following summary illustrates the shift of the condition digit to R7 under control of either SJ*rm* or SJ*mg*R:

| SJR*m* | SJ*mg*R |
|---|---|
| J14—R*d* | J14—R*d* |
| J13—R*s* | J13—R*s* |
| J12—R*m*2 | J*mg*2—R*m*2 |
| J11—R*m*1 | J*mg*1—R*m*1 |

Thus, at $t16$ the operand is stored in the R-register. If the operand is alphanumeric, the mod-bits continue as 1, 1. However, if the operand is not alphanumeric, the new mod-bits represent the actual modulo-3 of the numeric portion of the operand.

At $t12$ the flip-flop T*i* is set unconditionally. It is turned off in the next clock period. T*i* effects the issuance of the signal XNA, which provides a parallel shift of the contents of the N-register to the A-register at $t13$. Thus, at $t14$ the address of the next-instruction is present in the A-register.

At $t13$, the signal M*ca* issues and directs the Memory to obtain the next-instruction, whose address is now in the A-register.

At $t15$, the signal XZJ issues, conditioned on $\overline{Jr}\ \overline{Bb}$.

At $t16$, the signal E*nd* occurs unconditionally, which effects the issuance of the signal XZJ, conditioned on $\overline{Jr}\ \overline{M3g}$. Time: 16 clock periods.

*Instruction 70: Transfer R to M (TRM)*

This instruction (FIG. 216) effects the transfer of the entire contents (except mod-bits) of the R-register to a specified Memory location.

The location address is: 0000–3999 Memory.

The description of Instruction 21, coupled with the description to follow, is a complete description of Instruction 70.

The Initial Routine is altered by the deletion of the signals XZJ and XMJ, at $t8$, inasmuch as no operand is received from Memory. Since XZJ does not occur at $t7$ and XMJ does not occur at $t8$, the signal SJ is not inhibited at these two clock periods, and, therefore, continues through $t8$.

Therefore, at $t9$, after SJ has occurred seven times, a complete ring shift-down of the instruction in the J-register has taken place.

At $t9$, the signal M*wt* issues and initiates the gating of data from the R-register to the M-register, as described in Instruction 21. When this occurs, the object of Instruction 70 has been completed. However, certain other non-essential actions take place as follows.

The signal SJ occurs from $t9$–$t15$ and effects another ring shift-down of the instruction in the J-register, so that at $t16$ the instruction again occupies its sequential position in J. Thus, the instruction is mod-checked once again. Since the contents of J*mg*2, 1 were 0, 0 at $t9$, these contents will be 0, 1 at $t16$, so that *A*mm* is suppressed (provided that the modulo-3 of the instruction was correct). The signals SR, SR76 and SRR*m* occur from $t9$ through $t15$ and cause a complete ring shift-down of the contents of the R-register. No essential function is accomplished by this action, but the Central Processor logic is simplified by not inhibiting these ring shifts.

The signal E*nd* occurs unconditionally at $t16$ and effects the issuance of the signal XZJ. Although the signal XMJ does not issue at $t16$, its issuance at the next $t1$ insures that the next-instruction will have a proper Initial Routine. Time: 16 clock periods.

*Instruction 75: Transfer M to R (TMR)*

This instruction (FIG. 221) effects the transfer of the contents of a memory location to the R-register.

The operand address is: 0000–3999 Memory.

The description of Instruction 21, coupled with the description to follow, is a complete description of Instruction 75.

The Initial Routine is unaltered.

The sequence of signals during the T*b*-cycle is the same as that of Instruction 21, except that the signal M*wt* does not issue at $t9$, so that the contents of R are not transferred to M.

Therefore, the sequence of Instruction 75 is the same as Instruction 21, except that the signal M*wt* does not occur.

The signal *End* occurs unconditionally at *t*16. Time: 16 clock periods.

*Instruction 85: Transfer M to FULL (TMF)*

This instruction (FIG. 227) effects the transfer of the contents of two successive Memory locations (a double-precision word) to the L and R-registers (FULL). The address of the most significant half (MSH) of the operand is specified in the address portion of the instruction. The MSH of the operand is stored in the L-register and the least significant half (LSH) of the operand is stored in the R-register. The former contents of the L and R-registers are destroyed.

The operand address specified in the instruction is: 0000–3998 Memory (MSH addressed).

The description of Instruction 21, coupled with the description to follow, is a complete description of Instruction 85.

The Initial Routine is unaltered.

The address portion of the instruction is first increased by 1, the LSH of the operand is received in J, and the LSH is then transferred from J to L. Next, the address portion of the instruction is decreased by 1, the MSH is received in J, and the MSH is then transferred from J to L as the LSH is simultaneously being transferred from L to R.

Since the MSH is originally addressed in the instruction, but the LSH must be transferred through L to R, the operand address must be increased by 1 before any portion of the operand is obtained from Memory. Therefore, at *t*3, the signal *Cau* issues, which causes the operand address to be increased by 1 at *t*4. The operand address becomes that of the LSH. At *t*9, the LSH portion of the operand is present in the J-register. At this time the signal *Cad* issues. *Cad* causes the operand address to be reduced by 1 at *t*10. The operand address now becomes the original address, that of the MSH. At *t*17, the MSH portion of the operand is in J.

The signals SJ, SJL*m* and SJL*s* issue for six clock periods (*t*9–*t*14) and transfer the contents of the numeric portion of the LSH in J to the L-register. SJL*s* transfers the contents of J13 and J14 to L73 and L74 respectively. SJL*m* transfers the contents of J11 and J12 to L71 and L72 respectively. The signals SL and SL76 effect the serial shift-down of the data entering the L-register. At *t*15, the most significant digit of the LSH is sampled in J1; if the LSH is alphanumeric, the mod-bits are transferred directly to the L-register at *t*16 by SJL*m*, but if LSH is numeric, SJ*mg*L transfers the contents of J*mg*2, 1 to the L-register. This testing of the condition digit is described in more detail in Instruction 21. SJL*s* also issues at *t*15 to transfer the contents of J13 and J14 to the L-register. (The contents of J1 are transferred to L7 by the use of two shift signals, as contrasted to the transfer of the contents of J1 to R7 by the use of one shift signal; see Instruction 21.)

At *t*16, the entire LSH is in the L-register.

XZJ issues at *t*15 to clear the J-register from J2–J7. XMJ issues at *t*16 to transfer the MSH to J.

The MSH of the operand is transferred from J to L during *t*18–*t*24 in the same manner as the LSH was transferred to L during *t*10–*t*16. Simultaneously with the transfer of the MSH to L, the signals SLR7, SR76 and SR effect the transfer of the contents of L to R. At *t*18, the LSD of the LSH is in R7, and the LSD of the MSH is in L7. Six clock periods later (*t*24) the entire MSH is in L and the entire LSH is in R. The J-Mod-generator, J*mg*2, 1, generates mod-bits for the numeric portions of both the LSH and the MSH. Thus, both words in FULL bear their own mod-bits.

The signals SLR7, SR76 and SR have no significance from *t*9–*t*15.

The J-mod-check is similar to that of Instruction 21 during the first two T-cycles. At *t*9, the J-Mod-generator, which had been set to 1, 0 at *t*1, is 0, 0 for a correct instruction. The J-Mod-generator then accumulates the modulo-3 of the LSH. Therefore, at *t*16, the proper contents in J*mg*2, 1 are 0, 1. At each T*b*8 the J-Mod-generator is set to 0, 0 so that by *t*24 the modulo-3 of the MSH will again set the J-Mod-generator to 0, 1.

The signal *End* occurs unconditionally at *t*24. Time: 24 clock periods.

*Instruction 80: Transfer FULL to M (TFM)*

This instruction (FIG. 223) effects the transfer of the entire contents (except mod-bits) of the L and R-registers (FULL) to two successive Memory locations.

The location address specified in the instruction is: 0000–3998 Memory.

The description of Instructions 70, 85 and 21, coupled with the description to follow, is a complete description of Instruction 80.

The Initial Routine is altered by the deletion of the signals XZJ and XMJ at *t*8, inasmuch as no operand is received from Memory. Since XZJ does not occur at *t*7, and XMJ does not occur at *t*8, the signal SJ is not inhibited at these two clock periods, and, therefore, continues through *t*8.

The $M_A$ address portion of the instruction is first increased by 1, the LSH contents of R are transferred to $M_A+1$, and the entire contents of FULL are ring shifted-down. Next, the address portion of the instruction is decreased by 1, the MSH contents of R are transferred to $M_A$, and FULL is again ring shifted-down. Therefore, the original contents of FULL remain unaltered at the end of the instruction.

Since the memory location of the MSH is provided in the instruction, but the LSH, which is in R, must be transferred to Memory first, the location address specified in the instruction must first be increased by 1. This is accomplished at *t*4, by the signal *Cau*. At *t*9, M*wt* occurs, and gates the LSH from R to M in the manner described in Instruction 21. From *t*9–*t*15, SL76, SL, SLR7, SR76, SR and SRL7 occur, causing a ring shift-down of the contents of FULL, so that by *t*16, the MSH is in R and the LSH is in L.

At *t*17, M*wt* occurs again, gating the MSH from R to M. Once again, the contents of FULL are ring shifted-down, so that by *t*24 the original contents of L and R have been restored, with the MSH in L and the LSH in R.

As in Instruction 70, the instruction is ring shifted-down in J through the two T*b*-cycles in order to suppress the issuance of the signal *A*mm*.

The signal *End* occurs unconditionally at *t*24. Time: 24 clock periods.

*Instruction 94: Exchange R and B (XRB)*

This instruction (FIG. 235) effects the exchange of the entire contents of the B-register with the contents of the four least significant digit positions of the R-register. The A-register contents have no significance.

The descriptions of Instructions 21 and 70, coupled with the description to follow, is a complete description of Instruction 94.

The Initial Routine is altered by the deletion of the signals XZJ and XMJ at *t*8, and M*ca* at *t*5, inasmuch as no operand is received from Memory. Since XZJ does not occur at *t*7 and XMJ does not occur at *t*8, the signal SJ is not inhibited in these clock periods, and, therefore, continues through *t*8. Therefore, at *t*9, after SJ has occurred seven times, a complete ring shift-down of the instruction in the J-register has taken place.

The signal *T*v* issues at *t*3 and sets T*v* at *t*4. T*v* remains set for seven clock periods (*t*4–*t*10) and is reset at *t*11. T*v* causes the issuance of the four shift signals which effect the exchange between the B and R-registers; namely, SR, SR76, SRXB and SB. SR and SR76 issue for the full seven clock periods of T*v*. SRXB and SB issue for the first four clock periods of T*v*. The signal SRXB gates digits from B1 to R7 and from R1 to B4. SRXB and SB are generated by the logic (94) T*p* T*v*.

The exchange of data is shown in the following table.

| | R7 | R6 | R5 | R4 | R3 | R2 | R1 | B4 | B3 | B2 | B1 |
|---|---|---|---|---|---|---|---|---|---|---|---|
| *t*4 | S-7 | S-6 | S-5 | S-4 | S-3 | S-2 | S-1 | Q-4 | Q-3 | Q-2 | Q-1 |
| *t*5 | Q-1 | S-7 | S-6 | S-5 | S-4 | S-3 | S-2 | S-1 | Q-4 | Q-3 | Q 2 |
| *t*6 | Q-2 | Q-1 | S-7 | S-6 | S-5 | S-4 | S-3 | S-2 | S-1 | Q-4 | Q-3 |
| *t*7 | Q-3 | Q-2 | Q-1 | S-7 | S-6 | S-5 | S-4 | S-3 | S-2 | S-1 | Q-4 |
| *t*8 | Q-4 | Q-3 | Q-2 | Q-1 | S-7 | S-6 | S-5 | S-4 | S-3 | S-2 | S-1 |
| *t*9 | S-5 | Q-4 | Q-3 | Q-2 | Q-1 | S-7 | S-6 | | | | |
| *t*10 | S-6 | S-5 | Q-4 | Q-3 | Q-2 | Q-1 | S-7 | | | | |
| *t*11 | S-7 | S-6 | S-5 | Q-4 | Q-3 | Q-2 | Q-1 | | | | |

At the end of the first four clock periods of T*v* (i.e., at *t*8) the four least significant digits of R have been transferred in sequential order to B, and the contents of B have been transferred in sequential order to the four most significant digit positions of R. From *t*8–*t*10, the logical gating signal SRR*m* issues, effecting the cyclic shift of the contents of R. SRR*m* is generated by the logic (94) $\overline{Tp}$ T*v*. Therefore, at *t*11, the R-register contains in its three most significant digit positions, the original three digits located therein, and in its four least significant digit positions, the original contents of the B-register.

Since the numeric contents of the R-register have been changed, the modulo-3 of the new numeric portion may be different than that of the original numeric portion. Therefore, new mod-bits must be generated for this new word in R prior to the issuance of the next instruction. The signal *M3*g* occurs unconditionally at *t*15 and sets M3*g* at *t*16. M3*g* alters the succeeding sequence. The signal E*nd* occurs unconditionally at *t*16, but both XZJ and *T1 are inhibited by M3*g*, and do not occur. Therefore, the T*a*-cycle is not entered at the next clock period, but instead another T*b*-cycle is entered, due to the *T*b* and *T*b*1 logic, which includes the term T*b*8 M3*g*. (The signal E*nd* prevents setting of Ty.) M3*g* sets the C-register to 25 at *t*17. For the next eight clock periods the Central Processor executes Instruction 25, "Mod-3 Generation on R." The signal M3*g* sets all four bits of C6 and the three most significant bits of C5. C51 remains unchanged, and, therefore, remains in the 0-state.

M3*g* is reset unconditionally at the next T*b*8.

See Instruction 25 for details.

The instruction is once again mod-checked during the T*b*-cycle to prevent the issuance of *A*mm*. Time: 24 clock periods.

*Instruction 97: Exchange L and R (XLR)*

This instruction (FIG. 236) effects the exchange of the entire contents of the L-register with the entire contents of the R-register.

The A-register contents have no significance.

The descriptions of Instructions 21 and 70, coupled with the description to follow, is a complete description of Instruction 97.

The Initial Routine is altered by the deletion of the signals XZJ and XMJ at *t*8, and M*ca* at *t*5, inasmuch as no operand is received from Memory. Since XZJ does not occur at *t*7 and XMJ does not occur at *t*8, the signal SJ is not inhibited in these clock periods, and, therefore, continues through *t*8. Therefore, at *t*9, after SJ has occurred seven times, a complete ring shift-down of the instruction in the J-register has taken place.

The signal *T*v* issues at *t*3 and sets T*v* at *t*4. T*v* remains set for seven clock periods (*t*4–*t*10) and is reset at *t*11. T*v* causes the issuance of the six shift signals which effect a ring shift-down of the L and R-register combination (FULL); namely SL76, SL, SLR7, SR76, SR and SRL7. Therefore, at *t*11, the former contents of R are in L and vice-versa.

The instruction is once again mod-checked during the T*b*-cycle to prevent the issuance of *A*mm*.

The signal E*nd* occurs unconditionally at *t*16. Time: 16 clock periods.

*Instruction 90: Shift R Right (N) (SHR)*

This instruction (FIG. 231) causes the numeric contents of the R-register to shift-down N digit positions, and replaces the N most significant numeric positions of R with 0's.

The A-register contents are: 0001–0006. The LSD, N, of the A-register contents denotes the number of digit positions through which the contents of R must shift.

The descriptions of Instructions 21 and 70, coupled with the description to follow, is a complete description of Instruction 90.

The Initial Routine is altered by the deletion of the signals XZJ and XMJ at *t*8, and M*ca* at *t*5, inasmuch as no operand is received from Memory. Since XZJ does not occur at *t*7 and XMJ does not occur at *t*8, the signal SJ is not inhibited in these clock periods, and, therefore, continues through *t*8. Therefore, at *t*9, after SJ has occurred seven times, a complete ring shift-down of the instruction in the J-register has taken place.

The signal *T*v* issues at *t*3 and sets T*v* at *t*4. T*v* remains set for N clock periods, starting at and including *t*4. T*v* causes the issuance of the two shift signals SR and SZR6, and the signal C*ad*. SR shifts-down the numeric contents of R, and SZR6 inserts 0's in R6. The signal C*ad* reduces the numeric contents of A1 by 1 in each clock period. During the clock period when the contents of A1 become equal 1, *$\overline{Tv}$ issues and T*v* is reset to 0 in the next succeeding clock period. At the same time, the numeric contents of A1 have been reduced to 0. Therefore, an SR and SZR6 signal issues in each clock period when T*v* is on and when the contents of A1 are non-zero. For example, if the A-register contents are initially 0004, the shift signals will issue for four clock periods; so that the two digits originally in the 5th and 6th digit positions of R will terminate in the 1st and 2nd digit positions respectively, and the 3rd–6th digit positions of R will contain 0's. The condition digit in R is not affected. For example:

$$R\ (\text{initial}) = C123456 \qquad R\ (\text{final}) = C000012$$

The signals *W3 and *W2 also issue at *t*3 to set W3 and W2 to 1. It is necessary that these two flip-flops be in the 1-state in order that T*v* be reset when the A1 contents reach 1. The logic is *$\overline{Tv}$=(90) W2 W3 $\overline{A21}$ $\overline{A14}$ $\overline{A13}$ $\overline{A12}$. The W-counter performs no other function during this instruction, and is reset in the clock period next following *t*16.

If the initial contents of A1 are 0, T*v* is not set, since *T*v* is inhibited by the signal I*tv*. I*tv* is generated when the contents of A1 are 0, and no shift occurs.

Since the numeric contents of the R-register have been changed when this instruction is completed, the modulo-3 of the final numeric portion may be different from that of the initial numeric portion. Therefore, M3*g* is set at *t*16, the contents of the C-register are changed to 25 in the next clock period, and for the next 8 clock periods the Central Processor executes the "Mod-3 generation on R" instruction. (See Instruction 25 for details.)

The instruction is again mod-checked during the T*b*-cycle to prevent the issuance of *A*mm*.

The signal E*nd* occurs unconditionally at *t*16. The signals XZJ and *T1 are inhibited by M3*g*, so that the next T-cycle is a T*b*-cycle. Time: 24 clock periods.

*Instruction 91: Ring Shift R (N) (RSR)*

This instruction (FIG. 232) effects a ring shift-down by N digit positions of the numeric contents of the R-register.

The A-register contents are: 0001–0006. The LSD, N, of the A-register contents denotes the number of digit positions through which the numeric contents of R must ring shift.

The descriptions of Instructions 90 and 21, coupled with the description to follow, is a complete description of Instruction 91.

The primary difference between this instruction and Instruction 90, is that the contents of R are ring shifted-down N digit positions, instead of merely shifting-down. Therefore, this instruction is not described in detail; instead, the distinction between this instruction and Instruction 90 is described. Instead of the signal SZR6, which shifts 0's into R6 as the contents of R are shifted-down in Instruction 90, the signal SR16 issues. The signal SR16 transfers the contents of R1 to R6. Therefore, no digits of the numeric contents of R are lost, but instead, they are merely ring shifted-down N digit positions. At the end of the requisite N shifts, all original digits remain in R.

As in Instruction 90, the only function of W3 and W2 is to permit the resetting of T*v* when the contents of A1 have been reduced to 1.

The condition digit in R is not affected.

The signal E*nd* occurs unconditionally at *t*16.

Inasmuch as the original six numeric digits are still present in R, the modulo-3 of the numeric contents of R remain unchanged, so that M3*g* does issue at the end of this instruction. (This is the only shift instruction not followed by a Mod-3 generation instruction.) Time: 16 clock periods.

*Instruction 92: Shift FULL Right (N) (SHF)*

This instruction (FIG. 233) causes the numeric contents of FULL (taken as a twelve-digit register) to shift-down N digits, and replaces the N most significant numeric positions of FULL with 0's.

The A-register contents are: 0001–0012. The LSD, N, of the A-register contents denotes the number of digit positions through which the contents of FULL must shift.

The descriptions of Instructions 90 and 21, coupled with the description to follow, is a complete description of Instruction 92.

The Initial Routine is altered by the deletion of the signals XZJ and XMJ at *t*8, and M*ca* at *t*5, inasmuch as no operand is received from Memory. Since XZJ does not occur at *t*7 and XMJ does not occur at *t*8, the signal SJ is not inhibited in these clock periods, and, therefore, continues through *t*8. Therefore, at *t*9, after SJ has occurred seven times, a complete ring shift-down of the instruction in the J-register has taken place.

The signal *T*v issues at *t*3 and sets T*v* at *t*4. T*v* remains set for N clock periods, starting at and including *t*4. T*v* causes the issuance of the four shift signals SZL6, SL, SLR6, and SR and the signals C*ad* or C*wu*. The last three of the shift signals shift-down the numeric contents of FULL, and SZL6 inserts 0's in L6. For example, if $N=10$, FULL (initial)=C123456 C789064; FULL (final)=C000000 C000012. The signal C*ad* reduces the numeric contents of A1 (the address) by 1 in each clock period. C*ad* exists only through *t*11, provided that at least 8 shift signals are denoted by N. If N equals 1–9, A1 is reduced to 1, at the latest, by *t*12. This reduction of A to 1 causes the occurrence of $*\overline{Tv}$, thereby terminating these shift signals.

At *t*12, the signal XNA occurs and destroys the existing contents of A at *t*13. Therefore, any information remaining in A is transferred to the W-counter at *t*13 and the shift count is continued under the control of the W-counter.

The W-counter can only count up, under the control of C*wu*. The signal C*wu* is enabled by $Tv(\overline{W2}+\overline{W3})$. Therefore, the complement of the information in A must be transferred to W at *t*13. Since the greatest value of N is 12, the largest value in A at *t*12 is four, and only A13, A12 and A11 will have significant data at *t*12. The complement of this data is that which is to be transferred to the W-counter. The simplest complement is one in which each binary digit is inverted. For three binary digits, such a complement is the 7's complement. Thus, at *t*12, the 7's complement of the count of A is transferred to W and sets the W-counter at *t*13. Until *t*13 the W-counter has the number 6 stored therein, and thereby inhibits the counting signal C*wu*. Therefore, at *t*13, the signal C*wu* commences and W-counts up, as may be seen in the analysis following. If the last shift signal occurs when W reaches 5, N shift signals will have issued. Therefore, W reaching 5 is equivalent to A having been counted down to 1. Therefore, when either W reaches 5 or A reaches 1, $*\overline{Tv}$ issues and the last of the N shift signals occurs.

If N is 9, or less, all shift signals are controlled by A, and W never has any other state than 6. If N is 10, or greater, W controls the issuance of 1–3 shift signals.

The functioning of the A and W-registers to provide N shift signals is illustrated in the following tables A–E.

TABLE A

| | A | Count | W | T*v* | Shift signals |
|---|---|---|---|---|---|
| *t*4 | 12 | C*ad* | 6 | 1 | 1 |
| . | . | . | . | . | . |
| . | . | . | . | . | . |
| . | . | . | . | . | . |
| *t*11 | 5 | C*ad* | 6 | 1 | 8 |
| *t*12 | 4 | ---- | 6 | 1 | 9 |
| *t*13 | Next instr. address | C*wu* | 3 | 1 | 10 |
| *t*14 | . | C*wu* | 4 | 1 | 11 |
| *t*15 | . | C*wu* | 5 | 1 | 12 |
| *t*16 | . | ---- | 6 | 0 | -- |

*Explanation of table:*

C*ad* requires $Tv(\overline{Tp}+Ta)$—last C*ad* at *t*11.

C*wu* requires $Tv(\overline{W2}+\overline{W3})$—does not operate if $W=6$.

$*\overline{Tv}$ occurs if $A=1$ or $W=5$.

Shift signals require T*v*.

TABLE B

| | A | Count | W | T*v* | Shift signals |
|---|---|---|---|---|---|
| *t*4 | 11 | C*ad* | 6 | 1 | 1 |
| . | . | . | . | . | . |
| . | . | . | . | . | . |
| . | . | . | . | . | . |
| *t*11 | 4 | C*ad* | 6 | 1 | 8 |
| *t*12 | 3 | ----- | 6 | 1 | 9 |
| *t*13 | Next instr. address | C*wu* | 4 | 1 | 10 |
| *t*14 | . | C*wu* | 5 | 1 | 11 |
| *t*15 | . | ----- | 6 | 0 | -- |

TABLE C

| | A | Count | W | T*v* | Shift signals |
|---|---|---|---|---|---|
| *t*4 | 10 | C*ad* | 6 | 1 | 1 |
| . | . | . | . | . | . |
| . | . | . | . | . | . |
| . | . | . | . | . | . |
| *t*11 | 3 | C*ad* | 6 | 1 | 8 |
| *t*12 | 2 | ----- | 6 | 1 | 9 |
| *t*13 | Next instr. address | C*wu* | 5 | 1 | 10 |
| *t*14 | . | ----- | 6 | 0 | -- |

TABLE D

| | A | Count | W | Tv | Shift signals |
|---|---|---|---|---|---|
| t4 | 9 | Cad | 6 | 1 | 1 |
| . | . | . | . | . | . |
| . | . | . | . | . | . |
| . | . | . | . | . | . |
| t11 | 2 | Cad | 6 | 1 | 8 |
| t12 | 1 | ----- | 6 | 1 | 9 |
| t13 | Next instr. address | ----- | 6 | 0 | - |

TABLE E

| | A | Count | W | Tv | Shift signals |
|---|---|---|---|---|---|
| t4 | 8 | Cad | 6 | 1 | 1 |
| . | . | . | . | . | . |
| . | . | . | . | . | . |
| . | . | . | . | . | |
| t11 | 1 | Cad | 6 | 1 | 8 |
| t12 | 0 | ----- | 6 | 0 | - |

As in Instruction 90, the W-counter is set to the 6-state at $t4$ to enable the issuance of $*\overline{Tv}$ if A reaches 1.

If the initial contents of A1 are 0, T*v* is not set since *T*v* is inhibited by the signal I*tv*, which is generated when the contents of A1 are 0, and no shift occurs.

The instruction is again mod-checked during the T*b*-cycle to prevent the issuance of *A*mm*.

Since the numeric contents of both the L and R-registers have been changed, the modulo-3 of these new numeric portions may be different from those of the original numeric portions. Therefore, M3*g* is set at $t16$, the contents of the C-register are changed to 26 in the next clock period, and for 8 additional clock periods the Central Processor executes the "Mod-3 generation on L and R" instruction. (See Instruction 26 for details.)

The sign and designator bits of both the R and L-register contents are unaffected by this instruction.

The signal E*nd* occurs unconditionally at $t16$. The signals XZJ and *T1 are inhibited by M3*g* so that the next T-cycle is a T*b*-cycle. Time: 24 clock periods.

ANALYSIS OF JOINT USE OF A AND W TO CONTROL SHIFT COUNT

As complementary data must be transferred from A to W, the simplest such transfer is one where each binary digit is merely inverted. Since only the three least significant digits of A contain data at $t12$, a 7's complement shift is used to transfer this data to the three W flip-flops.

Let:

$A_0$ be the contents of A at $t12$.
$W_0$ be the contents of W at $t13$.

The contents of A are transferred to W as: $W_0=7-A_0$.

Total shifts necessary: N.

Total shifts through $t12=9=N-A_0+1$, if $N=9$, or greater.

Total shifts necessary following $t12$; $A_0-1=6-W_0$. If the last shift signal issues when W reaches 5, $6-W_0$ shift signals occur. Hence, if last shift occurs when W reaches 5, the total shifts are N.

Check:

$$N-A_0+1+6-W_0=N-A_0+1+6-7+A_0=N$$

Therefore, W stops counting when it reaches 6. Hence, $W=6$ is also a useful control to trigger $*\overline{Tv}$ prior to $t13$, if A reaches 1.

If $A_0$ is 1 at $t12$, N was 9, and 9 shift signals have issued. $W_0$ is set to 6 and no further shift signals remain.

If $A_0$ reaches 1 before $t12$, $*\overline{Tv}$ occurs, and no A to W transfer takes place at $t12$.

*Instruction 93: Ring Shift FULL (N) (RSF)*

This instruction (FIG. 234) causes the numeric contents of FULL (taken as a 12-digit register) to ring shift-down N digits.

The A-register contents are: 0001–0012. The LSD, N, of the A-register contents denotes the number of digit positions through which the contents of FULL must ring shift.

The descriptions of Instructions 92 and 21, coupled with the description to follow, is a complete description of Instruction 93.

The primary difference between this instruction and Instruction 92, is that the numeric contents of FULL are ring shifted-down N digits, instead of merely shifting-down. Therefore, this instruction is not described in detail; instead, only the distinction between this instruction and Instruction 92 is described. Instead of the signal SZL6, which shifts 0's into L6, as the contents of FULL are shifted-down in Instruction 92, the signal SRL6 issues. The signal SRL6 transfers the contents of R1 to L6. Therefore, no digits of the numeric contents of FULL are lost, but instead, they are merely ring shifted-down by N digit positions. At the end of the requisite N shifts, all original digits remain in FULL. For example, if $N=10$, FULL (initial)=C123456 C789064
FULL (final)=C345678 C906412

The functions of C*ad*, the W-register, and C*wu* are the same as in Instruction 92.

The sign and designator bits of both the R and L-register contents are unaffected by this instruction.

The signal E*nd* occurs unconditionally at $t16$.

Since the numeric contents of both the L and R-registers have been changed, the modulo-3 of these new numeric portions may be different from those of the original numeric portions. Therefore, M3*g* is set at $t16$, the contents of the C-register are changed to 26 in the next clock period, and for 8 additional clock periods the Central Processor executes the "Mod-3 generation on L and R" instruction. (See Instruction 26 for details.) Time: 24 clock periods.

*Instruction 25: Mod-3 Generation on R (GMR)*

This instruction (FIG. 190) effects the generation of the mod-bits for the numeric contents of R. The instruction is employed either as a "wired" instruction, which is executed by the Central Processor without direction by the program, following a programmed instruction which may alter the modulo-3 of the R-register contents (for example, Instruction 94); or as a "programmed" instruction.

The descriptions of Instructions 21 and 94, coupled with the description to follow, is a complete description of Instruction 25.

When Instruction 25 is employed as a wired instruction, it is entered at time $t9$, because of generation of the signal M3*g* in the immediately preceding clock period, which was the last clock period of a preceding instruction that may have changed the modulo-3 of the contents of R. However, Ty is inhibited by the previous signal E*nd*. When Instruction 25 is employed as a programmed instruction, it has an Initial Routine, as any other conventional instruction.

When Instruction 25 is programmed, the Initial Routine is unaltered, the A-register contents have no significance, and the signal M3*g* issues at $t9$.

For both wired and programmed employment, the actual mod-bit generation occurs following the issuance of M3*g* and upon the setting of T*b*. For both types of employment, $t9$–$t16$ in the timing diagram are common. The signals SR and SR76 issue unconditionally during the presence of T*b*. SRR*m* also issues unconditionally from $t9$–$t14$. SR76, SR and SRR*m* effect a ring shiftdown of the contents of R, so that by $t15$ the condition digit of these contents is in R1, and the six least significant digits are in sequential order in the other six digit positions of R.

M3$g$ also directs the contents of R1 to the Arithmetic Unit output decoding gates V($i$), the output of these gates being directed to the V-Mod-generator, V$mg$1, 2. Therefore, the V-Mod-generator accumulates the modulo-3 of the contents of R as they are shifted. The signal M3$g$ enables V$mg$1 and V$mg$2 to receive input signals for the total duration of T$b$. At $t9$, *V$mg$1, *V$mg$2 are responsive to the LSD in R and, consequently, at $t10$, V$mg$2, 1 reflect the modulo-3 of this LSD. Therefore, at $t15$, the V-Mod-generator has accumulated the modulo-3 of the numeric portion of R. At $t15$, the old mod-bits are in R1, which is now sampled. If the R contents are numeric, SV$mg$R issues to direct the contents of V$gm$2, 1 to R72 and R71, while simultaneously placing the contents of R14 and R13 in R74 and R73. However, if the old mod-bits indicate an alphanumeric, SRR$m$ issues, and the entire contents of R1 are transferred to R7. This alternative generation of the condition digit occurs at $t16$, at which time the original six least significant digits of R have been returned to R6–R1 and the new condition digit is in R7.

The signal XMJ occurs at $t8$ when Instruction 25 is employed as a programmed instruction. This serves to place a new operand, which is not used, in J. The signal M3$g$ directs the contents of L1 to the V-Mod-generator, but this function is not used. J$mg$1 is set to 1 at $t16$ by the logic T$b$7 M3$g$. With J$mg$1 at 1 at this time, *A$mm$ will not occur. This is necessary, because the full modulo-3 of a number in L is not necessarily +1, as is that of an operand.

M3$g$ is reset unconditionally at $t16$ (at the end of the first T-cycle in which it exists).

E$nd$ occurs unconditionally at $t16$. Time: 16 clock periods; if programmed employment. 8 clock periods; if wired employment.

*Instruction 26: Mod-3 Generation on L and R (GMF)*

This instruction (FIG. 191) effects the generation of the mod-bits for the numeric contents of both L and R. The instruction is employed as either a "wired" instruction, which is executed by the Central Processor without direction by the program, following a programmed instruction which may alter the modulo-3 of the contents of one or both words in FULL (for example, Instruction 92); or as a "programmed" instruction.

The descriptions of Instructions 25, 92 and 21, coupled with the description to follow, is a complete description of Instruction 26.

When Instruction 26 is employed as a wired instruction, it is entered at time $t9$, because of generation of signal M3$g$ in the immediately preceding clock period, which was the last clock period of a preceding instruction that may have changed the modulo-3 of the contents of L or R, or both. However, Ty is inhibited by the previous signal E$nd$. When Instruction 26 is employed as a programmed instruction, it has an Initial Routine, as any other conventional instruction.

When Instruction 26 is programmed, the Initial Routine is unaltered, the A-register contents have no significance, and the signal M3$g$ issues at $t9$.

For both wired and programmed employment, the actual mod-bit generation occurs following the issuance of M3$g$ and upon the setting of T$b$. For both types of employment, $t9$–$t16$ in the timing diagram are common. The mod-bits of L and R are generated simultaneously during $t9$–$t16$, by parallel operations. The mod-bits of L are generated by the J-Mod-generator and those of R by the V-Mod-generator.

SL76, SL, SLL$s$, SR76 and SR issue unconditionally during the presence of T$b$. SLL7 and SRR$m$ also issue unconditionally from $t9$–$t14$. SLL7, SL76 and SL effect a ring shift-down of the contents of L, so that by $t15$ the condition digit of these contents is in L1, and the six least significant digits are in sequential order in the other six digit positions of L. SRR$m$, SR76 and SR effect a ring shift-down of the contents of R, so that by $t15$ the condition digit of these contents is in R1, and the six least significant digits are in sequential order in the other six digit positions of R.

M3$g$ directs the contents of L1 to M$j$($i$), which are input gates to the J-Mod-generator. Similarly, the contents of R1 are directed to the V-Mod-generator. The mod-bits of the numeric contents of R are generated in the same manner as in Instruction 25. At $t9$, J$mg$2, 1 is set to 00, if the instruction is employed as a wired instruction. On the other hand, if the instruction is a programmed one, J$mg$2, 1 reach 00 at $t9$ if the modulo-3 of the instruction is correct. Consequently, at $t10$, J$mg$2, 1 reflect the modulo-3 of the LSD in L. By $t15$, the J-Mod-generator has accumulated the modulo-3 of the numeric portion of L. At $t15$, the old mod-bits are in L1, which is now sampled. If the L contents are numeric, SJ$mg$L issues to direct the contents of J$mg$2, 1 to L72 and L71. Simultaneously, SLL$s$ places the contents of L14 and L13 in L74 and L73. However, if the old mod-bits indicate an alphanumeric, SLL7 issues, and the entire contents of L1 are transferred to L7. This alternative generation of the condition digit occurs at $t16$, at which time the original six least significant digits of L have been returned to L6–L1, and the new condition digit is in L7.

The signal XMJ occurs at $t8$ when Instruction 26 is employed as a programmed instruction. This serves to place a new operand, which is not used, in J. The signal M3$g$ directs the contents of L1 to the V-Mod-generator, instead of this operand. J$mg$1 is set to 1 at $t16$ by the logic T$b$7 M3$g$. With J$mg$1 at 1 at this time, *A$mm$ will not occur. This is necessary, because the full modulo-3 of a number in L is not necessarily +1, as is that of an operand.

M3$g$ is reset unconditionally at $t16$ (at the end of the first T-cycle in which it exists).

E$nd$ occurs unconditionally at $t16$. Time: 16 clock periods; if programmed employment. 8 clock periods; if wired employment.

*Instruction 53: Halt (HLT)*

This instruction (FIG. 202) is a programmed halt, which causes the Central Processor to halt at $t3$ following the completion of this instruction.

The A-register contents have no significance.

The description of Instruction 21, coupled with the description to follow, is a complete description of Instruction 53.

The Initial Routine is unaltered.

The halt sequence is initiated by the issuance of *H$t$1 at $t3$, and the Central Processor stops when both H$t$1 and H$t$2 are on.

*H$t$1 issues unconditionally at $t3$. At $t4$, H$t$1 is turned off by the issuance of $*\overline{Ht1}$ and H$t$2 is turned on, providing certain conditions are met. Thus, $$*Ht2 = *\overline{Ht1} = Tp\ Ht1\ \overline{Rcb}\ \overline{Web}\ \overline{Bb}$$

If *H$t$2 issues at $t4$, H$t$2 stays on following the end of this instruction. With H$t$2 on, *H$t$1 will issue at $t2$ of the next following instruction, and H$t$1 comes on at $t3$. Since H$t$2 is also on, the Central Processor ceases programmed processing by inhibiting the output signals of clock drivers CDA11, CDA13, CDA14 and SJ. These clock drivers control the setting of the timing flip-flops, the mod-bit check circuitry and the shifting of data in the J-register. The T$a$3 flip-flop is prevented from setting at this next succeeding $t2$, but except for this flip-flop, the Central Processor stops in the $t3$ mode; i.e., $$\overline{Tp}\ Tq\ Ts \text{ and } Ta = 1$$

The signal *End* occurs at *t*8 of this instruction, but the Central Processor continues through its halting process as the next-instruction is received. Since *Cau* occurs at *t*1, and XAN and XJI occur at *t*2, following *End*, when the Central Processor finally halts, the new instruction to be executed is in the I-register, and the address of the next-instruction following this new instruction is stored in the N-register. The signal XAA*w* issues at *t*1, following *End*, and transfers the address portion of the new instruction to the A*w*-register. Thus, when the Central Processor stops, the new instruction is in both the J and I-registers, the address portion of this new instruction is in the A*w*-register, and the address of the next-instruction is in the N-register. The instruction stored in A*w* is used for Zingle cycle operation. The clock driver CDA12 continues to function, so that clock pulses are available to reset H*t*1 and H*t*2, when the appropriate logic is applied thereto, and to set T*a*3 when H*t*2 is reset to 0. When the Central Processor is restarted following this instruction, it will start in the normal *t*3 mode for the instruction in the instruction register.

The two signals $*\overline{Ht1}$ and *H*t*2 will not issue if a tape is reading, a tape is writing, or a B-subroutine is being performed. When the B-subroutine is completed, $*\overline{Ht1}$ and *H*t*2 will issue at the following *t*4, and the Central Processor will halt, as shown in the timing diagram. If either *Reb* or *Web*=1, H*t*1 stays on. At the next *t*1 the C-register contents are altered to 51, and Tape Interrupt Sequence 51 occurs. When R*eb* or W*eb* or both are restored to 0, the halt sequence is completed.

*Instruction 63: Jump Unconditionally (JUN)*

This instruction (FIG. 210) is an unconditional Jump, wherein the execution of instructions in sequential order in Memory is interrupted and a new sequence of instructions commences from the memory location specified in this instruction.

The location address specified in the instruction is: 0000–3999 Memory.

The description of Instruction 21, coupled with the description to follow, is a complete description of Instruction 63.

The Initial Routine is unaltered.

Both T*i* and J*na* issue unconditionally at *t*4. The signal J*na* inhibits the issuance of the signal XNA, so that the next sequential instruction location is not transferred from N to A. Thus, when the next-instruction is brought from Memory, its address is that specified in the address portion of this Instruction 63. Subsequent instructions are taken in sequential order from this new memory location.

J*na* is reset at *t*8 if $\overline{Jr}\ \overline{Jw}\ \overline{Jm20}$.

The signal *End* occurs unconditionally at *t*8. Time: 8 clock periods.

*Instruction 61: Jump Unconditionally, Transfer N to B (JNB)*

This instruction (FIG. 208) is an unconditional Jump, wherein the execution of instructions in sequential order in Memory is interrupted and a new sequence of instructions commences from the memory location specified in this instruction. In addition, the contents of the N-register are placed in the B-register where they may be reached later in the program.

The location address is: 0000–3999 Memory.

The description of Instruction 63, coupled with the description to follow, is a complete description of Instruction 61.

The Initial Routine is unaltered.

Both T*i* and J*na* issue unconditionally at *t*4. The signal J*na* inhibits the issuance of the signal XNA, so that the next sequential instruction location is not transferred from N to A. Thus, when the next instruction is brought from Memory, its address is that specified in the address portion of this Instruction 61. Subsequent instructions are taken in sequential order from this new memory location.

The shift signals SN, SNB and SB issue unconditionally from *t*4–*t*7 and transfer the contents of N to B. These shift signals are controlled by the signal J*na*. Therefore, at *t*8, the address of the next-instruction in the old sequence is stored in B.

The first instruction in the new sequence transfers to J in the clock period following *t*8.

J*na* is reset at *t*8 if $\overline{Jr}\ \overline{Jw}\ \overline{Jm20}$.

The signal *End* occurs unconditionally at *t*8. Time: 8 clock periods.

*Instruction 60: Branch if D1 (BD1)*

This instruction (FIG. 207) is a Jump, conditioned on the state of the D1 decision flip-flop.

The location of the branch address specified in the instruction is: 0000–3999 Memory.

The description of Instruction 63, coupled with the description to follow, is a complete description of Instruction 60.

The Initial Routine is altered by the deletion of the signal XZJ at *t*7 and XMJ at *t*8. Since XZJ does not occur at *t*7, SJ is not then inhibited, and, therefore, continues through *t*7.

This instruction tests the condition of D1. D1 will be set before this instruction commences if certain conditions were met during a preceding comparison instruction; i.e., Instructions 71, 76, 81 or 86.

The actual Jump is accomplished by inhibiting the N to A transfer, thereby leaving the A-register contents unchanged at the time when the Memory is addressed to obtain the next-instruction. If D1 has been on, this N to A transfer is inhibited by the setting of J*na* at *t*4, which in turn inhibits the issuance of the signal XNA. Inhibiting XNA prevents the execution of the instruction in the next sequential location in Memory; instead, the next-instruction is obtained from the address in the address portion of this Instruction 60, and subsequent instructions will be taken sequentially from this new address. If D1 has not been on, XNA occurs, and the normal instruction sequence continues.

The same signal which caused J*na* to set also causes D1 to reset, if it has been on at the beginning of this instruction; as follows:

$$*Jna = *\overline{D1} = (60)\ Ta3\ D1$$

The flip-flop T*i* sets unconditionally at *t*4 and enables the conditional issuance of XNA.

J*na* is reset at *t*8 if $\overline{Jr}\ \overline{Jw}\ \overline{Jm20}$.

The signal *End* occurs unconditionally at *t*8. Time: 8 clock periods.

HALT OPTION

If the Control Console BRANCH HALT switch is on at the beginning of this instruction, the signal K*bh* issues, and the Central Processor will halt at the next *t*3 following the end of this instruction. The halting process is initiated by the setting of H*t*1; i.e., $$*Ht1 = (60)\ Ta3\ Kbh$$

The effect of the issuance of H*t*1 is to superpose Instruction 53 on Instruction 60, and the operations of both instructions will be executed. The sequence of the Halt operation which is superposed on Instruction 60, is described in the preceding section for Instruction 53. As in Instruction 53, the presence of a tape reading or writing or a B-subroutine takes precedence over the halting process. If D1 is on, XNA is inhibited, and the halt occurs with the branch instruction address in the I-register.

*Instruction 62: Branch if D2 (BD2)*

This instruction (FIG. 209) is a Jump, conditioned on the state of the D2 decision flip-flop.

The location of the branch address specified in the instruction is: 0000–3999 Memory.

The description of Instruction 60, coupled with the description to follow, is a complete description of Instruction 62.

The Initial Routine is unaltered.

This instruction tests the condition of D2. D2 will be set before this instruction commences if (*a*) an overflow on the addition to the B-register had occurred in a preceding Instruction 27, or (*b*) during the preceding instruction, the numeric contents of the word read from Memory was incremented by 2 by the signal A*tm* and a carry to the 100's digit did not occur (the signal A*tm* issues whenever the designator bit or the augmentor bit of an instruction is equal to 1).

The actual Jump is accomplished by inhibiting the N to A transfer, thereby leaving the A-register contents unchanged at the time when the Memory is addressed to obtain the next-instruction. If D2 has been on, this N to A transfer is inhibited by the setting of J*na* at *t*4, which in turn inhibits the issuance of the signal XNA. Inhibiting XNA prevents the execution of the instruction in the next sequential location in Memory; instead, the next-instruction is obtained from the address in the address portion of this Instruction 62, and subsequent instructions will be taken sequentially from this new address. If D2 has not been on, XNA occurs, and the normal instruction sequence continues.

The same signal which caused J*na* to set also causes D2 to reset, if it had been on at the beginning of this instruction; as follows:

$$*Jna = *\overline{D2} = (62)\ Ta3\ D2$$

The flip-flop T*i* sets unconditionally at *t*4 and enables the conditional issuance of XNA.

J*na* is reset at *t*8 if $\overline{Jr}\ \overline{Jw}\ \overline{Jm20}$.

The signal E*nd* occurs unconditionally at *t*8. Time: 8 clock periods.

*Instruction 64: Branch if D3 (BD3)*

This instruction (FIG. 211) is a Jump, conditioned on the state of the D3 decision flip-flop.

The location of the branch address specified in the instruction is: 0000–3999 Memory.

The description of Instruction 60, coupled with the description to follow, is a complete description of Instruction 64.

The Initial Routine is altered by the deletion of the signal XZJ at *t*7 and XMJ at *t*8. Since XZJ does not occur at *t*7, SJ is not then inhibited, and, therefore, continues through *t*7.

This instruction tests the condition of D3. D3 will be set before this instruction commences if an affirmative response has been received to the interrogation in a preceding Instruction 54.

The actual Jump is accomplished by inhibiting the N to A transfer, thereby leaving the A-register contents unchanged at the time when the Memory is addressed to obtain the next-instruction. If D3 has been on, this N to A transfer is inhibited by the setting of J*na* at *t*4, which in turn inhibits the issuance of XNA. Inhibiting XNA prevents the execution of the instruction in the next sequential location in Memory; instead, the next instruction is obtained from the address in the address portion of this Instruction 64, and subsequent instructions will be taken sequentially from this new address. If D3 has not been on, XNA occurs, and the normal instruction sequence continues.

The same signal which causes J*na* to set also causes D3 to reset, if it had been on at the beginning of this instruction; as follows:

$$*Jna = *\overline{D3} = (64)\ Ta3\ D3$$

The flip-flop T*i* sets unconditionally at *t*4, and enables the conditional issuance of XNA.

J*na* is reset at *t*8 if $\overline{Jr}\ \overline{Jw}\ \overline{Jm20}$.

The signal E*nd* occurs unconditionally at *t*8. Time: 8 clock periods.

*Instruction 54: Does Condition X Exist? (DSW)*

This instruction (FIG. 203) functions to interrogate the system to determine whether a particular situation exists. If the situation exists, the D3 flip-flop will be set and remain set at the end of this instruction. A succeeding Instruction 64 may then be used to determine the course of the Central Processor as a result of this interrogation.

The A-register contents are: X. The contents X constitute a control function to designate the particular interrogation, or interrogations, to be performed by this instruction.

The description of Instruction 21, coupled with the description to follow, is a complete description of Instruction 54.

The Initial Routine is altered by the deletion of the signal XZJ at *t*7 and XMJ at *t*8. Since XZJ does not occur at *t*7, SJ is not then inhibited, and, therefore, continues through *t*7.

The presence of a particular additional signal in the system, when a given control function X is present, causes the signal D3*g* to issue continuously. (Thus, whenever the proper combination of flip-flops in A are set, and the particular additional signal is present in the system, D3*g* issues.) If D3*g* is present at *t*3, *D3 issues and sets D3 at *t*4. D3 remains set at the end of this instruction to indicate an affirmative result to the interrogation.

The table below illustrates the various combinations of logic which will produce the signal D3*g* for a particular control function.

| Logic | X | Interrogation |
|---|---|---|
| O*v* A33 A21 | 0410 | Has there been an overflow? |
| Er*s* A41 A21 | 1014 | Is there a "read-tape" subalarm? |
| Ew*s* A41 A24 | 1054 | Is there a "write-tape" subalarm? |
| K*ds*1 A42 A11 | 2001 | Is DECISION switch 1 on? |
| K*ds*2 A42 A12 | 2002 | Is DECISION switch 2 on? |
| K*ds*3 A42 A14 | 2005 | Is DECISION switch 3 on? |
| K*ds*4 A42 A21 | 2010 | Is DECISION switch 4 on? |
| K*ds*5 A41 A34 | 1500 | Is DECISION switch 5 on? |
| K*ds*6 A41 A22 | 1020 | Is DECISION switch 6 on? |
| K*ey* A33 A11 | 0401 | Is Control Console KEY switch unlocked? |
| R*s* A34 A21 | 0510 | Is sign of R negative? |
| R*d* A34 A22 | 0520 | Is designator bit of R=1? |
| L*d* A34 A24 | 0550 | Is designator bit of L=1? |
| L*s* A34 A14 | 0505 | Is sign of L negative? |
| A23 | 0040 | Are the last two digits of B≠0? |
| R*m*1 R*m*2 A44 | 5000 | Is R alphanumeric? |
| R*eb* A41 A11 | 1001 | Is a tape reading? |
| W*eb* A41 A12 | 1002 | Is a tape writing? |
| R*wd* A41 A14 | 1005 | Is a tape rewinding? |
| R*eb* W*eb* A41 A32 | 1200 | Is a tape reading and a tape writing? |
| D*t* A33 A22 | 0420 | Has an instruction been rejected? |
| R63(R62+R61)A41 A13 | 0004 | Is the MSD of R non-numeric? |
| P*bz* A33 A24 | 0450 | Is the P-Buffer busy? |
| C*fd* A31 | 0100 | Is the Sorter on and feeding? |
| A*npd* A41 A33 | 1400 | Has there been no pocket decision? |

For example, if X is 0410, and the flip-flop O*v* has been set at the beginning of this instruction, D3*g* will be present during this instruction, so long as O*v* remains in the 1-state.

During five of these interrogations, an interrogated flip-flop is reset, if it has been set at the beginning of this instruction. Thus, O*v*, D*t* and A*npd* are unconditionally reset at *t*4, if they are interrogated by this instruction, and if they have been on. The flip-flops E*rs* and E*ws* are reset in a slightly different manner. If E*rs* is interrogated, the signal E*rsd* issues conditionally (if the Read Buffer is not busy). This is indicated by:

$$Ersd=(54)\ A41\ A21\ A13\ Ers\ \overline{Reb}\ Ta3$$

The signal E*rsd* resets E*rs*.

If E*ws* is interrogated, the signal E*wsd* issues conditionally (if the Write Buffer is not busy). This is indicated by:

$$Ewsd=(54)\ A41\ A24\ A12\ Ews\ \overline{Web}\ Ta3$$

The signal E*wsd* resets E*ws*.

More than one interrogation may be performed during this instruction. This is accomplished by combining control functions. For example, to combine the interrogations, "Has there been an overflow?", or, "Is there a 'read-tape' subalarm?", the digital elements of the corresponding control functions are combined. The resulting control function X for this joint interrogation is 1414. The joint control function, therefore, must have a bit equal to 1 for each bit which must be equal to 1 in each individual interrogation. Other examples of joint interrogations are "Is a tape-reading, writing or rewinding?", for which the control function is 1008; and "Is a tape reading, or is there a read-tape subalarm?" for which the control function is 101$.

One exception to the general method of interrogation by this instruction is the interrogation "Are the last two digits of $B\neq 0$?". The control function for this instruction sets D3 at *t*4, unconditionally. However, the logic for D3 provides that it will be reset for this particular interrogation if the last two digits of B are equal to 0, i.e., $$*\overline{D3}=(54)\ A23\ (B2=0)\ (B1=0)\ Ti$$

Thus, if the last two digits of B are equal to 0, D3 will be reset at *t*5, but if either of these last two digits is not equal to 0, D3 will be on at the end of this instruction.

T*i* issues unconditionally at *t*4 and causes the issuance of XNA. XNA transmits the next-instruction address to the A-register, in order that the next memory cycle-A will make this next-instruction available in the M-register at *t*8.

The signal E*nd* issues unconditionally at *t*8. Time: 8 clock periods.

*Instruction 50: Change State of Sign or Designator of R, or Change Jc (CHR)*

This instruction (FIG. 200) sets a particular flip-flop to a predetermined state, or changes the state of the flip-flop. The instruction also causes the issuance of a signal to reset the R*eb* flip-flop.

The A-register contents are: XXXX. Any non-zero digits of these contents constitute a control function to alter the state of a designated flip-flop.

The description of Instruction 21, coupled with the description to follow, is a complete description of Instruction 50.

The Initial Routine is altered by the deletion of the signal XZJ at *t*7 and XMJ at *t*8. Since XZJ does not occur at *t*7, SJ is not then inhibited and, therefore, continues through *t*7.

Each digit in the control function affects the setting of a particular flip-flop by controlling a set or reset signal at T*a*3. For example, if $A12=1$, the sign bit of the R-register is changed to the 1-state, if it is not already in that state, by the issuance of *R*s* at T*a*3; i.e., $*Rs=(50)\ Ta3\ \overline{Bb}\ \overline{Rs}\ A12$. The following list illustrates the flip-flops which are altered by the presence of the denoted bit in the A-register:

| | |
|---|---|
| $A11$: $*\overline{Rs}$ | $A31$: $*Jc$ |
| $A12$: $*Rs$ | $A32$: $*\overline{Jc}$ |
| $A21$: $*Rd$ | $A41$: $Cfsd$ |
| $A22$: $*\overline{Rd}$ | |

If both set and reset control functions are present for a particular flip-flop, the flip-flop will be changed from the state which it occupies to its other state. For example, if $A2=3$, R*d* will be transferred to its other state at T*a*4. Any one, or all, of the control function bits may be present in a particular instruction word bearing the 50 command.

The presence of the digit A41 causes the issuance of the signal C*fsd*, which, in turn, causes the resetting of the Read Busy flip-flop R*eb*. C*fsd* is designated as the "Reset, Read Busy" signal. The equation for the issuance of this signal is:

$$Cfsd=(50)\ Ta3\ \overline{Bb}\ A41$$

The signal E*nd* occurs unconditionally at *t*8. Time: 8 clock periods.

*Instruction 76: Is R Greater Than M? (RGM)*

This instruction (FIG. 222) effects a comparison between the contents of the R-register and a word in Memory to determine whether the contents of R are greater than the word in Memory.

The operand address is: 0000–3999 Memory.

The description of Instruction 21, coupled with the description to follow, is a complete description of Instruction 76.

The Initial Routine is unaltered.

At *t*9, the word in the specified memory location is in the J-register, for comparison with the word in the R-register.

From *t*9–*t*15, the shift signals SR, SR76 and SRR*m* issue to effect a complete ring shift-down of the contents of R. Simultaneously, the signal SJ issues from *t*9–*t*14, and the signal XZJ issues at *t*15, to effect a shift-down of all seven digits of J to the least significant digit position J1.

The signal C*pg* also issues unconditionally during *t*9–*t*15 to enable various logic inputs to D1 in order that D1 may reflect the result of a "greater than" comparison.

If R is:

Greater than $J-D1$ turned on.
Equal to $J-D1$ unchanged.
Less than $J-D1$ turned off.

From *t*9–*t*15, the contents of R1 and J1 are fed into the R*gm* and IR*em* logic chain. Generally, the R*gm* signal will equal 1 if the R1 digit is greater than the J1 digit. The IR*em* signal will equal 1 if the R1 digit is equal to the J1 digit, or if either R1 or J1 contains an asterisk (*). From *t*9–*t*14, the corresponding digits of the numeric contents of R and J are compared by R*gm* and IR*em*, and the R*gm* and $\overline{IREm}$ signals are employed to control the state of the D1 flip-flop. During these six clock periods, D1 sets or resets as follows:

(1) If $R1>J1$, *D1 issues.
(2) If $R1<J1$, $*\overline{D1}$ issues.
(3) If $R1=J1$, there is no change in D1.
(4) If there is an asterisk in either R1 or J1, the equality is indicated, and there is no change in D1. In this instance, $\overline{IREm}=0$ and inhibits any signal provided by R*gm*.

If, during the comparison of the contents of R1 and J1, one or both of the digits is non-numeric, the numeric equivalent of the non-numeric digit is employed in determining whether the digit content of R1 is greater than that of J1.

In the comparison of non-numerics, a period compares greater than any other digit, except the asterisk, to which it is equal.

Thus, by *t*15, the numeric contents of R and J have been compared, and if $D1=1$, $|R|>|J|$. If $D1=0$, after comparing these numeric contents of R and J, either $|R|=|J|$ or $|R|<|J|$. At *t*15, the condition digits of R and J are in R1 and J1 respectively, and several alternative courses are available.

When this instruction was initiated, the flip-flop Jc could have been in either one of its two states. Jc can only be set, or reset, by Instruction 50. The state of Jc will influence the course of the comparison at $t15$.

The result of the comparison at $t15$ is also determined by the state of the two flip-flops W1 and W2. During $t9$–$t14$, *W1 issues so that W1 is set to 1 and stays set, if $\overline{IRcm}$ occurred during this time. Thus, at $t15$, if $W1=1$, the numeric contents of R and J were not alike, whereas if $W1=0$, the numeric contents of R and J are equal. During $t9$–$t14$, *W2 issues, so that W2 is set to 1 and stays set, if at any time R1 or J1 contained an asterisk.

At $t15$, if $W2=1$, the condition digits of R and J have no influence on the final state of D1, and it remains in the state that it was in at $t15$. Thus, if an asterisk were present in the numeric portion of either R or J; if $D1=1$ at the end of this instruction, the absolute value of the numeric portion of R is greater than the absolute value of the numeric portion of J, whereas if $D1=0$, the absolute value of the numeric portion of R is less than or equal to that of J.

If $W2=0$ at $t15$, the state of Jc determines the influence of the condition digits of R and J on the comparison. If $Jc=1$, the absolute values of the 4 position bit and the 5 position bit of the condition digits of R and J are compared at $t15$, and if the absolute value of the combination of the 4 position bit and the 5 position bit of the condition digit of R is greater than the corresponding value of J, *D1 will issue. Thus, with $Jc=1$ and $W2=0$, if $D1=1$ at the end of this instruction, $|R|>|J|$; where the digits compared included the numeric portions and the 4 position bit and 5 position bit of the condition digits.

If $Jc=0$, and $W2=0$, the algebraic values of R and J are compared. In this instance, at $t15$, only the sign bits of the condition digits are sampled to determine the inputs to the D1 flip-flops. The following Table A illustrates the influence of the sign bits on changing the state of D1 at $t15$. The body of the table illustrates the state of D1 at $t16$, provided it had the indicated state at $t15$.

have minus signs, the state of D1 at $t15$ may have to be inverted to correctly represent the relationship between R and J. If the signs are unlike, the state of D1 has to reflect that R is greater than J, only if R has the positive sign.

Had D1 been on at the beginning of the instruction, and the portions of J and R compared equal, D1 would have remained on.

W1 and W2 are reset to 0 in the clock period next following $t16$.

The asterisk is a programming tool. Whenever an asterisk is present as a digit in the numeric portion of either R or J, when R and J are compared, the comparison for that digit will always be equality. Furthermore, the presence of an asterisk will always prevent the comparison of the two condition digits. This effect of the asterisk is employed in all comparison instructions.

The signal *End* occurs unconditionally at $t16$. Time: 16 clock periods.

*Instruction 86: Is L—R Greater Than $M_A$ and $M_A+1$? (FGM)*

This instruction (FIG. 228) effects a comparison between the entire contents of the L and R registers (FULL) and a double-precision word in Memory to determine whether the contents of FULL are greater than the double-precision word in Memory.

The operand address, $M_A$, is: 0000–3998.

The description of Instruction 76, coupled with the description to follow, is a complete description of Instruction 86.

The Initial Routine is unaltered.

From $t9$–$t15$, the shift signals SL76, SL, SLR7, SR76, SR, and SRL7 issue to effect a half ring shift-down of the contents of $L-R$. Simultaneously, the signal SJ issues from $t9$–$t14$, and the signal XZJ issues at $t15$ to effect a shift-down of all seven digits of J to the least significant digit position J1. Thus, from $t9$–$t15$, the least significant half words (LSH) of the two double-precision words are compared. In a similar manner from $t17$–$t23$, the MSH portions of the two double-precision words are compared.

The LSH in Memory at memory location $M_A+1$ is obtained by increasing the instruction word address portion TABLE A: STATE OF D1 at $t16$

| Jc=0 W2=0 Sign of— | | State of D1 at $t15$ | | | Comments |
|---|---|---|---|---|---|
| R | J | D1 (\|R\|>\|J\|) | $\overline{D1}$ $\overline{W1}$ (\|R\|=\|J\|) | $\overline{D1}$ W1 (\|R\|<\|J\|) | |
| + | + | D1 | $\overline{D1}$ | $\overline{D1}$ | If both signs (+), never change D1. |
| + | − | D1 | D1 | D1 | If R is (+) and J is (−), R is always larger than J (even if magnitudes are equal). |
| − | + | $\overline{D1}$ | $\overline{D1}$ | $\overline{D1}$ | If R is (−) and J is (+), R always less than J (even if magnitudes are equal). |
| − | − | $\overline{D1}$ | $\overline{D1}$ | D1 | If both signs (−), must reverse results of magnitude comparison, unless \|R\|=\|J\|. |
| W2=1 | | D1 | $\overline{D1}$ | $\overline{D1}$ | Asterisk in R or J. No comparison at $t15$. |
| W2=0 Jc=1 R7>J7 | | D1 | D1 | D1 | If R7>J7, R>J. |
| W2=0 Jc=1 R7<J7 | | $\overline{D1}$ | $\overline{D1}$ | $\overline{D1}$ | If R7<J7, J>R. |
| W2=0 Jc=1 R7=J7 | | D1 | $\overline{D1}$ | $\overline{D1}$ | If R7=J7, no change from $t15$. |

Generally, the table indicates that if the signs of R and J are both positive, the state of D1 at $t15$ correctly represents the relationship of R to J. If both R and J by 1 at $t4$, so that the LSH is in J at $t9$. At $t10$, the instruction word address portion is decreased by 1. Thus, at $t17$, the MSH is in J from $M_A$.

The signal *Cpg* also issues unconditionally during *t9–t15* and during *t17–t23* to enable various logical inputs to D1 in order that D1 may reflect the result of a "greater than" comparison.

If FULL is:

Greater than $M_A$, $M_A+1$, —D1 turned on.
Equal to $M_A$, $M_A+1$, —D1 unchanged .
Less than $M_A$, $M_A+1$, —D1 turned off.

The conditions on the comparison according to whether $Jc=1$, whether an asterisk is present in the word compared, and whether $D1=1$ at the commencement of this instruction are identical for each half word comparison and are identical to the comparison described in detail in Instruction 76. Thus, in effect, this instruction is two successive Instructions 76 performed in sequence on the LSH and MSH portions of the two double-precision words compared. The state of D1 at the start of the MSH comparison is its state at the conclusion of the LSH comparison. The W1 and W2 flip-flops are reset between the two comparisons, i.e., at *t17*.

The signal *End* occurs unconditionally at *t24*. Time: 24 clock periods.

*Instruction 71: Is R Unequal to M? (RUM)*

This instruction (FIG. 217) effects a comparison between the contents of the R-register and a word in Memory to determine whether the contents of R are unequal to the word in Memory.

The operand address is: 0000–3999 Memory.

The description of Instruction 76, coupled with the description to follow, is a complete description of Instruction 71.

The Initial Routine is unaltered.

At *t9*, the word in the specified memory location is in the J-register, for comparison with the word in the R-register.

From *t9–t15*, the shift signals SR, SR76, and SRR*m* issue to effect a complete ring shift-down of the contents of R. Simultaneously, the signal SJ issues from *t9–t14*, and the signal XZJ issues at *t15* to effect a shift-down of all seven digits of J to the least significant digit J1.

If R is:

Unequal to J—D1 turned on.
Equal to J—D1 unchanged.

From *t9–t15*, the contents of R1 and J1 are fed into the IR*em* logic chain. From *t9–t14*, the IR*em* signal will equal 1 if the R1 digit is equal to the J1 digit, or if either R1 or J1 contains an asterisk. If at any time during this period $\overline{TRem}=0$, *D1 issues. At any time the asterisk appears in R1 or J1, *W2 issues. At *t15*, the comparison ends if W2 has been set. However, if W2 is still equal to 0, indicating that no asterisks have appeared in the numeric portions of R and J, the 4 position bit and 5 position bit of the condition digits are compared by IR*em* for inequality, and if inequality is indicated, *D1 issues.

Therefore, if D1 is set before beginning the instruction, or is set at any time during the instruction, it remains set at the end of the instruction. D1 is set in the event of any inequality during *t9–t14* and an inequality during *t15*, if W2 had not been previously set.

The signal *End* occurs unconditionally at *t16*. Time: 16 clock periods.

*Instruction 81: Is L—R Unequal to $M_A$ and $M_A+1$? (FUM)*

This instruction (FIG. 224) effects a comparison between the entire contents of the L and R registers (FULL) and a double-precision word in Memory to determine whether the contents of FULL are unequal to the double-precision word in Memory.

The operand address, $M_A$, is: 0000–3998 Memory.

The descriptions of Instructions 71 and 76, coupled with the description to follow, is a complete description of Instruction 81.

The Initial Routine is unaltered.

From *t9–t15*, the shift signals SL76, SL, SLR7, SR76, SR and SRL7 issue to effect a half ring shift-down of the contents of *L—R*. Simultaneously, the signal SJ issues from *t9–t14*, and the signal XZJ issues at *t15* to effect a shift-down of all seven digits of J to the least significant digit position J1. Thus, from *t9–t15*, the least significant half words (LSH) of the two double-precision words are compared. In a similar manner, from *t17–t23*, the MSH portions of the two double-precision words are compared.

The LSH in Memory at memory location $M_A+1$ is obtained by increasing the instruction word address portion by 1 at *t4*, so that LSH is in J at *t9*. At *t10*, the instruction word address portion is decreased by 1. Thus, at *t17*, the MSH is in J from $M_A$. During *t9–t15* and *t17–t23*, the contents of R1 and J1 are fed into the IR*em* logic chain to enable various logical inputs to D1 in order that D1 may reflect the result of an "inequality" comparison.

If FULL is:

Unequal to $M_A$, $M_A+1$, —D1 turned on.
Equal to $M_A$, $M_A+1$, —D1 unchanged.

If D1 is set before the beginning of the instruction, or is set at any time during the instruction, it remains set at the end of the instruction. The presence of an asterisk in the numeric portion of either half word of *L—R* or $M_A$, $M_A+1$ prevents comparison of the condition digits of the respective half word.

In effect, this instruction is two successive Instructions 71 performed in sequence on the LSH and MSH portions of the two double-precision words compared. The W2 flip-flop is reset between these comparisons, i.e., at *t17*.

The signal *End* occurs unconditionally at *t24*. Time: 24 clock periods.

*Instruction 31: Find Word in Memory Equal to L—R (FND)*

This instruction (FIG. 195) effects a search of the Memory to locate a double-precision word that is equal to the contents of FULL. When the word is found, an indication of its location is stored in the B-register.

The operand address is: 0000–3998 Memory.

The descriptions of Instructions 71 and 81, coupled with the description to follow, is a complete description of Instruction 31.

The Initial Routine is unaltered.

Following the first T-cycle, a series of comparisons is performed between a double-precision word from Memory and the contents of FULL. Each comparison requires two T-cycles. During the first T-cycle of each comparison, Ty is off and the LSH's are compared. During the second T-cycle, Ty is on and the MSH's are compared. The first and second T-cycles of each comparison occur during *t9–t24* of the timing sequence. At *t24*, a decision is made: if the double-precision word in Memory is unequal to the contents of FULL, the timing circuit is reset to *t9*, and another comparison is made; but, if equality was found, Tz is set and the Central Processor enters an instruction-closing T-cycle (*t25–t32*).

The original operand address, $M_A$, is increased by 1 at *t4*, and at *t9* the LSH from $M_A+1$ is in J. From *t9–t15*, the shift signals SL76, SL, SLR7, SR76, SR and SRL7 issue to effect a half ring shift-down of the contents of *L—R* (FULL). Simultaneously, the signal SJ issues from *t9–t14* and the signal XZJ issues at *t15* to effect a sequential shift of all seven digits of J to J1. Thus, from *t9–t15*, the LSH portions of the two double-precision words are compared. The contents of R1 and J1 are fed into the IR*em* logic chain to enable various inputs to D1 in order that D1 may reflect the result of the comparison. So long as $IRem=1$, indicating that the digits compared are alike, the state of D1 is unchanged from 0. If $IRem=0$, indicating an inequality in the contents of R1 and J1, *D1 occurs and D1 is set to the 1-state, where it remains until $t24$, whereupon a D1 resetting signal automatically occurs. During this comparison an asterisk (*) in either R1 or J1 compares as an equality, and immediately sets W2 to the 1-state, where it remains until $t16$, at which time $*\overline{W2}$ issues. At $t15$, if $W2=0$, the 4 position bit and 5 position bit of the condition digits of the LSH's are compared for equality. However, if an asterisk was in the numeric portion of either LSH, $W2=1$ at $t15$, and the condition digits of the LSH's are ignored in the comparison. This procedure is similar to that of Instructions 71 and 81.

At $t9$, *Cad* issues, so that the original operand address $M_A$ is restored to the A-register. At $t17$, the MSH from $M_A$ is in J. *Ty issues at $t16$, so that the next clock period is $t17$ of the timing sequence; i.e. (T*b* Ty). From $t17$–$t23$, a comparison similar to that described above is performed on the MSH's. Since W2 was reset to 0 at $t17$, an asterisk in the numeric portions of the MSH's will prevent comparing the condition digits thereof at $t23$. Thus, by $t24$, two double-precision words have been compared for equality. If any two corresponding digits compared were unequal, D1 was set to the 1-state and is in that state at $t24$. If either half of either double-precision word contained an asterisk, the corresponding condition digits were not compared. From $t1$–$t23$ this instruction is similar to Instruction 81, except for the issuance of three *Cau* signals during $t17$–$t19$.

At $t24$, the succeeding course of action will depend on the state of D1. If $D1=1$, indicating that the two double-precision words compared were unequal, the search criterion of this instruction has not been satisfied, so that the search must be continued. The timing sequence is thereupon returned to $t9$ by issuing $*\overline{Ty}$. Simultaneously, D1 and W2 are restored to the 0-state, and the $t9$–$t24$ sequence is repeated on the next sequential double-precision word in Memory. Since the A contents had been counted up by 3 during $t17$–$t19$, the word at $M_A+3$ is in the M-register at $t24$ and is then compared with the LSH of FULL starting at the new $t9$. The address $M_A+3$ locates the LSH of the double-precision word in Memory next following the one originally addressed. When $t24$ is again reached, the state of D1 again influences the succeeding course of the Central Processor. So long as $D1=1$ at $t24$, the word sought has not been found, the timing sequence is again returned to $t9$, and the next double-precision word in Memory is compared with FULL.

If, however, $D1=0$ at $t24$, a word equal to FULL has been found, Tz is set to 1, and the instruction-closing T-cycle is entered; i.e., the T*b* Tz-subsequence.

Whether the timing sequence is returned to $t9$, or continued to $t25$, depends on whether *Tz issues or not at $t24$; as follows:

$$*Tz=(31)\ Ty\ \overline{D1}\ Tb8\ \overline{IEnd}$$

Since $*\overline{Ty}$ occurs at $t24$, the T-cycle starting with $t9$ is denoted as the $\overline{Ty}\ \overline{Tz}$ subsequence and that at $t25$ as the $\overline{Ty}$ Tz subsequence. The T-cycle starting at $t17$ is denoted as the Ty $\overline{Tz}$ subsequence. Thus, during the repetitive searching process, Ty goes on and off during alternate T-cycles.

During the instruction-closing T-cycle, the next LSH enters J, but is never employed. At $t25$, *Cad* issues for the last time and reduces the address in the A-register to a number which is greater by 2 than the address of the "equal" word found; i.e., $M_e+2$. The following table illustrates the sequential addresses in A, assuming that the search starts at $M_A=1000$, and that the MSH of the "equal" word is 1004.

| Timing circuit state | A in 1st clock period of T-cycle | A in 4th clock period of T-cycle | D1 at $t24$ |
|---|---|---|---|
| T*a* | ---- | 1001 | |
| T*b* $\overline{Ty}\ \overline{Tz}$ | 1001 | 1000 | |
| T*b* Ty $\overline{Tz}$ | 1000 | 1003 | 1 |
| T*b* $\overline{Ty}\ \overline{Tz}$ | 1003 | 1002 | |
| T*b* Ty $\overline{Tz}$ | 1002 | 1005 | 1 |
| T*b* $\overline{Ty}\ \overline{Tz}$ | 1005 | 1004 | |
| T*b* Ty $\overline{Tz}$ | 1004 | 1007 | 0 |
| T*b* $\overline{Ty}$ Tz | 1007 | 1006 | |

NOTE.—1006 transferred to B, but 1004 is the location ($M_e$) of "found" word.

The signal *J*na* issues at $t25$. J*na* enables the issuance of XAN and XNA at $t27$. Thus, at $t28$, the address of the next instruction is in A, and $M_e+2$ is in N. XNA does not issue when T*i* issues at $t28$, because T*i* does not control XNA for this instruction. J*na* also enables the issuance of the shift signals SN, SNB, and SB from $t28$–$t31$:

$$SN,\ SNB,\ SB=(31)\ Jna\ Tp$$

Thus, from $t28$–$t31$, the contents of N, which are $M_e+2$, are transferred to B. At $t32$ this address is in B. $*\overline{Jna}$ issues at $t31$ and $*\overline{Tz}$ at $t32$.

NOTE.—Although SJ does not occur in the $\overline{Ty}$ Tz subsequence, so that J*mg*2, 1 stays at 0, 0 throughout the subsequence, the mod alert does not occur since *A*mm* is inhibited by Tz; i.e., $$*Amm=\overline{Jmg1}\ Tb8\ \overline{Tz}$$

The signal E*nd* occurs unconditionally at $t32$; as follows:

$$End=(31)\ Tb8\ Tz$$

Time: 32 clock periods, plus 16 clock periods for each unsuccessful search.

HALT SEARCH OR TUMBLE VARIATION

The above analysis was based on the assumption that a prior Multiplex Buffer Instruction (i.e., 65, 66 or 68) is not incomplete when this instruction is started. If such an instruction was incomplete, the Central Processor must be prepared to accept or transmit data at intervals not exceeding 64 clock periods. Therefore, means is provided for interrupting Instruction 31.

The primary flip-flop in initiating the variation is H*st*, where $*Hst=(31)\ \overline{Tz}\ \overline{T1}\ \overline{W3}\ (Jr+Jw)$. J*r* is a flip-flop which is set whenever the Central Processor must interrupt its program to accept data from the Read Buffer. Similarly, J*w* orders the Central Processor to interrupt its program to fill the Write Buffer. *J*r* and *J*w* can only occur at T*i*, if the respective "Unload, Read," U*r*, or "Load, Write," L*w*, signals are present. Thus, $$*Jr=Ti\ Ur\ \overline{Jm20} \text{ and } *Jw=Ti\ Lw\ \overline{Ur}$$

For Instruction 31, T*i* can only occur at the 4th clock period of a Ty or Tz cycle. Therefore, this instruction can only be interrupted at the end of a FULL comparison, i.e., at $t24$, since except for the instruction-closing T-cycle, T*i* only occurs at each $t20$. With the issuance of T*i*, *J*r* or *J*w* can occur, at $t20$, if the corresponding Read or Write Buffers are ready. Then, in accordance with the above logic, *H*st* occurs at $t21$. It should be noted that H*st* is inhibited during the instruction-closing T-cycle by Tz.

If H*st* is on at $t24$, the C-register is set to 51, with timing returning to $t1$; i.e., $*T1=Tb8$, $Hst$, and a Read-Interrupt or Write-Interrupt subsequence occurs. (See section on Multiplex Buffer Operations.) However, $Hst$ does not effect the setting of Tz at $t24$, so that if $D1=0$, *Tz occurs. Neither the setting of Tz nor the address in the A-register at $t24$ are altered by the Interrupt-subsequence. Consequently, following the Interrupt-subsequence, the sequence of Instruction 31 continues from the precise point where it was interrupted; i.e., the Central Processor returns to $t9$, if Tz has not been set at $t24$, and to $t25$ if Tz has been set, and C is reset to 31. $*\overline{Hst}$ occurs at $Tb1$, which is the first clock period following the Interrupt-subsequence. Thus, if an Interrupt-subsequence occurs, $*\overline{Hst}$ occurs either at $t9$ or $t25$, depending on whether the search had been completed.

If $Jr=1$, XZJ and XMJ are inhibited during $t23$ and $t24$, respectively.

*Instruction 36: Find Word in Memory Equal to or Greater Than FULL (FGR)*

This instruction (FIG. 197) effects a search of the Memory to locate a double-precision word that is equal to or greater than the contents of FULL. When the word is found, an indication of its location is stored in the B-register.

The operand address is: 0000–3998 Memory.

The descriptions of Instructions 31, 76 and 86, coupled with the description to follow, is a complete description of Instruction 36.

The Initial Routine is unaltered.

Following the first T-cycle, a series of comparisons is performed between a double-precision word from Memory and the contents of FULL. Each comparison requires two T-cycles. During the first T-cycle of each comparison, Ty is off and the LSH's are compared. During the second T-cycle, Ty is on and the MSH's are compared. The first and second T-cycles of each comparison occur during $t9$–$t24$ of the timing sequence. At $t24$ a decision is made: if the double-precision word in Memory is less than the contents of FULL, the timing circuit is reset to $t9$, and another comparison is made; but if the double-precision word in Memory is equal to or greater than the contents of FULL, Tz is set and the Central Processor enters an instruction-closing T-cycle ($t25$–$t32$).

The sequence for obtaining words from Memory and for executing successive comparisons is similar to that of Instruction 31. The comparison to determine if FULL is greater than the double-precision word in Memory is similar to that of Instruction 86. The comparison includes the conditions that an asterisk in R or J sets W2 and precludes a comparison of the corresponding condition digits; but if no asterisk is present, $Jc=0$ causes an algebraic comparison of the contents of R and J, and $Jc=1$ causes an absolute comparison of the numeric portions and the 4 position bits and 5 position bits of the condition digits of the words in R and J. As in Instruction 86, the state of D1 continues from the LSH comparison to the MSH comparison. Unlike Instruction 86, however, D1 is reset to 0 at $t24$ to prepare for the next comparison.

If D1 is equal to 1 at $t24$, FULL is greater than the double-precision word from Memory, or conversely, the Memory double-precision word is less than FULL, so that the search criterion has not been satisfied, and the timing sequence returns to $t9$. If D1 is equal to 0 at $t24$, FULL is equal to or less than the word in Memory, or conversely, the word in Memory is equal to or greater than FULL, whereby the search criterion is satisfied and the timing sequence continues to $t25$, the beginning of the instruction-closing T-cycle.

At the end of this instruction, the address $M_g+2$, where $M_g$ is the address of the Memory double-precision word equal to or greater than the contents of FULL, is stored in B.

The signal $End$ occurs unconditionally at $t32$; as follows:

$$End=(36)\ Tb8\ Tz$$

Time: 32 clock periods, plus 16 clock periods for each unsuccessful search.

NOTE.—When this instruction is used for sorting, it is followed by an Instruction 35 (Tumble), with an operand address of 3998.

HALT SEARCH OR TUMBLE VARIATION

The preceding analysis is based on the assumption that a prior Multiplex Buffer Instruction (i.e., 65, 66 or 68) not incomplete when this instruction is started. If such an instruction was incomplete, the Central Processor must be prepared to accept or transmit data at intervals not exceeding 64 clock periods. Therefore, means is provided for interrupting Instruction 36. The Halt Search or Tumble Variation is similar to that described for Instruction 31, except that the C-register is set to 56. The interruption can only occur at $t24$, and at its conclusion, the sequence of Instruction 36 is continued from the precise point where it was interrupted, C being restored to 36.

*Instruction 35: Tumble (TUM)*

This instruction (FIG. 196) effects the insertion of a double-precision word into a predetermined position within a sequential set of double-precision words in Memory. When this instruction is used for sorting by insertion, it is preceded by Instruction 36. Instruction 36 determines the address of the double-precision word in the sequential set that is equal to or greater than the contents of FULL, which contents remain unchanged as this instruction is entered. Thereupon, this instruction inserts these contents of FULL at the memory location found in the preceding Instruction 36 and translates, or "tumbles" each of the remaining double-precision words in the set to the next successive double word location. When a double-precision word is reached that has a period (.) in the least significant digit position, it is tumbled and the instruction terminated.

The operand address is: 0000–3998, or 9998 Memory.

The descriptions of Instructions 31, 36, 80 and 85, coupled with the description to follow, is a complete description of Instruction 35.

The Initial Routine is unaltered, except that in the sorting mode a B-subroutine is usually performed during the Initial Routine.

During the sorting mode, the instruction word bears the address 9998 and has its sign bit equal to 1. With this instruction word, a B-subroutine is performed before the instruction is executed. The address stored in the B-register during the preceding Instruction 36 is added to 9998 and placed in the A-register. Since the 9998 address in A, when increased by the contents of B, provides a number 2 less than the contents of B, the new address in A, following the B-subroutine, is the address of the previously located double-precision word "equal to or greater than" the contents of FULL.

During the first T-cycle, the operand address, $M_A$, is increased by 1 to the address of the LSH of the double-precision word in Memory originally addressed. At $t9$, the LSH from $M_A+1$ is in J. Simultaneously, $Mwt$ issues and initiates the storing of the contents of R in $M_A+1$.

The instruction then proceeds through a series of $t9$–$t24$ sequences, the second half of each sequence being distinguished from the first by the presence of the Ty signal. When Ty is turned off at $t24$, the timing sequence returns to $t9$, if $W3=0$. From $t9$–$t16$, the LSH from the Memory double word location addressed is placed in L, the MSH of FULL that is in L is shifted to R, and the LSH of FULL in R is transferred to the location in Memory to replace the LSH brought into L. From $t17$–$t24$, the MSH from the addressed Memory double word location is placed in L, the LSH of the addressed Memory double word is shifted from L to R, and the MSH of FULL in R is transferred to the location in Memory to replace the MSH brought into L. Thus, during each period *t*9–*t*24, the contents of FULL are exchanged with the contents of a double word location in Memory. The address of this double word location is increased by 2 each *t*9–*t*24 sequence, since during *t*17–*t*19 *Cau* issues three times.

Therefore, each double-precision word read from Memory is transferred to the next sequential double word location in Memory. The instruction enters its last *t*9–*t*24 cycle when a double-precision word containing a period (.) in the LSD position is in FULL at *t*9. The presence of a period in R1 at *t*9 causes the issuance of *W3, thereby setting W3 to 1, where it remains until reset by the signal *End*. Whenever W3 is set at *t*10, *End* will occur at *t*24. If *End* does not occur at *t*24 ($W3=0$), the timing sequence is reset to *t*9.

The shifting of data in FULL is accomplished by the signals SL76, SL, SLR7, SR76 and SR. The signal SJL*s* transfers data from J13 and J14 to L73 and L74. The signal SJL*m* issues from *t*9–*t*14 and from *t*17–*t*22 to transfer the contents of J11 and J12 to the corresponding mod positions of L7. At *t*15 and *t*23, the contents of the J-Mod generators are transferred by the signal SJ*mg*L to the mod-bit positions of L7, if the contents of J are numeric. If the contents of J are alphanumeric, SJL*m* issues again at *t*15 and *t*22.

The following example will illustrate the operation of this instruction. Assume that the contents of FULL are 234567 890123 from the preceding Instruction 36. The double word memory location at which a double-precision word was found that is equal to or greater than the contents of FULL is 2002; therefore, the B-register now contains the address 2004. The following data is stored in the corresponding memory locations prior to execution of this Instruction 35.

*L*−*R*: *234567 890123*

B-register contents: *2004* (*2002* was $\geq L-R$)

| Memory locations | Data |
|---|---|
| 2000, 2001 | 123456 789012 |
| 2002, 2003 | 345678 901234 |
| 2004, 2005 | 456789 012345 |
| 2006, 2007 | 000000 00000. |
| 2008, 2009 | 135790 246801 |

The instruction word placed in the I-register in the instant operation is 359998. Following a B-subroutine, this instruction word is changed to 352002. Thus, the initial memory location addressed is 2002. The original contents of FULL are now stored in 2002, 2003, and the tumble process proceeds until the double-precision word originally stored in 2006, 2007 is placed in FULL. This word has a period in the LSD position and causes the instruction to conclude. The following data is stored in the corresponding memory locations at the termination of this instruction.

| Memory locations | Data |
|---|---|
| 2000, 2001 | 123456 789012 |
| 2002, 2003 | 234567 890123 |
| 2004, 2005 | 345678 901234 |
| 2006, 2007 | 456789 012345 |
| 2008, 2009 | 000000 00000. |
| 2010, 2011 | Unchanged |

NOTE.—*L*−*R*: 135790 246801

At the end of this instruction, FULL contains the double-precision word originally stored in the memory location where the double-precision word containing the period is now stored.

The signal T*i* issues at each *t*20, but XNA does not occur unless $W3=1$.

The signal *End* occurs at *t*24, provided $W3=1$; as follows:

$$End=(35)\ Tb8\ Ty\ W3$$

Time: 24 clock periods, plus 16 clock periods for each double-precision word tumbled.

HALT SEARCH OR TUMBLE VARIATION

The above analysis is based on the assumption that a prior Multiplex Buffer Instruction (i.e., 65, 66 or 68) is not incomplete when this instruction started. If such an instruction was incomplete, the Central Processor must be prepared to accept or transmit data at intervals not exceeding 64 clock periods. Therefore, a means is provided for interrupting Instruction 35. The Halt Search or Tumble Variation is similar to that described for Instruction 31, except that the C-register is set to 55. The interruption can only occur at *t*24, and at its conclusion, the sequence of Instruction 35 continues at *t*9, C being restored to 35. However, *H*st* cannot issue if Instruction 35 is beginning to halt; i.e., if $W3=1$. Thus, $*Hst=(35)(Jr+Jw)\overline{Tz}\ \overline{W3}\ \overline{T1}$.

*Instruction 72: Add M to R (AMR)*

This instruction (FIG. 218) effects the algebraic adding of a word in Memory to the word in R. The sum appears in R at the conclusion of the instruction. If the sum exceeds 6 digits, the overflow is lost, but the overflow flip-flop is turned on.

The operand address is 0000–3999 Memory.

The description of Instruction 21, coupled with the description to follow, is a complete description of Instruction 72.

The Initial Routine is unaltered.

One of three courses is taken during this instruction:

A. If the signs of the R and M contents are alike, |R| is added to |M| and the sign of R is affixed to the result.

B. If the signs of the R and M contents are unlike and $|R|>|M|$, |M| is deducted from |R| and the sign of R is affixed to the result.

C. If the signs of the R and M contents are unlike and $|M|>|R|$, |R| is deducted from |M| and a sign opposite to that of R is affixed to the result.

The course taken during this instruction is determined by several criteria. During the Initial Routine, the signs of the contents of R and M are examined. If they are alike, course A is entered at *t*9. If they are unlike, simultaneous courses B and C are entered at *t*9 by setting U*s* and V*c*. U*s* dictates a subtractive operation starting at *t*9, and V*c* provides for a 10's complement type of subtraction. Both courses B and C are alike from *t*9–*t*16. At *t*16, courses A and B terminate, with the proper answer in R. However, if common courses B and C were taken, the carry flip-flop V*c* is sampled at *t*16, and if V*c* is off the signal *End* does not occur, but instead, course C is found to be the one necessary, so that this instruction continues in *t*33–*t*40.

Consider, now, the operation in detail. At *t*8, if the signs of R and M are unlike, *U*s* and *V*c* occur. The signal SJ occurs from *t*9–*t*14 and shifts the numeric contents of J to the V*a* input AND-gates of the Arithmetic Unit. From *t*9–*t*16, the signals SR76 and SR occur and shift-down the entire contents of R. As the contents of R shift-down, they are applied to the V*b* input AND-gates of the Arithmetic Unit. Therefore, from *t*9–*t*14, the corresponding six numeric digits of R and J are applied sequentially to the Arithmetic Unit. Since a one clock period delay is present in the Arithmetic Unit, the sum digital outputs appear at the V output AND-gates one clock period later. Therefore, from $t10$–$t15$ the six digits of the sum of the two numbers applied to the V*a* and V*b* input AND-gates appear from the V output AND-gates. From $t9$–$t14$, the signal V*ct* issues to enable the numeric inputs to the carry flip-flop V*c*. During $t10$–$t15$, the V*c* flip-flop is set for each pair of digits combined whose total, with the carry value represented by V*c*, is 10 or greater.

If $\overline{Us}$, the true contents of R and J are applied to the Arithmetic Unit from $t9$–$t14$, so that the output of the Arithmetic Unit reflects the addition of these numeric contents. However, if $Us=1$, the 9's complement of J is applied to the V*a* input AND-gates. This complementary input, combined with the initial setting of V*c*, effects the adding of the 10's complement of the contents of J to the contents of R. The signal SVR7 occurs from $t10$–$t15$ and transfers the contents of the V output AND-gates to the MSD position of R. Thus, at $t11$, the LSD of the Arithmetic Unit output appears in R7. By $t16$, the last numeric digit of the Arithmetic Unit output is in R7.

However, the Arithmetic Unit has completed the sum of the numeric contents at $t15$. Therefore, at $t15$, the contents of V*c* are sampled. If V*c* is on at this time, and the operation was one of addition, the overflow flip-flop, O*v*, is set; as follows:

$$*Ov=(72)\ \overline{Us}\ Vc\ Tb7\ \overline{Ty}$$

Thus, during an addition, the carry digit is lost, but the overflow flip-flop is turned on if a carry occurred during the MSD summation. The setting of O*v* does not affect the operation of this instruction. It is the function of the program to test the state of O*v*. (See Instruction 54.)

At $t16$, the signal SV*mg*R occurs and transfers the contents of the V-Mod-generator to the mod-bit positions of R7 and transfers the sign and designator bits in R1 to R7. Thus, at $t33$, or at $t1$, depending on the course, the proper sign and mod-bits are in R7 and the numeric portion of the result is in R6–R1.

*Z*va* issues at $t15$, so that Z*va* is set to 1 at $t16$. At $t16$, E*nd* occurs if $\overline{Us}$ or if U*s* V*c*; i.e., if an additive operation had occurred, or if a subtractive operation had occurred and $|R|>|J|$. If the $|J|>|R|$, $Vc=0$ at $t16$ for the subtractive operation and E*nd* does not occur. Additionally, at $t16$, the U*s* flip-flop is reset unconditionally. If E*nd* does not occur at $t16$, Z*va* continues in its set condition and *Ty and *Tz occur. The issuance of *Ty and *Tz causes the timing sequence to jump to $t33$ in course C.

At $t33$, V*c* is set to 1 to provide for a 10's complement of the contents of R. $*Vc=(72)Tb8$. From $t33$–$t38$, V*ct* issues to enable the numeric inputs to the carry flip-flop. SR76 and SR issue from $t33$–$t40$ to shift-down the contents of R. SVR7 issues from $t34$–$t39$ and transfers the output of the Arithmetic Unit to the R-register. The signal Z*va* causes the entry of 0's into the V*a* input AND-gates. The signal T*z* causes the application of the 9's complement of the contents of R to the V*b* input AND-gates. Thus, a 10's complement of the contents of R is effected from $t33$–$t40$. At $t40$, SV*mg*R occurs and transfers the contents of the V-Mod-generator to the mod-bit positions of R7 and transfers the designator bit in R1 to R7. SV*mg*R does not affect the contents of R73 during a T*y*-cycle. Instead, at $t40$, the sign of R is inverted from its value at $t17$; as follows:

$$*Rs=(72)\ Tb8\ Ty\ \overline{R13} \text{ and } *\overline{Rs}=(72)\ Tb8\ Ty\ R13$$

The following table illustrates the transfer of data in the R-register during the two T*b*-cycles of this instruction.

| | R7 | R6 | R5 | R4 | R3 | R2 | R1 |
|---|---|---|---|---|---|---|---|
| $t9$ | S-7 | S-6 | S-5 | S-4 | S-3 | S-2 | S-1 |
| $t10$ | S-7 | S-7 | S-6 | S-5 | S-4 | S-3 | S-2 |
| $t11$ | V-1 | S-7 | S-7 | S-6 | S-5 | S-4 | S-3 |
| $t12$ | V-2 | V-1 | S-7 | S-7 | S-6 | S-5 | S-4 |
| $t13$ | V-3 | V-2 | V-1 | S-7 | S-7 | S-6 | S-5 |
| $t14$ | V-4 | V-3 | V-2 | V-1 | S-7 | S-7 | S-6 |
| $t15$ | V-5 | V-4 | V-3 | V-2 | V-1 | S-7 | S-7 |
| $t16$ | V-6 | V-5 | V-4 | V-3 | V-2 | V-1 | S-7 |
| $t1$ | S-M | V-6 | V-5 | V-4 | V-3 | V-2 | V-1 |
| $t33$ | S-M | V-6 | V-5 | V-4 | V-3 | V-2 | V-1 |
| $t34$ | S-M | S-M | V-6 | V-5 | V-4 | V-3 | V-2 |
| $t35$ | V'-1 | S-M | S-M | V-6 | V-5 | V-4 | V-3 |
| $t36$ | V'-2 | V'-1 | S-M | S-M | V-6 | V-5 | V-4 |
| $t37$ | V'-3 | V'-2 | V'-1 | S-M | S-M | V-6 | V-5 |
| $t38$ | V'-4 | V'-3 | V'-2 | V'-1 | S-M | S-M | V-6 |
| $t39$ | V'-5 | V'-4 | V'-3 | V'-2 | V'-1 | S-M | S-M |
| $t40$ | V'-6 | V'-5 | V'-4 | V'-3 | V'-2 | V'-1 | S-M |
| $t1$ | S'-M' | V'-6 | V'-5 | V'-4 | V'-3 | V'-2 | V'-1 |

The signal E*nd* occurs unconditionally at $t40$. Time: 16 clock periods if the signs of R and M are alike, or if these signs are unlike $|R|>|M|$. 24 clock periods if the signs of R and M are unlike and $|R|<|M|$.

MATHEMATICAL ANALYSIS OF RESULTS OF COMPLEMENTATION

The following analysis is employed to illustrate courses B and C of this instruction, which are taken when the signs of M and R are unlike. To arrive at a correct answer, a subtraction must be effected of the magnitudes of J and R, and the correct sign attached to the result.

The first ($t9$–$t16$) step is to deduct |J| from |R| by adding the 10's complement of |J| to |R|. Actually, 1 is first inserted in the Arithmetic Unit and the 9's complement of |J| is added to |R|. 10 is subtracted from the result, provided $|R|>|J|$. (In the following exemplary equations it will be assumed that |A| and |B| are both less than 10.)

If the $|R|>|J|$, it is desired to provide:

$$\Delta=|R|-|J| \tag{1}$$

This is accomplished by:

$$\Delta=|R|+(9-|J|)+1-10 \tag{2}$$

V*c* is set to 1 before the complementing operation starts in order to add the 1 of Equation 10. The quantity 10 is deducted from the result by ignoring the 10's carry, V*c*. However, the answer can only truly reflect $|R|-|M|$ if V*c* is present at the end of the additive process. V*c* is present under the following conditions: i.e., if $$|R|+(9-|J|)+1\geqq 10 \tag{3}$$

or $$|R|-|J|\geqq 0 \tag{4}$$

or $$|R|>|J| \tag{5}$$

Therefore, if $|R|>|J|$, the addition of the 9's complement of |J| to |R|, after first setting V*c*, gives the magnitude of the correct answer. The sign which is then affixed to this magnitude is the original sign of R, and the answer is complete.

If, however, $|R|<|J|$, it is desired to obtain $|J|-|R|$. After performing the left-hand side of inequality (3), the result is the 10's complement of the desired answer, since 10 has not been deducted from the result because V*c* did not occur; i.e., $$\Delta=10-(|J|-|R|) \tag{6}$$

Consequently, if V*c* does not occur following the performance of the left-hand side of inequality (3), $|J|>|R|$, and the preceding answer is complemented by 10; i.e., by first setting V*c* and then by adding the 9's complement of the new contents of R to 0's.

$$R''=9-[|R|+(9-|J|)+1]+1 \tag{7}$$

$$R''=|J|-|R| \tag{8}$$

To these new contents, R'' is affixed a sign opposite that originally in R, and the answer is complete.

The following table illustrates the courses taken by this instruction for all four possible combinations of the contents of R and M with unlike signs.

| | I (Course B) | II (Course B) | III (Course C) | IV (Course C) |
|---|---|---|---|---|
| R | +200000 | −200000 | −100000 | +100000 |
| J | −100000 | +100000 | +200000 | −200000 |
| At $t9$, $Us$ and $Vc$ are set. The 9's complement of J is added to R. The original sign of R is affixed to the new sum in R. | | | | |
| R | +200000 | −200000 | −100000 | +100000 |
| J (comp.) | 899999 | 899999 | 799999 | 799999 |
| Vc | 1 | 1 | 1 | 1 |
| R' | +100000+Vc | −100000+Vc | −900000+$\overline{Vc}$ | +900000+$\overline{Vc}$ |
| | Since $Vc$=1, $End$ occurs, and Vc dropped. | | Since $Vc$=0, continue to $t33$. Set Vc to 1, and add 0's to the 9's complement of R. The sign of R is changed on the final answer in R. | |
| | | R' (comp.) | −099999 | +099999 |
| | | $Zva$ | 000000 | 000000 |
| | | Vc | 1 | 1 |
| | | | +100000 | −100000 |
| | | | $End$ occurs | |

MODULO-3 COMPARISON

In addition to the normal mod-checking of the contents of J, and the mod-generation for the numeric contents of the sum output of the Arithmetic Unit by V$mg$2, 1, the mod-bits are employed to make a check on the results of the additive process employed in this instruction. The mod-check is based on the fact that the modulo-3 of the sum of two numbers (Mod Σ) is equal the sum of the mod-bits of the numbers (Σ Mod). Therefore, following an addition, the modulo-3 of the sum is checked against the sum of the mod-bits of the addend and augend.

In supplying the mod-bits of the addend or augend for the mod-check, care must be taken to insure that the mod-bits of the corresponding contents of R or J are correctly altered if the complement has been employed in the addition. Thus, the following inputs are supplied to the Arithmetic Unit in this instruction:

| | V$a$ | V$b$ |
|---|---|---|
| Addition ($\overline{Us}$ $\overline{Tz}$) | J | R. |
| Subtraction (Us $\overline{Tz}$) | J (comp.) | R. |
| Tz-cycle following subtraction ($\overline{Us}$ Tz) | 0 | R (comp.). |

The modulo-3 of a complemented number is the complement of the original modulo-3. For example, if the modulo-3 of J is $Jmg1=1$, the modulo-3 of the complement of J is $Jmg2=1$; if the modulo-3 of J is $Jmg2=1$, the modulo-3 of the complement of J is $Jmg1=1$. However, if the modulo-3 of J is $\overline{Jmg2}$ $\overline{Jmg1}$, this is also the modulo-3 of the complement of J.

Referring once again to Instruction 21, it is seen that the mod-bits of the numeric contents of J are in J$mg$2, 1, at $t15$. Referring to the preceding table illustrating the contents of R, it is seen that the mod-bits of R are in R1 at $t15$. Therefore, at $t15$, the sum of the mod-bits of R and J may be generated. The AND-gates R$a$2, 1 sample the contents of R12 and R11 at $t15$ and apply these contents directly to the mod-adder flip-flops M$a$2, 1. The AND-gates J$a$2, 1, at $t15$, apply the contents of J$mg$2, 1 directly to the mod-adder flip-flops, if $\overline{Us}$; and the complement of the contents of J$mg$2, 1 to the mod-adder flip-flops, if $Us$ (since, when $Us=1$, the complement of J is applied to the Arithmetic Unit). However, if $Us=1$ from $t9$–$t16$, V$c$ had been set at $t9$ and an additional 1 had been inserted in the Arithmetic Unit, a 1 which does not appear in either input number applied to the Arithmetic Unit. Therefore, this 1 must be added to the contents of M$a$2, 1 before the mod-bits are applied thereto at $t15$ for addition. This is accomplished by setting M$a$1 to 1 at $t9$. Thus, at $t16$, the contents of M$a$2, 1, the mod-adder, represents the sum of the mod-bits (Σ Mod) of the two numbers applied to the Arithmetic Unit.

Since the output of the Arithmetic Unit is only first available at $t10$, the Arithmetic Unit mod-generator V$mg$2, 1 first reflects the modulo-3 of the least significant digit of the output of the Arithmetic Unit at $t11$. Therefore, at $t16$, V$mg$2, 1 reflects the modulo-3 of the 6-digit sum delivered by the Arithmetic Unit. Consequently, at $t16$, the mod-comparator AND-gate, M$c$, samples the contents of M$a$2, 1 and V$mg$2, 1. If V$c$ is on at $t16$, an additional 1 not reflected in V$mg$2, 1 must be sampled with the contents of V$mg$2, 1 to determine if the modulo-3 of the sum equals the sum of the mod-bits. A table illustrating the inputs to the mod-comparator, M$c$, follows.

| $Mc=1$ if: | |
|---|---|
| $\overline{Ma1}$ $\overline{Ma2}$ $\overline{Vc}$ (V$mg$1+V$mg$2) | Σ Mod=0; Mod Σ=1, 2 |
| M$a$1 $\overline{Vc}$ $\overline{Vmg1}$ | Σ Mod=1; Mod Σ=0, 2 |
| M$a$2 $\overline{Vc}$ $\overline{Vmg2}$ | Σ Mod=2; Mod Σ=0, 1 |
| $\overline{Ma1}$ $\overline{Ma2}$ V$c$ $\overline{Vmg2}$ | Σ Mod=0; Mod Σ=1, 2 |
| M$a$1 V$c$ (V$mg$1+V$mg$2) | Σ Mod=1; Mod Σ=0, 2 |
| M$a$2 V$c$ $\overline{Vmg1}$ | Σ Mod=2; Mod Σ=0, 1 |

If the output of the mod-comparator equals 1, a comparison was not obtained and the signal *A$ac$ issues at $t16$ to set the "Alert, Arithmetic" flip-flop, A$ac$, which stops the Central Processor.

In a similar manner, a mod-check is made at $t40$. Although, during this period the next-instruction is in the J-register, the signal Z$va$ inhibits all inputs to J$mg$2, 1 so that J$mg$2, 1 reflect 0, 0 at T$b$7, which is the mod of the 0's applied to the V$a$ input AND-gates of the Arithmetic Unit. At T$b$7, J$mg$1 is set to 1 whenever $Zva=1$ to prevent the issuance of *A$mm$.

All of M$a$2, 1, J$mg$2, 1 and V$mg$2, 1 are set to 0, 0 at the first clock period of each T-cycle.

*Instruction 73: Subtract M From R (SMR)*

This instruction (FIG. 219) effects the algebraic subtracting of a word in Memory from the word in R. The difference appears in R at the conclusion of the instruction. If the difference exceeds 6 digits, the overflow is lost, but the overflow flip-flop is turned on.

The operand address is: 0000–3999 Memory.

The description of Instruction 72, coupled with the description to follow, is a complete description of Instruction 73.

The Initial Routine is unaltered.

One of three courses is taken during this instruction:

A. If the signs of the R and M contents are unlike, |R| is added to |M| and the sign of R is affixed to the result.

B. If the signs of the R and M contents are alike and $|R|>|M|$, |M| is deducted from |R| and the sign of R is affixed to the result.

C. If the signs of the R and M contents are alike and $|M|>|R|$, |R| is deducted from |M| and a sign opposite to that of R is affixed to the result.

This instruction is similar to Instruction 72, except that U$s$ is turned on if the signs of M and R are alike. That is, for subtraction, an additive operation ($\overline{Us}$) is employed if the signs are unlike, and a subtractive operation ($Us$) is employed only if the signs are alike. Therefore, the operative details of this instruction will not be given since, they are identical, except for the one noted difference, to those of Instruction 72.

If the signs of R and M are unlike, course A is entered at $t9$. If the signs of R and M are alike, simultaneous courses B and C are entered at $t9$ by setting $Us$ and $Vc$. $Us$ dictates a subtractive operation starting at $t9$ and $Vc$ provides for a 10's complement type of subtraction. Both courses B and C are alike from $t9$–$t16$. At $t16$, courses A and B terminate, with the proper answer in R. However, if common courses B and C were taken, the carry flip-flop $Vc$ is sampled at $t16$, and if $Vc$ is off, the signal *End* does not occur, but instead, course C is found to be the one necessary, so that this instruction continues in $t33$–$t40$. Courses A, B and C are identical to those of Instruction 72 and only differ in the criteria by which they are selected.

The signal *End* occurs unconditionally at $t40$.

Time: 16 clock periods if the signs of R and M are unlike, or if the signs are alike and $|R|>|M|$. 24 clock periods if the signs of R and M are alike and $|R|<|M|$.

EXAMPLES

The following table illustrates the courses taken by this instruction for all four possible combinations of the contents of R and M with like signs.

| | I (Course B) | II (Course B) | III (Course C) | IV (Course C) |
|---|---|---|---|---|
| R | +200000 | −200000 | +100000 | −100000 |
| J | +100000 | −100000 | +200000 | −200000 |

At $t9$, $Us$ and $Vc$ are set. The 9's complement of J is added to R. The original sign of R is affixed to the new sum in R.

| | | | | |
|---|---|---|---|---|
| R | +200000 | −200000 | +100000 | −100000 |
| J (comp.) | 899999 | 899999 | 799999 | 799999 |
| $Vc$ | 1 | 1 | 1 | 1 |
| R′ | +100000+$Vc$ | −100000+$Vc$ | +900000+$\overline{Vc}$ | −900000+$\overline{Vc}$ |
| | Since $Vc$=1, *End* occurs, and $Vc$ dropped. | | Since $Vc$=0, continue to $t33$. Set $Vc$=1, and add 0's to the 9's complement of R. The sign of R is changed on the final answer in R. | |
| | | R′ (comp.) | +099999 | −099999 |
| | | $Zva$ | 000000 | 000000 |
| | | $Vc$ | 1 | 1 |
| | | | −100000 | +100000 |
| | | | *End* occurs | |

*Instruction 82: Add M to FULL (AMF)*

This instruction (FIG. 225) effects the algebraic adding of a double-precision word in Memory to the double-precision word in FULL. The sum appears in FULL at the conclusion of the instruction. If the sum exceeds 12 digits, the overflow is lost, but the overflow flip-flop is turned on.

The operand address is: 0000–3998 Memory.

The description of Instruction 72, coupled with the description to follow, is a complete description of Instruction 82.

The Initial Routine is unaltered.

One of three courses is taken by this instruction:

A. If the signs of the word initially in R and the word in $M_A+1$ are alike, |FULL| is added to $|M_A, M_A+1|$ and the sign of the word initially in R is affixed to the result.

B. If the signs of the word initially in R and the word in $M_A+1$ are unlike and $|FULL|>|M_A, M_A+1|$, $|M_A, M_A+1|$ is deducted from |FULL| and the sign of the word initially in R is affixed to the result.

C. If the signs of the word initially in R and the word in $M_A+1$ are unlike and $|M_A, M_A+1|>|FULL|$, |FULL| is deducted from $|M_A, M_A+1|$ and a sign opposite to that of the word initially in R is affixed to the result.

The course taken during this instruction is determined by several criteria. During the Initial Routine, the signs of the contents of R and $M_A+1$ are examined. If they are alike, course A is entered at $t9$. If they are unlike, simultaneous courses B and C are entered at $t9$ by setting $Us$ and $Vc$. $Us$ dictates a subtractive operation starting at $t9$, and $Vc$ provides for a 10's complement type of subtraction. Both courses B and C are alike from $t9$–$t24$. At $t24$, courses A and B terminate, with the proper answer in FULL. However, if common courses B and C were taken, the carry flip-flop $Vc$ is sampled at $t24$, and if $Vc$ is off, the signal *End* does not occur, but instead, course C is found to be the one necessary, so that this instruction continues from $t25$–$t40$.

Consider, now, the operation in detail. At $t8$, the contents of the sign bit position in R are sampled and the sign bit in L is set to the same value; as follows:

$$*Ls=(82)\ Ta8\ Rs \text{ and } *\overline{Ls}=(82)\ Ta8\ \overline{Rs}$$

Thus, both words in FULL are given the same sign, this sign being that of the word initially in R. At $t8$, if the signs of R and $M_A+1$ are unlike, $*Us$ and $*Vc$ occur. Thus, the algebraic addition is controlled by only the sign of the word initially in R and the sign of $M_A+1$.

The signal $Cau$ issues at $t3$ to increase the original operand address, $M_A$, by 1, so that the LSH of the double-precision word in Memory may be transferred to J at $t9$. The signal SJ occurs from $t9$–$t14$ and shifts the numeric contents of J to the $Va$ input AND-gates of the Arithmetic Unit. From $t9$–$t16$, the signals SL76 and SL occur and shift-down the entire contents of L. As the contents of L shift-down, they are applied to the MSD position of R by the signal SLR7, which issues from $t9$–$t15$. Also issuing from $t9$–$t15$, are the signals SR76 and SR, which enable the transfer of the contents of L to R from $t9$–$t16$, and which apply the contents of R to the $Vb$ input AND-gates of the Arithmetic Unit. Therefore, from $t9$–$t14$, the six corresponding numeric digits of R and J are applied sequentially to the Arithmetic Unit. Since a one clock period delay is present in the Arithmetic Unit, the sum digital outputs appear at the V output AND-gates one clock period later.

Therefore, from $t10$–$t15$, the six digits of the sum of the two numbers applied to the $Va$ and $Vb$ input AND-gates appear from the V output AND-gates. From $t9$–$t14$, the signal $Vct$ issues to enable the numeric inputs to the carry flip-flop $Vc$. During $t10$–$t15$, the $Vc$ flip-flop is set for each pair of digits combined whose total, with the carry value represented by $Vc$, is 10 or greater.

If $\overline{Us}$, the true contents of R and J are applied to the Arithmetic Unit from $t9$–$t14$, so that the output of the Arithmetic Unit reflects the addition of these numeric contents. However, if $Us$=1, the 9's complement of J is applied to the $Va$ input AND-gates. This complementary input, combined with the initial setting of $Vc$, effects the adding of the 10's complement of the contents of J to the contents of R. The signal SVL7 occurs from $t10$–$t15$, and transfers the contents of the V output AND-gates to the MSD position of L. Thus, at $t11$, the LSD of the Arithmetic Unit output appears in L7. By $t16$, the last numeric digit of the Arithmetic Unit output is in L7. (This shifting and adding process is shown graphically in the following table.)

| | L7 | L6 | L5 | L4 | L3 | L2 | L1 | R7 | R6 | R5 | R4 | R3 | R2 | R1 | J1 | V (addition) |
|---|---|---|---|---|---|---|---|---|---|---|---|---|---|---|---|---|
| t8 | SG MG | G-6 | G-5 | G-4 | G-3 | G-2 | G-1 | SF MF | F-6 | F-5 | F-4 | F-3 | F-2 | F-1 | O-1 | |
| t9 | SF MG | G-6 | G-5 | G-4 | G-3 | G-2 | G-1 | SF MF | F-6 | F-5 | F-4 | F-3 | F-2 | F-1 | O-1 | |
| t10 | SF MG | SF MG | G-6 | G-5 | G-4 | G-3 | G-2 | G-1 | SF MF | F-6 | F-5 | F-4 | F-3 | F-2 | O-2 | V-1=(O-1)+(F-1) |
| t11 | V-1 | SF MG | SF MG | G-6 | G-5 | G-4 | G-3 | G-2 | G-1 | SF MF | F-6 | F-5 | F-4 | F-3 | O-3 | V-2=(O-2)+(F-2) |
| t12 | V-2 | V-1 | SF MG | SF MG | G-6 | G-5 | G-4 | G-3 | G-2 | G-1 | SF MF | F-6 | F-5 | F-4 | O-4 | V-3=(O-3)+(F-3) |
| t13 | V-3 | V-2 | V-1 | SF MG | SF MG | G-6 | G-5 | G-4 | G-3 | G-2 | G-1 | SF MF | F-6 | F-5 | O-5 | V-4=(O-4)+(F-4) |
| t14 | V-4 | V-3 | V-2 | V-1 | SF MG | SF MG | G-6 | G-5 | G-4 | G-3 | G-2 | G-1 | SF MF | F-6 | O-6 | V-5=(O-5)+(F-5) |
| t15 | V-5 | V-4 | V-3 | V-2 | V-1 | SF MG | SF MG | G-6 | G-5 | G-4 | G-3 | G-2 | G-1 | SF MF | O-M | V-6=(O-6)+(F-6) |
| t16 | V-6 | V-5 | V-4 | V-3 | V-2 | V-1 | SF MG | SF MG | G-6 | G-5 | G-4 | G-3 | G-2 | G-1 | O-M | |
| t17 | SF MVA | V-6 | V-5 | V-4 | V-3 | V-2 | V-1 | SF MG | G-6 | G-5 | G-4 | G-3 | G-2 | G-1 | Q-1 | |
| t18 | SF MVA | SF MVA | V-6 | V-5 | V-4 | V-3 | V-2 | V-1 | SF MG | G-6 | G-5 | G-4 | G-3 | G-2 | Q-2 | V-7=(Q-1)+(G-1) |
| t19 | V-7 | SF MVA | SF MVA | V-6 | V-5 | V-4 | V-3 | V-2 | V-1 | SF MG | G-6 | G-5 | G-4 | G-3 | Q-3 | V-8=(Q-2)+(G-2) |
| t20 | V-8 | V-7 | SF MVA | SF MVA | V-6 | V-5 | V-4 | V-3 | V-2 | V-1 | SF MG | G-6 | G-5 | G-4 | Q-4 | V-9=(Q-3)+(G-3) |
| t21 | V-9 | V-8 | V-7 | SF MVA | SF MVA | V-6 | V-5 | V-4 | V-3 | V-2 | V-1 | SF MG | G-6 | G-5 | Q-5 | V-10=(Q-4)+(G-4) |
| t22 | V-10 | V-9 | V-8 | V-7 | SF MVA | SF MVA | V-6 | V-5 | V-4 | V-3 | V-2 | V-1 | SF MG | G-6 | Q-6 | V-11=(Q-5)+(G-5) |
| t23 | V-11 | V-10 | V-9 | V-8 | V-7 | SF MVA | SF MVA | V-6 | V-5 | V-4 | V-3 | V-2 | V-1 | SF MG | Q-M | V-12=(Q-6)+(G-6) |
| t24 | V-12 | V-11 | V-10 | V-9 | V-8 | V-7 | SF MVA | SF MVA | V-6 | V-5 | V-4 | V-3 | V-2 | V-1 | Q-M | |
| t1 | SF MVB | V-12 | V-11 | V-10 | V-9 | V-8 | V-7 | SF MVA | V-6 | V-5 | V-4 | V-3 | V-2 | V-1 | | |
| t25 | SF MVB | V-12 | V-11 | V-10 | V-9 | V-8 | V-7 | SF MVA | V-6 | V-5 | V-4 | V-3 | V-2 | V-1 | | |
| t26 | SF MVB | SF MVB | V-12 | V-11 | V-10 | V-9 | V-8 | V-7 | SF MVA | V-6 | V-5 | V-4 | V-3 | V-2 | | |
| t27 | V'-1 | SF MVB | SF MVB | V-12 | V-11 | V-10 | V-9 | V-8 | V-7 | SF MVA | V-6 | V-5 | V-4 | V-3 | | |
| t28 | V'-2 | V'-1 | SF MVB | SF MVB | V-12 | V-11 | V-10 | V-9 | V-8 | V-7 | SF MVA | V-6 | V-5 | V-4 | | |
| t29 | V'-3 | V'-2 | V'-1 | SF MVB | SF MVB | V-12 | V-11 | V-10 | V-9 | V-8 | V-7 | SF MVA | V-6 | V-5 | | |
| t30 | V'-4 | V'-3 | V'-2 | V'-1 | SF MVB | SF MVB | V-12 | V-11 | V-10 | V-9 | V-8 | V-7 | SF MVA | V-6 | | |
| t31 | V'-5 | V'-4 | V'-3 | V'-2 | V'-1 | SF MVB | SF MVB | V-12 | V-11 | V-10 | V-9 | V-8 | V-7 | SF MVA | | |
| t32 | V'-6 | V'-5 | V'-4 | V'-3 | V'-2 | V'-1 | SF MVB | SF MVB | V-12 | V-11 | V-10 | V-9 | V-8 | V-7 | | |
| t33 | SF' MVC | V'-6 | V'-5 | V'-4 | V'-3 | V'-2 | V'-1 | SF MVB | V-12 | V-11 | V-10 | V-9 | V-8 | V-7 | | |
| t34 | SF' MVC | SF' MVC | V'-6 | V'-5 | V'-4 | V'-3 | V'-2 | V'-1 | SF MVB | V-12 | V-11 | V-10 | V-9 | V-8 | | |
| t35 | V'-7 | SF' MVC | SF' MVC | V'-6 | V'-5 | V'-4 | V'-3 | V'-2 | V'-1 | SF MVB | V-12 | V-11 | V-10 | V-9 | | |
| t36 | V'-8 | V'-7 | SF' MVC | SF' MVC | V'-6 | V'-5 | V'-4 | V'-3 | V'-2 | V'-1 | SF MVB | V-12 | V-11 | V-10 | | |
| t37 | V'-9 | V'-8 | V'-7 | SF' MVC | SF' MVC | V'-6 | V'-5 | V'-4 | V'-3 | V'-2 | V'-1 | SF MVB | V-12 | V-11 | | |
| t38 | V'-10 | V'-9 | V'-8 | V'-7 | SF' MVC | SF' MVC | V'-6 | V'-5 | V'-4 | V'-3 | V'-2 | V'-1 | SF MVB | V-12 | | |
| t39 | V'-11 | V'-10 | V'-9 | V'-8 | V'-7 | SF' MVC | SF' MVC | V'-6 | V'-5 | V'-4 | V'-3 | V'-2 | V'-1 | SF MVB | | |
| t40 | V'-12 | V'-11 | V'-10 | V'-9 | V'-8 | V'-7 | SF' MVC | SF' MVC | V'-6 | V'-5 | V'-4 | V'-3 | V'-2 | V'-1 | | |
| t1 | SF' MVD | V'-12 | V'-11 | V'-10 | V'-9 | V'-8 | V'-7 | SF' MVC | V'-6 | V'-5 | V'-4 | V'-3 | V'-2 | V'-1 | | |

wherein

SF represents the original sign of the R contents,
SG represents the original sign of the L contents,
SF' represents the inverted sign,
MF represents the mod-bits of the R contents,
MG represents the mod-bits of the L contents,
MVA represents the mod-bits of the original LSD of the sum,
MVB represents the mod-bits of the original MSD of the sum,
MVC represents the mod-bits of the complemented R contents,
MVD represents the mod-bits of the complemented L contents.

At *t*16, the signals SV*mg*L and SLL*s* issue. SV*mg*L transfers the contents of the V-Mod-generator to L*m*2, 1. SLL*s* transfers the contents of L13 and L14, which contain respectively the sign and designator bits of the double-precision word in FULL, to L*s* and L*d* respectively. The signal *Ty issues at *t*16, so that *t*17 is entered in the next clock period.

The numeric digits in both halves of FULL are treated as a single twelve digit word in this instruction. In a similar manner, the numeric contents of $M_A$ and $M_A+1$ are treated as a single twelve digit word. Therefore, if a carry is present at *t*15, this carry must be transmitted to *t*17 when the addition of the MSH words takes place. This transmission of the carry from times *t*15–*t*17 is accomplished by the following signals:

$$*Vc=(87)\ Tb7\ Vc+(87)\ Tb8\ Vc$$

The signal *Cad* issues at *t*9, to decrease the operand address by 1 to $M_A$, so that the MSH of the double-precision word in Memory may be transferred to J at *t*17. By *t*17, the MSH of FULL has been transferred into R. Therefore, from *t*17–*t*22, the numeric contents of R and J are combined in the Arithmetic Unit by an operation similar to that executed during $t9$–$t14$. The continuing state of U$s$ determines whether another additive or subtractive operation is to be performed. By $t24$, the last numeric digit of the Arithmetic Unit output appears in L7.

The Arithmetic Unit has completed the sum of the numeric portions at $t15$. Therefore, at $t15$, the contents of V$c$ are sampled. If V$c$ is on at this time, and the operation was one of addition, the overflow flip-flop O$v$ is set; as follows:

$$*Ov=(82)\ \overline{Us}\ Vc\ Tb7\ Ty\ \overline{Tz}$$

Thus, during an addition, the carry digit is lost, but the overflow flip-flop is turned on if a carry occurred during the MSD summation.

At $t24$, the signals SV$mg$L and SLL$s$ again issue to transfer the contents of the V-Mod-generator and the sign and designator bits of the double-precision words in FULL to L7. Thus, at $t25$, or at $t1$, depending on the course, the proper sign, designator, and mod-bits are in L7 and R7, and the twelve digit sum is in L6–L1 and R6–R1.

*Z$va$ issues at $t23$, so that Z$va$ is set to 1 at $t24$. At $t24$, E$nd$ occurs, if $\overline{Us}$ or if U$s$ V$c$; i.e., if an additive operation had occurred, or if a subtractive operation had occurred and $$|FULL|>|M_A, M_A+1|$$

If $|M_A, M_A+1|>|FULL|$, $Vc=0$ at $t24$ for the subtractive operation and E$nd$ does not occur. Additionally, at $t24$, the U$s$ flip-flop is reset unconditionally. If E$nd$ does not occur at $t24$, Z$va$ continues in its set condition and *Tz occurs. The issuance of *Tz causes the timing sequence to proceed to $t25$ in course C.

At $t25$, V$c$ is set to 1, to provide for a 10's complement of the contents of R. From $t25$–$t30$, V$ct$ issues to enable the numeric inputs to the carry flip-flop V$c$. SL76, SL, SLR7, SR76 and SR issue from $t25$–$t31$ to shift-down the contents of FULL. SL76 and SL also issue at $t32$ to allow for the insertion of the sign, designator, and mod-bits in L7. SVL7 issues from $t26$–$t31$ and transfers the output of the Arithmetic Unit to the L-register. The signal Z$va$ causes the entry of 0's into the V$a$ input AND-gates. The signal Tz causes the application of the 9's complement of the contents of R to the V$b$ input AND-gates. Thus, a 10's complement of the contents of R is effected from $t25$–$t32$ and the result is stored in L. At $t24$, SV$mg$L and SLL$s$ issue to transfer the contents of the V-Mod-generator and the designator bit to L7. SLL$s$ does not affect the contents of L73 during a $\overline{Ty}$ Tz-cycle. Instead, at $t32$, the sign of L is inverted from its value at $t25$; as follows:

$$*Ls=(82)\ Tb8\ \overline{Ty}\ Tz\ \overline{L13}$$

and $$*\overline{Ls}=(82)\ Tb8\ \overline{Ty}\ Tz\ L13$$

In a similar manner, the complement of the contents of the MSH of FULL is effected from $t33$–$t40$. The only basic difference between the operation from $t33$–$t40$ as contrasted to that occurring from $t25$–$t32$, is that T$y$ is also on, so that SLL$s$ is now effective to transfer the sign bit of L1 to L7 at $t40$.

The mathematical analysis of this instruction is substantially identical to that of Instruction 72 and will not be repeated here. The only difference is the substitution of a 12 digit for a 6 digit number.

A mod-comparison is made during each of the four T$b$-cycles and *A$ac$ issues if the mod-check fails, except for the conditions noted in the Hash-Add description following. Again, as in Instruction 72, the signal Z$va$ inhibits all inputs to J$mg$2, 1 so that J$mg$2, 1 reflect 0, 0 at each T$b$7 in the Tz-cycles.

It will be noted that T$i$ is suppressed at $t12$, since it is necessary to have the address of the MSH word of $M_A$ in the A-register at $t16$.

The signal E$nd$ occurs unconditionally at $t40$. Time: 24 clock periods if the signs of the word initially in R and the word in $M_A+1$ are alike, or if these signs are unlike and $|FULL|>|M_A, M_A+1|$. 40 clock periods if the signs of the word initially in R and the word in $M_A+1$ are unlike and $|FULL|<|M_A, M_A+1|$.

HASH-ADD

The Hash-Add instruction is a variation of Instruction 82, and permits a non-numeric or alphanumeric double-precision word in $M_A$, $M_A+1$ to be "added" to a numeric word in FULL. To perform such an addition, both the D1 and D3 flip-flops must be on. The effect of executing this instruction is to place a numeric word in FULL.

It is essential that FULL be numeric at the start of this instruction. Normally, in an add or subtract instruction, the alarm *A$ac$ issues if there is a non-numeric digit from either the V$a$ or V$b$ input AND-gates to the Arithmetic Unit at T$b$ $\overline{Tb7}$, or if there is a non-numeric sum digit from the Arithmetic Unit at any time. However, if D1 and D3 both equal 1, *A$ac$ is inhibited for Instruction 82 if a non-numeric digit issues from the V$a$ input AND-gates. Since the contents of J pass through these V$a$ input AND-gates, it is only the double-precision word in Memory that may be non-numeric during this instruction. The logic for the output digits supplied by the Arithmetic Unit provides that only numeric digits can issue therefrom. Therefore, the result of this instruction is a numeric quantity in FULL.

By analyzing the specific logic equations, it may be noted that the digit ($) adds as a 5, the digit (,) as a 6, the digit (&) as a 7, the digit (.) as a 10 and the digit (*) as an 11.

Inasmuch as the J-Mod-generator does not accumulate the modulo-3 of an alphanumeric word, but instead is immediately set to 11 when an alphanumeric word enters J, no mod-comparison can be made during Hash-Add. (See Instruction 21.) Therefore, if D1 and D3 are both set to 1, *A$ac$ is inhibited for Instruction 82, even though the mod-check fails.

Therefore, by setting D1 and D3 for Instruction 82, the instruction may be executed as the Memory supplies non-numeric or alphanumeric words, without triggering the alarm A$ac$ due to a non-numeric input to the Arithmetic Unit or due to the failure of the mod-check.

Hash-Add is employed for the purpose of verifying blocks of information by taking a block sum, even though all of the data in the block is not numeric.

Normally, D1 and D3 are set to 1 prior to this instruction by programming techniques. For example, a compare instruction, such as Instruction 71, may be performed where it is known that the result will set D1. Similarly, an interrogation Instruction 54 may be employed wherein a flip-flop is interrogated that is known to be in a predetermined condition so that D3 will be set.

*Instruction 83: Subtract M From FULL (SMF)*

This instruction (FIG. 226) effects the algebraic subtracting of a double-precision word in Memory from the double-precision word in FULL. The difference appears in FULL at the conclusion of the instruction. If the difference exceeds 12 digits, the overflow is lost, but the overflow flip-flop is turned on.

The operand address is: 0000–3998 Memory.

The descriptions of Instructions 72, 73 and 82, coupled with the description to follow, is a complete description of Instruction 83.

The Initial Routine is unaltered.

One of three courses is taken by this instruction:

A. If the signs of the word initially in R and the word in $M_A+1$ are unlike, |FULL| is added to $|M_A, M_A+1|$ and the sign of the word initially in R is affixed to the result.

B. If the signs of the word initially in R and the word in $M_A+1$ are alike, and $|FULL|>|M_A, M_A+1|$, $|M_A, M_A+1|$ is deducted from |FULL| and the sign of the word initially in R is affixed to the result.

C. If the signs of the word initially in R and the word in $M_A+1$ are alike and $|M_A, M_A+1|>|FULL|$, |FULL| is deducted from $|M_A, M_A+1|$ and a sign opposite to that of the word initially in R is affixed to the result.

The course taken during this instruction is determined by several criteria. During the Initial Routine, the signs of the contents of R and $M_A+1$ are examined. If they are unlike, course A is entered at *t*9. If they are alike, simultaneous courses B and C are entered at *t*9 by setting U*s* and V*c*. U*s* dictates a subtractive operation starting at *t*9, and V*c* provides for a 10's complement type of subtraction. Both courses B and C are alike from *t*9–*t*24. At *t*24, courses A and B terminate, with the proper answer in FULL. However, if common courses B and C were taken, the carry flip-flop V*c* is sampled at *t*24, and if V*c* is off, the signal E*nd* does not occur, but instead, course C is found to be the one necessary, so that this instruction continues from *t*25–*t*40.

Thus, this instruction is similar to Instruction 82, except that U*s* is turned on if the signs of the word initially in R and the word in $M_A+1$ are alike. That is, for subtraction, an additive operation ($\overline{Us}$) is employed if the signs are unlike, and a subtractive operation (U*s*) is employed only if the signs are alike. Therefore, the operative details of this instruction will not be given, since they are identical, except for the one noted difference, to those of Instruction 82.

The examples of the courses taken by Instruction 73 are equally applicable to this instruction, except that 12 digit numbers are employed rather than 6 digit numbers.

The signal E*nd* occurs unconditionally at *t*40. Time: 24 clock periods if the signs of the word initially in R and the word in $M_A+1$ are unlike, or if these signs are alike and $|FULL|>|M_A, M_A+1|$. 40 clock periods if the signs of the word initially in R and the word in $M_A+1$ are alike and $|FULL|<|M_A, M_A+1|$.

*Instruction 87: Add M to R and Carry (ARC)*

This instruction (FIG. 229) effects the algebraic adding of a single word in Memory to the double-precision word in FULL. The sum appears in FULL at the conclusion of the instruction. If the sum exceeds 12 digits, the overflow is lost, but the overflow flip-flop is turned on.

The operand address is: 0000–3999 Memory.

The description of Instruction 82, coupled with the description to follow, is a complete description of Instruction 87.

The Initial Routine is unaltered.

This instruction is similar to Instruction 82, except that only a single word in M is added to FULL. Any carry from the most significant digit of R goes to L. As in Instruction 82, the sign of R determines the sign of FULL. However, since only a single word is to be added to the word in FULL, during *t*17–*t*23 0's are supplied to the Arithmetic Unit by the action of Z*va* if $Us=0$ (additive operation), and 9's are supplied to the Arithmetic Unit by the action of Z*va* if $Us=1$ (subtractive complementation). Thus, the MSH of FULL is affected only by any carry which may occur by the addition to its LSH. The selection between courses of action B and C in this instruction is determined by the relationship between |FULL| and |M|. Only if the MSH of FULL comprises all 0's can course C take place.

The signal E*nd* occurs unconditionally at *t*40. Time: 24 clock periods if the signs of the word initially in R and the word in M are alike, or if these signs are unlike and $|FULL|>|M|$. 40 clock periods if the signs of the word initially in R and the word in M are unlike and $|FULL|<|M|$.

*Instruction 88: Subtract M From R and Carry (SRC)*

This instruction (FIG. 230) effects the algebraic subtracting of a single word in Memory from the double-precision word in FULL. The difference appears in FULL at the conclusion of the instruction. If the difference exceeds 12 digits, the overflow is lost, but the overflow flip-flop is turned on.

The operand address is: 0000–3999 Memory.

The description of Instruction 83, coupled with the description to follow, is a complete description of Instruction 88.

The Initial Routine is unaltered.

This instruction is similar to Instruction 83, except that only a single word in M is subtracted from FULL. Any borrow from the most significant digit of R goes to L. As in Instruction 83, the sign of R determines the sign of FULL. However, since only a single word is to be added to the word in FULL, during *t*17–*t*23, 0's are supplied to the Arithmetic Unit by the action of Z*va* if $Us=0$ (additive operation), and 9's are supplied to the Arithmetic Unit by the action of Z*va* if $Us=1$ (subtractive complementation). Thus, the MSH of FULL is affected only by any borrow which may occur by the subtraction from its LSH. The selection between courses of action B and C in this instruction is determined by the relationship between |FULL| and |M|. Only if the MSH of FULL comprises all 0's can course C take place.

The signal E*nd* occurs unconditionally at *t*40. Time: 24 clock periods if the signs of the word initially in R and the word in M are unlike, or if these signs are alike and $|FULL|>|M|$. 40 clock periods if the signs of the word initially in R and the word in M are alike and $$|FULL|<|M|$$

*Instruction 27: Add M to B (AMB)*

This instruction (FIG. 192) effects the adding of the four least significant digits of a word in Memory to the word in B. The sum appears in B at the conclusion of the instruction. If the sum exceeds four digits, the overflow is lost, but the D2 flip-flop is turned on.

The operand address is: 0000–3999 Memory.

The description of Instruction 72, coupled with the description to follow, is a complete description of Instruction 27.

The initial routine is unaltered.

The four digits from Memory are transferred from the J-register through the V*a* input AND-gates to the Arithmetic Unit. The four digits from B are transferred through the V*b* input AND-gates to the Arithmetic Unit. Because of the one clock period delay in the Arithmetic Unit, five clock periods are necessary to perform the addition.

At *t*9, the operand is in the J-register. At this time the shift signals SJ, SVB and SB issue. SVB and SB issue unconditionally from *t*9–*t*13. SJ transfers the digits in J sequentially to the V*a* input AND-gates, and SVB transfers the B digits sequentially to the V*b* input AND-gates. The Arithmetic Unit output signals, which are available from the V-output AND-gates, are delivered one clock period after the entry of the corresponding digits at V*a* and V*b*. The signal V*ct* enables the numeric inputs to the carry flip-flop V*c*.

The signal SVB gates the signals provided by the V-output AND-gates to B4. Therefore, in this instruction, the former contents of the B-register are destroyed as the new number is transferred thereto. The least significant sum digit of J and B is in the V*s* flip-flops at *t*10, and in B4 at *t*11. At *t*13, the V-output AND-gates reflect the last sum digit to be transferred to B4. At this time, V*c* is sampled, and if an overflow has occurred, *D2 issues and D2 is set at *t*14; as follows:

$$*D2=(27)\ Tb\ Tp\ \overline{Tq}\ Ts\ Vc$$

D2 may be later interrogated by an Instruction 62. At $t14$, the new number is completely in the B-register, and the shifting thereof terminates.

The table below illustrates the operation and the transfer of the resulting sum to the B-register.

| | J4 | J3 | J2 | J1 | V | B4 | B3 | B2 | B1 |
|---|---|---|---|---|---|---|---|---|---|
| $t9$ | O-4 | O-3 | O-2 | O-1 | ---------- | S-4 | S-3 | S-2 | S-1 |
| $t10$ | O-5 | O-4 | O-3 | O-2 | O-1+S-1 | ---- | S-4 | S-3 | S-2 |
| $t11$ | O-6 | O-5 | O-4 | O-3 | O-2+S-2 | O-1+S-1 | ---- | S-4 | S-3 |
| $t12$ | O-7 | O-6 | O-5 | O-4 | O-3+S-3 | O-2+S-2 | O-1+S-1 | ---- | S-4 |
| $t13$ | O-1 | O-7 | O-6 | O-5 | O-4+S-4 | O-3+S-3 | O-2+S-2 | O-1+S-1 | ---- |
| $t14$ | O-2 | O-1 | O-7 | O-6 | ---------- | O-4+S-4 | O-3+S-3 | O-2+S-2 | O-1+S-1 |
| $t15$ | O-3 | O-2 | O-1 | O-7 | ---------- | O-4+S-4 | O-3+S-3 | O-2+S-2 | O-1+S-1 |
| $t16$ | 0 | 0 | 0 | O-1 | ---------- | O-4+S-4 | O-3+S-3 | O-2+S-2 | O-1+S-1 |

Although no Arithmetic Unit mod-check is made, *A*ac* issues if the V*a* or V*b* inputs are non-numeric during $t9$–$t12$, or if the Arithmetic Unit output is non-numeric at any time.

The signal E*nd* occurs unconditionally at $t16$. Time: 16 clock periods.

*Instruction 28: Transfer M to B (TMB)*

This instruction (FIG. 193) effects the transfer of the four least significant digits of a word in Memory to the B-register.

The operand address is: 0000–3999 Memory.

The description of Instruction 27, coupled with the description to follow, is a complete description of Instruction 28.

The Initial Routine is unaltered.

This instruction is similar to Instruction 27, except that 0's, instead of the contents of B, are added to the four digits from Memory. No overflow can occur.

The four digits from Memory are transferred from the J-register through the Arithmetic Unit to the B-register. Because of the one clock period delay in the Arithmetic Unit, five clock periods are necessary to transfer these four digits.

At $t9$, the operand is in the J-register. At this time the shift signals SJ, SVB and SB issue. SVB and SB issue unconditionally from $t9$ through $t13$. SJ transfers the digits in J sequentially to the V*a* input AND-gates of the Arithmetic Unit. Simultaneously 0's are transferred to the V*b* input AND-gates. Therefore, the Arithmetic Unit adds 0's to the four digits of J transferred thereto. The Arithmetic Unit output signals, which are available from the V output AND-gates, are delivered one clock period after their entry at V*a*.

The signal SVB gates the signals provided by the V output AND-gates to B4. The signal SB shifts-down the contents of the B-register. Therefore, in this instruction, the former contents of the B-register are destroyed as the new number is transferred thereto. The least significant digit of the operand enters the V*s* flip-flops at $t10$ and B4 at $t11$. At $t14$, the new number is in the B-register, and the shifting thereof terminates. The table below illustrates the transfer of the data to the B-register.

| | J4 | J3 | J2 | J1 | V | B4 | B3 | B2 | B1 |
|---|---|---|---|---|---|---|---|---|---|
| $t9$ | O-4 | O-3 | O-2 | O-1 | ---- | S-4 | S-3 | S-2 | S-1 |
| $t10$ | O-5 | O-4 | O-3 | O-2 | O-1 | ---- | S-4 | S-3 | S-2 |
| $t11$ | O-6 | O-5 | O-4 | O-3 | O-2 | O-1 | ---- | S-4 | S-3 |
| $t12$ | O-7 | O-6 | O-5 | O-4 | O-3 | O-2 | O-1 | ---- | S-4 |
| $t13$ | O-1 | O-7 | O-6 | O-5 | O-4 | O-3 | O-2 | O-1 | ---- |
| $t14$ | O-2 | O-1 | O-7 | O-6 | O-5 | O-4 | O-3 | O-2 | O-1 |
| $t15$ | O-3 | O-2 | O-1 | O-7 | O-6 | O-4 | O-3 | O-2 | O-1 |
| $t16$ | 0 | 0 | 0 | O-1 | O-7 | O-4 | O-3 | O-2 | O-1 |

Although no adder mod-check is made, *A*ac* issues if the V*a* or V*b* inputs are non-numeric during $t9$–$t12$, or if an Arithmetic Unit output is non-numeric at any time.

The signal E*nd* occurs unconditionally at $t16$. Time: 16 clock periods.

*Instruction 29: Extract M Into R by L (EXT)*

This instruction (FIG. 194) effects the replacement of digits of a word in R with the corresponding digits of a word in Memory, under control of a word in L.

The operand address is: 0000–3999 Memory.

The description of Instruction 21, coupled with the description to follow, is a complete description of Instruction 29.

The Initial Routine is unaltered.

From $t9$–$t15$, the contents of J shift-down, the contents of L completely ring shift-down, and certain digits of R completely ring shift-down. The signals SL76, SL and SLL7, effect a complete ring shift-down of the L-register contents as the signals SJ and XZJ shift-down the entire contents of the J-register. The signals SR76 and SR shift-down the entire contents of R, and the signal SRR*m*, which is conditional, effects a complete ring shift-down of specified digits of R, as directed by corresponding digits of L. For each digit of R which is not ring shifted, a corresponding digit of J is inserted in R. If the bit in L14 is equal to 0, the digit in R1 is transferred to R7, but if the L14 bit is equal to 1, the digit in J1 is transferred to R7. The logic directing this extract operation is:

$$SRRm=(29)\ Tb\ \overline{L14} \text{ and } SJRm=(29)\ Tb\ L14$$

The condition digit in R is transferred in the same manner as the six numeric digits during $t9$–$t16$.

The following table illustrates the operation of this instruction. In this table, the terms $C_J$, $C_R$ and $C_L$ represent respectively the condition digits in J, R and L.

| Initial | Final |
|---|---|
| $J=C_J121212$<br>$R=C_R989898$<br>$L=C_L050505$ | $J=000000C_J$<br>$R=C_J929292$<br>$L=C_L050505$ |

where the designator bit of $C_L$ is 1.

Since the numeric contents of the word in R are normally changed by this operation, new mod-bits for the numeric portion must be generated. Therefore, M3*g* set at $t16$, the contents of the C-register are changed to 25 in the next clock period, and for the next 8 clock periods, the Central Processor executes the "Mod-3 generation on R" instruction. (See Instruction 25.)

The final condition digit of the word in R is affected as follows:

(1) If the designator bit in L is equal to 0, the sign and designator bits and the alphabetic nature of R remain unchanged.

(2) If the designator bit of the word in L is equal to 1;

*a.* the sign and designator bits of R become those of the word in J, and

*b.* if the word in J is alphanumeric, the mod-bits in R indicate an alphanumeric; whereas if the word in J is numeric, the mod-bits in R indicate a numeric.

The signal E*nd* occurs unconditionally at $t16$. The signals XZJ and *T*i* are inhibited by M3*g*, so that the next T-cycle is a T*b*-cycle. Time: 24 clock periods.

*Instruction 42: Multiply M by R (MPY)*

This instruction (FIG. 198) effects the algebraic multiplication of a word in Memory by the word in R. The product appears in FULL at the termination of the instruction, with the MSH word in R and the LSH word in L.

The operand address is: 0000–3999 Memory.

The descriptions of Instructions 21, 72 and 73, coupled with the description to follow, is a complete description of Instruction 42.

The Initial Routine is unaltered.

From $t1$–$t16$, the instruction and the multiplicand are mod-checked, and at $t16$ the multiplicand from Memory is in J. During $t9$–$t15$, the signals SR76, SR, SRL7, SL76, SL and SZR7 issue to cause all 7 digits of the multiplier in R to transfer to L, and to clear the contents of R. The original contents of L are destroyed. The multiplier remains in L for the remainder of this instruction, gradually shifting to the right and being destroyed as it is replaced by the LSH word of the product. At $t16$, *Ty issues, and Ty remains on for the remainder of this instruction.

During the remainder of this instruction, the multiplication is accomplished by operating in but two different subsequences. One of these subsequences is identified as the Tz subsequence. The Tz subsequence is entered when the T-counter is set to 111, Tz is on, and T*d* is off, this state of the timing circuit being identified as $t39$. The other of the two subsequences is identified as the T*d* subsequence. The T*d* subsequence is entered when the T-counter is set to 001, T*d* is on, and Tz off, the state of the timing circuit being identified as $t41$. The Tz subsequence terminates at $t40$, being only 2 clock periods in duration. The T*d* subsequence terminates at $t48$, being 8 clock periods in duration. At the end of each of the Tz and T*d* subsequences, namely at $t40$ and $t48$, the contents of L1 are tested to determine whether the existing subsequence should be repeated, or whether the other of these two subsequences should be entered.

Generally, it is the function of the Tz subsequence to shift-down by one digit position the accumulated product in L and R, following each multiplication by a digit of the multiplier, in order that the next multiplier digit may add to the accumulated product in the next higher order group of digits. The Tz subsequence is also employed if the next multiplier digit is 0, when only a digit shift of the accumulated product is necessary.

Generally, it is the function of the T*d* subsequence to multiply the multiplicand by the digit of the multiplier then in L1, and to add the resulting partial product to the accumulated product portion in R. After each multiplication by a digit of the multiplier is completed, the LSD in R is transferred to L6 and the remaining five digits in R are shifted-down one digit position. Therefore, the accumulated product is stored in R and a portion of L until the product is complete, whereupon the product occupies the entire contents of FULL.

At $t16$, the first test of the contents of L1 is made. At $t16$, the digit in L1 is the sole factor determining whether a Tz or T*d* subsequence will be next entered. If $L1=0$, indicating that the multiplicand should be multiplied by 0, the Tz subsequence is entered. If $L1\neq 0$, the T*d* subsequence is entered. If $L14=0$, the T*d* subsequence will be additive. If $L14=1$, *U*s* issues, and the T*d* subsequence will be subtractive.

The number of multiplier digits which have multiplied the multiplicand determines when the instruction is completed. After each multiplier partial product has been added to the accumulated product, the W-counter is counted up by 1 in the next occurring Tz subsequence. The instruction terminates when $W=6$, although the termination test is made immediately following multiplication by the last digit of the multiplier, when W is still equal to 5.

Tz SUBSEQUENCE

At $t16$, at $t40$ of a Tz subsequence, and at $t48$ of a T*d* subsequence, L1 is sampled and, generally, if $L1=0$, Z*m* and *Tz issue. Z*m* forces the T-counter to 111 and sets T*b* and T*b*7. Therefore, the next clock period is $t39$. At $t39$, the signal C*wu* issues to count up the W-counter. The signals SR, SR76, SRL7 and SL issue to shift-down the accumulated product one digit position, and, therefore, transfer the LSD in R to L6. If $\overline{Us}$, SZR7 also issues at $t39$ to transfer a 0 to the MSD position of R. If $Us=1$, indicating a complementing process has just been completed, S9R7 issues to transfer a 9 to the MSD position of R. If $\overline{Us}$ and $W=5$, *M3*g* issues at $t39$ to terminate the instruction in the next clock period. Since $W=5$, it is being changed to 6 in this next clock period, indicating the completion of multiplication by all 6 digits of the multiplier. However, if $Us=1$ at $t39$, the preceding subtractive process is not complete, so that even though $W=5$ at $t39$, a single T*d* subsequence must follow this Tz subsequence before the instruction can terminate. If, at $t40$, $Us=1$ the previous subtractive process still remains to be complemented by the addition of (10×multiplicand) to the accumulated product. Therefore, at $t40$, the LSD of L is increased by 1 by the signal C*lu*, indicating that one additional multiplicand must be added to the accumulated product in the next T*d* subsequence. The reason for this procedure will be described later. If $L1=0$, $Us=0$, and the instruction is not terminating, *Z*m*, at $t40$, issues to provide another Tz subsequence in order to shift the accumulated product one digit to the right, which gives the effect of multiplying by a 0 multiplier. If $L1=9$ and $Us=1$, provided $W\neq 6$, *Z*m* also issues, since the effect of C*lu* is to increase the contents of L1 to 10, requiring an immediate shift of the accumulated product, followed by counting the next multiplier digit up 1. If Z*m* does not issue at $t40$ and the instruction is not terminating, *T*d* issues, and the next subsequence is a T*d* subsequence. *U*s* also issues at $t40$ if $L14=1$ and $W\neq 6$. *$\overline{Tz}$ occurs if Z*m* does not issue.

If *M3*g* had issued at $t39$, indicating the instruction was to terminate, E*nd* occurs at $t40$ and Instruction 26 is initiated for 8 additional clock periods to generate new mod-bits for L and R. (See Instruction 26 for details.) At the time E*nd* issues, the designator bits and proper signs for L and R are generated. If the signs of the multiplier and multiplicand, which are stored respectively in L7 and J7, are alike, the new signs inserted in L7 and R7 are positive. If the signs of the multiplier and multiplicand are unlike, the new signs are negative. This generation of the new signs is given by:

$$*Rs=(42)\ End\ (Js\ \overline{Ls}+\overline{Js}\ Ls)$$
$$*\overline{Rs}=(42)\ End\ (\overline{Js}\ \overline{Ls}+Js\ Ls)$$
$$*Ls=(42)\ End\ Js\ \overline{Ls}$$
$$*\overline{Ls}=(42)\ End\ Js\ Ls$$

The designator bits of L and R are set to zero when E*nd* occurs; i.e., $$*\overline{Ld}=(42)\ End \text{ and } *\overline{Rd}=(42)\ End$$

Td SUBSEQUENCE

At $t16$, at $t40$ of a Tz subsequence, and at $t48$ of a T*d* subsequence, L1 is sampled and, generally, if $L1\neq 0$, *T*d* issues. Therefore, the next clock period is $t41$.

A time saving feature is employed in this instruction. The number of additions required for multiplication is dependent upon the magnitudes of the multiplier digits. The maximum number of additions for any digit is normally equal to the largest possible multiplier digit. However, the maximum number of additions for any digit and the average number of additions per digit is reduced one-half by counting the multiplier digit down and adding the multiplicand when a multiplier digit is 4 or less, and by counting the multiplier up and subtracting the multiplicand when a multiplier digit is 5 or greater. The decision of whether addition or subtraction is to be performed during the T*d*-cycle occurs at *t*16 for the LSD of the multiplier and at *t*40 for each of the remaining multiplier digits. Generally, if $L14=0$, a series of additive processes take place during a succession of T*d* subsequences until L1 is reduced to 0. On the other hand, if $L14=1$, a series of subtractive processes take place during a succession of T*d* subsequences until L1 is increased to 0. Thus, if $Us=0$ at *t*41, the multiplicand is added to the accumulated product and the contents of L1 are reduced by 1 during each T*d* subsequence. At the end of each T*d* subsequence, L1 is sampled, and if $L1\neq 0$, a succeeding T*d* subsequence is entered. The T*d* subsequences continue until L1 is reduced to 0, at which time the multiplicand has been added to the accumulated product a number of times equal to the original value of L1. If $Us=1$ at *t*41, the multiplicand is subtracted from the accumulated product and the contents of L1 are increased by 1 during each T*d* subsequence. The T*d* subsequences continue until L1 is increased to 0, at which time the multiplicand has been subtracted from the accumulated product a number of times equal to (10—original value of L1).

The signals SVR7, SR76 and SR transfer the contents of the Arithmetic Unit to the R-register and apply the contents of the R-register to the V*b* input AND-gates of the Arithmetic Unit during the T*d* subsequence. The signal SJ functions to apply the multiplicand, if $Us=0$, or the complement of the multiplicand, if $Us=1$, to the V*a* input AND-gates of the Arithmetic Unit during *t*41–*t*46. The signal Z*va* issues during *t*47 and *t*48 and applies 0's to the V*a* input AND-gates of the Arithmetic Unit, if $\overline{Us}$. If $Us=1$, Z*va* transfers 9's to the V*a* input AND-gates of the Arithmetic Unit during *t*47 and *t*48.

At *t*47, the signal C*ld* issues to count down L1, if $\overline{Us}$. If $Us=1$, C*lu* issues to count up L1.

At *t*48, the contents of L1 is sampled. If the instruction is not ending and $L1=0$, Z*m* issues and a Tz subsequence is entered in the next succeeding clock period. If $L1\neq 0$, another similar T*d* subsequence immediately follows.

If $W=6$ during the T*d* subsequence, *M3*g* issues at *t*47 and the instruction terminates at *t*48. SVR7 is inhibited if E*nd* occurs at *t*48, in order to allow for the generation of the sign bits of the product, as previously described.

MISCELLANEOUS LOGIC RELATIONSHIPS

Extracts from the logical relationships provided in the drawings, which are applicable here, will be given. The Tz subsequence is entered when the Z*m* signal occurs:

$$*Tz=Zm=(42)[(\overline{W2}+\overline{W3})Tb8\ Tz\ Us\ L13\ L14]$$
$$+(42)[\overline{M3g}\ Tb8\ (L1=0)\overline{Tz}+\overline{M3g}\ Tb8(L1=0)\overline{Us}]$$

The first term in the expression for Z*m* indicates that during a Tz subsequence, another Tz subsequence is entered if $Us=1$ and $L1=9$, provided the instruction is not ending. The second term in the expression for Z*m* indicates that a Tz subsequence will be entered following *t*16, or following *t*48 of a T*d* subsequence, if $L1=0$. The third term for Z*m* indicates that another Tz subsequence will be entered if $\overline{Us}$ and $L1=0$ at *t*40 of a Tz subsequence.

The subtraction flip-flop is set to 1; as follows:

$$*Us=(42)Tb8\ \overline{Td}\ L14\ (\overline{W2}+\overline{W3})$$

i.e., if the instruction is not ending, U*s* is set to 1 at *t*16, or at *t*40 of a Tz subsequence, if $L14=1$. U*s* is reset to 0; as follows:

$$*\overline{Us}=(42)Tb8\ \overline{Td}\ (W2\ W3+\overline{L14})$$

or U*s* is reset to 0 at *t*40 if $W=6$, or $\overline{L14}$.

The signal C*lu* is described by:

$$Clu=Tb7\ Td\ Us+Tb8\ Tz\ Us$$

or L1 is counted up during a T*d*-cycle if $Us=1$, or during a Tz-cycle if $Us=1$. The latter function is necessary to provide the complementing action following a subtractive T*d* subsequence. The signal C*ld* issues; as follows:

$$Cld=Tb7\ Td\ \overline{Us}$$

or L1 is counted down during a T*d* subsequence if $Us=0$.

The W-counter is counted up; as follows:

$$Cwu=Tb7\ Ty\ Tz$$

or the W-counter contents are increased by 1 during each Tz subsequence.

The carry flip-flop is set to 1 under the following special conditions;

$$*Vc=*Us+Td\ Tb8\ Us$$

Each of these terms is necessary because a complementary operation will be performed if the next succeeding subsequence is a T*d* subsequence, and because V*ct* does not enable V*c* at T*b*8 T*d*. The carry flip-flop also responds in normal operation to the numerical inputs to the Arithmetic Unit, when enabled by V*ct* during *t*41–*t*47.

The signal E*nd* immediately follows the setting of M3*g*; i.e., $$End=M3g\ Tb8$$

Therefore, the issuance of M3*g* determines when the instruction terminates. M3*g* occurs; as follows:

$$*M3g=(42)\ [(W=5)\ Tz+(W=6)]\ \overline{Us}\ Tb7$$

Thus, the instruction terminates during a Tz subsequence if $W=5$ and $\overline{Us}$. Since C*wu* issues at the same time as M3*g*, W is set to 6 in the next succeeding clock period and the instruction terminates. At this time, all 6 digits of the multiplier have added their corresponding partial products to the accumulated product. If, however, $Us=1$ when $W=5$, M3*g* will not issue, but, instead, $W=6$ will inhibit Z*m*, and another T*d* subsequence will be entered. This is an additive subsequence since $*\overline{Us}$, as indicated previously, issues when W reaches 6. Therefore, at *t*48 of the first T*d* subsequence following $W=6$, M3*g* issues and the instruction terminates.

TAPE INTERRUPT VARIATION NOT NECESSARY

Since the Memory is not used following *t*8, except to obtain the next instruction, data may be exchanged between the Memory and the Multiplex Buffer without interrupting this instruction.

MOD-CHECK

No mod-check is performed on the results of the additions or subtractions executed during this instruction. However, *A*ac* sets at all times in the T*d* subsequence if the V*b* output signals are non-numeric; at all times in the T*d* subsequence, except at T*b*7, if the V*a* output signals are non-numeric; and at any time, if $\overline{M3g}$, if the Arithmetic Unit output signals are non-numeric.

MATHEMATICAL ANALYSIS OF THE SUBTRACTIVE T*d* SUBSEQUENCE

If $Us=0$, the multiplicand is added to the portion of the accumulated product in R L1 times. When L1 has been reduced to 0, the new accumulated product is shifted-down 1 digit during the Tz subsequence. An equation expressing this is, $$A'=A+L1\times J \qquad (1)$$

where A represents the accumulated product and J represents the multiplicand. If $Us=1$, the multiplicand is subtracted from the portion of the accumulated product in R (10—L1) times; i.e., $$A'=A-(10-L1)J \qquad (2)$$

Equation 2 will be the equivalent to Equation 1, provided $10\times J$ is added thereto. Therefore, after L1 has been counted up to 0, and a Tz subsequence is entered, C*lu* issues in order that the multiplicand may be added to the accumulated product an additional time during the next occurring T*d* subsequence. This technique of multiplying by subtraction is described in R. K. Richards "Arithmetic Operations in Digital Computers," pp. 251–252, D. Van Nostrand Co., Inc., Princeton, N.J., 1955. Inasmuch as the accumulated product is shifted-down one digit position before this next T*d* subsequence, the effect of this action is to add the desired $10 \times J$ to the accumulated product.

the Central Processor during this instruction, a numerical example is illustrated in detail in the table following. The entry N in the table, illustrates that the contents of the particular digit position has no significance at that time and does not affect the final result. In this example, the number −200003 in Memory is multiplied by the number +990802 in R. The product −198163372406 appears in R and L at the conclusion of the instruction.

At *t*1, the multiplier is in R and the multiplicand is in

MULTIPLICATION EXAMPLE

| Subsequence | | L7 | L6 | L5 | L4 | L3 | L2 | L1 | R7 | R6 | R5 | R4 | R3 | R2 | R1 | J7 | J6 | J5 | J4 | J3 | J2 | J1 | V (out) | Us | Vc | Zm | W | Sigs. |
|---|---|---|---|---|---|---|---|---|---|---|---|---|---|---|---|---|---|---|---|---|---|---|---|---|---|---|---|---|
| | *t*1 | N | N | N | N | N | N | N | + | 9 | 9 | 0 | 8 | 0 | 2 | N | N | N | N | N | N | N | N | N | 0 | 0 | 0 | |
| | *t*16 | + | 9 | 9 | 0 | 8 | 0 | 2 | 0 | 0 | 0 | 0 | 0 | 0 | 0 | − | 2 | 0 | 0 | 0 | 0 | 3 | N | N | 0 | 0 | 0 | |
| I | *t*41 | + | 9 | 9 | 0 | 8 | 0 | 2 | 0 | 0 | 0 | 0 | 0 | 0 | 0 | − | 2 | 0 | 0 | 0 | 0 | 3 | N | 0 | 0 | 0 | 0 | |
| | *t*42 | + | 9 | 9 | 0 | 8 | 0 | 2 | N | 0 | 0 | 0 | 0 | 0 | 0 | 3 | − | 2 | 0 | 0 | 0 | 0 | 3 | 0 | 0 | 0 | 0 | |
| | *t*43 | + | 9 | 9 | 0 | 8 | 0 | 2 | 3 | N | 0 | 0 | 0 | 0 | 0 | 0 | 3 | − | 2 | 0 | 0 | 0 | 0 | 0 | 0 | 0 | 0 | |
| | *t*44 | + | 9 | 9 | 0 | 8 | 0 | 2 | 0 | 3 | N | 0 | 0 | 0 | 0 | 0 | 0 | 3 | − | 2 | 0 | 0 | 0 | 0 | 0 | 0 | 0 | |
| | *t*45 | + | 9 | 9 | 0 | 8 | 0 | 2 | 0 | 0 | 3 | N | 0 | 0 | 0 | 0 | 0 | 0 | 3 | − | 2 | 0 | 0 | 0 | 0 | 0 | 0 | |
| | *t*46 | + | 9 | 9 | 0 | 8 | 0 | 2 | 0 | 0 | 0 | 3 | N | 0 | 0 | 0 | 0 | 0 | 0 | 3 | − | 2 | 0 | 0 | 0 | 0 | 0 | |
| | *t*47 | + | 9 | 9 | 0 | 8 | 0 | 2 | 0 | 0 | 0 | 0 | 3 | N | 0 | 2 | 0 | 0 | 0 | 0 | 3 | − | 2 | 0 | 0 | 0 | 0 | *Zva, Cld* |
| | *t*48 | + | 9 | 9 | 0 | 8 | 0 | 1 | 2 | 0 | 0 | 0 | 0 | 3 | N | − | 2 | 0 | 0 | 0 | 0 | 3 | 0 | 0 | 0 | 0 | 0 | *Zva* |
| II | *t*41 | + | 9 | 9 | 0 | 8 | 0 | 1 | 0 | 2 | 0 | 0 | 0 | 0 | 3 | − | 2 | 0 | 0 | 0 | 0 | 3 | N | 0 | N | 0 | 0 | |
| | *t*42 | + | 9 | 9 | 0 | 8 | 0 | 1 | N | 0 | 2 | 0 | 0 | 0 | 0 | 3 | − | 2 | 0 | 0 | 0 | 0 | 6 | 0 | 0 | 0 | 0 | |
| | *t*43 | + | 9 | 9 | 0 | 8 | 0 | 1 | 6 | N | 0 | 2 | 0 | 0 | 0 | 0 | 3 | − | 2 | 0 | 0 | 0 | 0 | 0 | 0 | 0 | 0 | |
| | *t*44 | + | 9 | 9 | 0 | 8 | 0 | 1 | 0 | 6 | N | 0 | 2 | 0 | 0 | 0 | 0 | 3 | − | 2 | 0 | 0 | 0 | 0 | 0 | 0 | 0 | |
| | *t*45 | + | 9 | 9 | 0 | 8 | 0 | 1 | 0 | 0 | 6 | N | 0 | 2 | 0 | 0 | 0 | 0 | 3 | − | 2 | 0 | 0 | 0 | 0 | 0 | 0 | |
| | *t*46 | + | 9 | 9 | 0 | 8 | 0 | 1 | 0 | 0 | 0 | 6 | N | 0 | 2 | 0 | 0 | 0 | 0 | 3 | − | 2 | 0 | 0 | 0 | 0 | 0 | |
| | *t*47 | + | 9 | 9 | 0 | 8 | 0 | 1 | 0 | 0 | 0 | 0 | 6 | N | 0 | 2 | 0 | 0 | 0 | 0 | 3 | − | 4 | 0 | 0 | 0 | 0 | *Zva, Cld* |
| | *t*48 | + | 9 | 9 | 0 | 8 | 0 | 0 | 4 | 0 | 0 | 0 | 0 | 6 | N | − | 2 | 0 | 0 | 0 | 0 | 3 | 0 | 0 | 0 | 1 | 0 | *Zva* |
| III | *t*39 | + | 9 | 9 | 0 | 8 | 0 | 0 | 0 | 4 | 0 | 0 | 0 | 0 | 6 | − | 2 | 0 | 0 | 0 | 0 | 3 | N | 0 | N | 0 | 0 | |
| | *t*40 | + | 6 | 9 | 9 | 0 | 8 | 0 | 0 | 0 | 4 | 0 | 0 | 0 | 0 | − | 2 | 0 | 0 | 0 | 0 | 3 | N | 0 | 0 | 1 | 1 | |
| IV | *t*39 | + | 6 | 9 | 9 | 0 | 8 | 0 | 0 | 0 | 4 | 0 | 0 | 0 | 0 | − | 2 | 0 | 0 | 0 | 0 | 3 | N | 0 | 0 | 0 | 1 | |
| | *t*40 | + | 0 | 6 | 9 | 9 | 0 | 8 | 0 | 0 | 0 | 4 | 0 | 0 | 0 | − | 2 | 0 | 0 | 0 | 0 | 3 | N | 0 | 0 | 0 | 2 | |
| V | *t*41 | + | 0 | 6 | 9 | 9 | 0 | 8 | 0 | 0 | 0 | 4 | 0 | 0 | 0 | − | 2 | 0 | 0 | 0 | 0 | 3 | N | 1 | 1 | 0 | 2 | |
| | *t*42 | + | 0 | 6 | 9 | 9 | 0 | 8 | N | 0 | 0 | 0 | 4 | 0 | 0 | 3 | − | 2 | 0 | 0 | 0 | 0 | 7 | 1 | 0 | 0 | 2 | |
| | *t*43 | + | 0 | 6 | 9 | 9 | 0 | 8 | 7 | N | 0 | 0 | 0 | 4 | 0 | 0 | 3 | − | 2 | 0 | 0 | 0 | 9 | 1 | 0 | 0 | 2 | |
| | *t*44 | + | 0 | 6 | 9 | 9 | 0 | 8 | 9 | 7 | N | 0 | 0 | 0 | 4 | 0 | 0 | 3 | − | 2 | 0 | 0 | 9 | 1 | 0 | 0 | 2 | |
| | *t*45 | + | 0 | 6 | 9 | 9 | 0 | 8 | 9 | 9 | 7 | N | 0 | 0 | 0 | 0 | 0 | 0 | 3 | − | 2 | 0 | 3 | 1 | 1 | 0 | 2 | |
| | *t*46 | + | 0 | 6 | 9 | 9 | 0 | 8 | 3 | 9 | 9 | 7 | N | 0 | 0 | 0 | 0 | 0 | 0 | 3 | − | 2 | 0 | 1 | 1 | 0 | 2 | |
| | *t*47 | + | 0 | 6 | 9 | 9 | 0 | 8 | 0 | 3 | 9 | 9 | 7 | N | 0 | 2 | 0 | 0 | 0 | 0 | 3 | 2 | 8 | 1 | 0 | 0 | 2 | *Zva, Clu* |
| | *t*48 | + | 0 | 6 | 9 | 9 | 0 | 9 | 8 | 0 | 3 | 9 | 9 | 7 | N | − | 2 | 0 | 0 | 0 | 0 | 3 | 9 | 1 | 0 | 0 | 2 | *Zva* |
| VI | *t*41 | + | 0 | 6 | 9 | 9 | 0 | 9 | 9 | 8 | 0 | 3 | 9 | 9 | 7 | − | 2 | 0 | 0 | 0 | 0 | 3 | N | 1 | 1 | 0 | 2 | |
| | *t*42 | + | 0 | 6 | 9 | 9 | 0 | 9 | N | 9 | 8 | 0 | 3 | 9 | 9 | 3 | − | 2 | 0 | 0 | 0 | 0 | 4 | 1 | 1 | 0 | 2 | |
| | *t*43 | + | 0 | 6 | 9 | 9 | 0 | 9 | 4 | N | 9 | 8 | 0 | 3 | 9 | 0 | 3 | − | 2 | 0 | 0 | 0 | 9 | 1 | 1 | 0 | 2 | |
| | *t*44 | + | 0 | 6 | 9 | 9 | 0 | 9 | 9 | 4 | N | 9 | 8 | 0 | 3 | 0 | 0 | 3 | − | 2 | 0 | 0 | 9 | 1 | 1 | 0 | 2 | |
| | *t*45 | + | 0 | 6 | 9 | 9 | 0 | 9 | 9 | 9 | 4 | N | 9 | 8 | 0 | 0 | 0 | 0 | 3 | − | 2 | 0 | 3 | 1 | 1 | 0 | 2 | |
| | *t*46 | + | 0 | 6 | 9 | 9 | 0 | 9 | 3 | 9 | 9 | 4 | N | 9 | 8 | 0 | 0 | 0 | 0 | 3 | − | 2 | 0 | 1 | 1 | 0 | 2 | |
| | *t*47 | + | 0 | 6 | 9 | 9 | 0 | 9 | 0 | 3 | 9 | 9 | 4 | N | 9 | 2 | 0 | 0 | 0 | 0 | 3 | − | 6 | 1 | 1 | 0 | 2 | *Zva, Clu* |
| | *t*48 | + | 0 | 6 | 9 | 9 | 0 | 0 | 6 | 0 | 3 | 9 | 9 | 4 | N | − | 2 | 0 | 0 | 0 | 0 | 3 | 9 | 1 | 1 | 1 | 2 | *Zva* |
| VII | *t*39 | + | 0 | 6 | 9 | 9 | 0 | 0 | 9 | 6 | 0 | 3 | 9 | 9 | 4 | − | 2 | 0 | 0 | 0 | 0 | 3 | N | 1 | 1 | 0 | 2 | |
| | *t*40 | + | 4 | 0 | 6 | 9 | 9 | 0 | 9 | 9 | 6 | 0 | 3 | 9 | 9 | − | 2 | 0 | 0 | 0 | 0 | 3 | N | 1 | 0 | 0 | 3 | *Clu* |
| VIII | *t*41 | + | 4 | 0 | 6 | 9 | 9 | 1 | 9 | 9 | 6 | 0 | 3 | 9 | 9 | − | 2 | 0 | 0 | 0 | 0 | 3 | N | 0 | 0 | 0 | 3 | |
| | *t*42 | + | 4 | 0 | 6 | 9 | 9 | 1 | N | 9 | 9 | 6 | 0 | 3 | 9 | 3 | − | 2 | 0 | 0 | 0 | 0 | 2 | 0 | 1 | 0 | 3 | |
| | *t*43 | + | 4 | 0 | 6 | 9 | 9 | 1 | 2 | N | 9 | 9 | 6 | 0 | 3 | 0 | 3 | − | 2 | 0 | 0 | 0 | 0 | 0 | 1 | 0 | 3 | |
| | *t*44 | + | 4 | 0 | 6 | 9 | 9 | 1 | 0 | 2 | N | 9 | 9 | 6 | 0 | 0 | 0 | 3 | − | 2 | 0 | 0 | 4 | 0 | 0 | 0 | 3 | |
| | *t*45 | + | 4 | 0 | 6 | 9 | 9 | 1 | 4 | 0 | 2 | N | 9 | 9 | 6 | 0 | 0 | 0 | 3 | − | 2 | 0 | 0 | 0 | 0 | 0 | 3 | |
| | *t*46 | + | 4 | 0 | 6 | 9 | 9 | 1 | 0 | 4 | 0 | 2 | N | 9 | 9 | 0 | 0 | 0 | 0 | 3 | − | 2 | 6 | 0 | 0 | 0 | 3 | |
| | *t*47 | + | 4 | 0 | 6 | 9 | 9 | 1 | 6 | 0 | 4 | 0 | 2 | N | 9 | 2 | 0 | 0 | 0 | 0 | 3 | − | 1 | 0 | 1 | 0 | 3 | *Zva, Cld* |
| | *t*48 | + | 4 | 0 | 6 | 9 | 9 | 0 | 1 | 6 | 0 | 4 | 0 | 2 | N | − | 2 | 0 | 0 | 0 | 0 | 3 | 0 | 0 | 1 | 1 | 3 | *Zva* |
| IX | *t*39 | + | 4 | 0 | 6 | 9 | 9 | 0 | 0 | 1 | 6 | 0 | 4 | 0 | 2 | − | 2 | 0 | 0 | 0 | 0 | 3 | N | 0 | N | 0 | 3 | |
| | *t*40 | + | 2 | 4 | 0 | 6 | 9 | 9 | 0 | 0 | 1 | 6 | 0 | 4 | 0 | − | 2 | 0 | 0 | 0 | 0 | 3 | N | 0 | 0 | 0 | 4 | |
| X | *t*41 | + | 2 | 4 | 0 | 6 | 9 | 9 | 0 | 0 | 1 | 6 | 0 | 4 | 0 | − | 2 | 0 | 0 | 0 | 0 | 3 | N | 1 | 1 | 0 | 4 | |
| | *t*42 | + | 2 | 4 | 0 | 6 | 9 | 9 | N | 0 | 0 | 1 | 6 | 0 | 4 | 3 | − | 2 | 0 | 0 | 0 | 0 | 7 | 1 | 0 | 0 | 4 | |
| | *t*43 | + | 2 | 4 | 0 | 6 | 9 | 9 | 7 | N | 0 | 0 | 1 | 6 | 0 | 0 | 3 | − | 2 | 0 | 0 | 0 | 3 | 1 | 1 | 0 | 4 | |
| | *t*44 | + | 2 | 4 | 0 | 6 | 9 | 9 | 3 | 7 | N | 0 | 0 | 1 | 6 | 0 | 0 | 3 | − | 2 | 0 | 0 | 0 | 1 | 1 | 0 | 4 | |
| | *t*45 | + | 2 | 4 | 0 | 6 | 9 | 9 | 0 | 3 | 7 | N | 0 | 0 | 1 | 0 | 0 | 0 | 3 | − | 2 | 0 | 6 | 1 | 1 | 0 | 4 | |
| | *t*46 | + | 2 | 4 | 0 | 6 | 9 | 9 | 6 | 0 | 3 | 7 | N | 0 | 0 | 0 | 0 | 0 | 0 | 3 | − | 2 | 1 | 1 | 1 | 0 | 4 | |
| | *t*47 | + | 2 | 4 | 0 | 6 | 9 | 9 | 1 | 6 | 0 | 3 | 7 | N | 0 | 2 | 0 | 0 | 0 | 0 | 3 | − | 8 | 1 | 0 | 0 | 4 | *Zva, Clu* |
| | *t*48 | + | 2 | 4 | 0 | 6 | 9 | 0 | 8 | 1 | 6 | 0 | 3 | 7 | N | − | 2 | 0 | 0 | 0 | 0 | 3 | 9 | 1 | 0 | 1 | 4 | *Zva* |
| XI | *t*39 | + | 2 | 4 | 0 | 6 | 9 | 0 | 9 | 8 | 1 | 6 | 0 | 3 | 7 | − | 2 | 0 | 0 | 0 | 0 | 3 | N | 1 | 1 | 0 | 4 | |
| | *t*40 | + | 7 | 2 | 4 | 0 | 6 | 9 | 9 | 9 | 8 | 1 | 6 | 0 | 3 | − | 2 | 0 | 0 | 0 | 0 | 3 | N | 1 | 0 | 1 | 5 | *Clu* |
| XII | *t*39 | + | 7 | 2 | 4 | 0 | 6 | 0 | 9 | 9 | 8 | 1 | 6 | 0 | 3 | − | 2 | 0 | 0 | 0 | 0 | 3 | N | 1 | 1 | 0 | 5 | |
| | *t*40 | + | 3 | 7 | 2 | 4 | 0 | 6 | 9 | 9 | 9 | 8 | 1 | 6 | 0 | − | 2 | 0 | 0 | 0 | 0 | 3 | N | 1 | 0 | 0 | 6 | *Clu* |
| XIII | *t*41 | + | 3 | 7 | 2 | 4 | 0 | 7 | 9 | 9 | 9 | 8 | 1 | 6 | 0 | − | 2 | 0 | 0 | 0 | 0 | 3 | N | 0 | 0 | 0 | 6 | |
| | *t*42 | + | 3 | 7 | 2 | 4 | 0 | 7 | N | 9 | 9 | 9 | 8 | 1 | 6 | 3 | − | 2 | 0 | 0 | 0 | 0 | 3 | 0 | 0 | 0 | 6 | |
| | *t*43 | + | 3 | 7 | 2 | 4 | 0 | 7 | 3 | N | 9 | 9 | 9 | 8 | 1 | 0 | 3 | − | 2 | 0 | 0 | 0 | 6 | 0 | 0 | 0 | 6 | |
| | *t*44 | + | 3 | 7 | 2 | 4 | 0 | 7 | 6 | 3 | N | 9 | 9 | 9 | 8 | 0 | 0 | 3 | − | 2 | 0 | 0 | 1 | 0 | 0 | 0 | 6 | |
| | *t*45 | + | 3 | 7 | 2 | 4 | 0 | 7 | 1 | 6 | 3 | N | 9 | 9 | 9 | 0 | 0 | 0 | 3 | − | 2 | 0 | 8 | 0 | 0 | 0 | 6 | |
| | *t*46 | + | 3 | 7 | 2 | 4 | 0 | 7 | 8 | 1 | 6 | 3 | N | 9 | 9 | 0 | 0 | 0 | 0 | 3 | − | 2 | 9 | 0 | 0 | 0 | 6 | |
| | *t*47 | + | 3 | 7 | 2 | 4 | 0 | 7 | 9 | 8 | 1 | 6 | 3 | N | 9 | 2 | 0 | 0 | 0 | 0 | 3 | − | 1 | 0 | 1 | 0 | 6 | *Zva, Cld, *M3g* |
| | *t*48 | + | 3 | 7 | 2 | 4 | 0 | 6 | 1 | 9 | 8 | 1 | 6 | 3 | N | − | 2 | 0 | 0 | 0 | 0 | 3 | 0 | 0 | 1 | 0 | 6 | *Zva, End* |
| | *t*9 | − | 3 | 7 | 2 | 4 | 0 | 6 | − | 1 | 9 | 8 | 1 | 6 | 3 | | | | | | | | | | | | | |

EXAMPLE

To illustrate the various alternative courses taken by the multiplier in R, the multiplicand in J, and the product in L, the table following illustrates the contents of the Memory. By *t*16, the multiplier has been shifted to L, R has been cleared, and the multiplicand is stored in J.

During each T*d* subsequence, the contents of J are ring shifted in order to present each digit therein to the V*a* input AND-gates of the Arithmetic Unit. During each T*d* subsequence the contents of R are shifted to the right in order to present each digit therein to the V*b* input AND-gates of the Arithmetic Unit. During each T*z* subsequence, the combined contents of R and L1–L6 are shifted-down one digit position. The sign of the multiplier remains in L7 from *t*16 to the conclusion of the instruction, at which time it is changed, if necessary, to provide the product with a proper sign.

At *t*16, L1 is sampled. Since *L*1=2, *T*d* occurs, but U*s* is not set. Additive T*d* subsequence I is entered. From *t*41–*t*48, the contents of J are added to the contents of R and the sum is placed in R. It is seen that by shifting R for 8 clock periods, the digit position which contains no significant data is destroyed. At *t*47, C*ld* issues to decrease the contents of L1 to 1. During *t*47 and *t*48, Z*va* issues and inserts 0's into the V*a* input AND-gates of the Arithmetic Unit. At *t*48, L1 is again sampled. Since L1 is not 0, another additive T*d* subsequence II is entered. Again in subsequence II, *Us*=0. In subsequence II, the contents of J are again added to the accumulated product in R. At *t*47 of subsequence II, C*ld* issues again, so that by *t*48 L1 has been reduced to 0. Therefore, when L1 is sampled at *t*48 of subsequence II, Z*m* issues to cause entry into T*z* subsequence III.

In subsequence III, the LSD in R1 is transferred to L6 and the remaining numeric contents of L and R are shifted-down one digit position. At *t*40, the W-register is counted up to 1, and a 0 is inserted into the MSD position of R. At *t*40 of subsequence III, L1 is sampled. Since the next multiplier digit is found to be 0, Z*m* issues once again and subsequence IV is entered.

In subsequence IV, the numeric contents of L and R are again shifted-down one digit position, which has the effect of multiplying the multiplicand by 0. W is now counted up to 2, indicating that the accumulated product reflects the multiplication by the two least significant digits of the multiplier; namely, 2 and 0.

At *t*40 of subsequence IV, L1 is again sampled. Since *L*1=8, *U*s*, *V*c* and *T*d* issue and subtractive T*d* subsequence V is entered. During subsequence V, the 9's complement of the contents of J are added to the accumulated product in R, and the sum is placed in R. At *t*48 of subsequence V, the digit in L1 is increased to 9. Inasmuch as *L*≠0 at *t*48 of subsequence V, another subtractive T*d* subsequence is entered. At *t*47 of this new subtractive subsequence VI, C*lu* again issues to increase the contents of L1 to 0. At *t*48 of subsequence VI, L1 is equal to 0 and, therefore, Z*m* issues.

T*z* subsequence VII is entered and the numeric contents of L and R are shifted-down one digit position. At *t*40, U*s* is still equal to 1, so that C*lu* issues to complete the previous subtractive process by causing 10×*J* to be added to the accumulated product. Inasmuch as *Us*=1 at *t*40 of subsequence VII, Z*m* is inhibited, and *T*d* issues. However, at *t*40 $*\overline{Us}$ occurs, so that the next subsequence is additive. A single additive T*d* subsequence VIII follows, in which L1 is again reduced to 0. T*z* subsequence IX follows.

Since *L*1=9 at *t*40 of subsequence IX, a single subtractive T*d* subsequence X follows, and is immediately followed by T*z* subsequence XI.

At *t*40 of subsequence XI, U*s* is still equal to 1 so that C*lu* issues. Inasmuch as *L*1=9, Z*m* issues and, in effect, L1 is changed to 10. Therefore, another T*z* subsequence XII occurs. At *t*39 of subsequence XII, *W*=5, but M3*g* is inhibited since *Us*=1. The digit in L1 is increased by 1 to account for the fact that the last multiplier digit became 10 and a single completion T*d* subsequence XIII is entered. $*\overline{Us}$ issues at *t*40 of subsequence XII since *W*=6. During subsequence XIII, the multiplicand is once more added to the accumulated product. At *t*47 of subsequence XIII, L1 is reduced to the value it had at *t*40 of subsequence XII, which value was that of the LSD of the product. *M3*g* issues unconditionally at *t*47, since *W*=6. The instruction ends at *t*48 of subsequence XIII. In the next clock cycle the sign and designator bits in L7 and R7 are altered to their correct values for the product.

*Instruction 43: Divide FULL by M (DIV)*

This instruction (FIG. 199) effects the algebraic division of a 12 digit word in FULL by a 6 digit word in Memory. The 6 digit quotient appears in L and the 6 digit remainder appears in R at the termination of the instruction.

The operand address is: 0000–3999 Memory.

The descriptions of Instructions 21, 72 and 73, coupled with the description to follow, is a complete description of Instruction 43.

The Initial Routine is unaltered.

From *t*1–*t*16, the instruction and the divisor are mod-checked, and at *t*16 the divisor from Memory is in J. During *t*9–*t*15, the signals SL76, SL, SLR7, SR76, SR and SRL7 issue to effect an exchange between the contents of L and R. By *t*16, the MSH of the dividend is in R, and the LSH of the dividend is in L.

The purpose of this exchange of the contents of L and R is to prepare for a comparison of the MSH of the dividend with the divisor. Whenever a 12 digit number is divided by a 6 digit number, a quotient of more than 6 digits is possible. However, since a limit of 6 quotient digits is imposed by the capacity of the L-register, an overflow is possible. Therefore, this instruction will not perform a division where such an overflow would otherwise occur. The test for this overflow is accomplished from *t*17–*t*24, by comparing the divisor in J with the MSH of the dividend in R. If $|R|<|J|$, the quotient will be expressable in 6 digits and the instruction continues. However, if $|R|>|J|$, the quotient will be too large to be expressed in 6 digits, and the instruction terminates. As a preparation for the comparison of R and J, the overflow flip-flop O*v* is set at *t*8, and continues set through *t*16. From *t*17–*t*22, R*gm* and IR*em* compare corresponding digits of R and J as they are ring shifted in their respective registers. R*gm* occurs whenever *R*1>*J*1. IR*em* occurs whenever *R*1=*J*1. From *t*17–*t*22, *O*v* issues if R*gm* occurs and $*\overline{Ov}$ issues if neither R*gm* nor IR*em* occurs. Therefore, if *Ov*=0 at *t*24, $|R|<|J|$, and the instruction will continue. Otherwise, the instruction terminates at *t*24. The expressions for the response of O*v* during this comparison are:

$$*Ov=(43)\ Tb\ Ty\ \overline{Tz}\ \overline{Td}\ Rgm\ \overline{Tb7}$$
$$*\overline{Ov}=(43)\ Tb\ Ty\ \overline{Tz}\ \overline{Td}\ \overline{IRgm}\ \overline{IRem}\ \overline{Tb7}$$

If the instruction is to continue, at *t*24 *T*z* issues, and SZR7 issues to replace the condition digit in R7 by a 0.

From *t*25–*t*40, the T*z* flip-flop is on, and this period will be identified as the T*z* subsequence. During the T*z* subsequence, the contents of L1–L6 and R are effectively ring shifted-up one digit position. Generally, this action serves to transfer the partial quotient to the left in L and to place a 0 in L1 for generation of the next quotient digit. This ring shift-up of L1–L6 and R is accomplished by ring shifting-down the contents of R and L1–L6 twelve digit positions. During *t*26–*t*31 and *t*34–*t*39, the signals SL, SLR7, SR76, SR and SRL6 effect this 12 digit ring shift-down.

The general procedure employed for accomplishing division is to successively subtract the divisor from the proper dividend digits until a borrow is produced; whereupon the divisor is added once to the dividend, the dividend is shifted-up one digit position with respect to the divisor and the procedure is repeated. The number of times that the divisor is subtracted is counted in L1, and this digit becomes a digit of the quotient. The W-counter counts up 1 before each subtractive subsequence, so that when $W=6$, the last subtractive subsequence is entered.

Before entering each subtractive subsequence the U*s* and V*c* flip-flops must be set, the latter because a complementary process is employed. These two flip-flops are set at *t*26 of the T*z* subsequence. At *t*39 of the T*z* subsequence, W is counted up 1 to anticipate the next series of subtractions for generating a particular digit of the quotient. At *t*40, T*d* is set to 1, and T*z* is reset, so that the next clock period is *t*41. $Td=1$ from *t*41–*t*48, this interval being identified as a T*d* subsequence. During the successive T*d* subsequences following a T*z* subsequence, the divisor in J is subtracted from the dividend portion in R until a borrow bit is produced. T*d* then issues for eight more clock periods, during which the divisor is added to the dividend portion in R. Following this additive T*d* subsequence, another T*z* subsequence is entered.

If $Us=1$, subtraction is performed in the T*d* subsequence by supplying the complement of J to the V*a* input AND-gates of the Arithmetic Unit, and by supplying the contents of R to the V*b* input AND-gates of the Arithmetic Unit. The signal SVR7 issues from *t*41–*t*47, to transfer the sum from the Arithmetic Unit to the R-register. The signals V*ct* also issue during this interval to enable the carry flip-flop.

At *t*48 of each T*d* subsequence, V*c* is sampled. If the divisor was greater than the dividend portion in R at *t*41 of the subsequence, $Vc=0$ at *t*48, and the next T*d* subsequence must be additive; i.e., by resetting U*s* to 0. If $Vc=1$ at *t*48, the dividend portion in R was greater than the divisor at *t*41, and another subtractive T*d* subsequence must be entered. Instruction 72 illustrated that if V*c* was not set following complementary subtraction, then $|J|>|R|$; i.e., the subtractive process went one step too far, and the divisor must be added back to the dividend portion in R.

Immediately following the additive T*d* subsequence, during which $Us=0$, the T*z* subsequence is entered, provided the instruction is not concluding.

The signal Z*va* is present during *t*47–*t*48, and serves to transfer 9's to the V*a* input AND-gates, if U*s*, and 0's to the V*a* input AND-gates if $\overline{Us}$. At *t*47, C*lu* issues to count L1 up if a subtractive process is being performed, and C*ld* issues to count L1 down if an additive process is being performed.

If $W=6$ when the last series of T*d* subsequences is entered, the 6th digit of the quotient is present in the L-register following the additive T*d* subsequence, so that the instruction may be concluded. Therefore, if $\overline{Us}$ and $W=6$, *M3*g* issues at *t*47. If $M3g=1$ at *t*48, E*nd* occurs and the instruction is concluded. At this time, new sign and designator bits are generated for L and R. If the signs of the divisor and dividend are alike, the new sign inserted in L7, which contains the quotient, is positive. If the signs of the dividend and divisor are unlike, the new sign inserted in L7 is negative. This generation of the new sign for L is given by:

$$*Ls=(43)\ End\ Js\ \overline{Ls}$$

$$*\overline{Ls}=(43)\ End\ Js\ Ls$$

The sign of the division remainder is the sign of the original dividend. Therefore, the sign of the remainder which is inserted in R7, is given by:

$$*Rs=(43)\ End\ Ls$$

$$*\overline{Rs}=(43)\ End\ \overline{Ls}$$

The designator bits of L and R are set to 0 when E*nd* occurs; i.e., $$*\overline{Ld}=(43)\ End$$

$$*\overline{Rd}=(43)\ End$$

MISCELLANEOUS LOGIC RELATIONSHIPS

Extracts from the logical relationships, provided in the drawings, which are applicable here, will be given. The subtraction flip-flop is set to 1 as follows:

$$*Us=(43)\ Tz$$

or U*s* is set to 1 at the beginning of each T*z* subsequence, since each T*z* subsequence is followed by at least one subtractive T*d* subsequence. U*s* is reset to 0 as follows:

$$*\overline{Us}=(43)\ Tb8\ Td\ \overline{Vc}$$

or U*s* is reset to 0 at *t*48 of a subtractive T*d* subsequence, if no carry bit occurred.

The signal C*lu* is given by:

$$Clu=Tb7\ Td\ Us$$

and the signal C*ld* is given by:

$$Cld=Tb7\ Td\ \overline{Us}$$

or L1 is counted up during a subtractive T*d* subsequence and counted down during an additive T*d* subsequence.

The W-counter is counted up as follows:

$$Cwu=Tb7\ Ty\ Tz$$

or W is counted up at *t*39 of the T*z* subsequence.

The carry flip-flop is set to 0 under the following special conditions:

$$*Vc=*Us+Tb8\ Td\ Us\ Vc$$

The second of these expressions is necessary because a subtractive T*d* subsequence will follow a subtractive T*d* subsequence, if $Vc=1$ at *t*48 thereof.

The signal E*nd* immediately follows the setting of M3*g* in a T*d* subsequence, or the setting of O*v* in the comparison subsequence, as follows:

$$End=M3g\ Tb8+Ov\ Ty\ Tb8$$

The issuance of M3*g* occurs as follows:

$$*M3g=(43)(W=6)\ \overline{Us}\ Tb7$$

or M3*g* is set to 1 during the first additive T*d* subsequence following the T*z* subsequence in which W is set to 6.

TAPE INTERRUPT VARIATION NOT NECESSARY

Since the Memory is not used following *t*8, except to obtain the next instruction, data may be exchanged between the Memory and the Multiplex Buffer without interrupting this instruction.

MOD-CHECK

No mod-check is performed on the results of the additions or subtractions performed during this instruction. However, *A*ac* sets at all times in the T*d* subsequence if the V*b* output signals are non-numeric; at all times in the T*d* subsequence except at T*b*7, if the V*a* output signals are non-numeric; and at any time, if $\overline{M3g}$, if the Arithmetic Unit output signals are non-numeric.

EXAMPLE

To illustrate the various alternative courses taken by the Central Processor during this instruction, a numerical example is illustrated in detail in the table following. The entry N, in the table, illustrates that the contents of the particular digit position has no significance at that time, and does not affect the final result. In this example, the number +000080400030 in FULL is divided by the number −000400 in Memory. The quotient −201000 appears in L and the remainder +000030 appears in R at the conclusion of the instruction.

At *t*1, the dividend is in FULL and the divisor is in Memory. By *t*16, the MSH and LSH words of the dividend have been exchanged and the divisor is stored in J.

DIVISION EXAMPLE

| Subsequence | | L7 | L6 | L5 | L4 | L3 | L2 | L1 | R7 | R6 | R5 | R4 | R3 | R2 | R1 | J7 | J6 | J5 | J4 | J3 | J2 | J1 | V (out) | Us | Vc | W | Sigs. |
|---|---|---|---|---|---|---|---|---|---|---|---|---|---|---|---|---|---|---|---|---|---|---|---|---|---|---|---|
| | *t9* | + | 0 | 0 | 0 | 0 | 8 | 0 | + | 4 | 0 | 0 | 0 | 3 | 0 | − | 0 | 0 | 0 | 4 | 0 | 0 | N | 0 | 0 | 0 | |
| | *t17* | + | 4 | 0 | 0 | 0 | 3 | 0 | + | 0 | 0 | 0 | 0 | 8 | 0 | − | 0 | 0 | 0 | 4 | 0 | 0 | N | 0 | 0 | 0 | |
| | *t18* | + | 4 | 0 | 0 | 0 | 3 | 0 | 0 | + | 0 | 0 | 0 | 0 | 8 | 0 | − | 0 | 0 | 0 | 4 | 0 | N | 0 | 0 | 0 | |
| | *t19* | + | 4 | 0 | 0 | 0 | 3 | 0 | 8 | 0 | + | 0 | 0 | 0 | 0 | 0 | 0 | − | 0 | 0 | 0 | 4 | N | 0 | 0 | 0 | |
| | *t20* | + | 4 | 0 | 0 | 0 | 3 | 0 | 0 | 8 | 0 | + | 0 | 0 | 0 | 4 | 0 | 0 | − | 0 | 0 | 0 | N | 0 | 0 | 0 | |
| | *t21* | + | 4 | 0 | 0 | 0 | 3 | 0 | 0 | 0 | 8 | 0 | + | 0 | 0 | 0 | 4 | 0 | 0 | − | 0 | 0 | N | 0 | 0 | 0 | |
| | *t22* | + | 4 | 0 | 0 | 0 | 3 | 0 | 0 | 0 | 0 | 8 | 0 | + | 0 | 0 | 0 | 4 | 0 | 0 | − | 0 | N | 0 | 0 | 0 | |
| | *t23* | + | 4 | 0 | 0 | 0 | 3 | 0 | 0 | 0 | 0 | 0 | 8 | 0 | + | 0 | 0 | 0 | 4 | 0 | 0 | − | N | 0 | 0 | 0 | |
| | *t24* | + | 4 | 0 | 0 | 0 | 3 | 0 | + | 0 | 0 | 0 | 0 | 8 | 0 | − | 0 | 0 | 0 | 4 | 0 | 0 | N | 0 | 0 | 0 | |
| I | *t25* | + | 4 | 0 | 0 | 0 | 3 | 0 | 0 | 0 | 0 | 0 | 0 | 8 | 0 | − | 0 | 0 | 0 | 4 | 0 | 0 | N | 0 | 0 | 0 | |
| | *t26* | + | 4 | 0 | 0 | 0 | 3 | 0 | 0 | 0 | 0 | 0 | 0 | 8 | 0 | − | 0 | 0 | 0 | 4 | 0 | 0 | N | 1 | 1 | 0 | |
| | *t27* | + | 0 | 4 | 0 | 0 | 0 | 3 | 0 | 0 | 0 | 0 | 0 | 0 | 8 | − | 0 | 0 | 0 | 4 | 0 | 0 | N | 1 | 1 | 0 | |
| | *t28* | + | 8 | 0 | 4 | 0 | 0 | 0 | 3 | 0 | 0 | 0 | 0 | 0 | 0 | − | 0 | 0 | 0 | 4 | 0 | 0 | N | 1 | 1 | 0 | |
| | *t29* | + | 0 | 8 | 0 | 4 | 0 | 0 | 0 | 3 | 0 | 0 | 0 | 0 | 0 | − | 0 | 0 | 0 | 4 | 0 | 0 | N | 1 | 1 | 0 | |
| | *t30* | + | 0 | 0 | 8 | 0 | 4 | 0 | 0 | 0 | 3 | 0 | 0 | 0 | 0 | − | 0 | 0 | 0 | 4 | 0 | 0 | N | 1 | 1 | 0 | |
| | *t31* | + | 0 | 0 | 0 | 8 | 0 | 4 | 0 | 0 | 0 | 3 | 0 | 0 | 0 | − | 0 | 0 | 0 | 4 | 0 | 0 | N | 1 | 1 | 0 | |
| | *t32* | + | 0 | 0 | 0 | 0 | 8 | 0 | 4 | 0 | 0 | 0 | 3 | 0 | 0 | − | 0 | 0 | 0 | 4 | 0 | 0 | N | 1 | 1 | 0 | |
| | *t33* | + | 0 | 0 | 0 | 0 | 8 | 0 | 4 | 0 | 0 | 0 | 3 | 0 | 0 | − | 0 | 0 | 0 | 4 | 0 | 0 | N | 1 | 1 | 0 | |
| | *t34* | + | 0 | 0 | 0 | 0 | 8 | 0 | 4 | 0 | 0 | 0 | 3 | 0 | 0 | − | 0 | 0 | 0 | 4 | 0 | 0 | N | 1 | 1 | 0 | |
| | *t35* | + | 0 | 0 | 0 | 0 | 0 | 8 | 0 | 4 | 0 | 0 | 0 | 3 | 0 | − | 0 | 0 | 0 | 4 | 0 | 0 | N | 1 | 1 | 0 | |
| | *t36* | + | 0 | 0 | 0 | 0 | 0 | 0 | 8 | 0 | 4 | 0 | 0 | 0 | 3 | − | 0 | 0 | 0 | 4 | 0 | 0 | N | 1 | 1 | 0 | |
| | *t37* | + | 3 | 0 | 0 | 0 | 0 | 0 | 0 | 8 | 0 | 4 | 0 | 0 | 0 | − | 0 | 0 | 0 | 4 | 0 | 0 | N | 1 | 1 | 0 | |
| | *t38* | + | 0 | 3 | 0 | 0 | 0 | 0 | 0 | 0 | 8 | 0 | 4 | 0 | 0 | − | 0 | 0 | 0 | 4 | 0 | 0 | N | 1 | 1 | 0 | |
| | *t39* | + | 0 | 0 | 3 | 0 | 0 | 0 | 0 | 0 | 0 | 8 | 0 | 4 | 0 | − | 0 | 0 | 0 | 4 | 0 | 0 | N | 1 | 1 | 0 | |
| | *t40* | + | 0 | 0 | 0 | 3 | 0 | 0 | 0 | 0 | 0 | 0 | 8 | 0 | 4 | − | 0 | 0 | 0 | 4 | 0 | 0 | N | 1 | 1 | 1 | |
| II | *t41* | + | 0 | 0 | 0 | 3 | 0 | 0 | 0 | 0 | 0 | 0 | 8 | 0 | 4 | − | 0 | 0 | 0 | 4 | 0 | 0 | N | 1 | 1 | 1 | |
| | *t42* | + | 0 | 0 | 0 | 3 | 0 | 0 | N | 0 | 0 | 0 | 0 | 8 | 0 | 0 | − | 0 | 0 | 0 | 4 | 0 | 4 | 1 | 1 | 1 | |
| | *t43* | + | 0 | 0 | 0 | 3 | 0 | 0 | 4 | N | 0 | 0 | 0 | 0 | 8 | 0 | 0 | − | 0 | 0 | 0 | 4 | 0 | 1 | 1 | 1 | |
| | *t44* | + | 0 | 0 | 0 | 3 | 0 | 0 | 0 | 4 | N | 0 | 0 | 0 | 0 | 4 | 0 | 0 | − | 0 | 0 | 0 | 4 | 1 | 1 | 1 | |
| | *t45* | + | 0 | 0 | 0 | 3 | 0 | 0 | 4 | 0 | 4 | N | 0 | 0 | 0 | 0 | 4 | 0 | 0 | − | 0 | 0 | 0 | 1 | 1 | 1 | |
| | *t46* | + | 0 | 0 | 0 | 3 | 0 | 0 | 0 | 4 | 0 | 4 | N | 0 | 0 | 0 | 0 | 4 | 0 | 0 | − | 0 | 0 | 1 | 1 | 1 | |
| | *t47* | + | 0 | 0 | 0 | 3 | 0 | 0 | 0 | 0 | 4 | 0 | 4 | N | 0 | 0 | 0 | 0 | 4 | 0 | 0 | − | 0 | 1 | 1 | 1 | *Zva, Clu* |
| | *t48* | + | 0 | 0 | 0 | 3 | 0 | 1 | 0 | 0 | 0 | 4 | 0 | 4 | N | − | 0 | 0 | 0 | 4 | 0 | 0 | 0 | 1 | 1 | 1 | *Zva* |
| III | *t41* | + | 0 | 0 | 0 | 3 | 0 | 1 | 0 | 0 | 0 | 0 | 4 | 0 | 4 | − | 0 | 0 | 0 | 4 | 0 | 0 | N | 1 | 1 | 1 | |
| | *t42* | + | 0 | 0 | 0 | 3 | 0 | 1 | N | 0 | 0 | 0 | 0 | 4 | 0 | 0 | − | 0 | 0 | 0 | 4 | 0 | 4 | 1 | 1 | 1 | |
| | *t43* | + | 0 | 0 | 0 | 3 | 0 | 1 | 4 | N | 0 | 0 | 0 | 0 | 4 | 0 | 0 | − | 0 | 0 | 0 | 4 | 0 | 1 | 1 | 1 | |
| | *t44* | + | 0 | 0 | 0 | 3 | 0 | 1 | 0 | 4 | N | 0 | 0 | 0 | 0 | 4 | 0 | 0 | − | 0 | 0 | 0 | 0 | 1 | 1 | 1 | |
| | *t45* | + | 0 | 0 | 0 | 3 | 0 | 1 | 0 | 0 | 4 | N | 0 | 0 | 0 | 0 | 4 | 0 | 0 | − | 0 | 0 | 0 | 1 | 1 | 1 | |
| | *t46* | + | 0 | 0 | 0 | 3 | 0 | 1 | 0 | 0 | 0 | 4 | N | 0 | 0 | 0 | 0 | 4 | 0 | 0 | − | 0 | 0 | 1 | 1 | 1 | |
| | *t47* | + | 0 | 0 | 0 | 3 | 0 | 1 | 0 | 0 | 0 | 0 | 4 | N | 0 | 0 | 0 | 0 | 4 | 0 | 0 | − | 0 | 1 | 1 | 1 | *Zva, Clu* |
| | *t48* | + | 0 | 0 | 0 | 3 | 0 | 2 | 0 | 0 | 0 | 0 | 0 | 4 | N | − | 0 | 0 | 0 | 4 | 0 | 0 | 0 | 1 | 1 | 1 | *Zva* |
| IV | *t41* | + | 0 | 0 | 0 | 3 | 0 | 2 | 0 | 0 | 0 | 0 | 0 | 0 | 4 | − | 0 | 0 | 0 | 4 | 0 | 0 | N | 1 | 1 | 1 | |
| | *t42* | + | 0 | 0 | 0 | 3 | 0 | 2 | N | 0 | 0 | 0 | 0 | 0 | 0 | 0 | − | 0 | 0 | 0 | 4 | 0 | 4 | 1 | 1 | 1 | |
| | *t43* | + | 0 | 0 | 0 | 3 | 0 | 2 | 4 | N | 0 | 0 | 0 | 0 | 0 | 0 | 0 | − | 0 | 0 | 0 | 4 | 0 | 1 | 1 | 1 | |
| | *t44* | + | 0 | 0 | 0 | 3 | 0 | 2 | 0 | 4 | N | 0 | 0 | 0 | 0 | 4 | 0 | 0 | − | 0 | 0 | 0 | 6 | 1 | 0 | 1 | |
| | *t45* | + | 0 | 0 | 0 | 3 | 0 | 2 | 6 | 0 | 4 | N | 0 | 0 | 0 | 0 | 4 | 0 | 0 | − | 0 | 0 | 9 | 1 | 0 | 1 | |
| | *t46* | + | 0 | 0 | 0 | 3 | 0 | 2 | 9 | 6 | 0 | 4 | N | 0 | 0 | 0 | 0 | 4 | 0 | 0 | − | 0 | 9 | 1 | 0 | 1 | |
| | *t47* | + | 0 | 0 | 0 | 3 | 0 | 2 | 9 | 9 | 6 | 0 | 4 | N | 0 | 0 | 0 | 0 | 4 | 0 | 0 | − | 9 | 1 | 0 | 1 | *Zva, Clu* |
| | *t48* | + | 0 | 0 | 0 | 3 | 0 | 3 | 9 | 9 | 9 | 6 | 0 | 4 | N | − | 0 | 0 | 0 | 4 | 0 | 0 | 9 | 1 | 0 | 1 | *Zva* |
| V | *t41* | + | 0 | 0 | 0 | 3 | 0 | 3 | 9 | 9 | 9 | 9 | 6 | 0 | 4 | − | 0 | 0 | 0 | 4 | 0 | 0 | N | 0 | 0 | 1 | |
| | *t42* | + | 0 | 0 | 0 | 3 | 0 | 3 | N | 9 | 9 | 9 | 9 | 6 | 0 | 0 | − | 0 | 0 | 0 | 4 | 0 | 4 | 0 | 0 | 1 | |
| | *t43* | + | 0 | 0 | 0 | 3 | 0 | 3 | 4 | N | 9 | 9 | 9 | 9 | 6 | 0 | 0 | − | 0 | 0 | 0 | 4 | 0 | 0 | 1 | 1 | |
| | *t44* | + | 0 | 0 | 0 | 3 | 0 | 3 | 0 | 4 | N | 9 | 9 | 9 | 9 | 4 | 0 | 0 | − | 0 | 0 | 0 | 0 | 0 | 1 | 1 | |
| | *t45* | + | 0 | 0 | 0 | 3 | 0 | 3 | 0 | 0 | 4 | N | 9 | 9 | 9 | 0 | 4 | 0 | 0 | − | 0 | 0 | 0 | 0 | 1 | 1 | |
| | *t46* | + | 0 | 0 | 0 | 3 | 0 | 3 | 0 | 0 | 0 | 4 | N | 9 | 9 | 0 | 0 | 4 | 0 | 0 | − | 0 | 0 | 0 | 1 | 1 | |
| | *t47* | + | 0 | 0 | 0 | 3 | 0 | 3 | 0 | 0 | 0 | 0 | 4 | N | 9 | 0 | 0 | 0 | 4 | 0 | 0 | − | 0 | 0 | 1 | 1 | *Zva, Cld* |
| | *t48* | + | 0 | 0 | 0 | 3 | 0 | 2 | 0 | 0 | 0 | 0 | 0 | 4 | N | − | 0 | 0 | 0 | 4 | 0 | 0 | 0 | 0 | 1 | 1 | *Zva* |
| VI | *t25* | + | 0 | 0 | 0 | 3 | 0 | 2 | 0 | 0 | 0 | 0 | 0 | 0 | 4 | − | 0 | 0 | 0 | 4 | 0 | 0 | N | 0 | 0 | 1 | |
| | *t40* | + | 0 | 0 | 3 | 0 | 2 | 0 | 0 | 0 | 0 | 0 | 0 | 4 | 0 | − | 0 | 0 | 0 | 4 | 0 | 0 | N | 1 | 1 | 2 | |
| VII | *t41* | + | 0 | 0 | 3 | 0 | 2 | 0 | 0 | 0 | 0 | 0 | 0 | 4 | 0 | − | 0 | 0 | 0 | 4 | 0 | 0 | N | 1 | 1 | 2 | |
| | *t42* | + | 0 | 0 | 3 | 0 | 2 | 0 | N | 0 | 0 | 0 | 0 | 0 | 4 | 0 | − | 0 | 0 | 0 | 4 | 0 | 0 | 1 | 1 | 2 | |
| | *t43* | + | 0 | 0 | 3 | 0 | 2 | 0 | 0 | N | 0 | 0 | 0 | 0 | 0 | 0 | 0 | − | 0 | 0 | 0 | 4 | 4 | 1 | 1 | 2 | |
| | *t44* | + | 0 | 0 | 3 | 0 | 2 | 0 | 4 | 0 | N | 0 | 0 | 0 | 0 | 4 | 0 | 0 | − | 0 | 0 | 0 | 6 | 1 | 0 | 2 | |
| | *t45* | + | 0 | 0 | 3 | 0 | 2 | 0 | 6 | 4 | 0 | N | 0 | 0 | 0 | 0 | 4 | 0 | 0 | − | 0 | 0 | 9 | 1 | 0 | 2 | |
| | *t46* | + | 0 | 0 | 3 | 0 | 2 | 0 | 9 | 6 | 4 | 0 | N | 0 | 0 | 0 | 0 | 4 | 0 | 0 | − | 0 | 9 | 1 | 0 | 2 | |
| | *t47* | + | 0 | 0 | 3 | 0 | 2 | 0 | 9 | 9 | 6 | 4 | 0 | N | 0 | 0 | 0 | 0 | 4 | 0 | 0 | − | 9 | 1 | 0 | 2 | *Zva, Clu* |
| | *t48* | + | 0 | 0 | 3 | 0 | 2 | 1 | 9 | 9 | 9 | 6 | 4 | 0 | N | − | 0 | 0 | 0 | 4 | 0 | 0 | 9 | 1 | 0 | 2 | *Zva* |
| VIII | *t41* | + | 0 | 0 | 3 | 0 | 2 | 1 | 9 | 9 | 9 | 9 | 6 | 4 | 0 | − | 0 | 0 | 0 | 4 | 0 | 0 | N | 0 | 0 | 2 | |
| | *t42* | + | 0 | 0 | 3 | 0 | 2 | 1 | N | 9 | 9 | 9 | 9 | 6 | 4 | 0 | − | 0 | 0 | 0 | 4 | 0 | 0 | 0 | 0 | 2 | |
| | *t43* | + | 0 | 0 | 3 | 0 | 2 | 1 | 0 | N | 9 | 9 | 9 | 9 | 6 | 0 | 0 | − | 0 | 0 | 0 | 4 | 4 | 0 | 0 | 2 | |
| | *t44* | + | 0 | 0 | 3 | 0 | 2 | 1 | 4 | 0 | N | 9 | 9 | 9 | 9 | 4 | 0 | 0 | − | 0 | 0 | 0 | 0 | 0 | 1 | 2 | |
| | *t45* | + | 0 | 0 | 3 | 0 | 2 | 1 | 0 | 4 | 0 | N | 9 | 9 | 9 | 0 | 4 | 0 | 0 | − | 0 | 0 | 0 | 0 | 1 | 2 | |
| | *t46* | + | 0 | 0 | 3 | 0 | 2 | 1 | 0 | 0 | 4 | 0 | N | 9 | 9 | 0 | 0 | 4 | 0 | 0 | − | 0 | 0 | 0 | 1 | 2 | |
| | *t47* | + | 0 | 0 | 3 | 0 | 2 | 1 | 0 | 0 | 0 | 4 | 0 | N | 9 | 0 | 0 | 0 | 4 | 0 | 0 | − | 0 | 0 | 1 | 2 | *Zva, Cld* |
| | *t48* | + | 0 | 0 | 3 | 0 | 2 | 0 | 0 | 0 | 0 | 0 | 4 | 0 | N | − | 0 | 0 | 0 | 4 | 0 | 0 | 0 | 0 | 1 | 2 | *Zva* |
| IX | *t25* | + | 0 | 0 | 3 | 0 | 2 | 0 | 0 | 0 | 0 | 0 | 0 | 4 | 0 | − | 0 | 0 | 0 | 4 | 0 | 0 | N | 0 | 0 | 2 | |
| | *t40* | + | 0 | 3 | 0 | 2 | 0 | 0 | 0 | 0 | 0 | 0 | 4 | 0 | 0 | − | 0 | 0 | 0 | 4 | 0 | 0 | N | 1 | 1 | 3 | |
| X | *t41* | + | 0 | 3 | 0 | 2 | 0 | 0 | 0 | 0 | 0 | 0 | 4 | 0 | 0 | − | 0 | 0 | 0 | 4 | 0 | 0 | N | 1 | 1 | 3 | |
| XI | Two Subtractive *Td* subsequences followed by one additive *Td* subsequence | | | | | | | | | | | | | | | | | | | | | | | | | | |
| XII | *t48* | + | 0 | 3 | 0 | 2 | 0 | 1 | 0 | 0 | 0 | 0 | 0 | 0 | 0 | − | 0 | 0 | 0 | 4 | 0 | 0 | 0 | 0 | 1 | 3 | |
| XIII | *t25* | + | 0 | 3 | 0 | 2 | 0 | 1 | 0 | 0 | 0 | 0 | 0 | 0 | 0 | − | 0 | 0 | 0 | 4 | 0 | 0 | N | 0 | 0 | 3 | |
| | *t40* | + | 3 | 0 | 2 | 0 | 1 | 0 | 0 | 0 | 0 | 0 | 0 | 0 | 0 | − | 0 | 0 | 0 | 4 | 0 | 0 | N | 1 | 1 | 4 | |
| XIV | *t41* | + | 3 | 0 | 2 | 0 | 1 | 0 | 0 | 0 | 0 | 0 | 0 | 0 | 0 | − | 0 | 0 | 0 | 4 | 0 | 0 | N | 1 | 1 | 4 | |
| | One Subtractive *Td* subsequence followed by one additive *Td* subsequence | | | | | | | | | | | | | | | | | | | | | | | | | | |
| XV | *t48* | + | 3 | 0 | 2 | 0 | 1 | 0 | 0 | 0 | 0 | 0 | 0 | 0 | 0 | − | 0 | 0 | 0 | 4 | 0 | 0 | 0 | 0 | 1 | 4 | |
| XVI | *t25* | + | 3 | 0 | 2 | 0 | 1 | 0 | 0 | 0 | 0 | 0 | 0 | 0 | 0 | − | 0 | 0 | 0 | 4 | 0 | 0 | N | 0 | 0 | 4 | |
| | *t40* | + | 0 | 2 | 0 | 1 | 0 | 0 | 0 | 0 | 0 | 0 | 0 | 0 | 3 | − | 0 | 0 | 0 | 4 | 0 | 0 | N | 1 | 1 | 5 | |
| XVII | *t41* | + | 0 | 2 | 0 | 1 | 0 | 0 | 0 | 0 | 0 | 0 | 0 | 0 | 3 | − | 0 | 0 | 0 | 4 | 0 | 0 | N | 1 | 1 | 5 | |
| | One Subtractive *Td* subsequence followed by one additive *Td* subsequence | | | | | | | | | | | | | | | | | | | | | | | | | | |
| XVIII | *t48* | + | 0 | 2 | 0 | 1 | 0 | 0 | 0 | 0 | 0 | 0 | 0 | 0 | 3 | − | 0 | 0 | 0 | 4 | 0 | 0 | 0 | 0 | 1 | 5 | |

DIVISION EXAMPLE—Continued

| Subsequence | | L7 | L6 | L5 | L4 | L3 | L2 | L1 | R7 | R6 | R5 | R4 | R3 | R2 | R1 | J7 | J6 | J5 | J4 | J3 | J2 | J1 | V (out) | Us | Vc | W | Sigs. |
|---|---|---|---|---|---|---|---|---|---|---|---|---|---|---|---|---|---|---|---|---|---|---|---|---|---|---|---|
| XIX | t25 | + | 0 | 2 | 0 | 1 | 0 | 0 | 0 | 0 | 0 | 0 | 0 | 0 | 3 | — | 0 | 0 | 0 | 4 | 0 | 0 | N | 0 | 0 | 5 | |
| | t40 | + | 2 | 0 | 1 | 0 | 0 | 0 | 0 | 0 | 0 | 0 | 0 | 3 | 0 | — | 0 | 0 | 0 | 4 | 0 | 0 | N | 1 | 1 | 6 | |
| XX | t41 | + | 2 | 0 | 1 | 0 | 0 | 0 | 0 | 0 | 0 | 0 | 0 | 3 | 0 | — | 0 | 0 | 0 | 4 | 0 | 0 | N | 1 | 1 | 6 | |
| | t42 | + | 2 | 0 | 1 | 0 | 0 | 0 | N | 0 | 0 | 0 | 0 | 0 | 3 | 0 | — | 0 | 0 | 0 | 4 | 0 | | 1 | 1 | 6 | |
| | t43 | + | 2 | 0 | 1 | 0 | 0 | 0 | 0 | N | 0 | 0 | 0 | 0 | 0 | 0 | 0 | — | 0 | 0 | 0 | 4 | | 1 | 1 | 6 | |
| | t44 | + | 2 | 0 | 1 | 0 | 0 | 0 | 3 | 0 | N | 0 | 0 | 0 | 0 | 4 | 0 | 0 | — | 0 | 0 | 0 | 6 | 1 | 0 | 6 | |
| | t45 | + | 2 | 0 | 1 | 0 | 0 | 0 | 6 | 3 | 0 | N | 0 | 0 | 0 | 0 | 4 | 0 | 0 | — | 0 | 0 | 9 | 1 | 0 | 6 | |
| | t46 | + | 2 | 0 | 1 | 0 | 0 | 0 | 9 | 6 | 3 | 0 | N | 0 | 0 | 0 | 0 | 4 | 0 | 0 | — | 0 | 9 | 1 | 0 | 6 | |
| | t47 | + | 2 | 0 | 1 | 0 | 0 | 0 | 9 | 9 | 6 | 3 | 0 | N | 0 | 0 | 0 | 0 | 4 | 0 | 0 | — | 9 | 1 | 0 | 6 | Zva, Clu |
| | t48 | + | 2 | 0 | 1 | 0 | 0 | 1 | 9 | 9 | 9 | 6 | 3 | 0 | N | — | 0 | 0 | 0 | 4 | 0 | 0 | 9 | 1 | 0 | 6 | Zva |
| XXI | t41 | + | 2 | 0 | 1 | 0 | 0 | 1 | 9 | 9 | 9 | 9 | 6 | 3 | 0 | — | 0 | 0 | 0 | 4 | 0 | 0 | N | 0 | 0 | 6 | |
| | t42 | + | 2 | 0 | 1 | 0 | 0 | 1 | N | 9 | 9 | 9 | 9 | 6 | 3 | 0 | — | 0 | 0 | 0 | 4 | 0 | 0 | 0 | 0 | 6 | |
| | t43 | + | 2 | 0 | 1 | 0 | 0 | 1 | 0 | N | 9 | 9 | 9 | 9 | 6 | 0 | 0 | — | 0 | 0 | 0 | 4 | 3 | 0 | 0 | 6 | |
| | t44 | + | 2 | 0 | 1 | 0 | 0 | 1 | 3 | 0 | N | 9 | 9 | 9 | 9 | 4 | 0 | 0 | — | 0 | 0 | 0 | 0 | 0 | 1 | 6 | |
| | t45 | + | 2 | 0 | 1 | 0 | 0 | 1 | 0 | 3 | 0 | N | 9 | 9 | 9 | 0 | 4 | 0 | 0 | — | 0 | 0 | 0 | 0 | 1 | 6 | |
| | t46 | + | 2 | 0 | 1 | 0 | 0 | 1 | 0 | 0 | 3 | 0 | N | 9 | 9 | 0 | 0 | 4 | 0 | 0 | — | 0 | 0 | 0 | 1 | 6 | |
| | t47 | + | 2 | 0 | 1 | 0 | 0 | 1 | 0 | 0 | 0 | 3 | 0 | N | 9 | 0 | 0 | 0 | 4 | 0 | 0 | — | 0 | 0 | 1 | 6 | Zva, Cld, *M3g |
| | t48 | + | 2 | 0 | 1 | 0 | 0 | 0 | 0 | 0 | 0 | 0 | 3 | 0 | N | — | 0 | 0 | 0 | 4 | 0 | 0 | 0 | 0 | 1 | 6 | Zva, End |
| | t9 | — | 2 | 0 | 1 | 0 | 0 | 0 | + | 0 | 0 | 0 | 0 | 3 | 0 | | | | | | | | | | | | |

From $t17$–$t24$, the contents of R and J are respectively ring shifted in order to compare the MSH of the dividend with the divisor to determine whether the quotient can be expressed in six digits or less. Since such is the case here, the division proceeds, and a 0 is inserted in R7 at $t25$. From $t25$–$t40$, Tz subsequence I, the contents of R and L1–L6 are ring shifted-down twelve digits, which, in effect, ring shifts-up these contents one digit position. At $t40$ of subsequence I, a 0 is in L1, so that the contents of L1 may serve as the first digit of the quotient during the first set of succeeding T*d* subsequences. At $t40$ of subsequence I, W is counted up to 1. At $t26$ of subsequence I, U*s* and V*c* are set to 1 to prepare for the first T*d* subsequence to follow $t40$.

T*d* subsequence II is subtractive. The divisor in J is subtracted from the dividend portion in R. At $t47$, C*lu* issues to insert a 1 in the most significant quotient position in L1. At $t48$, V*c* is sampled. Since V*c* is on, U*s* stays on, and another subtractive T*d* subsequence is entered.

At $t48$ of subsequence III, L1 is counted up to 2. At this time, V*c* is still on, so that the divisor must be once more subtracted from the dividend portion remaining in R1, by entering T*d* subsequence IV. At $t48$ of subsequence IV, L3 is counted up to 3, indicating that the divisor has been subtracted three times from the dividend portion in R. At $t48$ of subsequence IV, $Vc=0$, so that $*\overline{Us}$ occurs, and T*d* subsequence V becomes additive. During subsequence V, the divisor is added to the dividend portion in R, and L1 counted back down to 2.

Tz subsequence VI is automatically entered following $t48$ of subsequence V, since $Us=0$ at that time. Thus, at $t25$ of subsequence VI, the MSD (namely, 2) of the quotient is in L1. During Tz subsequence VI, the contents of L1–L6 and R are ring shifted-up one digit position and W is counted up to 2.

A subtractive T*d* subsequence VII automatically follows Tz subsequence VI. Since $Vc=0$ at the end of subsequence VII, the dividend portion in R was less than the divisor in J at $t41$ thereof. Therefore, U*s* is reset in the clock period next following $t48$ of subsequence VII, and T*d* subsequence VIII is additive to restore the divisor quantity to the dividend portion in R. Therefore, the next quotient digit, which is completed at $t48$ of subsequence VIII, is a 0.

The processes thus far outlined, will continue through subsequences IX–XIX.

In subsequence XIX, W is counted up to 6, indicating that during the next set of T*d* subsequences, the LSD of the quotient will be formed. At the end of subtractive T*d* subsequence XX, $Vc=0$, thereby effecting the resetting of U*s* and entry into additive T*d* subsequence XXI. Since $\overline{Us}$ and $W=6$ at $t47$ of subsequence XXI, *M3*g* issues and causes the setting of E*nd* at $t48$. Therefore, the instruction concludes at $t48$ of subsequence XXI. In the next clock period, the sign and designator bits of the quotient in L and the remainder in R are altered to their correct values.

*Instruction 65: Read Magnetic Tape or Character Reader (RMT)*

This instruction (FIG. 212) initiates the reading of one block of 100 words of data from magnetic tape and its transfer into Memory, or the reading of one line of data from a document by the Character Reader and its transfer into Memory.

The A-register contents are: 00MX–39MX, where M should be 0, or a digit divisible by 2. The LSD of the A-register contents is a control function which identifies the particular Tape Handler that is to read data into Memory or identifies the Character Reader. The other three digits of the A-register contents represent the three MSD's of the starting memory address. The LSD of the starting memory address will always be translated as a 0. Therefore, all starting memory addresses will be multiples of 20. The LSD of the A-register contents may be any numeric digit, which identifies a corresponding Tape Handler, or the non-numeric dollar sign ($), which identifies the Character Reader.

The descriptions of Instructions 21 and 58, coupled with the description to follow, is a complete description of Instruction 65.

The Initial Routine is unaltered; however, additional signals are added from $t1$–$t8$ to accomplish this instruction.

MAGNETIC TAPE READING

At $t3$, the "Read" signal R*ebd* in the Central Processor issues to prepare the Read Buffer and Tape Control Unit for a read operation. This signal issues; as follows:

$$Rebd=(65)\ Ta3\ \overline{Reb}\ \overline{Ers}$$

The signal R*ebd* causes the "Read Buffer Busy" flip-flop, R*eb*, in the Multiplex Buffer to set; as follows:

$$*Reb=Rebd$$

The signal XA*r*A also issues at $t3$; as follows:

$$XArA=(65)\ Ta3\ \overline{Reb}$$

This signal effects the transfer of the contents of the A-register to the A*r*-register, after which A*r* will retain the starting memory address. At $t4$, signals issue to clear the LSD of the A*r*-register to 0; as follows:

$$*\overline{Arli}=(65)\ Tp\ \overline{Dt}\ \overline{Bb}$$

The signal N*rb* in the Tape Control Unit also issues at $t3$ to control the transfer of the Tape Handler address from the LSD position of the A-register to the R*t*-Read Address register in the Tape Control Unit; as follows:

$$Nrb = Rebd\ \overline{Rb}$$

Therefore, at *t*4, the R*t*-register is set from the following signals:

$$*Rti = Nrb\ Ali$$

$$*\overline{Rti} = Nrb\ \overline{Ali}$$

The signal N*rb* also causes the "Tape Handler Busy Reading" flip-flop, R*b*, in the Tape Control Unit to set; as follows:

$$*Rb = Nrb$$

The signal R*b* controls the gating of the selected Tape Handler read preamplifier output signals to the F*tr* read amplifiers.

Thus, at *t*5, the selected Tape Handler has been addressed, the starting memory address is in the A*r*-register, the Read Buffer is prepared to receive the first word from tape, and the Tape Control Unit has been prepared for the read operation. Since approximately 10 to 25 milliseconds are required from the time the Tape Handler is referenced until the first word is available in the Read Buffer for storage in Memory, the Central Processor continues with its program until this first word is available in the Read Buffer. The succeeding program will be continually interrupted to store the 100 words in Memory, as described in the Read Buffer Operations section. The interruptions will continue until the $\gamma$ block marker on the tape indicates that one block of data has been read therefrom and stored in Memory, at which time the read operation will cease by the resetting of R*b* and R*eb*, and the program will continue uninterrupted; i.e., $$*\overline{Rb} = Red + Rt3\ (Rt1 + Rt2)$$

$$*\overline{Reb} = Red\ Reb\ \overline{Cha} + Cha\ Csf\ Eoc$$

The first term in the equation for $*\overline{Reb}$ controls the resetting of R*eb* when tape is being read. The signal R*ed* of the Tape Control Unit issues in response to the $\gamma$ block marker.

Therefore, this instruction merely prepares the system to read one block of data into the Memory. Following the conclusion of this instruction, the Read Buffer controls and the Tape Control Unit take over reading of data from tape, signaling the Central Processor when a word is available for loading, and terminating the reading process.

If this instruction is given when any one of the Tape Handlers is already reading, the R*eb* flip-flop is already on. The presence of the R*eb* signal inhibits the R*ebd* and XA*r*A signals. Thus, the starting memory address specified in this instruction is not transferred to the A*r*-register, thereby preventing destruction of the memory address already present therein; and the selected Tape Handler address is not transferred to the R*t*-register, thereby preventing destruction of the Tape Handler address already present therein. Instead, the signal *D*t* issues at *t*3 to set the D*t* flip-flop, thereby indicating that this instruction was ineffective.

$$*Dt = (65)\ Ta3\ Reb$$

The D*t* flip-flop, when on, inhibits the clearance of the LSD contents of the A*r*-register. Since the setting of D*t* does not stop the Central Processor, a function of the program is to interrogate D*t* with a DSW interrogation (Instruction 54).

During a preceding read instruction, the E*rs* read sub-alarm of the Multiplex Buffer may have been set. This sub-alarm does not stop the Central Processor. However, if a new read Instruction 65 is given with the read sub-alarm set, a major alarm signal will issue and stop the Central Processor. Thus, as indicated above, the E*rs* signal inhibits R*ebd*, thereby preventing the preparation of the Read Buffer and Tape Control Unit for a read operation, and sets the "Alert Tape Error" flip-flop, A*te*, of the Central Processor, which is a major alarm and stops the Central Processor; as follows:

$$*Ate = (65)\ Ta3\ Ers$$

It is to be noted that the signal XA*r*A need not be inhibited at this time since there is no significant data in the A*r*-register.

CHARACTER READING

If the LSD in A contains the dollar sign (0101), the Central Processor signal C*had* issues, in addition to R*ebd*, to prepare the Read Buffer and Character Reader for a read operation; as follows:

$$Chad = (65)\ Ta3\ \overline{Reb}\ \overline{Ers}\ (A1 = 0101)$$

The signal C*had* causes the setting of the "Character Reader Select" flip-flop, C*ha* in the Multiplex Buffer; as follows:

$$*Cha = Chad$$

As before, the R*ebd* signal transfers the A1 digit to the R*t*-register, transfers the starting memory address to the A*r*-register, and prepares the Read Buffer for the read operation. Additionally, the R*ebd* signal sets the C*su* flip-flop; as follows:

$$*Csu = Rebd$$

Since tape is not read, the R*b* signal is unnecessary, and the R*b* flip-flop is reset following storage of the non-numeric dollar sign digit in the R*t*-register.

Data does not enter the Read Buffer until the document field is being read by the Character Reader, which is indicated by the "Check Field Synchronizer" flip-flop, C*fs*, of the Multiplex Buffer, and which is set; as follows:

$$*Cfs = Cha\ Ckp$$

The C*kp* signal in the above equation is the Check Presence signal from the Sorter Control Unit, and issues when a document is being read by the Character Reader. The complete contents of the line of data on the document being scanned are transferred to the memory before this read operation terminates. The C*ha* signal gates the digit representing each symbol read by the Character Reader to the Read Buffer register element R*a*4 and inhibits entry of tape data input thereto. However, unlike the tape read variation of this instruction, the character reading operation does not conclude at the end of a block, but only when one line of data has been read from a document. Therefore, only one check or one line of data from a document will be read by this instruction. Since the speed of reading data by the Character Reader is slow compared to the speed of the Central Processor, the Central Processor continues with its program, subject to continual interruptions to receive data for the Memory from the Read Buffer, as described in the Read Buffer Operations section.

The interruptions will continue until the "End of Check" signal, E*oc*, occurs. E*oc* issues when the E*oc* flip-flop of the Multiplex Buffer is set to 1 at the termination of the Check Presence signal; as follows:

$$*Eoc = \overline{Ckp}\ Cfs\ \overline{Eoc}$$

The signal E*oc*, in turn, terminates the signal R*eb*, as indicated in the preceding equation for $*\overline{Reb}$, and the signals C*ha* and C*fs*; as follows:

$$*\overline{Cha} = Cha\ Cfs\ Eoc$$

$$*\overline{Cfs} = Eoc\ Cfs$$

The E*oc* flip-flop is reset in the clock period next following that in which it sets; i.e., $$*\overline{Eoc} = Eoc\ Cfs$$

If a tape was already reading when this instruction was given, so that the R*eb* flip-flop was on, this instruction is ineffective, and D*t* is set as described previously. If the read sub-alarm E*rs* is on when this instruction is entered, the instruction is ineffective, and the major alarm A*te* issues, as described previously.

If the A*npd* sub-alarm is on when this signal is entered, a major alarm will issue at *t*3; as follows:

$$*Ate = Chad\ Anpd$$

This sub-alarm is present in the event that a required pocket decision failed to occur. Therefore, where the present document is one of a series of documents being read, the Central Processor will immediately halt following the end of this instruction if A*npd* is present.

The halting of the Central Processor, when the A*te* major alarm occurs, is described in the Alarm Halt section.

It is to be noted that the major alarm A*i* does not set and stop the Central Processor, even though a non-numeric LSD is present in the A-register. This is because the signal $*Ai = A13(A12+A11)Mca$ is effective only at *t*5. However, by *t*5, the Tape Handler selector digit has been transferred to the R*t* read address register, and a numeric digit is in A1 due to the occurrence of XNA at *t*4.

The signal E*nd* occurs unconditionally at *t*8. Time: 8 clock periods.

*Instruction 66: Write Magnetic Tape or Load Printer (WMT)*

This instruction (FIG. 213) initiates the writing of one block of 100 words of data from consecutive memory locations onto magnetic tape or 100 words by the Printer.

The A-register contents are: 00MX–39MX, where M must be 0, or a digit divisible by 2. The LSD of the A-register contents is a control function which identifies the particular Tape Handler that is to receive data from the Memory or which identifies the Printer. The other three digits of the A-register contents represent the three MSD's of the starting memory address. The LSD of the starting memory address will always be translated as a 0. Therefore, all starting memory addresses will be multiples of 20. The LSD of the A-register contents may be any numeric digit, which identifies a corresponding Tape Handler, or the non-numeric comma (,), which identifies the Printer.

The description of Instruction 65, coupled with the description to follow, is a complete description of Instruction 66.

The Initial Routine is unaltered; however, additional signals are added from *t*1–*t*8 to accomplish this instruction.

MAGNETIC TAPE WRITING

At *t*3, the "Write" signal W*ebd* in the Central Processor issues to prepare the Write Buffer and Tape Control Unit for a write operation. This signal issues; as follows:

$$Webd = (66)\ Ta3\ \overline{Web}\ \overline{Ews}$$

The signal W*ebd* causes the "Write Buffer Busy" flip-flop, W*eb*, in the Multiplex Buffer to set; as follows:

$$*Web = Webd$$

The signal W*eb* controls writing of the one block of data.

The signal XAA*w* also issues at *t*3; as follows:

$$XAAw = (66)\ Ta3\ \overline{Web}$$

This signal effects the transfer of the contents of the A-register to the A*w*-register, after which A*w* will retain the starting memory address. At *t*4, signals issue to clear the LSD of the A*w*-register to 0; as follows:

$$*\overline{Awli} = (66)\ Tp\ \overline{Dt}\ \overline{Bb}$$

The logic causes the issuance of the signal *L*w* (Load Write); as follows:

$$*Lw = (66)\ Tp\ \overline{Dt}\ \overline{Bb}$$

The Load Write signal prepares the write buffer to accept the first word of the block from Memory. When T*i* occurs in the next-following instruction, a Write Buffer Operation will be entered and this first word transferred to the Write Buffer.

The logic also causes the issuance of the signal XA*w*A, which causes the transfer of the contents of A*w* to the A-register. However, this signal plays no part in this instruction, inasmuch as these new contents of A are immediately destroyed at *t*5.

There are two modes of delivering data to magnetic tape. In the block mode, the contents of 100 consecutive memory locations are delivered for writing. In the blockette mode, 5 random groups of 20 words each in memory are delivered for writing. Therefore, in this instruction the controlling flip-flop, B*lk*, in the Central Processor which determines the one of these two modes to be employed, is reset at *t*3 in order to allow the writing of the contents of 100 consecutive memory locations; as follows:

$$*\overline{Blk} = (66)\ Ta3\ \overline{Web}$$

The signal N*wb* in the Tape Control Unit also issues at *t*3 to control the transfer of the Tape Handler address from the LSD position of the A-register to the W*t*-alter address register in the Tape Control Unit; as follows:

$$Nwb = Webd\ \overline{Wb}$$

Therefore, at *t*4, the W*t*-register is set from the following signals:

$$*Wti = Nwb\ Ali$$

$$*\overline{Wti} = Nwb\ \overline{Ali}$$

The signal N*wb* also causes the "Tape Handler Busy Writing" flip-flop, W*b*, in the Tape Control Unit to set; as follows:

$$*Wb = Nwb$$

The signal W*b* controls the application of the write driver output signals to the write heads of the selected Tape Handler.

Thus, at *t*5, the selected Tape Handler has been addressed, the starting memory address is in the A*w*-register, the Write Buffer is prepared to receive the first word from Memory, and the Tape Control Unit has been prepared for the write operation. The succeeding program will be continually interrupted to obtain the 100 words from Memory, as described in the Write Buffer Operations section. These interruptions will continue until the $\gamma$ block marker on the tape indicates that one block of data has been written thereon, at which time the write operation will cease by the resetting of W*b* and W*eb*, and the program will continue uninterrupted; i.e., $$*\overline{Wb} = Wed + Wt3(Wt1 + Wt2)$$

$$*\overline{Web} = Wed\ Web\ \overline{Prt} + Tw6\ Tw5\ Tw4\ Tw3\ Wbk3\ \overline{Wbk2}\ Wbk1\ Bbf\ Web$$

The first term in the equation for W*eb* controls the resetting of W*eb* when tape is being written. The signal W*ed* of the Tape Control Unit issues in response to the $\gamma$ block marker.

Therefore, this instruction merely prepares the system to write one block of data from the Memory. Following the conclusion of this instruction, the Write Buffer controls and the Tape Control Unit take over writing of data on tape, signaling the Central Processor when another word is required for storage, and terminating the writing process.

If this instruction is given when any one of the Tape Handlers is already writing, the W*eb* flip-flop is already on. The presence of the W*eb* signal inhibits the W*ebd* and XAA*w* signals. Thus, the starting memory address specified in this instruction is not transferred to the A*w*-register, thereby preventing destruction of the memory address already present therein; and the selected Tape Handler address is not transferred to the W*t*-register, thereby preventing destruction of the Tape Handler address already present therein. Instead, the signal *D*t* issues at *t*3 to set the D*t* flip-flop, thereby indicating that this instruction was ineffective.

$$*Dt = (66)\ Ta3\ Web$$

The D*t* flip-flop, when on, inhibits the clearance of the LSD contents of the A*w*-register. Since the setting of D*t* does not stop the Central Processor, a function of the program is to interrogate D*t* with a DSW interrogation (Instruction 54).

During a preceding write instruction, the E*ws* write sub-alarm of the Multiplex Buffer may have been set. This sub-alarm does not stop the Central Processor. However, if a new write Instruction 66 is given with the write sub-alarm set, a major alarm signal will issue and stop the Central Processor. Thus, as indicated above, the E*ws* signal inhibits W*ebd*, thereby preventing the preparation of the Write Buffer and Tape Control Unit for a write operation, and sets the "Alert Tape Error" flip-flop, A*te*, of the Central Processor, which is a major alarm and stops the Central Processor; as follows:

$$*Ate = (66)\ Ta3\ Ews$$

PRINTER WRITING

If the LSD in A contains the comma (0110), the Central Processor signal P*rtd* issues, in addition to W*ebd*, to prepare the Write Buffer and Printer for a write operation; as follows:

$$Prtd=(66)\ Ta3\ \overline{Web}\ \overline{Ews}\ (A1=0110)$$

The signal P*rtd* causes the setting of the "Print-on-Line Select" flip-flop, P*rt*, in the Multiplex Buffer; as follows:

$$*Prt = Prtd$$

One hundred words of data are then transferred to the Printer by Write Buffer operations, while the program continues. After 100 words have been written by the Printer, the write operation will cease by resetting P*rt* and W*eb*. W*eb* is reset as shown by the second term in the previous equation for $*\overline{Web}$. In this second term, the T*wi* and W*bki* terms refer respectively to the T*w*-counter and W*bk*-counter, both in the Multiplex Buffer, which serve to time the write operation and to control the number of words written. The Multiplex Buffer signal B*bf* has been set when the first word is loaded into the Write Buffer from Memory.

The P*rt* flip-flop is reset; as follows:

$$*\overline{Prt}=Tw6\ Tw5\ Tw4\ Tw3\ Wbk3\ \overline{Wbk2}\ Wbk1$$

If a tape was already writing when this instruction was given, so that the W*eb* flip-flop was on, this instruction is ineffective, and D*t* is set as described previously. If the write sub-alarm E*ws* is on when this instruction is entered, the instruction is ineffective and the major alarm A*te* issues, as described previously.

The signal E*nd* occurs unconditionally at *t*8. Time: 8 clock periods.

*Instruction 68: Write Blockettes on Magnetic Tape or Load Printer (WMB)*

This instruction (FIG. 215) initiates the writing of 100 words of data from five groups of memory locations disposed at random in Memory, wherein each group comprises 20 consecutive memory locations. The words stored in each group of 20 consecutive memory locations are termed a blockette. These five blockettes may be written on magnetic tape or by the Printer.

The A-register contents are 00MX–39MX, where M must be 0, or a digit divisible by 2. The LSD of the A-register contents is a control function which identifies the particular Tape Handler that is to receive data from the Memory or which identifies the Printer. The other three digits of the A-register contents represent the three MSD's of the starting memory address of the first blockette. The LSD of the starting memory address will always be translated as a 0. Therefore, all starting memory addresses will be multiples of 20. The starting memory addresses for the remaining four blockettes, which must also be divisible by 20, must be stored sequentially in memory locations 0000, 0001, 0002, and 0003.

The LSD of the A-register contents may be any numeric digit, which identifies a corresponding Tape Handler, or the non-numeric comma (,), which identifies the Printer.

The description of Instruction 66, coupled with the description to follow, is a complete description of Instruction 68. This instruction is substantially identical to Instruction 66, except that the B*lk* flip-flop in the Central Processor is set to 1 at *t*4; as follows:

$$*Blk=(68)\ Ta3\ \overline{Web}$$

The flip-flop B*lk* controls the receipt of a new blockette starting memory address for every 20 words that are delivered by the Memory.

As indicated in Instruction 66, this instruction merely prepares the tape controls to write five blockettes of data from the Memory. Following the conclusion of this instruction, the Write Buffer controls and the Tape Control Unit take over the subsequent writing of data, signaling the Central Processor in the manner described in the Write Buffer Operations section. During these subsequences, the signal *J*m*20 of the Central Processor issues whenever the memory address reaches a quantity divisible by 20. The signal *J*m*20 controls the shift signal XA*t*A, which effects the transfer of the next required one of memory addresses 0000, 0001, 0002 or 0003 to the A-register.

The signal E*nd* occurs unconditionally at *t*8. Time: 8 clock periods.

*Instruction 67: Alter Magnetic Tape (AMT)*

This instruction (FIG. 214) initiates the backing, erasing, or rewinding of magnetic tape.

The A-register contents are: 00YX. The LSD, X, of the A-register contents is a control function which identifies the particular Tape Handler. The next higher order digit, Y, of the A-register contents identifies the one of three courses which this instruction may take.

If:

*Y*=1, the Tape Handler will back one block.
*Y*=3, the Tape Handler will back one block and erase one set of block markers.
*Y*=4, the Tape Handler will rewind completely.

The description of Instruction 66, coupled with the description to follow, is a complete description of Instruction 67.

The Initial Routine is unaltered. However, additional signals are added from *t*1–*t*8 to accomplish this instruction.

The "Back Tape" signal B*kt* of the Central Processor initiates the one block backing of the identified Tape Handler and issues; as follows:

$$Bkt=(67)\ Ta3\ \overline{Web}\ A21$$

The "Erase Tape" signal E*rt* of the Central Processor initiates the erasing of the block markers when the tape of the identified Tape Handler is backed one block and issues; as follows:

$$Ert=(67)\ Ta3\ \overline{Web}\ A22\ A21$$

The "Rewind Magnetic Tape" signal R*mt* of the Central

Processor initiates the rewinding of the identified Tape Handler and issues; as follows:

$$Rmt=(67)\ Ta3\ A23$$

The *Web* flip-flop is set by the signals B*kt* and E*rt*, as well as by the Write signal W*ebd* of Instructions 66 and 68; as follows:

$$*Web=Webd+Bkt+Ert$$

Following the issuance of any one of the signals B*kt*, E*rt* and R*mt*, this instruction concludes, but the Tape Control Unit continues control of the initiated course until it is completed.

As indicated in the equations above, each of the B*kt* and E*rt* signals is inhibited from issuing if the W*eb* signal of the Multiplex Buffer is present; i.e., if a previous write tape, back tape, or erase tape operation is not yet completed. One reason for this inhibiting action, is because the W*t*-register can only store the identification of one Tape Handler at a time.

As in Instruction 66, the N*wb* signal of the Tape Control Unit gates the identification of the Tape Handler into the Tape Control Unit W*t*-register for both the back and erase commands; as follows:

$$Nwb=(Webd+Ert+Bkt)\ \overline{Wb}$$
$$*Wti=Nwb\ Ali$$
$$*\overline{Wti}=Nwb\ \overline{Ali}$$

Therefore, the W*t*-register is employed to store the identification of the Tape Handler for the write, erase and back operations.

It is noted in the equations above that the R*mt* signal is not inhibited by the signal W*eb*. Thus, a rewind operation can be initiated at any time. One reason for the independence of this operation is that a separately settable flip-flop in the rewind register S, of the Tape Control Unit, controls the rewinding of a corresponding Tape Handler. Thus, the S*i* flip-flop, when set, causes the rewinding of the *i*th Tape Handler. The S*i* flip-flop in the rewind register is set; as follows:

$$*Si=Rmt\ (A1=i)$$

The back and erase instructions are terminated when a $\gamma$ block marker causes the issuance of the signal W*ed* of the Tape Control Unit, at which time W*eb* is reset; as follows:

$$*\overline{Web}=Web\ \overline{Prt}\ Wed$$

The rewind operations are terminated by the resetting of the corresponding S*i* flip-flop by the corresponding signal NB*td*(*i*) issuing from the respective Tape Handler when the *i*th tape is completely rewound.

If the back or erase instructions are given when the W*eb* signal is already on, the instruction is ineffective. Instead, the signal *D*t* issues at *t*3 to set the D*t* flip-flops, thereby indicating that this instruction was ineffective.

$$*Dt=(67)\ Ta3\ Web\ A21$$

Since the setting of D*t* does not stop the Central Processor, a function of the program is to interrogate D*t* with a DSW interrogation (Instruction 54).

The signal E*nd* occurs unconditionally at *t*8. Time: 8 clock periods.

*Instruction 58: Start or Stop Check Feeding (CHF)*

This instruction (FIG. 205) commands the Sorter to start or stop feeding documents.

The A-register contents are: 000X. The LSD of the A-register contents is a control function which identifies the one of two courses which this instruction may take. If:

A11=1 the Sorter will commence the continuous feeding of documents.

A11=0 the Sorter will stop the feeding of documents.

The description of Instruction 21, coupled with the description to follow, is a complete description of Instruction 58.

The Initial Routine is unaltered. However, additional signals are added from *t*1–*t*8 to accomplish this instruction.

At T*a*3, the signals *C*fd* or $*\overline{Cfd}$ issue from the Central Processor to control the "Check Feed" flip-flop, C*fd*, in the Central Processor; as follows:

$$*Cfd=(58)\ Ta3\ Rsr\ A11$$
$$*\overline{Cfd}=(58)\ Ta3\ \overline{A11}$$

The output of the C*fd* flip-flop controls the "Continuous Feed" flip-flop, C*of*, in the Sorter Control Unit; as follows:

$$*Cof=Cfd$$
$$*\overline{Cof}=\overline{Cfd}$$

Thus, after C*fd* is set, or reset, the C*of* flip-flop will correspondingly set or reset.

The C*of* signal actuates the vacuum feed solenoid in the Sorter, causing the Sorter to start feeding checks. In the absence of the C*of* signal, no checks are fed.

It is a condition for the issuance of the signal *C*fd*, and, consequently, to the starting of the check feeding, that the Sorter Ready signal R*sr* be equal to 1. The R*sr* signal is equal to 1 if the START SORTER switch is closed, so that the Sorter is running.

The signal E*nd* occurs unconditionally at *t*8. Time: 8 clock periods.

*Instruction 57: Select Sorter Pocket (N) (POC)*

This instruction (FIG. 204) effects the selection of one of the 12 Sorter pockets to receive a document.

The A-register contents are 000X. The LSD of the A-register contents is a digit which identifies the particular pocket selected.

The descriptions of Instructions 21, 58 and 65, coupled with the description to follow, is a complete description of Instruction 57.

The Initial Routine is unaltered. However, additional signals are added from *t*1–*t*8 to accomplish this instruction.

During *t*3 and *t*4 the signals P*si* issue from the Central Processor in response to the corresponding bits in A*li*; as follows:

$$Psi=(57)\ (Ti+Ta3)\ \overline{Ali}$$

The four signals P*s*1–P*s*4 represent four bits, which are respectively the inverse of the corresponding bits in A1. This inversion is necessary because the S*ou* output register of the Sorter Control Unit is adapted to respond to this inverted type of digit representation.

The signals P*si* are applied directly to the reset terminals of the S*ou*-register; as follows:

$$*\overline{Sou}(i)=Psi$$

The S*ou*-register has been previously set to the 1111-state. Following receipt of the P*si* signals, the *Sou*-register contents control the selection of the proper Sorter pocket when enabled by the read-out signal Y*ro* of the Sorter Control Unit.

The digits 0–9 in A1 control the respective 0–9 pockets of the Sorter. For example, if pocket #1 is to be selected, the contents of A1 are 0001. Therefore, the signals P*si*, which are consequently transmitted to the Sorter Control Unit, are 1110. These P*si* signals, in turn, set the S*ou*-register to the 0001-state. With the S*ou*-register in the 0001-state, a significant output signal is available on only the D*ec*1 line from the Sorter Control Unit. When the read-out signal occurs, the signal on the D*ec*1 line controls the opening of the deflector to Sorter pocket #1, for receipt of the document.

The asterisk (*), which is stored in A1 as 1110, ultimately provides an output on the D*ec–ss* line from the Sorter Control Unit, which, in turn, directly opens the Sorter special-sort pocket. The reject signal is stored as a period (.) in A1 and provides no output from any Sorter decision line, thereby causing the document to enter the Reject pocket.

If the forbidden digit 1111 is stored in A1, the document also enters the Sorter reject pocket. With the forbidden digit in A1, no flip-flop in the *Sou*-register is reset, and therefore the *Sou*-register remains in its cleared state. When the read-out signal subsequently occurs, no pocket command line is actuated, but instead, the N*pd* signal is transmitted to the Central Processor to set the flip-flop A*npd*. Thus, if either a forbidden digit or no pocket decision is transmitted from the Central Processor, A*npd* is set when the read-out signal occurs. Since the setting of A*npd* does not stop the Central Processor, a function of the program is to interrogate A*npd* with a DSW interrogation (Instruction 54).

Inasmuch as the Sorter Control Unit and the Central Processor operate asynchronously, the P*si* signals are applied to the *Sou*-register reset logic terminals for two clock periods of Central Processor time in order to insure that at least one clock pulse of the Sorter Control Unit occurs while the P*si* signals are applied.

The signal E*nd* occurs unconditionally at *t*8. Time: 8 clock periods.

*Instruction 24: Transfer P to M (TPM)*

This instruction (FIG. 189) effects the transfer of the entire contents of the P-register to a specified Memory location.

The location address is: 0000–3999 Memory.

The descriptions of Instructions 21 and 70, coupled with the description to follow, is a complete description of Instruction 24.

The Initial Routine is altered, as was that of Instruction 70, to eliminate XZJ at *t*7 and XMJ at *t*8, inasmuch as no operand is received from Memory. Instead, the instruction is circulated twice in the J-register and is mod-checked twice. At *t*8, the signal E*m*24 issues unconditionally; and the signal *D*t* issues conditionally.

E*m*24, a Central Processor signal, initiates the delivery of M*wt* from the Central Processor, which allows data to shift in parallel from the P-register to the M-register. Either of two conditions may exist at *t*8, which would result in the setting of D*t*, and which, in turn, would prevent the issuance of M*wt*:

$$*Dt=(54)\ Ta8\ (\overline{Mc3}+Pbz)$$

(1) If the P-register is empty, the P-Buffer flip-flop $Mc3=0$.

(2) If the P-register is receiving data from the Control Typewriter or the Photoreader, or is sending data to the Control Typewriter; the P*bz* signal of the P-Buffer is present, indicating that the P-register is busy.

The D*t* flip-flop is set at *t*9 if $\overline{Mc3}$ or P*bz* is present at *t*8. The setting of D*t* indicates that this instruction "didn't take." Since the setting of D*t* does not stop the Central Processor, a function of the program is to interrogate D*t* with a DSW interrogation (Instruction 54).

If the P-register is full and ready to transfer data to M, M*c*3 is on during the T*a*-cycle.

At *t*9, M*wt* occurs if D*t* is off; i.e., if P was full ($Mc3=1$) and P was not busy.

$$Mwt=(24)\ Tb1\ \overline{Dt}$$

Upon the issuance of M*wt*, the word in P is transferred to M. The presence of C53 gates the entire contents of the P-register by parallel shift to the M-register input gates, and the signal M*wt* enters these entire contents into the M-register (if $\overline{Jr}$). There is no Memory mod-generation, as in Instructions 21 and 70, when the word is transferred to the Memory.

If the P-register was not busy, E*m*24 resets M*c*3 at *t*9, so that when this instruction is completed $\overline{Mc3}$ indicates that the P-register is empty; i.e., $$*\overline{Mc3}=Em24\ Pnbz$$

Had the P-register been full ($Mc3=1$), but busy, M*wt* would not have issued, and M*c*3 would not have been reset, but would continue to indicate that the P-register was full.

The signal E*nd* occurs unconditionally at *t*16. Time: 16 clock periods.

*Instruction 74: Transfer M to P (TMP)*

This instruction (FIG. 220) effects the transfer of the entire contents of a Memory location to the P-register. The address of the operand in Memory is specified in the address portion of the instruction. The transfer is made through the medium of the J-register.

The operand address is: 0000–3999 Memory.

The description of Instruction 21, coupled with the description to follow, is a complete description of Instruction 74.

The Initial Routine is unaltered. However, at *t*8 the additional signal, E*m*74, issues unconditionally; and the signal *D*t* issues conditionally.

E*m*74 is a Central Processor signal for preparing the P-Buffer controls to accept a word from the J-register. Either of two conditions may exist at *t*8 which would result in the setting of D*t*, and which would also prevent E*m*74 from preparing the P-register controls for the word transfer:

(1) If the P-register already contains data, the P-Buffer flip-flop $Mc3=1$.

(2) If the P-register is receiving data from the Control Typewriter or the Photoreader, or is sending data to the Control Typewriter, the P*bz* signal of the P-Buffer is present, indicating that the P-register is busy.

The D*t* flip-flop is set at *t*9, if M*c*3 or P*bz* is present at *t*8. The setting of D*t* indicates that this instruction "didn't take." Since the setting of D*t* does not stop the Central Processor, a function of the program is to interrogate D*t* with a DSW interrogation (Instruction 54).

If the P-register was not busy, E*m*74 sets M*c*3, so that when this instruction is completed $Mc3=1$ indicates that the P-register is filled.

$$*Mc3=Em74\ Pnbz$$

M*c*3 is therefore set at *t*9 and so remains when the instruction has concluded.

If the P-register is not busy, so that $Pnbz=1$ and $Pbz=0$, and if $Mc3=0$, the T*sc* flip-flop of the T*s*-counter of the P-Buffer will be set to 1 by E*m*74, at *t*9.

$$*Tsc=Em74\ Pnbz\ \overline{Mc3}$$

A summary of these effects is given in Table A.

TABLE A

| When E*m*74 issues, if: | | These flip-flops will be set: | |
|---|---|---|---|
| M*c*3 | P*bz* | T*sc* | M*c*3 |
| 0 | 0 | 1 | 1 |
| 0 | 1 | 0 | 0 |
| 1 | 0 | 0 | 1 |
| 1 | 1 | 0 | 1 |

Only in the first situation of Table A is the P-register loaded from the R-register. In the remaining situations *D*t* occurs, and the instruction is not effective. In the last two situations, P remains filled with the data therein when this instruction commenced.

When the T*s*-counter is set to 1 it will count from 2 to 7, to 0, whereupon it ceases to count. The T*s*-counter in turn, causes the T*sp* signal of the P-Buffer to issue for seven clock periods from *t*9–*t*15. Clock pulse drivers S*p* and *Cap* of the P-Buffer direct a serial shift of the contents of P, and of the contents of J1 to P7, for seven clock periods under the control of T*sp*. At *t*9 the operand is in the J-register in sequential order and at this time the signals SJ, S*p* and *Cap* commence. At *t*10 the first digit of the operand appears in P7. Six clock periods later, at *t*16, this operand has completed a ring shift-down in the J-register and has been entirely shifted to the P-register. This transfer of the operand from the J-register to the P-register is illustrated in Table B.

TABLE B

| | J7 | J6 | J5 | J4 | J3 | J2 | J1 | P7 | P6 | P5 | P4 | P3 | P2 | P1 |
|---|---|---|---|---|---|---|---|---|---|---|---|---|---|---|
| *t*9 | 0–7 | 0–6 | 0–5 | 0–4 | 0–3 | 0–2 | 0–1 | | | | | | | |
| *t*10 | 0–1 | 0–7 | 0–6 | 0–5 | 0–4 | 0–3 | 0–2 | 0–1 | | | | | | |
| *t*11 | 0–2 | 0–1 | 0–7 | 0–6 | 0–5 | 0–4 | 0–3 | 0–2 | 0–1 | | | | | |
| *t*12 | 0–3 | 0–2 | 0–1 | 0–7 | 0–6 | 0–5 | 0–4 | 0–3 | 0–2 | 0–1 | | | | |
| *t*13 | 0–4 | 0–3 | 0–2 | 0–1 | 0–7 | 0–6 | 0–5 | 0–4 | 0–3 | 0–2 | 0–1 | | | |
| *t*14 | 0–5 | 0–4 | 0–3 | 0–2 | 0–1 | 0–7 | 0–6 | 0–5 | 0–4 | 0–3 | 0–2 | 0–1 | | |
| *t*15 | 0–6 | 0–5 | 0–4 | 0–3 | 0–2 | 0–1 | 0–7 | 0–6 | 0–5 | 0–4 | 0–3 | 0–2 | 0–1 | |
| *t*16 | 0–7 | 0–6 | 0–5 | 0–4 | 0–3 | 0–2 | 0–1 | 0–7 | 0–6 | 0–5 | 0–4 | 0–3 | 0–2 | 0–1 |

The signal S*jp* of the P-Buffer is normally present and gates the transfer of J1 to P7. The actual transfer of data into P7 is controlled by *Cap* clock signals applied to P7.

The normal mod-check of the instruction and operand take place.

The signal E*nd* occurs unconditionally at *t*16. Time: 16 clock periods.

*Instruction 59: Photoreader of Control Typewriter In or Out (PIO)*

This instruction (FIG. 206) effects the transfer of one data word between the P-register and either the Photoreader or the Control Typewriter.

The A-register contents are: 0ZYX. The three least significant digits of the A-register contents constitute a control function, which determines the mode of operation to be executed by the P-Buffer.

The descriptions of Instructions 21 and 74, coupled with the description to follow, is a complete description of Instruction 59.

The Initial Routine is unaltered. However, at *t*3 one additional signal, E*m*59, issues unconditionally; and the signal D*t* issues conditionally.

The signal E*m*59 of the Central Processor sets the P-Buffer mode control flip-flops to execute the selected operation, in accordance with the control function. The control function directs the type of data transfer to take place, and indicates the nature of the word to be transferred; as follows:

| Control function | Mode |
|---|---|
| Z1X | Transfer word in P-register to Control Typewriter. |
| Z2X | Transfer word from Control Typewriter to P-register. |
| Z3X | Transfer word from Photoreader to P-register. |
| ZY1 | Word concerned is single numeric. |
| ZY2 | Word concerned is first half of double-precision word. |
| ZY3 | Word concerned is second half of double-precision word. |
| ZY4 | Word concerned is alphanumeric. |
| OY3 | Generate Tab putaway character. |
| IY3 | Generate Car Ret restoring character. |

The P-Buffer mode control flip-flops are set in accordance with the control function and direct the succeeding operation of the P-Buffer and its associated Photoreader and Control Typewriter independently of the Central Processor. Therefore, although this instruction requires but eight clock periods of the time of the Central Processor, the P-Buffer controls require considerably more time to execute the directed operation. The functioning of the P-register, in the event that the instruction is effective, is described in detail in the section entitled "P-Buffer Operation."

If the P-register is busy at *t*3, if it is full and the control function dictates that data be transferred to the P-register, or if it is empty and the control function dictates that data be transferred from the P-register, the instruction is ineffective, and the D*t* flip-flop sets to indicate that this instruction "didn't take." The conditions under which the D*t* flip-flop is set, for this instruction, are given by:

$$*Dt=(59)\ Ta3\ (Pbz+Mc3\ A22+\overline{Mc3}\ \overline{A22})$$

where P*bz* is a P-Buffer signal indicating that the P-register is busy, and M*c*3 is a P-Buffer signal, which when 1 at this time, indicates that the P-register is full. Since the setting of D*t* does not stop the Central Processor, a function of the program is to interrogate D*t* with a DSW interrogation (Instruction 54).

The signal E*nd* occurs unconditionally at *t*8. Time: 8 clock periods.

*Instruction 52: Ring Bell or Gong (RNG)*

This instruction (FIG. 201) initiates one of two audible indications. One audible indication is the sound of a bell for approximately one second. The other audible indication is the sound of a gong, which continues until manually terminated.

The A-register contents are 000X. The LSD of the A-register contents is a control function which identifies the particular audible indication desired.

The description of Instruction 21, coupled with the description to follow, is a complete description of Instruction 52.

The Initial Routine is unaltered. However, additional signals are added from *t*1–*t*8 to accomplish this instruction.

If *A*11=1, a monostable multivibrator, Y*b*1, in the Central Processor, is triggered at T*a*3; as follows:

$$*Yb1=(52)\ Ta3\ A11$$

$\overline{IYb1}$, which issues in response to $\overline{Yb1}$, locks the contacts of a relay in the Control Console, which thereby causes a gong to sound repeatedly until it is manually terminated by the "Release Gong" button on the Control Console.

If *A*12=1, the monostable multivibrator, Y*b*2, in the Central Processor, is triggered at T*a*3; as follows:

$$*Yb2=(52)\ Ta3\ A12$$

$\overline{IYb2}$, which issues in response to $\overline{Yb2}$, actuates a bell in the Control Console, which continues to ring for approximately one second.

If both A11 and A12 are equal to 1, both the gong and the bell will sound.

The signal E*nd* occurs unconditionally at *t*8. Time: 8 clock periods.

AUTOMATIC SUBROUTINES

In addition to the automatic routines which are executed as complete instructions; i.e., 25, 26, 51, 55 and 56, automatic subroutines occur if an instruction word contains certain data. These data are contained in the 4 and 5-bit positions of the condition digit and in the 4 and 5-bit positions of the 4th digit. (Since the largest addressable memory location is 3999, the 4 and 5-bit positions of the 4th digit position of an instruction are not employed for the memory address.)

These subroutines are initiated by the following data in an instruction:

(1) *Sign bit.*—If the 4-bit position of the condition digit contains a 1, a B-subroutine is entered following *t*2 of an instruction. In the B-subroutine, the contents of B are added to the address in A. The 4-bit position of the condition digit is termed the sign bit.

(2) *Designator bit.*—If the 5-bit position of the condition digit contains a 1, the address of the instruction is increased by 2 each time the instruction is executed. The 5-bit position of the condition digit is termed the designator bit.

(3) *Augmentor bit.*—If the 5-bit position of the 4th digit contains 1, the numeric contents of the word in Memory whose location is specified by the address of the instruction is increased by 2. The 5-bit position of the 4th digit of an instruction is termed the augmentor bit.

(4) *Breakpoint bit.*—If the 4-bit position of the 4th digit is equal to 1, the Central Processor will be forced to halt if the SELECTIVE HALT switch is on. The 4-bit position of the 4th digit of an instruction is termed the breakpoint bit.

*B-Subroutine*

This subroutine (FIG. 238) causes the address portion of the instruction currently being executed to be added to the contents of the B-register, and the resulting sum to be shifted to the I-register to become the effective address. The contents of B are left unchanged.

The description of Instructions 27 and 72, coupled with the description to follow, is a complete description of the B-subroutine.

This subroutine takes place during the Initial Routine. At *t*2 of the instruction being executed, the sign bit of the contents of the J-register is sampled in J*s* and if this bit is equal to 1, the B-subroutine interrupts the Initial Routine. The B-subroutine is initiated when the signal *B*b* issues, and a special five clock period timing sequence is entered by resetting T*a*. At the end of these five clock periods, T*a* is again set, *t*3 of the Initial Routine is entered, and the instruction continues. The resetting of T*a* and the setting of B*b* is given by:

$$*Bb = *\overline{Ta} = Ta2\ Klm2\ Js\ (\overline{Jr}\ \overline{Jw}\ \overline{Jm20})$$

The presence of J*s* inhibits the setting of T*a*3. The presence of B*b* enables the issuance of the signals SBB and SB for four clock periods. The signals SB and SBB cause a complete ring shiftdown of the contents of B. B*b* also enables the issuance of SA, SVA, and V*ct*. SA shifts the original address of the present instruction from the A-register to the V*a* input AND-gates of the Arithmetic Unit. The four digits of B are transferred to the V*b* input AND-gates of the Arithmetic Unit. One clock period after the first digits of A and B enter the Arithmetic Unit, the Arithmetic Unit output signal issues, representing the sum of the two input signals. In the third period of the B-cycle, the first digit of the new address is gated into the A-register by SVA. The MSD of the new address is in the A-register at *t*3, following the B-subroutine. The signal V*ct* enables the numeric inputs to the carry flip-flop V*ct*.

The presence of B*b* alters the sequence of the T-counter, so that following its state of 111, it changes to 011, which is the required state for T*a*3. When the T-counter reaches the 111 state, B*b* is reset, and T*a* and T*a*3 are set, so that the next clock period is *t*3 of the Initial Routine.

Any overflow that occurs during the addition is ignored.

The table below illustrates the summation and the transfer of the sum to the B-register.

| | A4 | A3 | A2 | A1 | B4 | B3 | B2 | B1 | V. |
|---|---|---|---|---|---|---|---|---|---|
| *t*2 | A-4 | A-3 | A-2 | A-1 | B-4 | B-3 | B-2 | B-1 | ------ |
| $\overline{Tp}$ Tq Ts | A-4 | A-3 | A-2 | A-1 | B-4 | B-3 | B-2 | B-1 | ------ |
| Tp $\overline{Tq}$ $\overline{Ts}$ | ------- | A-4 | A-3 | A-2 | B-1 | B-4 | B-3 | B-2 | S-1 |
| Tp $\overline{Tq}$ Ts | S-1 | ------ | A-4 | A-3 | B-2 | B-1 | B-4 | B-3 | S-2 |
| Tp Tq $\overline{Ts}$ | S-2 | S-1 | ------ | A-4 | B-3 | B-2 | B-1 | B-4 | S-3 |
| Tp Tq Ts | S-3 | S-2 | S-1 | ------ | B-4 | B-3 | B-2 | B-1 | S-4 |
| *t*3 | S-4 | S-3 | S-2 | S-1 | | | | | |

where $S-1=(A-1)+(B-1)$
$S-2=(A-2)+(B-2)$
$S-3=(A-3)+(B-3)$
$S-4=(A-4)+(B-4)$
("+", here, indicates addition)

No Arithmetic Unit Mod-check is made. However, *A*ac* issues if the V*a* or V*b* inputs are non-numeric during the presence of B*b*, or if the Arithmetic Unit output is non-numeric at any time.

*Designator Bit Subroutine*

If the designator bit of an instruction word is equal to 1, the address portion of that instruction is increased by 2 each time the instruction is executed. This increase by 2 occurs just before the instruction is restored to the Core Memory, and is effected in the Memory. This change is directed by the signal *A*tm*, which is initiated if the designator bit is on when the signal E*nd* occurs, immediately before the instant instruction is executed. The logic for the issuance of *A*tm* is:

$$*Atm = Klm2\ Md\ End\ \overline{M3g}\ \overline{Ht1}\ (\overline{Jr}\ \overline{Jw}\ \overline{Jm20})$$

The flip-flop A*tm* sets at *t*1, whereupon the Memory receives the signal to increase the contents of the M-register by 2. Since this instruction word, however, is already in the J-register, the operand which the instant instruction obtains from Memory is that located at the original address.

For example, if the designator bit is equal to 1 in Instruction 85, "Transfer M to FULL," and the address portion represents 1000, the contents of memory addresses 1000 and 1001 will be placed in the L and R-registers the first time the instruction is executed. The second time the instruction is executed the contents of memory addresses 1002 and 1003 will be placed in the L and R-registers, etc.

Each time this address modification takes place, the signal A*tm* sets the D2 flip-flop, which remains set at the end of the instruction being executed, if there is no carry to the 100's position in the M-register. Therefore, if the two least significant digits of the instruction address are 98, the issuance of A*tm* restores them to 00 and resets D2. Thus, in the preceding example, the memory address will be successively increased to 1098, after which it will return to 1000.

The signal M*of* issues from Memory when the addition of 2 to the words stored in the M-register causes a carry from the 10's digit. This signal serves to reset the flip-flop D2. The logic by which A*tm* sets D2 and an overflow resets D2 is:

$$*D2 = \overline{Tq}\ Ts\ Atm;\ *\overline{D2} = Mof\ Atm$$

Thus, by means of the designator bit, an instruction may automatically have its address stepped through a sequence of 100 words in the Memory. These 100 words constitute a block of information.

At the same time as the count of 2 is added to the two least significant digits, a count of 2 is subtracted from the mod-bits in the M-register to correct the total modulo-3. However, only a count of 1 is subtracted from the mod-bits if an overflow occurs.

*Augmentor Bit Subroutine*

If the augmentor bit of an instruction word is equal to 1, the numeric contents of the word located in Memory at the address specified in the address portion of the instruction is increased by 2 each time the instruction is executed. This increase by 2 is directed by the signal *A*tm*, which is controlled by the augmentor bit. However, the augmentor bit is only effective for instructions in the 20, 30, 70, and 80 decades. The logic for issuance of *A*tm* is:

$$*Atm = C62\ Ta8\ A44\ \overline{Hst}$$

The signal *A*tm* issues at T*a*8, if the augmentor bit is , and the A*tm* flip-flop sets at *t*9. When the A*tm* flip-op is on at *t*9, the numeric value of the operand is in-:eased by 2 before it is restored to the Core Memory. lowever, inasmuch as the operand is already present in ıe J-register at *t*9, the current instruction is executed on ıe original value of the operand.

For example, if the augmentor bit is equal to 1 in In-:ruction 75, "Transfer M to R," and the address portion ; 1000, the operand at address 1000 is transferred to R ı its original form the first time the instruction is ex-:uted. If this operand has the original numeric value 53000, the first time this Instruction 75 is executed, the umber 853000 will be placed in the R-register. The :cond time the instruction is executed 853002 will be laced in the R-register, etc.

As in the subroutine for the designator bit, the D2 ip-flop is turned on, and stays on, each time the instruc-ion is executed, until the addition of 2 causes a carry rom the 10's digit position of the M-register contents; /hereupon, the addition is made to the least significant igits of the word in M, but the D2 flip-flop is turned off ıefore the end of the instruction.

Mod-bit correction is the same as described for the lesignator bit subroutine.

*Breakpoint Bit Subroutine*

If the breakpoint bit of an instruction word is equal o 1, the Central Processor halts if the Control Console SELECTIVE HALT switch is on. The logic for initiat-ng the halt is given by $*Ht1=Ta3\ A43\ Ksh$.

One use for this subroutine is to provide periodic ıtops in the program to facilitate checking prior to op-:rational use of the program. The breakpoint bit is :qual to 1 if it is provided in an instruction word in :he program, if an addition occurs using the instruction n the Arithmetic Unit, or if a B-subroutine increases :he address portion of an instruction to 4000–4999.

The "Selective Halt" section provides details of the ıalt operation.

HALTS

There are six types of operations which will cause the Central Processor to halt. These are:

(1) Manual Halt
(2) Programmed Halt (Instruction 53)
(3) Branch Halt (Instruction 60)
(4) Selective Halt
(5) Address Halt
(6) Alarm Halt In each halt operation the present instruction is completed, the next instruction word is placed in the instruction register, and the Central Processor halts at *t*3 following the termination of the instruction during which the halt operation was initiated. The address portion of the instruction in the I-register is also in the A*w*-register and the address of the instruction next following that in the I-register is in the N-register when the Central Processor halts.

The Central Processor is halted by the suppression of the output signals of the clock pulse drivers CDA11, 13, 14 and SJ. This prevents the functioning of the timing circuit, the J-register shifting, and the mod-checking circuitry. Only CDA12 remains active, to allow resetting of the H*t*1 and H*t*2 flip-flops, and the setting of the T*a*3 flip-flop.

All halts yield precedence to a B-subroutine, or to the presence of a tape reading or tape writing. Each of these priority operations must be completed before H*t*2 can set to commence completion of the halt sequence. For details of the halt operation, reference should be made to Instruction 53.

*Manual Halt*

This halt operation is initiated by depression of the HALT button on the Control Console, which yields the signal K*hb*, or by depression of the H key on the Control Typewriter, which yields the signal K*h*. The issuance of K*hb* or K*h* initiates a typical halt operation, such as is described briefly in the preceding section entitled "Halts," and in more detail in the description of Instruction 53. The manual halt operation commences with the first issuance of *H*t*1; as follows:

$$*Ht1=(Kh+Khb)\ Tp\ \overline{Ts}\ \overline{Ht2}$$

The sequence of the operation then proceeds as described for Instruction 53. The purpose of the inhibiting signal $\overline{Ht2}$ in the above equation is to prevent the second issuance of *H*t*1 during the remainder of the instruction in which it first issued. *H*t*1 can only then issue at the next T*a*2.

*Selective Halt*

This halt operation takes place if the Control Console SELECTIVE HALT switch is on (yielding the signal K*sh*), when an instruction bearing the breakpoint bit is executed (see the section entitled "Breakpoint Bit"). The halt sequence commences with the first issuance of *H*t*1; as follows:

$$*Ht1=Ta3\ A43\ Ksh$$

Following the first issuance of *H*t*1, the normal halt operation occurs, as is described for Instruction 53 and in the section entitled "Halts." Since T*a*3 is required for *H*t*1, the signal *H*t*1 cannot again issue during the instruction in which it first issued.

*Address Halt*

This halt operation takes place if the Control Console ADDRESS HALT switch is on (yielding the signal A*h*), when an instruction bearing the address to which the Address Halt selector switches (FIG. 19) are set is in the A-register. At this time, the signal K*ah* issues. The halt sequence is initiated by the signal *H*t*1; as follows:

$$*Ht1=Kah\ Ah\ Mca\ \overline{Ht2}$$

Following the issuance of *H*t*1, the normal halt operation occurs, as is described for Instruction 53 and in the section entitled "Halts."

*Alarm Halt*

This halt operation takes place by the setting of one of the alarm flip-flops. The halt sequence commences with the first issuance of the signal *H*t*1; as follows:

$$*Ht1=(Aac+Ai+Amm+Ate+Efp+Atd)\ Tp\ Kho2\ \overline{Ht2}$$

The sequence of the halt operation, once *H*t*1 first issues, is similar to that described for Instruction 53 and in the section entitled "Halts."

The conditions under which the alarm signals A*ac*, A*i*, A*mm*, A*te*, E*fp* and A*td* issue, are described in the section entitled "Alarms."

The signal K*ho*2 is normally present, except when the ALARM HALT OVERRIDE switch on the Control Console is on. With $Kho2=1$, the Central Processor halts upon the occurrence of any one of the alarm signals. Turning on the ALARM HALT OVERRIDE switch suppresses, K*ho*2 and the Central Processor continues its normal instruction sequence without interruption, despite the issuance of an alarm signal. The ALARM HALT OVERRIDE switch is only effective, however, when the KEY switch is unlocked, so that the signal K*ey*2 is in the 0-state.

ALARMS

Many monitoring facilities are built into the system to detect the presence of certain malfunctions, or to detect the absence of certain necessary functions. When these malfunctions or non-functions occur, an alarm flip-flop or sub-alarm flip-flop sets to indicate that the malfunction or non-function has occurred. When an alarm flip-flop (which may also be termed a full-alarm flip-flop) sets it initiates a normal system halt sequence, as designated in the preceding section "Alarm Halt." When a sub-alarm flip-flop sets, the system does not halt, but instead it is intended that the operation of the sub-alarm flip-flop in its 1-state will be normally detected by executing an appropriate Instruction 54. These interrogations cause the resetting, or clearing, of the corresponding sub-alarm flip-flops. However, if certain operations are attempted before a sub-alarm flip-flop is cleared, a full-alarm flip-flop will be set and thereby halt the system. Each alarm and sub-alarm flip-flop, when on, causes the illumination of a corresponding indicator (not shown) on the Control Console.

*Sub-Alarms*

The flip-flops *Anpd*, *Ers*, and *Ews* are the sub-alarm flip-flops. It is a function of the program to interrogate each of these flip-flops with an appropriate Instruction 54 to determine if they are set, and in accordance with such tests to determine the proper action to be taken. However, if certain instructions are executed with any one of these three flip-flops on, the full-alarm flip-flop *Ate* will be set and the system will halt. The conditions under which the sub-alarm flip-flops are set are as follows:

*Anpd*: No Pocket Decision Sub-Alarm—This flip-flop sets if:

(*a*) No pocket designation is transmitted from the Central Processor to the Sorter Control Unit by the time the Sorter Control Unit read-out signal occurs, following the reading of data from a document, and (*b*) The Central Processor transmits a forbidden digit to the Sorter Control Unit.

*Ers*: Read Sub-Alarm—This flip-flop sets if:

(*a*) A row or parity column error exists in a data word received by the Read Buffer from magnetic tape, (*b*) The Read Buffer has not been unloaded when the next word received from magnetic tape or the Character Reader is ready to be inserted therein; i.e., the Central Processor is late in executing a Read Buffer operation, and (*c*) No data is transmitted into the Read Buffer from a tape block.

*Ews*: Write Sub-Alarm—This flip-flop sets if:

(*a*) The Write Buffer has not been loaded before another word is to be transmitted to the Tape Handler; i.e., the Central Processor is late in executing a Write Buffer operation, and (*b*) The Write Buffer has not been unloaded when the Central Processor is ready to enter another word therein (during a Write Buffer operation); i.e., the Central Processor is attempting to execute a double load into the Write Buffer.

*Full Alarms*

The flip-flops *Aac*, *Ai*, *Amm*, *Atd*, *Ate*, and *Efp* are the full-alarm flip-flops. When any one of these flip-flops sets, the system halts after completion of the instruction in which the flip-flop is set, unless the ALARM HALT OVERRIDE switch on the Control Console is actuated. However, the *Ai* flip-flop, which, when set, indicates an improper instruction word, terminates the current instruction by causing issuance of the *End* signal in the last clock period of the T-cycle in which the *Ai* flip-flop is set; as follows:

$$End = Ai\ \overline{Tp}\ \overline{Tq}\ \overline{Ts}$$

After the system halts, the flip-flop which is on is reset by depressing the appropriate clearing button on the Control Console. The system may then be restarted after correction of the malfunction or non-function. The conditions under which the full-alarm flip-flops are set are as follows:

*Aac*: Arithmetic Alarm—This flip-flop sets if:

(*a*) The Arithmetic Unit output digits (from V-output gates) are non-numeric; except if $M3g=1$, during which time mod-bits are generated for the R contents and the Arithmetic Unit output digits are not employed, (*b*) Any input digit is non-numeric during execution of an operation when the Arithmetic Unit is actually performing an arithmetic operation and its output signals are being used; except that non-numeric digits to the V*a* input gates do not set this alarm flip-flop during the "Hash-Add" variation of Instruction 82. This flip-flop also sets if there is a non-numeric digit input to the V*a* input gates during execution of Instruction 28, wherein the contents of a designated memory location are transmitted through the Arithmetic Unit to the B-register, and (*c*) The mod-comparator signal, M*c*, issues during an arithmetic operation to indicate that the mod-comparison has failed.

*Ai*: Improper Instruction Word Alarm—This flip-flop sets if:

(*a*) There is an attempt to count down from 0 the contents of the A1 flip-flops of the A-register; except during the 90 group of instructions, wherein both the A1 and A2 flip-flops are counted down together, (*b*) The word inserted in the instruction register is alphanumeric, (*c*) The command portion number in the C-register has no significance and thereby is incapable of directing any intelligent system operation, (*d*) The A-register contains non-numeric digits, except in the least significant digit position, which is often employed to store a control function; i.e., during an Instruction 54, 57, 65, 66, 68, etc., and (*e*) There are non-numeric digits in the C-register.

*Amm*: Memory Alarm—This flip-flop sets if:

(*a*) The total modulo-3 of an instruction word or numeric operand transferred from Memory to the J-register is not +1, and (*b*) If any digit in the numeric portion of an instruction word or operand word entering the J-register is the forbidden digit.

*Atd*: Tape Transport Disabled Alarm—This flip-flop sets if the Tape Handler addressed during an Instruction 65–68 is disabled. This flip-flop is in the Tape Control Unit and is not illustrated in the drawings. It is sufficient for the description of this invention that the *Atd* output signal of this flip-flop be shown as effecting the setting of the halt flip-flop, H*t*1.

*Ate*: Peripheral Error Alarm—This flip-flop sets if:

(*a*) The *Amm* flip-flop is set during a program-interrupt or instruction-interrupt type of Write Buffer operation, thereby denoting that the memory error which has occurred was not related to the program being processed, but was in the data transferred to the magnetic tape or Printer during the interrupt operation. (During the interrupt type of Write Buffer operation, the word going to the Write Buffer also goes to the J-register where it is mod-checked, if it is not alphanumeric), (*b*) The *Ers* sub-alarm flip-flop is on when a new "Read Magnetic Tape or Character Reader" (Instruction 65) command is given, (*c*) The *Ews* sub-alarm flip-flop is on when a new "Write Magnetic Tape or Load Printer" (Instruction 66 or 68) command is given, (*d*) The *Anpd* sub-alarm flip-flop is on when a new "Read Character Reader" (Instruction 65) command is given, and (*e*) The read demand flip-flop U*r* is set, but the R*eb* flip-flop is off; or if the write demand flip-flop L*w* is set, but the W*eb* flip-flop is off.

E*fp*: Error, P-Buffer Parity Alarm—This flip-flop sets if an error is detected in the parity configuration of the 7-bit character received by the P-Buffer from the Control Typewriter or the Photoreader.

OPERATIONS FROM HALT MODE

*Original Insertion of Instructions and Operands in Memory*

To commence data processing after power is applied to the system, the Control Console TOTAL CLEAR button is depressed. Depressing this button causes the signal K*tcc* to issue (FIG. 19). The signal K*tcc* clears the entire system and provides initial conditions in the Central Processor.

One of these initial conditions is the halt mode, wherein the H*t*1 and H*t*2 flip-flops are in their 1-states, and the timing circuit is in the *t*3-state. Another initial condition provided by the TOTAL CLEAR button is that of setting the instruction word for Instruction 65, with an address portion of 0000, into the I-register.

Instruction 65, when executed, prepares the system to read one block of data from magnetic tape into Memory. This block of data comprises the first sequential instructions in the program to be followed and the corresponding operands. (See Instruction 65 description.) When the Control Console COMPUTE button is subsequently depressed, a tape Read operation commences and accompanies the normal program sequence with Read-Parallel and Read-Interrupt operations.

Since the address portion of the instruction word in the I-register is 0000, following clearing, the first word in the block of data received from magnetic tape is inserted in Memory at the 0000 location. Since the address in N is 0000, following clearing, the normal program sequence will be initiated from memory location 0000. Therefore, memory location 0000 will contain the first instruction of the program transferred from magnetic tape to Memory.

The effect of depressing the COMPUTE button is described in the next subsection.

The original insertion of instructions and operands may also be effected by the P-Buffer and the Control Typewriter or Photoreader executing a corresponding "Control Typewriter load Memory operation" or "Photoreader load Memory operation," as described in the subsections to follow.

*Starting System From Halt Mode*

With the system in the halt mode, this operation is executed to place the system in the normal data processing mode, wherein instructions are executed in normal sequence. In the halt mode, the Central Processor is in the *t*3 timing mode, both of the halt flip-flops H*t*1 and H*t*2 are in the 1-state, and the clock drivers CDA11, 13, 14 and SJ are gated off (see Instruction 53). This operation is initiated by resetting both halt flip-flops, which occurs by depressing the COMPUTE button on the Control Console, or by depressing the Enable key, followed by the A-key on the Control Typewriter. Depressing the COMPUTE button will cause the Control Console signal K*cb*, which is normally in the 1-state, to enter the 0-state. Following enabling, depressing the A-key will cause the Control Typewriter signal K*a*, which is normally in the 1-state, to enter the 0-state. Depressing the COMPUTE button also causes the Console Common signal K*bc* to enter the 1-state, provided the signal *Key*=1 (i.e., the KEY switch is unlocked). Depressing the enabled A-key also causes the Common Control Typewriter signal K*cf* to enter the 1-state.

The occurrence of either one of the signals K*bc* or K*cf* when the system is in the halt mode causes the setting of the Manual Single-Cycle flip-flop M*sc*1; as follows:

$$*Msc1=\overline{Msc1}\ \overline{Msc2}\ Ht1\ Ht2\ (Kcf+Kbc)$$

When either one of the signals K*cb* or K*a* is in the 0-state, the setting of M*sc*1 to the 1-state causes the signal I*com* to enter the 0-state; as follows:

$$Icom=Ka\ Kcb+\overline{Msc1}$$

When the signal I*com* enters the 0-state, both halt flip-flops are reset and the timing circuit flip-flop T*a*3 is set; as follows:

$$*\overline{Ht1}=*\overline{Ht2}=*Ta3=\overline{Icom}$$

With H*t*1 and H*t*2 off, the clock drivers CDA11, 13, 14 and SJ resume delivering clock signals, and the instruction then present in the I-register is executed. This execution starts at *t*3, the timing mode in which the Central Processor was halted. The address of the next-instruction is in the N-register, so that the normal instruction sequence commences when this address is placed in the A-register.

Since K*bc* will not issue if the signal K*ey* is not equal to 1, this operation cannot be directed from the Control Console, unless the KEY switch is unlocked. The Control Typewriter is not so inhibited.

It is the function of the Manual Single-Cycle flip-flops M*sc*1 and M*sc*2 to permit only a single specified operating mode to take place when the corresponding Control Console button or Control Typewriter key is depressed. Thus, when the COMPUTE button is depressed, only one starting operation may be executed until the button is released. During the time the button is depressed, if the Central Processor once again halts, it will not restart. This is because the M*sc*1 flip-flop is only in the 1-state, to enable I*com* to go to 0, for one clock period. M*sc*1 is reset and M*sc*2 is set in the clock period next following that in which M*sc*1 was set; as follows:

$$*\overline{Msc1}=*Msc2=Msc1$$

As shown in the above equation for *M*sc*1, M*sc*1 cannot again be set until M*sc*2 is restored to 0. This occurs only when the button or key which initiated the operation is released, so that the corresponding signal returns to its 1-state; as follows:

$$*\overline{Msc2}=Ka\ Ks\ Kz\ Kcb\ Ksb$$

Therefore, as seen by the equations immediately above, when one of a specified group of buttons on the Control Console or keys on the Control Typewriter is depressed, M*sc*1 enables the selected operation to occur only once while the button or key is depressed.

*Single-Cycle*

With the system in the halt mode, this operation causes the Central Processor to execute the instruction then in the I-register, and to halt immediately thereafter with the next sequential instruction in the I-register. The description of the preceding section "Starting from Halt Mode," coupled with the description to follow, is a complete description of the Single-Cycle operation. Unlike the Starting from Halt Mode, this operation is initiated by resetting only the H*t*2 flip-flop.

The H*t*2 flip-flop is reset by depressing the SINGLE-CYCLE button on the Control Console, or by depressing the Control Typewriter Enable key, followed by the S-key on the Control Typewriter. Depressing of the SINGLE-CYCLE button will cause the Control Console signal K*sb*, which is normally in the 1-state, to enter the 0-state. Following enabling, depressing the S-key will cause the Control Typewriter signal K*s*, which is normally in the 1-state, to enter the 0-state. Depressing the SINGLE-CYCLE button also causes the Console Common signal K*bc* to enter the 1-state, provided the signal $Key=1$. Depressing the enabled S-key also causes the Common Control Typewriter signal $Kcf$ to enter the 1-state. As before, the occurrence of either one of the signals $Kbc$ or $Kcf$ when the system is in the halt mode causes the setting of the flip-flop $Msc1$.

When either one of the signals $Ksb$ or $Ks$ is in the 0-state, the setting of $Msc1$ to the 1-state causes the signal $Isin$ to enter the 0-state; as follows:

$$Isin=Ks\ Ksb\ (Kz+Atm)+\overline{Msc1}$$

When the signal $Isin$ enters the 0-state, the halt flip-flop $Ht2$ is reset and the timing flip-flop $Ta3$ is set; as follows:

$$*\overline{Ht2}=*Ta3=\overline{Isin}$$

With either $Ht1$ or $Ht2$ off, the clock drivers CDA11, 13, 14 and SJ resume delivering clock signals, and the instruction then present in the I-register is executed. This execution starts at $t3$, the timing mode in which the Central Processor was halted.

$Ht1$ is reset and $Ht2$ is set in the clock period next following that in which $Ht2$ was first reset; as follows:

$$*Ht2=*\overline{Ht1}=Tp\ Ht1\ \overline{Reb}\ \overline{Web}\ \overline{Bb}$$

Thus, as the instruction in the I-register is executed, the halt flip-flops $Ht1$ and $Ht2$ are in the state described in the preceding section "Manual Halt." $Ht1$ can only issue again at the next $Ta2$, whereupon the Central Processor again halts. However, during the execution of the instruction, the address of the next-instruction is transferred to A, and the Central Processor halts with the next-instruction in the normal sequence in the I-register.

Therefore, a series of Single-Cycle operations will execute, one instruction at a time, the normal instruction sequence.

The $Msc1$ and $Msc2$ flip-flops function as described in the preceding section to prevent more than one Single-Cycle operation from occurring while the SINGLE-CYCLE button or S-key is depressed.

The operation cannot be directed from the Control Console unless the KEY switch is unlocked. The Control Typewriter is not so inhibited.

*Zingle-Cycle*

With the system in the halt mode, this operation causes the Central Processor to execute the instruction then in the I-register, and to halt immediately thereafter with the I-register holding the instruction whose address is in the $Aw$-register. The description of the preceding section "Single Cycle," coupled with the description to follow, is a complete description of the Zingle-Cycle operation. This operation is similar to the Single-Cycle operation, except that the instruction present in the I-register when the Central Processor previously halted, is again present in the I-register at the termination of this operation.

The operation is initiated by depressing the Enable-key and then the Z-key, both on the Control Typewriter. Following enabling, depressing the Z-key will cause the Control Typewriter signal $Kz$, which is normally in the 1-state, to enter the 0-state. Depressing the enabled Z-key also causes the Common Control Typewriter signal $Kcf$ to enter the 1-state, and the signal $Kcf$ causes the setting of the flip-flop $Msc1$.

The signal $Kz$ causes the signal $Isin$ to enter the 0-state; as follows:

$$Isin=Ks\ Ksb\ (Kz+Atm)+\overline{Msc1}$$

provided the $Atm$ flip-flop is not set.

When the signal $Isin$ enters the 0-state, a modified Single-Cycle operation is initiated. When the signal $Kz$ goes to 0, the signal $IZc$ goes to 0, as follows:

$$IZc=Kz+\overline{Msc2}$$

This action causes the issuance of the clock driver signal XA$w$A at T$i$ as the instruction in the I-register is executed, as follows:

$$XAwA=\overline{IZc}\ Ti$$

At T$i$ time, the signal XNA is inhibited; as follows:

$$XNA=Ti\ \overline{Ur}\ \overline{Lw}\ \overline{Jm20}\ \overline{Jna}\ IZc\ Klm2\ \overline{Hsi}\ (C64+\overline{C61}+W3)$$

Therefore, the address of the instruction present in the Instruction-register when the Central Processor previously halted (see Instruction 53), is transferred to the A-register, rather than the address of the next sequential instruction. Consequently, when the Central Processor again halts, the instruction in the I-register will be the instruction that was present when the Central Processor previously halted.

One use for this operation is to permit halting the Central Processor, to insert any instruction or group of instructions in the I-register, to execute each instruction, after insertion with a Zingle-Cycle, and then to start the system once again and continue to execute instructions sequentially from the point in the normal instruction sequence where it halted.

Thus, this operation differs from the Single-Cycle operation, wherein an instruction in the normal sequence is skipped each time the Single-Cycle is executed.

As indicated above, the Zingle-Cycle is rendered ineffective if the $Atm$ flip-flop is on when the Z-key is depressed. This is because the instruction present in the I-register when the Central Processor halts with the $Atm$ flip-flop on may not be the same as the instruction present at the address location indicated in the $Aw$-register, since the address portion of an instruction is increased by 2 when it is restored to Memory if the $Atm$ flip-flop is on due to the designator bit of the instruction being equal to 1. Consequently, the instruction then present in the I-register would be lost if the Zingle-Cycle were executed.

*Recycle*

This operation is executed to cause the system to repeatedly execute an instruction in the I-register. The operation is effected by preventing the next-instruction address from being transferred to the N-register after it has been counted up by 1 (see Initial Routine). The operation is initiated by setting the RECYCLE switch on the Control Console to the ON position. When the RECYCLE switch is in the ON position, the signal $Kry2$, which is normally in the 1-state, will enter the 0-state, provided the signal $Key2=0$ (i.e., the KEY switch is unlocked). The signal XAN, which functions to transfer the next-instruction address to the N-register, is thereby inhibited; as follows:

$$XAN=Ta2\ (\overline{Jr}\ \overline{Jw}\ \overline{Jm20})\ \overline{Ai}\ Kry2$$

Thus, once the RECYCLE switch is placed in the ON position, the instruction at the memory location then designated in the N-register will be continuously transferred to the I-register and repeatedly executed. If the RECYCLE switch is in the ON position and the COMPUTE button is depressed (see section "Starting from Halt Mode"), the instruction then present in the I-register will be executed but once, and the next normal sequential instruction will be executed repeatedly until the RECYCLE switch is returned to the NORMAL position.

An example of the employment of this operation follows: An instruction which is to be executed repetitively is placed in Memory at the 0000 address, the system is cleared, and the RECYCLE switch is placed in the ON position. Since the address in N at this time is 0000, the desired instruction will be executed repeatedly.

*Manually-Controlled Operations Involving Sequential Memory Locations*

With the system in the halt mode four different operaons, which are directed by setting Control Console witches, involve sequential memory locations. Each of ıese operations is initiated by setting to the ON position ne of the following switches (FIG. 19): CONTROL YPEWRITER LOAD switch 350, PHOTOREADER OAD switch 351, MEMORY DUMP switch 352, or ECYCLE MANUAL switch 353. These operations ıay be performed only if the KEY switch 325, is unıcked, so that the K*ey* signal is in the 1-state and the *ey*2 signal is in the 0-state.

COUNT-UP OF INSTRUCTION ADDRESS PORTION

The function of repeatedly executing an instruction and ounting-up the address portion thereof is common to ll four of the operations involving sequential memory ocations.

For data processing from sequential programmed inıructions the K*lm*2 signal is normally in the 1-state and ıe K*lm*1 signal is normally in the 0-state (FIG. 19). ven after the KEY switch is unlocked these two signals ill continue unchanged until one of the four switches 50, 351, 352, or 353 is set to its ON position. With all f switches 350, 351, 352, and 353 in the OFF position, ıe AND-gate 354 delivers a 1 output signal, since each witch in the OFF position delivers a 1 signal to ANDate 354. The OR-gate 355 receives the 1 signal from ıND-gate 354, so that the K*lm*2 output signal of ORate 355 is in the 1-state. At this time, AND-gate 356 ; disabled by the 0 signal received on its input lead 357. herefore, the K*lm*1 output signal of AND-gate 356 is 0.

When any one of switches 350, 351, 352, or 353 is set ɔ its ON position, the corresponding signal delivered hereby to AND-gate 354 is a 0, so that the output sigal of AND-gate 354 is also a 0. Therefore, the K*lm*2 ignal is transferred to the 0-state. Simultaneously, the ctuated switch delivers a 1 signal on lead 357 to enable ıND-gate 356, and the K*lm*1 signal is transferred to the -state.

When $Klm1=1$ and $Klm2=0$, the instruction in the -register is retained therein, and the address portion of his instruction word is counted-up by 1 each time the nstruction is executed. This function is applicable to ıy instruction word in the I-register when K*lm*1 transers to the 1-state. When an instruction is executed unler these conditions, the next-instruction location in the N-register is not transferred to the I-register, because the ignal XNA is inhibited when T*i* occurs as the instruction s ready to terminate; as follows:

$$XNA=Klm2\ Ti\ \overline{Ur}\ \overline{Lw}\ \overline{Jm20}\ \overline{Jna}\ IZc\ \overline{Hst}\ (C64+\overline{C61}+W3)$$

Therefore, the instruction word in I remains unchanged when the signal E*nd* occurs. At *t*1, immediately followng E*nd*, execution of this same instruction commences ɔnce again. This time, however, the instruction addresses he next sequential location in Memory, because the sigıal C*au* occurs at *t*1 and counts-up the address portion ɔy 1. At *t*2, the transfer of the word in the J-register to he I-register is prevented by inhibiting XJI; as follows:

$$XJI=Klm2\ Ta2\ \overline{Hi1}\ (\overline{Jr}\ \overline{Jw}\ \overline{Jm20})$$

The word in J was obtained from the memory location specified by the instruction address portion existing when the preceding signal E*nd* occurred.

In order to insure that this instruction is not affected ɔy the words which are received in J during the Initial Routine, but are not employed, the signals *A*tm*, *A*i*, and *$\overline{Ta}$ and *B*b* are inhibited (see the respective secıions entitled "Designator Bit Subroutine," "Alarms" and "B-Subroutine"). The signal T*a*3 will not be disabled by any instruction word in J having $Js=1$. The signal *J*mg*1 issues at *t*1 to simulate an alphanumeric word in J, and, therefore, to prevent the setting of the A*mm* alarm flip-flop.

Therefore, when any one of the switches 350, 351, 352, or 353 is placed in the ON position, the instruction then in I is executed repeatedly and the address of this instruction is increased by 1 following each execution. The two instructions most useful under these conditions are Instruction 24, "Transfer P to M" and Instruction 74, "Transfer M to P." Instruction 24, in this type of operation, will place input words in sequential memory locations. Instruction 74, in this type of operation, enables reading out words from sequential memory locations.

CONTROL TYPEWRITER LOAD MEMORY OPERATION

In this operation, which is initiated with the system in the halt mode, the Memory receives words from the Control Typewriter and places them in sequential memory locations. The operation commences when the Control Console CONTROL TYPEWRITER LOAD switch 350 is turned on. The Control Typewriter single numeric input operation and Instruction 24, "Transfer P to M" are executed alternately. The single numeric input operation, described in the preceding "P-Buffer Operations" section, functions to transfer a word from the Control Typewriter tape or keyboard to the P-register. When this input operation is completed, Instruction 24 is automatically executed once to transfer the word from the P-register to Memory. Since the CONTROL TYPEWRITER LOAD switch is on, Instruction 24 remains in the I-register after it has been executed and the system again halts after the address portion of the instruction has been increased by 1. Therefore, upon the next execution of Instruction 24, the input word is transferred to the next sequential memory location. Each time Instruction 24 ends another Control Typewriter single numeric input operation automatically starts. Thus, this operation continues with input words from the Control Typewriter being stored in sequential memory locations.

The description of Instruction 24 and subsections entitled "Control Typewriter Input to P-register; Single Numeric Word" and "Register Type-In" from the section "P-Buffer Operations," coupled with the description to follow, is a complete description of this operation.

The two logical relationships which effect the automatic alternating between the Control Typewriter single numeric input operation and Instruction 24 are:

$$Pss=Klm1g\ Eod$$
$$*Mi1=Klm1g\ Ht1\ Ht2\ \overline{Mi1}$$

Thus, $Pss=1$ when the E*od* signal occurs at the conclusion of the Control Typewriter input operation, whereupon P*ss* initiates a single execution of Instruction 24. The signal *M*i*1 exists when the Central Processor again halts after executing Instruction 24, whereupon *M*i*1 initiates another P-Buffer input operation.

With the Central Processor in the halt mode, Instruction 24 in the I-register and the Control Typewriter ready to transmit data to the P-Buffer, this operation commences when the CONTROL TYPEWRITER LOAD switch 350 (FIG. 19) is placed in its ON position. The signal K*lm*1 is transferred to its 1-state and the signal K*lm*2 is transferred to its 0-state, whereby each Instruction 24, when executed, remains in I, and has its address portion increased by 1, as described in the preceding subsection. With the RECYCLE MANUAL switch 353 in the OFF position, the output signal K*lm*1*g* of AND-gate 358 transfers to the 1-state when the CONTROL TYPEWRITER LOAD switch is turned on. The signal K*lm*1*g* sets the P-Buffer flip-flop M*i*1 to the 1-state, in accordance with the preceding equation for *M*i*1. As described in the "Register Type-In" subsection, M*c*1 and M*c*2 are both transferred to the 1-state when M*i*1 becomes 1. (With the CONTROL TYPEWRITER LOAD switch on, both of the signals K*lmp* and K*lmd* are in their normal 1-state.) The setting of Mc1 and Mc2 to the 1-state triggers the P-Buffer into the Control Typewriter single numeric input operation described in the corresponding subsection.

Following insertion of a complete word into the P-register, the Control Typewriter input operation is terminated by a putaway character. Because this operation is conducted in the Mi1 $\overline{Mi2}$ mode, the P-Buffer halts with the input word in the P-register. When the end order flip-flop Eod is set to 1 during the operation-closing sequence, the signal Pss issues in accordance with the above equation. At this time, the Mc1, Mc2, and Mi1 flip-flops are reset.

The signal Pss initiates a single execution of Instruction 24 by resetting the Ht2 flip-flop; as follows:

$$*\overline{Ht2}=Pss$$

The direct resetting of Ht2 with the Pss signal has an effect similar to the issuance of Isin, as described in the "Single-Cycle" subsection. The system executes Instruction 24 once and then halts again. However, unlike the Single-Cycle operation, the Central Processor halts with Instruction 24 still in the I-register, but with the instruction address portion increased by 1.

The operation of transferring a word to the Control Typewriter from Memory has now been completed.

When the Central Processor halts, both Ht1 and Ht2 are again in the 1-state, the required logical combinations for the issuance of *Mi1 again occurs, Mi1 again sets, and the next Control Typewriter input operation occurs.

One deviation from the normal Control Typewriter input operation takes place. The Yeo one-shot is prevented from firing with Klm2=0; as follows:

$$*Yeo=Eos\ Mc1\ Klm2$$

Thus, the Eod flip-flop remains in the 1-state for only one clock period and, therefore, Pss issues for only one clock period, whereby Instruction 24 is executed but once following completion of the Control Typewriter input operation.

PHOTOREADER LOAD MEMORY OPERATION

In this operation the Memory receives words from the Photoreader and places them in sequential memory locations. This operation is similar to the preceding subsection, "Control Typewriter Load Memory Operation." The only major functional difference between the two operations is the source of input data to the P-register.

With the Central Processor in the halt mode, Instruction 24 in the I-register, and the Photoreader ready to transmit data to the P-Buffer, this operation commences when the PHOTOREADER LOAD switch 351 (FIG. 19) is turned on. In a manner similar to that described in the preceding subsection, the signal Klm1g issues and sets the Mi1 flip-flop, which, in turn, sets Mc2. The PHOTOREADER LOAD switch also transfers the signal Klmp, which is normally in the 1-state, to the 0-state. The Klmp signal prevents the setting of the mode control flip-flop Mc1; as follows:

$$*Mc1=Klmp\ \overline{Mc1}\ (Mi1+Mi2)\ \overline{Eod}$$

The setting of the Mc2 flip-flop, but not the Mc1 flip-flop, triggers the P-Buffer into the Photoreader single numeric input operation described in the corresponding subsection.

Following insertion into the P-register of a complete word from the Photoreader, the input operation is terminated by a putaway character. The resulting Pss signal triggers an Instruction 24, which transfers the word in P to the Memory. The operation then continues with the alternate execution of the Photoreader single numeric input operation and Instruction 24.

DUMP MEMORY OPERATION

In this operation, which is initiated with the system in the halt mode, the Memory transmits words from sequential memory locations to the Control Typewriter. The operation commences when the MEMORY DUMP switch 352 (FIG. 19) is turned on. Instruction 74, "Transfer M to P," and the Control Typewriter single numeric output operation are executed alternately. Instruction 74 transfers a word in Memory to the P-register. Following the single execution of Instruction 74, the instruction remains in the I-register when the system halts, but its address portion has been increased by 1. When Instruction 74 terminates, the Control Typewriter output operation automatically starts, and transfers the word in the P-register to the Control Typewriter. When this output operation is completed, Instruction 74 occurs again automatically. Thus, words from sequential locations in Memory are transferred to the Control Typewriter.

The description of Instruction 74 and the subsections entitled "Control Typewriter Output from P-register; Single Numeric Word" and "Register Type-In" from the section "P-Buffer Operations," coupled with the description to follow, is a complete description of this operation.

As in the Load Memory operations described in the immediately preceding subsections, the two logical relationships which effect the automatic alternating of Instruction 74 and the Control Typewriter output operation are:

$$Pss=Klm1g\ Eod$$
$$*Mi1=Klm1g\ Ht1\ Ht2\ \overline{Mi1}$$

With the Central Processor in the halt mode, Instruction 74 in the I-register, and the Control Typewriter ready to receive data from the P-Buffer, the operation commences when the MEMORY DUMP switch 352 is placed in its ON position. In the manner described previously, the signal Klm1 is transferred to its 1-state, the signal Klm2 is transferred to its 0-state, and the signal Klm1g issues to set the Mi1 flip-flop, in accordance with the preceding equation. The MEMORY DUMP switch also transfers the signal Klmd, which is normally in the 1-state, to the 0-state. The Mi1 signal sets the Mc1 flip-flop. The Klmd signal prevents the setting of the mode control flip-flop Mc2; as follows:

$$*Mc2=Klmd\ \overline{Mc2}\ (Mi1+Mi2)\ \overline{Eod}$$

The setting of the Mc1 flip-flop, but not the Mc2 flip-flop, triggers the P-Buffer into the Control Typewriter single numeric output operation described in the corresponding subsection.

Following transmittal of the contents of the P-register to the Control Typewriter, these contents having no significance during this first sequence, the Control Typewriter output operation is terminated by the automatic generation of a putaway character by the P-Buffer. When the end order flip-flop Eod is set to 1 during the operation-closing sequence, the signal Pss issues in accordance with the above equation. At this time, Mc1 and Mi1 are reset.

The signal Pss initiates a single execution of Instruction 74, by resetting Ht2; as follows:

$$*\overline{Ht2}=Pss$$

The direct resetting of Ht2 by the Pss signal has an effect similar to the issuance of Isin, as described in the "Single-Cycle" subsection. The system executes Instruction 74 once to transfer the next sequential word in Memory to the P-register, and then halts again. The Central Processor halts with Instruction 74 still in the I-register, but with the instruction address portion increased by 1.

When the Central Processor halts, both Ht1 and Ht2 are again in the 1-state, the required logical combination for the issuance of *Mi1 again occurs, Mi1 again sets, and the next single numeric output operation occurs.

As described in the preceding subsection, the *Yeo* flip-flop is inhibited from firing, so that the *Eod* flip-flop remains in the 1-state for but one clock period.

The *Klmd* signal is also employed to inhibit the *Ics6* signal when $Tc=0$; as follows:

$$Ics6=Cinr\ (Tc=0)\ Mc3\ Gm2\ Klmd$$

When $Tc=0$, the automatic generation of the putaway character takes place. As was described in the subsection, "Control Typewriter Output From P-Register; Second Half Double-Precision Word," the signal *Gm2* is set by the A-register flip-flop A31 being in the 1-state. This would cause the P-Buffer to generate a Car Ret putaway character, rather than the normal Tab putaway character. In the instant operation, the instruction address portion might require setting the A31 flip-flop. Therefore, *Klmd* inhibits the generation of the Car Ret putaway character.

COUNT-UP RECYCLE OPERATION

In this operation, which is initiated with the system in the halt mode, the instruction in the I-register is repeatedly executed and the address portion thereof is increased by 1 following each execution. The operation commences when the Control Console RECYCLE MANUAL switch 353 is turned on. The signal *Klm2* is transferred to its 0-state and the signal *Klm1* is transferred to its 1-state. The signal *Klm1g* is inhibited, since the RECYCLE MANUAL switch in the ON position delivers a 0 signal to AND-gate 358 on lead 359. Therefore, in this operation, the function described in the preceding subsection, "Count-Up of Instruction Address Portion," is performed.

This operation is to be distinguished from the operation described in a preceding section entitled "Recycle," wherein an instruction is executed repeatedly, but does not have its address portion increased following each execution.

P-BUFFER OPERATIONS

The P-Buffer (FIG. 29), which has been described previously, provides an intermediate storage function for data being transferred to the Memory from the Control Typewriter or Photoreader and for data words being transferred from the Memory to the Control Typewriter. The P-Buffer temporarily stores data during these transfers to accommodate the relatively slow rate of Control Typewriter and Photoreader action to the relatively fast rate of the Central Processor action.

This transfer of data is directed by either programmed instructions (24, 74, and 59) executed in the Central Processor or by manually actuated signals derived from the Control Typewriter keyboard. When the data transfer is directed by a programmed instruction and requires coordination and synchronization with the Control Typewriter or Photoreader (Instruction 59), the operation sequence is only initiated by the instruction, but is executed and carried to completion under the control of the P-Buffer and the Control Typewriter or Photoreader.

When the operation requires that data be transferred between the P-register and the Control Typewriter or Photoreader (Instruction 59 and the manual keyboard-directed operations) the Mode-Control flip-flops *Mc(i)* are set for controlling the course of the operation. The execution of Instruction 59 has as its primary function the setting of these Mode-Control flip-flops to initiate the designated operation. The following table illustrates the initial state of the Mode-Control flip-flops, the operation to be executed, the nature of the data to be transferred, and the required control function of Instruction 59.

| Operation | Data | Control function | Mc1 | Mc2 | Mc3 | Mc4 |
|---|---|---|---|---|---|---|
| Input: | | | | | | |
| Control typewriter. | Single Numeric | 0_21 | 1 | 1 | 0 | 0 |
| Do | 1st Half, D-P | 0_22 | 1 | 1 | 1 | 0 |
| Do | 2nd Half, D-P | 0_23 | 1 | 1 | 1 | 1 |
| Do | Alphanumeric | 0_24 | 1 | 1 | 0 | 1 |
| Photoreader | Single Numeric | 0_31 | 0 | 1 | 0 | 0 |
| Do | 1st Half, D-P | 0_32 | 0 | 1 | 1 | 0 |
| Do | 2nd Half, D-P | 0_33 | 0 | 1 | 1 | 1 |
| Do | Alphanumeric | 0_34 | 0 | 1 | 0 | 1 |
| Output: | | | | | | |
| Control typewriter. | Single Numeric | 0_11 | 1 | 0 | 0 | 0 |
| Do | 1st Half, D-P | 0_12 | 1 | 0 | 1 | 0 |
| Do | 2nd Half, D-P | 0_13 | 1 | 0 | 1 | 1 |
| Do | Alphanumeric | 0_14 | 1 | 0 | 0 | 1 |

When set at the beginning of a P-Buffer operation: *Mc1* directs the operation to involve the Control Typewriter; *Mc2* directs the operation to transfer data from the Control Typewriter or Photoreader to the P-register; *Mc3* directs that the data to be transferred be handled as one-half of a double-precision word; and *Mc4*, if $Mc3=1$, directs that the data to be transferred be handled as the second half of a double-precision word, and *Mc4*, if $Mc3=0$, directs that the data to be transferred be handled as an alphanumeric word.

Most of the operations involving the P-Buffer are described in the sections immediately following. The descriptions of Instructions 24, 74, and 59, where appropriate, complement the descriptions to follow. An additional employment of the P-Buffer for loading and for reading-out groups of memory words is described in a later section.

*Transfer of P-Register Contents to M-Register*

All 28 bits stored in the P-register are transferred to the M-register during Instruction 24. This parallel shift of data occurs under full control of the Central Processor and takes place during the execution of Instruction 24 by the Central Processor. If the P-register is not busy when Instruction 24 commences ($Pnbz=1$), the contents of the P-register are gated to the M-register, and the *Mc3* flip-flop is reset to indicate that the P-register is empty when Instruction 24 is completed.

Actually, the P-register continues to retain the data it had stored at the beginning of Instruction 74, but since the same data has been "copied" elsewhere, the P-register is considered as empty.

Details of the P to M data transfer are provided in the description of Instruction 24.

*Transfer of M-Register Contents to P-Register*

All 28 bits of the addressed location in Memory are transferred to the P-register during Instruction 74. This transfer of data takes place under the joint control of the Central Processor and P-Buffer during the execution of Instruction 74 of the Central Processor. The word in the addressed Memory location is first transferred to the M-register. If the P-register is not busy when Instruction 74 commences, the contents of the M-register are transferred to the P-register, and the *Mc3* flip-flop is set to indicate that the P-register is full when Instruction 74 is completed. Details of the M to P data transfer supplementary to the description of this section are provided in the description of Instruction 74.

At $t9$ the contents of the M-register are transferred to the J-register. From $t10$–$t16$, the contents of the J-register are ring shifted-down, the contents of J1 are shifted to P7, and the contents of P are shifted-down. Thus, as J ring shifts, its digits are present in sequential order in J1 for transfer to P7, where they are, in turn, serially shifted across the P-register.

The clock pulse drivers $Sp$ and $Cap$ provide the signals by which the data from J is gated into and through the P-register. Those clock drivers are gated, in turn, by the signal $Tsp$ to provide 7 successive clock pulses from $t9$–$t15$. The signal $Tsp$ exists for the clock periods $t9$–$t15$, while the $Ts$-counter is counting from 1–7 during $t9$–$t15$, the counter having been started by the signal:

$$*Tsc=Em74\ Pnbz\ \overline{Mc3}$$

The signal $Tsp$ issues as follows:

$$Tsp=Tsc\ \overline{Mc1}\ \overline{Mc2}+Tsb\ Mc3+Tsa$$

The individual bits of the digit in J1 are gated into the respective condition digit inverters of P1 ($Ipd$, $Ips$, $Ipm2$, $Ipm1$) by the signal $Sjp$, which is normally 1; for example:

$$Ipd=Sjp\ J14$$

The output terminals of these condition digit inverters are connected directly to the respective logic input terminals of P7; for example:

$$*Pd=Ipd;\ *\overline{Pd}=\overline{Ipd}$$

The signal $Cap$ is the clock pulse input to P7 and gates the entry of the J1 digits therein.

The serial shift of the contents of the P-register for the digits being transferred from P7 to P6, P5 to P4, P4 to P3, P3 to P2, P2 to P1 is controlled by register transfer circuits, which are gated by the signal $Sp$. The contents of P6 are gated to the logic input terminals of P5 by the signal $Pig2$, which is on since $Mc2=0$ for Instruction 74; for example:

$$*P54=P64\ Pig2$$

The signal $Sp$ is the clock pulse input to P6.

Thus on the 7th count of the $Ts$-counter, the 7th $Cap$ signal gates the condition digit of the operand into P7. Following this last data shift, the $Ts$-counter is reset to 0 and halts, thereby discontinuing the clock pulse driver signals $Cap$ and $Sp$.

*Control Typewriter Input to P-Register; Single Numeric or First Half Double-Precision Word*

In this operation the Control Typewriter transfers a numeric word to the P-register after a previous Instruction 59 has been executed by the Central Processor to prepare the P-Buffer for this operation. The transfer of data takes place under control of only the P-Buffer and the Control Typewriter.

The previous Instruction 59 sets the Mode Control flip-flops to $Mc1\ Mc2\ \overline{Mc3}\ \overline{Mc4}$, if the input is to be single numeric, or to $Mc1\ Mc2\ Mc3\ \overline{Mc4}$, if the input is to be the first half of a double-precision word. The $Mc1$ flip-flop, being on, indicates that the operation relates to the Control Typewriter. The $Mc2$ flip-flop, being on, indicates that the operation provides input data for the P-register.

This operation is substantially identical for both types of input words, except that at the termination of the single numeric input operation, $Mc3$ must be set to 1 to indicate that P-register is full.

The timing of this operation is illustrated in the following timing diagram:

SINGLE NUMERIC OR FIRST HALF DOUBLE-PRECISION INPUT

| $Tca\ Tcb\ Tcc$ | Execution | P-Register contents |
|---|---|---|
| 001 | $Em59$ issues | XXXXXXX |
| 010 | P-contents ring shift-down six digit positions. No parity check. | XXXXXXX |
| 010 | Gate-in condition digit. | CXXXXXX |
| 010 | P-contents ring shift-down six digit positions. Check parity of condition digit in Cs. | XXXXXXC |
| 010 | Gate-in MSD. | 6XXXXXC |
| 010 | P-contents ring shift-down six digit positions. Check parity of MSD in Cs. | XXXXXC6 |
| 010 | Repeat gating-in of each of next five digits, each gating followed by six-digit ring shift and parity check. | C654321 |
| 000 | Recognize putaway digit in Cs. | |
| 001 | P-contents completely ring shift-down. Accumulate Mod-3 of P-contents. Check parity of putaway digit in Cs. Clear $Mc2$, 1 and set $Mc3$, if off. Insert mod-bits in P7. | C654321 |

At the beginning of this operation, the $Tc$-counter is in the 001, or rest state, and the $Ts$-counter is in the 000, or rest state. At the clock period next following that in which $Mc2$ is set to 1 (Instruction 59), the $Ts$-counter is started by the setting of the $Tsc$ flip-flop; as follows:

$$*Tsc=Mc2\ \overline{Tsc}\ (Tcc=1)$$

The $Tsc$-counter then counts through its complete cycle from 1–7 and back to 0, where it rests once again. When the $Ts$-counter reaches the count of 7 the $Tc$-counter is set to the 010 state. During this initial $Ts$-cycle, the P-register shift signals $Sp$ and $Cap$ issue six times in response to the signal $Tsp$, which occurs when the $Ts$-counter is in the state 2–7; as follows:

$$Tsp=Tsa+Tsb\ \overline{Mc4}$$

In addition, the shift signal $Spp$ occurs when the $Ts$-counter is in the states 1–7; as follows:

$$Spp=(Tsa+Tsb+Tsc)\ Mc2$$

$Spp$ gates the contents of P1 to P7. Thus, the contents of the P-register ring shift-down six digit positions.

The signal $Pig1$ issues and gates non-significant digits into P5; as follows:

$$Pig1=(Tc=1)\ Mc2$$

However, there is no significance at this time to any of the contents of the P-register. At the end of this initial $Ts$-cycle, the $Tc$-counter is no longer 001, so that the signal $Pig2$ now issues. This signal is controlled by the inverse logic of the signal $Pig1$. Therefore, the signal $Pig2$ is normally on, except when the $Tc$-counter is in the 001 state. The signal $Pig2$ enables the normal shift of the contents of P6 to P5, when P5 is gated by the clock signal $Sp$.

The P-Buffer is now ready to accept the first input or condition digit from the Control Typewriter. Since the information from the Control Typewriter is asynchronous with respect to the P-Buffer clock rate, certain signals are employed to perform a synchronizing function.

The path of data from the Control Typewriter to the P-Buffer will now be described, and is shown on FIGS. 138, 130, 131, and 122. Data is received from the Control Typewriter on the $Kf1$–6, $p$ lines. Lines $Kf1$–6 carry the 6 bits of an input character encoded in the previously described 6-bit code. Line $Kfp$ carries the parity bit for this character. The data on lines $Kf1$–6, $p$ is ated into the Cs input inverters by the signal Cinf; as follows:

$$Ics(i)=Cinf\ Kf(i)$$

he Cs flip-flops are applied with continuous clock pulses, nd therefore, the input character is gated into the Cs ip-flops when Cinf issues. The signal Cinf issues only hen the Mode Control flip-flops denote a Control Typeriter input and only when the Ts-counter is in the 0 or 1-ate; as follows:

$$Cinf=Mc1\ Mc2\ \overline{Tsa}\ \overline{Tsb}$$

Thus, no character is gated into the Cs flip-flops when e P-register is being ring shifted; i.e., during Ts=2–7. he output signals of the Cs flip-flops are encoded into entral Processor code and gated to the P7 input inerters by the signal Rip. The signal Rip occurs only hen the Ts-counter is in a 0-state; as follows:

$$Rip=\overline{Tsa}\ \overline{Tsb}\ \overline{Tsc}\ Mc2$$

t is the primary function of the Rip signal to gate umeric input data to the P-register. The P7 flip-flops ccept the input data from the Cs flip-flops only when he signal Rdy occurs, which, in turn, causes the issuance f the Cap signal. The Cap signal is a clock pulse which ates P7 to accept data. The Cap signal issues in this intance; as follows:

$$\text{Gate-}Cap=Rdy\ (\overline{Cs5}+\overline{Cs3})\ Mc2$$

The Rdy signal is provided when a character is supplied rom the Control Typewriter.

The generation of the signal Rdy will now be described. The waveforms, shown in FIG. 30, illustrate the timing nd generation of Rdy. The sprocket (timing) signal Kfc is provided by the Control Typewriter when a charcter signal is to be supplied. The signal on the Kfc lead s normally in the 1-state, except during the interval when lata is being supplied. The inverter Ifc follows Kfc durng the input mode of operation; as follows:

$$Ifc=Kfc\ Mc2$$

When the signal Ifc changes to the 0-state, the one-shot Yfr transfers to its unstable state, wherein it remains for pproximately 15 milliseconds; as follows:

$$*Yfr=\overline{Ifc}\ \overline{Rd1}\ \overline{Rd2}\ Mc1\ Kfi\ Ken2$$

Yfr is enabled by Ifc if the Control Typewriter is ready (Kfi=1), if an enable signal is not delivered by the Conrol Typewriter (Ken2=1), if a Control Typewriter mode s denoted (Mc1=1), and if the Rd1 and Rd2 flip-flops are both in the 0-state. The inverter Iyrd follows the Yfr one-shot; as follows:

$$Iyrd=\overline{Yfr}\ \overline{Ypr}$$

The Rd1 flip-flop sets when Iyrd enters the 0-state, as follows:

$$*Rd1=\overline{Iyrd}\ \overline{Rd2}$$

Thus, the sprocket signal Kfc from the Control Typewriter causes the flip-flop Rd1 to be set to the 1-state. The signal Rd1 enables the flip-flop Rd2, which thereupon transfers to the 1-state when the one-shot Yfr returns to its stable state; as follows:

$$*Rd2=Rd1\ Mc1\ \overline{Yfr}$$

The coincidence of the flip-flops Rd1 and Rd2 in their 1-state is the condition for the generation for the Ready signal Rdy; as follows:

$$Rdy=Rd1\ Rd2\ \overline{Ifc}\ Mc1\ Cs(i)\ \overline{Cs(j)}$$

The signal Rdy occurs approximately midway during the existence of Kfc in the 0-state, and enables the clock signal Cap, which, in turn, gates a digit into P7.

Rdy issues if a character is present in Cs; i.e., at least one Cs flip-flop is in the 1-state and at least one is in the 0-state.

The signal Rd1 is reset to 0 after Rd2 is set to 1 and thereby provides a signal Rdy with a duration of one clock period; as follows:

$$*\overline{Rd1}=Rd2$$

Only one of four characters are entered into P7 as a condition digit. These four characters are P, M, (+), and (−). The character P enters the designator bit, in addition to the (+) sign. The character M enters the designator bit, in addition to the (−) sign. In the encoding of these characters to the Central Processor code, all four characters will yield mod-bits having a modulo-3 of +1. Certain characters, such as putaway characters, are not gated into P7, since Cap does not issue. This is shown on the above expression for Cap which is dependent on $(\overline{Cs5}+\overline{Cs3})$.

The signal Rdy, in addition to gating the condition digit into P7, initiates another cycle of the Ts-counter by setting Tsc; as follows:

$$*Tsc=Rdy$$

Thus, the condition digit is gated into P7 when the Ts-counter is in its 1-state.

As described above, the shift signals Sp, Cap, and Spp now ring shift-down the contents of the P-register by six digit positions. During this Ts-cycle the condition digit is shifted from P7 to P1; as follows:

| Tsc | P7 | P6 | P5 | P4 | P3 | P2 | P1 |
|---|---|---|---|---|---|---|---|
| 1 | C | x | x | x | x | x | x |
| 2 | C | x | x | x | x | x | x |
| 3 | x | C | x | x | x | x | x |
| 4 | x | x | C | x | x | x | x |
| 5 | x | x | x | C | x | x | x |
| 6 | x | x | x | x | C | x | x |
| 7 | x | x | x | x | x | C | x |
| 0 | x | x | x | x | x | x | C |

The Ts-counter again halts when it reaches the 000 state, wherein it remains until the next Rdy signal is received. The signal *Tcc cannot occur until the end of this operation, and, therefore, until that time the Tc-counter remains in the 010 state.

With Tsc now in the 0-state, the MSD of the input word is gated into P7 by the next signal Rdy. Rdy again initiates a Ts-cycle and the MSD is transferred to P1, as shown in the preceding timing diagram. This process is repeated five times, whereupon the input word is in the P-register in sequential order.

After the entire input word is in the P-register, an operation-closing sequence is initiated when the Control Typewriter supplies a putaway character. A putaway character is one in which the signals on lines Kf3 and Kf5 are both in the 1-state. The following characters may be employed as putaway characters: Tab, Car Ret, Stop, and EOI (End of Information). The putaway character sets the Cs3 and Cs5 flip-flops. With these two flip-flops set, the Rdy signal cannot enable the Cap clock pulse, so that a putaway character is not inserted in the P-register. Instead, the resetting of Tcb is enabled as follows:

$$*\overline{Tcb}=Rdy\ Mc2\ Cs5\ Cs3\ \overline{Mc4}$$

Therefore, the signal Rdy from a putaway character sets the Tc-counter to 000 and initiates a Ts-cycle. In this next Ts-cycle, the signal Tsp issues for 7 clock periods; as follows:

$$Tsp=Tsa+Tsb\ \overline{Mc4}+Tsc\ \overline{Mc4}\ (Tc=0)$$

Therefore, the shift signals Sp, Cap, and Spp occur seven times and cause a complete ring shift-down of the P-register contents. During this ring shift, the modulo-3 of the contents of the P-register are accumulated in the $Gm1$, 2 flip-flops.

When $Ts$ reaches 7, the end-order signal $Eos$ issues; as follows:

$$Eos=(Tc=0)(Ts=7)$$

The signal $Eos$ immediately resets the mode control flip-flops $Mc1$ and $Mc2$ and sets $Mc3$, if it is not already set, to indicate that the P-register is full.

The resetting of $Mc1$ and $Mc2$ allows $Tcc$ to return to its rest state of 001; as follows:

$$*Tcc=\overline{Mc1}\ \overline{Mc2}$$

Thus, when this operation terminates, the $Tc$-counter is in its 1-state and the $Ts$-counter is in its 0-state.

The signal $Eos$ sets the $Eod$ flip-flop to its 1-state and transfers the $Yeo$ one-shot to its unstable state; as follows:

$$*Eod=Eos$$
$$*Yeo=Eos\ Mc1\ Klm2$$

$Yeo$ remains in its unstable state for approximately 200 milliseconds in order that the flip-flop $Eod$ may remain in its 1-state for an equal duration to isolate the P-Buffer from further control from the Central Processor. This 200 millisecond delay in freeing the P-Buffer from Central Processor control is dictated by the time necessary for the mechanism of the Control Typewriter to return to its idle state. The signal $Eod$ causes the busy signal $Pbz$ to issue; as follows:

$$Pbz=Mc1+Mc2+Eod$$

The $Pbz$ signal prevents the Central Processor from initiating another P-Buffer operation.

When the $Yeo$ one-shot returns to its stable state, the $Eod$ flip-flop is restored to its 0-state; as follows:

$$*\overline{Eod}=\overline{Yeo}\ \overline{Brl}\ Eod$$

The operation is now terminated.

The accumulation of the modulo-3 of the P-register contents, and the encoding and gating of the mod-bits to P7 are subsequently described in the modulo-3 generation section. In addition to the functions described above, a parity check is made on each incoming character from the Control Typewriter. The details of this parity check will also be described in a subsequent section.

*Modulo-3 Generation for Numeric Inputs to P-Register*

Following the insertion of a numeric word into the P-register, a putaway character initiates the final $Ts$-cycle. During this cycle the P-register ring shifts-down completely. The digit contents of P1 are sampled to provide the signals $Gm3$ and $Gm4$ for altering the contents of $Gm2$, 1 in accordance with the modulo-3 of the digit sampled. The signal $Gmt$ gates the signals $Gm3$ and $Gm4$ to the $Gm2$, 1 flip-flops, which accumulate the modulo-3 of the word in P. The signal $Gmt$ issues from the count of $Ts=1$ to 7; as follows:

$$Gmt=(Tsa+Tsb+Tsc)(\overline{Tsa}+\overline{Tsb}+\overline{Tsc}+\overline{Mc2})\ Mc2$$

If the modulo-3 of the digit in P1 is +1, $Gm3$ issues. When $Gm3$ is gated to $Gm2$ and $Gm1$ by $Gmt$, the new state of $Gm2$, 1 will depend on its previous state. If the previous state of $Gm2$, 1 reflects an accumulated modulo-3 of +1, the new state will be −1; if the previous state is 0, the new state will be +1; and if the previous state is −1, the new state will be 0. If the modulo-3 of the digit in P1 is −1, $Gm4$ issues and changes the state of $Gm2$, 1 accordingly. If the modulo-3 of the digit in P1 is 0, $Gm3$ and $Gm4$ do not issue, and the state of $Gm2$, 1 remains unchanged. In this manner, $Gm2$, 1 accumulates the modulo-3 as the word in P ring shifts.

The signal $Rip$ issues whenever $Ts=0$ and clears $Gm2$, 1. Therefore, when the $Ts$-counter is in the 1-state the contents of $Gm2$, 1 remain at 0. When the $Ts$-counter is in the 2-state $Gm2$, 1 reflects the modulo-3 of the LSD in P. Therefore, when the $Ts$-counter has again completed its cycle and reached 0, $Gm2$, 1 has accumulated the modulo-3 of the entire contents of the P-register. The signal $Eod$ controls the encoding of the contents of $Gm2$, 1 into the proper mod-bits for the word in P and gates these mod-bits into the P7 input inverters $IPm2$, 1. The bits to be placed in $Pm2$ and $Pm1$ must make the total modulo-3 of the word in P equal to +1. The logic for encoding the contents of $Gm2$, 1 into the correct mod-bits must not only account for the requirement that the total modulo-3 of P be +1, but must take into account that $Pm2$, 1 were preset to 01 on receipt of the condition digit. The following table illustrates the mod-bits generated for various combinations of $Gm2$, 1 in order to take into account these two factors:

| $Gm2$, 1 after modulo-3 accumulation | Actual modulo-3 of P1–P6, $Ps$, $Pd$ | Mod-bits inserted into $Pm2$, $Pm1$ |
|---|---|---|
| 0, 0 | −1 | 1, 0 |
| 0, 1 | 0 | 0, 1 |
| 1, 0 | +1 | 0, 0 |

The signal $Cap$ issues in response to the signal $Eod$ and gates the mod-bits into P7; as follows:

$$\text{Gate-}Cap=Eod\ \overline{Rtc}$$

The presetting of the mod-bits in P7 when the condition digit is entered is arbitrary. It is only necessary that the mod-bits be preset to a known value, in order that the subsequent mod-bit generation may be accomplished.

*Parity Checking*

In the input mode ($Mc2$) the contents of $Cs1$–6 are ring shifted during each $Ts$-cycle while $Csp$ checks the parity configuration of these contents for correctness. This parity check determines if there is an even number of 1's in the complete character received by the $Cs$ flip-flops.

The complete ring shift of the $Cs1$–6 contents is directed by the six states of the $Ts$-counter from 2 to 7; as follows:

$$Ics(i)=(Tsa+Tsb)\ Cs(i+1)$$

During this ring shift, the contents of $Cs$ are serially shifted toward $Cs1$. The bit in $Cs1$ is sampled by the $Csp$ input inverter.

$Csp$ is first set to the state of the parity bit of the received character. When the $Ts$-counter commences its cycle, $Csp$ responds to the original bit in $Cs1$ and to each bit shifted into $Cs1$. $Csp$ changes its state whenever the bit in $Cs1$ is a 1; as follows:

$$ICsp=(Tsa+Tsb)(Csp\ \overline{Cs1}+\overline{Csp}\ Cs1)$$

When $Ts=2$, the original contents of $Cs1$ are sampled and when $Ts=3$, $Csp$ reflects the state of this sample. When $Ts=7$ the bit originally in $Cs6$ is in $Cs1$, and the state of $Csp$ reflects the original contents of $Cs1$–5. If the parity configuration of the input character is correct, the following situation should exist at this time:

(*a*) If the bit presently in $Cs1$ is a 1, $Csp$ must reflect the receipt of an odd number of 1's, and is in the 1-state.

(*b*) If the bit presently in $Cs1$ is a 0, $Csp$ must reflect the receipt of an even number of 1's, and is in the 0-state.

At $Ts=7$ the contents of $Cs1$ and $Csp$ are sampled by the "Error, P-Buffer, Parity" flip-flop $Efp$; as follows:

$$*Efp=Mc2\ (Ts=7)(Tc\neq 1)(Csp\ \overline{Cs1}+\overline{Csp}\ Cs1)$$

If $Csp$ and $Cs1$ are not in the same state, $Efp$ sets and halts the Central Processor. $Efp$ will not set when the $Tc$-counter is in the 1-state, since no significant input character is delivered to the P-register at this time.

*Photoreader Input to P-Register; Single Numeric or First Half Double-Precision Word*

In this operation, the Photoreader transfers a numeric word to the P-register after a previous Instruction 59 has been executed by the Central Processor to prepare the P-Buffer for this operation. The transfer of data takes place under control of only the P-Buffer and the Photoreader.

The previous Instruction 59 sets the Mode-Control flip-flops to $\overline{Mc1}$ $Mc2$ $\overline{Mc3}$ $\overline{Mc4}$, if the input is to be single numeric, or to $\overline{Mc1}$ $Mc2$ $Mc3$ $\overline{Mc4}$, if the input is to be the first half of a double-precision word. The $Mc1$ flip-flop, being off, indicates that the operation relates to the Photoreader. The $Mc2$ flip-flop, being on, indicates that the operation provides input data for the P-register.

Both of these operations are substantially identical to the corresponding operations previously described in detail for the Control Typewriter input operation. Therefore, this description merely points out the major differences between a Photoreader input operation and a Control Typewriter input operation.

At the beginning of this operation, the $Ts$-counter counts through its initial cycle, as before. At the end of this cycle, the $Tc$-counter is in the 010-state, where it remains until the end of the operation.

An additional initial step takes place in this operation to eliminate a premature read-in from the Photoreader. Normally the Photoreader stops on the punched holes containing the Stop code. This causes the sprocket signal $Kpc$ to issue at the start of this operation. Such a sprocket signal would trigger $Ypr$ and result in the issuance of the $Rdy$ signal, which, in turn, would cause an acceptance by the P-register of the Stop digit, unless the triggering of $Ypr$ is inhibited. The triggering of $Ypr$ is prevented by having the signal $Em59$ set $Rd2$; as follows:

$$*Rd2=Em59\ Pnbz\ A22\ A21\ \overline{Mc3}$$

With $Rd2$ on, $*Ypr$ is inhibited until $Rd2$ is subsequently reset when the paper tape starts feeding and terminates the sprocket signal; as follows:

$$*Rd2=\overline{Ipc}\ \overline{Mc1}\ Rd2$$

Following the initial $Ts$-cycle the input condition digit is transmitted from the Photoreader to the P-Buffer on lines $Kp1$–6, $p$. A method similar to that employed for the Control Typewriter input is used to perform a synchronizing function in this operation.

The character on lines $Kp1$–6, $p$ is gated into the $Cs$ input inverters by the signal $Cinp$; as follows:

$$Ics(i)=Cinp\ Kp(i)$$

The signal $Cinp$ issues only when the mode control flip-flops denote a Photoreader input and only when the $Ts$-counter is in the 0 or 1-state; as follows:

$$Cinp=\overline{Mc1}\ Mc2\ \overline{Tsa}\ \overline{Tsb}$$

As before, the signal $Rip$ gates the output signals of the $Cs$ flip-flops, in Central Processor code, to the P7 input inverters. The P7 flip-flops accept the input data from the $Cs$ flip-flops only when the signal $Rdy$ occurs which causes the issuance of a $Cap$ signal.

The method of generation of the $Rdy$ signal, also illustrated with the waveforms of FIG. 30, is the major difference between the Photoreader input operation and the Control Typewriter input operation.

The sprocket signal $Kpc$ is provided by the Photoreader when a character signal is to be supplied. The signal on the $Kpc$ lead is in the 1-state only during the interval when data is being supplied. The inverter $Ipc$ follows $Kpc$ during the input mode of operation; as follows:

$$Ipc=Kpc$$

The one-shot $Ypr$ transfers to its unstable state, wherein it remains for approximately 320 microseconds, upon receipt of the sprocket signal; as follows:

$$*Ypr=Kpc\ \overline{Rd1}\ \overline{Rd2}\ \overline{Mc1}\ Mc2\ Kpi$$

$Ypr$ is enabled by $Kpc$ if the Photoreader is ready ($Kpi=1$).

The inverter $Iyrd$ follows the $Ypr$ one-shot, as indicated in the Photoreader input section.

The $Rd1$ flip-flop sets when $Iyrd$ enters the 0-state, as described previously.

The $Rd2$ flip-flop is enabled by $Rd1$, and transfers to the 1-state when the one-shot $Ypr$ returns to its stable state; as follows:

$$*Rd2=Rd1\ \overline{Mc1}\ \overline{Ypr}$$

The coincidence of the flip-flops $Rd1$ and $Rd2$ in their 1-state is the condition for the generation of the Ready signal $Rdy$; as follows:

$$Rdy=Rd1\ Rd2\ Kpc\ \overline{Mc1}\ Mc2\ Cs(i)\ \overline{Cs(j)}$$

The signal $Rdy$ then enables the clock signal $Cap$, which, in turn, gates a digit into P7, and also starts the $Ts$-counter.

The technique by which the seven digits are gated into and shifted through the P-register is substantially the same as that described in the Control Typewriter input section, the only difference being in the manner of generation of the signal $Rdy$, as described above.

The operation-closing sequence is substantially the same as that employed for the Control Typewriter input operation, except that the one-shot $Yeo$ is not triggered. The modulo-3 generation and the parity checking are substantially identical to that described in the Control Typewriter input section. Since $Yeo$ is not triggered, the flip-flop $Eod$ remains in its 1-state for but one clock period, and functions only to gate the encoded contents of $Gm2$, 1 to the P7 input inverters $Ipm2$, 1 during the modulo-3 generation.

*Control Typewriter or Photoreader Input to P-Register; Second Half Double-Precision Word*

In this operation the Control Typewriter or the Photoreader transfers the second half of a double-precision word to the P-register after the first half of the double-precision word has been transferred to the P-register and after a new Instruction 59 has been executed by the Central Processor to prepare the P-Buffer for this operation. The transfer of data takes place under control of only the P-Buffer and the Control Typewriter or Photoreader.

The new Instruction 59 sets the Mode-Control flip-flops to $Mc1$ $Mc2$ $Mc3$ $Mc4$, if the input is to be from the Control Typewriter, or to $\overline{Mc1}$ $Mc2$ $Mc3$ $Mc4$, if the input is to be from the Photoreader. The $Mc3$ flip-flop, being on, indicates that a double-precision word is involved in the data transfer. The $Mc4$ flip-flop, being on, indicates that the second half of a double-precision word is involved, provided that $Mc3$ is on.

These operations are substantially alike for inputs from either the Control Typewriter or the Photoreader, except for the minor differences between these two sources of input data described in the previous sections for single numeric input. Furthermore, except during the initial $Ts$-cycle, the operations for the Control Typewriter and the Photoreader second half double-precision inputs are substantially identical to the corresponding single numeric input operations previously described.

Since both halves of a double-precision word must have the same sign bit, the sign bit of the preceding first half double-precision word is retained in this operation. At the completion of the previous first half double-precision input operation the condition digit will be in P7, where it remains until the beginning of this operation. Therefore, during the initial Ts-cycle, the condition digit is shifted left from P7 to P1. In passing from P6 to P5, the sign and designator bits are retained, but the mod-bits are changed to those necessary for correct mod-bit generation; as follows:

$$*P54=P64\ Mc3$$
$$*P53=P63\ Mc3$$
$$*P52=\overline{Tsc}\ Pig1$$
$$*P51=Pig1$$
$$*\overline{P54}=\overline{P64}$$
$$*\overline{P53}=\overline{P63}\ Mc3$$
$$*\overline{P52}=Tsc\ Pig1$$
$$*\overline{P51}=\overline{P61}\ Pig2$$

Since Tsp issues for $Ts=2$–7, the condition digit is still in P7 during the initial Ts-cycle, when $Ts=2$. Therefore, when $Ts=3$ ($Tsc=1$), the condition digit is in P6 and prepares the transfer into P5, in accordance with the above equations. Thus, the sign and designator bits of the condition digit transfer into P5, and subsequently into P1, but the mod-bits are altered to the required 01 values.

Following the initial Ts-cycle, the MSD of the numeric portion is transferred from the Control Typewriter or Photoreader to P7. No condition digit is entered during this operation. Following the receipt of the six numeric digits, the operation-closing sequence takes place, during which the correct mod-bits are generated.

The insertion of each of the numeric digits into P7, the parity checking of each of these digits, and the final mod-bit generation is identical to that described heretofore in the sections describing the Control Typewriter and Photoreader input operations.

There is one deviation from the equations for the generation of Tsp and for the resetting of Tcb. These signals are now enabled by Mc3; as follows:

$$Tsp=Tsa+Tsb\ Mc3+Tsc\ Mc3\ (Tc=0)$$
$$*\overline{Tcb}=Rdy\ Mc2\ Mc3\ Cs5\ Cs3$$

*Control Typewriter or Photoreader Input to P-Register; Alphanumeric Word*

In this operation the Control Typewriter or the Photoreader transfers an alphanumeric word to the P-register after a previous Instruction 59 has been executed by the Central Processor to prepare the P-Buffer for this operation. The transfer of data takes place under control of only the P-Buffer and the Control Typewriter or Photoreader.

The previous Instruction 59 sets the Mode-Control flip-flops to Mc1 Mc2 $\overline{Mc3}$ Mc4, if the input is to be from the Control Typewriter, or to $\overline{Mc1}$ Mc2 $\overline{Mc3}$ Mc4, if the input is to be from the Photoreader. The $\overline{Mc3}$ Mc4 combination indicates that an alphanumeric word is involved.

These operations are substantially alike for inputs from either the Control Typewriter or the Photoreader, except for the minor differences which occur between these two sources of input data as described in the previous sections for single numeric input. Either one, two, or three alphanumeric characters may be transferred. The operation-closing sequence may be initiated by a putaway character, which is also inserted in the P-register. If three alphanumeric characters are provided, the operation-closing sequence is initiated by the third character and no putaway character need be provided.

The timing of this operation is illustrated in the following timing diagrams:

ALPHANUMERIC INPUT—3 CHARACTERS

| Tca Tcb Tcc | Execution | P-Register contents |
|---|---|---|
| 001 | Em59 issues | xxxxxxx |
| | P contents ring shift-down five digit positions. "Ignore" characters inserted. No parity check. | |
| 010 | | xxIgIgx |
| | Gate-in first character. | |
| 010 | | 5xIgIg6 |
| | P contents ring shift-down five digit positions. Check parity of character in Cs. | |
| 011 | | IgIg65x |
| | Gate-in second character. | |
| 011 | | 3gIg654 |
| | P contents ring shift-down five digit positions. Check parity of character in Cs. | |
| 000 | | Ig6543g |
| | Gate-in third character. | |
| 000 | | Ig65432 |
| | P contents ring shift-down six digit positions. Check parity of character in Cs. Clear Mc4 and Mc2, and Mc1, if on, and set Mc3. Insert mod-bits in P7. | |
| 001 | | C654321 |

ALPHANUMERIC INPUT—1 CHARACTER

| Tca Tcb Tcc | Execution | P-Register contents |
|---|---|---|
| 001 | Em59 issues | xxxxxxx |
| | P contents ring shift-down five digit positions. "Ignore" characters inserted. No parity check. | |
| 010 | | xxIgIgx |
| | Gate-in first character. | |
| 010 | | 5xIgIg6 |
| | P contents ring shift-down five digit positions. Check parity of character in Cs. | |
| 011 | | IgIg65x |
| | Gate-in putaway character. | |
| 000 | | PgIg65P |
| | P contents ring shift-down six digit positions. Check parity of character in Cs. Clear Mc4 and Mc2, and Mc1, if on, and set Mc3. Insert mod-bits in P7. | |
| 001 | | CIg65PP |

At the beginning of this operation, the Tc-counter is in the 001-state and the Ts-counter is in the 000-state. At the clock period next following that in which Mc2 is set to 1 (Instruction 59), the Ts-counter is started, and counts through its complete cycle. When the Ts-counter reaches the count of 7 the Tc-counter is set to the 010-state. During this initial Ts-cycle, the shift signals Sp and Cap issue five times in response to the signal Tsp, which occurs when the Ts-counter is in the states 3–7; as follows:

$$Tsp=Tsa+Tsa\ Tsb+Tsb\ (Tc=0)$$

In addition, the shift signal Spp occurs when the Ts-counter is in the states 1–7. Thus, the contents of the P-register ring shift-down five digit positions.

The signal Pig1 issues and gates Ignore characters into P5; as follows:

$$*P53=\overline{Tsc}\ Pig1\ \overline{Mc3}$$
$$*P52=\overline{Tsc}\ Pig1$$
$$*P51=Pig1$$
$$*\overline{P54}=Pig1\ \overline{Mc3}$$
$$*\overline{P53}=Tsc\ Pig1\ \overline{Mc3}$$
$$*\overline{P52}=Tsc\ Pig1$$

The first digit is gated from P6 to P5 by the clock pulse following $Ts=3$ ($Tsc=1$). Therefore, this digit, which comes to rest in P1 at the end of the first Ts-cycle and the igits which come to rest in P3 and P5 are 1's, in accordnce with the above equation group. The digits which ome to rest in P2 and P4 are &'s. Therefore, the digit air in P5, P4 and the digit pair in P3, P2 will be Ignore lphanumeric characters. These Ignore characters reain in the final P contents in any of the three character ositions not filled with input data. Ignore characters are nored by all system output devices.

The configuration of the P-register contents at the conlusion of the initial Ts-cycle is; as follows:

| Bit | P7 | P6 | P5 | P4 | P3 | P2 | P1 |
|---|---|---|---|---|---|---|---|
| 5 | x | x | 0 | 0 | 0 | 0 | 0 |
| 4 | x | x | 0 | 1 | 0 | 1 | 0 |
| 2 | x | x | 0 | 1 | 0 | 1 | 0 |
| 1 | x | x | 1 | 1 | 1 | 1 | 1 |
| | | | Ignore | | Ignore | | |

he P-buffer is now ready to accept the first character rom the Control Typewriter or Photoreader. No conition digit is supplied in this operation. Therefore, the rst character supplied is the most significant alphanumeric haracter.

The gating of data from the Control Typewriter or the hotoreader to the Cs flip-flops, and the generation of the ignal Rdy to store this data in the P-register and to start e Ts-cycle is similar to that described in the preceding ections for single numeric input. However, the path of ata transfer from the Cs flip-flops to the P-register is difrent in the operations of this section.

In addition to the signal Rip, the signal Ripa issues; as ollows:

$$Ripa=(Ts=0)\ Mc2\ \overline{Mc3}\ Mc4$$

ripa functions to encode the character in Cs into the two equired digits in Central Processor alphanumeric code. he most significant of these two digits is gated into P1 nd the least significant into P7. The contents of Cs1–4 re directed to the corresponding flip-flops of P7, through he P7 input inverters; as follows:

$$Ipd=Ripa\ Cs4$$
$$Ips=Ripa\ Cs3$$
$$Ipm2=Ripa\ Cs2$$
$$Ipm1=Rip\ Cs1$$

he contents of Cs5 and Cs6 are encoded by Ripa into a igit for P1; as follows:

$$*P13=Ripa\ (\text{putaway})$$
$$*P12=Ripa\ \overline{Cs6}$$
$$*P11=Ripa\ Cs5$$
$$*\overline{P14}=Ripa$$
$$*\overline{P13}=Ripa\ (\text{non-putaway})$$
$$*\overline{P12}=Ripa\ Cs6$$
$$*\overline{P11}=Ripa\ \overline{Cs5}$$

or a normal alphanumeric character, the contents of oth P13 and P14 are 0.

The Rdy signal occurs and starts the Ts-counter and auses the issuance of Cap, which is the clock pulse which ates the two digits derived from the input character into 7 and P1; as follows:

$$\text{Gate-}Cap=Rdy\ Mc2\ \overline{Mc3}\ Mc4$$

The Ts-counter now completes another cycle, Tc is ounted to 011 and the P contents ring shift-down five digit ositions. At the end of this shifting, the first alphanuneric character is in P3, P2.

THREE ALPHANUMERIC CHARACTERS ENTERED

The second alphanumeric character is gated into P7 and 1, the P contents ring shift-down five digit positions, and he Tc-counter is transferred to the 000-state.

The third alphanumeric character is then gated into P7 nd P1. With the Tc-counter is the 000-state, Tsp issues ix times, so that the P contents ring shift-down six digit positions. When Ts reaches the count of 7, the signal Eos issues and terminates this operation in the manner described in the preceding sections for single numeric input. When the P contents have completed this last ring shift, the three alphanumeric characters occupy the six numeric positions of the P-register.

The mod-generation flip-flops Gm2, 1 are continuously set to the 011-state to indicate an alphanumeric word; as follows:

$$*Gm2=\overline{Mc3}\ Mc4$$
$$*Gm1=Mc2\ \overline{Mc3}\ Mc4$$

Therefore, when the Eod flip-flop is set by the Eos signal the contents of Gm2, 1 are inserted into P7. At this time the contents of both Ps and Pd are changed to 0 for the alphanumeric word in the P-register.

Parity checking is as described for the previous operations. All three input characters are checked for correctness of parity configuration.

LESS THAN THREE ALPHANUMERIC CHARACTERS ENTERED

If it is desired to have only one or two alphanumeric characters in the input word, a putaway character is supplied from the Control Typewriter or Photoreader immediately following the entry of the first or second alphanumeric character. The Stop or EOI normally function as putaway characters for alphanumeric input.

However, if the ALPHANUMERIC STORE switch is in the Tab-Car Ret position, the Tab or Car Ret signals will also function as putaway signals. With the ALPHANUMERIC Switch in the Tab-Car Ret position, the signal Kam is transmitted by the Control Console to enable the resetting of the Tc-counter to the 0-state, if it is not already in that state; as follows:

$$*\overline{Tcc}=*\overline{Tcb}=Rdy\ (Mc2\ Cs5\ Cs3)\ \overline{Cs4}\ (Cs2+Cs1\ Kam)$$

This action enables the operation-closing sequence to occur. This operation-closing sequence is identical to that described above for the three-alphanumeric-character input operation.

In this operation, unlike the numeric input operations, the putaway character is entered into the P-register in the same manner as an alphanumeric character is entered. This is effected by the signal Cap, described above, which is not inhibited by the presence of Cs5 Cs3.

*Control Typewriter Output From P-Register; Single Numeric or First Half Double-Precision Word*

In this operation the Control Typewriter receives a numeric word from the P-register after a previous Instruction 59 has been executed by the Central Processor to prepare the P-Buffer for this operation. The transfer of data takes place under control of only the P-Buffer and the Control Typewriter.

The previous Instruction 59 sets the Mode-Control flip-flops to Mc1 $\overline{Mc2}$ $\overline{Mc3}$ $\overline{Mc4}$, if the output is to be single numeric, or to Mc1 $\overline{Mc2}$ Mc3 $\overline{Mc4}$, if the output is to be the first half of a double-precision word. The Mc1 flip-flop, being on, indicates that the operation relates to the Control Typewriter. The Mc2 flip-flop, being off, indicates that the operation delivers output data from the P-register.

The flip-flop Mc1 is set; as follows:

$$*Mc1=Em59\ Pnbz\ \overline{A22}\ Mc3\ Knt1$$

wherein $\overline{A22}$ denotes an output operation, Mc3 denotes that the P-register is full, and Knt1=1 denotes that the INHIBIT-TYPEOUT switch on the Control Console is in the NORMAL position. If the INHIBIT-TYPEOUT switch is ON, the P-register is not emptied by this Instruction 59.

The flip-flop Mc3 is reset; as follows:

$$*\overline{Mc3}=Em59\ Pnbz\ \overline{A22}\ (\overline{A12}+Knt2)$$

The signal $\overline{A12}$, for single numeric output, resets Mc3 to indicate that the P-register has been emptied at the end of this operation. If the INHIBIT-TYPEOUT switch is ON, $Knt2=1$ and the operation is not performed by this Instruction 59, but the contents of the P-register are treated as non-existent, or P as empty, so that P can subsequently be filled.

This operation is substantially identical for both types of words, except that at the termination of the double-precision output operation Mc3 is reset and a different putaway character is supplied for each type of output word.

This operation starts as soon as Mc1 is set. At this time $Ifc=0$; as follows:

$$Ifc=(Ktf+\overline{Iycrt})\ \overline{Mc2}$$

The above equation includes all possible conditions occurring during this operation. The signal Ktf is a Control Typewriter feedback signal which only issues in response to $Ytc=0$, a condition which occurs when Cs is loaded with a character for transfer to the Control Typewriter. Thus, $Ktf=0$ at the start of this operation. Similarly, $Iycrt=0$ because this signal can only equal 1 when Ycrt is fired, a condition which occurs whenever the Carriage Return signal Kacr is received from the Control Typewriter. The signal Kacr does not issue unless the Control Typewriter is printing a character.

Therefore, the one-shot Yfr fires immediately after Mc1 sets; as follows:

$$*Yfr=\overline{Ifc}\ \overline{Rd1}\ \overline{Rd2}\ Mc1\ Kfi\ Ken2$$

Yfr remains in its unstable state for approximately 15 milliseconds. Waveforms of the $\overline{Yfr}$ signal and other signals employed in synchronizing the Control Typewriter with the P-Buffer are shown in FIG. 31.

The signal Iyrd follows the signal $\overline{Yfr}$; as follows:

$$Iyrd=\overline{Yfr}\ \overline{Ypr}$$

The Rd1 flip-flop sets on the clock pulse next following the firing of Yfr; as follows:

$$*Rd1=\overline{Iyrd}\ \overline{Rd2}$$

The Rd2 flip-flop then sets when Yfr returns to its stable state; as follows:

$$*Rd2=Rd1\ Mc1\ \overline{Yfr}$$

The signal Rdy issues upon the coincidence of the flip-flops Rd1 and Rd2 in their 1-state; as follows:

$$Rdy=Rd1\ Rd2\ \overline{Ifc}\ Mc1\ \overline{Mc2}$$

The signal Rd1 resets immediately after Rd2 is set, to limit the signal Rdy to one clock period; as follows:

$$*\overline{Rd1}=Rd2$$

The Rdy signal initiates a Ts-cycle by setting Tsc to 1, the Ts-counter having been in the 0-state; as follows:

$$*Tsc=Rdy$$

There is no preliminary Ts-cycle in this operation as occurred in the numeric input operations.

In the waveform for Tsc, the pulses are numbered to identify the corresponding states of the Ts-counter.

During the Ts-cycle the Sp and Cap clock signals issue when Tsp occurs. The signal Tsp occurs from $Ts=2$–7 for all Ts-cycles of this operation, except when $Tc=0$; as follows:

$$Tsp=Tsa+Tsb+Tsc\ \overline{Mc4}\ (Tc=0)$$

The gating signal Spp issues for $Ts=1$–7, for all Ts-cycles of this operation; as follows:

$$Spp=(Tsa+Tsb+Tsc)\ Mc1$$

Therefore, the contents of the P-register ring shift-down through six digit positions during every Ts-cycle, except when $Tc=0$, at which time the contents of P completely ring shift-down.

When $Ts=1$, the signal Cinr issues; as follows:

$$Cinr=\overline{Mc2}\ (Ts=1)$$

The signal Cinr functions to gate an encoded digit from P7 to Cs through the Cs input inverters; as follows:

$$Ics4=Cinr\ (Tc=1)\ (Ps+Pd)\ (\overline{Ps}+\overline{Pd})$$
$$Ics3=Cinr\ Ps+Cinr\ (Tc=1)\ \overline{Pd}$$
$$Ics2=Cinr\ (Tc=1)\ (\overline{Ps}+\overline{Pd})$$

The above equations are applicable only for the condition digit output, which occurs when $Tc=1$. There are no inputs to Ics 6, 5, 1 when $Tc=1$. Only one of four combinations of bits in Pd and Ps are encoded into Control Typewriter code at this time. These four combinations are encoded by the logic of the above equations into one of the Control Typewriter characters P, M, (+), (−).

Since continuous clock pulses are applied to Cs at this time, when $Ts=2$, Cs stores the character to be gated-out to the Control Typewriter.

Starting at $Ts=3$ the contents of P ring shift-down six digit positions to place the MSD in P7 when Ts again reaches the rest state. This shift of the contents of P and a description of the timing of this operation is shown in the following timing diagram:

SINGLE NUMERIC OR FIRST HALF DOUBLE-PRECISION OUTPUT

| Tca Tcb Tcc | Execution | P-Register Contents |
|---|---|---|
| 001 | Em59 issues | C654321 |
| 010 | Condition digit gated to Cs and then transferred to Control Typewriter. P contents ring shift-down six digit positions. Parity bit generated for condition character in Cs. | 654321C |
| 011 | MSD gated to Cs and then transferred to Control Typewriter. P contents ring shift-down six digit positions. Parity bit generated for MSD in Cs. | 54321C6 |
| 000 | Repeat above procedure five times for transfer of remaining five digits to Control Typewriter. | C654321 |
| 001 | Automatic putaway character gated to Cs and then transferred to Control Typewriter. P contents completely ring shift down. Clear Mc1 and Mc3, if on. | C654321 |

Each time that Ts reaches the count of 7 the Tc-counter has its contents increased by 1. This is due to the fact that *Tcc is enabled by $\overline{Mc2}$; as follows:

$$*Tcc=\overline{Tcc}\ (Ts=7)\ \overline{Mc2}$$

Therefore, at the end of the condition digit output sequence, Tc is in the 010 state.

Also, when $Ts=7$ the one-shot Ytc fires for approximately 35 milliseconds; as follows:

$$*Ytc=(Ts=7)\ Mc1\ \overline{Mc2}$$

Ytc gates the Cs character into the Control Typewriter. In response to the Ytc signal, the Control Typewriter issues the feedback signal Ktf for approximately 100 milliseconds. The signal Ktf inhibits the readout of any further signals to the Control Typewriter until the type-out or punch-out of the character is completed by forcing Ifc to the 1-state. (See preceding equation for Ifc, this section.)

The flip-flop R*d*2 is reset by K*tf*; as follows:

$$*\overline{Rd2}=(Ktf+\overline{Iycrt})\ \overline{Mc2}$$

The signal I*fc* goes to 1 with K*tf* and prevents further firing of Y*fr* and the transfer of further data to C*s* until the Control Typewriter is ready. In the event that a carriage return or Tab action is required in the Control Typewriter, following insertion of the character from C*s*, the signal K*acr* delivered by the Control Typewriter fires the one-shot Y*crt*. Y*crt* remains in its unstable state for approximately 150 milliseconds to allow the carriage to return. The signal I*ycrt* results; as follows:

$$Iycrt=\overline{Ycrt}$$

and inhibits the return to 0 of the I*fc* signal until the carriage return is completed.

During the interval from $Ts=3\text{–}7$, 0, the contents of C*s* completely ring shift for generation of the parity bit in C*sp*; as follows:

$$Ics(i)=(Tsa+Ts)\ Cs(i+1)$$

When T*s* again reaches 0, the contents of C*s* have returned to their original positions and the parity bit is present in C*sp*.

When the one-shot Y*tc* is fired, the C*ytc* clock signals to C*s* cease; as follows:

$$\text{Gate-}Cytc=\overline{Ytc}$$

This action enables C*s* to hold the character until it is transferred to the Control Typewriter. When the one-shot Y*tc* returns to its stable state C*s* is cleared; as follows:

$$*\overline{Cs}(i)=\overline{Ics}(i)\ \overline{Ytc}$$

The signal C*an* is now present from $Tc=2$ to $Tc=7$; as follows:

$$Can=Tca+Tcb$$

to enable the encoded data to enter C*s* from P7.

When both K*tf* and $\overline{Iycrt}$ have dropped to 0, the one-shot Y*fr* fires again, R*dy* occurs, and the T*s*-cycle commences again. The contents of P again shift six times. The signal C*inr* issues when $Ts=1$ and gates the encoded MSD in P7 to C*s* through the C*s* input inverters; as follows:

$$Ics6=Cinr\ (Tca+Tcb)\ \overline{Mc4}$$
$$Ics5=Cinr\ (Tca+Tcb)\ Mc4\ Gm1$$
$$Ics4=Cinr\ Can\ Pd$$
$$Ics3=Cinr\ Ps$$
$$Ics2=Cinr\ Can\ Pm2$$
$$Ics1=Cinr\ Can\ Pm1$$

The I*cs*(*i*) inputs above occur each time $Ts=1$ from $Tc=2\text{–}7$ and gate into C*s*, in Control Typewriter code, all numeric data in P. The numeric digits are gated directly to C*s*1–4. C*s*6 is automatically set to 1 for all numerics. C*s*5 is set to 0 for all numerics if $Gm1=0$, and is set to 1 if $Gm1=1$.

This control of the configuration of the character in C*s* in accordance with the state of G*m* is a zero suppression feature. When $Gm1=1$, a 0-digit in P7 is converted to the Control Typewriter code for a space: $Cs6\text{–}1=110000$. When $Gm1=0$, a 0-digit in P7 remains a 0 in Control Typewriter code: $Cs6\text{–}1=100000$. When the Mode-Control flip-flops are set at the beginning of this operation, G*m*1 is set to 1 to suppress the most significant 0's in the numeric portion of the P-contents; as follows:

$$*\overline{Gm1}=(Tc=1)\ Mc1\ \overline{Mc2}\ \overline{Mc4}$$

*G*m*1 then samples the contents of P7 during $Tc=2\text{–}7$ (when $Ts=0$) and resets G*m*1 when the first non-zero digit enters P7; as follows:

$$*\overline{Gm1}=(Pd+Ps+Pm2+Pm1)\ (Mc1\ \overline{Mc2})(Tca+Tcb)(Ts=0)$$

Thus, G*m*1 does not sample the condition digit. G*m*1 is automatically reset after the fourth zero has been suppressed during single numeric output; as follows:

$$*\overline{Gm1}=Tca\ Tcb\ Mc1\ \overline{Mc2}\ \overline{Mc3}\ (Ts=0)$$

This results in printing two 0's where a completely zero number has been typed out. If only the LSD is non-zero, it is preceded by a 0, to provide a form particularly useful if this value indicates cents, as in a monetary balance. However, if this operation involves the first half of a double-precision number, the entire numeric portion will be suppressed, if it is a completely zero number.

Again, when the T*s*-counter reaches 7, Y*tc* is triggered and the MSD is transferred to the Control Typewriter.

The above sequence for the most significant digit occurs five additional times, after which $Tcc=0$, $Ts=0$, the contents of P are again in sequential order, and the complete word in P has been typed or punched out.

With T*c* in the 0-state, when Y*tc* returns to its stable state, the T*s*-counter starts its last cycle. When $Ts=1$ the signal C*inr* automatically gates a character into C*s* in accordance with the following logic:

$$Ics6=\text{Automatic Reset}$$
$$Ics5=Cinr\ (Tc=0)\ \overline{Mc4}$$
$$Ics4=\text{Automatic Reset}$$
$$Ics3=Cinr\ (Tc=0)\ \overline{Mc4}$$
$$Ics2=Cinr\ (Tc=0)\ Mc3\ \overline{Mc4}$$
$$Ics1=Cinr\ (Tc=0)\ \overline{Mc3}\ \overline{Mc4}$$

For the single numeric output this data inserted in C*s* has the configuration of the Tab character:

$$Cs6\text{–}1=010101$$

For the first half double-precision numeric output, the configuration of this data inserted in C*s* is not recognizable by the Control Typewriter: $Cs=010110$. This improper code results in no further action by the Control Typewriter.

When T*s* reaches 7 the signal E*os* issues, which resets M*c*1 and resets M*c*3, if it is on. The operation terminates following the setting of the E*od* flip-flop and the firing of the Y*eo* one-shot, as described in the preceding section for single numeric Control Typewriter input.

*Parity Bit Generation*

In the output mode ($\overline{Mc2}$) the contents of C*s*1–6 are completely ring shifted during each T*s*-cycle while C*sp* generates the parity bit for these contents. This parity bit is generated to provide an even number of 1's in the complete character to be transmitted from the seven C*s* flip-flops.

The complete ring shift of the C*s*1–6 contents is directed by the six states of the T*s*-counter from 2–7; as follows:

$$Ics(i)=(Tsa+Tsb)\ Cs(i+1)$$

During this ring shift, the contents of C*s* are serially shifted toward C*s*1. The bit in C*s*1 is sampled by the C*sp* input inverter.

C*sp* is initially in the 0-state. When the T*s*-counter commences its cycle, C*sp* responds to the original bit in C*s*1 and to each additional bit shifted into C*s*1. C*sp* changes its state whenever the bit in C*s*1 is a 1; as follows:

$$Icsp=(Tsa+Tsb)(Csp\ \overline{Cs1}+\overline{Csp}\ Cs1)$$

When $Ts=2$, the original contents of C*s*1 are sampled and when $Ts=3$, C*sp* reflects the state of this sample. When $Ts=7$, the bit originally in C*s*6 is in C*s*1, so that when T*s* returns to 0, the state of C*sp* reflects the entire contents of C*s*1–6. At this time, if C*s*1–6 contains an even number of 1's, $Csp=0$, whereas if C*s*1–6 contains an odd number of 1's, $Csp=1$.

*Control Typewriter Output From P-Register Second Half Double-Precision Word*

In this operation, the Control Typewriter receives the second half of a double-precision word from the P-register after the first half of the double-precision word has been transferred to the Control Typewriter and after a new Instruction 59 has been executed by the Central Processor to prepare the P-Buffer for this operation. The transfer of data takes place under control of only the P-Buffer and the Control Typewriter.

The new Instruction 59 sets the Mode-Control flip-flops to $Mc1\ \overline{Mc2}\ Mc3\ Mc4$. The $Mc3$ and $Mc4$ flip-flops, being on together, indicate that the second half of a double-precision word is involved.

This operation is similar to the single numeric output operation previously described.

Since the first half of a double-precision word contains the condition digit for the entire double-precision word, the condition digit of the second half is suppressed during this operation; whereby the numeric portion of the second half may be typed adjacent the numeric portion of the first half, if desired. This is accomplished by encoding the condition digit, during the first $Ts$-cycle, into a character that is not recognizable by the Control Typewriter. During this first $Ts$-cycle the inputs to $Cs6$ are continuous 1's; as follows:

$$Ics6=(Tc=1)\ Mc1\ Mc4$$

Following insertion of the encoded condition digit into $Cs$, the contents of $Cs$ ring shift-down. During this ring shift action continuous 1's enter into $Cs6$, filling $Cs6$–1 with 1's, a configuration which is not recognizable by the Control Typewriter and, therefore, the read-out of such character results in no action by the Control Typewriter.

Following the first $Ts$-cycle, the numeric contents of P are transferred to the Control Typewriter, in the manner described in the preceding section on P-Buffer output operation. One difference between the instant operation and the previously described output operation is the technique for zero suppression. Zeros are not normally suppressed in this half word operation. The flip-flop $Gm1$ is not transferred to the 1-state when the Mode-Control flip-flops are set. However, if this operation follows an output operation for a first half double-precision word having all 0's in the numeric portion, $Gm1$ is still on when the instant operation starts. In such instance, 0's will continue to be suppressed for the more significant numeric digits of the word in P. However, if the fourth zero has been suppressed, $Gm1$ will automatically be reset and the last two digits of the numeric word will type-out; as follows:

$$*\overline{Gm1}=Tca\ Tcb\ Mc1\ \overline{Mc2}\ Mc4\ (Ts=0)$$

The remaining features whereby this operation differs from the previously described output operation lies in the type of putaway character employed, and in the ability of the operator to select the putaway character used. The logic for automatically generating a putaway character when $Tc$ reaches the 0-state is:

$$Ics6=Cinr\ (Tc=0)\ Mc3\ Gm2\ Klmd$$
$$Ics5=Cinr\ (Tc=0)\ Mc3$$
$$Ics4=\text{Automatic reset}$$
$$Ics3=Cinr\ (Tc=0)\ Mc3$$
$$Ics2=\text{Automatic reset}$$
$$Ics1=Cinr\ (Tc=0)\ Mc3\ Mc4$$

The character generated is controlled by the $Gm2$ signal, which enables $Ics6$. If the A13 flip-flop is turned on by this Instruction 59, $Gm2$ is correspondingly turned on; whereas, if A13 remains off, $Gm2$ remains off. If $Gm2=1$, $Cs6$–$1=110101$, the configuration for the Car Ret character. If $Gm2=0$, $Cs6$–$1=010101$, the configuration for the Tab character.

At the conclusion of this operation, the signal $Eos$ resets the $Mc3$ and $Mc1$ flip-flops.

*Control Typewriter Output From P-Register; Alphanumeric Word*

In this operation the Control Typewriter receives an alphanumeric word from the P-register after a previous Instruction 59 has been executed by the Central Processor to prepare the P-Buffer for this operation. The transfer of data takes place under control of only the P-Buffer and the Control Typewriter.

The previous Instruction 59 sets the Mode-Control flip-flop to $Mc1\ \overline{Mc2}\ \overline{Mc3}\ Mc4$. The $\overline{Mc3}\ Mc4$ combination indicates that an alphanumeric word is involved.

This operation is similar to the second half double precision output operation previously described, except that no putaway character is generated by the P-Buffer.

When $Mc1$ goes on, the one-shot $Yfr$ fires and the first $Rdy$ is generated, as previously described. The manner of generation of the first and succeeding $Rdy$ signals is the same as for the single numeric output operation. Therefore, the waveforms of FIG. 31 for the single numeric output operation are equally applicable to this operation, with the exception that $Can=1$ for the entire operation; as follows:

$$Can=\overline{Mc3}\ Mc4$$

When $Rdy$ occurs the first time, the $Ts$-counter starts through its first cycle. When the $Ts$-counter is in the 1-state the signal $Cinr$ occurs and gates the encoded condition digit from P7 to $Cs$. However, since both $Mc1$ and $Mc4$ are on, 1's are continuously gated into $Cs6$ during this first $Ts$-cycle; as follows:

$$Ics6=(Tc=1)\ Mc1\ Mc4$$

After the parity bit is generated for the output character, $Cs$ is filled with 1's, a character not recognizable by the Control Typewriter. Therefore, the condition digit in the P-register has no effect on the Control Typewriter.

The signal $Tsp$ occurs; as follows:

$$Tsp=Tsa+Tsb\ Tsc+Tsb\ (Tc=0)$$

The clock signals $Sp$ and $Cap$ issue only five times for each $Ts$-cycle, except for the last $Ts$-cycle when $Tc=0$. Thus, during the first $Ts$-cycle the contents of P ring shift-down five digit positions and $Tc$ is counted up to 010. Therefore, at the end of the first $Ts$-cycle the MSD of the most significant of the alphanumeric characters is in P1 and its LSD is in P7.

The timing of this operation is illustrated by the following timing diagram:

ALPHANUMERIC OUTPUT

| Tca Tcb Tcc | Execution | P-Register contents |
|---|---|---|
| 001 | Em59 issues | C654321 |
| 010 | Condition digit gated to Cs, but has no effect on Control Typewriter. P contents ring shift-down five digit positions. Parity bit generated for character in Cs. | 54321C6 |
| 011 | Most significant alphanumeric character gated to Cs and transferred to Control Typewriter. P contents ring shift-down five digit positions. Parity bit generated for character in Cs. | 321C654 |
| 000 | Next alphanumeric character gated to Cs and transferred to Control Typewriter. P contents ring shift-down five digit positions. Parity bit generated for character in Cs. | 1C65432 |
| 001 | Least significant alphanumeric character gated to Cs and transferred to Control Typewriter. P contents ring shift-down six digit positions. Parity bit generated for character in Cs. Clear Mc1. | C654321 |

Once again, R*dy* occurs, and the T*s*-counter starts. When $Ts=1$, the digit in P7 is copied into C*s*1–4 and the contents of P11, P12 are encoded respectively into C*s*5, 6; as follows:

$$Ics6=Cinr\ \overline{Mc3}\ Mc4\ \overline{P12}$$
$$Ics5=Cinr\ \overline{Mc3}\ Mc4\ P11$$
$$Ics4=Cinr\ Can\ Pd$$
$$Ics3=Cinr\ Ps$$
$$Ics2=Cinr\ Can\ Pm2$$
$$Ics1=Cinr\ Can\ Pm1$$

The I*cs*(*i*) inputs above occur each time $Ts=1$ for all T*s*-cycles following that when $Tc=1$; i.e., until the three alphanumeric characters are transferred to the Control Typewriter.

A parity bit is generated for the character in C*s*, as described before, and Y*tc* fires to transfer the alphanumeric character to the Control Typewriter. During this second T*s*-cycle, the P-register again ring shifts-down through five digit positions. At the end of the second T*s*-cycle, the second alphanumeric character is in P1 and P7, and $Tc=011$.

The signal R*dy* occurs again, and the T*s*-cycle recurs again, the second alphanumeric character is transferred to the Control Typewriter, and the P-register ring shifts-down through five digit positions to place the least significant alphanumeric character in P1 and P7. During this third T*s*-cycle, the T*c*-counter is inhibited from counting to the 4-state, and returns, instead, to the 1-state. T*ca* is inhibited from setting; as follows:

$$*Tca=(Tc=3)(Ts=7)(Mc3+\overline{Mc4})$$

When the T*c*-counter is in the 0-state, the next R*dy* signal initiates the operation-closing sequence, wherein the least significant alphanumeric character is encoded into C*s*, and is subsequently transferred to the Control Typewriter. At $Ts=7$, E*os* occurs, to terminate the operation. When the operation terminates, the P contents have been restored to their initial order.

*Register Type-Out, Register Type-In; General*

When the Central Processor is halted, the contents of the R, L, I, B, N, or P registers may be transferred to the Control Typewriter, or the R, I, or P-registers may be filled from the Control Typewriter. These actions are initiated from the Control Typewriter keyboard by first depressing the Enable key and then a key designating the type-out or type-in operation selected.

REGISTER TYPE-OUT

In this operation, the Control Typewriter receives the contents of the R, L, I, B, N, or P-registers.

The operation is initiated by the successive striking of two Control Typewriter keys. First, the Enable key is depressed, which causes the signal K*en*1 to enter the 1-state. One of the keys R, L, I, B, N, or T is then depressed, which causes the issuance of a respective one of the signals K*r*, K*l*, K*i*, K*b*, K*n*, or K*t*, according to whether the contents of the R, L, I, B, N, or P-registers are to be typed-out.

The depression of the two successive keys causes the five Central Processor registers R, L, I, B, and N to ring shift-down once. The Control Typewriter signal K*tc* is normally equal to 1. However, depression of any one of the keys R, L, I, B, N, or T causes K*tc* to drop to the 0-state. The I*rt* inverter follows K*tc*; as follows:

$$Irt=Ktc$$

The B*rt* flip-flop is then set; as follows:

$$*Brt=\overline{Irt}\ Ken1\ Kfi\ Ht1\ Ht2\ (\overline{Mc3}+Kt)$$

wherein the signal K*fi* issues from the Control Typewriter when it is prepared. B*rt* is thus set to 1 when $Mc3=0$, indicating that the P-register may accept data from a Central Processor register, or when $Kt=1$, indicating that the P-register contents are to be typed-out. The flip-flop R*tc* is immediately set; as follows:

$$*Rtc=Brt$$

With R*tc* in the 1-state, the ring shift-down of the five Central Processor registers commences with the simultaneous issuance of the signals P*rl*, P*i*, and P*bn*; as follows:

$$Prl=(Tsa+Tsb+Tsc)Rtc$$
$$Pi=(Tsa+Tsb+Tsc)(\overline{Tsa}+\overline{Tsb}+\overline{Tsc})Rtc$$
$$Pbn=(Tsa+Tsb+Tsc)\overline{Tsa}\ Rtc+\overline{Tsa}\ \overline{Tsb}\ \overline{Tsc}\ Rtc$$

The signal P*rl* gates the clock drivers SR76, SR and SRR*m*, which ring shift R, and the clock drivers SL, SL76, and SLL7 which ring shift L. The signal P*i* gates the clock drivers SC, SA, and SAC, which ring shift I. The signal P*bn* gates the clock drivers SB and SBB, which ring shift B, and SN which ring shifts N.

At the same time that the R*tc* flip-flop is set, the M*c*3 and M*c*4 flip-flops are set if the I, B, or N keys are depressed; as follows:

$$*Mc3=*Mc4=Brt\ \overline{Rtc}(Kb+Kn+Ki)$$

Thus, during the subsequent transfer to the Control Typewriter the P contents will be treated as the second half of a double-precision word and the condition digit will be suppressed.

The setting of B*rt* also initiates a full cycle of the T*s*-counter; as follows:

$$*Tsc=Brt\ \overline{Rtc}$$

Thus, as shown by the preceding equations for P*rl*, P*i*, and P*bn*, the R and L contents are ring shifted-down completely by clock signals occurring during $Ts=1$–7, the I contents are ring shifted-down completely by clock signals occurring during $Ts=1$–6 and the B and N contents are ring shifted-down completely by clock signals occurring during $Ts=1$–4.

The signal T*sp* occurs continuously from $Ts=1$–7 to control the issuance of C*ap* and S*p*, which cause the P-register to shift-down; as follows:

$$Tsp=Tsa+Tsb(Mc3+\overline{Mc4})+Tsc(\overline{Mc1}\ \overline{Mc2})$$

For the P-register type-out, the depressed key T causes the issuance of the signal S*pp*, which enables a complete ring shift-down of the P-contents; as follows:

$$Spp=(Tsa+Tsb+Tsc)\ Rtc\ Kt$$

Thus, during the first T*s*-cycle, the P-register shifts-down through seven digit positions to receive inputs from a Central Processor register and ring shifts-down if the P-register is to be typed-out.

As the five Central Processor registers ring shift-down, during this first T*s*-cycle, the contents of one are transferred into the P-register by gating data from the LSD position of the Central Processor register to P7. The designated data is gated into P in accordance with the Control Typewriter key depressed; as follows:

$$Ip(i)=Rtc\ Kr\ Rl(i)+Rtc\ Kl\ Ll(i)$$
$$+Rtc\ Ki\ Al(i)+Rtc\ Kn(\overline{Tsa}+\overline{Tsb}\ \overline{Tsc})Nl(i)$$
$$+Rtc\ Kb(\overline{Tsa}+\overline{Tsb}\ \overline{Tsc})Bl(i)$$

In accordance with the above equation, data is continuously transferred from the R, L, and I-registers to the P-register during the first T*s*-cycle. Therefore, at the end of the first T*s*-cycle, the P-register contains the entire contents of the R-register or the L-register. If the I-key had been depressed, P6–1 will contain the contents of I, but since the contents of the I-register had shifted completely around by clock signals occurring during $Ts=1-6$, P7 will also contain the LSD of I. For the I-register type-out, however, the condition digit is not transferred to the Control Typewriter, since the transfer is treated as the second half of a double-precision word. The contents of N or B are gated to P7 only during $Ts=2-5$ and during the next three clock periods no data is transferred to P7. Therefore upon depressing the B or N-key the first four digit positions of P will receive the contents of the respective B or N-registers and the 3 most significant positions of P will receive 0's.

Therefore, when the Ts-counter returns to 000, the P-register contains the data from the selected Central Processor register or retains the word it originally had, according to the Control Typewriter key that was depressed.

About 30 milliseconds after the Ts-counter returns to its 0-state, the Control Typewriter keys return to their rest position. Thus, Ken2 returns to its 1-state. The end order flip-flop Eod thereupon sets; as follows:

$$*Eod=Ken2\ Brt$$

In the clock period next following the setting of Eod, the Brt flip-flop is reset and the Yeo one-shot fires; as follows:

$$*\overline{Brt}=Eod$$
$$*Yeo=Eod\ Brt$$

The Yeo one-shot controls the time during which the Eod flip-flop is in its 1-state, in order that it may communicate the busy signal Pbz. When Yeo returns to its stable state the Eod flip-flop resets and, in turn, resets Rtc; as follows:

$$*\overline{Rtc}=\overline{Brt}\ \overline{Eod}$$

At the same time that Rtc is reset, the Mode-Control flip-flop Mc1 is set to indicate that the Control Typewriter is to receive a word from the P-register; as follows:

$$*Mc1=\overline{Eod}\ Rtc\ \overline{Brt}$$

At this time one of two previously described P-register output operations is initiated:

(a) If the Mode-Control flip-flops are in the state Mc1 $\overline{Mc2}$ $\overline{Mc3}$ $\overline{Mc4}$ the "Control Typewriter Output From P-Register; Single Numeric" operation is executed to empty the P-register.

(b) If the Mode-Control flip-flops are in the state Mc1 $\overline{Mc2}$ Mc3 Mc4 the "Control Typewriter Output From P-Register; Second Half Double-Precision Word" operation is executed to empty the P-register.

The second of these two operations is executed when the I, B, or N-registers are to be typed-out, and suppresses the condition digit contents of P.

Immediately upon the setting of the Mc1 flip-flop, the one-shot Yfr fires and the indicated P-register output operation is executed to empty P and complete the type-out operation.

REGISTER TYPE-IN

In this operation, the Control Typewriter transfers a word to the P-register, where it may be retained or transferred to the I-register or the R-register in the Central Processor.

The operation is initiated by the successive striking of two Control Typewriter keys. First, the Enable key is depressed, which causes the signal Ken1 to enter the 1-state. One of the keys Q, E, or W, is then depressed, according to whether the P-register is to retain the input word, whether the P-register is to transfer the input word to the I-register, or whether the P-register is to transfer the input word to the R-register. Depression of the Q-key causes the issuance of the signal Kqw, depression of the E-key causes the issuance of the signal Kew and depression of the W-key causes the issuance of the signal Kqw and Kew. Either one or both of the Manual Control flip-flops Mi1 and Mi2 are set by the signals Kqw and Kew; as follows:

$$*Mi1=Kqw\ (Ken1\ Kfi\ Ht1\ Ht2)\ \overline{Mc3}$$
$$*Mi2=Kew\ (Ken1\ Kfi\ Ht1\ Ht2)\ \overline{Mc3}$$

The Mode-Control flip-flops Mc1 and Mc2 are set by either Mi1 or Mi2 and, in turn, trigger the P-buffer into the normal single numeric input operation previously described:

$$*Mc1=\overline{Mc1}\ (Mi1+Mi2)\ \overline{Eod}\ Klmp$$
$$*Mc2=\overline{Mc2}\ (Mi1+Mi2)\ \overline{Eod}\ Klmd$$

Following the insertion of the complete input word into the P-register, a putaway character is inserted to start the operation-closing sequence. The Tc-counter is immediately set to the 000-state and one of three different courses will be followed during this last Ts-cycle, according to the state of the Manual Control flip-flops.

(I) Mi1 $\overline{Mi2}$: Neither Ppi nor Ppr issue, so that the input word is retained in the P-register when the operation concludes.

(II) $\overline{Mi1}$ Mi2: The Ppi signals commence as follows:

$$Ppi=(Tsa+Tsb+Tsc)(\overline{Tsa}+\overline{Tsb}+\overline{Tsc})\ \overline{Mi1}\ Mi2\ (Tc=0)$$

The Pp1 signals occur during $Ts=1-6$ and gate the contents of P1 to C6 as the contents of P ring shift-down during the final Ts-cycle. A Ppi signal causes the issuance of the clock driver signals SPC, SC, and SA. Thus, the numeric contents of the P-register are transferred to the I-register.

The P-register is treated as empty at the end of this operation, so that Mc3 is inhibited from setting as the operation-closing sequence terminates; as follows:

$$*Mc3=Eos\ Mc2\ \overline{Mi2}$$

(III) Mi1 Mi2: The Ppr signals commence; as follows:

$$Ppr=(Tsa+Tsb+Tsc)\ Mi1\ Mi2\ (Tc=0)$$

The Ppr signals occur during $Ts=1-7$ and gate the contents of P1 to R7, as the contents of P ring shift-down during the final Ts-cycle. A Ppr signal causes the issuance of the clock driver signals SPR7, SR76, and SR. Thus, the entire contents of the P-register are transferred to the R-register.

The condition digit in P enter R7 as Ts returns to the 0-state. The mod-bits now in R7 are those which were first inserted in P7 when the condition digit was entered from the Control Typewriter (i.e., 01). However, when $Ts=7$, the modulo-3 of the numeric portion of the P contents has been accumulated in Gm2, 1. The condition digit modulo-3 is not accumulated in Gm2, 1 for this operation, because Gmt is inhibited by Mi2 at $Ts=7$ (see section "Modulo-3 Generation for Numeric Inputs to P-register"). Therefore, when Ts enters the 0-state, Gm2, 1 continues to retain the modulo-3 of the numeric portion of the word in R.

At this time the signal Eod occurs and causes the issuance of Pmr; as follows:

$$Pmr=Eod\ Mi1\ Mi2$$

As Pmr issues, if the bit in either Gm2 or Gm1 differs from the respective bit in Rm2 or Rm1, the bit in Gm2 or Gm1 is transferred to the corresponding Rm2 or Rm1 by Pmr; as follows:

$$*Rm2=Gm2\ Pmr$$
$$*\overline{Rm1}=\overline{Gm1}\ Pmr$$

The mod-bits now in R7 represent the modulo-3 of the numeric portion of the word therein. Thus, this action differs from that of encoding the contents of $Gm2$, 1 to make the total modulo-3 of the word in P equal to +1, as is done for the condition digit in P in the normal single numeric input operation.

The P-register is treated as empty at the end of this operation, so that $Mc3$ is inhibited from setting as the operation terminates.

At the conclusion of all of the three courses described above the $Mi1$ and $Mi2$ flip-flops are reset, if they are on; as follows:

$$*\overline{Mi1}=\overline{Mi2}=Eod$$

MULTIPLEX BUFFER OPERATIONS

The Multiplex Buffer comprising the Write Buffer (FIG. 32) and the Read Buffer (FIG. 40), which has been described previously, provides an intermediate storage function for data words being transferred from Memory to a Tape Handler for storage on magnetic tape or to the Printer and for data being transferred from a Tape Handler or the Character Reader to Memory. The Multiplex Buffer temporarily stores data during these transfers to accommodate the relatively slow rate of the Tape Handler, Printer, and Character Reader action to the relatively fast rate of the Memory and its controlling Central Processor.

This transfer of data is initiated by an appropriate programmed instruction (65, 66 or 68), which is executed in the Central Processor, but is continued and carried to completion under control of the Multiplex Buffer. The programmed instruction is intended primarily to set certain controls in the Multiplex Buffer, so that when the instruction is completed, the Multiplex Buffer can continue the operation.

The succeeding sections provide details of the operation of the system in effecting the following six types of data transfer:

(*a*) The writing of one block of 100 data words on magnetic tape from consecutive memory locations, initiated by Instruction 66;

(*b*) The printing of one block of 100 data words by the Printer from consecutive memory locations, initiated by Instruction 66;

(*c*) The writing of one block of 100 data words on magnetic tape from five groups (blockettes) of memory locations, wherein each group comprises 20 consecutive memory locations, initiated by Instruction 68;

(*d*) The printing of one block of 100 data words by the Printer from five groups (blockettes) of memory locations, wherein each group comprises 20 consecutive memory locations, initiated by Instruction 68;

(*e*) The storing in consecutive memory locations of one block of 100 data words from magnetic tape, initiated by Instruction 65; and (*f*) The storing in consecutive memory locations of one line of data read from a document by the Character Reader, initiated by Instruction 65.

The descriptions of Instructions 65, 66 and 68, where appropriate, complement the descriptions to follow.

The speed of a Tape Handler is adjusted so that a complete data word may be written on the magnetic tape thereof every 64 clock periods of the Central Processor or so that a complete data word may be read from the magnetic tape thereof every 64 clock periods of the Central Processor. It is desirable that the Central Processor not be idle during the entire 64 clock periods between Memory communications with the Multiplex Buffer, but instead, that the Central Processor continue to execute a program while the Memory is being loaded or unloaded by a Multiplex Buffer operation. However, when the Write Buffer has been unloaded and is ready to receive another word from Memory, or when the Read Buffer is full and is ready to transmit this word to Memory, the Central Processor must temporarily cease its data word exchanges with the Memory until the Multiplex Buffer exchange is completed. One of three types of operations will occur at this time; i.e., when the Memory is employed to receive data from or to transmit data to the Multiplex Buffer. These operations may be classified as program-interrupt operations, instruction-parallel operations, and instruction-interrupt operations.

The program-interrupt operation interrupts the sequential execution of instructions of the current program to effect the transfer of a data word between Memory and Multiplex Buffer. This operation is entered when the Multiplex Buffer is ready for the data word communication with Memory, provided that the instruction then being executed is nearing completion. When the instruction thereupon concludes, the program-interrupt operation, rather than the next-instruction, occurs immediately following the signal *End*. During the program-interrupt operation a word is transferred between the Multiplex Buffer and Memory, and following the operation the Central Processor continues executing the program from the point of interruption.

The instruction-parallel operation effects the data word transfer between Memory and Multiplex Buffer without interrupting the program. This operation is executed during certain instructions at a time when the Memory is not being employed by the Central Processor. Thus, for example, during Instruction 72 the Central Processor obtains the operand from Memory by $t9$ and does not again employ the Memory until the next-instruction is obtained. If the addition operation of Instruction 72 requires the additional complementing subsequence from $t33$–$t40$, no access to the Memory is required from $t10$–$t36$. Therefore, if the Multiplex Buffer is ready to exchange a word with Memory in this latter interval, such an exchange is effected while the Central Processor concurrently executes the corresponding portion of Instruction 72.

The instruction-interrupt operation interrupts the execution of an instruction. This operation is employed during the lengthy search and sorting instructions (i.e., Instructions 31, 35 and 36). During one of these instructions the Memory is in continuous use, so that an instruction-parallel operation cannot be employed, and the Multiplex Buffer cannot wait for the instruction to conclude in order to execute a program-interrupt operation. Therefore, the execution of the instruction is interrupted, a data word is exchanged between Multiplex Buffer and Memory, and the instruction proceeds.

Operations wherein a data word is transferred from Memory to Multiplex Buffer, for writing on magnetic tape or for printing, employ the Write Buffer and will be termed Write Buffer operations. Operations wherein data is transferred from the Multiplex Buffer to Memory, after data is read from tape or the Character Reader, involve the Read Buffer, and are termed Read Buffer operations.

Inasmuch as one Tape Handler can be writing data on magnetic tape at the same time as another Tape Handler is reading data from magnetic tape, both Write Buffer and Read Buffer may demand access to the Memory at the same time. Access priority to the Memory must be established between the Write Buffer and the Read Buffer. If the Write and Read Buffers both demand access to the Memory at the same time, the Read Buffer is given first priority, and the Read Buffer is first unloaded into Memory by one of the three types of Multiplex Buffer operations described above. After the Read Buffer operation is completed, the Write Buffer operation takes place. However, if the blockette variation of the Write Buffer operation is being executed when the Read Buffer demands access to the Memory, the Read Buffer must wait until this variation operation is completed.

*Write Buffer Operations*

The Write Buffer receives 100 data words from Memory to be written on magnetic tape or to be printed by the Printer. These 100 data words are received during 100 Write Buffer operations which follow execution of an Instruction 66 or 68 by the Central Processor. Any one of three types of Write Buffer operations may be employed to transfer a data word from Memory to Write Buffer. The operation employed depends on the particular instruction being executed when the Write Buffer demands a word from Memory and depends on the degree of completion of the instruction when the demand occurs. The three types of operations are: write program-interrupt operation, write instruction-parallel operation and write instruction-interrupt operation. Additionally, when blockettes are being written (initiated by Instruction 68), each of the three types of Write Buffer operations is modified when the 20th, 40th, 60th and 80th words are transferred from Memory to the Write Buffer. This modification is termed the blockette variation of the particular type of Write operation.

The Write Timer, T*w*, of the Multiplex Buffer, causes the setting of the write demand flip-flop, L*w*, once during each 64 clock periods of the Central Processor. The Multiplex Buffer L*w* flip-flop, when on, indicates that the Write Buffer is empty and that the Memory must supply the Write Buffer with another data word. The L*w* signal causes the Central Processor to cooperate in the execution of a Write Buffer operation to fill the Write Buffer. The W*bk*-counter insures that exactly 100 data word demands are made for a word from Memory, following execution of an Instruction 66 or 68.

The Write Buffer is prepared to write a block of 100 words on magnetic tape by an Instruction 66 or 68. Execution of Instruction 66 sets the W*eb* flip-flop in the Multiplex Buffer and transfers the first write-memory location address to the A*w*-register, this address being divisible by 20. The W*eb* flip-flop controls the writing of the 100 words of data. Also, during Instruction 66, the Load, Write flip-flop, L*w*, is set in order that the first data word may be transferred from Memory to Write Buffer during, or immediately following, execution of the next sequential instruction of the program. Instruction 66 also sets the Tape Handler Busy Writing flip-flop, W*b*, in the Tape Control Unit, and stores the Tape Handler identification in the W*t*-register of the Tape Control Unit. (For details, see the description of Instruction 66.) Execution of Instruction 68 presets the same Multiplex Buffer and Tape Control Unit flip-flops that are set during Instruction 66, and, in addition, sets the B*lk* flip-flop so that the 100 words of data are received from five blockette positions in Memory.

The Write Buffer may also be prepared by Instruction 66 or 68 to transfer a block of 100 words to the Printer, rather than to magnetic tape. This preparation is similar to that for transfer of data to tape, except that the Print-On-Line Select flip-flop P*rt* is also set during the corresponding Instruction 66 or 68.

Following execution of Instruction 66 or 68, 100 write operations, comprising any combination of the three types of Write Buffer operations, occur to transfer 100 data words from Memory to Write Buffer.

WRITE PROGRAM-INTERRUPT OPERATION

This operation (FIG. 239) interrupts the sequential execution of instructions of the current program to effect the transfer of a data word from Memory to Write Buffer. The operation is initiated if the demand flip-flop, L*w*, is set before the issuance of the T*i* signal of the last T-cycle of an instruction, but following any earlier T*i* signal which may issue during the instruction. If the L*w* flip-flop is set before any earlier T*i* signal of the instruction, either an instruction-parallel or an instruction-interrupt operation will be executed. Furthermore, even though L*w* is set before the T*i* signal of the last T-cycle, if the instruction is followed by an automatic Instruction 25 or 26, an instruction-parallel operation occurs. A table illustrating the clock period when the L*w* signal initiates the write program-interrupt operations for the various programmable instructions follows:

TABLE OF MULTIPLEX BUFFER OPERATIONS EMPLOYED WHEN DEMAND SIGNALS (U*r* or L*w*) ARE PRESENT AT T*i*

| Inst.[1] | Clock period when T*i* occurs | Clock periods duration of instruction | Type of multiplex buffer oper. |
|---|---|---|---|
| 21 | 12 | 16 | Prog-Int.[2] |
| 25 | 12 | 16 | Prog-Int. |
| 26 | 12 | 16 | Prog-Int. |
| 27 | 12 | 16 | Prog-Int. |
| 28 | 12 | 16 | Prog-Int. |
| 29 | 12 | | Parallel. |
| | 20 | 24 | Prog-Int. |
| 31 | 20 of each comparison subsequence. | | Inst-Int.[3] |
| | 28 of inst.-closing subsequence. | 32 (closing clock period). | Prog-Int. |
| 35 | 20 of each tumbling subsequence. | 24 (closing clock period). | Inst-Int. if $\overline{W3}$; Prog-Int. if W3=1. |
| 36 | 20 of each comparison subsequence. | | Inst-Int. |
| | 28 of inst.-closing subsequence. | 32 (closing clock period). | Prog-Int. |
| 42 | 12 of initial subsequence. | 16 (end of initial subsequence). | Parallel. |
| | 44 of T*d* subsequence | 48 (closing clock period). | Do. |
| | 12 of mod-bit generation. | 16 | Prog-Int. |
| 43 | 20 of initial subsequence. | 24 (end of initial subsequence). | Parallel. |
| | 28, 36 of T*z* subsequence. | | Do. |
| | 44 of T*d* subsequence | 48 (closing clock period). | Do. |
| | 12 of mod-bit generation. | 16 | Prog-Int. |
| 50 | 4 | 8 | Prog-Int. |
| 52 | 4 | 8 | Prog-Int. |
| 53 | 4 | 8 | Prog-Int. |
| 54 | 4 | 8 | Prog-Int. |
| 57 | 4 | 8 | Prog-Int. |
| 58 | 4 | 8 | Prog-Int. |
| 59 | 4 | 8 | Prog-Int. |
| 60 | 4 | 8 | Prog-Int. |
| 61 | 4 | 8 | Prog-Int. |
| 62 | 4 | 8 | Prog-Int. |
| 63 | 4 | 8 | Prog-Int. |
| 64 | 4 | 8 | Prog-Int. |
| 65 | 4 | 8 | Prog-Int. |
| 66 | 4 | 8 | Prog-Int. |
| 67 | 4 | 8 | Prog-Int. |
| 68 | 4 | 8 | Prog-Int. |
| 70 | 12 | 16 | Prog-Int. |
| 71 | 12 | 16 | Prog-Int. |
| 72 | 12 | 16 (if no comp.) | Parallel if comp.; Prog-Int. if no comp. |
| | 20 (if comp.[4]) | 24 (if comp.) | Prog-Int. |
| 73 | 12 | 16 (if no comp.) | Parallel if comp.; Prog-Int. if no comp. |
| | 20 (if comp.) | 24 (if comp.) | Prog-Int. |
| 74 | 12 | 16 | Prog-Int. |
| 75 | 12 | 16 | Prog-Int. |
| 76 | 12 | 16 | Prog-Int. |
| 80 | 20 | 24 | Prog-Int. |
| 81 | 20 | 24 | Prog-Int. |
| 82 | 20 | 24 (if no comp.) | Parallel if comp.; Prog-Int. if no comp. |
| | 28 (if comp.) | | Parallel. |
| | 36 (if comp.) | 40 (if comp.) | Prog-Int. |
| 83 | 20 | 24 (if no comp.) | Parallel if comp.; Prog-Int. if no comp. |
| | 28 (if comp.) | | Parallel. |
| | 36 (if comp.) | 40 (if comp.) | Prog-Int. |
| 85 | 20 | 24 | Prog-Int. |
| 86 | 20 | 24 | Prog-Int. |
| 87 | 20 | 24 (if no comp.) | Parallel if comp.; Prog-Int. if no comp. |
| | 28 (if comp.) | | Parallel. |
| | 36 (if comp.) | 40 (if comp.) | Prog-Int. |
| 88 | 20 | 24 (if no comp.) | Parallel if comp.; Prog-Int. if no comp. |
| | 28 (if comp.) | | Parallel. |
| | 36 (if comp.) | 40 (if comp.) | Prog-Int. |
| 90 | 12 | | Parallel. |
| | 20 | 24 | Prog-Int. |
| 91 | 12 | 16 | Prog-Int. |
| 92 | 12 | | Parallel. |
| | 20 | 24 | Prog-Int. |
| 93 | 12 | | Parallel. |
| | 20 | 24 | Prog-Int. |
| 94 | 12 | | Parallel. |
| | 20 | 24 | Prog-Int. |
| 97 | 12 | 16 | Prog-Int. |

[1] Inst. = Instruction.
[2] Prog-Int. = Program-Interrupt.
[3] Inst-Int. = Instruction-Interrupt.
[4] Comp. = Complement.

The above table illustrates that a write program-interrupt operation takes place if the L*w* flip-flop is turned on prior to *t*12 of Instruction 21. If L*w* is turned on prior to *t*12 of Instruction 29, a write instruction-parallel operation occurs, but if L*w* is turned on following *t*12, but before *t*20, a write program-interrupt operation occurs.

The write program-interrupt operation is initiated by the setting of the J*w* flip-flop, if the L*w* flip-flop is on when the proper T*i* signal occurs, according to the preceding table; as follows:

$$*Jw = Ti\ Lw\ \overline{Ur}$$

The above expression for *J*w* illustrates the precedence accorded the Read Buffer operations. The L*w* signal will not be recognized if the Read Buffer demand signal, U*r*, is present. The *J*w* signal will not issue until the Read Buffer demand is satisfied and the U*r* flip-flop has been turned off.

During a T*i* signal when *J*w* occurs, the XNA signal is inhibited by L*w*. Therefore, the next-instruction address is not transferred to the A-register, but, instead, the clock signal XA*w*A issues to transfer the write-memory location address to the A-register. The write-memory location is the address in Memory from which the next data word is to be transferred to the Write Buffer. The clock signal XAA*w* also issues to transfer the contents of the A-register to A*w*, but this address is not normally employed during this operation. The clock signals XA*w*A and XAA*w* issue as follows:

$$\text{Gate-}XAwA = \text{Gate-}XAAw = Ti\ Lw\ \overline{Ur}$$

During the following memory cycle-A, the data word in the addressed memory location is transferred to the M-register.

Following the issuance of the *J*w* signal, the current instruction is executed to completion, and the E*nd* signal thereof issues. The timing sequence then reverts to *t*1.

At *t*1 several signals normally issue for this operation.

(*a*) The Multiplex Buffer clock signal XMW*b* issues; as follows:

$$\text{Gate-}XMWb = Web\ \overline{Tp}\ \overline{Tq}\ Ts\ Jw$$

and gates the data word in the M-register to the W*b*-register of the Multiplex Buffer. Only the 1-output signals of the M-register flip-flops are transferred to the W*b*-register, since the W*b*-register has been previously cleared, (*b*) The L*w* flip-flop is cleared, (*c*) The C*au* signal issues to count the A-register contents up by 1 to the address of the next sequential write-memory location, and (*d*) The *W*bf* signal issues to turn on the "Write Buffer Full" flip-flop, W*bf*, to indicate that the Write Buffer is loaded. (The W*bf* flip-flop is subsequently reset when the Write Buffer has been emptied.)

Certain signals also issue under special conditions at *t*1:

(*e*) The *B*bf* signal issues if the state of the W*bk*-counter is 6, $$*Bbf = Web\ (\overline{Tp}\ \overline{Tq}\ Ts)\ Jw\ (Wbk=6)$$

to denote that the beginning-of-the-block data word has been transferred to the W*b*-register. The signal B*bf* enables the setting of the W*bk*-counter to the 7-state and thereby enables the counting of the W*bk*-counter and the T*w*-counter to commence. The signal *B*bf*, therefore, occurs during a write program-interrupt operation only when the first word of the block is transferred to the Write Buffer, and (*f*) The *E*ws* signal issues to set the write sub-alarm, E*ws*, if the W*bf* flip-flop is on at this time, indicating that the Write Buffer has not been cleared when this new data word is to be transferred thereto.

At *t*2 the clock signals XAA*w* and XA*w*A issue to effect an exchange of the contents of the A-register and the A*w*-register. Thus, the address of the next write-memory location is transferred to the A*w*-register for storage until the next Write Buffer operation occurs. These clock signals issue as follows:

$$\text{Gate-}XAwA = \text{Gate-}XAAw = Jw\ \overline{Tp}\ Tq\ \overline{Ts}$$

At *t*2, the contents of the C-register are set to 51, 55, or 56, according to the command number of the preceding instruction, by the action of (T1 J*w*) at *t*1.

Also issuing at *t*2 is the Central Processor signal B*ls*, provided the new write-memory location address in the A-register is divisible by 20, or has the last two digits thereof equal to 00. The B*ls* signal issues after each group of 20 words has been transferred from Memory to the Write Buffer. The 20th, 40th, 60th, 80th, or 100th word is transferred to the Write Buffer when the write-memory location address has as the respective last two digits 19, 39, 59, 79, or 99 at the start of the Write Buffer operation. However, these A-register contents are counted up by 1 at *t*1 and are divisible by 20, or have the last two digits 00, at *t*2. The B*ls* signal counts the W*bk*-counter up by 1 each time it issues. Therefore, the W*bk*-counter is counted up five times by the B*ls* signal while 100 data words are transferred from Memory to Write Buffer.

At *t*4 the signal XNA occurs and transfers the next-instruction address to the A-register. This is the address of the next sequential instruction in the program being executed by the Central Processor.

At *t*8 the signal E*nd* issues to terminate the write program-interrupt operation. In the following clock period the timing sequence returns to *t*1 and the next programmed instruction is executed.

A precaution is taken during this operation to prevent the setting of the mod-alert flip-flop A*mm* and the halting of the system. The signal XMJ always occurs at *t*1 and transfers the contents of M to J. If the word transferred is alphanumeric, J*mg*2, 1 is set to 1, 1 at *t*1 by sampling the M*m*2, 1 contents. Setting J*mg*2, 1 to 1, 1 prevents accumulation of the modulo-3 of the word in J and, therefore, prevents setting the A*mm* flip-flop. (See Instruction 21.)

WRITE INSTRUCTION-PARALLEL OPERATION

This operation (FIG. 240) effects the transfer of a data word from Memory to Write Buffer at the same time that an instruction is being executed. The operation is initiated if the demand flip-flop, L*w*, has been set before the issuance of a T*i* signal in an instruction that is followed by eight clock periods when the Memory is not needed. Thus, generally, this instruction takes place prior to the last T-cycle of those instructions wherein it occurs. The single exception to this rule is for those instructions that are followed by an automatic mod-bit generation Instruction 25 or 26. For such exceptions, although the signal E*nd* occurs, the automatic mod-bit generation continues for eight additional clock periods.

The preceding table "Multiplex Buffer Operations" illustrates those instructions wherein a write instruction-parallel operation takes place, by the designation "Parallel." The table illustrates, for example, that if L*w* is turned on prior to *t*12 of Instruction 29, a write instruction-parallel operation occurs, since the Memory is not again employed until *t*21. Again, if L*w* is turned on prior to *t*12 of Instruction 90, a write instruction-parallel operation occurs even though the signal E*nd* occurs at *t*16. Following *t*16 of Instruction 90 the mod-bit generation Instruction 25 is automatically executed for the next eight clock periods, so that the Memory is not again needed until the equivalent *t*21.

The write instruction-parallel operation is initiated by the setting of the J*w* flip-flop, if the L*w* flip-flop is on when the proper T*i* signal occurs. The signal XNA is inhibited when T*i* occurs. As in the write program-interrupt operation, the write-memory location is transferred from A*w* to A and the word in the addressed write-memory location is transferred to the M-register.

The instruction being executed then continues into its next T*b*-cycle, unless it is an instruction which is about to end and to be followed by the T*b*-cycle of a mod-bit generation instruction. In this instance the signal E*nd* occurs four clock periods after the J*w* flip-flop sets.

At the first T*b*1 after J*w* sets, the write instruction-parallel operation takes place. This operation is similar to that previously described for the write program-interrupt operation with but two minor differences. The first difference is that the C-register contents are not changed, since the command number of the instruction currently being executed is retained. At the following T*b*8 the signal E*nd* may occur, or not, according whether the instruction being executed has been completed, or is to conclude with a mod-bit generation instruction. If the instruction terminates at this T*b*8 the next clock period will normally be *t*1, but if the instruction is not completed, this next clock period will be T*b*1.

FIGURE 240 illustrates that if the J*w* flip-flop is set during a T*d* subsequence of Instruction 42, or during the initial subsequence thereof, one or more T*z* subsequences may occur before the next T*b*1 signal issues. Similarly, following T*b*8 of the write instruction-parallel operation, one or more T*z* subsequences may occur before the next T*b*1 signal issues.

The precaution to prevent the setting of the mod-alert flip-flop A*mm*, which was taken during the write program-interrupt operation, need not be taken during this operation, because if the data word is transferred into the J-register, the transfer occurs at T*b*1. At T*b*1, the J-mod-generator is responsive to an alphanumeric word in the J-register and will prevent the A*mm* flip-flop from setting.

WRITE INSTRUCTION-INTERRUPT OPERATION

This operation interrupts the execution of an instruction to effect the transfer of a data word from Memory to Write Buffer. The operation is initiated if the demand flip-flop, L*w*, is set before the issuance of any T*i* signal, except the last T*i* signal, of Instructions 31, 35 and 36. If the L*w* flip-flop is set before only the last T*i* signal of these three instructions, a write program-interrupt operation will occur. The preceding table "Multiplex Buffer Operations" illustrates those instructions wherein a write instruction-interrupt operation occurs. (For additional details of the effect of the write instruction-interrupt operation on the execution of Instructions 31, 35 and 36, see the subsections entitled "Halt, Search or Tumble Variations" in the instruction descriptions.)

The write instruction-interrupt operation is initiated by the setting of the J*w* flip-flop, if the L*w* flip-flop is on when the proper T*i* signal occurs; as follows:

$$*Jw = Ti\ Lw\ \overline{Ur}$$

As in the write program-interrupt operation, the clock signal XA*w*A issues to transfer the write-memory location address to the A-register. Following the setting of the J*w* flip-flop, and the transfer of the write-memory address to the A-register, the data word in the addressed memory location is transferred to the M-register.

Additionally, the signal *H*st* issues in the clock period following T*i*; as follows:

$$*Hst = (31,\ 35,\ 36)\ Jw\ \overline{Tz}\ \overline{W3}\ \overline{T1}$$

The H*st* flip-flop is employed to "remember" that an Instruction 31, 35, or 36 was interrupted to allow the execution of a Write Buffer operation. When the Write Buffer operation has been completed, the H*st* flip-flop directs the Central Processor to commence executing the instruction, that was interrupted, from the point of interruption.

Immediately after the T*b*8 clock period which follows the setting of the J*w* flip-flop, the timing sequence reverts to *t*1 by the setting of the T1 flip-flop; as follows:

$$*T1 = Hst\ Tb8$$

The T*b*1 and T*b* flip-flops are inhibited from setting at T*b*8 by the issuance of the H*st* signal. Starting at this new *t*1, an operation is executed which is similar to the previously described write program-interrupt operation, but with the following differences:

(*a*) The C-register contents are changed to 51, 55, or 56 according to whether the instruction being executed was respectively 31, 35, or 36;

(*b*) The signal XNA is inhibited at *t*4, so that the address originally in the A-register when the instruction-interrupt operation was initiated remains therein when the interrupt operation is completed;

(*c*) The signal E*nd* is inhibited by the H*st* flip-flop at *t*8; and (*d*) Signals to restore to the C-register its original 31, 35, or 36 contents issue at *t*8.

Therefore, in the clock period next following *t*8 of the write instruction-interrupt operation, the original Instruction 31, 35, or 36 continues from the precise point at which it was interrupted.

A signal to reset the H*st* flip-flop issues in the first clock period of the continuation of the original instruction; as follows:

$$*\overline{Hst} = Tb1$$

BLOCKETTE VARIATION OF WRITE BUFFER OPERATIONS

These operations (FIG. 241) are variations of the three previously described Write Buffer operations, and occur during the transfer of the 100 data words from Memory to Write Buffer following execution of an Instruction 68. These variations, however, occur only for those Write Buffer operations which transfer the 20th, 40th, 60th, 80th and 100th words of the block to the Write Buffer, and provide the starting memory address of the next blockette. The variation is directed by the B*lk* flip-flop, which is in the 1-state during the transfer of the entire 100 words from Memory to Write Buffer following an Instruction 68. (For additional details, refer to the description of Instruction 68.)

The Write Buffer operation to transfer the 20th, 40th, 60th, 80th, or 100th word from Memory to Write Buffer commences at T*i* signal when the L*w* flip-flop is in the 1-state, and is either a program-interrupt, instruction-parallel, or an instruction-interrupt operation, according to the conditions prescribed in the three preceding subsections. At the following T_2, the write-memory location address in the A-register is counted up by 1 and becomes divisible by 20, or its last two digits become 00. Therefore, the signal *J*m*20 issues; as follows:

$$*Jm20 = \overline{Tp}\ Tq\ \overline{Ts}\ \overline{A14}\ \overline{A13}\ \overline{A12}\ \overline{A11}\ (A24 + \overline{A21})\ (\overline{A24} + A21)\ Jw\ Blk$$

At T_3, the clock signals XA*w*A and XAA*w* issue to exchange the contents of the A and A*w*-registers, and to thereby restore the original address in A to A*w*. These two signals issue as follows:

$$\text{Gate-}XAwA = \text{Gate-}XAAw = Jm20\ (\overline{Tp}\ Tq\ Ts)$$

This action makes available this original address for the write-instruction-interrupt operation.

At T_4 the signal J*m*20 inhibits the issuance of the clock signal XNA and enables the issuance of the clock signal XA*t*A; as follows:

$$\text{Gate-}XAtA = Jm20\ Jw\ Ti$$

The clock signal XA*t*A effects the transfer of the contents of the W*bk*-counter to the three least significant digit positions of A1 and sets the remaining eleven address bits in the A-register to 0. Thus, J*m*20 places the contents of the W*bk*-counter in the A-register to form the location of the next word to be obtained from Memory. The resulting memory addresses 0000, 0001, 0002, and 0003 store the respective starting write-memory location addresses for the second, third, fourth, and fifth blockettes of twenty words to be transferred to the Write Buffer.

The W*bk*-counter is counted to the 0, 1, 2, and 3-states following transfer of the last word of the respective first, second, third, and fourth blockettes to the Write Buffer. As was described in the "Write Program-Interrupt Operation" subsection, the B*ls* signal issues immediately after the write-memory location is counted up to a multiple of 20, or has its two least significant digits set to 00, and counts the W*bk*-counter up by 1. The following table illustrates how the W*bk*-counter has its state changed by the signal B*ls* immediately following transfer of the last word of a blockette.

| Following: | W*bk*-counter changed to: |
|---|---|
| 1st word transfer | 7 |
| 20th word transfer | 0 |
| 40th word transfer | 1 |
| 60th word transfer | 2 |
| 80th word transfer | 3 |
| 100th word transfer | 4 |

For example, the 40th word is the last word of the second blockette. Immediately after this 40th word is transferred from Memory to Write Buffer, the W*bk*-counter is changed to the 1-state. With the W*bk*-counter in the 1-state, the address 0001 is placed in the A-register by the XA*t*A signal. The instruction word in the 0001 address contains as an address portion the write-memory location address of the first word of the third blockette.

Following T_5, the word in one of memory locations 0000, 0001, 0002, 0003, 0004 is transferred to the M-register. At T_8, the signal E*nd* will occur if a write instruction-parallel operation was being executed and the current instruction has ended; otherwise, the signal E*nd* does not occur at T_8 for the parallel operation. If, however, a write program-interrupt or a write instruction-interrupt operation was being executed, the C-register has the number 51, 55, or 56 in it, and the signal E*nd* occurs; as follows:

$$End=(51,\ 55,\ 56)\ Ta8\ (\overline{Hst}+Jr+Jw+Jm20)$$

Thus, the second T-cycle of a blockette variation operation is always a T*a*-cycle, unless a write instruction-parallel operation was being executed and the current instruction did not terminate. At T_2 of the second T-cycle of the blockette variation, the C-register contents are changed to 51, 55, or 56 if they are not already in that configuration, and if a write instruction-parallel operation is not being continued. At this time the clock signal XMA also issues; as follows:

$$\text{Gate-}XMA=Jm20\ (\overline{Tp}\ Tq\ \overline{Ts})$$

The signal XMA functions to transfer the contents of the three least significant digits and the two least significant bits of the fourth digit (i.e., the address portion) of the word in the M-register directly to the A-register. This is the write-memory location address of the first word of the next blockette. This address may be any memory location; except that it should be divisible by 20.

In the clock period following the issuance of XMA, the J*m*20 flip-flop is reset and the signals XA*w*A and XAA*w* issue to exchange the new write-memory location in the A-register with the address in the A*w*-register. These two signals issue for the same logic as for the preceding T_3, above.

In the next clock period the signal XNA issues, if a write program-interrupt or write instruction-parallel operation was being executed, and places the next-instruction address in the A-register. However, if a write instruction-interrupt operation was being executed XNA is inhibited by H*st*.

Thus, in the blockette variation of the Write Buffer operation an additional T-cycle is provided in order to obtain the starting memory address of the next blockette from a predetermined location in Memory and to store this starting memory address in the A*w*-register. When the next word is demanded by the Write Buffer, this new address in A*w* causes data words to be transferred from a new blockette location in Memory.

WRITE BUFFER DATA TRANSFER FOR MAGNETIC TAPE WRITING

The timing of the Write Buffer (FIG. 32) is under control of the T*w*-counter (FIGS. 152 and 153). The T*w*-counter is a binary counter, adapted to count to 64 and then to recycle. The T*w*-counter halts in the 62-state if the W*bk*-counter (FIG. 154) is in the 6-state, and remains in the 62-state until the W*bk*-counter is set to the 7-state. After the W*bk*-counter is set to the 7-state, the T*w*-counter counts through 100 complete cycles as the W*bk*-counter is counting through one cycle. When the W*bk*-counter again reaches the 6-state, the T*w*-counter has completed 100 cycles and again halts in the 62-state.

Each time that the T*w*-counter is in the 22-state, except during its 100th cycle ($Wbk=5$), the demand flip-flop, L*w*, is set and causes a data word to be transferred from Memory to the W*b*-register. This word is then transferred to magnetic tape during the next T*w*-cycle and the L*w* demand flip-flop is set once again. The relationships between the Write Buffer signals and the states of the T*w*-counter are shown in FIG. 242.

Following execution of an Instruction 66 or 68, the first data word is transferred to the W*b*-register, this transfer usually taking place before the T*w*-counter and the W*bk*-counter commence counting. The B*bf* flip-flop, which is set during Instructions 66 and 68, enables the setting of the W*bk*1 flip-flop and, consequently, the transfer of the W*bk*-counter to the 7-state. The Tape Handler addressed by the W*t*-register starts feeding tape past the write heads thereof and when the α-block marker is detected, the Block Marker Analyzer (FIG. 35), delivers the W*sy* signal. The W*sy* signal sets the W*bk*-counter to the 7-state; as follows:

$$*Wbk1=Wsy\ Bbf\ \overline{Prt}\ \overline{Wbk1}$$

The W*bk*-counter will then be counted up by 1, after transfer of the 20th, 40th, 60th, 80th, and 100th data words to the Write Buffer, by the Central Processor signal B*ls*. After the 100th word has been transferred to the Write Buffer, the W*bk*-counter is set to the 4-state and the T*w*-counter is in its 99th cycle. When the T*w*-counter reaches the 1-state in the 100th cycle, the W*bk*-counter is counted to 5; as follows:

$$*Wbk1=(Wbk=4)(Tw=1)$$

When the T*w*-counter next reaches the 60-state, the W*bk*-counter is set to the 6-state; as follows:

$$*Wbk2=(Wbk=5)(Tw=60)\overline{Prt}$$

and the counting of W*bk* halts. The T*w*-counter then halts in the 62-state.

When the W*bk*-counter is first transferred to the 7-state, the T*w*-counter is set to the 63-state; as follows:

$$*Tw1=\overline{Tw1}\ (Wbk\neq 6)$$

and continues counting for 100 complete cycles.

Consider the operation of the Write Buffer during the first 99 T*w*-cycles. The data word is in the W*b*-register when the T*w*-counter reaches the 0-state. When $Tw=1$ the sub-alarm flip-flop, E*ws*, sets if the L*w* flip-flop is still on, indicating that a word has not been loaded into the Write Buffer. From $Tw=1$ to $Tw=3$, the shift signals SW*b*1/4, SW*b*5/7, and SW*a*1 issue to shift-up the combined contents of the W*a* and W*b*-registers through 3 digit positions. Thus, by $Tw=4$, the data word has its 3 most significant digits in the W*a*-register and its 4 least significant digits in W*b*7 to W*b*4. At $Tw=1$, W*b*1 is cleared; as follows:

$$*\overline{Wb1(i)}=1$$

since the SW*b*1/4 signal is applied to the clock pulse input terminals of the W*b*1 flip-flop. During $Tw=2$ and $Tw=3$ this 0 digit in $Wb1$ is shifted into and also clears $Wb2$ and $Wb3$.

During $Tw=1$ to $Tw=3$, the shift signal $SPwr$ also issues to gate the contents of $Wb7$ to the $Pwr$ flip-flops. The $Pwr$ flip-flops, at this time, accumulate the row parity bits for the data word in the Write Buffer. The row parity bit when added to the number of 0's in the 7 bits of like bit-order of the data word provides an odd number. The generation of the row parity bits in $Pwr$ is accomplished by first setting all $Pwr$ flip-flops to 1; as follows:

$$*Pwr(i)=1$$

The $Pwr$ flip-flops are set to 1 each time the $SWot$ clock signal issues, since the $SWot$ signal is applied to the clock pulse input terminals of the $Pwr$ flip-flops. The $SWot$ signal issues each time a digit is transferred to magnetic tape. The state of the $Pwr$ flip-flops is then changed for every binary 1 applied thereto. Therefore, a $Pwr$ flip-flop is in the 0-state after receiving an odd number of 1's, and in the 1-state after receiving an even number of 1's. This change of state of the $Pwr$ flip-flops occurs as follows:

$$\#Pwr(i)=SPwr\ Wb7(i)\ \overline{Pwr(i)}$$
$$\#\overline{Pwr(i)}=SPwr\ Wb7(i)\ Pwr(i)$$

Consequently, after each $Pwr$ flip-flop has sampled all 7 bits of the corresponding bit-order of the data word in the Write Buffer, it will be in the 1-state if there are an even number of 1-bits (odd number of 0-bits), and in the 0-state if there are an odd number of 1-bits (even number of 0-bits). Therefore, each bit-order stored on tape always contains an odd number of 0's therein.

During $Tw=4$ to $Tw=7$, the shift signals $SWb5/7$ and $SWb7/4$ ring shift-up the contents of $Wb7$ to $Wb4$ while the shift signal $SPwr$ gates the contents of $Wb7$ to the $Pwr$ flip-flops. Therefore, at $Tw=8$, $Pwr$ contains the row parity bits for the entire data word in the Write Buffer.

At $Tw=8$, the $SWot$ signal issues to gate the most significant digit, which is in $Wa3$, and the row parity bits, which are in $Pwr$, to the input logic gates (Write Zeros, FIG. 32) of the respective $Wo6$–9 and $Wo1$–4 flip-flops. The signal $SWot$ issues; as follows:

$$\text{Gate-}SWot=Tw4\ \overline{Tw3}\ \overline{Tw2}\ \overline{Tw1}\ \overline{Prt}\ \overline{Bbf}$$

Only Zeros are written on magnetic tape. Zeros are represented by reversals of the magnetic field polarity in the corresponding tape tracks (FIG. 35). The current through a write head is reversed only when a zero is to be written by that head.

As shown in FIG. 36, each $Wo$ flip-flop is coupled through a write driver to the corresponding write head of the Tape Handler then addressed. Whenever a $Wo$ flip-flop changes state, the direction of the magnetic field provided by the write driver changes, and thereby writes a 0 on the tape. Therefore, only the 0-bits of data to be written on magnetic tape are transferred to the $Wo$ Write Buffer output flip-flops. The states of the $Wo1$–4 and $Wo6$–9 flip-flops are changed when the corresponding bit to be written is a 0. For example:

$$*Wo7=\overline{Wa32}\ \overline{Wo7}$$
$$*\overline{Wo7}=\overline{Wa32}\ Wo7$$

The above expressions illustrate that the $Wo7$ flip-flop changes its state only when the bit to be written thereby, which is stored in $Wa32$, is a 0. The $Wo7$ flip-flop is only responsive to the contents of $Wa32$ when the signal $SWot$ occurs, inasmuch as the $SWot$ signals are applied to the clock pulse input terminals of the $Wo7$ flip-flop.

At the same time that the two digits are gated to $Wo1$–4 and $Wo6$–9 for writing on tape, the column parity-bit for each of these digits is generated and stored in the respective $Wo5$ and $Wo10$ flip-flops. When $Tw=8$, the $SWot$ signal is applied to the clock pulse input terminals of the $Wo5$ and $Wo10$ flip-flops and enables the transfer thereto of the respective column parity bits, which are generated by the corresponding logical input networks thereof (Column Parity Gen., FIG. 32). The two Column Parity Generator logical networks sample the respective bits in $Wa3$ and $Pwr$ to determine whether the bits to be inserted into $Wo5$ and $Wo10$ should be 0's, in order to provide an odd number of 0's for each half of the magnetic tape column to be written. Therefore, if an even number of 0's is stored in $Wa3$ or $Pwr$, the corresponding Column Parity Generator issues a signal to generate the storing of a 0 in the respective one of the $Wo5$ and $Wo10$ flip-flops. For example:

$$Pwc1=(\overline{Pwr1}+Pwr2)(Pwr1+\overline{Pwr2})(\overline{Pwr3}+Pwr4)(Pwr3+\overline{Pwr4})$$
$$Pwc2=(Pwr1+Pwr2)(\overline{Pwr1}+\overline{Pwr2})(Pwr3+Pwr4)(\overline{Pwr3}+\overline{Pwr4})$$

If either $Pwc1$ or $Pwc2$, from the Column Parity Generator for $Wo5$, represents a binary 1, there is an even number of 0's in $Pwr$, and $Wo5$ must change state to write a 0 on tape; as follows:

$$*Wo5=(Pwc1+Pwc2)\overline{Wo5}$$
$$*\overline{Wo5}=(Pwc1+Pwc2)Wo5$$

In a similar manner, either $Pwc3$ or $Pwc4$, from the Column Parity Generator for $Wo10$, represents a binary 1 to change the state of $Wo10$, if an even number of 0's are in $Wa3$.

Thus, the row parity digit and the MSD of the data word are written side-by-side on magnetic tape in tracks 1–4 and 6–9 (FIG. 35). At the same time, the column parity bit of the row parity digit is written in track 5 and the column parity bit of the MSD is written in track 10.

During $Tw=10$ and 11 the signals $SWb1/4$, $SWb5/7$ and $SWa1$ issue to shift-up the combined contents of the $Wa$ and $Wb$-registers through 2 digit positions, and the signal $SWa2$ gates the contents of $Wa3$ to the $Pwr$ flip-flops. Hence, at $t12$, the 5th to 1st digits of the data word to be written are in $Wa3$–$Wa1$ and $Wb7$, 6 and the 6th digit is in $Pwr$. The contents of $Wb5$–$Wb1$ have been cleared. At $Tw=24$ the $SWot$ signal again issues to gate the 0's of the 6th and 5th digits and their respective column parity bits to the respective $Wo1$–5 and $Wo6$–10 flip-flops. The 6th and 5th digits are then written side-by-side on magnetic tape, the 6th digit being written in the same tracks, but following, the row parity digit, and the 5th digit being written in the same tracks, but following, the MSD.

During $Tw=26$ and 27 the signals $SWb1/4$, $SWb5/7$ and $SWa1$ issue to shift-up the combined contents of the $Wa$ and $Wb$-registers through 2 digit positions, and the signal $SWa2$ gates the contents of $Wa3$ to the $Pwr$ flip-flops. Hence, at $Tw=28$, the 3rd to 1st digits of the data word to be written are in $Wa3$–$Wa1$, the 4th digit is in $Pwr$, and the $Wb$-register has been cleared. At $Tw=27$, the signal $*\overline{Wbf}$ issues to reset the $Wbf$ flip-flop and indicate that the $Wb$-register has been emptied and cleared. At $Tw=40$, the $SWot$ signal again issues to gate 0's of the 4th and 3rd digits and their respective column parity bits to the respective $Wo1$–5 and $Wo6$–10 flip-flops.

Meanwhile, at $Tw=22$, the $*Lw$ signal issues to demand another word from Memory. The setting of the $Lw$ flip-flop initiates a write program-interrupt, write instruction-parallel, or write instruction-interrupt operation in the Central Processor to effect the transfer of another word from Memory to the $Wb$-register. Referring to the corresponding subsection for these operations, it will be seen that $Tw=29$ is the earliest time when the new data word can be transferred into the $Wb$-register. When $Tw=29$, the $Wb$-register has been cleared. Thus, the ensuing Write Buffer operation places in the $Wb$-register the next data word to be written, although a portion of the preceding data word is still in the $Wa$-register. The writing of this next word can, therefore, commence smoothly and without delay as soon as the preceding word has been completely transferred to magnetic tape.

During $Tw=42$ and 43, the signal SW$a$1 issues to shift-up the W$a$ contents through 2 digit positions, and the signal SW$a$2 gates the contents of W$a$3 to the P$wr$ flip-flops. Hence, at $Tw=44$, the LSD of the data word to be written is in W$a$3, and the 2nd digit is in P$wr$. At $Tw=56$, the SW$ot$ signal again issues to gate the 2nd and 1st digits and their respective column parity bits to the respective W$o$1–5 and W$o$6–10 flip-flops.

Following the writing of the last two digits of the data word on magnetic tape, the T$w$-counter counts to 63, returns to 0, and the next word, which has already been stored in the W$b$-register, is written on tape.

When the T$w$-counter enters its 100th (last) cycle, the W$bk$-counter is counted up to 5 when $Tw=1$. The 100th word in the W$b$-register is then written on tape in accordance with the procedure described above. However, during this 100th T$w$-cycle, *L$w$ is suppressed at $t22$, since $Wbk=5$, and no further data word is received by the W$b$-register.

When the T$w$-counter again reaches the 60-state, the 100th word has been written on magnetic tape, so that the W$bk$-counter is set to the 6-state and halts. With W$bk$ in the 6-state, the T$w$-counter stops in the 62-state. The $\gamma$-block marker on magnetic tape is then sensed and the Block Marker Analyzer, FIG. 35, issues the W$ed$ signal, which resets the W$eb$ and W$b$ flip-flops; as follows:

$$*\overline{Web}=Web\ Wed\ \overline{Prt};\ *\overline{Wb}=Wed$$

and the write operation terminates. Data will only again be written on magnetic tape if another Instruction 66 or 68 is executed.

WRITE BUFFER DATA TRANSFER FOR PRINTER

The operation and timing of the Write Buffer for transfer of 100 data words to the Printer (FIG. 242) is similar to that previously described for transferring 100 data words to magnetic tape, differing in but three respects; as follows:

(*a*) The required signals for starting the counting of the T$w$-counter and the W$bk$-counter,
(*b*) The system for gating the digit contents of the P$wr$ and W$a$3 flip-flops to the W$o$ flip-flops, and
(*c*) The signal sequence for terminating the transfer of data to the Printer during the 100th T$w$-cycle.

The points of similarity will not be repeated in this section, the operation of the Write Buffer for these points of similarity having been described in the preceding section. Only the above-mentioned points of difference will be described herein.

Since data is not being written on magnetic tape, the tape block markers are not employed to initiate the counting of the T$w$ and W$bk$-counters and to terminate the write operation. Instead following an Instruction 66 or 68 which directs that 100 data words be transferred to the Printer by setting the P$rt$ and B$bf$ flip-flops, the L$pr$ signal issues from the Printer to indicate that the Printer is ready to receive data. The L$pr$ signal causes the W$bk$-counter to be set to the 7-state, by setting the W$bk$1 flip-flop; as follows:

$$*Wbk1=Lpr\ Bbf\ Prt\ \overline{Wbk1}$$

Thus, the L$pr$ signal replaces the W$sy$ signal, which was generated by detecting the $\alpha$-block marker in the tape write operation. With the transfer of the W$bk$-counter to the 7-state, the T$w$-counter commences counting through its 100 cycles to transfer 100 data words to the Printer.

When $Tw=2$, the B$bs$ signal issues to notify the Printer that the first word is ready to be transferred thereto; as follows:

$$Bbs=Bbf\ Prt\ \overline{Tw6}\ Tw2$$

From $Tw=1$ to $Tw=8$, the row parity digit is generated, and the row parity digit and the MSD are stored respectively in the P$wr$ and W$a$3 flip-flops. When $Tw=8$, the SW$op$ signal issues; as follows:

$$\text{Gate-}SWop=Tw4\ \overline{Tw3}\ \overline{Tw2}\ \overline{Tw1}\ (Prt+Bbf)$$

The SW$op$ signal gates the contents of P$wr$ and W$a$3 through register transfers to the respective W$o$1–W$o$4 and W$o$6–W$o$9 flip-flops. Column parity-bits are not employed for this operation, and, therefore, the W$o$5 and W$o$10 flip-flops are not actuated.

Similarly, when $Tw=24$, $Tw=40$, and $Tw=56$, the SW$op$ signal gates the digit contents of P$wr$ and W$a$3 to the respective W$o$1–4 and W$o$6–9 flip-flops. When $Tw=10$, 26, 42, and 58, the Read Buffer signal W$os$ issues; as follows:

$$Wos=Tw4\ \overline{Tw3}\ Tw2\ (Prt+Bbf)$$

to signal the Printer that two digits are in the W$o$ flip-flops for receipt by the Printer.

At the end of the 100th T$w$-cycle, after the 100th data word has been transferred to the Printer from the W$o$ flip-flops, a sequence of actions, distinctive to this Printer operation, takes place. By $Tw=60$ of the 100th T$w$-cycle the W$bk$-counter is in the 5-state. At $Tw=60$ the P$rt$ flip-flop of the Write Buffer is reset; as follows:

$$*\overline{Prt}=(Tw=60)\ (Wbk=5)$$

the B$bf$ flip-flop is again set; as follows:

$$*Bbf=(Tw=60)\ (Wbk=5)\ Prt$$

and the T$w$-counter is reset to the 45-state by the resetting of the T$w$5 flip-flop; as follows:

$$*\overline{Tw5}=Prt\ (Tw=60)\ (Wbk=5)$$

It is the function of the resulting additional 15 clock periods to allow generation of an end-of-block character for transfer to the Printer, in order to signal that the data transfer operation has terminated.

This end-of-the-block character comprises 1's in each bit position of the W$o$ flip-flops, and is generated by the issuance of each SW$op$ signal, whereby the P$wr$ flip-flops are set to the 1-state; as follows:

$$\#Pwr(i)=SWop\ (1)$$

and the W$a$ flip-flops are set to the 1-state; as follows:

$$*Wa3(i)=1$$

since the SW$op$ signal is applied to the clock pulse input terminals of the W$a$3 flip-flops. Therefore, all P$wr$ and W$a$3 flip-flops are preset to the 1-state at $Tw=56$, and remain in that state when the T$w$-counter is reset to 45 and counts once again to $Tw=56$. At this second $Tw=56$ of the 100th T$w$-cycle, the SW$op$ signal which issues gates the end-of-block character to the W$o$ flip-flops. SW$op$ is enabled at this time by the signal B$bf$, as shown in the preceding expression for Gate-SW$op$. When $Tw=58$, the W$os$ signal issues to notify the Printer that another pair of digits (end-of-block character) is available in the W$o$ flip-flops.

When the T$w$-counter again reaches the 60-state, the write operation terminates by the resetting of the W$eb$ flip-flop; as follows:

$$*\overline{Web}=(Tw=60)\ (Wbk=5)\ Bbf\ Web$$

and by the counting of W$bk$ to the 6-state; as follows:

$$\#Wbk2=*\overline{Wbk1}=(Tw=60)\ (Wbk=5)\ \overline{Prt}$$

Therefore, when the T$w$-counter reaches the 62-state, it halts and no more data can be transferred to the Printer until execution of another Instruction 66 or 68, which sets the P$rt$ flip-flop.

*Read Buffer Operations*

The Read Buffer transmits 100 data words which have been read from magnetic tape, or the data read from one line of magnetically imprinted documents, to the Memory for storage therein. These 100 data words are transmitted during 100 Read Buffer operations, which follow execution of an Instruction 65 by the Central Processor. Any one of three types of Read Buffer operations may be employed to transfer a data word from Read Buffer to Memory. The operation employed depends upon the particular instruction being executed when the Read Buffer demands that the word stored therein be transferred to Memory and depends on the degree of completion of the instruction when the demand occurs. The three types of operations are: read program-interrupt operation, read instruction-parallel operation, and read instruction-interrupt operation. The Read Timer, T*r*, of the Multiplex Buffer, causes the setting of the read demand flip-flop, U*r*, once during each 64 clock periods of the Central Processor. The Multiplex Buffer U*r* flip-flop, when on, indicates that the Read Buffer has a data word therein, and that the Memory must accept the data word. The U*r* signal causes the Central Processor to cooperate in the execution of a Read Buffer operation to empty the Read Buffer.

The Read Buffer is prepared to accept a block of 100 words from magnetic tape and to transfer the 100 words to the Memory by an Instruction 65. Execution of Instruction 65 sets the R*eb* flip-flop in the Multiplex Buffer and transfers the first read-memory location address to the A*r*-register, this address normally being divisible by 20. The R*eb* flip-flop controls the transfer of the 100 words of data read from magnetic tape to the Memory. Instruction 65 also sets the Tape Handler Busy Reading flip-flop, R*b*, in the Tape Control Unit, and stores the Tape Handler identification in the R*t*-register of the Tape Control Unit. (For details, see the description of Instruction 65.)

The Read Buffer may also be prepared by Instruction 65 to receive the data read from one line of a document by the Character Reader and to store this data in consecutive memory locations. This preparation is similar to that for reading data from magnetic tape, except that the Character Reader Select flip-flop, C*ha*, is also set during the corresponding Instruction 65.

Following execution of Instruction 65, 100 read operations, comprising any combination of the three types of Read Buffer operations, occur to transfer 100 data words from Read Buffer to Memory.

READ PROGRAM-INTERRUPT OPERATION

This operation (FIG. 243) interrupts the sequential execution of instructions of the current program to effect the transfer of a data word from Read Buffer to Memory. The operation is initiated if the demand flip-flop, U*r*, is set before the issuance of the T*i* signal of the last T-cycle of an instruction, but following any earlier T*i* signal which may issue during the instruction. If the U*r* flip-flop is set before any earlier T*i* signal of the instruction, either an instruction-parallel or an instruction-interrupt operation will be executed. Furthermore, even though U*r* is set before the T*i* signal of the last T-cycle, if the instruction is followed by an automatic Instruction 25 or 26, an instruction-parallel operation occurs. The preceding "Multiplex Buffer Operations" table illustrates the clock period when the U*r* signal initiates the read program-interrupt operations for the various programmable instructions.

The read program-interrupt operation is initiated by the setting of the J*r* flip-flop, if the U*r* flip-flop is on when the proper T*i* signal occurs, according to the "Multiplex Buffer Operations" table; as follows:

$$*Jr = Ti\ Ur\ \overline{Jm20}$$

The above expression for *J*r* illustrates the precedence accorded the blockette variation of Write Buffer operations. The U*r* signal will not be recognized if the J*m*20 signal is present. The *J*r* signal will not issue until the blockette variation operation is completed and the J*m*20 flip-flop has been turned off. However, the Read Buffer demand signal, U*r*, is accorded precedence over the Write Buffer demand signal, L*w*, as described in the preceding subsection "Write Program-Interrupt Operation."

During a T*i* signal when *J*r* occurs, the XNA is inhibited by U*r*. Therefore, the next-instruction address is not transferred to the A-register, but instead, the clock signal XA*r*A issues to transfer the read-memory location address to the A-register. The read-memory location is the address in Memory to which the next data word is to be transferred from the Read Buffer. The clock signal XA*r*A issues as follows:

$$\text{Gate-}XArA = Ti\ Ur\ \overline{Jm20}$$

During the following Memory cycle-A, the addressed read-memory location is cleared.

Following issuance of the *J*r* signal, the current instruction is executed to completion, and the E*nd* signal thereof issues. The timing sequence then reverts to *t*1. At *t*1 the $*\overline{Ur}$ signal issues to clear the U*r* flip-flop, and the M*wt* signal issues to gate the contents of the R*b*-register of the Read Buffer to the M-register of the Memory ($Mwt = Jr\ T1$). The signal J*r* gates the contents of the R*b* flip-flops to the respective M-register input inverters; as follows:

$$IMij = Rbij\ Jr$$

The signal M*wt*, in turn, gates the M-register input inverter signals to the corresponding M-register flip-flops; as follows:

$$*Mij = Mwt\ IMij$$
$$*\overline{Mij} = Mwt\ \overline{IMij}$$

Additionally, at *t*1, the C*au* signal issues to count the A-register contents up by 1 to the address of the next sequential read-memory location.

Following clock period *t*1, the data word in the M-register is transferred to the addressed memory location during the following Memory cycle-B.

At *t*2, the clock signal XA*r*A issues to effect an exchange of the contents of the A-register and the A*r*-register. Thus, the address of the next read-memory location is transferred to the A*r*-register for storage until the next Read Buffer operation occurs. This clock signal issues as follows:

$$\text{Gate-}XArA = Jr\ \overline{Tp}\ Tq\ \overline{Ts}$$

At *t*2 the contents of the C-register are changed to 51, 55, or 56, according to the command number of the preceding instruction, by the action of (T1 J*w*) at *t*1.

At *t*4 the signal XNA occurs and transfers the next-instruction address to the A-register. This is the address of the next sequential instruction in the program being executed by the Central Processor.

At *t*8 the signal E*nd* issues to terminate the read program-interrupt operation. In the following clock period the timing sequence returns to *t*1 and the next programmed instruction is executed.

A precaution is taken during this operation to prevent the setting of the mod-alert flip-flop A*mm* and the halting of the system. An instruction word is not transferred to the J-register at *t*1 and, therefore, the contents thereof may be an alphanumeric word from the preceding instruction. At *t*1, the J-mod-generator is not responsive to an alphanumeric word in the J-register and the A*mm* flip-flop might be set if an alphanumeric word were stored therein. Therefore, J*mg*2, 1 is set to 1, 1 at *t*1 whenever the J*r* flip-flop is in the 1-state at that time. Setting J*mg*2, 1 to 1, 1 prevents accumulation of the modulo-3 of the word in J*m* and, therefore, prevents setting the A*mm* flip-flop. (See Instruction 21.)

READ INSTRUCTION-PARALLEL OPERATION

This operation (FIG. 244) effects the transfer of a data word from Read Buffer to Memory at the same time that an instruction is being executed. The operation is initiated if the demand flip-flop, U*r*, has been set before the issuance of a T*i* signal in an instruction that is followed by eight clock periods when the Memory is not needed. Thus, generally, this instruction takes place prior to the last T-cycle of those instructions wherein it occurs. The single exception to this rule is for those instructions that are followed by an automatic mod-bit generation Instruction 25 or 26. For such exceptions, although the signal E*nd* occurs, the automatic mod-bit generation continues for eight additional clock periods.

The preceding table "Multiplex Buffer Operations" illustrates those instructions wherein a read instruction-parallel operation takes place by the designation "Parallel."

The read instruction-parallel operation is initiated by the setting of the J*r* flip-flop, if the U*r* flip-flop is on when the proper T*i* signal occurs. The signal XNA is inhibited when T*i* occurs.

The instruction being executed then continues into its next T*b*-cycle, unless it is an instruction which is about to end and to be followed by the T*b*-cycle of the mod-bit generation instruction. In this instance the signal E*nd* occurs four clock periods after the J*r* flip-flop sets.

At the first T*b*1 after J*r* sets, the read instruction-parallel operation takes place. This operation is similar to that previously described for the read program-interrupt operation with but two minor differences. The first difference is that the C-register contents are not changed, since the command number of the instruction currently being executed is retained. At the following T*b*8 the signal E*nd* may occur, or not, according to whether the instruction being executed has been completed, or is to conclude with a mod-bit generation instruction. If the instruction terminates at this T*b*8 the next clock period will normally be *t*1, but if the instruction is not completed, the next clock period will be T*b*1.

FIGURE 244 illustrates that if the J*r* flip-flop is set during a T*d* subsequence of Instruction 42, or during the initial subsequence thereof, one or more T*z* subsequences may occur before the next T*b*1 signal issues. Similarly, following T*b*8 of the read instruction-parallel operation, one or more T*z* subsequences may occur before the next T*b*1 signal issues.

The precaution to prevent the setting of the mod-alert flip-flop, A*mm*, which was taken during the read program-interrupt operation, need not be taken during this operation, because the start of this operation occurs at T*b*1. At T*b*1, the J-mod-generator is responsive to an alphanumeric word in the J-register and will prevent the A*mm* flip-flop from setting.

READ INSTRUCTION-INTERRUPT OPERATION

This operation interrupts the execution of an instruction to effect the transfer of a data word from Read Buffer to Memory. The operation is initiated if the demand flip-flop, U*r*, is set before the issuance of any T*i* signal, except the last T*i* signal, of Instructions 31, 35 and 36. If the U*r* flip-flop is set before only the last T*i* signal of these three instructions, a read program-interrupt operation will occur. The preceding table "Multiplex Buffer Operations" illustrates those instructions wherein a read instruction-interrupt operation occurs. (For additional details of the effect of the read instruction-interrupt operation on the execution of Instructions 31, 35 and 36, see the subsections entitled "Halt Search or Tumble Variations" in the instruction descriptions.)

The read instruction-interrupt operation is initiated by the setting of the J*r* flip-flop, if the U*r* flip-flop is on when the proper T*i* signal occurs; as follows:

$$*Jr = Ti\ Ur\ \overline{Jm20}$$

As in the read program-interrupt operation, the clock signal XA*r*A issues to transfer the read-memory location address to the A-register. Following the setting of the J*r* flip-flop, and the transfer of the read-memory address to the A-register, the addressed memory location is cleared.

Additionally, the signal *H*st* issues in the clock period following T*i*; as follows:

$$*Hst = (31,\ 35,\ 36)\ Jr\ \overline{Tz}\ \overline{W3}\ \overline{T1}$$

The H*st* flip-flop is employed to "remember" that an Instruction 31, 35, or 36 was interrupted to allow the execution of a Read Buffer operation. When the Read Buffer operation has been completed, the H*st* flip-flop directs the Central Processor to commence executing the instruction, that was interrupted, from the point of interruption.

Immediately after the T*b*8 clock period which follows the setting of the J*r* flip-flop, the timing sequence reverts to *t*1 by the setting of the T1 flip-flop; as follows:

$$*T1 = Hst\ Tb8$$

The T*b*1 and T*b* flip-flops are inhibited from setting at T*b*8 by the issuance of the H*st* signal. Starting at this new *t*1, an operation is executed which is similar to the previously described read program-interrupt operation, but with the following differences:

(*a*) The C-register contents are changed to 51, 55, or 56 according to whether the instruction being executed was respectively 31, 35, or 36;

(*b*) The signal XNA is inhibited at *t*4, so that the address originally in the A-register when the instruction-interrupt operation was initiated remains therein when an interrupt operation is completed;

(*c*) The signal E*nd* is inhibited by the H*st* flip-flop at *t*8; and (*d*) Signals to restore the C-register to its original 31, 35, or 36 contents issue at *t*8.

Therefore, in the clock period next following *t*8 of the read instruction-interrupt operation, the original Instruction 31, 35, or 36 continues from the precise point at which it was interrupted.

A signal to reset the H*st* flip-flop issues in the first clock period of the continuation of the original instruction; as follows:

$$*\overline{Hst} = Tb1$$

READ BUFFER DATA TRANSFER FOR MAGNETIC TAPE READING

The timing of the Read Buffer (FIG. 40) is under control of the T*r*-counter (FIGS. 173 and 174). The T*r*-counter is a register comprising five flip-flops, and is adapted to operate in 17 discrete states in predetermined sequence during magnetic tape reading, and then to recycle. The T*r*-counter counts in short bursts and then halts. Each burst is initiated when the two data words which are stored in each transverse recording position on the magnetic tape have been read by the tape read heads and stored in the digit input registers (R*in*1–5 and R*in*6–10) of the Read Buffer. During each burst, the T*r*-counter causes the transfer of the two digits in the digit input registers to the R*a*-register of the Read Buffer, and directs a column parity check on each of these digits. When the full data word is in the Read Buffer, the T*r*-counter executes its last burst of the cycle to complete a row parity check of the data word and to transfer the entire word to the Read Buffer R*b*-register, for subsequent transfer to Memory.

Each time that the T*r*-counter is in its 12-state, the demand flip-flop, U*r*, is set and causes the word in the R*b*-register to be subsequently transferred to Memory. The relationship between the Read Buffer signals and the states of the T*r*-counter are shown in FIG. 245.

Following execution of an Instruction 65, the Tape Handler addressed by the R*t*-register starts feeding magnetic tape past the read heads thereof, and when a $\beta$-block marker is detected, the Block Marker Analyzer (FIG. 35) delivers an R*sy* signal. The R*sy* signal enables the gates in the two channels of the data retiming circuit (FIG. 41), so that the data in the tape block immediately following the $\beta$-block marker will be transferred to the Read Buffer. The R*sy* signal continues while the full block is read and until the $\gamma$-block marker following this block is detected. The read preamplifiers (FIGS. 37 and 38) of the addressed *i*th Tape Handler are enabled by the corresponding signal N*r*(*i*) (FIG. 183) to receive the output signals of the corresponding read heads (FIG. 34). The enabled read preamplifiers provide an output signal whenever a recorded 0 is detected in the tape track read by the corresponding read head. The read preamplifier output signal alternates in polarity as successive 0's are read by the corresponding head, inasmuch as 0's are stored on the magnetic tape track by successive reversals of the magnetic field polarity.

The ten F*tr* read amplifiers (FIGS. 37 and 39) receive the output signals of the corresponding one of the ten preamplifiers of the addressed Tape Handler and deliver a binary 1 output signal at their F*tr*(*i*) output terminals so long as no binary 0 is read from the corresponding tape track. However, the read amplifiers deliver a binary 1 output signal at their $\overline{\text{F}tr(i)}$ output terminals whenever a binary 0 is detected by the corresponding read head. The F*tr*1–5 read amplifiers are preset to the 1-state by the clock signal X*r*1 during each clock period when the signal R*sy* equals 0 (i.e., when the data block is not yet being read) and whenever a complete digit has been read from tape tracks 1–5 and stored in the Read Buffer R*in*1–5 digit input register. Similarly, the F*tr*6–10 read amplifiers are preset to the 1-state by the clock signal X*r*2 during each clock period when the signal R*sy* equals 0, and whenever a complete digit has been read from tracks 6–10 and stored in the Read Buffer R*in*6–10 digit input register.

An F*tr* read amplifier is reset to the 0-state during the interval between the receipt of two successive presetting signals, if a binary 0 is detected by the corresponding read head during this interval. If no binary 0 is read in this interval, the read amplifier remains in its preset 1-state, indicating that the corresponding bit of the digit being read is a binary 1. The data retiming circuit of FIG. 41 permits all five bits of a digit read from tape to be stored in the corresponding read amplifiers until the entire digit has been read, and then directs the simultaneous transfer of these five bits to the Read Buffer. The data retiming circuit also signals the control circuits of the Read Buffer when both digits have been transferred thereto, in order that the Read Buffer may commence the processing of these digits. Thus, if the tape transverse recording position is skewed with respect to the read head array, the bits of the digits therein will not be read simultaneously by the read heads. Each bit, however, is temporarily stored in the corresponding read amplifier until the entire digit has passed the read head array. The data retiming circuit then transfers the entire digit to the Read Buffer. Further details of the data retiming circuit are provided in the following subsection, "Data Retiming During Magnetic Tape Reading."

The data retiming circuit, in cooperation with the read heads, the read preamplifiers, and the read amplifiers, causes the transfer of the pair of digits from a magnetic tape transverse recording position to the R*in*1–5 and R*in*6–10 digit input registers of the Read Buffer during an interval approximately 16 clock periods in duration. A complete data word is delivered to the Read Buffer during a 64 clock period interval. In addition to causing these digits to be transferred to the Read Buffer, the data retiming circuit sets the T*r*1 flip-flop of the T*r*-counter to the 1-state each time that the pair of digits from a transverse recording position is transferred to the Read Buffer.

The operation of the Read Buffer of FIG. 40 during transfer of a data word thereto from magnetic tape will now be described. Before the first digits of the data word are received by the Read Buffer, the T*r*-counter is in its 0-state, as shown in FIG. 245. As the magnetic tape passes the read heads, the row parity digit (designated R–P in FIG. 245) and the MSD (7th tape digit) of the tape data word are stored in the corresponding F*tr* read amplifiers.

When the five bits of the row parity digit have been read from tape and stored in the F*tr*1–5 read amplifiers, the data retiming circuit causes the S*in*1 signal to issue, which effects the transfer of the contents of F*tr*1–5 to the R*in*1–5 flip-flops of the Read Buffer. When the five bits of the MSD have been stored in the F*tr*6–10 read amplifiers, the data retiming circuit causes the S*in*2 signal to issue, which effects the transfer of the contents of F*tr*6–10 to the R*in*6–10 flip-flops of the Read Buffer. When the second of the S*in*1 and S*in*2 signals issues, the T*r*1 flip-flop of the Read Buffer is set to the 1-state and the T*r*-counter is thereby set to its 1-state.

The T*r*-counter automatically counts through the 2-state to the 3-state, whereupon it once again halts. When the T*r*-counter is in its 1-state, the shift signal SR*a* issues to gate the contents of R*in*1–4 to the R*a*1 position of the R*a*-register and the signal SR*in* issues to gate the contents of R*in*6–10 to R*in*1–5. When *Tr*=2, the signal SR*a* again issues to transfer the contents of R*a*1 to R*a*2 and to transfer the contents of R*in*1–4 to R*a*1. Therefore, when the T*r*-counter halts in the 3-state, the row parity digit is in R*a*2 and the MSD is in R*a*1. The transfer of the data word into the Read Buffer during the T*r*-cycle is illustrated in the following table entitled "Read Buffer Data Transfer." In this table, the symbol D–(*i*) stands for the *i*th digit of the data word being entered into the Read Buffer.

READ BUFFER DATA TRANSFER

| Tr State | Rb7 | Rb6 | Rb5 | Rb4 | Rb3 | Rb2 | Rb1 | Ra4 | Ra3 | Ra2 | Ra1 | Rin1–4 | Rin6–9 |
|---|---|---|---|---|---|---|---|---|---|---|---|---|---|
| 0 | | | | | | | | | | | | | |
| 1 | | | | | | | | | | | | R–P | D–7 |
| 2 | | | | | | | | | | | R–P | D–7 | |
| 3 | | | | | | | | | | R–P | D–7 | | |
| 4 | | | | | | | | | | R–P | D–7 | D–6 | D–5 |
| 5 | | | | | | | | | R–P | D–7 | D–6 | D–5 | |
| 6 | | | | | | | | R–P | D–7 | D–6 | D–5 | | |
| 7 | 1 | | | | | | | R–P | D–7 | D–6 | D–5 | D–4 | D–3 |
| 8 | Par R–P | | | | | | R–P | D–7 | D–6 | D–5 | D–4 | D–3 | |
| 9 | Par–7 | | | | | R–P | D–7 | D–6 | D–5 | D–4 | D–3 | | |
| 10 | Par–7 | | | | | R–P | D–7 | D–6 | D–5 | D–4 | D–3 | D–2 | D–1 |
| 11 | Par–6 | | | | R–P | D–7 | D–6 | D–5 | D–4 | D–3 | D–2 | D–1 | |
| 12 | Par–5 | | | R–P | D–7 | D–6 | D–5 | D–4 | D–3 | D–2 | D–1 | | |
| 13 | Par–4 | | R–P | D–7 | D–6 | D–5 | D–4 | D–3 | D–2 | D–1 | | | |
| 14 | Par–3 | R–P | D–7 | D–6 | D–5 | D–4 | D–3 | D–2 | D–1 | | | | |
| 15 | Par–2 | D–7 | D–6 | D–5 | D–4 | D–3 | D–2 | D–1 | | | | | |
| 16 | Par–1 | D–7 | D–6 | D–5 | D–4 | D–3 | D–2 | D–1 | | | | | |
| 0 | D–7 | D–6 | D–5 | D–4 | D–3 | D–2 | D–1 | | | | | | |

During $Tr=1$ and 2, the digit in R$in$1–5 is sampled for a column parity check. That is, the states of R$in$1–5 are inspected to determine if an odd number of 0's exist therein. If an odd number of 0's does not exist in R$in$1–5, the parity check fails and the read subalarm flip-flop, E$rs$, is set. Thus, when $Tr=1$, the column parity of the row parity digit is checked and when $Tr=2$, the column parity of the MSD is checked. The Column Parity Check logic circuit samples the digits of R$in$1–5 in two groups. The logical signal P$ce$ issues if an even number of 0's is present in R$in$1–3; as follows:

$$Pce=Rin1\ Rin2\ Rin3+\overline{Rin1}\ \overline{Rin2}\ Rin3 +\overline{Rin1}\ Rin2\ \overline{Rin3}+Rin1\ \overline{Rin2}\ \overline{Rin3}$$

and the logical signal P$co$ issues if an odd number of 0's is present in R$in$1–3; as follows:

$$Pco=\overline{Rin1}\ Rin2\ Rin3+Rin1\ \overline{Rin2}\ Rin3 +Rin1\ Rin2\ \overline{Rin3}+\overline{Rin1}\ \overline{Rin2}\ \overline{Rin3}$$

The logical signal P$cs$ issues if the two bits in R$in$4, 5 are both 1's or both 0's; as follows:

$$Pcs=(\overline{Rin4}+Rin5)\ \ (Rin4+\overline{Rin5})$$

and the logical signal P$cd$ issues if these two bits are different; as follows:

$$Pcd=(\overline{Rin4}+\overline{Rin5})\ \ (Rin4+Rin5)$$

These four column parity check logical signals are combined for providing a signal for the 1-logic input terminal of the E$rs$ flip-flop, and if the combination thereof indicates an odd number of 0's is not present in R$in$1–5, the E$rs$ flip-flop is set to the 1-state, to indicate a parity error; as follows:

$$*Ers=(Pce\ Pcs+Pco\ Pcd)\ Tr1\ (\overline{Tr3} +Tr2\ Tr3\ Tr4+\overline{Tr2}\ Tr3\ \overline{Tr5})\ \overline{Cha}$$

For example, if an even number of 0's is present in R$in$1–3, an odd number of 0's must be present in R$in$4, 5 for proper parity. Therefore, if P$cs$ issues when P$ce$ issues, there is not an odd number of 0's in R$in$4, 5 and the parity check fails.

After the T$r$-counter halts in the 3-state, the 6th and 5th digits are read from tape and transferred to the respective R$in$1–5 and R$in$6–10 flip-flops. After both digits have been transferred to the Read Buffer, the data retiming circuit again sets the T$r$1 flip-flop, and the T$r$-counter enters the 4-state. The T$r$-counter automatically counts through the 5-state to the 6-state, whereupon, it once again halts. When the T$r$-counter is in the 4-state, the shift signal SR$a$ issues to shift-up the contents of R$a$2, R$a$1, and R$in$1–4 by one digit position, and the signal SR$in$ issues to gate the contents of R$in$6–10 to R$in$1–5. When $Tr=5$, the signal SR$a$ again issues to shift-up through one digit position the contents of the R$a$-register and R$in$1–4. Therefore, when the T$r$-counter halts in the 6-state, the row parity digit and the three most significant digits of the input word are in R$a$4–R$a$1.

When $Tr=4$, the contents of R$in$1–5 are sampled to perform a column parity check on the 6th digit and when $Tr=5$, a column parity check is performed on the 5th digit.

The 4th and 3rd digits of the data word are next transferred to the Read Buffer, the T$r$-counter counts to the 9-state, the signals SR$a$ and SR$b$ issue twice, and when $Tr=9$, the 6 digits of the data word occupy the digit positions R$b$2, R$b$1 and R$a$4–R$a$1. When the two least significant digits are read from tape and transferred to the Read Buffer, the T$r$-counter is set to its 10-state, whereupon it automatically counts through its next six states to its 0-state, where it once again halts. During $Tr=10$–14 and $Tr=16$, the shift signals SR$a$ and SR$b$ issue to shift-up the digit contents of R$a$, R$b$ and R$in$1–4 by six digit positions, so that when the T$r$-counter reaches the 0-state, the seven digits of the data word are in the R$b$-register and ready to be transferred to Memory. (After row parity has been checked, the row parity digit is destroyed.) Therefore, when $Tr$ equals 12, the signal *U$r$ occurs to initiate a Read Buffer operation for transferring the data word in the R$b$-register to Memory. Thus, the R$b$-register holds the data word read from magnetic tape until a Read Buffer operation can transfer it to Memory, thereby freeing the R$a$-register to receive the first portion of the next word read from magnetic tape. The reading of this next word can, therefore, commence smoothly and without delay as soon as the preceding word has been completely read from the tape.

Meanwhile, commencing at $Tr=7$, a row parity check is executed on the data word in the Read Buffer. The row parity digit comprises four row parity bits. The total number of 0's in the eight bits of like bit order of the data word received from tape should be odd to provide a row parity check. The R$b$7 flip-flops accumulate the number of 0's in the eight digits received from tape, and after parity has been accumulated for all eight digits, the R$b$7 flip-flops provide a row parity check for all bit-rows of the data word. The R$b$7 flip-flops are preset to the 0001 state before each data word is read from tape (FIG. 163) by the signal R$ebd$, which occurs before the first data word of a block is read, and by the signal $Jr(T=1)$, which issues during each Read Buffer operation. Therefore, if the three most significant bits of R$b$7 accumulate an odd number of 0's, they should be in the 1-state for proper row parity check, and conversely, the least significant bit of R$b$7 should be in the 0-state. If any one of the four bits of R$b$7 is not in the proper state after accumulating all eight bits of the corresponding bit order, the read subalarm E$rs$ is set.

The R$b$7 flip-flops commence accumulating the row parity of the input data word upon issuance of the R$p$1 signal at $Tr=7$. Therefore, when $Tr=8$, R$p$1 has gated the row parity digit of the input word to the R$b$7 flip-flops from the R$a$4 flip-flops as follows:

$$*Rb7(i)=Rp1\ \overline{Ra4(i)}\ \overline{Rb7(i)}$$
$$*\overline{Rb7(i)}=Rp1\ \overline{Ra4(i)}\ Rb7(i)$$

Thus, each R$b$7 flip-flop changes its state when a binary 0 is applied thereto from the corresponding R$a$4 flip-flop. The R$p$1 signal issues during $Tr=7$, 8, and 10–15; as follows:

$$Rp1=\overline{Cha}\ Tr1\ Tr3(\overline{Tr2}+Tr4+Tr5)+\overline{Cha}\ \overline{Tr1}\ Tr2$$

and thereby gates the eight data word digits from the R$a$4 flip-flops to the R$b$7 flip-flops. The preceding "Read Buffer Data Transfer" table illustrates the accumulation of row parity in the R$b$7 flip-flops. Thus, when $Tr=7$, the R$b$7 flip-flops are in the preset 0001 state. When $Tr=8$, the R$b$7 flip-flops have accumulated the row parity of the row parity digit. When $Tr=9$, the R$b$7 flip-flops have further accumulated the parity of the 7th, or MSD, of the input data word. By $Tr=16$, R$b$7 has accumulated the row parity of all eight digits read from tape and, therefore, at this time the contents of R$b$7 are sampled by the E$rs$ flip-flop, with the Row Parity check logic circuit; as follows:

$$*Ers=Tr2\ \overline{Tr4}\ \overline{Tr5}\ \overline{Cha}(Rbm1 +\overline{Rbm2}+\overline{Rbm3}+\overline{Rbm4})$$

When $Tr=16$, the R$b$7 flip-flops sample the contents of the corresponding R$b$6 flip-flops in order that the digit stored in R$b$6 may be transferred to R$b$7 in the next clock period; as follows:

$$*Rb7(i)=Rb6(i)\ \ (Tr=16)\ \overline{Cha}$$
$$*\overline{Rb7(i)}=\overline{Rb6(i)}\ \ (Tr=16)\ \overline{Cha}$$

The E$rs$ flip-flop is employed to indicate two additional malfunctions occurring during the operation of reading data from tape. When $Tr=7$, the signal $*Ers$ issues if the $Ur$ flip-flop is still on; as follows:

$$*Ers=Ur\ Tr1\ \overline{Tr2}\ Tr3\ \overline{Tr5}$$

This setting of $Ers$ indicates that a Read Buffer operation has not transferred to Memory the previous word that was stored in the $Rb$-register. The second additional malfunction is that of the Read Buffer's failure to read any data from tape, as might occur when a Tape Handler fails to function or some other circuitry defect prevents data being transferred to the Read Buffer. The flip-flop $Csu$ is originally set when Instruction 65 is executed; as follows:

$$*Csu=Rebd$$

The $Csu$ flip-flop is then reset whenever the $Tr1$ flip-flop is set; as follows:

$$*\overline{Csu}=Tr1$$

Inasmuch as the $Tr1$ flip-flop is only set to the 1-state when the two digits of a transverse recording position have been transferred to the Read Buffer, the $Tr1$ signal does not issue and the $Csu$ flip-flop does not reset if no data is transferred to the Read Buffer. Therefore, when the $Red$ signal issues as the $\gamma$-block marker is read from tape, denoting the end of the block, the signal $*Ers$ issues if the $Csu$ flip-flop is still in the 1-state; as follows:

$$*Ers=Csu\ Red\ Reb\ \overline{Cha}$$

When the $\gamma$-block marker on magnetic tape is sensed, indicating that the read operation should be terminated, the Block Marker Analyzer, FIG. 35, delivers the $Red$ signal. The $Red$ signal resets the $Reb$ and $Rb$ flip-flops; as follows:

$$*\overline{Reb}=Red\ Reb\ \overline{Cha}$$
$$*\overline{Rb}=Red$$

and the read operation terminates. Data will only again be read from magnetic tape if another Instruction 65 is executed.

DATA RETIMING DURING MAGNETIC TAPE READING

The data retiming circuit of FIG. 41 comprises two channels, responsive respectively to the data recorded on the two halves of the magnetic tape. The retiming circuit provides output signals to gate the digit received by the read amplifiers from each tape half to the corresponding one of the Read Buffer digit input registers $Rin1$–$5$ and $Rin6$–$10$. The data retiming circuit also provides an output signal to set the $Tr1$ flip-flop of the Read Buffer when both digits in a transverse recording position on magnetic tape have been stored in the Read Buffer digit input registers, thereby notifying the Read Buffer that the two digits are ready for processing thereby.

Consider, now, the operation of the channel of the data retiming circuit that is responsive to the tape digits stored on the tape half comprising tracks 1–5 (FIGS. 34 and 35). An OR-gate 750 is coupled to the 0-output terminals of the $Ftr1$–$5$ read amplifiers (FIG. 39) and delivers a binary 1 output signal as soon as the first of these read amplifiers is transferred to the 0-state, upon detection of a binary 0 on the tape by the corresponding read head. Since each tape digit comprises an odd number of 0-bits, at least one read amplifier is set to the 0-state during the reading of each digit from tape. Waveform $Ftr_$ of FIG. 41$a$ illustrates symbolically how any one, or more, of the five read amplifiers is set to the 0-state when a digit is being read. The staggered setting to 0 of the $Ftr_$ flip-flops illustrated in this waveform corresponds to a magnetic tape wherein the data stored thereon is skewed with respect to the read head array.

Since the $Dsy1$ and $Rds1$ flip-flops are both in the 0-state when the reading of a tape digit commences, AND-gate 751 enabled when the first 0-bit is read from tape. Thus, the first binary 1 output signal of OR-gate 750 is transmitted through AND-gate 751 and OR-gate 752 to set the $Rds1$ flip-flop when the next clock pulse occurs. Continuous clock pulses from clock driver CD1 are applied to the clock pulse input terminals of the $Rds1$ flip-flop, so that at the first clock pulse immediately after the first of the read amplifiers $Ftr1$–$5$ is set to the 0-state, the $Rds1$ flip-flop is set to the 1-state. This is illustrated by the $Rds_$ waveform of FIG. 41$a$.

When the $Rds1$ flip-flop is first set to the 1-state, the $Dsy1$ flip-flop and the $Ytd1$ one-shot are both in the 0-state and, therefore, enable AND-gate 753. AND-gate 753 also requires the signal $Rsy$ for enabling. $Rsy$ is present only during the interval following detection of the $\beta$-block marker, but before detection of the $\gamma$-block marker. Therefore, the binary 1 output signal from the $Rds1$ output terminal of the $Rds1$ flip-flop is coupled through AND-gate 753 to the logic input terminals of the $Dsy1$ flip-flop and the $Ytd1$ one-shot. At the clock pulse next following that which sets $Rds1$ to the 1-state, the $Dsy1$ flip-flop is set to its 1-state and the $Ytd1$ one-shot is triggered to its unstable state.

The duration of the $Ytd1$ one-shot in its unstable state determines the maximum allowable skew angle of the magnetic tape for which all bits of the digit will be transferred to the Read Buffer. Thus, the duration of the $Ytd1$ flip-flop in its unstable state determines the interval between the reading of the first 0-bit of a digit from tape and the time when the contents of the read amplifiers $Ftr1$–$5$ are transferred to the Read Buffer. In this embodiment, the $Ytd1$ one-shot remains in its unstable state for approximately 3.5 clock periods. During these 3.5 clock periods the remaining bits of the digit may be read from tape and stored in the $Ftr1$–$5$ read amplifiers.

The $Rds1$ flip-flop resets itself to the 0-state in the next clock period after it is set to the 1-state. AND-gate 751 is disabled while the $Dsy1$ flip-flop is in its 1-state and prevents further setting of the $Rds1$ flip-flop during this time.

When the $Ytd1$ one-shot returns to its stable state, the resulting logical signal $Dsy1\ \overline{Ytd1}\ \overline{Rds1}$, which is applied to OR-gate 752, sets the $Rds1$ flip-flop to the 1-state, once again. The concurrence of the $Rds1$ and $Dsy1$ flip-flops in the 1-state provides a binary 1 output signal from AND-gate 754. A binary 1 output signal from AND-gate 754 enables the $Sin1$ clock pulse driver (FIG. 183) and a single $Sin1$ clock pulse will be delivered thereby (waveform $Sin_$, FIG. 41$a$). The clock signal $Sin1$ is applied as a clock pulse input signal to the $Rin1$–$4$ flip-flops and gates thereto the corresponding contents of the $Ftr1$–$4$ read amplifiers; for example:

$$*Rin2=Ftr2$$
$$*\overline{Rin2}=\overline{Ftr2}$$

as shown in FIG. 170. The contents of the $Ftr5$ read amplifier are gated to the $Rin5$ flip-flop, which has applied thereto the continuous clock pulses of the CD1 clock pulse driver; as follows:

$$*Rin5=Rds1\ Dsy1\ Ftr5$$
$$*\overline{Rin5}=Rds1\ Dsy1\ \overline{Ftr5}$$

The $Ftr1$–$5$ flip-flops are immediately preset to the 1-state to prepare for the next digit in tracks 1–5, by the issuance of the clock signal $Xr1$; as follows:

$$\text{Gate-}Xr1=Rds1\ Dsy1$$

Thus, the data retiming circuit channel comprising OR-gate 750, AND-gate 751, OR-gate 752, the $Rds1$ flip-flop, AND-gate 753, the $Dsy1$ flip-flop, the $Ytd1$ one-shot, and AND-gate 754, responds to the first 0-bit of a digit recorded in tracks 1–5 of a magnetic tape transverse recording position, and following a predetermined interval thereafter, provides signals to gate the entire digit to the $Rin1$–$5$ flip-flops.

Similarly, the channel comprising OR-gate 757, AND-gate 758, OR-gate 759, the R*ds*2 flip-flop, AND-gate 760, the D*sy*2 flip-flop, the Y*td*2 one-shot, and the AND-gate 761, responds to the first 0-bit of a digit recorded in tracks 6–10 of a magnetic tape transverse recording position, and following a predetermined interval thereafter, provides signals to gate the entire digit to the R*in*6–10 flip-flops.

The Read Buffer is not notified of the receipt of new data from magnetic tape until both of the digits in a transverse recording position have been stored in the Read Buffer digit input registers. The sequence by which the data retimer determines when the two digits in a transverse recording position have been received and thereupon signals the Read Buffer will now be described.

If no significant tape skew exists, both digits will be gated into the Read Buffer digit input registers R*in*1–5 and R*in*6–10 during the same clock period and the Read Buffer will be immediately notified. The AND-gate 764 receives the output signals of AND-gates 754 and 761, and in response to the simultaneous issuance of binary 1 signals therefrom, provides a binary 1 output signal. This binary 1 output signal of AND-gate 764 is applied through OR-gate 765 to the 1-logic input terminal of the T*r*1 flip-flop, thereby setting the T*r*1 flip-flop to notify the Read Buffer that both digits have been transferred thereto.

If, however, significant skew exists between the digits stored on the tape and the read head array, the two digits will not be gated to the Read Buffer during the same clock period, and a binary 1 output signal will not be delivered by AND-gate 764. For this instance, the H*af* flip-flop 766 is provided to remember that but one digit from a tape transverse recording position has been transmitted to the Read Buffer digit input registers and that the Read Buffer should be notified when the other digit is transmitted. Therefore, the H*af* flip-flop is set to the 1-state when one digit, but not both digits simultaneously, are transferred to the Read Buffer digit input register from a transverse recording position; as follows:

$$*Haf = Rds1\ Dsy1\ (\overline{Rds2} + \overline{Dsy2})\ \overline{Haf} + Rds2\ Dsy2\ (\overline{Rds1} + \overline{Dsy1})\ \overline{Haf}$$

If the H*af* flip-flop is in the 1-state, the T*r*1 flip-flop will be set to the 1-state and the H*af* flip-flop will be reset to the 0-state when the second of the two digits of the tape transverse recording position is inserted in the Read Buffer digit input register. Thus, AND-gate 767 receives the input signal (R*ds*1 D*sy*1+R*ds*2 D*sy*2) from OR-gate 768 and the H*af* output signal from the H*af* output signal from the H*af* flip-flop. With the H*af* flip-flop in the 1-state, the transmittal of the second digit to the Read Buffer causes AND-gate 767 to deliver a binary 1 signal through OR-gate 765 to set the T*r*1 flip-flop to the 1-state, and thereby notifies the Read Buffer that both data words have been transferred thereto.

READ BUFFER DATA TRANSFER FOR DOCUMENT READING

The operation and timing of the Read Buffer for transferring to Memory the data read from one line of a magnetically imprinted document is somewhat different from that previously described for transferring to Memory 100 data words read from magnetic tape. As before, the timing of the Read Buffer is under control of the T*r*-counter (FIGS. 173 and 174). After each character is read from the document, the T*r*-counter counts through eight states and then halts. During each counting sequence, the four bit code which represents the character read from the document is transferred into each of the six least significant digit positions of the R*b*-register.

Each time that the T*r*-counter is in its 12-state, the demand flip-flop, U*r*, is set and causes the word in the R*b*-register to be subsequently transferred to Memory. The relationships between the Read Buffer signals and the states of the T*r*-counter for the character reading operation are shown in FIG. 245.

The document is read following execution of an Instruction 65, which directs that one line of data on a document be transferred to Memory. However, prior to such an Instruction 65, an Instruction 58 must have been executed to cause the Sorter to start feeding documents to the Character Reader. After the Sorter (FIG. 42) has started feeding documents, the appropriate Instruction 65 may be executed. Instruction 65, in addition to setting the R*eb* flip-flop, sets the C*su* flip-flop and the Character Reader Select flip-flop, C*ha*. The C*ha* flip-flop remains in the 1-state until one line of data has been read from the next document read by the Character Reader.

The following description is implemented by reference to the waveforms of FIGS. 46 and 47. When the photocell of the Character Reader detects the leading edge of a document, the C*sy*1 signal issues to initiate reading of characters from that document. The C*sy*1 signal triggers the Y*ck* one-shot; as follows:

$$*Yck = Csy1$$

The transfer of the Y*ck* one-shot to its unstable state causes the corresponding IY*ck* inverter to transfer to its 1-state (FIG. 187). The IY*ck* inverter, in turn, sets the C*kp* flip-flop to its 1-state; as follows:

$$*Ckp = \overline{IYck}$$

The C*kp* flip-flop remains in its 1-state so long as the field of data of the document is opposite the read head of the Character Reader, and is only reset after the normal extent of the field has passed the read head. The C*kp* flip-flop, when reset, terminates the transfer to the Read Buffer of the data read from the document.

The C*kp* flip-flop causes the setting of the C*fs* flip-flop: as follows:

$$*Cfs = Ckp\ Cha$$

When a character is read by the Character Reader, the coded representation thereof is transferred by the C*rd*4, 3, 2, 1 output signals of the Sorter Control Unit to the Read Buffer. The coding for each of the characters in the C*rd* signals is complementary to the code employed for that character in normal data processing. For example, the C*rd*4, 3, 2, 1 signals for the digit 1 are respectively 1, 1, 1, 0.

When a proper character is read, one of the signals C*d*0–9 or C*u*1–4 is a binary 1 and causes the corresponding D*or* or Q*or* signal (FIG. 187) to issue. The D*or* signal indicates that a numeral has been read and the Q*or* signal indicates that a C*ue* character has been read. Thus, when a character is read the D*cc* flip-flop of the Sorter Control Unit is set to the 1-state; as follows:

$$*Dcc = Qor + Dor$$

The D*cc* flip-flop remains in its 1-state for one clock period, immediately resetting itself, but during this clock period D*cc* initiates acceptance of the Sorter Control Unit output signals C*rd* by the Read Buffer. When the D*cc* flip-flop is transferred to its 1-state, the Y*cp* one-shot is triggered; as follows:

$$*Ycp = Dcc$$

The Y*cp* one-shot remains in its unstable state for approximately 500 μsec., the approximate duration necessary for a character to be scanned by the Character Reader. The Y*cp* one-shot, in its unstable state, triggers the T*r*-counter into its 8-count sequence by setting the T*r*1 flip-flop thereof; as follows:

$$*Tr1 = \overline{IYcp}\ Csu\ Cha$$

The C*su* flip-flop, which enables the Y*cp* one-shot to set the T*r*1 flip-flop, is immediately reset; as follows:

$$*\overline{Csu} = Tr1$$

and prevents the subsequent triggering of T*r*1 until it is once more set to its 1-state.

The T*r*-counter then counts through the states 11–16 and returns to the 0-state where it rests, as shown by FIG. 245. The numbers of the states are chosen to correspond with the similar states of the T*r*-counter for the tape reading operation.

Before each character is read, the R*a*4 flip-flops are preset to the 1-state; as follows:

$$*Ra4(i)=Cha\ \overline{Ycp}$$

When the T*r*-counter is in the 1-state, the R*a*4 flip-flops of the Read Buffer sample the corresponding C*rd* signals of the Sorter Control Unit and are set accordingly in the next clock period. Therefore, when $Tr=11$, each R*a*4 flip-flop is in a state complementary of the corresponding C*rd* signal; as follows:

$$*Ra4(i)=Crd(i)\ Tr1\ \overline{Tr3}\ Cha$$

The code of the digit entered in R*a*4 is thus inverted from the digit code received from the Sorter Control Unit, and is the normal data code for processing by the Central Processor.

During $Tr=11$–16, the shift signal S*rb* issues and shifts-up the contents of R*a*4 through six digit positions of the R*b*-register (FIG. 40). In this interval, the Y*cp* one-shot remains in its unstable state and the T*r*3 flip-flop is in its 1-state, so that the states of the R*a*4 flip-flops cannot be altered. Consequently, the digit entered into the R*a*4 flip-flops at $Tr=11$ is transferred or "smeared" into all six least significant digit positions of the R*b*-register, so that when the T*r*-counter again reaches 0, each of the six least significant digit positions of the R*b*-register contains the Central Processor code for the character read from the document.

During and following the T*r* counting, the MSD position of the R*b*-register contains the digit 0001, because during Instruction 65 and during each Read Buffer operation when the contents of the R*b*-register are transferred to Memory, the contents of R*b*7 are preset to the 0001 state. (See FIG. 163.) Inasmuch as all six digits in R*b*6–R*b*1 are alike, the modulo-3 thereof is 0. Consequently, by presetting the mod-bits in the R*b*-register to 0, 1 for each character read from the document, the modulo-3 of each word transfer to Memory will be +1.

When the T*r*-counter is in its 12-state, the demand flip-flop, U*r*, is set and causes the word in the R*b*-register to be subsequently transferred to Memory by one of the Read Buffer operations previously described.

When the Y*cp* one-shot returns to its stable state, the C*su* flip-flop is once again set to the 1-state; as follows:

$$*Csu=Cha\ \overline{Ycp}$$

so that the T*r*-counter and Read Buffer are prepared to receive the coded equivalent of the next character as it is read by the Character Reader.

The Read Buffer is disabled from receiving further data from the Character Reader when the check presence flip-flop C*kp* is returned to its 0-state at the end of the single document read. The C*sy*2 signal, which issues by the Sorter approximately 80 milliseconds after the leading edge of the document passes the photocell of the Character Reader, resets the C*kp* flip-flops; as follows:

$$\#\overline{Ckp}=Csy2$$

Upon the resetting of the C*kp* flip-flop, the E*oc* flip-flop is set to its 1-state; as follows:

$$*Eoc=\overline{Ckp}\ Cfs\ \overline{Eoc}$$

The E*oc* signal then resets the C*ha* and C*fs* flip-flops to the 0-state; as follows:

$$*\overline{Cha}=Cha\ Cfs\ Eoc$$
$$*\overline{Cfs}=Eoc\ Cfs$$

The E*oc* flip-flop immediately resets itself in the clock period following that in which it was set.

With the C*ha* flip-flop in its 0-state no further data can be gated into the R*a*4 flip-flops.

Data may not again be read from a document into the Read Buffer until execution of another Instruction 65 which sets the C*ha* flip-flop. Thus, an Instruction 65 affects the reading of one line of data from a document.

DOCUMENT READING AND SORTING

As has been described previously, the system of FIG. 1 is adapted to read data borne by documents, to process this data, and as a result of this processing to sort the documents into selected pockets of the Sorter. This reading, processing, and sorting sequence requires several distinct operations by the system. Some of these operations have been described heretofore. Thus, the preceding sections "Sorter and Character Reader" and "Sorter Control Unit" described the structure and functions of these components. These functions, when combined, constitute a portion of the operations of the reading, processing and sorting sequence. The section "Instruction 58" described the cooperation of the Central Processor, the Sorter Control Unit, and the Sorter in starting and stopping check feeding by the Sorter. The section "Instruction 65" described the functioning of the Sorter, the Character Reader, the Sorter Control Unit and the Read Buffer in directing the reading of one line of data from a document. The section "Instruction 57" described the operation of the Central Processor, the Sorter Control Unit, and the Sorter in directing a document into a selected Sorter pocket. The section "Read Buffer Data Transfer for Document Reading" described the operations of the Character Reader, Sorter Control Unit, and the Read Buffer in transferring to Memory the individual digits read from a line of data on a document. The instant section is concerned with the combination of all of these operations to read and subsequently to sort documents.

The following program of instructions illustrates one scheme by which documents may be read and sorted by the system:

Inst. 58: Start Feeding Checks
Inst. 65: Read Character Reader
Inst. 57: Select Sorter Pocket (N)
Inst. 65: Read Character Reader
Inst. 57: Select Sorter Pocket (N)
Continue with Instruction 65, 57 pair until stack of documents has been sorted.
Inst. 58: Stop Feeding Checks Although it is not illustrated in the above program, many instructions may be executed by the Central Processor, in addition to the intervening Instruction 57, between successive Instructions 65. This intervening program is permissible because of the relatively long duration required to read a character on the document and present it in the Read Buffer for transfer to Memory, a duration in which the Central Processor and Memory are free to perform other operations.

Execution of the first Instruction 58 commands the Sorter to start feeding documents. The Sorter of FIG. 42 thereupon commences feeding single documents in sequence to the automatic reading apparatus thereof. An Instruction 65 is then executed to prepare the Read Buffer to accept one line of data from the first document transported past the automatic reading apparatus and to transmit this data to the Memory. Following execution of this Instruction 65, transducer 820 scans each magnetized character on the line of information borne by the first document. As each character is scanned, a characteristic waveshape is generated by transducer 820 and transmitted to Character Reader 22. In response to this characteristic waveshape, the Character Reader provides a signal on a corresponding output line. This Character Reader output signal is encoded by the Sorter Control Unit of FIG. 43 and a corresponding four bit digit is transmitted to the Read Buffer. The Read Buffer of FIG. 40 is triggered into a Read Buffer operation upon detection of the character by the automatic reading apparatus and thereupon accepts the corresponding four bit digit delivered by the Sorter Control Unit, entering the digit into all six numeric positions of the R*b*-register. At this time, the Read Buffer signals the Central Processor to enter the contents of the R*b*-register into Memory. The Central Processor thereupon interrupts its program, which it has been executing, following execution of the first Instruction 65, interrupts an instruction it is executing, or executes an instruction-parallel operation in order to store the contents of the R*b*-register in the next read-memory location. The next character is then read from the document and a similar process is executed to store the corresponding four bit digit in Memory. Each time a character is read from the document and stored in the Read Buffer, a Read Buffer operation is executed to store the corresponding digit in Memory.

Following storage in Memory of the character in the field position on which the document is to be sorted, the Central Processor analyzes this character. As a result of this analysis an Instruction 57 may be executed to transmit to the Sorter Control Unit the digit for the Sorter pocket wherein the document is to be inserted. However, this Instruction 57 need not be executed until the full line of data has been read from the document. Following transmittal of the pocket decision digit to the Sorter Control Unit, the corresponding pocket deflector of the Sorter will be opened immediately before the respective document arrives.

Immediately after the first document leaves the automatic reading apparatus of the Sorter, a second Instruction 65 will be executed to prepare the Read Buffer to accept one line of data from the second document. The programmed sequence continues, an Instruction 65 being executed for each document to be read and an Instruction 57 being executed after data read from the document is processed and the proper Sorter pocket determined. Thus, a sequence of documents is read by the automatic reading apparatus of the Sorter, the data read is processed by the system, and as a result of the processing, the document is directed to a pocket of the Sorter.

*Document Reading Operation*

There has heretofore been described in the section "Read Buffer Data Transfer for Document Reading" the details of the operation of the Character Reader, Sorter Control Unit, and Read Buffer in transferring to Memory the individual characters read from the field of a document. There will be described herein the operation of the Sorter and Sorter Control Unit in timing and controlling the reading of such a field of characters. The ensuing description will be complemented by reference to the waveforms of FIG. 46.

Following execution of an Instruction 58, the Sorter of FIG. 42 commences feeding single documents in sequence to the automatic reading apparatus thereof. In the automatic reading apparatus, the photocell 818 senses the reference edge of the document and in response thereto provides the photocell pulse, shown in the first waveform of FIG. 46. The photocell pulses are designated by number, to correspond to the leading edges of the first, second, third and fourth documents arriving at the photocell. After being sensed by photocell 818, the documents pass magnet 819, where the magnetizable characters of the field thereon are magnetized prior to being read. The documents then pass transducer 820, which senses the magnetic field of each character in the fields, and thereupon delivers a characteristic waveshape for each magnetized character. Character Reader 22 analyzes each waveshape, and if it is recognizable as being derived from one of the characters to be identified by the Character Reader, a corresponding output signal is provided on one of the output lines thereof. This Character Reader output signal is encoded by the Sorter Control Unit of FIG. 43 into the complementary four-bit code and transmitted to the Read Buffer. The above-described operations will occur following execution of an Instruction 58, whether or not an Instruction 65 has been executed to prepare the Read Buffer to accept the line of data from one document. If Instruction 65 has not been executed, the *Cha* flip-flop is not in the 1-state, and the R*a*4 flip-flops of the Read Buffer will not accept the output data provided by the Sorter Control Unit. On the other hand, if an Instruction 65 for document reading has been executed, the *Cha* flip-flop in the Read Buffer is set, and the Read Buffer accepts each four-bit digit as it is transmitted by the Sorter Control Unit.

The photocell pulse provided by the reference edge of the document triggers the Sorter one-shot 822, which remains in its unstable state for 10 msec. When one-shot 822 returns to its stable state, the *Csy*1 signal is delivered thereby. The *Csy*1 pulse triggers the 70 msec. one-shot 823 and also triggers the 20 μsec. one-shot *Yck* in the Sorter Control Unit; as follows:

$$*Yck=Csy1$$

When the *Yck* one-shot is in its unstable state, the *Ckp* flip-flop is set; as follows:

$$*Ckp=\overline{Yck}$$

The approximately 10 msec. between the photocell pulse and the *Csy*1 pulse insures that the *Ckp* flip-flop is set immediately before the document field is scanned by transducer 820. Therefore, the interval when the *Ckp* flip-flop is in its 1-state is an indication of the time when the field is being scanned by the transducer. The field is opposite transducer 820 for approximately 36 msec. after the *Ckp* flip-flop has been set. This is illustrated in the waveform for *Ckp*. Thus, 10 msec. after the first photocell pulse issues, data from the first document is transferred to the Read Buffer, and subsequently to the Central Processor, for a duration of approximately 36 msec.

The unstable state of the *Yck* one-shot also causes the triggering of the *Yor* one-shot in the Sorter Control Unit; as follows:

$$*Yor=\overline{Yck}$$

The *Yor* one-shot remains in its unstable state for 59 msec., and thereby prevents the clearing of the *Sou*-register during that time. During the first 52 msec. of this 59 msec., the *Sou*-register is available to accept a pocket decision digit.

When the one-shot 823 of the Sorter returns to its stable state 70 msec. after the *Ckp* flip-flop has been set, the *Csy*2 signal is delivered. The *Csy*2 signal triggers the 62 msec. one-shot 824 and also resets the *Ckp* flip-flop; as follows:

$$\#Ckp=Csy2$$

When the *Ckp* flip-flop is reset, it initiates the setting of the *Eoc* flip-flop of the Read Buffer. The *Eoc* flip-flop then resets the *Cha* flip-flop to terminate acceptance by the Read Buffer of data from the Sorter Control Unit.

After the second document is sensed and photocell pulse 2 issues, a sequence of events occurs, similar to that described above, provided another Instruction 65 is executed before the first character is read from this second document. During the first 62 msecs. following the occurrence of photocell pulse 2, one-shot 824 of the Sorter is in its unstable state. When one-shot 824 returns to its stable state, the *Csy*3 signal is delivered. In the 62 msec. interval between the issuance of the *Csy*2 signal and the following *Csy*3 signal, the *Sou*-register cannot be cleared, and is available to receive the pocket decision digit for sorting the first document. The *Csy*3 signal then triggers the 15 msec. *Yro* one-shot; as follows:

$$*Yro=Csy3$$

The *Yro* one-shot in its unstable state gates the pocket decision for the first document from the Sorter Control Unit to the Sorter, as indicated in the logical schematic diagrams for the $Dec(i)$ signals of FIG. 187. During the period when the $Yro$ one-shot is in its unstable state, the $Yor$ one-shot returns to its stable state. The $Yro$ one-shot then returns to its stable state 3 msec. before the $Ckp$ flip-flop is reset. During this 3 msec. after the $Yro$ one-shot returns to its stable state, the $Sou$-register is cleared; as follows:

$$*Sou(i)=Ckp\ \overline{Yor}\ \overline{Yro}$$

The $*Sou(i)$ waveform illustrates the interval when the $Sou$-register is reset.

The waveforms for $Chad$ and $Cha$ illustrate that if an Instruction 65 for document reading is executed prior to occurrence of the $Csy1$ signal, the data from the entire field will be transferred to the Read Buffer from the document.

The above document reading operation may be summarized as follows: Starting from 10 msec. after the reference edge of a first document is sensed, data is transmitted from the document to Memory. This data transmission continues for approximately 36 msec. A second document follows the first document by 80 msec. During the first 62 msec. following detection of the second document, a pocket decision for the first document may be transmitted to the $Sou$-register. In the next 15 msec. this pocket decision is transmitted to the Sorter, and in the following 3 msec. the $Sou$-register is cleared to receive the pocket decision for the second document.

As was pointed out in the description of Instruction 57, if the forbidden digit or no pocket decision was transmitted from the Central Processor by the time the $Yro$ one-shot is triggered, the no-pocket decision signal, $Npd$, is enabled, and the $Anpd$ sub-alarm flip-flop of the Central Processor is set.]

Certain portions of the apparatus herein disclosed are not of our invention, but are the inventions of:

C. H. Tucker, as defined by the claims of his application, Serial No. 8,867, filed February 15, 1960, now Patent No. 3,219,976;

J. G. Levinthal and David Zeheb, as defined by the claims of their application, Serial No. 8,873, filed February 15, 1960, now Patent No. 3,245,041;

David Zeheb, as defined by the claims of his application, Serial No. 8,875, filed February 15, 1960, now Patent No. 3,219,807;

J. G. Levinthal, as defined by the claims of his application, Serial No. 8,877, filed February 15, 1960, now Patent No. 3,219,977;

R. B. Wright, Jr., as defined by the claims of his application, Serial No. 8,879, filed February 15, 1960;

W. G. Facenda, Jr., R. B. Wright, Jr., and David Zeheb, as defined by the claims of their application, Serial No. 46,161, filed July 29, 1960, and now abandoned;

J. G. Levinthal and N. R. Crain, as defined by the claims of their application, Serial No. 46,162, filed July 29, 1960, now Patent No. 3,226,682;

G. B. Barclay de Tolly and R. B. Wright, Jr., as defined by the claims of their application, Serial No. 46,163, filed July 29, 1960, and now abandoned;

W. G. Facenda, Jr., and David Zeheb, as defined by the claims of their application, Serial No. 46,164, filed July 29, 1960 and now abandoned;

B. F. Burch, Jr., and C. H. Tucker, as defined by the claims of their application, Serial No. 53,022, filed July 29, 1960, and now abandoned; and D. W. Masters, as defined by the claims of his application, Serial No. 53,024, filed July 29, 1960; all such applications being assigned to the assignee of the present application.

Furthermore, certain portions of the apparatus herein disclosed are not of our joint invention, but are the inventions of:

H. L. Herold and J. G. Levinthal, as defined by the claims of their application, Serial No. 8,868, filed February 15, 1960, now Patent No. 3,235,879;

J. Weizenbaum, as defined by the claims of his application, Serial No. 8,869, filed February 15, 1960, now Patent No. 3,238,507;

H. L. Herold and R. B. Wright, Jr., as defined by the claims of their application, Serial No. 8,872, filed February 15, 1960, now Patent No. 3,234,517;

R. B. Wright, Jr., and J. Weizenbaum, as defined by the claims of their application, Serial No. 8,874, filed February 15, 1960, now Patent No. 3,237,166;

H. L. Herold, as defined by the claims of his application, Serial No. 8,876, filed February 15, 1960, now Patent No. 3,242,322;

H. L. Herold and C. H. Tucker, as defined by the claims of their application, Serial No. 8,878, filed February 15, 1960, now Patent No. 3,219,978; and H. L. Herold, D. W. Masters, and R. B. Wright, Jr., as defined by the claims of their application, Serial No. 53,023, filed July 29, 1960; all such applications being assigned to the assignee of the present application.

What is claimed is:

1. In combination, a data storage unit for storing a plurality of data items, first means for handling data items, signalling means for providing a signal when said first means must communicate with said data storage unit, a data processing unit adapted to perform data processing operations on data items received thereby, and means responsive to said signal for providing communication between said first means and said data storage unit during a period of predetermined duration wherein no data item is transferred between said data storage unit and said data processing unit.

2. In combination, a data storage unit for storing a plurality of data items, first means for handling data items in sequence, signalling means for providing a signal when said first means must communicate with said storage unit, a data processing unit connected for access to said data storage unit and adapted to process data by executing operations thereon, means responsive to said signal for causing said data processing unit to discontinue data processing, means for providing communication between said first means and said storage unit following the discontinuation of said data processing, and means for causing said data processing unit to resume processing data following completion of said communication.

3. In combination, a data storage unit for storing a plurality of data items, first means for handling data items in sequence, signalling means for providing a signal when said first means must communicate with said storage unit, a data processing unit connected for access to said data storage unit and adapted to execute a program of distinct commands in sequential order by executing corresponding distinct operations on said data items, means responto said signal for causing said data processing unit to discontinue execution of said program, means for providing communication between said first means and said storage unit following the discontinuance of execution of said program, and means for causing said data processing unit to resume executing said program following completion of said communication.

4. In combination, a data storage unit for storing a plurality of data items, first means for handling data items in sequence, signalling means for providing a signal when said first means must communicate with said storage unit, a data processing unit connected for access to said data storage unit and adapted to execute a program of distinct commands in seqeuntial order by executing corresponding distinct operations on said data items, means responsive to said signal for causing said data processing unit to discontinue execution of said program following completion of the operation being executed when said signal occurs, means for providing communication between said first means and said storage unit following completion of the operation being executed when said signal occurs, and means for causing said data processing unit to resume executing said program following completion of said communication.

5. In combination, a data source for supplying a sequence of data items, a data storage unit for storing a plurality of said data items, signalling means for providing a signal when a data item must be transferred from said source to said storage unit, a data processing unit connected to communicate with said data storage unit and adapted to execute a program of distinct commands in sequential order by executing corresponding distinct operations on said data items, means responsive to said signal for causing said data processing unit to discontinue execution of said program following completion of the operation being executed when said signal occurs, means for transferring said data item from said data source to said storage unit following completion of the operation being executed when said signal occurs, and means for causing said data processing unit to resume executing said program following transfer of said data item to said data storage unit.

6. In combination, a data receiver for accepting a sequence of data items, a data storage unit for storing a plurality of said data items, signalling means for supplying a signal when a data item must be transferred from said storage unit to said receiver, a data processing unit connected to communicate with said data storage unit and adapted to execute a program of distinct commands in sequential order by executing corresponding distinct operations on said data items, means responsive to said signal for causing said data processing unit to discontinue execution of said program following completion of the operation being executed when said signal occurs, means for transferring said data item from said data storage unit to said data receiver following completion of the operation being executed when said signal occurs, and means for causing said data processing unit to resume executing said program following transfer of said data item to said data receiver.

7. In combination, a data storage unit for storing a plurality of data items, a data source for supplying a sequence of data items, a data receiver for receiving a sequence of data items, first signalling means for providing a first signal when a data item must be transferred from said source to said storage unit, second signalling means for supplying a second signal when a data item must be transferred from said storage unit to said receiver, a data processing unit connected for access to said data storage unit and adapted to execute a program of distinct commands in sequential order by executing corresponding distinct operations on said data items, means responsive to any one of said signals for causing said data processing unit to discontinue execution of said program, means responsive to said first signal for transferring a data item from said source to said storage unit following the discontinuance of execution of said program, means responsive to said second signal for transferring a data item from said storage unit to said receiver following the discontinuance of execution of said program, and means for causing said data processing unit to resume executing said program following completion of said communication.

8. A combination, as in claim 7, further including means to accord precedence to one of said first and second signals when both of said first and second signals are provided prior to said discontinuance of execution of said program.

9. In combination, a data storage unit for storing a plurality of data items in a corresponding plurality of storage locations, a register for storing a data item, means for providing a first signal having two possible states, addressing means for providing in succession the identifications of a plurality of different storage locations, means responsive to one state of said first signal and to the identification provided by said addressing means for exchanging the data item contents of said register and the identified storage location for each such identification when said first signal is in said one state, means for sampling the contents of each data item received by said register from said data storage unit, means adapted to provide a second signal when the information content of a sector of a data item sampled satisfies a predetermined criterion, and means responsive to said second signal for causing said first signal to transfer to its other state.

10. In combination, a data storage unit for storing a plurality of data items in a corresponding plurality of storage locations, a register for storing a data item, means for causing a succesion of exchanges of the data item contents of said register with the data item contents of a sequence of said storage locations, means for sampling the contents of each data item received by said register from said data storage unit, and means for discontinuing said exchanges when the information content of a sector of a data item sampled satisfies a predetermined criterion.

11. In combination, a data storage unit for storing a plurality of data items in a corresponding plurality of storage locations, a register for storing a data item, means for providing a succession of signals, addressing means responsive to said signals for providing in sequence the identifications of a plurality of different storage locations, means responsive to one of said signals and the identification provided by said addressing means for transferring the data item in the corresponding storage location to said register, means responsive to one of said signals and the identification provided by said addressing means for transferring the data item in said register to the corresponding storage location, means for sampling the contents of each data item received by said register from said data storage unit, and means for terminating said succession of signals when the information content of a sector of a data item sampled satisfies a predetermined criterion.

12. In combination, a data storage unit for storing a plurality of data items in a corresponding plurality of storage locations, each of said data items constituting a plurality of data entities, a register for storing a data item, means for causing a succession of exchanges of the data item contents of said register with the data item contents of a sequence of said storage locations, means for sampling the contents of each data item received by said register from said data storage unit, and means for discontinuing said exchanges when one of the data entities of a data item sampled satisfies a predetermined criterion.

13. In combination, a data storage unit for storing a plurality of data items in a corresponding plurality of storage locations, a register for storing a data item, means for causing a succession of exchanges of the data item contents of said register with the data item contents of a sequence of said storage locations, and means for discontinuing said exchanges when the information content of a sector of a data item received by said register from said data storage unit satisfies a predetermined criterion.

14. In combination, a data storage unit for storing a plurality of data items in a corresponding plurality of storage locations, a register for storing a data item, means for providing a succession of signals, addressing means responsive to said signals for providing in sequence the identifications of a plurality of different storage locations, means responsive to one of said signals and to the identification provided by said addressing means for transferring the data item in the corresponding storage location to said register, and means responsive to one of said signals and to the identification provided by said addressing means for transferring the data item in said register to the corresponding storage location.

15. In combination, a data storage unit for storing a plurality of data items in a corresponding plurality of storage locations, a register for storing a data item, comparison means for comparing a pair of data items applied thereto and for delivering an output signal when a predetermined relationship exists between said data item pair, means for providing a succession of control signals, addressing means responsive to said control signals for providing in sequence the identifications of different ones of said storage locations, means responsive to one of said control signals and to the identification provided by said addressing means for applying the data item contents of the corresponding storage location to said comparison means, means responsive to each one of said control signals for applying the data item contents of said register to said comparison means, and means responsive to said output signal for terminating said control signals.

16. In a system for comparing first and second data items by successively comparing corresponding characters of each of said data items in increasing order of significance, wherein the characters of each of said data items are represented in increasing order of significance by a train of signals, the combination comprising: first and second bistable devices, each of said bistable devices being adapted to operate in either one of two states thereof, first means for receiving a pair of signal trains representing a pair of data items and responsive to the signals representing each pair of characters of corresponding order of significance for providing a first output signal when the two characters of one of said pair of characters are equal, second means for receiving said pair of signal trains and responsive to the signals representing each pair of characters of corresponding order of significance for providing a second output signal when a predetermined state of inequality occurs between the two characters of one of said pair of characters, means responsive to said second output signal for causing said first bistable device to operate in one state thereof, means responsive to the absence of both of said first and second output signals to cause said first bistable device to operate in the other state thereof, and means responsive to the absence of said first output signal to cause said second bistable device to operate in one state thereof.

17. In a system adapted to compare first and second double items, each composed of a pair of data items; the combination comprising: a data storage unit for storing a plurality of data items in a corresponding plurality of storage locations, wherein the data items of said first double item are stored in a pair of successively accessible storage locations; a pair of registers for storing the respective data items of said second double item; addressing means for providing the identification of one of said storage locations; comparison means for comparing a pair of data items applied thereto; and means responsive to the identification provided by said addressing means for applying successively to said comparison means (1) the data item in one of said registers and the data item in one of said pair of storage locations and (2) the data item in the other of said registers and the data item in the other of said pair of storage locations.

18. In a binary digital data processing system for processing mixed numeric and non-numeric data, means for processing data as groups of digits, each digit comprising four binary signals, means for representing each numeric digit by a corresponding one of ten different predetermined configurations of said binary signals, and means for representing said non-numeric digits by remaining configurations of said binary signals.

19. In a data processing system for representing the state of equality of pairs of characters, wherein each of said characters comprised a group of signals, the configuration of said signal groups determining the kind of character represented, the combination comprising: comparison means for comparing the two signal groups representing one of said pairs of characters and for delivering a signal when the configurations of said two signal groups are alike, sensing means for sensing said two signal groups and for delivering a signal when any one of the groups sensed thereby has a predetermined configuration, a signal generator responsive to a signal received at an input terminal thereof for providing an output signal representing equality of a pair of characters, and means for applying the signals delivered by said comparison means and said sensing means to said input terminal of said signal generator.

20. In a data processing system, a data processing unit for executing in succession the commands of a first sub-group of a predetermined group of commands, means for generating a plurality of first signals in response to a corresponding plurality of events occurring in said data processing system, a plurality of testing means, each of said testing means being selectively operable to test for the presence of a corresponding one of said first signals, each of said testing means being adapted to deliver a second signal when the one of said first signals corresponding thereto is detected thereby, and means responsive to any one of said second signals for modifying the operation of said data processing unit to commence executing in succession the commands of a second sub-group of said group of commands.

21. In combination, a data storage unit for storing a plurality of data items, first means for handling data items, a data processing unit connected for access to said data storage unit and adapted to execute a program of distinct commands in sequential order by executing corresponding distinct operations on said data items, and means for selectively providing communication between said first means and said data storage unit during a period of predetermined duration wherein no data item is transferred between said data storage unit and said data processing unit.

22. In combination, a data storage unit for storing a plurality of data items, first means for handling data items, a data processing unit connected for access to said data storage unit and adapted to execute a program of distinct commands in sequential order by executing corresponding distinct operations on said data items, and means for selectively interrupting the access of said data processing unit to said data storage unit for an interval and for providing communication between said first means and said data storage unit during said interval.

23. In combination, a data storage unit for storing a plurality of data items, first means for handling data items, signalling means for providing a first signal when said first means must communicate with said data storage unit, a data processing unit connected for access to said data storage unit and adapted to execute a program of distinct commands in sequential order by executing corresponding distinct operations on said data items, means for providing a second signal at a predetermined time during execution of an operation by said data processing unit, and means responsive to said first and said second signals for providing communication between said first means and said data storage unit during a period of predetermined duration wherein no data item is transferred between said data storage unit and said data processing unit.

24. In combination, a data storage unit for storing a plurality of data items, first means for handling data items, signalling means for providing a signal when said first means must communicate with said data storage unit, a register for storing command items, a data processing unit connected from access to said data storage unit and responsive to the contents of said register for executing a program of distinct commands in sequential order by executing corresponding distinct operations on said data items, means responsive to the contents of said register for providing a second signal at a predetermined time during the execution of an operation by said data processing unit, and means responsive to said first and said second signals for providing communication between said first means and said data storage unit during a period of predetermined duration wherein no data item is transferred between said data storage unit and said data processing unit.

25. In combination, a data storage unit for storing a plurality of data items, a data processing unit adapted to execute a program of distinct commands in sequential order by executing corresponding distinct operations on said data items, first means for handling data items, signalling means for providing a signal having two possible states, said signal having one state when said first means must communicate with said data storage unit, means responsive to the other state of said signal for providing uninterrupted access by said data processing unit to said data storage unit, and means responsive to said one state of said signal for interrupting the access of said data processing unit to said data storage unit for a period and for providing communication between said first means and said data storage unit during said period.

26. In combination, a data storage unit for storing a plurality of data items, a data processing unit adapted to execute data processing operations on data items received thereby, first means for handling data items, signalling means for providing a first signal having two possible states, said first signal having one state when said first means must communicate with said data storage unit, means responsive to the other state of said first signal for providing uninterrupted access by said data processing unit to said data storage unit, means for providing a second signal at a predetermined time during the execution of an operation by said data processing unit, and means responsive to said second signal and to said one state of said first signal for interrupting the access of said data processing unit to said data storage unit for a period and for providing communication between said first means and said data storage unit during said period.

27. In combination, a data storage unit for storing a plurality of data items, a register for storing command items, a data processing unit responsive to the contents of said register for executing a program of distinct commands in sequential order by executing corresponding distinct operations on said data items, first means for handling data items, signalling means for providing a first signal having two possible states, said first signal having one state when said first means must communicate with said data storage unit, means responsive to the other state of said first signal for providing uninterrupted access by said data processing unit to said data storage unit, means responsive to the contents of said register for providing a second signal at a predetermined time during the execution of an operation by said data processing unit, and means responsive to said second signal and to said one state of said first signal for interrupting the access of said data processing unit to said data storage unit for a period and for providing communication between said first means and said data storage unit during said period.

28. In combination, a data storage unit for storing a plurality of data items, a data processing unit adapted to execute a program of distinct commands in sequential order by executing corresponding distinct operations on said data items, first means for handling data items, signalling means for providing a signal having two possible states, said signal having one state when said first means must communicate with said data storage unit, means responsive to the other state of said signal for providing uninterrupted access by said data processing unit to said data storage unit, means responsive to said one state of said signal for interrupting access by said data processing unit to said data storage unit and for interrupting the execution of said program by said data processing unit, means for providing communication between said first means and said data storage unit following the interruption of execution of said program, and means for causing said data processing unit to resume executing said program following completion of said communication.

29. In combination, a data storage unit for storing a plurality of data items, a data processing unit adapted to execute a program of distinct commands in sequential order by executing corresponding distinct operations on said data items, first means for handling data items, signalling means for providing a signal having two possible states, said signal having one state when said first means must communicate with said data storage unit, means responsive to the other state of said signal for providing uninterrupted access by said data processing unit to said data storage unit, means responsive to said one state of said signal for interrupting access by said data processing unit to said data storage unit and for causing said data processing unit to discontinue execution of said program following completion of the operation being executed when said one state of said signal occurs, means for providing communication between said first means and said data storage unit following the discontinuance of execution of said program, and means for causing said data processing unit to resume executing said program following completion of said communication.

30. In combination, a data storage unit for storing a plurality of data items, first means for handling data items, first signalling means for providing a first signal when a data item must be transferred from said first means to said data storage unit, second signalling means for providing a second signal when a data item must be transferred from said data storage unit to said first means, a data processing unit connected for access to said data storage unit and adapted to execute a program of distinct commands in sequential order by executing corresponding distinct operations on said data items, and means responsive to one of said signals for providing communication between said first means and said data storage unit during a period of predetermined duration wherein no data item is transferred between said data storage unit and said data processing unit.

31. In combination, a data storage unit for storing a plurality of data items, first means for handling data items, first signalling means for providing a first signal when a data item must be transferred from said first means to said data storage unit, second signalling means for providing a second signal when a data item must be transferred from said data storage unit to said first means, a data processing unit connected for access to said data storage unit and adapted to execute a program of distinct commands in sequential order by executing corresponding distinct operations on said data items, and means responsive to one of said signals for interrupting the access of said data processing unit to said data storage unit for an interval and for providing communication between said first means and said data storage unit during said interval.

32. In combination, a data storage unit for storing a plurality of data items, data source means for supplying data items, data receiver means for receiving data items, a data processing unit connected for access to said data storage unit and adapted to execute a program of distinct commands in sequential order by executing corresponding distinct operations on said data items, and means for selectively interrupting the access of said data processing unit to said data storage unit for an interval and for providing communication between one of said data means and said data storage unit during said interval.

33. In combination, a data storage unit for storing a plurality of data items, an input buffer, first peripheral means for supplying data items to said input buffer, an output buffer, second peripheral means for receiving data items from said output buffer, a data processing unit connected for access to said data storage unit and adapted to execute a program of distinct commands in sequential order by executing corresponding distinct operations on said data items, and means for selectively interrupting the access of said data processing unit to said data storage unit for an interval and for providing communication between one of said buffers and said data storage unit during said interval.

34. In combination, a data storage unit for storing a plurality of data items, data source means for supplying a sequence of data items, data receiver means for receiving a sequence of data items, first signalling means for providing a first control signal when a data item must be transferred from said data source means to said data storage unit, second signalling means for providing a second control signal when a data item must be transferred from said data storage unit to said data receiver means, a data processing unit connected for access to said data storage unit and adapted to execute a program of distinct commands in sequential order by executing corresponding distinct operations on said data items, means for providing a third signal at a predetermined time during execution of an operation by said data processing unit, and means responsive to said third signal and to one of said control signals for providing communication between the corresponding data means and said data storage unit during a period of predetermined duration wherein no data item is transferred between said data storage unit and said data processing unit.

35. In combination, a data storage unit for storing a plurality of data items, an input buffer, first peripheral means for supplying a sequence of data items to said input buffer, an output buffer, second peripheral means for receiving a sequence of data items from said output buffer, first signalling means for providing a first control signal when a data item must be transferred from said input buffer to said data storage unit, second signalling means for providing a second control signal when a data item must be transfered from said data storage unit to said output buffer, a data processing unit connected for access to said data storage unit and adapted to execute a program of distinct commands in sequential order by executing corresponding distinct operations on said data items, means for providing a third signal at a predetermined time during execution of an operation by said data processing unit, and means responsive to said third signal and to one of said control signals for providing communication between the corresponding buffer and said data storage unit during a period of predetermined duration wherein no data item is transferred between said data storage unit and said data processing unit.

36. In combination, a data storage unit for storing a plurality of data items, a data processing unit adapted to execute a program of distinct commands in sequential order by executing corresponding distinct operations on said data items, data source means for supplying data items, data receiver means for receiving data items, first signalling means for providing a first signal having two possible states, said first signal having one state when a data item must be transferred from said data source means to said data storage unit, second signalling means for providing a second signal having two possible states, said second signal having ont state when a data item must be transferred from said data storage unit to said data receiver means, means responsive to the other states of said first and said second signals for providing uninterrupted access by said data processing unit to said data storage unit, and means responsive to the one state of one of said signals for interrupting the access of said data processing unit to said data storage unit for an interval and for providing communication between the corresponding data means and said data storage unit during said interval.

37. In combination, a data storage unit for storing a plurality of data items, a data processing unit adapted to execute data processing operations on data items received thereby, data source means for supplying data items, data receiver means for receiving data items, signalling means for providing a first signal having two possible states, said first signal having one state when one of said data means must communicate with said data storage unit, means responsive to the other state of said first signal for providing uninterrupted access by said data processing unit to said data storage unit, means for providing a second signal at a predetermined time during the execution of an operation by said data processing unit, and means responsive to said second signal and to said one state of said first signal for interrupting the access of said data processing unit to said data storage unit for a period and for providing communication between said data storage unit and one of said data means during said period.

38. In combination, a data storage unit for storing a plurality of data items, a data processing unit adapted to execute a program of distinct commands in sequential order by executing corresponding distinct operations on said data items, data source means for supplying data items, data receiver means for receiving data items, first signalling means for providing a first signal having two possible states, said first signal having one state when a data item must be transferred from said data source means to said data storage unit, second signalling means for providing a second signal having two possible states, said second signal having one state when a data item must be transferred from said data storage unit to said data receiver means, means responsive to the other states of said first and said second signals for providing uninterrupted access by said data processing unit to said data storage unit, means responsive to the one state of one of said signals for interrupting the access of said data processing unit to said data storage unit and for causing said data processing unit to discontinue execution of said program following completion of the operation being executed when said one state of one of said signals occurs, means for providing communication between the corresponding data means and said data storage unit following the discontinuance of execution of said program, and means for causing said data processing unit to resume executing said program following completion of said communication.

*39. In a data processing system having a memory including a plurality of locations each respectively storing either an instruction or a data word;*

*a plurality of registers;*

*means for selectively accessing one of said instruction words from said memory and for storing said instruction word in a first of said registers;*

*means for identifying a first data word stored in said memory;*

*means for accessing said first data word from said memory;*

*means for storing a test data word in a second of said registers;*

*means for comparing said first and test data words in accordance with a comparison criterion defined by said accessed instruction word and for generating a signal when said comparison satisfies said criterion; and*

*means responsive to said accessed instruction word stored in said first register and to the absence of said signal for sequentially identifying and accessing other data words stored in said memory and for sequentially comparing said other data words with the data word stored in said second register.*

References Cited

The following references, cited by the Examiner, are of record in the patented file of this patent or the original patent.

UNITED STATES PATENTS

| | | | |
|---|---|---|---|
| 2,679,638 | 5/1954 | Bensky et al. | 340—172 |
| 2,831,179 | 4/1958 | Wright et al. | 340—172.5 |
| 2,863,604 | 12/1958 | Leclerc et al. | 235—159 |
| 2,923,476 | 2/1960 | Ketchledge | 235—177 |
| 2,934,269 | 4/1960 | Havens et al. | 235—159 |
| 2,949,231 | 8/1960 | Schubert | 235—177 |
| 3,008,127 | 11/1961 | Block | 340—172.5 |
| 3,024,445 | 3/1962 | Spielberg | 340—172 |
| 3,029,414 | 4/1962 | Schrimpf | 340—172.5 |
| 3,063,036 | 11/1962 | Reach | 340—172.5 |

PAUL J. HENON, Primary Examiner

R. F. CHAPURAN, Assistant Examiner